US005742813A

United States Patent [19]

Kavanagh et al.

[11] Patent Number: 5,742,813

[45] Date of Patent: Apr. 21, 1998

[54] METHOD AND APPARATUS FOR CONCURRENCY IN AN OBJECT ORIENTED DATABASE USING LOCK INHERITANCE BASED ON CLASS OBJECTS

[75] Inventors: Thomas S. Kavanagh; Christopher W. Beall, both of Boulder; William C. Heiny, Arvada; John D. Motycka, Evergreen; Samuel S. Pendleton, Louisville; Brooke E. Terpening, Golden; Kenneth A. Traut, Boulder, all of Colo.

[73] Assignee: CADIS, Inc., Boulder, Colo.

[21] Appl. No.: 527,161

[22] Filed: Sep. 12, 1995

Related U.S. Application Data

[63] Continuation-in-part of Ser. No. 339,481, Nov. 10, 1994.

[51] Int. Cl.[6] .................................................... G06F 17/30

[52] U.S. Cl. ............................ 395/608; 395/614; 395/54

[58] Field of Search .................................... 395/608, 614, 395/616, 726, 54, 62

[56] References Cited

U.S. PATENT DOCUMENTS

| | | | |
|---|---|---|---|
| 3,343,133 | 9/1967 | Dirks | 340/172.5 |
| 4,318,184 | 3/1982 | Millett et al. | 395/601 |
| 4,879,648 | 11/1989 | Cochran et al. | 395/353 |
| 4,887,206 | 12/1989 | Natarajan | 395/229 |
| 4,918,602 | 4/1990 | Bone et al. | 395/201 |
| 4,930,071 | 5/1990 | Tou et al. | 395/604 |
| 4,984,155 | 1/1991 | Geier et al. | 395/226 |
| 5,021,992 | 6/1991 | Kondo | 395/54 |
| 5,109,337 | 4/1992 | Ferriter et al. | 395/229 |
| 5,133,075 | 7/1992 | Rissch | 395/800 |
| 5,146,404 | 9/1992 | Calloway et al. | 395/201 |
| 5,191,534 | 3/1993 | Orr et al. | 364/468.12 |
| 5,206,949 | 4/1993 | Cochran et al. | 395/604 |
| 5,210,868 | 5/1993 | Shimada et al. | 395/615 |
| 5,257,365 | 10/1993 | Powers et al. | 395/611 |
| 5,260,866 | 11/1993 | Lisinski et al. | 395/229 |
| 5,283,865 | 2/1994 | Johnson | 395/357 |
| 5,485,607 | 1/1996 | Lomet et al. | 395/608 |

OTHER PUBLICATIONS

Won Kim, "Introduction to Object-Oriented Databases," 1991 MIT Press, pp. 128–143; 164–169.

Jim Gray et al., "Transaction Processing = Concepts and Techniques," 1993 Morgan Kaufman Publishers, Inc., pp. 406–414.

J.N. Gray et al., "Granularity of Locks and Degrees of Consistency in a Shared Data Base," IFIP Working Conference on Modeling of Data Base Management Systems, 1976, pp. 94–121.

Letter, dated Sep. 16, 1996, from Nancy P. Cochran to Caroline Himes.

PCT International Search Report, dated Apr. 22, 1996, International Appl. No. PCT/US95/15028 for CADIS, Inc., 4 pages.

*Primary Examiner*—Paul V. Kulik
*Attorney, Agent, or Firm*—Baker & Botts, L.L.P.

[57] ABSTRACT

The present invention provides a method and apparatus for concurrency control in an object oriented database management system having a plurality of users accessing the system at the same time, and allowing editing of the database while other users are concurrently searching the database. The present invention may be advantageously used in a client/server architecture comprising a knowledge base client and a knowledge base server. In a preferred embodiment, the knowledge base server may include an object oriented lock manager, a dynamic class manager, a connection manager, a query manager, a handle manager, a units manager, a database manager, and a file manager. The concurrency control mechanism includes a lock holder table. The present invention provides a method and apparatus for providing concurrency control in an object oriented database managemant system using only three types of lock modes: a class share lock, a tree update lock, and a tree exclusive lock. In a preferred embodiment, a fourth type of lock mode may be provided: a tree share lock. The present invention provides a particularly advantageous concurrency control mechanism for an object oriented database management system that is read oriented.

2 Claims, 73 Drawing Sheets

217 220 219 216 221

Lock Conflict Table

| | CSL | TSL | TUL | TXL |
|---|---|---|---|---|
| CSL | No | No | No | Yes |
| TSL | No | No | No | Yes |
| TUL | No | No | Yes | Yes |
| TXL | Yes | Yes | Yes | Yes |

250

Lock Table

| | Class (256) | Lock Object (257) | Lock Object (258) | Lock Object (259) | Lock Object | ... |
|---|---|---|---|---|---|---|
| 251 | 1 | 261 | CSL | | | |
| 252 | 2 | 249 | | | | |
| 253 | 3 | 262 | CSL | | | |
| 254 | 4 | 269 | | | | |
| 255 | 5 | | CSL (260) | | | |
| | . . . | | | | | |

260

Lock Object

| Lock Type | Count | |
|---|---|---|
| TXL - Tree Exclusive Lock | 0 | 264 |
| TUL - Tree Update Lock | 0 | 265 |
| TSL - Tree Share Lock | 0 | 266 |
| CSL - Class Share Lock | 1 | 263 |
| User ID | 100 | 268 |
| Lock Holder Handle | 1 | 267 |

250

Lock Table 256 257 258 259

| Class Handle | Lock Object | Lock Object | Lock Object | Lock Object | ... |
|---|---|---|---|---|---|
| 251 — 1 | 261 | CSL | | | |
| 252 — 2 | 249 | | | | |
| 253 — 3 | 262 | CSL | | | |
| 254 — 4 | 269 | | | | |
| 255 — 5 | 260 | CSL,TUL | | | |
| ... | | | | | |

260

| Lock Type | Count | |
|---|---|---|
| TXL - Tree Exclusive Lock | 0 | 264 |
| TUL - Tree Update Lock | 1 | 265 |
| TSL - Tree Share Lock | 0 | 266 |
| CSL - Class Share Lock | 1 | 263 |
| User ID | 100 | 268 |
| Lock Holder Handle | 1 | 267 |

250

Lock Table

| Class Handle | Lock Object (256) | Lock Object (257) | Lock Object (258) | Lock Object (259) | ... |
|---|---|---|---|---|---|
| 1 (251) | 261 | CSL, CSL | | | |
| 2 (252) | 249 | | | | |
| 3 (253) | 262 | CSL, CSL | | | |
| 4 (254) | 269 | | | | |
| 5 (255) | 260 | CSL,CSL | | | |
| ... | | | | | |

260

| Lock Type | Count | |
|---|---|---|
| TXL - Tree Exclusive Lock | 0 | 264 |
| TUL - Tree Update Lock | 0 | 265 |
| TSL - Tree Share Lock | 0 | 266 |
| CSL - Class Share Lock | 2 | 263 |
| User ID | 100 | 268 |
| Lock Holder Handle | 1 | 267 |

| | LOCK HOLDER 1 | LOCK HOLDER 2 | LOCK HOLDER 3 | LOCK HOLDER 4 | LOCK HOLDER 5 | LOCK HOLDER 6 | LOCK HOLDER 7 |
|---|---|---|---|---|---|---|---|
| CLASS HANDLE 1 | 401 | 408 | 415 | 422 | 429 | 436 | 443 |
| CLASS HANDLE 2 | 402 | 409 | 416 | 423 | 430 | 437 | 444 |
| CLASS HANDLE 3 | 403 | 410 | 417 | 424 | 431 | 438 | 445 |
| CLASS HANDLE 4 | 404 | 411 | 418 | 425 | 432 | 439 | 446 |
| CLASS HANDLE 5 | 405 | 412 | 419 | 426 | 433 | 440 | 447 |
| CLASS HANDLE 6 | 406 | 413 | 420 | 427 | 434 | 441 | 448 |
| CLASS HANDLE 7 | 407 | 414 | 421 | 428 | 435 | 442 | 449 |

METHOD AND APPARATUS FOR CONCURRENCY IN AN OBJECT ORIENTED DATABASE USING LOCK INHERITANCE BASED ON CLASS OBJECTS

CROSS-REFERENCE TO RELATED APPLICATIONS

This application is a continuation-in-part of application Ser. No. 08/339,481, filed Nov. 10, 1994, by Thomas S. Kavanagh, et al., for OBJECT ORIENTED DATABASE MANAGEMENT SYSTEM, the entire disclosure of which is incorporated herein by reference.

BACKGROUND OF THE INVENTION

A database system, regardless of whether it is object-oriented or not, may run either on one processor or a network of processors. A database on a network in turn may be managed by one or more nodes, or processors, on the network. A network-based database system in which the database is managed by more than one node on the network is sometimes called a distributed database system. A network-based database system in which the entire database is managed by one node of the network is sometimes called a client/server database system. In such a system, a dedicated server manages the entire database, and all other nodes are sometimes referred to as clients. The clients communicate with the server to access the database on behalf of the applications that run on them.

A client/server architecture for an object-oriented database system may offer some advantages over a distributed database architecture. It is often easier to implement and less complex than a fully distributed database system. It may provide a relatively easy means for the users of "diskless" workstations to manage their data. It may also allow fast access to objects in an object buffer pool, and may make those objects persistent as necessary.

While the entire database in a client/server database system is managed by one node of the network, it is desirable to allow more than one client to have access to and use the database at the same time. A system is needed to control and manage the concurrent operations of multiple clients. One user, for example, may need to change or delete certain data that is being accessed by another user. In addition, two clients cannot be allowed to change the same instance of data at the same time.

In the past, concurrency control of conventional relational databases has involved some type of locking protocol. The extension of conventional locking protocols to object-oriented database systems has not produced completely satisfactory results. Those skilled in the art have typically tried to approach the problem like it would be approached in a relational database. This has resulted in complexity and performance penalties.

In one example, a locking protocol has been proposed which requires a complex compatibility matrix structure. In order to provide a protocol for shared composite references, this reference states that a system needs to introduce eleven lock modes: S (shared) mode, X (exclusive) mode, IS (intention shared) mode, IX (intention exclusive) mode, SIX (shared intention exclusive) mode, ISO (intention shared object) mode, IXO (intention exclusive object) mode, SIXO (shared intention exclusive object) mode, ISOS (intention shared object-shared) mode, IXOS (intention exclusive object-shared) mode, and SIXOS (shared intention exclusive object-shared) mode. In this example, the attempted solution to concurrency problems was to introduce more complexity into the locking system. Such a complicated protocol has a significant number of locks that must be set and maintained in a system lock table. W. Kim, *Introduction to Object Oriented Databases*, at 164–68 (1990).

The above-cited Kim reference attempts to allow a user to lock a class, which is a component class on a composite object hierarchy, independently of the composite object hierarchy. The Kim reference also states that the most intuitive protocol is incorrect and produces bad results. Id., at 165. According to Kim, three new lock modes are required to make the protocol correct. Kim allows a unit of locking to include an instance, and allows locking independent of the composite object hierarchy. Id., at 164. This is shown schematically in FIG. 3A, which depicts an extended database granularity hierarchy. As shown in FIG. 3A, it is possible to obtain a lock on an instance without first obtaining a lock on the composite object.

In the above-cited Kim proposal, if there is even one reader via the composite object hierarchy, there can be no direct updaters of instances of component classes. Further, if there is even one direct reader of instances of a component class, there can be no updaters via the composite object hierarchy. Id., at 166. The Kim proposal attempts to prevent any user from viewing stale or incorrect data. This proposal has not provided an entirely satisfactory solution to concurrency problems, especially in an application that is read oriented.

Other proposals have employed similar hierarchies of lock granules. The example shown in FIG. 3B was proposed by W. Kim & F. H. Lochovsky, *Object-Oriented Concepts, Databases, and Applications*, at 271 (1989). In this example, a database may consist of a number of classes and indexes on the classes. A class consists of instances, and an index on a class has pointers to instances of the class. In this example, a lock could be acquired on an instance, and locking would be allowed independent of the composite object hierarchy.

At least some conventional approaches enforce atomicity for all transaction execution histories allowed by the system. In such a system, intermediate results of one transaction cannot be made visible to other transactions. The concurrency control mechanism may be such that a transaction may be partially completed before it is known that the transaction cannot be completed. Atomicity requires that, in the face of failure, it must be possible to roll back any partially completed transactions. Atomicity is discussed in W. Kim & F. H. Lochovsky, *Object-Oriented Concepts, Databases, and Applications*, at 396–97 (1989). In order to make it possible for a transaction to be recoverable, a transaction mechanism must incur significant overhead. In the past, some approaches have suffered from the disadvantage that the concurrency control mechanism would fail during a transaction, and the system would have to roll back partially completed transactions.

In the past, intent locks have been used, which require a two level way of getting to the locking mechanism. Intent locking is described in C. J. Date, *An Introduction to Database Systems*, vol. 2, at 112–32 (rev. 1984). A locking protocol purportedly used in SQL/DS would set an R or W lock on a node of the lock-granularity hierarchy by first locking in intention mode, i.e., either intention read or intention write, respectively, all ancestors of the node in a root-to-leaf order. W. Kim & F. H. Lochovsky, *Object-Oriented Concepts, Databases, and Applications*, at 271 (1989). This is a time consuming approach.

In the past, intention share locks have been proposed which may allow another user to also obtain an intention share lock for the same item, but only one user can actually share the data. Various lock mode terminology used in the past which includes the word "share" does not actually permit sharing of the data. In addition, the term "share" is sometimes applied to a lock mode that does not allow two users to both retrieve the same data item.

In some proposals, locks are subsumed, so more steps are required to accomplish certain tasks. For example, FIG. 4A depicts a hierarchy in which a class share lock "CS" has been applied to three classes, and is shown in FIG. 4A as a class share lock on class 107, a class share lock on class 101, and a class share lock on class 104. In FIG. 4B, a tree lock "TL" (which for example may be a tree share lock or a tree exclusive lock) has been acquired at class 107. In a system with lock subsuming, not only is the class share lock on class 107 changed to a tree lock, but the class share locks on class 101 and on class 104 are physically removed by the system. Performance may be limited by subsumed locking techniques. Lock promotion is also sometimes used, and requires more steps to implement, resulting in more complicated algorithms and more complicated locking schemes.

Additional background information appears in R. G. G. Cattell, *The Object Database Standard: ODMG*-93 (rel. 1.1 1994).

In a network-based object-oriented database system, it is desirable for the visual display of a class object hierarchy to a user to remain consistent. However, it is desirable to have a concurrency system that provides such a consistent visual display while allowing concurrent changes to the class hierarchy by other users. A simplified lock management system has been needed for an object oriented database which allows for implicit locking, and which does not allow a user to lock a class independently of the composite object hierarchy. A concurrency system has been needed that is optimized for a read oriented application.

SUMMARY OF THE INVENTION

The present invention may be advantageously used in a client/server architecture comprising a knowledge base client and a knowledge base server. The present invention provides a particularly advantageous concurrency control mechanism for an object oriented database management system that is read oriented. In a preferred embodiment, the knowledge base server includes an object oriented lock manager, a dynamic class manager, a connection manager, a query manager, a handle manager, a units manager, a database manager, and a file manager.

The object oriented lock manager of the present invention may be used to provide a concurrency control mechanism which has a number of advantageous features. A system in accordance with the present invention maximizes availability of a tool for design engineers. The invention provides optimal availability by allowing users to query and view class objects without disruption of their view while modifications are being made by other users. These modifications would preferably include additions, deletions, and edits of classes, attributes, instances, and parameters.

The invention optimizes performance of the concurrency control system by using lock inheritance based on class objects. The lock manager means implements a mechanism for locks to be placed on a class without subclass inheritance of the lock. This mechanism is a class lock. The lock manager means also provides an inheritance mechanism for locks. The inheritance mechanism is a tree lock. Tree locking a class will lock all descendants of that class by inheritance without physically requiring the placement of class locks on the descendant classes. The present invention employs true share locks and exclusive locks. The present invention also provides a novel implementation of a lock mode that is a hybrid between a share lock and an exclusive lock, which is referred to as an "update" lock.

The invention optimizes performance by simplifying the number of objects that need to be locked by using class level lock granularity. The granularity or scope of a class lock is the class itself, the attributes defined by the class, and the instances associated with that class. The present invention does not allow an instance to be locked independently of the class to which it belongs.

The knowledge base client means uses the object oriented lock means mechanisms to place locks of appropriate granularity and inheritance to provide the maximum availability, stability, and performance of a tool using these means.

BRIEF DESCRIPTION OF THE DRAWINGS

FIG. 51 is a diagram of a lock table that is used by the lock manager.

DETAILED DESCRIPTION OF A PREFERRED EMBODIMENT

I. Overall Architecture

Figure 1:
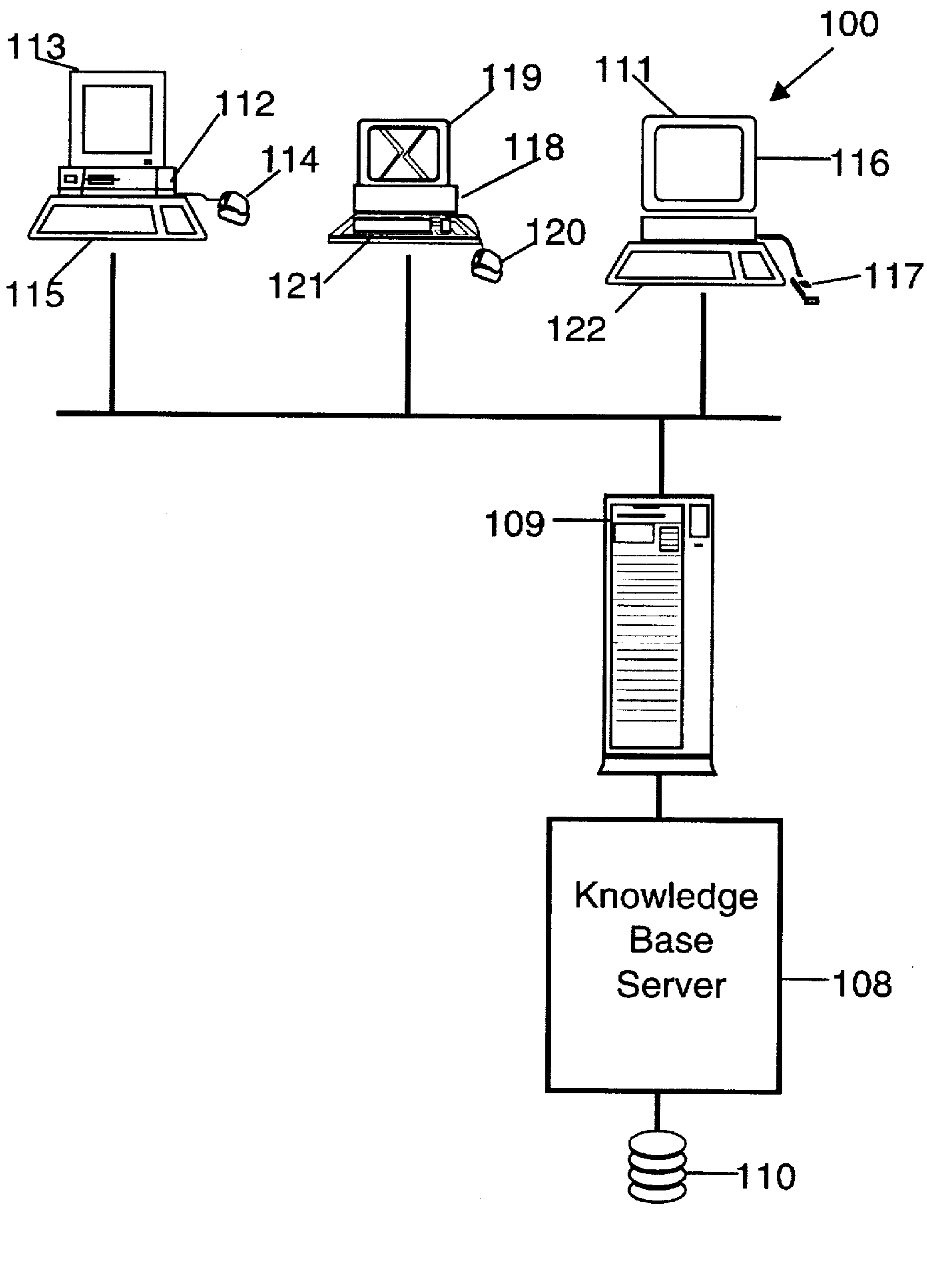
FIG. 1 is a diagram of a network environment that is suitable for a preferred embodiment of the present invention.

A presently preferred embodiment of the present invention is shown in FIG. 1, and employs a network 100 having a client/server architecture comprising one or more knowledge base clients 112, 118 and 111, and a knowledge base server 108. In the preferred embodiment shown in FIG. 2, the knowledge base server 108 includes an object oriented lock manager 125, a dynamic class manager 134, a connection manager 135, a query manager 136, a handle manager 137, a units manager 138, a database manager 139, and a file manager 140. A server host 109 may be designated to run the knowledge base server 108, with the software and knowledge base 123 preferably residing on a local disk drive 110. A knowledge base client 131 interacts with the knowledge server 132 over a network 100 in the illustrated embodiment. A preferred system includes a registry server 141 and a license manager 142 to control unauthorized access to the system. A legacy client 133 and a legacy manager 145 are preferably included to facilitate organization of an existing legacy database into schema for use in connection with an object oriented database management system. An application programming interface or API 143 is also shown in the illustrated embodiment.

A schema editor 144 is provided for modifying and changing the schema or database 123. With the concurrency control provided by the present invention, a plurality of schema editors 144 may be used at the same time, while a plurality of retrievers 130 are being used. The structure and operation of the schema editor 144, the dynamic class manager 134, the retriever 130, the connection manager 135, the query manager 136, the handle manager 137, the units manager 138, the database manager 139, the file manager 140, the registry server 141, the license manager 142, the API 143, the legacy manager 145, and the knowledge base client 131 are described in more detail in application Ser. No. 08/339,481, filed Nov. 10, 1994, by Thomas S. Kavanagh, et al., for OBJECT ORIENTED DATABASE MANAGEMENT SYSTEM, the entire disclosure of which is incorporated herein by reference.

II. Concurrency Control

In the example illustrated in FIG. 1, a plurality of users or clients 111, 112, and 118 are shown connected to the network 100. A first client 111 runs on a Sun Microsystems SPARCstation 111, which is shown having a display 116, a mouse 117, and a keyboard 122. A second client 112 runs on an IBM compatible computer 112, shown having a display 113, a mouse 114, and a keyboard 115. A third X Windows client 118 is illustrated having a computer 118, a display 119, a mouse 120, and a keyboard 122.

The present system supports interactive editing by one or more users connected through respective clients 131. For example, users are able to use a schema editor 144 to change the schema by adding and deleting attributes, to add whole sections to the schema, to reposition whole sections of the schema within the schema hierarchy, and to modify, add and delete instances. These interactive editing operations may be performed while other users are simultaneously using retrievers 130 to access the database 123. The management of these simultaneous operations, including the ability of a plurality of users to access the database 123 while a plurality of users are at the same time making changes to the database 123, is referred to as concurrency control.

In the present invention, the object oriented lock manager 125 provides a concurrency control mechanism which allows users to query and view class objects without disruption of their view while modifications are being made by other users. These modifications include additions, deletions, and edits of classes, attributes, instances, and parameters.

In a preferred embodiment, the lock manager 125 is a subsystem of the class manager 134.

The present invention optimizes performance of the concurrency control system by using lock inheritance based on class objects. The lock manager 125 implements a mechanism for locks to be placed on a class without subclass inheritance of the lock. This mechanism is referred to as a "class lock." The lock manager 125 also provides an inheritance mechanism for locks. The inheritance mechanism is referred to as a "tree lock." Tree locking a class will effectively result in a "lock" on all descendants of that class by inheritance without physically requiring the placement of class locks on the descendant classes.

Figure 3A:
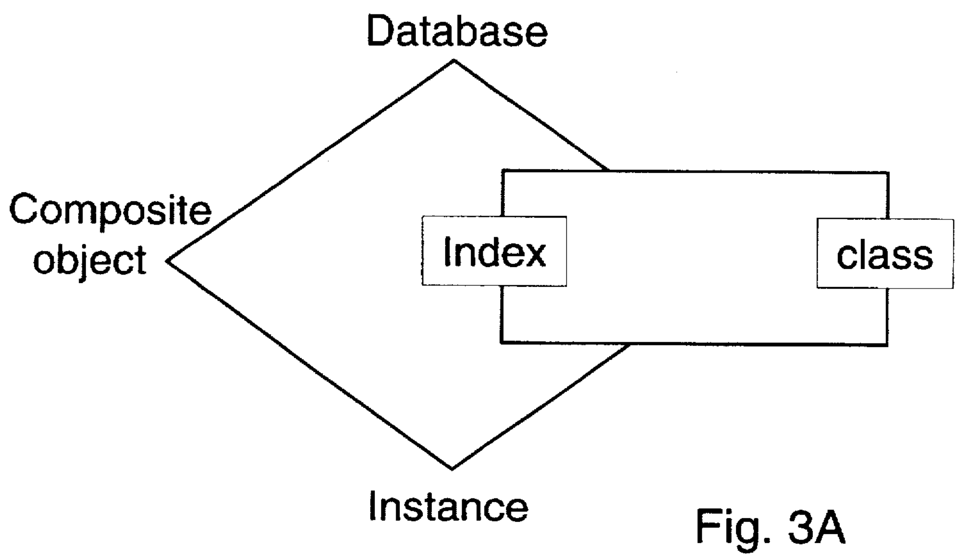
FIG. 3A is a schematic diagram which depicts an extended database granularity hierarchy proposed in the past.
Figure 3B:
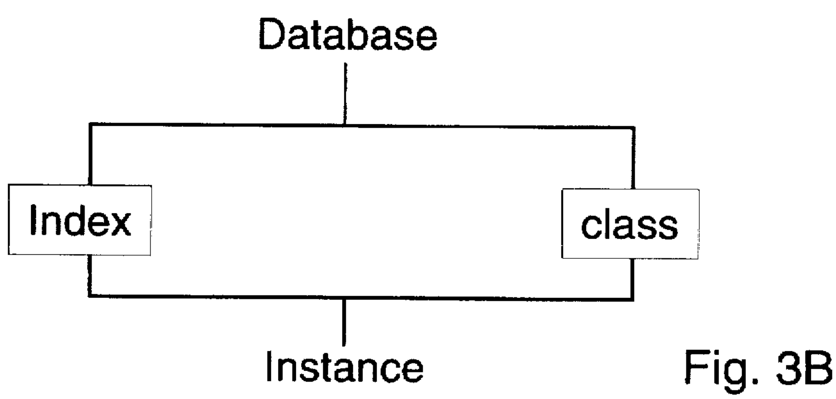
FIG. 3B is a schematic diagram that depicts another example of a hierarchy of lock granules proposed in the past.
Figure 3C:
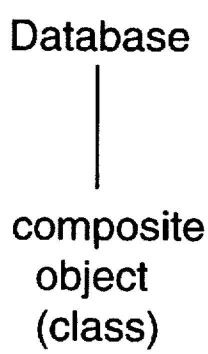
FIG. 3C is a schematic diagram that depicts a hierarchy of lock granules in accordance with the present invention.
Figure 4A:
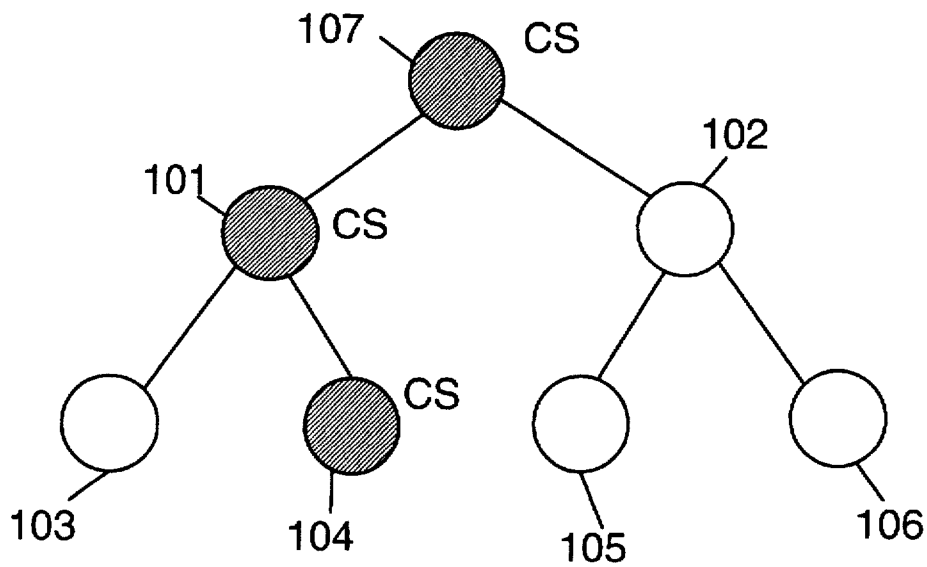
FIG. 4A is a schematic diagram that depicts a hierarchy in which a class share lock has been applied to three classes.
Figure 4B:
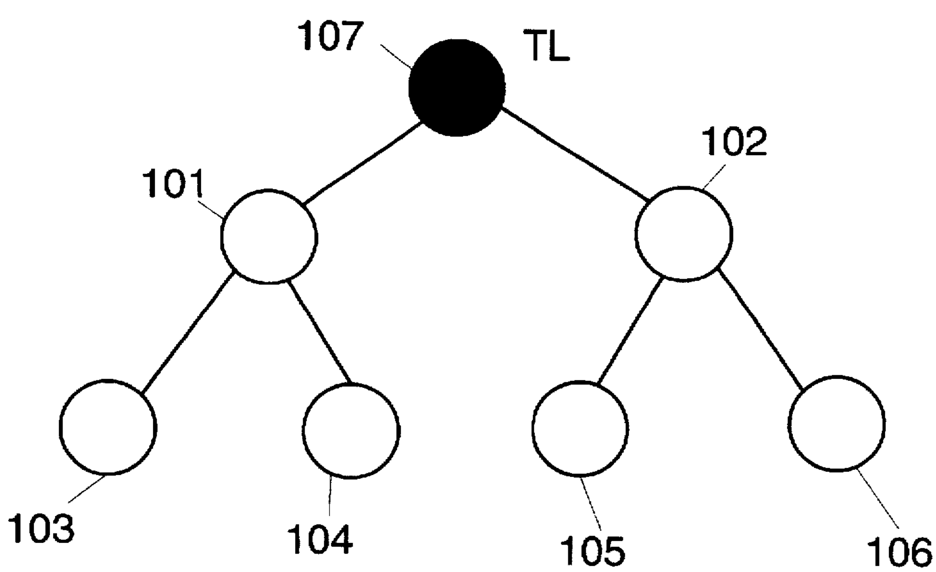
FIG. 4B is a schematic diagram that depicts a hierarchy in which a tree lock has been applied to a class, and in conjunction with FIG. 4A, demonstrates an example of lock subsuming.

The present invention simplifies the number of objects that need to be locked by using class level lock granularity. This optimizes performance. The granularity or scope of a class lock is the class itself, the attributes defined by the class, and the instances associated with that class. FIG. 3C is a schematic diagram that depicts a hierarchy of lock granules in accordance with the present invention. A significant feature of the present invention is that it does not allow an instance to be locked independently of the class to which it belongs. This is in contrast to the approaches shown in FIG. 3A and FIG. 3B. In the present invention, classes are locked, either individually (class locks), or in groups (tree locks), but instances are not locked as such. Concurrency is controlled, not by determining whether a instance in question is itself locked, but rather by determining whether the class to which it belongs is locked. The composite object is a class.

The present invention can implement concurrency control in an object oriented database using only three types of lock modes, although four types are preferably employed. The three types of lock modes used in the present invention are: class share lock ("CSL"), tree update lock ("TUL"), and tree exclusive lock ("TXL"). The fourth type of lock mode that may be used is a tree share lock ("TSL"), which may be considered to be in effect a group of class share locks. Therefore, in a preferred embodiment, the knowledge base server 132 actually supports four lock types: exclusive, update, and two flavors of share locks.

The "class share lock," which is also referred to as a "CSL," locks a single class node for sharing.

The "tree share lock," which is also referred to as a "TSL," locks the subtree rooted at the class for sharing. This lock behaves exactly like placing a CSL on each class in the subtree.

The "tree update lock," which is also referred to as a "TUL," locks the subtree rooted at the class for instance editing. This is sometimes called simply an 'update lock' or U-lock.

The "tree exclusive lock," which is also referred to as a "TXL," or sometimes simply as an X-lock, locks the subtree rooted at the class for exclusive use.

Some actions which change the knowledge base 123 can be performed without requiring an exclusive type of write lock. Another type of write lock, referred to herein as an "update" lock, is used for certain actions including modifying parameter values, adding, and moving instances. An update lock is a hybrid of the share and exclusive locks. An object may be update locked by at most one application, but simultaneously the object can be share locked by one or more applications. This means that the one application with the update lock can make changes to the object at the same time as it is being examined by the other applications. These changes to the knowledge base that can occur when an object is both update and share locked are considered easy enough for an application to recognize and manage.

An update lock is a "weaker" type of a write lock than an exclusive lock. Any change to the knowledge base 123 requires that a write lock has been requested and acquired. Some of the updating actions require an exclusive lock, and other updating actions require an update lock. But, the ones that require an update lock require "at least" an update lock. An exclusive lock is always sufficient for making a change to the knowledge base 123, but an update lock is a more friendly, more concurrent lock for making a selected set of changes.

The knowledge base client 131 uses the object oriented lock mechanisms provided by the lock manager 125 to place locks of appropriate granularity and inheritance to provide the maximum availability, stability, and performance of a tool using these mechanisms. The example described herein is optimized for a read oriented database system. It is particularly advantageous in a knowledge base schema that is used for parts management.

Locks serve two purposes. First, locks are used by the application or knowledge base client 131 to announce or make the statement that an object is being examined. Since it is harmless for multiple applications to examine the same object simultaneously, the type of lock used for this purpose is a share lock. Several applications can share an object by concurrently share locking it. Typically, applications use share locks as they navigate through the schema, perform queries, and examine instances.

The second use of locks by an application is to announce that it wishes to change an object. The application should insure that no other application is attempting to change the same object. This type of lock is called an write lock. Other applications are prevented from changing an object that is write locked. Typically, applications use write locks when adding or deleting instances, modifying parameter values, or editing the schema. As noted above, the knowledge base server 132 supports two types of write locks: exclusive locks and update locks. Exclusive locks are used to prevent applications from interacting in ways that could cause problems. For example, when an instance is to be deleted, or when the schema is edited, an exclusive lock is used. Where an object can be changed in ways that do not cause problems, a weaker update lock is preferably used to provide maximum concurrency.

It will be appreciated that most of the locks used in the present invention are 'tree' locks. In the above discussion, references were made to locking an object (actually a class). What is really meant is that a class is under the influence of a lock. When the ancestor class of a given class is exclusive locked, then that class is also effectively exclusive locked because it is in the subtree which is rooted by an exclusive locked class.

An application establishes a lock by requesting it. If the request succeeds, then the application has acquired the lock. The application must release the lock when the object no longer needs to be locked. The request will fail if the lock conflicts with other locks that have already been requested by other applications. A conflict will occur if the request is for a write lock and the object is already write locked or if the request is for a share lock and the object is already exclusive locked.

The objects that can be locked are always classes. Instances are never locked. The preferred system uses a subtree as an alias for an instance. In this approach, fewer locks are applied, which results in a less complex and faster system. For an application to change some object which is not a class, a write lock on the class associated with that object is required. In other words, to add an instance a write lock must be requested for the class to which the instance is to be added. A parameter value can only be changed when the application requests a write lock on the class that owns in instance. For example, the schema developer or editor 144 requests exclusive locks on a class for making changes to attributes which are defined by that class.

The lock manager 125 and the knowledge base server 132 require an application to become a lock holder before it can request a lock. It becomes a lock holder by using the pmx_startLockHolder( ) function, and thus starting a lock holder. The pmx_startLockHolder( ) function is described more fully in the software functions section. The combination of the application's connection to the knowledge base server 132 and the lock holder are what distinguish one application from another for resolving conflicts between locks. An application can start multiple lock holders and thus cause conflicts for lock requests within the application. This is useful for subroutines within the application that need to be isolated. The application stops being a lock holder by ending the lock holder.

Figure 2:
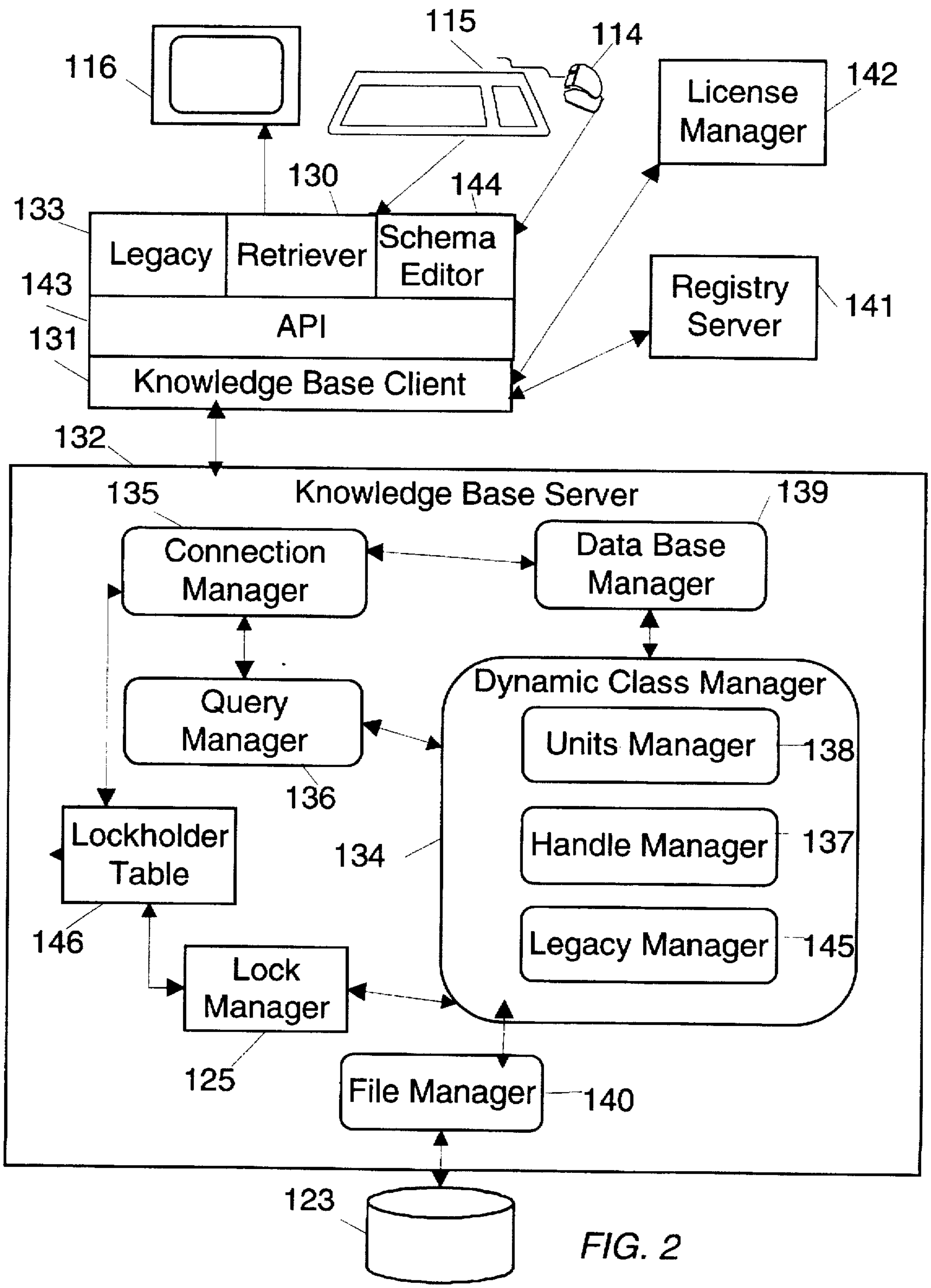
FIG. 2 is a block diagram depicting an overall architecture for a system employing a preferred embodiment of the present invention.

Each application connection to the knowledge base server has a unique lock holder table 146 as shown in FIG. 2. The lock holder table 146 is used by the lock manager 125 to manage the existing lock holders for each connection.

Figure 52:
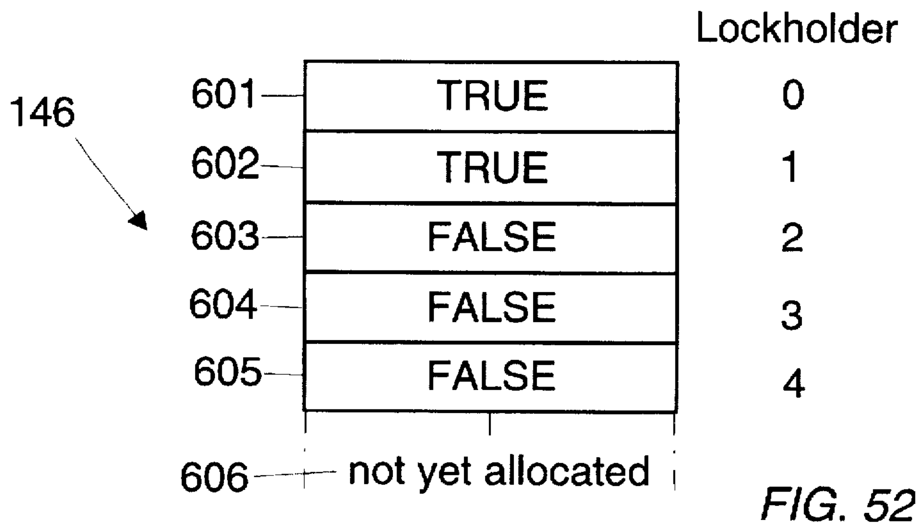
FIG. 52 shows the data structure for the lock holder table.

FIG. 52 shows the data structure for the lock holder table 146. In a preferred embodiment the lock holder table 146 is a dynamic list of Boolean values.

A TRUE value in the lock holder table 146 represents a lock holder that has been started. A FALSE value in the lock holder table 146 is a lock holder that has been ended or one that has never been used. The index into the lock holder table 146 is the lock holder handle 267 itself. Thus, in the example shown in FIG. 52, the TRUE value 601 is lock holder handle zero, and it has been started. The lock holder handle one 267 corresponds to the table 146 entry identified by reference numeral 602, and it has a TRUE value indicating that it has been started. The lock holder handle 2 with value FALSE 603 has been ended.

Figure 53:
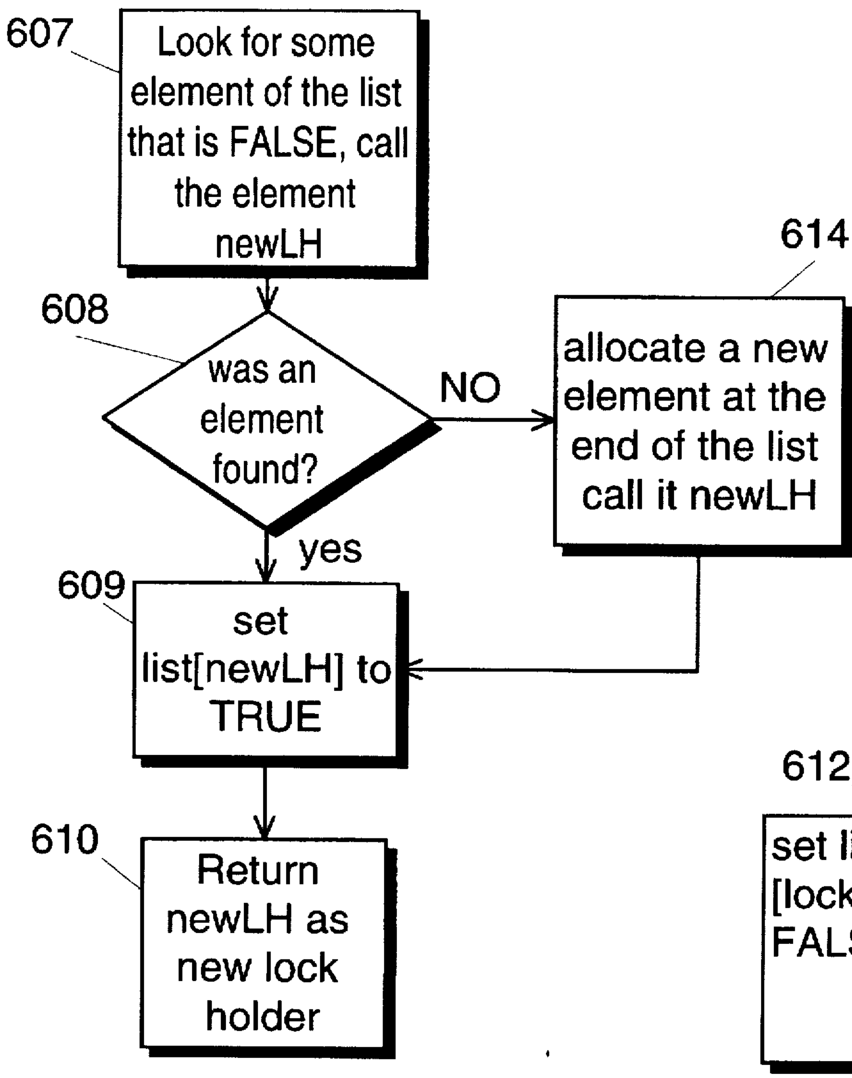
FIG. 53 is a flow chart showing the operation of starting a lock holder.

The operation of starting a lock holder is shown in the flow chart in FIG. 53. In step 607, the lock holder table 146 is searched for a value of FALSE, representing a lock holder that is not in use and can be allocated. If a FALSE element is found, then the table index is assigned to "newLH." In step 608, if a FALSE element was found control proceeds to step 609 where the the lock holder table 146 element at index "newLH" is set to TRUE to indicate that the lock holder is being allocated. If a FALSE element was not found in step 608, control continues at step 611 where a new element 606 is allocated at the end of the lock holder table 146 and the index of this new element 606 is assigned to "newLH". Control continues at step 609. At step 610, the index "newLH" is returned as the newly started lock holder handle.

Figure 54:
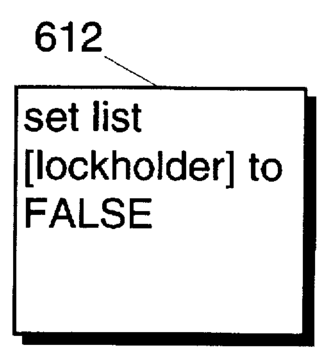
FIG. 54 is a flow chart for the operation of ending a lock holder.

FIG. 54 is a flow chart for the operation of ending a lock holder. The process can be performed very quickly in one step 612 in the present invention. In step 612, the lock holder table 146 element indexed by the lock holder handle to be ended is set to FALSE.

Figures 5, 6:
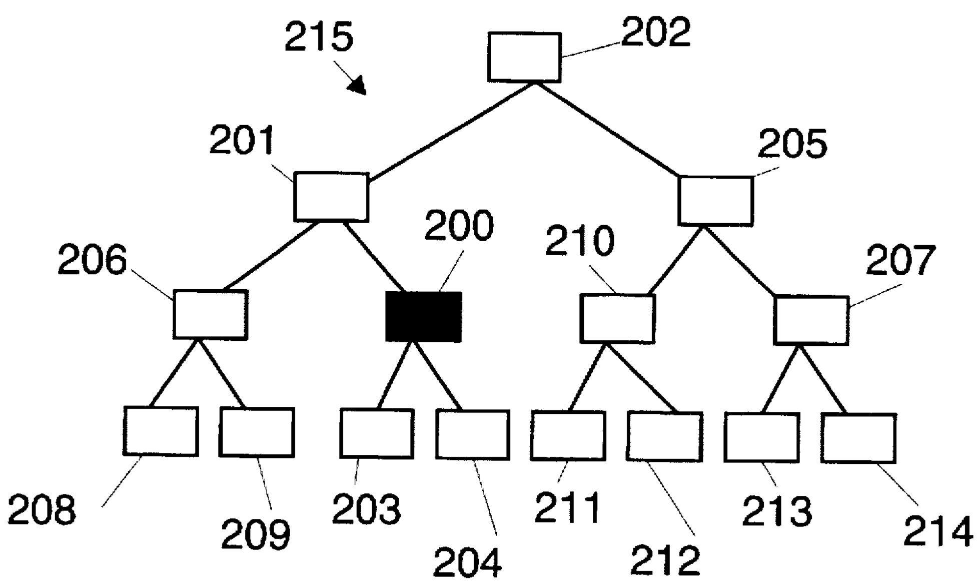
FIG. 5 is a diagram representing lock conflicts for the lock types and granularities employed by the present invention.
FIG. 6 is a diagram illustrating a hierarchy during a step in a process of granting a lock request.

FIG. 5 is a diagram representing the lock conflicts for the lock types and granularities provided in the present invention. The first column 220 represents locks held by a first user, who will be referred to as lock holder 1. The top row 219 represents the lock requested by a second user, who will be referred to as lock holder 2. The conflict states are shown in the intersecting cells. The cells indicate whether the lock requested by lock holder 2 conflicts with the lock held by lock holder 1. For example, if lock holder 1 has a TUL on a class, represented by the location in column 220 indicated by reference numeral 216, and lock holder 2 requests a CSL, represented by the location in row 219 indicated by reference numeral 217, then the intersecting cell 221 shows that there is no lock conflict and lock holder 2 gets the CSL on the class.

Table I lists the available lock types used by the present invention, lock granularities and their mnemonics. The most restrictive locking mechanism is the exclusive lock which only allows one lock holder. The most permissive lock type is a share lock which allows multiple lock holders of non-conflicting types. An intermediate level of concurrency is provided by the update lock. Although an object oriented lock manager may provide class exclusive locks or class update locks, the tree granularity for the lock types used in the preferred embodiment of the present invention are sufficient to provide view stability. Share locks are preferably provided at both the class and tree granularity, but that is not required by the present invention.

In a preferred embodiment, concurrency control primarily occurs at the application level, and not at the DBM (database management) level. The client application 130, 144 or 133 of the API 143 must explicitly request a lock when the application attempts a function. Although the description herein sometimes refers to a user or lock holder "requesting" a lock, in a preferred embodiment, the GUI programs may be written so that a user does not need to explicitly perform such a request in the sense that the GUI programs hide this operation from the user and the user may not actually be aware that the client application 130, 144, or 133 of the API 143 is requesting a lock. The client application may perform a background request to the lock manager 125 when the user attempts to navigate the hierarchy or edit parts, for example using the retriever 130 or the schema editor 144. If a conflict is detected or the request fails, the user is then informed through an appropriate dialog box or message that access to the portion of the schema that the user attempted to navigate or edit cannot be obtained. In a preferred system, the client applications 130, 144 and 133 are well behaved and cooperate to achieve concurrency control. In other words, concurrency is mediated by cooperating applications 130, 133, and 144.

A given application and lock holder combination can request multiple locks of the same type for the same class without conflict. For example, in the above description with reference to FIG. 5, the same user could be both lock holder 1 and lock holder 2. This may occur, for example, when the same user opens a second window. A count for each type of lock acquired by the application is maintained by the lock manager 125 of the knowledge base server 132. The locks must be released as many times as they are requested. However, in a preferred embodiment, locks can be released en masse in five ways. The knowledge base server supports two API functions for releasing multiple locks. All locks that have been acquired by a lock holder are released when the lock holder is ended. And, all locks that have been acquired by an application are released when the application closes the knowledge base 123 or when the application logs out.

The share locks supported by the lock manager 125 of the knowledge base server 132 are advisory. This means that the share lock is a means of announcing to other applications (ones that might want to edit instances or the schema) that a part of the schema is being navigated. Share locks are not required for navigating the schema or for querying and examining instances, but they are preferred. Acquiring a share lock prevents other applications from acquiring write locks, which are enforced. The lock manager 125 and the knowledge base server 132 will not allow any schema or instances to be edited without appropriate write locks. Therefore, if clients of the API 143, such as the retriever 130, schema editor 144, legacy 133, or user written API program, requests share locks whenever one of them navigates into a part of the schema, it will be insulated from any changes that might occur to the schema while it is navigating.

The client application 130, 144, and 133 of the API 143 should request a class share lock for a class whenever it gets a class descriptor or attribute descriptor for that class. This method insures that the data in the descriptor is valid and remains valid. The client application 130, 144, and 133 should also use a class tree lock at a class for which it does a query. This may be used to prevent another application from, for example, deleting instances in the subtree where the query is applied.

In the present invention, locks are not subsumed. An object may have multiple locks of the same type. Lock requests and releases are paired. In the illustrated embodiment, a function to perform a release of a class share lock will only release one class share lock on an object.

Figure 7:
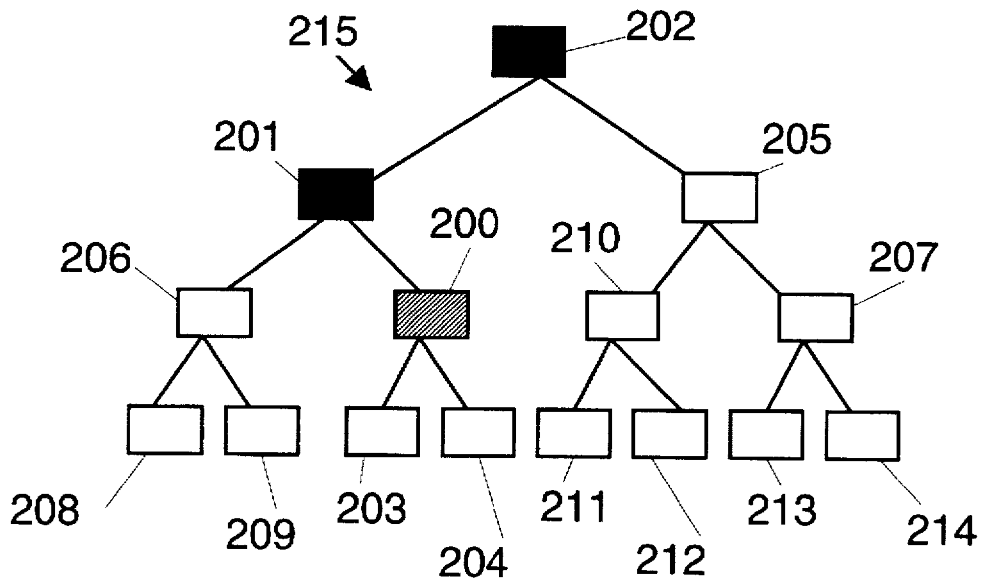
FIG. 7 is a diagram illustrating the hierarchy during a subsequent step in the process of granting a lock request.
Figure 8:
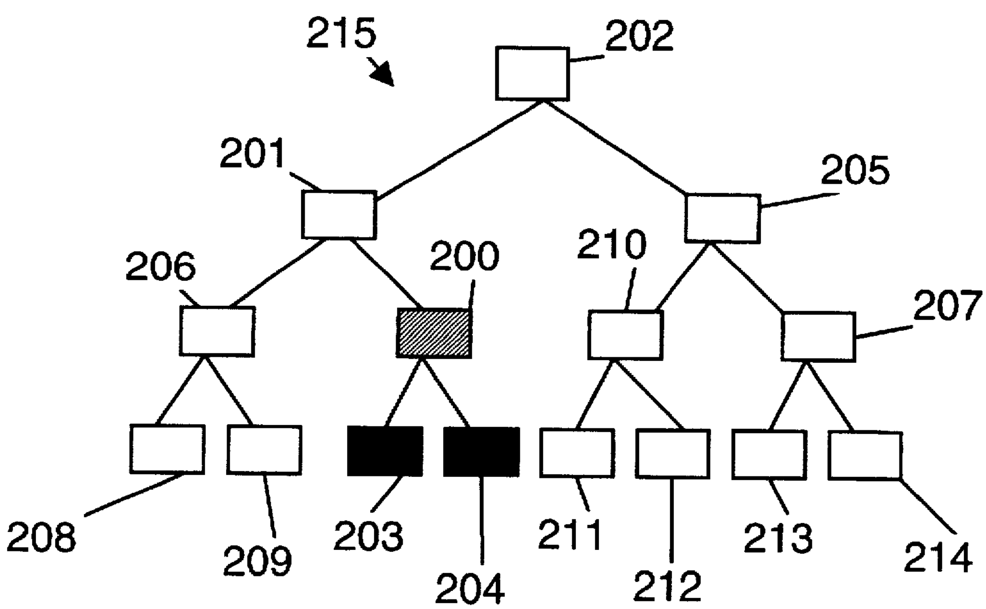
FIG. 8 is a diagram illustrating the hierarchy during a subsequent step in the process of granting a tree lock request on a class where the steps depicted in FIG. 6 and FIG. 7 are successful.

The operation of the lock manager 125 may be better understood with reference to FIGS. 6–8. FIG. 6 is a schematic diagram of a class hierarchy 215 representing an example of a portion of an object oriented database. In this example, class 202 is an ancestor for all of the other classes which are depicted. If FIG. 6 depicted the entire database, then class 202 would be the root class. Class 202 is the parent of class 201 and class 205. Class 201 has two children shown as class 206 and class 200. Class 205 is the parent of class 210 and class 207. Class 200 has two descendants: class 203 and class 204. Class 206 has two children shown as class 208 and class 209. Similarly, class 210 and class 207 each are shown with two children: classes 211 and 212, and classes 213 and 214, respectively.

If a lock is requested for class 200, the first step is checking whether the requested lock conflicts with any other lock at this class 200. This is represented in FIG. 6, where class 200 is shown as a black square to represent the step of examining the class 200 for conflicting locks at this point in the hierarchy 215. The determination of conflicts is performed in accordance with the matrix represented in FIG. 5. If the requested lock for class 200 is a class share lock CSL, and the class 200 is already subject to a class share lock CSL, a tree share lock TSL, or a tree update lock TUL, then there is no conflict, and the answer "No" (i.e., no conflict) would be returned. This is represented in FIG. 5 as a "No" at the intersection of the CSL column with the CSL, TSL, and TUL rows. If the requested lock for class 200 is a class share lock CSL, and the class 200 is already subject to a tree exclusive lock TXL, then there is a conflict and the answer "Yes" (i.e., yes there is a conflict) would be returned. This is represented in FIG. 5 as a "Yes" at the intersection of the CSL column with the TXL row. If there is a conflict, the requested lock is not granted.

The lock request procedure would then continue in this particular example with the step of checking whether the requested lock conflicts with any other lock at the ancestors 201 and 202 of the class 200. This is represented in FIG. 7, where class 201 and class 202 are shown as a black squares to represent the step of examining the ancestor classes 201 and 202 for conflicting locks at these points in the hierarchy 215. The determination of conflicts is performed in accordance with the matrix represented in FIG. 5. The class 200 is represented in FIG. 7 as a shaded square to indicate that the class 200 is the class for which the lock is requested. After the check in FIG. 6 is completed successfully, the ancestor classes 201 and 202 of class 200 are checked for conflicts. In this example, the request for a lock on class 200 could be for either a class or tree lock. If a conflict is indicated, the requested lock is not granted. If no conflict is detected, the answer "No" is returned. In such a case, the requested lock may be granted if the requested lock is a class share lock. If the requested lock is a tree exclusive lock, a tree share lock, or a tree update lock, the procedure continues to the step described in connection with FIG. 8.

FIG. 8 is a diagram illustrating a hierarchy during a subsequent step in the process of granting a tree lock request on class 200, if the checks in FIG. 6 and FIG. 7 are successful. The descendent classes 203 and 204 are checked for conflicts. The class 203 and the class 204 are each shown as a black square to represent the step of examining the descendent classes 203 and 204 for conflicting locks at these points in the hierarchy 215. The determination of conflicts is performed in accordance with the matrix represented in FIG. 5. The class 200 is represented in FIG. 8 as a shaded square to indicate that the class 200 is the class for which the lock is requested. If a conflict is indicated, the answer "Yes" is returned and the requested lock is not granted. If no conflict is detected, the answer "No" is returned and the requested lock is granted.

The operation of the lock manager 125 may be best understood with reference to FIGS. 44–51. During operation, the lock manager 125 maintains a dynamic lock table 400 shown in FIG. 51. The lock table 400 interacts with the schema. For example, if a class is physically added or deleted from the schema, the lock table 400 is changed accordingly. Locks are evaluated by the system based upon the inheritance pattern reflected by the schema. The lock table 400 is maintained in the illustrated example by the knowledge base server 132.

The lock table 400 shown in FIG. 51 is organized in the preferred embodiment so that each row corresponds to a class in the schema. Each column corresponds to a lock holder using the system. Each cell of the lock table 400 has been numbered for purposes of reference during the discussion that follows. For example, the intersection of the row corresponding to class handle 3 and the column corresponding to lock holder 2 is indicated by reference numeral 410. If the a class share lock is placed on the class corresponding to class handle 5 by the user corresponding to lock holder 3, then the lock manager 125 would place a CSL indication in element 419 of the lock table 400. It will be appreciated by those skilled in the art that there is no provision in the concurrency control system according to the present invention for locking an instance; the lock table 400 only makes provision for classes.

If lock holder 6 attempted to place some type of lock on the class corresponding to class handle 4, the lock manager 125 would have to check element 404 of the lock table 400 to determine whether lock holder 1 had a conflicting lock on that class. The determination of what lock type conflicts with the type of lock that the lock holder 6 was attempting to place on the class would be determined in accordance with the lock conflict table of FIG. 5. If no conflicting lock was found at cell 404, then the lock manager 125 would proceed to check cell 411 to determine whether lock holder 2 had a conflicting lock on the class corresponding to class handle 4. If not, the lock manager 125 would proceed to check cell 418 to determine whether lock holder 3 had a conflicting lock on the class. The lock manager 125 would continue until all corresponding cells 425, 432 and 446 for the remaining lock holders 4, 5, and 7, respectively, were checked. This is essentially the procedure corresponding to the process represented in FIG. 6.

In order to perform checks of ancestor classes, for example checking class 201 shown in FIG. 7, the lock manager 125 must have a mechanism to supply the lock manager 125 with information as to what class handle corresponds to the class 201. The dynamic class manager 134 performs this function. Thus, in order to implement the ancestor check depicted in FIG. 7, the dynamic class manager 134 will supply the lock manager 125 with the class handle for the ancestor class 201. If the corresponding class handle is class handle 2, then the lock manager 125 can perform a check of the cells 402, 409, 416, 423, 430, and 444 in the row corresponding to the class handle 2 in the manner described above with reference to the row for class handle 4.

Similarly, in order to perform a check of descendent classes 203 and 204 shown in FIG. 8, the dynamic class manager 134 will supply the lock manager with the class handles corresponding to these classes, and the lock manager may check the corresponding rows of the lock table 400 to determine if there is a conflicting lock. When an operation involves an instance, the dynamic class manager 134 supplies the lock manager 125 with the owning class for that instance, and the system checks for lock conflicts with that class.

When a lock is requested, the lock manager uses both the connection and the lock holder handle 267 for identifying lock conflicts. When a schema or instance edit is attempted, the dynamic class manager 134 first asks for authorization to perform the operation from the lock manager 125. In one embodiment, only the connection is used to check for authorization. In this example, the lock holder that asked for the edit operation is not taken into account when checking for the existence of the appropriate lock. This optimization was done in this particular example to prevent requiring a lock holder handle as an input argument to each of the API editing functions.

Figure 44:
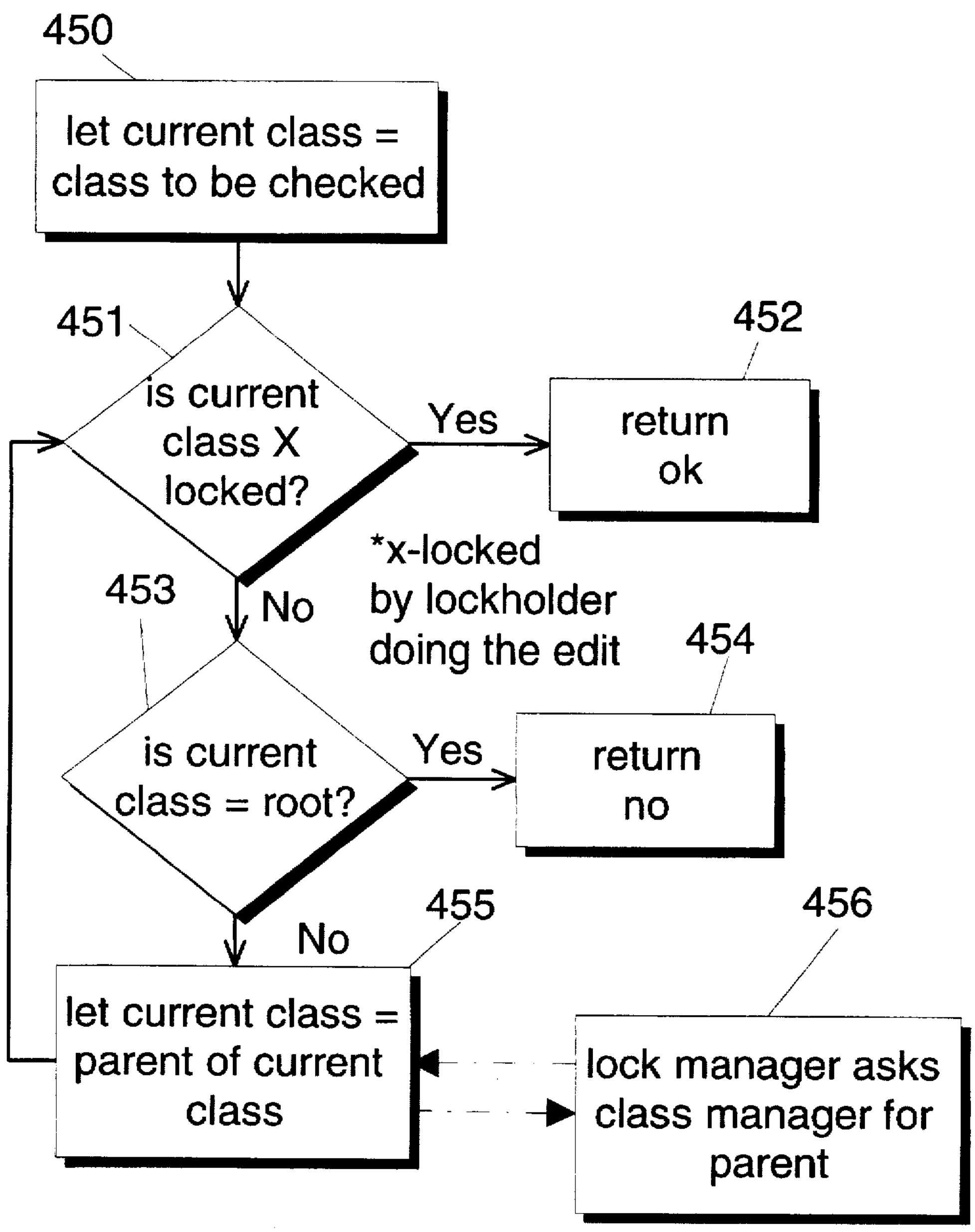
FIG. 44 is a flow chart depicting the steps for requesting authorization to do a schema edit.

FIG. 44 is a flow chart depicting the steps for requesting authorization to do a schema edit. An exclusive lock is required by the lock holder in order to do the desired schema edit. In step 450, the current class is set equal to the class to be checked. In step 451, the "current class" is checked to see if it is exclusive locked, (i.e., whether it has a tree exclusive lock TXL). Referring to FIG. 51, if the requesting lock holder is lock holder 3, and the current class is class handle 3, this step in effect checks the intersection cell 417 for an exclusive lock. If it is exclusive locked, then it means in this example that it is exclusive locked by the lock holder that is attempting to do the edit. In that event, the lock manager 125 returns an "OK" indication in step 452 to the client 131 corresponding to the requesting lock holder 3. If it is not exclusive locked, the flow proceeds to step 453 where the lock manager 125 checks to determine whether the "current class" is the root class. If it is the root class, the lock manager 125 returns a "no" in step 454. If it is not, the flow proceeds to step 455, where the "current class" is set equal to the parent class of the class that was the "current class." The lock manager 125 asks the dynamic class manager 134 who the parent is, and that information is supplied to the lock manager 125 by the class manager 134. The procedure then loops back to step 451, as shown in FIG. 44. In effect, the lock manager 125 will check the ancestors using this procedure.

Figure 45:
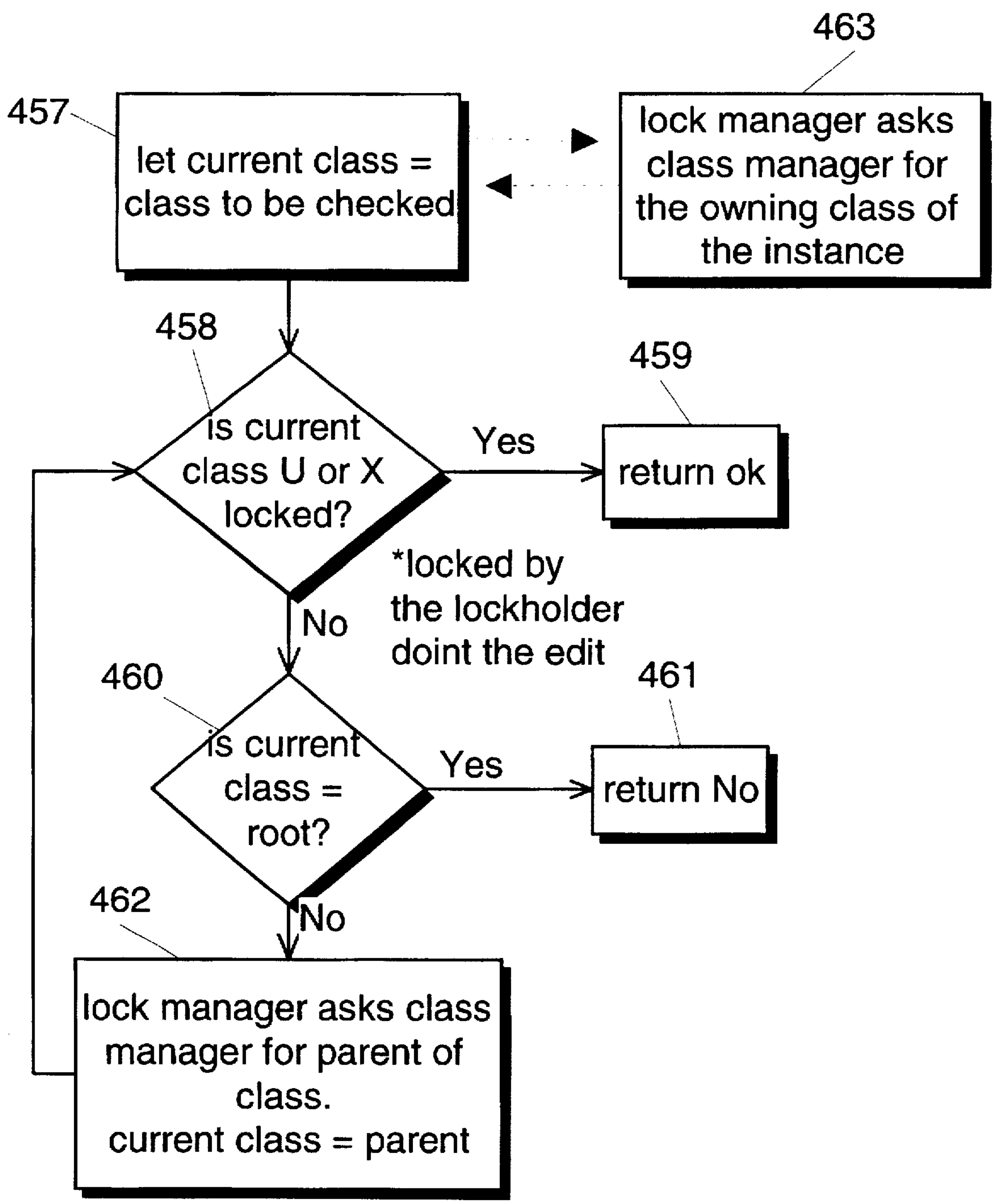
FIG. 45 is a flow chart depicting the steps for requesting authorization to do an instance edit.

FIG. 45 is a flow chart depicting the steps for requesting authorization to do an instance edit. In order to perform an edit of an instance, an exclusive lock or an update lock is required. The lock manager 125 must first ask the class manager 134 to tell the lock manager 125 who is the owning class for the instance, and this information is provided by the dynamic class manager 134. In step 457, the current class is set equal to the class to be checked. In step 458, the "current class" is checked to see if it is exclusive locked or update locked, (i.e., whether it has a tree exclusive lock TXL or a tree update lock TUL). If it is exclusive or update locked, then it means in this example that it is so locked by the lock holder that is doing the edit. In that event, the lock manager 125 returns an "OK" indication in step 459 to the client 131 corresponding to the requesting lock holder. If it is not exclusive locked, the flow proceeds to step 460 where the lock manager 125 checks to determine whether the "current class" is the root class. If it is the root class, the lock manager 125 returns a "no" in step 461. If it is not, the flow proceeds to step 462, where the "current class" is set equal to the parent class of the class that was the "current class." The lock manager 125 asks the dynamic class manager 134 who the parent is, and that information is supplied to the lock manager 125 by the class manager 134. The procedure then loops back to step 458, as shown in FIG. 45.

Figure 46:
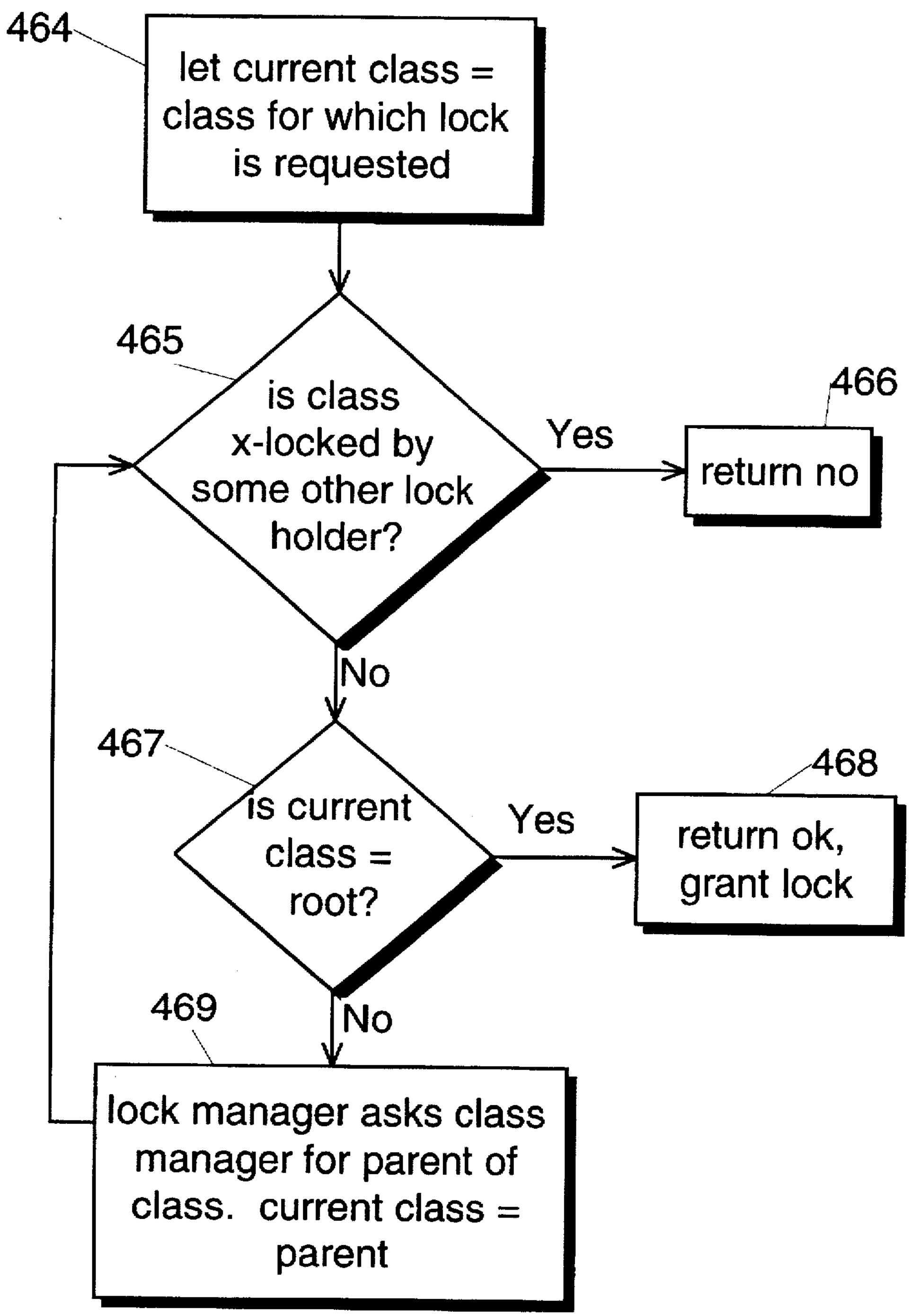
FIG. 46 is a flow chart depicting the steps for requesting a class share lock.

FIG. 46 is a flow chart depicting the steps for requesting a class share lock. In step 464, the "current class" is set equal to the class for which the lock is requested. In step 465, the class is checked to determine whether it is exclusive locked by some other lock holder. If it is, the lock manager 125 returns a "no" in step 466. If it is not, the lock manager 125 proceeds to step 467, where the lock manager 125 checks to determine whether the "current class" is the root class. If it is, the lock manager 125 returns a "yes" and grants the requested CSL in step 468. If it is not, the lock manager 125 proceeds to step 469, where the lock manager 125 asks the class manager who the parent class is. When that information is supplied to the lock manager 125, the "current class" is set equal to the parent class, and the flow loops back to step 465.

Figure 47:
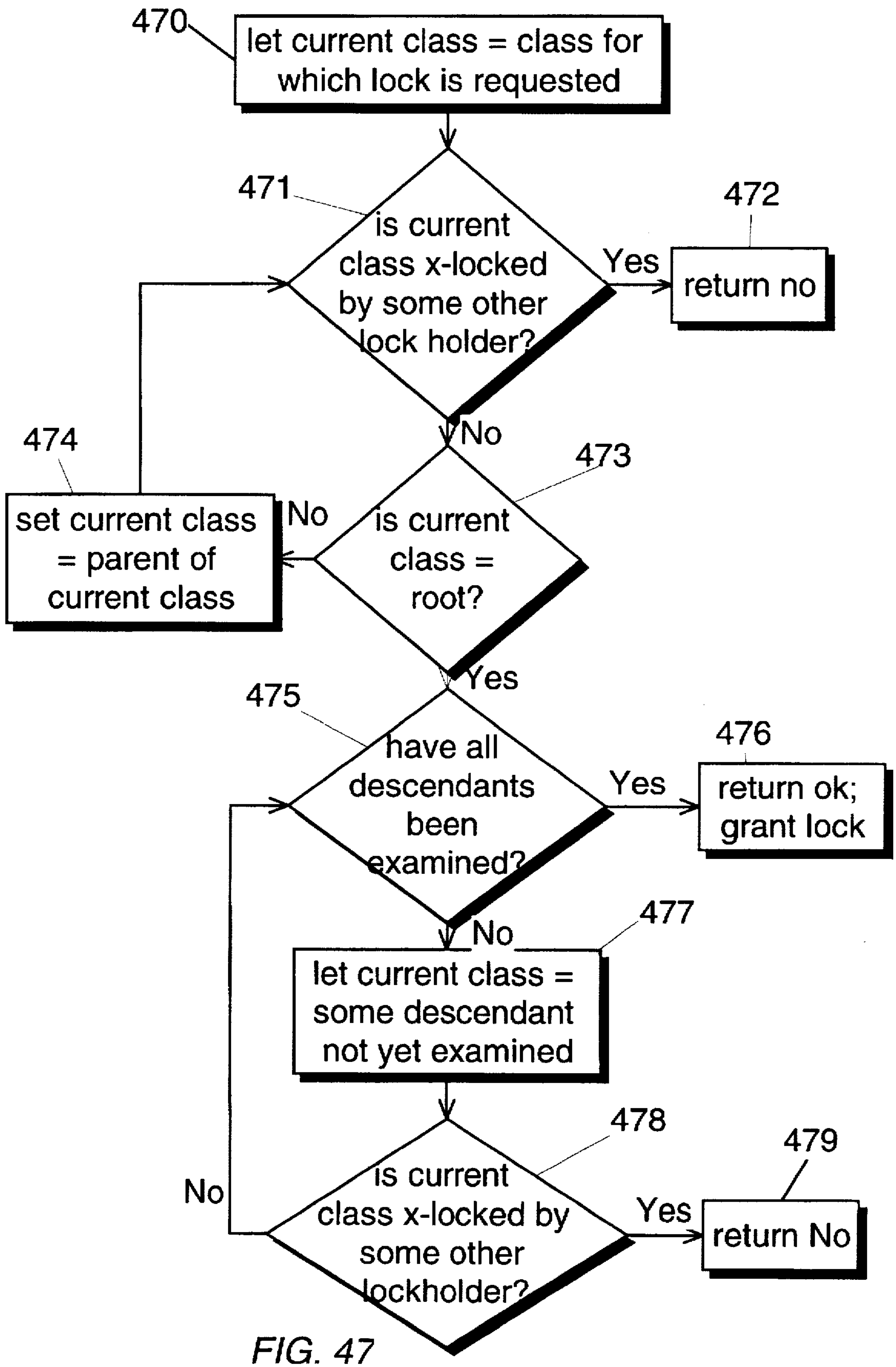
FIG. 47 is a flow chart depicting the steps for requesting a tree share lock.

FIG. 47 is a flow chart depicting the steps for requesting a tree share lock. In step 470, the "current class" is set equal to the class at which the tree lock is requested. In step 471, the "current class" is checked to determine whether it is exclusive locked by some other lock holder. This checks the row in the lock table 400 corresponding to the "current class" at every cell except the cell in the column corresponding to the requesting lock holder. If it is, the lock manager 125 returns a "no" in step 472. If it is not, the lock manager 125 proceeds to step 473, where the lock manager 125 checks to determine whether the "current class" is the root class. If it is not, the lock manager 125 proceeds to step 474, where the lock manager 125 sets the "current class" equal to the parent class (the lock manager 125 must obtain the identification of the parent class from the class manager 134). The procedure then loops back to step 471. This effectively results in checking the ancestors. If it is found to be the root class in step 473, the lock manager 125 checks to see if all of the descendent classes have been checked in step 475. If they have, then the lock manager 125 returns a "yes" and grants the requested TSL in step 476. If not, in step 477 the lock manager 125 sets the "current class" equal to some descendent that has not yet been examined.

In step 478, the lock manager 125 then checks to determine whether the new "current class" is exclusive locked by some other lock holder. This effectively results in checking the corresponding row in the lock table 400 at every cell except the cell in the column corresponding to the requesting lock holder. If the new "current class" is not exclusive locked by some other lock holder, the flow loops back to step 475. This loop effectively results in checking all of the descendants. If the new "current class" is exclusive locked by some other lock holder, then the lock manager 125 returns a "no" in step 479.

Figure 48:
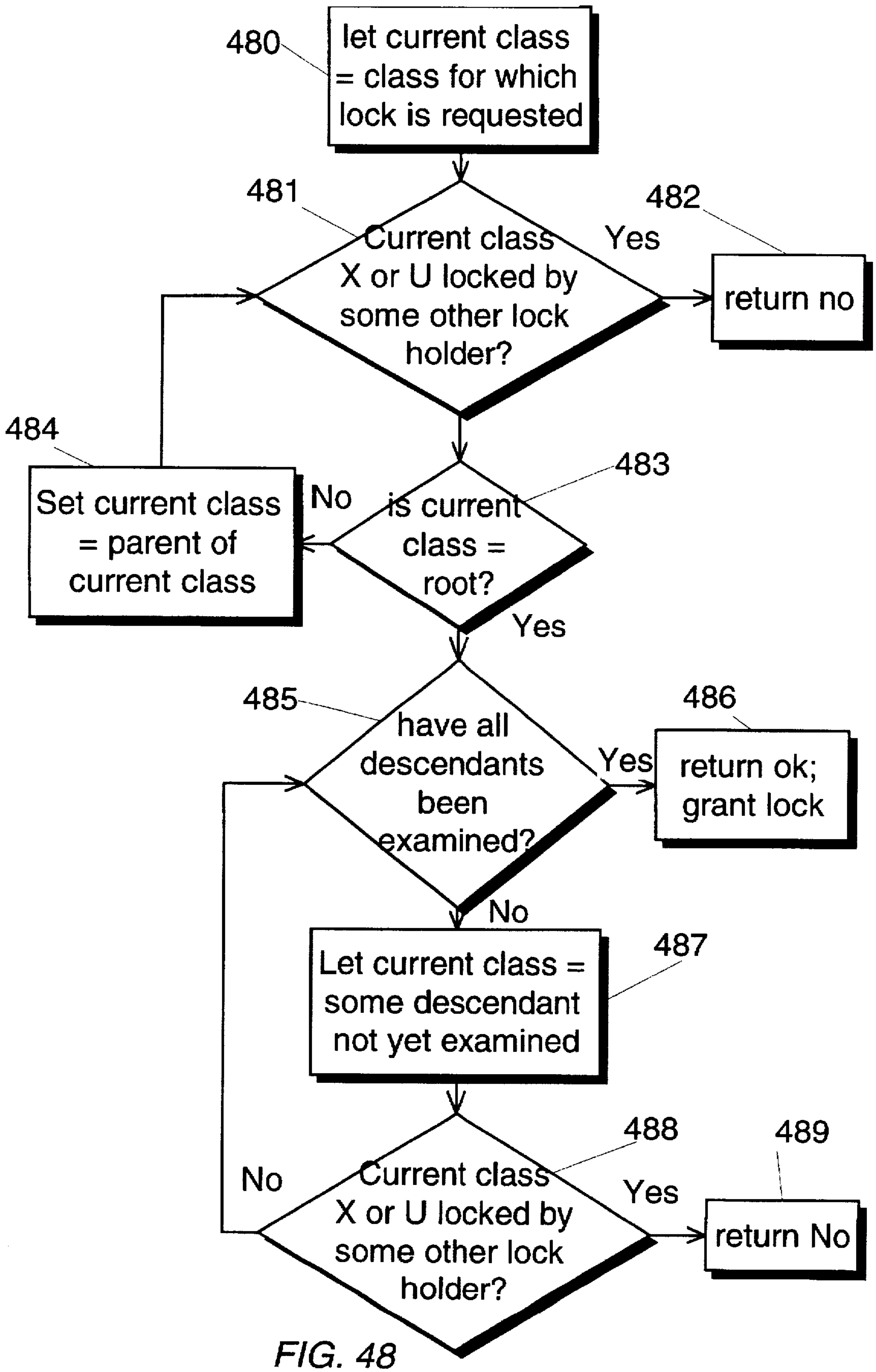
FIG. 48 is a flow chart depicting the steps for requesting a tree update lock.

FIG. 48 is a flow chart depicting the steps for requesting a tree update lock. In step 480, the "current class" is set equal to the class at which the tree lock is requested. In step 481, the "current class" is checked to determine whether it is exclusive locked or update locked by some other lock holder. This checks the row in the lock table 400 corresponding to the "current class" at every cell except the cell in the column corresponding to the requesting lock holder. If it is, the lock manager 125 returns a "no" in step 482. If it is not, the lock manager 125 proceeds to step 483, where the lock manager 125 checks to determine whether the "current class" is the root class. If it is not, the lock manager 125 proceeds to step 484, where the lock manager 125 sets the "current class" equal to the parent class (the lock manager 125 must obtain the identification of the parent class from the class manager 134). The procedure then loops back to step 481. This effectively results in checking the ancestors. If it is found to be the root class in step 483, the lock manager 125 checks to see if all of the descendent classes have been checked in step 485. If they have, then the lock manager 125 returns a "yes" and grants the requested TUL in step 486. If not, in step 487 the lock manager 125 sets the "current class" equal to some descendent that has not yet been examined.

The lock manager 125 then checks in step 488 to determine whether the new "current class" is exclusive locked or update locked by some other lock holder. This effectively results in checking the corresponding row in the lock table 400 for the new "current class" at every cell except the cell in the column corresponding to the requesting lock holder. If the new "current class" is not exclusive locked by some other lock holder, the flow loops back to step 485. This loop effectively results in checking all of the descendants. If the new "current class" is exclusive locked or update locked by some other lock holder, then the lock manager 125 returns a "no" in step 489.

Figure 49:
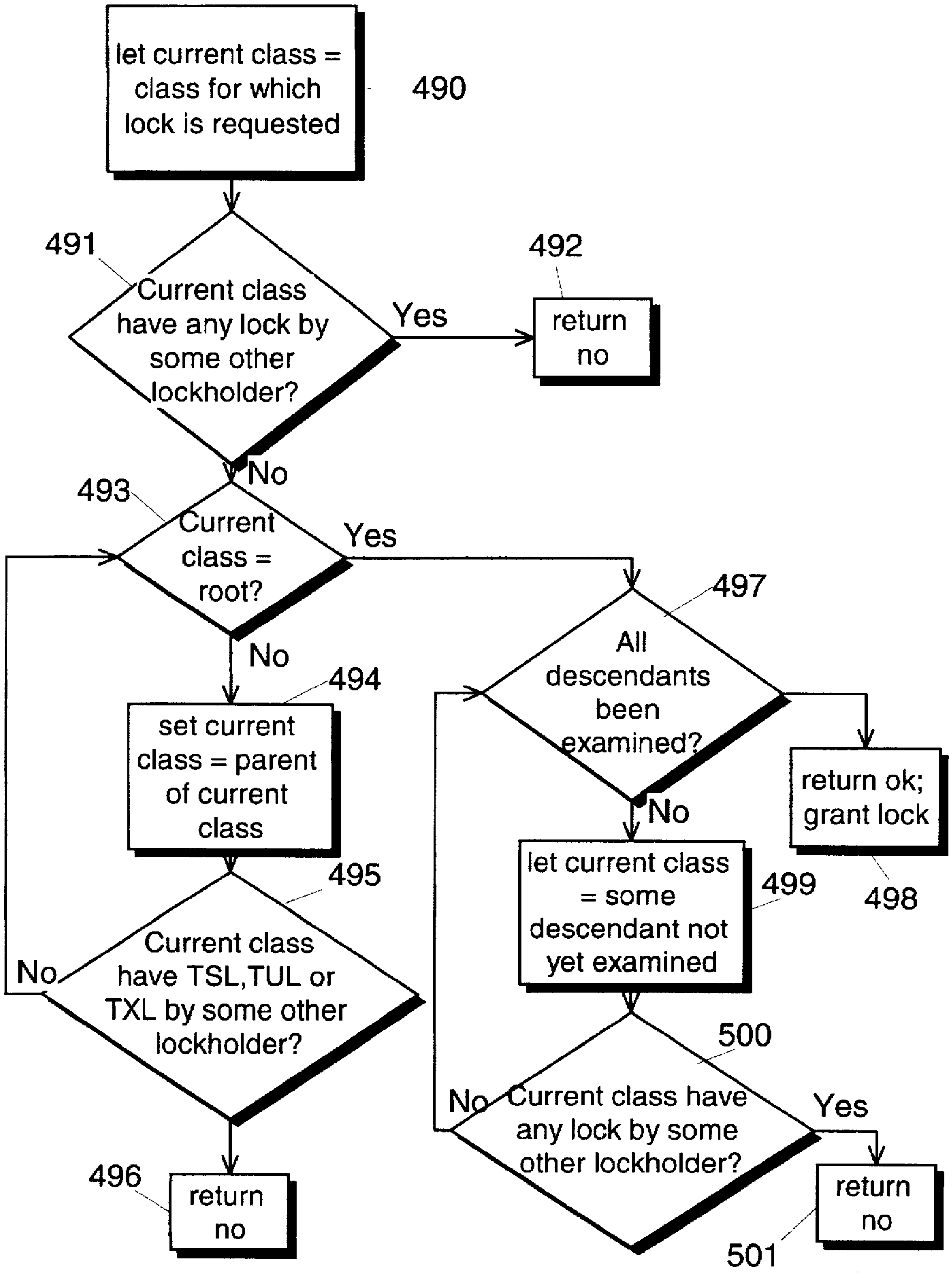
FIG. 49 is a flow chart depicting the steps for requesting a tree exclusive lock.

FIG. 49 is a flow chart depicting the steps for requesting a tree exclusive lock. In step 490, the "current class" is set equal to the class at which the tree lock is requested. In step 491, the "current class" is checked to determine whether it has any lock by some other lock holder. This checks the row in the lock table 400 corresponding to the "current class" at every cell except the cell in the column corresponding to the requesting lock holder. If any other lock holder has any type of lock on the "current class," the lock manager 125 returns a "no" in step 492. If it is not, the lock manager 125 proceeds to step 493, where the lock manager 125 checks to determine whether the "current class" is the root class. If it is not, the lock manager 125 proceeds to step 494, where the lock manager 125 sets the "current class" equal to the parent class (the lock manager 125 must obtain the identification of the parent class from the class manager 134). The procedure then proceeds to step 495, where the lock manager 125 checks to determine whether the new "current class" has a TSL, TUL or TXL by any other lock holder. If it does, the lock manager 125 returns a "no" in step 496. If it does not, the flow loops back to step 493. In step 493, if the "current class" is found to be the root class, the lock manager 125 checks in step 497 to see if all of the descendent classes have been checked. If they have, then the lock manager 125 returns a "yes" and grants the requested TXL in step 498. If not, in step 499 the lock manager 125 sets the "current class" equal to some descendent that has not yet been examined.

The lock manager 125 then checks in step 500 to determine whether the new "current class" is has any type of lock by some other lock holder. This effectively results in checking the corresponding row in the lock table 400 for the new "current class" at every cell except the cell in the column corresponding to the requesting lock holder. If the new "current class" does not have any type of lock by some other lock holder, the flow loops back to step 497. This loop effectively results in checking all of the descendants. If the new "current class" has any type of lock by some other lock holder, then the lock manager 125 returns a "no" in step 501.

Figure 9:
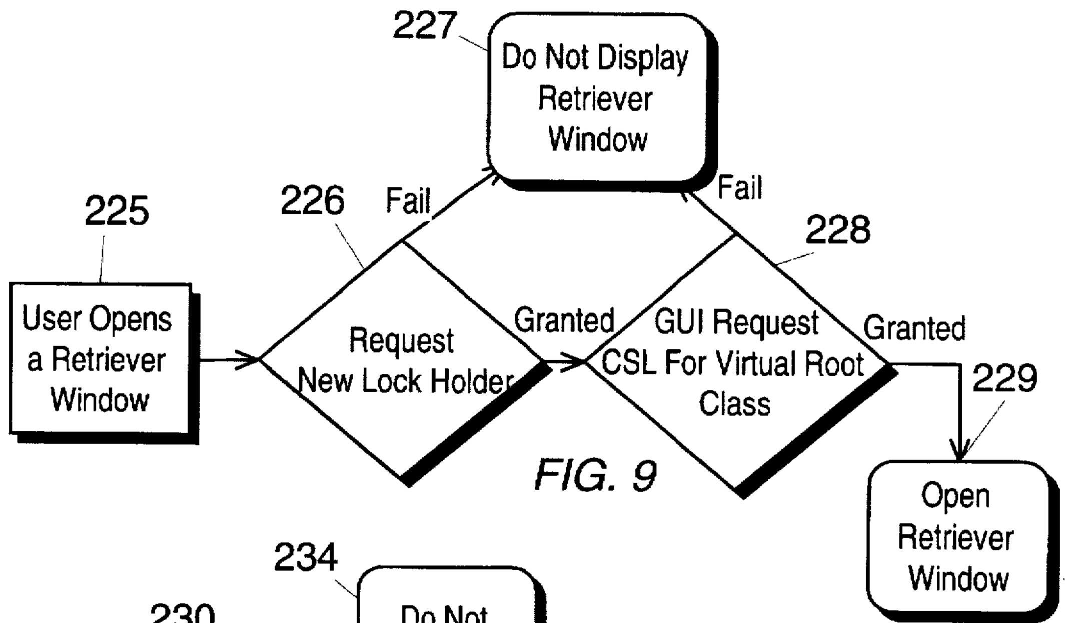
FIG. 9 is a flow diagram representing the locking process performed when a retriever window is opened.

When a client 131 invokes a retriever 130, the concurrency system will perform the procedure depicted in FIG. 9 to open a retriever window 290. FIG. 9 is a flow diagram representing the locking process performed when the retriever window 290 is opened. In step 225, the user attempts to open a retriever window 290. A new lock holder is requested in step 226. If the request for a new lock holder in step 226 fails, then the flow proceeds to step 227, and the client 131 will not display a retriever window. If the request for a new lock holder is granted, the flow proceeds to step 228.

The new lock holder is associated with that user. In many cases there may be a one-to-one correspondence between users and lock holders. However, a single user can be more than one lock holder, so the following discussion will refer to lock holders. In the procedure depicted in FIG. 9, the new lock holder then requests a CSL for the root class in step 228. In the illustrated example, a GUI associated with the client 131 will request the class share lock for the root class. If the requested CSL is not granted, the flow proceeds to step 227, and the retriever window will not be displayed. Preferably, a message to the user is generated by the system in step 227.

If the CSL requested in step 228 is granted, the flow proceeds to step 229, and a retriever window is opened for the lock holder and displayed on the user's display 116.

Figure 10:
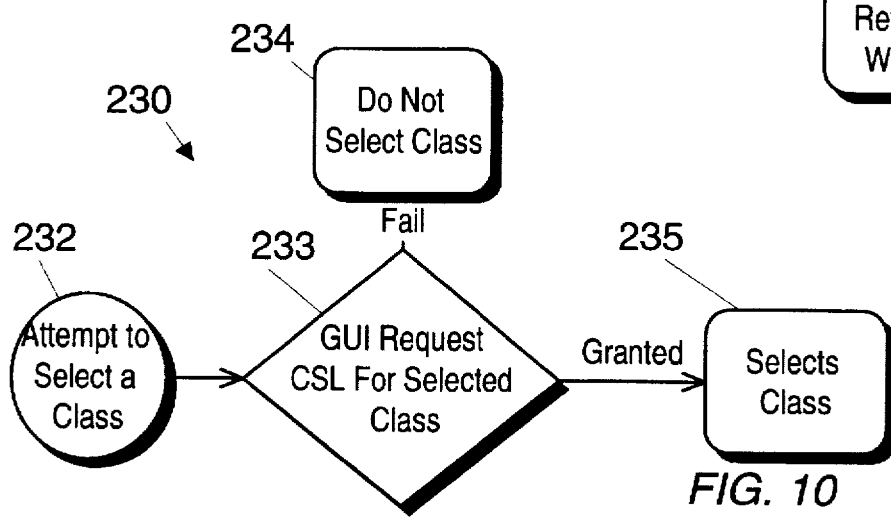
FIG. 10 illustrates the process that occurs when a class is selected in the class hierarchy.

FIG. 10 depicts a process 230 that is performed by the system when a class is selected in the class hierarchy. When the user attempts to select the class in step 232, a request for a CSL is issued in step 233 by the GUI associated with that user's knowledge base client 131. If the request fails, the flow proceeds to step 234; the class is not selected. If the CSL is granted, the flow method proceeds to step 235, where the class becomes the selected class, becomes highlighted, and associated attributes are displayed.

Figure 13:
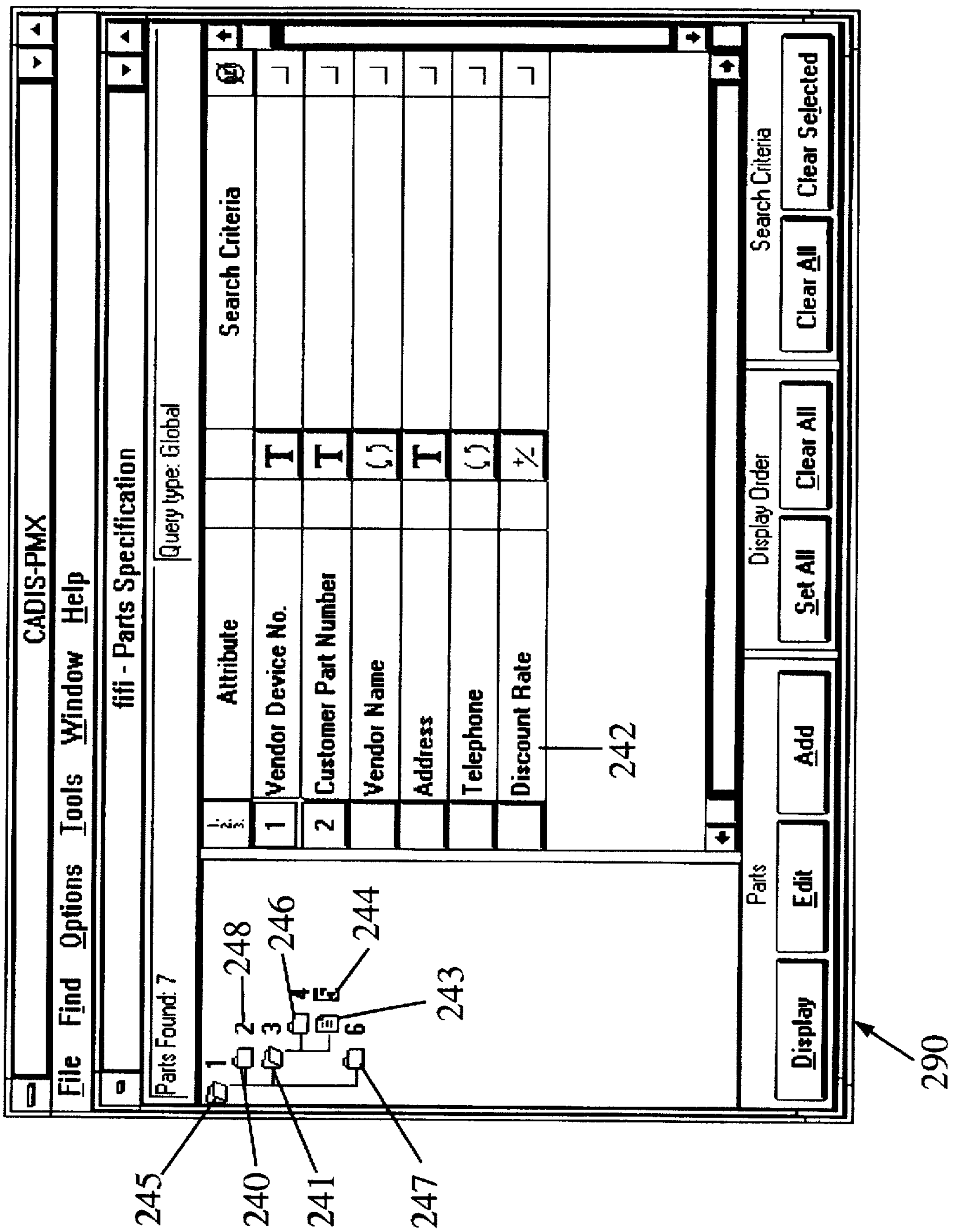
FIG. 13 depicts an example of a screen display when navigating the schema by opening and selecting classes.

FIG. 13 shows an example of a screen that may be displayed on the user's display 116 when the user is navigating the class tree 248. A root class 245 is designated class 1 in the display. Class 240 is a descendent of the root class 245, and is designated class 2 in the display. Class 241 is also a descendent of the root class 245, and is designated class 3 in the display. In addition, class 247 is a descendent of the root class 245, and is designated class 6 in the display. Class 241 has two descendants: class 246 and class 243. Class 246 is designated class 4 in the display shown in FIG. 13. And class 243 is designated class 5 in the display. In the illustrated example, the user selected class 243. If the CSL is granted in the method 230 depicted in FIG. 10, the class 243 becomes the selected class, becomes highlighted 244, and associated attributes 242 are displayed.

Figure 11:
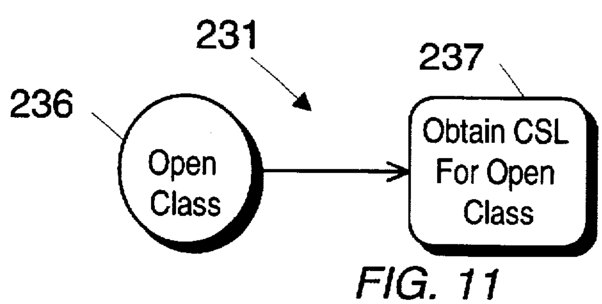
FIG. 11 is a flow diagram that represents the process of opening a class to view subclasses.

FIG. 11 is a flow diagram that represents a process 231 of opening a class to view subclasses. Referring to FIG. 13, in this example, the user double clicks on the class 241 to be opened, and a request for a CSL is issued in step 236 of FIG. 11. If the CSL is granted, the method proceeds to step 237, and the display of the class 241 changes from a closed folder (such as is shown in FIG. 13 for class 240) to an open folder 241, and all subclasses 246 and 243 are displayed. The step 237 of obtaining a CSL for the open class 241 is illustrated in the method shown in FIG. 11 as a single step, it being understood that step 237 comprises multiple steps similar to steps 233, 234 and 235 shown in FIG. 10.

Figure 12:
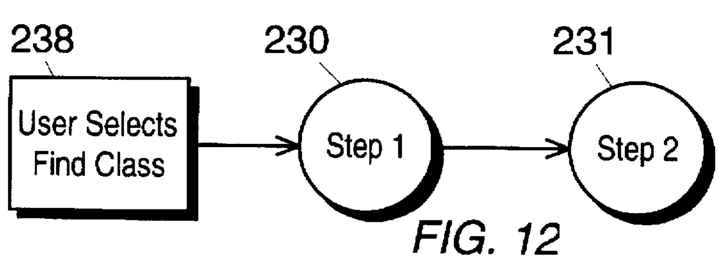
FIG. 12 is a flow diagram representing a process that occurs when a user selects a "find class" activity.

FIG. 12 is a flow diagram representing the steps of a process that occurs when a user selects the "find class" activity in step 238. (The find class activity is a class search through the class hierarchy or schema). A class matching a search pattern is first selected using the process 230 depicted in FIG. 10. If the process 230 depicted in FIG. 10 is successful, then the class is opened using the process 231 depicted in FIG. 11. It will be understood by those skilled in the art that the steps 230 and 231 shown in FIG. 12 correspond to multiple step procedures shown in FIGS. 10 and 11, respectively.

The lock manager 125 maintains a lock table for each class in the schema, and for each lock holder. This may be better understood with reference to FIGS. 14–16.

Figures 14, 15, 16:
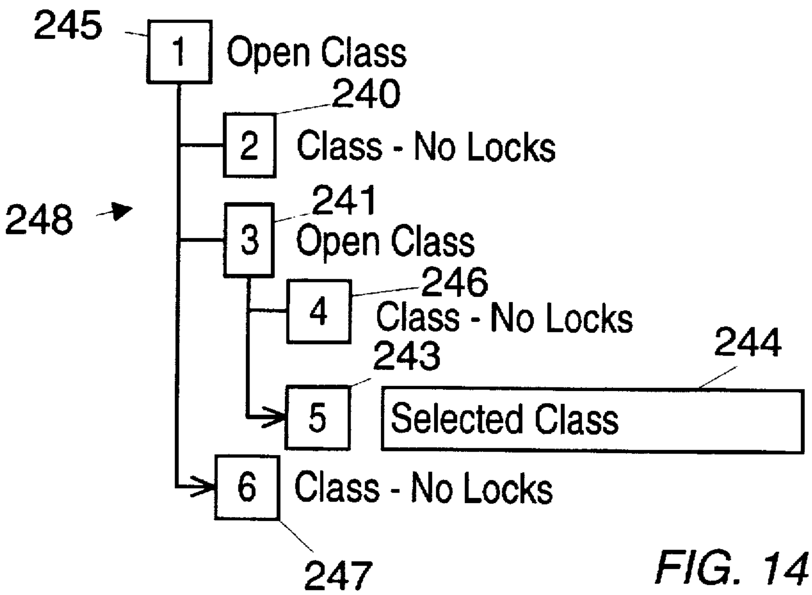
FIG. 14 is a diagram of a schema illustrating an example of internal lock states of classes in the schema corresponding to the display of FIG. 13.
FIG. 15 illustrates a lock table maintained by the lock manager as correlated with the schema depicted in FIG. 14.
FIG. 16 is a diagram that illustrates the contents of one of the lock objects in the lock table shown in FIG. 15.

FIG. 14 is a diagram of a schema 248 corresponding to the display of FIG. 13, and it illustrates corresponding internal lock states of the classes 245, 240, 241, 246, 243, and 247 in the schema 248. FIG. 15 illustrates a lock table 250 maintained by the lock manager 125 and corresponds to the schema 248 depicted in FIG. 14 and displayed in FIG. 13. FIG. 16 is a diagram that illustrates the contents of a lock object 260 for class 243 in the lock table 250 shown in FIG. 15.

The schema 248 that is displayed in FIG. 13 can be diagrammed as shown in FIG. 14 to show the internal lock states of the classes 245, 240, 241, 246, 243, and 247 that are maintained by the lock manager 125. The processes described in FIG. 11 and FIG. 12 for opening and selecting classes have been performed on the schema 248 shown in FIG. 14. Class 245 and class 241 have been opened. Class 243 has been selected.

Lock states are kept in the lock table 250 by the lock manager 125. The rows identified by reference numerals 251, 252, 253, 254, and 255 of the lock table 250 each corresponds to a class 245, 240, 241, 246, 243, and 247, respectively, in the schema 248. Each lock holder has a corresponding column, which are shown in FIG. 15 as lock objects 256, 257, 258, and 259. The lock table elements correlate the class handles 251, 252, 253, 254, and 255 of the classes 245, 240, 241, 246, 243, and 247 in the schema 248 with the lock objects 256, 257, 258, and 259. Class handle 251 in the lock table 250 has a CSL lock object 261 associated with lock holder 257 because the class 245 in the schema 248 is open on the display 116 of the user who is lock holder 257. The class 241 in the schema 248 has a CSL 262 because the user who is lock holder 257 also has it open. Class 243 in the schema 248 has a CSL lock object 260 because it is the selected class. Of course, the lock object 269 corresponding to the class handle 254 for this lock holder 257 is empty in FIG. 15, because the corresponding class 246 shown in FIG. 14 has no locks. Similarly, the lock object 249 is blank or empty in FIG. 15, because the corresponding class 240 shown in FIG. 14 has no lock applied to it.

An example of an element 260 of the lock table 250 corresponding to the selected class 243 is shown in FIG. 16. The contents of the lock object 260 for class 243 include means for indicating whether any lock types are applied to the corresponding class 243. In the illustrated embodiment, a CSL count 263 indicates that one class share lock exists for this class 243. A lock holder handle 267 is used by the lock manager 125 to identify each lock holder. When a request for a new lock holder 226 is granted, (see FIG. 9), a lock holder handle 267 is assigned to the new lock holder. Thus, the procedure for granting a request for a new lock holder includes the step of assigning a lock holder handle to the new lock holder. In the illustrated example, each user has a unique user identifier or user ID. The lock object 260 includes a record of the user ID 268 of the user who corresponds to the lock holder handle 267. Because a single user may be a multiple lock holder, the user ID 268 for other lock holders 256, 258 or 259 may be the same as the user ID 268 for the lock object 260.

In the example shown in FIG. 16, the lock holder 267 has a class lock on class 243, but does not have any tree locks (TSL, TUL, or TXL) on the class 243. Thus a count for TXL locks 264 is zero. Similarly, a count for TUL locks 265 and a count for TSL locks 266 are both zero in this example.

Figure 17:
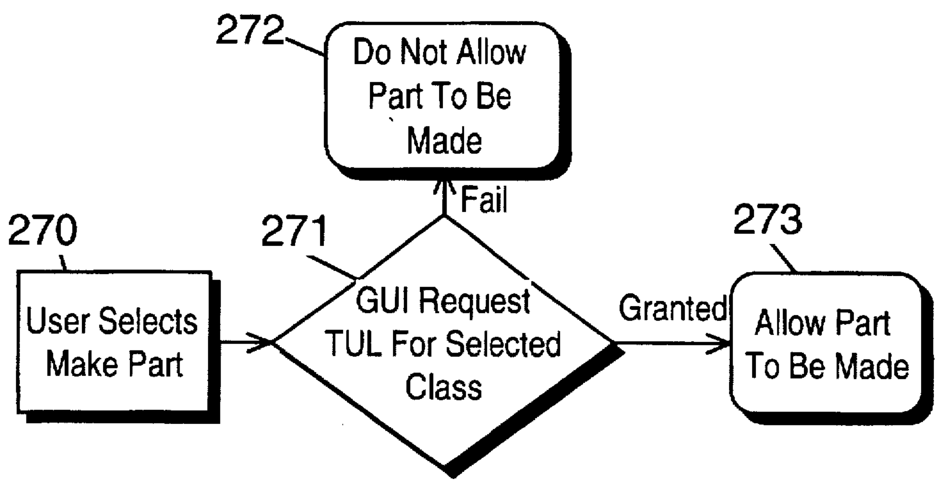
FIG. 17 diagrams the process that occurs when a user adds a part to a class in the knowledge base.

FIG. 17 diagrams the process that occurs when the user discussed above with reference to FIGS. 13–16 adds a part to a class 243 in the knowledge base 123. When the user selects the "make part" function in step 270 using the retriever 130 to add an instance to the database 123, the client 131 requests a tree update lock in step 271 for the selected class 243. If the request for a TUL is successful, the flow proceeds to step 273 and the user is given access to add the part. The TUL is then released by the lock manager 125 when the add part operation is completed. If the request for a TUL is not granted, the flow proceeds to step 272, and the user is denied access for the purpose of making a part. In a preferred embodiment, the user is given a message when access is not permitted to inform him or her of such event in step 272.

Figures 18, 19, 20:
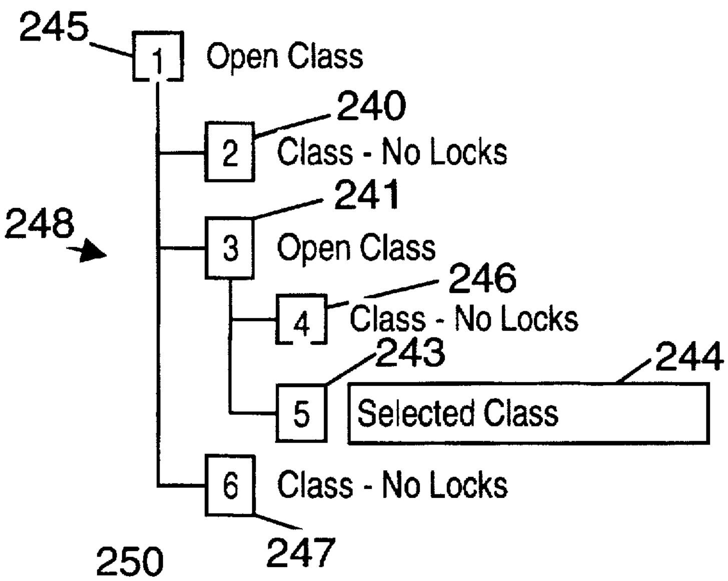
FIG. 18 shows a schema having a class to which a part is being added.
FIG. 19 depicts the lock table states for the process of adding a part as described in FIG. 17.
FIG. 20 shows a lock object corresponding to the class for the add part operation corresponding to FIGS. 18–19.
Figure 21:
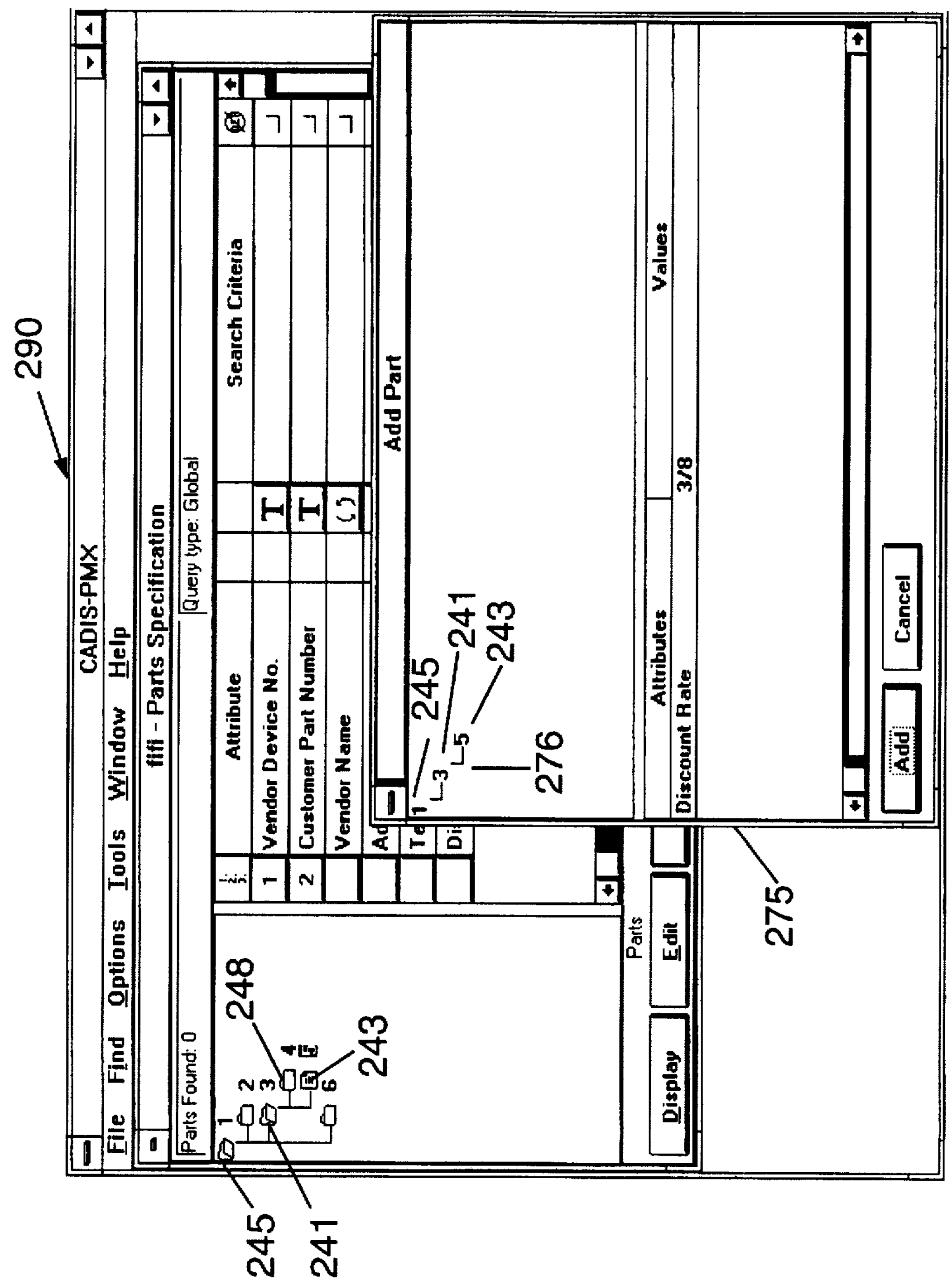
FIG. 21 depicts an example of a screen display when adding a part to the schema.

FIG. 19 depicts the states of the lock table 250 for the process of adding a part as described in FIG. 17. FIG. 18 diagrams the schema 248 to which the part is being added. A part is being added to class 243 in the schema 248 shown in FIG. 18. FIG. 21 shows the screen display during the process of adding a part under these circumstances. In order to perform the function of adding a part, a tree update lock is required. If it is granted, the lock object 260 for class 243 will have a TUL for the add part operation, and will also have a CSL as shown in FIG. 19, since the class 243 in the schema 248 is also the selected class. Of course, the lock object 269 corresponding to the class handle 254 for this lock holder 257 is empty in FIG. 19, because the corresponding class 246 shown in FIG. 18 has no locks. Similarly, the lock object 249 is blank or empty in FIG. 19, because the corresponding class 240 shown in FIG. 18 has no lock applied to it.

FIG. 20 shows the lock object 260 in this example. The count 265 for the tree update lock type is one in this example, because a TUL has been granted to this lock holder for this class 243. As noted above, the lock holder also has a CSL for the class 243, and the count 263 for the class share lock type is also one in this example. Like reference numerals in FIGS. 14–16 and FIGS. 18–20 refer to like elements, and the description in connection with FIGS. 14–16 will not be repeated.

When step 273 in FIG. 17 is performed in a preferred embodiment, the step of opening an "add part window" 275 (shown in FIG. 21) is also performed. The tree 276 under the influence of the tree update lock is represented in the add part window 275 by a diagram 276 representing class 245, class 241, and class 243.

Figure 22:
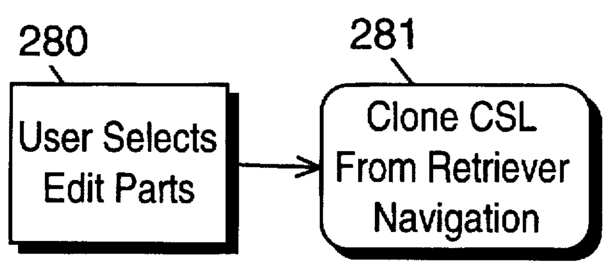
FIG. 22 illustrates a flow chart for an example where a user has selected the edit parts function.
Figure 24:
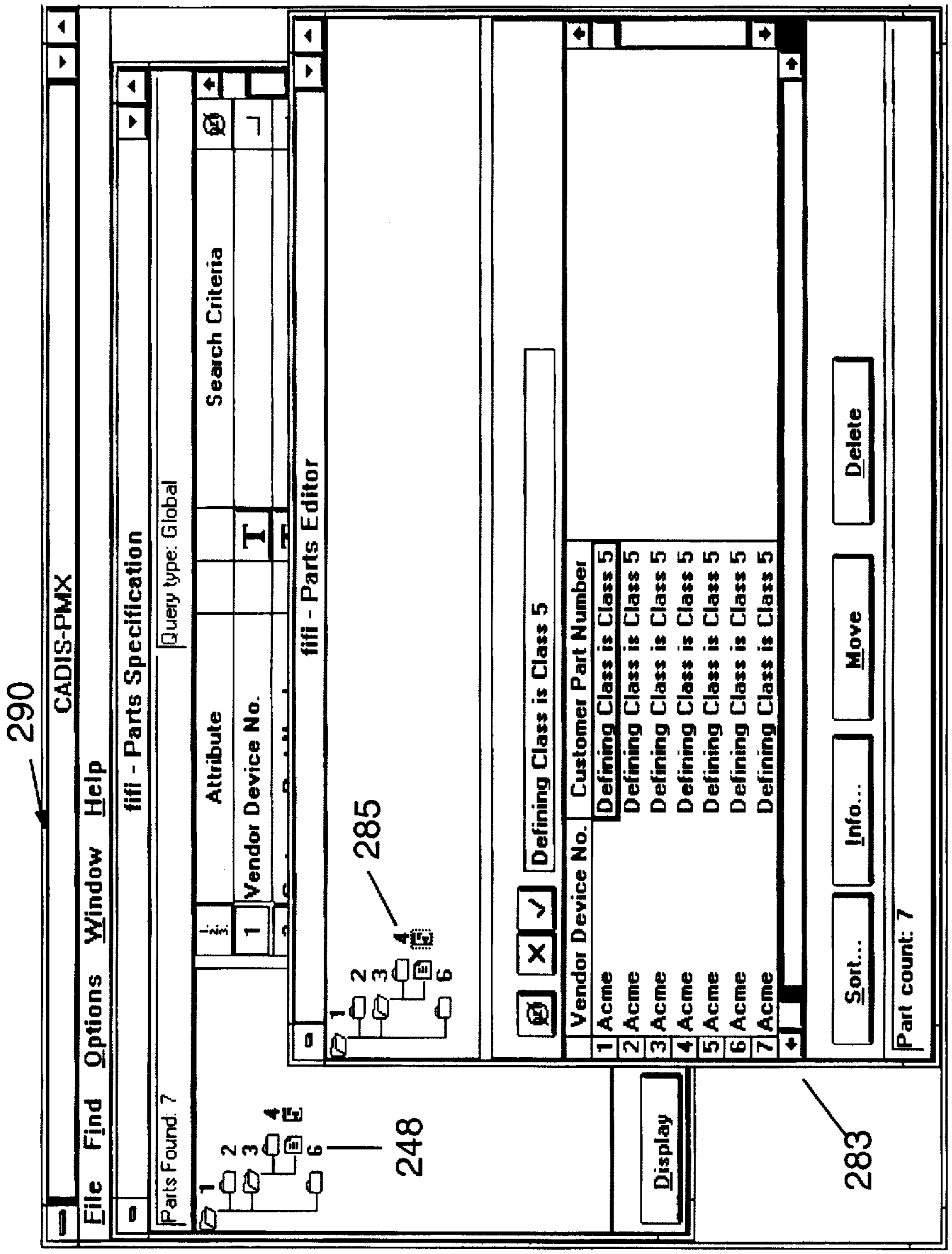
FIG. 24 depicts an example of a screen display when editing a part.

Referring to FIG. 22, when the user selects the edit parts function in step 280, the system clones the existing class share locks in step 281 for the corresponding portion of the hierarchy 248 currently displayed as a result of navigation to that point using the retriever 130. Referring to FIG. 24, the edit parts function creates a new window 283 which contains a view of the class tree 285 corresponding to the schema 248. To present that additional view 283 of the class hierarchy tree 285, new share locks must be obtained for the presented classes 245, 241, and 243. This insures a consistent view 285 for the parts that are going to be displayed or edited in this window 283. The system will reissue identical navigation locks for the parts editor tree 285.

Figure 23:
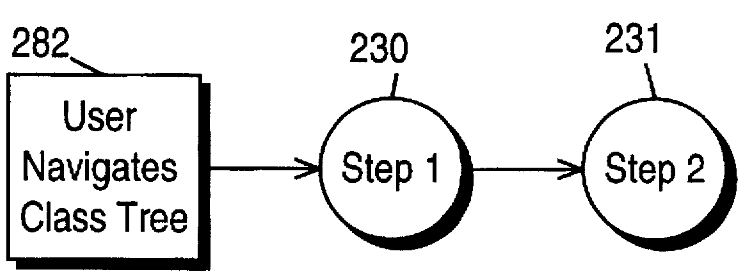
FIG. 23 illustrates a flow chart for an example where a user, while in the edit parts window, navigates to different locations in the class hierarchy tree.
Figures 25, 26, 27:
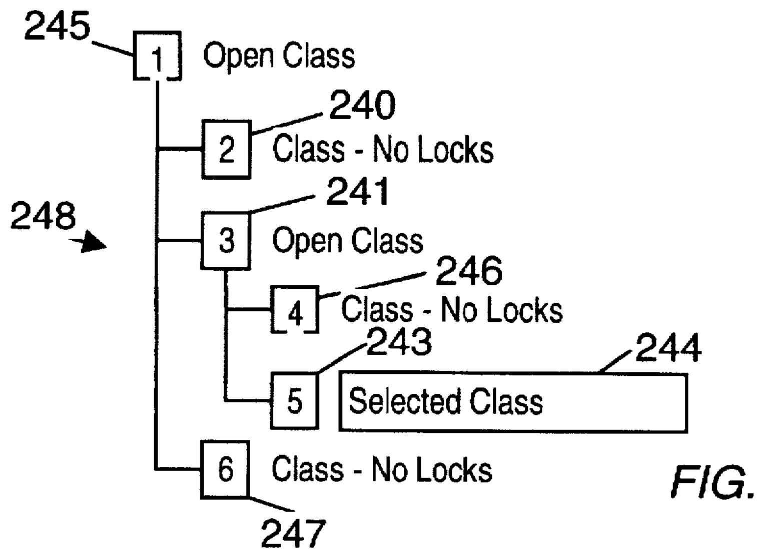
FIG. 25 shows a schema corresponding to the schema being edited in FIG. 24.
FIG. 26 shows a lock holder table after completion of the creation of an edit parts window.
FIG. 27 shows a lock object corresponding to the example shown in FIGS. 24–26.

While in the edit parts window 283, the user may navigate (see step 282 in FIG. 23) through the schema 248 shown in FIG. 25 to different locations in the class hierarchy tree 285. This navigation uses the same navigation steps 230 and 231 described above, as shown in FIG. 23.

In FIG. 26, the lock holder table 250 for this user is shown after the completion of the creation of the edit parts window 283. Note that the lock holder 257 contains two CSL (class share locks) 261, 262, and 260 for each class 245, 241 and 243 which has been opened to get to the class 243 identified by class handle 255. There is one CSL for each class 245, 241 and 243 opened for the original retriever window 290, and one CSL for each class 245, 241 and 243 opened for the edit parts window 283. When the user continues to navigate down the tree 285, CSL's will be obtained for each class through which the user navigates.

FIG. 27 shows the lock object 260 for this example in more detail. The class share lock count 263 is two, because two class share locks are contained in the element 260 shown in FIG. 26 at the intersection of the row corresponding to the class handle 255 and the column corresponding to the lock object 257.

Like reference numerals in FIGS. 25–27 refer to like elements in FIGS. 14–16 and FIGS. 18–20. Therefore, the description in connection with FIGS. 14–16 and FIGS. 18–20 will not be repeated.

Figure 28:
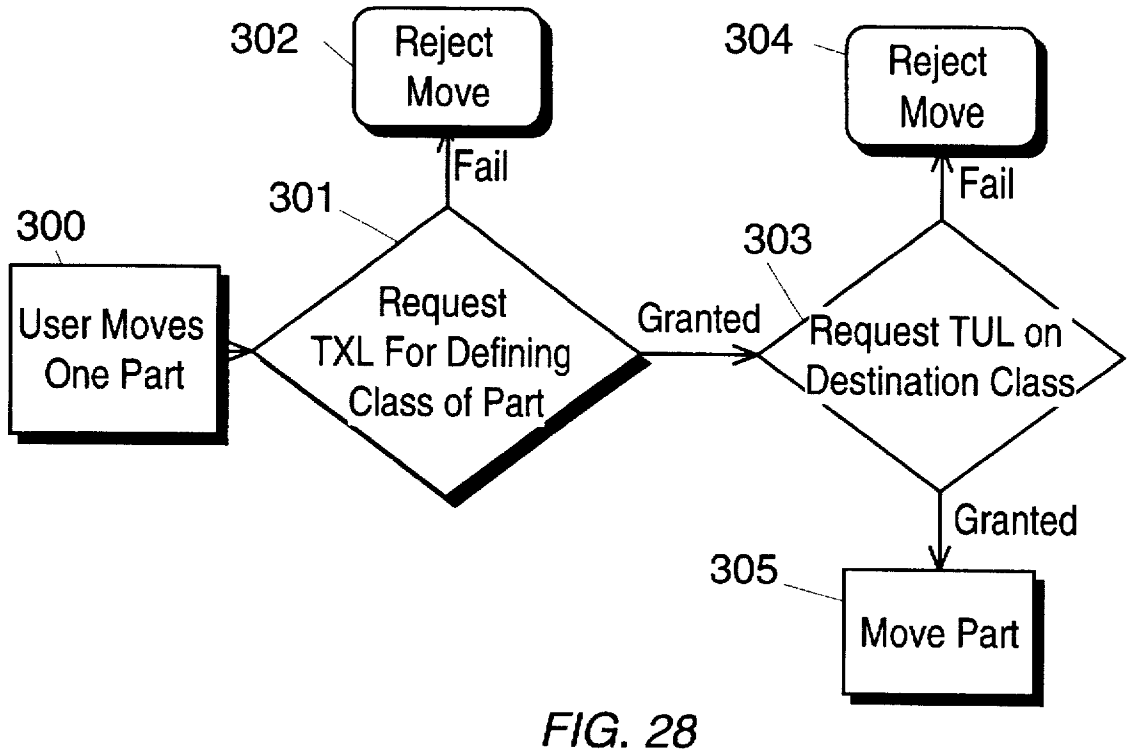
FIG. 28 shows a flow chart for an example of moving a single part from one class in a subtree to another class within a given subtree.
Figure 29:
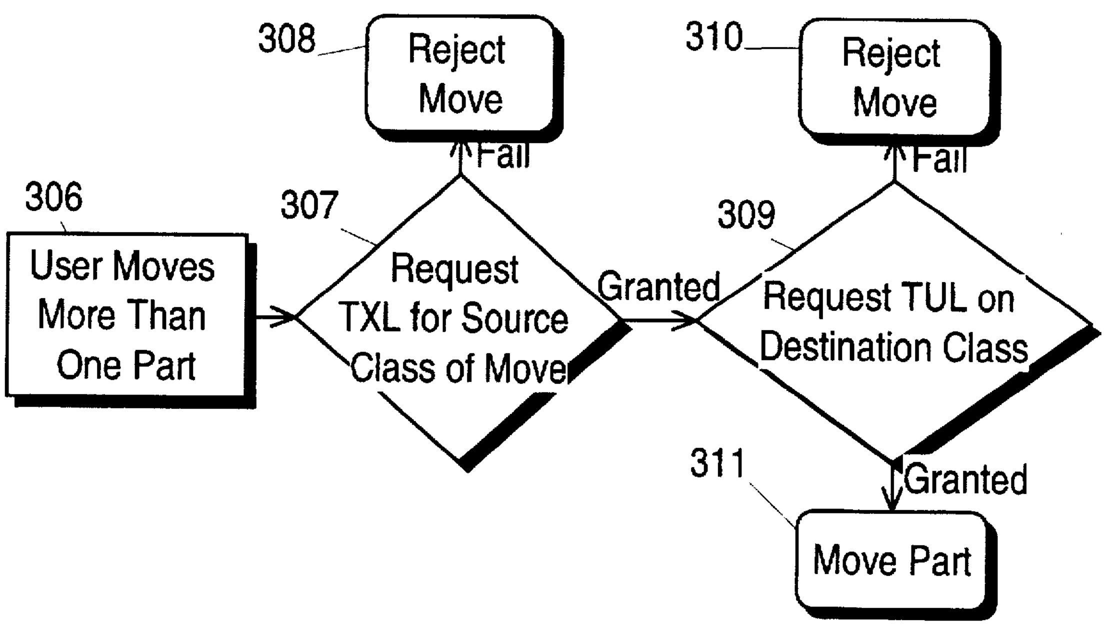
FIG. 29 shows a flow chart for an example of a general case of moving any number of parts from one class in a subtree to another class within that subtree.

FIG. 28 depicts a flow chart for the method used when a user is attempting to move a selected part 330 from one class 243 to another class 241 within a given subtree 248. FIG. 29 shows a flow chart for the method used in the general case of moving any number of parts from one class 243 in a subtree 248 to another class 241 within that subtree 248. The difference between these two figures is determined by the number of parts to be moved. In the special case of one part to be moved, an optimization can be made in the method shown in FIG. 28 that makes it more likely that the operation can be completed because the locks are applied to a smaller set of composite objects.

In FIG. 29, the general case of moving any number of parts from one class 243 in a subtree 248 to another class 241 within that subtree 248 is shown. In a preferred embodiment, this method is used to move more than one part, and the method depicted in FIG. 28 is used to move a single part. In FIG. 29, the operation begins by attempting to get a TXL (tree exclusive lock) for the subtree 243 that was selected when the edit parts operation was started (FIG. 22). If the lock is denied, then the operation is rejected. If the lock is granted, then a TUL (tree update lock) is requested for the destination class 241. If the TUL is granted, then the all of the necessary locks are held, and the parts are moved from the source class 243 to the destination class 241.

FIG. 28 shows the special case where only one part 330 is to be moved. The only thing that is different here is where the TXL is requested. Although the previous case (FIG. 29) is known to work, it will be less likely to succeed because it requires a broader lock on the subtree 285 in which parts are being moved. To increase the likelihood of moving the part 330, the TXL is applied to the class 243 which owns the instance 330 being moved. This applies the lock to the smallest possible portion of the tree 285, thereby locking the fewest number of instances. When the lock is granted, the operation proceeds in the same manner as the general case shown in FIG. 29.

Referring more specifically to FIG. 28, the user initiates the process in step 300. Although this step is labeled "user moves one part," it should be understood that the first step is more accurately an attempt by the user to perform the indicated function (if the necessary locks are available). The concurrency control system then proceeds to step 301, in which the system requests a TXL for the class 243 that owns the part that is to be moved. Although FIG. 28 refers to the "defining class of part," those skilled in the art will appreciate that it is more accurately referred to as the owning class for that part. If the TXL cannot be obtained, (because the lock manager 125 detects a conflicting lock present in the lock table 250), the system proceeds to step 302. The GUI preferably informs the user that the requested move cannot be performed, for example, with a message that access is denied because the information is in use. If the requested TXL is granted by the lock manager 125, the system proceeds to step 303. The system requests a TUL on the destination class 241. If the requested tree update lock cannot be granted, (because the lock manager 125 detects a conflicting lock present in the lock table 250), the system proceeds to step 304 and preferably informs the user that the requested move cannot be performed. If the requested TUL does not conflict with an existing lock in the lock table 250, the lock manager 125 grants the requested TUL and proceeds to step 305. The part can then be moved.

The dynamic class manager 134 will, of course, perform operations on the objects in the knowledge base 123 which are described more fully in application Ser. No. 08/339.481, filed Nov. 10, 1994, by Thomas S. Kavanagh, et al., for OBJECT ORIENTED DATABASE MANAGEMENT SYSTEM, the entire disclosure of which is incorporated herein by reference.

Figure 30:
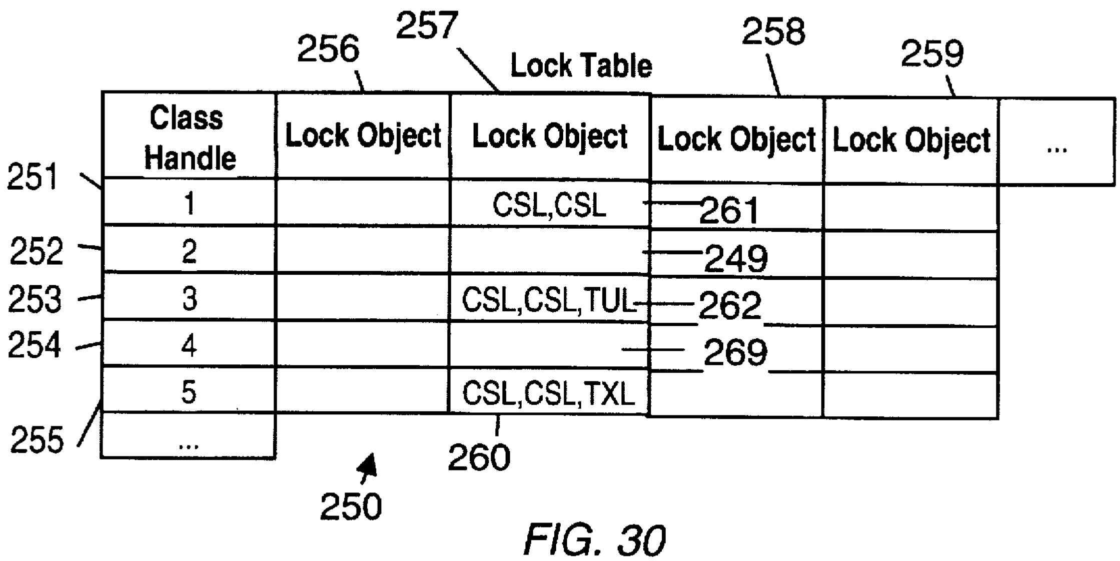
FIG. 30 shows a lock holder table during the process for the general case of moving any number of parts from one class in a subtree to another class within that subtree.
Figure 31:
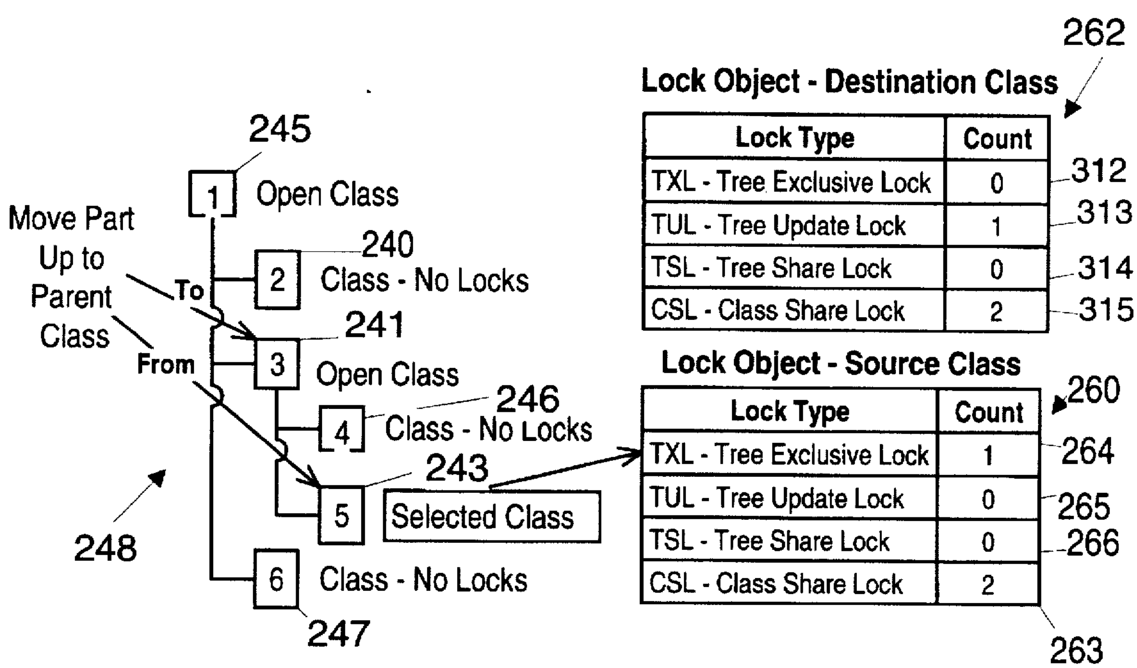
FIG. 31 shows details of the lock objects for the source and destination classes, and the associated actions for the general case of moving parts shown in FIG. 29.

FIG. 30 shows the lock table 250 for the general case of moving parts described in FIG. 29. The table 250 of lock holders may have multiple locks on many portions of the tree 285. The illustrated lock table 250 identifies the locks that are held by this lock holder 257 (the locks held by the retriever 290, the locks held by the parts editor 283, and the locks held for the move parts operation). The classes 245, 241, and 243 identified by class handles 251, 253, and 255, respectively, each have a CSL (class share lock) for the retriever, and a CSL for the parts editor. In addition, the class 241 identified by class handle 253 has a TUL (tree update lock) to add the part that is about to be moved to the class 241. Also, the class 243 identified by class handle 255 has a TXL for removing the part from the class 243.

In the illustrated example, in order to have the TXL granted to the class 243 represented by class handle 255, there may be no other TSL (tree share locks), TUL, TXL, or CSL's held by other lock holders 256, 258 or 259 which are currently operating. The fact that there are CSL's held by this lock holder 257 is considered a self conflicting condition. This condition is permitted, and the TXL granted, due to the fact that the CSL locks are held by the requester 257 of the TXL. In general, in circumstances like this, broader locks are granted if and only if the only conflicts that can be identified are with the lock holder 257 that is making the request.

Figure 32:
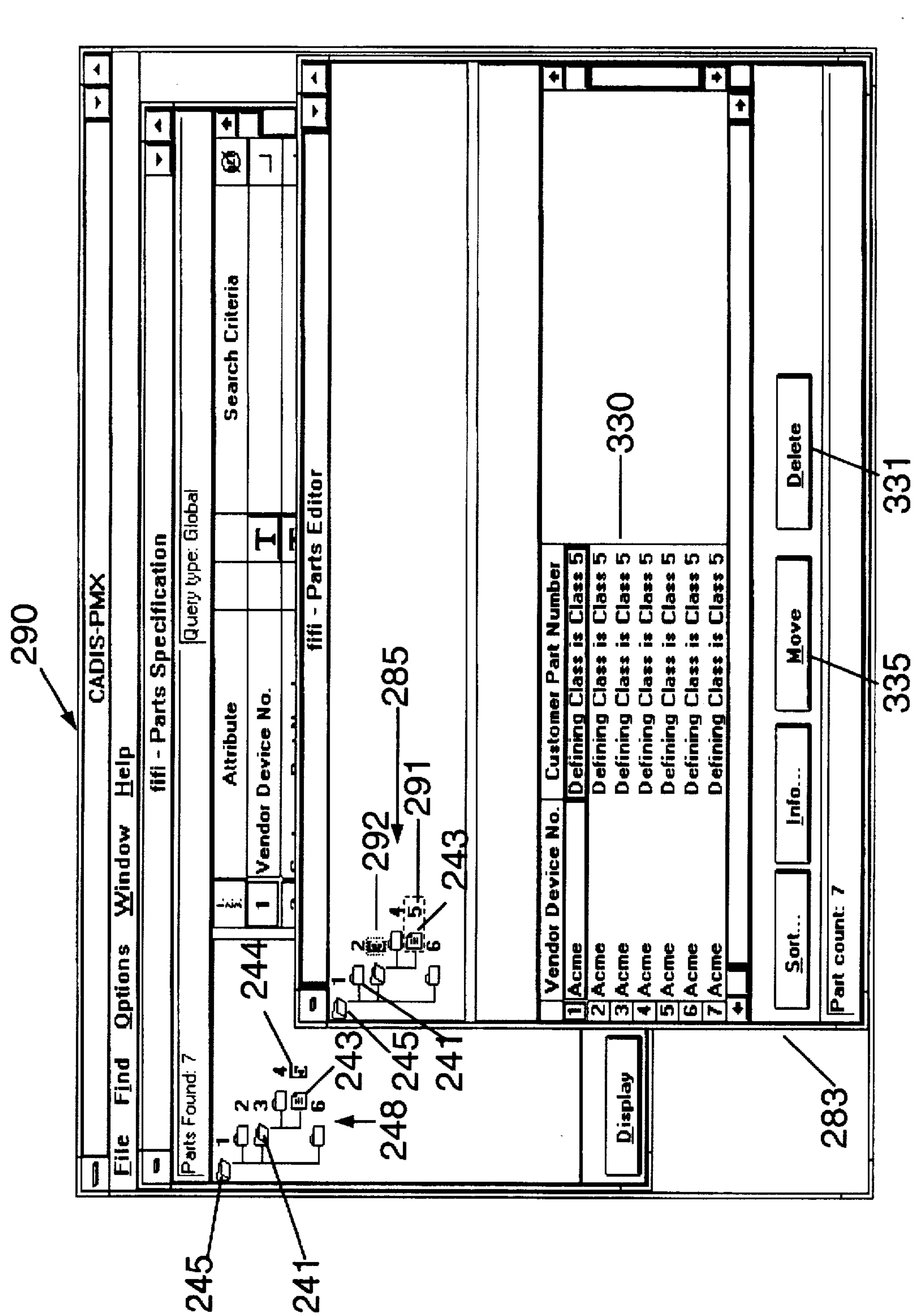
FIG. 32 shows a preferred display associated with a move parts operation.

A preferred display for moving a selected part 330 is shown in FIG. 32. In the preferred embodiment, the display of the parts editor window 283 shown in FIG. 32 should visually indicate the source class 243 in the tree 285 with a dotted rectangle 291, highlighting, color code, or some other distinguishing feature. The destination class 241 should be visually indicated by highlighting 292, or some other distinguishing feature. The user accomplishes the move function by clicking on the move command button 335.

Figure 33:
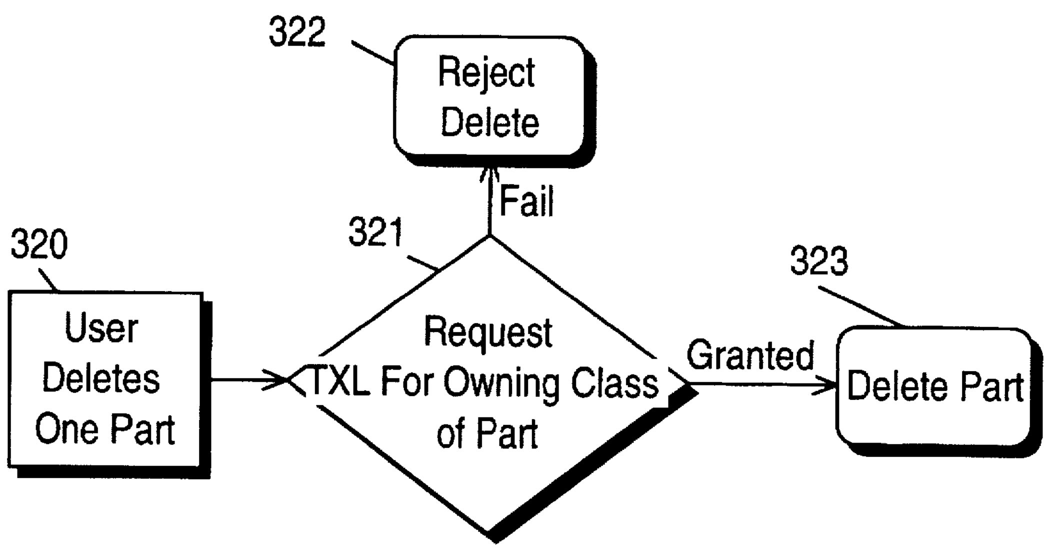
FIG. 33 is a flow chart illustrating the process for an optimized case where one part is to be removed from the knowledge base.

FIG. 33 depicts a flow chart for the optimized case where one part 328 is to be removed from the knowledge base 123. The process is started at step 320. In step 321, a TXL is requested for the class 243 that owns the instance 328 that is to be removed. Although FIG. 33 refers to the class 243 as the "defining class of part," those skilled in the art will appreciate that the class 243 is more accurately referred to as the owning class. If the TXL cannot be obtained, then the operation is denied in step 322. If the operation succeeds, the TXL is granted in step 323, and the part 328 is deleted.

Figure 35:
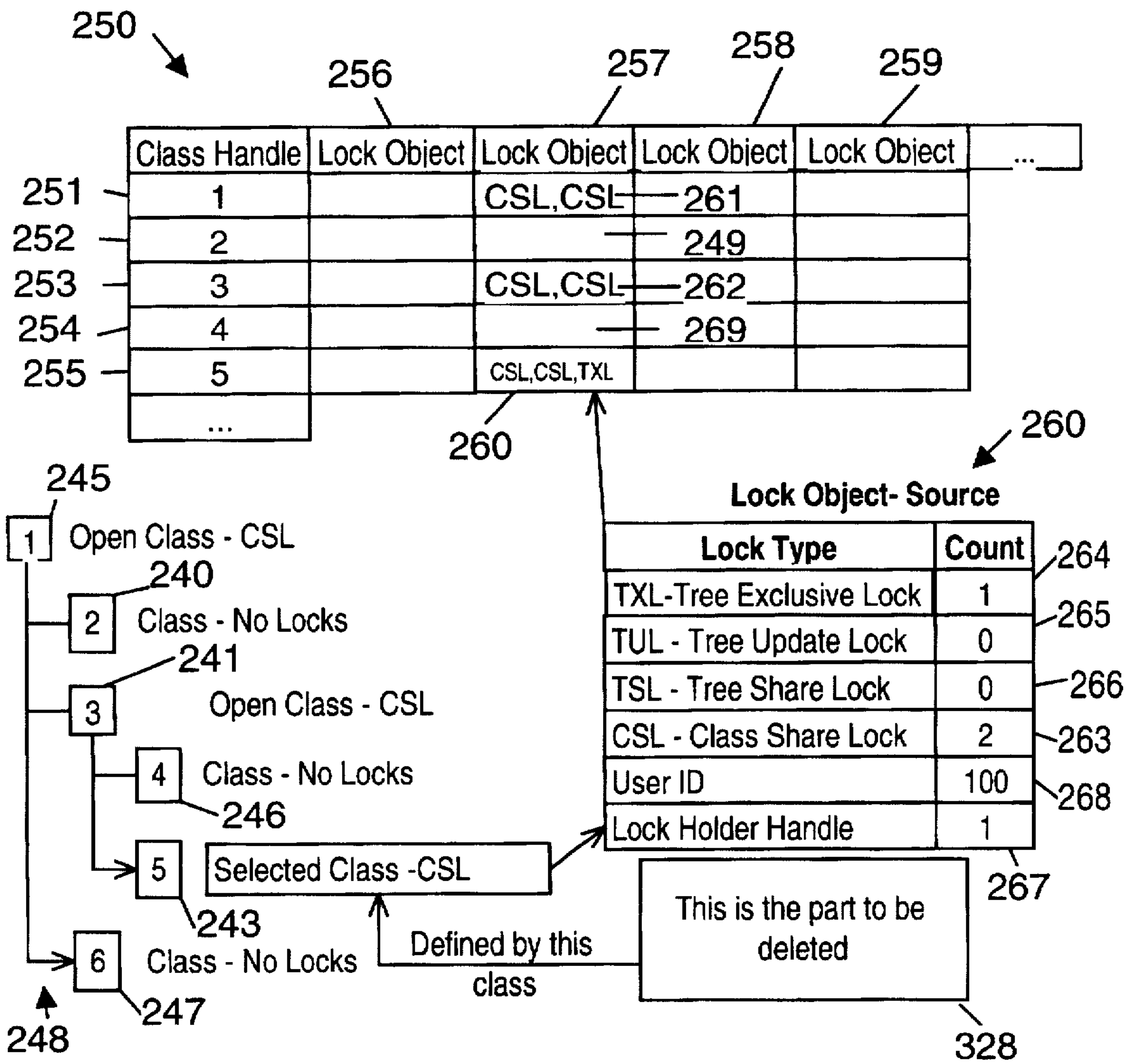
FIG. 35 shows the locks that must be held by a lock holder that wishes to remove an instance from a class.

FIG. 35 shows the locks 260 that must be held by a lock holder 257 that wishes to remove an instance 328 from a class 243. This condition is essentially the same as a portion of the move operation (see FIG. 30) wherein the part must be removed from a class 243. The lock conditions are the same for the classes 245 and 243 represented by class handles 251 and 255, respectively. The class 241 represented by class handle 253 holds a CSL for the retriever, and a CSL for the parts editor. To delete a part 328, a TXL must be held for the class 243 from which the instance 328 or set of instances is to be removed.

Figure 34:
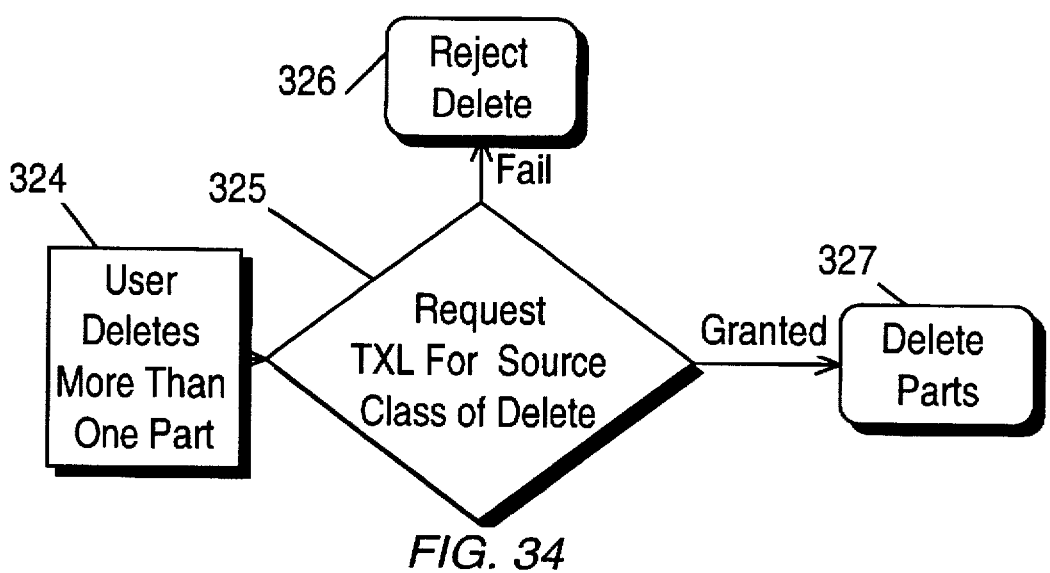
FIG. 34 is a flow chart illustrating the process for a general case of deleting one or more parts from a subtree.

FIG. 34 depicts a flow chart for the general case of deleting more than one part from the subtree 248, which begins with step 324. The TXL is requested in step 325 from the class 245 that was identified when the part editor was invoked. This is the class 245 that defines the subtree 285 wherein work will be done. After successfully obtaining the TXL, instances are deleted from their owning classes 245, 240, 241, 246, 243, or 247. If the TXL is denied, then the operation is rejected, and no parts are deleted.

Figure 36:
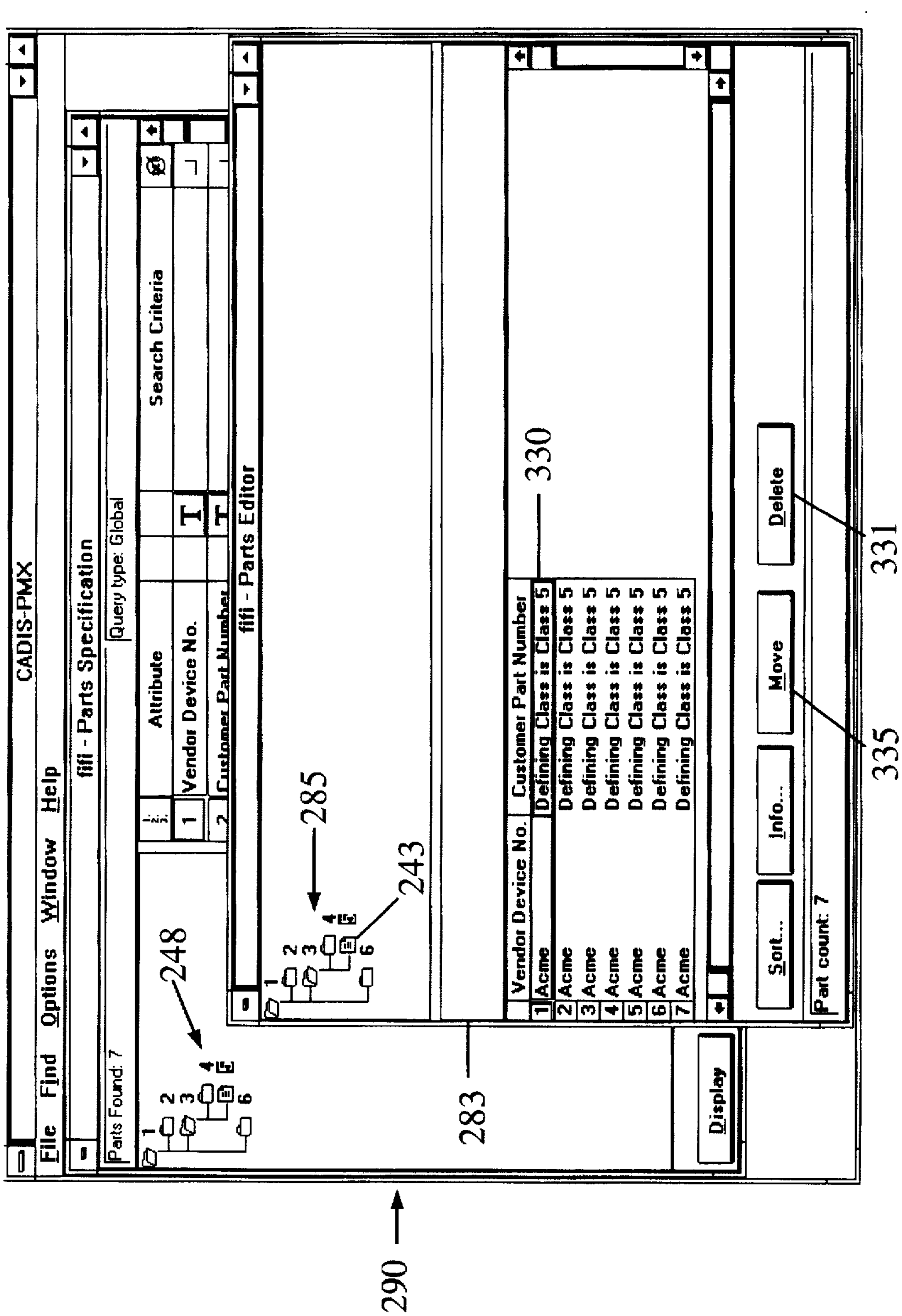
FIGS. 36 and 37 show preferred displays associated with a delete parts operation.
Figure 37:
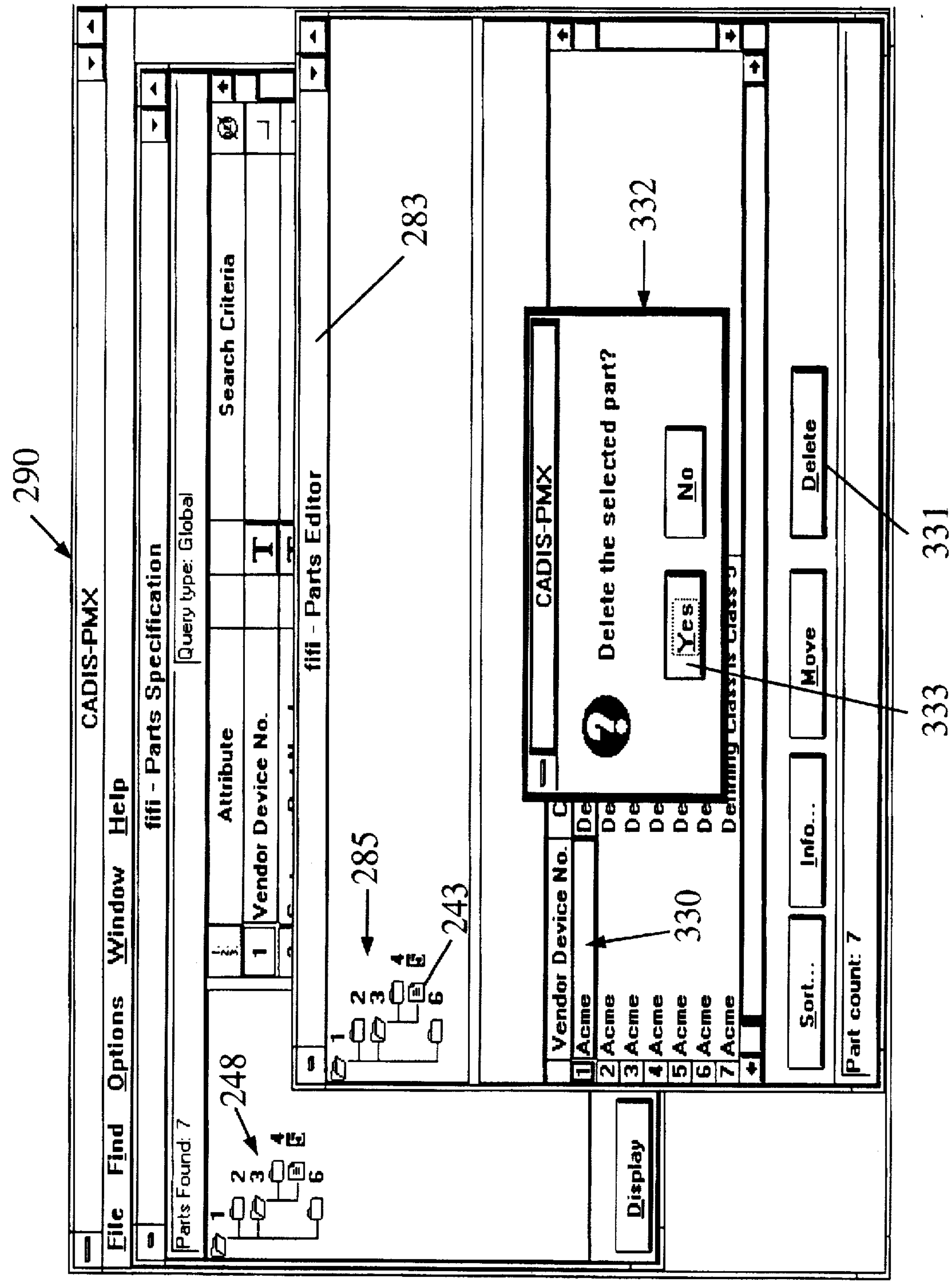

FIG. 36 shows the preferred display associated with the delete parts operation. A part 330 is selected by clicking on the display 330 of the part. The selected part 330 corresponds to the part 328 to be deleted shown schematically in FIG. 35. In the illustrated example, the selected part is defined by, or a member of, the selected class 243. The deletion of the selected part 330 is initiated by clicking on the delete command button 331 shown in FIG. 36. In a preferred embodiment, if the requested locks are granted, the system opens a dialog box or window 332 as shown in FIG. 37 to ask the user to confirm that he or she wants to delete the selected part 330. The deletion operation is confirmed by clicking on the "yes" button 333, at which time the dialog box 332 is closed and the selected part 330 is deleted.

Figure 38:
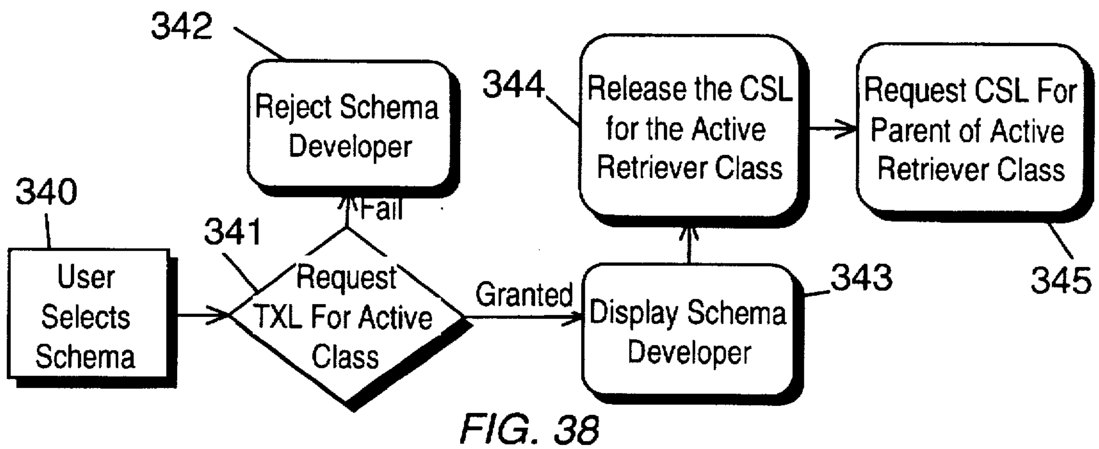
FIG. 38 is a flow chart that describes steps that are involved in concurrency control when using the schema editor to change the structure of the schema.

FIG. 38 describes the steps that are involved in concurrency control when using the schema editor to change the structure of the schema. In step 340 when the user selects the schema developer or schema editor 144, the next operation is to obtain a TXL lock on the subtree that the user wishes to modify. The procedure for attempting to accomplished this begins with step 341, where a tree exclusive lock is requested for the active class 243. If the TXL cannot be obtained, then the process branches to step 342 and the schema developer 144 cannot be started. When the TXL lock is granted, the method proceeds to step 343 and the schema developer screen 350 is displayed. Following step 343, the CSL locks that were obtained for the retriever 290 on the class 243 that was selected for schema editing are released in step 344 (because a TXL lock has been obtained for that class 243). In step 345, a CSL lock is then obtained by the schema developer 144 for the parent class 241 of the class 243 in which the schema is to be edited. A CSL is preferably also obtained for the parent class 245 of the class 241.

Figure 39:
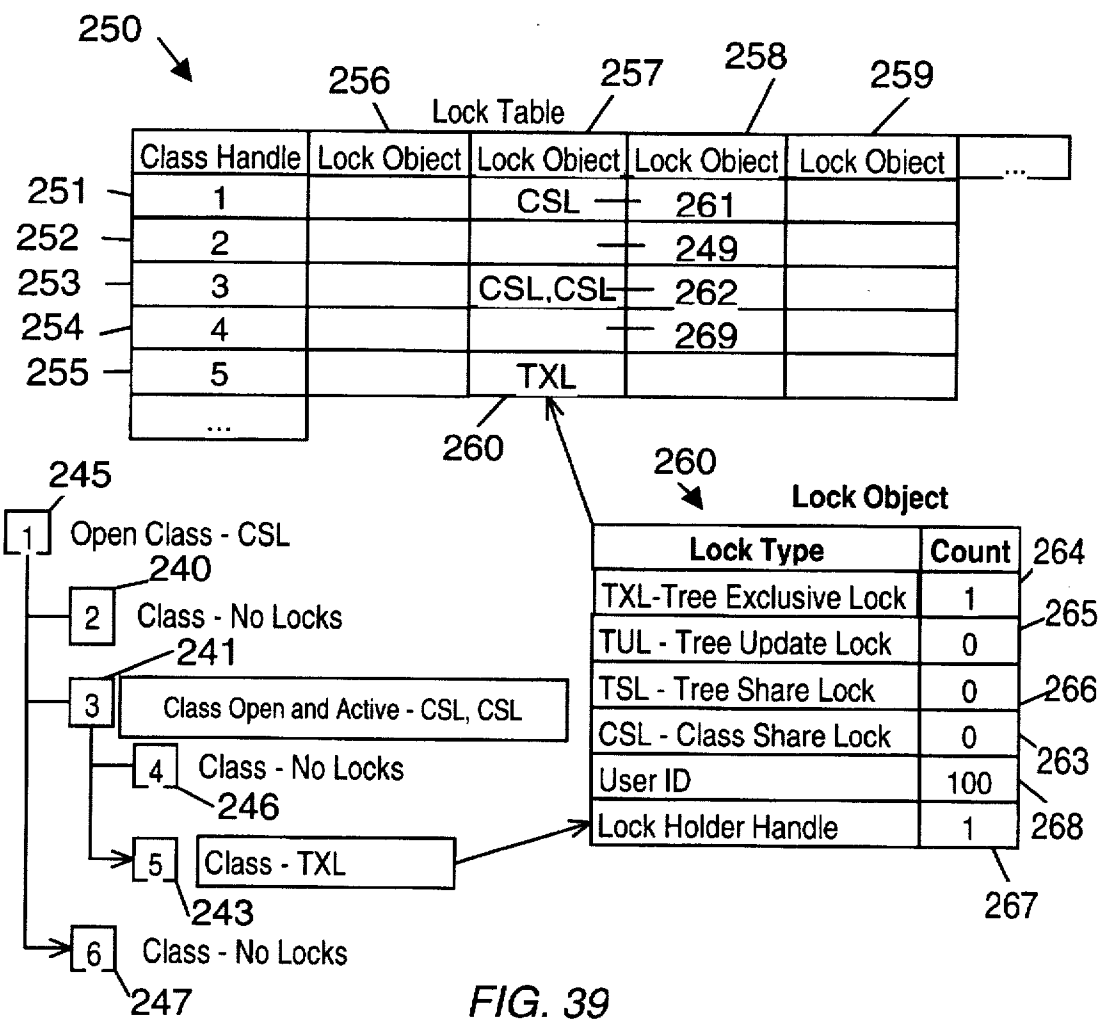
FIG. 39 shows a lock table that indicates the locks that are held during the operations described in FIG. 38.

FIG. 39 shows a lock table 250 that indicates the locks that are held during the operations described in FIG. 38. Note that the schema editor 144 holds a TXL (in element 260) for the class 243 represented by class handle 255. This prevents other users of the system from accessing any of the information in the subtree below the class 243 represented by class handle 255. Details of the lock object 260 are also shown in FIG. 39.

Figure 40:
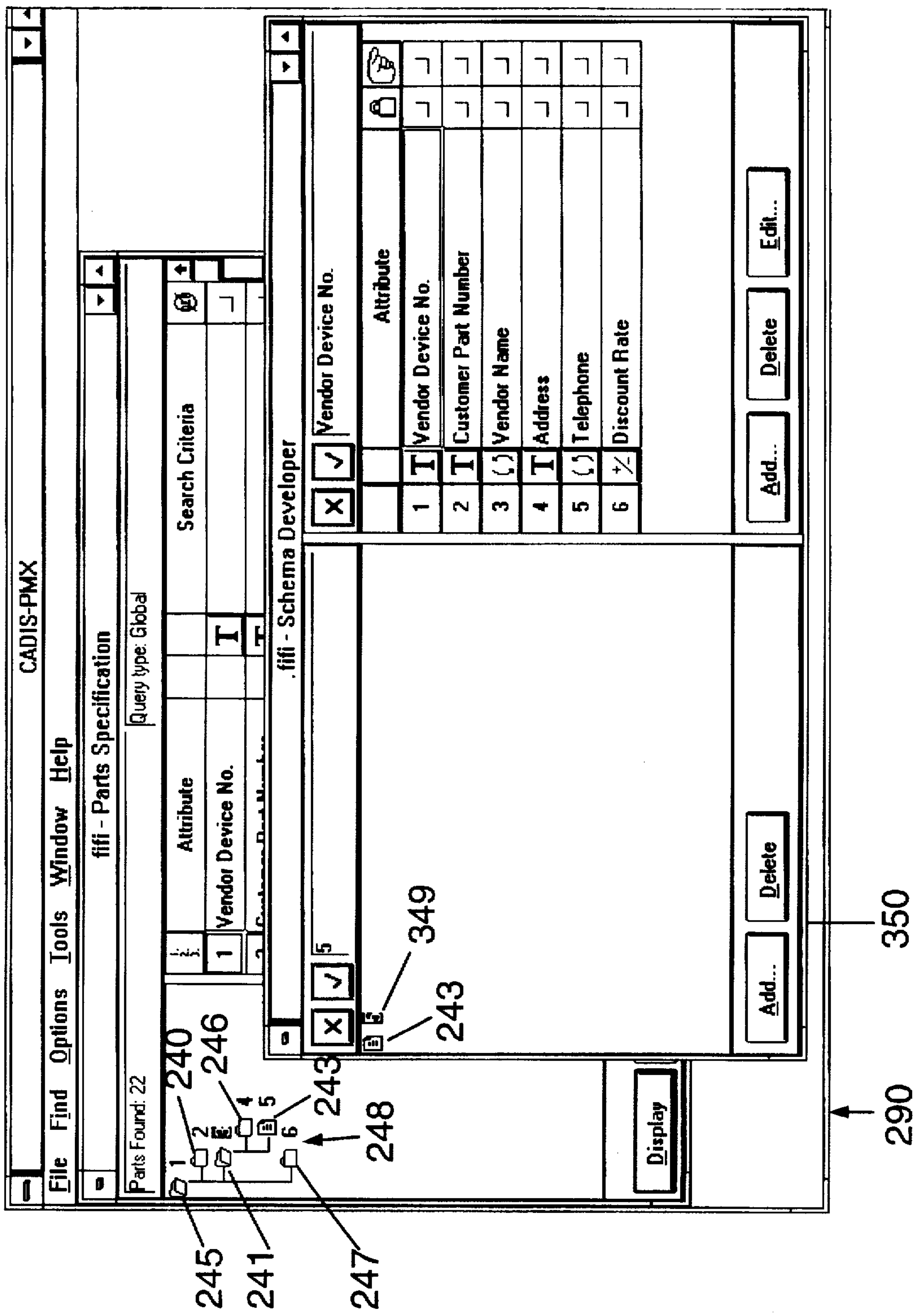
FIG. 40 illustrates a screen display for a preferred embodiment showing a schema developer window that is opened in one step of the process shown in FIG. 38.

FIG. 40 illustrates a screen display for a preferred embodiment showing a schema developer window 350 that is opened in step 343 of FIG. 38. The class 243 in which the schema is to be edited is preferably displayed in a highlighted manner 349.

Figure 41:
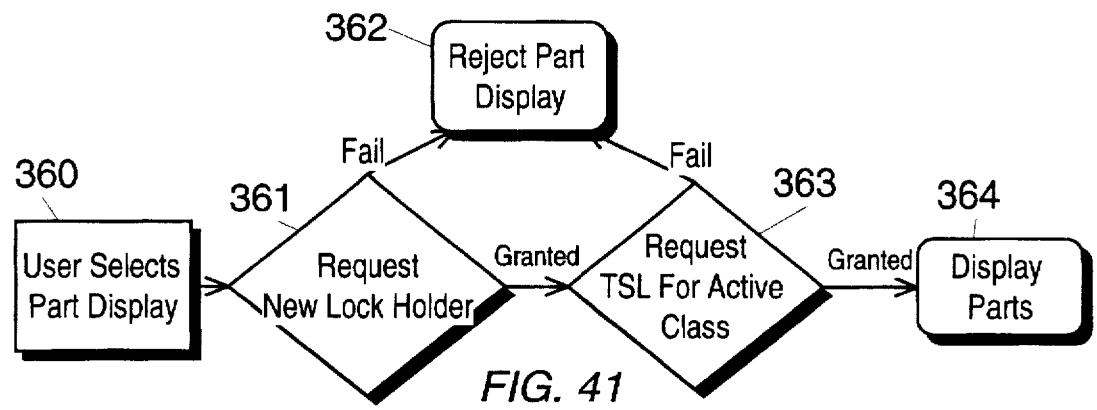
FIG. 41 shows a flow chart illustrating the mechanisms that are used by the concurrency control means when displaying a instance.
Figure 43:
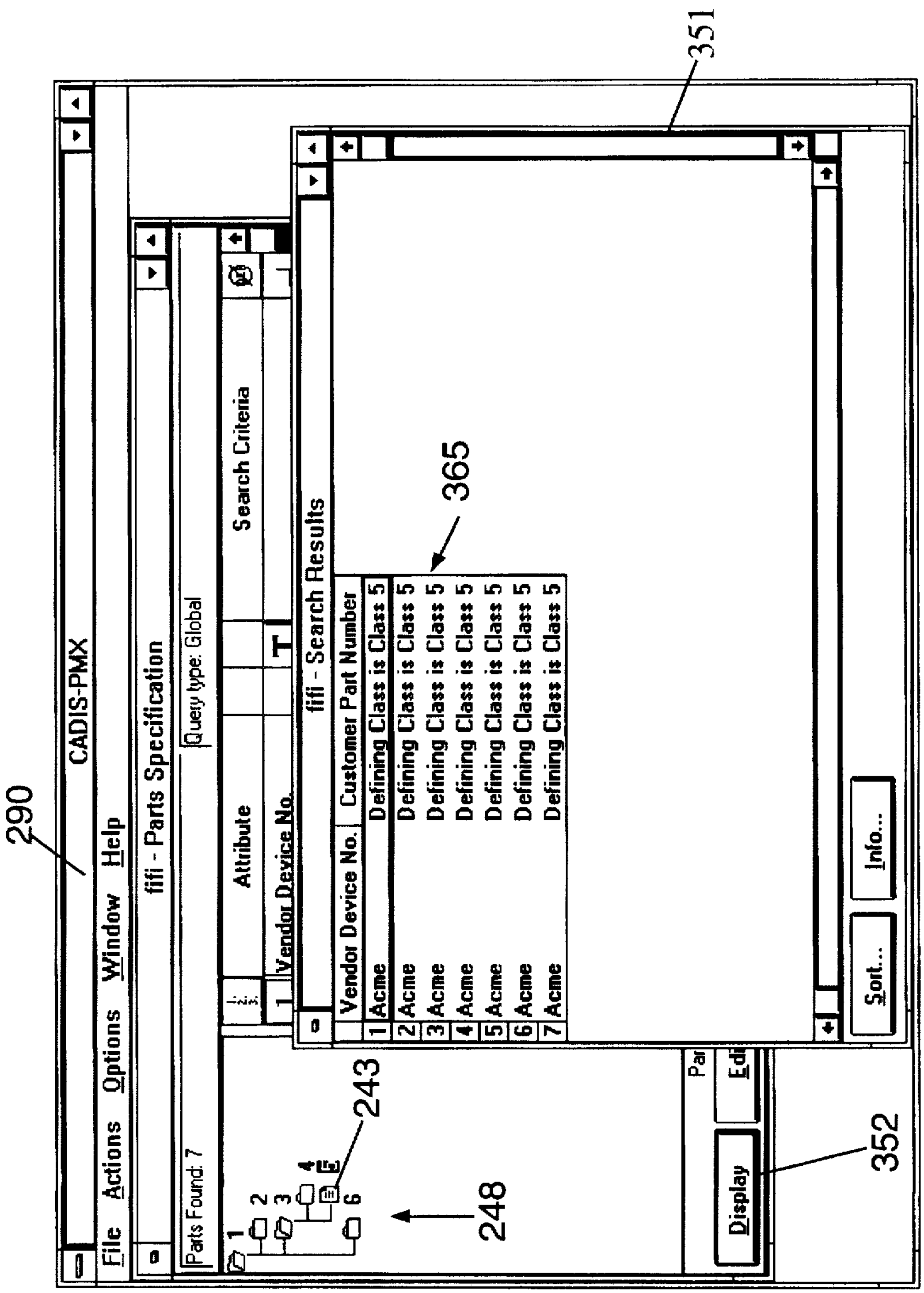
FIG. 43 illustrates a screen display for a preferred embodiment showing a search results window that is opened in one step of the process shown in FIG. 41.

FIG. 41 shows a flow chart illustrating the mechanisms that are used by the concurrency control means when displaying a instance. The operation begins at step 360 by the user selecting the parts display mechanism. Referring to FIG. 43, this is initiated when the user clicks on the display command button 352. In order for the system to display the desired information, there will need to be locks present. In order to obtain locks, the software 131 must become a lock holder. A request for a new lock holder is performed in step 361 shown in FIG. 41. If the request to become a lock holder is denied, then the flow proceeds to step 362 and the user is not allowed to display the parts. However, if the lock holder request is granted, then the flow proceeds to step 363 and the software 131 requests a TSL (tree share lock) on behalf of the user. If the TSL is denied, then the method proceeds to step 362 and the operation cannot proceed. When the TSL is granted for the active class, the method proceeds to step 364 and parts can be displayed with a confidence that the information contained within that subtree 243 is coherent.

Figure 42:
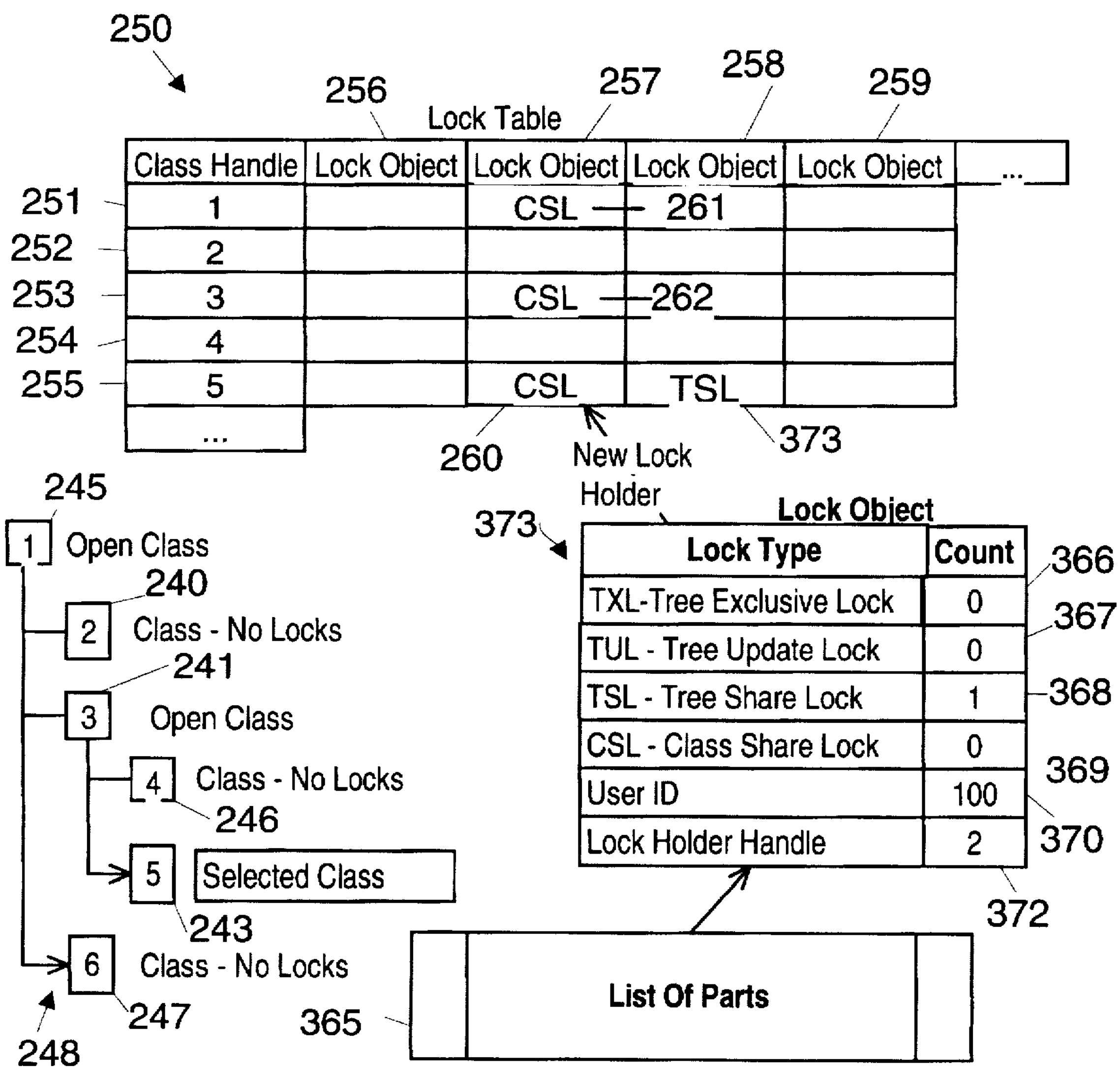
FIG. 42 depicts the lock table, a diagram of the schema, and details concerning one of the lock objects, showing the condition of the lock holder table for the situation depicted in FIG. 41.

FIG. 42 depicts the lock table 250, a diagram of the schema 248, and details concerning one of the lock objects 373. FIG. 42 shows the condition of the lock holder table 250 for the situation described in FIG. 41. The retriever 290 is holding the CSL locks 261, 262 and 260 for all of the classes 245, 241 and 243, respectively, that have been navigated through to get to the class 243 that is represented by class handle 255. In order for the system to display the parts defined by class 243, a new lock holder 258 is formed, and a TSL lock 373 is requested for the class 243 identified by class handle 255. The TSL 373 insures that other locks cannot be granted, and hence there will be no ability to modify the schema 248, or the instances contained within the this subtree 243. Hence the list of parts 365 displayed in the search results window 351 shown in FIG. 43 will be consistent, and coherent for the duration that the lock 373 is held.

In FIG. 42, the tree share lock is indicated in the lock table 250 at the intersection 373 of the row corresponding to the class handle 255 and the column corresponding to the lock holder 258. The lock object 373 is shown in more detail in FIG. 42. The TSL count for the lock object 373 is shown as one, because the lock holder 258 holds a TSL lock for the class 243 corresponding to the class handle 255. The lock holder handle 372 is two, indicating that this is a different lock holder from the lock holder described above with reference to FIGS. 35 and 39. However, the user ID 370 is shown as 100. This is because the same user (whose user ID is 100) is two lock holders.

Figure 50:
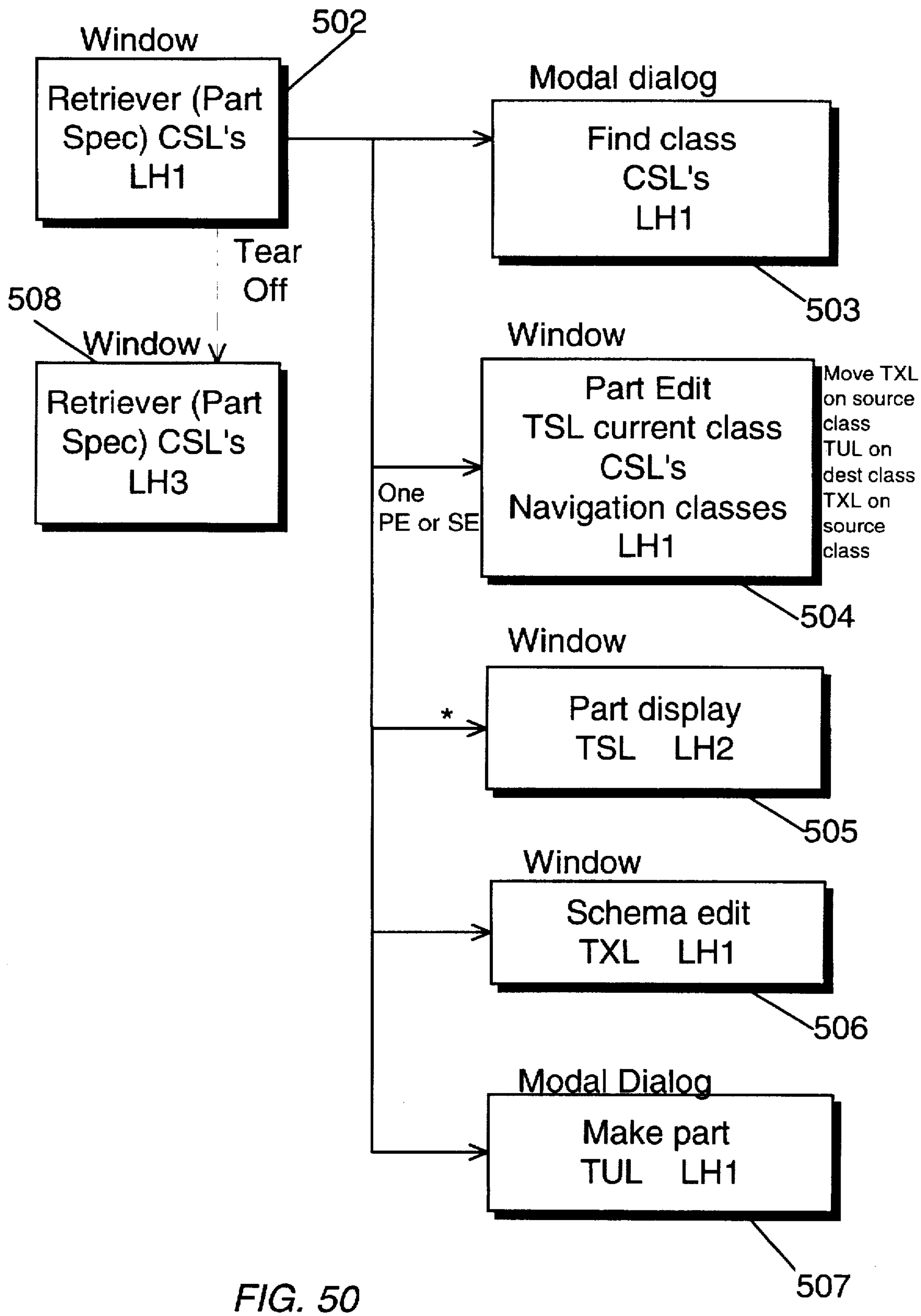
FIG. 50 is a chart representing the application of a lock manager by a knowledge base client.

FIG. 50 is a chart representing the application of the lock manager 125 by the knowledge base client 131. When a retriever window 502 is opened, the concurrency system assigns the user the lock holder 1 (LH1) position, and grants CSL's to that lock holder. To perform a "find class" function 503, lock holder 1 will require CSL's as shown in FIG. 50. When a part edit window 504 is opened, lock holder 1 must obtain a TSL on the current class, and CSL's to navigate the hierarchy. Tree locks (TUL and TXL) are required to edit the schema.

In order to open a part display window 505, the user will have to be assigned a new lock holder (LH2), and will require a TSL. In order to open a schema edit window 506, FIG. 50 shows that LH1 will require a TXL. In order to open an add part, or make part, window 507, LH1 will require a TUL. In a preferred system, a user can tear off a window 508 in the retriever. In order to do so, the user must be assigned LH3, and will require CSL's to navigate the schema.

The present invention may include a knowledge base client means and a knowledge base server means. The knowledge base server means preferably comprises an object oriented lock manager means. The knowledge base server means preferably includes a dynamic class manager means, a connection manager means, a query manager means, a handle manager means, a units manager means, a database manager means, and a file manager means.

Figure 55:
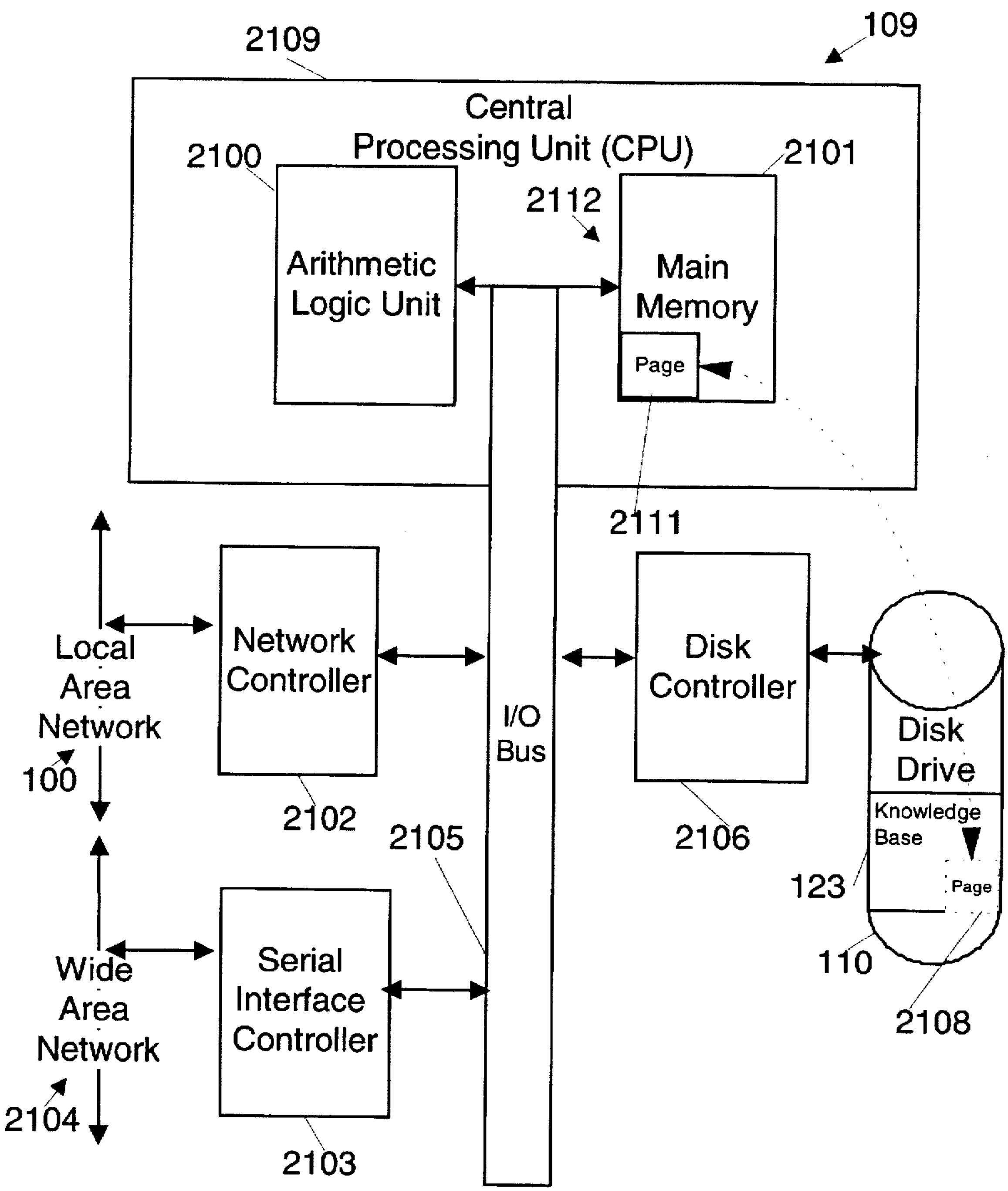
FIG. 55 shows the major components of a computer hardware configuration for a knowledge base server.

FIG. 55 shows the major components of a computer hardware configuration 109 providing the computational and communications environment for a knowledge base server 132. This configuration consists of a central processing unit or CPU 2109 which includes an arithmetic logical unit 2100 which fetches and executes program instructions from main memory 2101. The programs are stored on a disk drive 110, access to which is provided through a disk controller 2106. The knowledge base files 123 are also stored on disk drive 110 and accessed through virtual memory addresses 2112 in main memory 2101, through which, when required, a page 2111 of contiguous data in a disk file 2108 is copied into main memory 2101. The preferred embodiment of the present invention uses virtual memory 2112 for this knowledge base management system. The knowledge base server 132 interacts with the client API 143 through a local area network 100, access to which is controlled by network controller 2102, or through a wide area network 2104, access to which is controlled by a serial interface controller 2103. An I/O bus 2105 mediates data transfers between the CPU 2109 and the peripheral data storage, interface and communication components.

Figure 56:
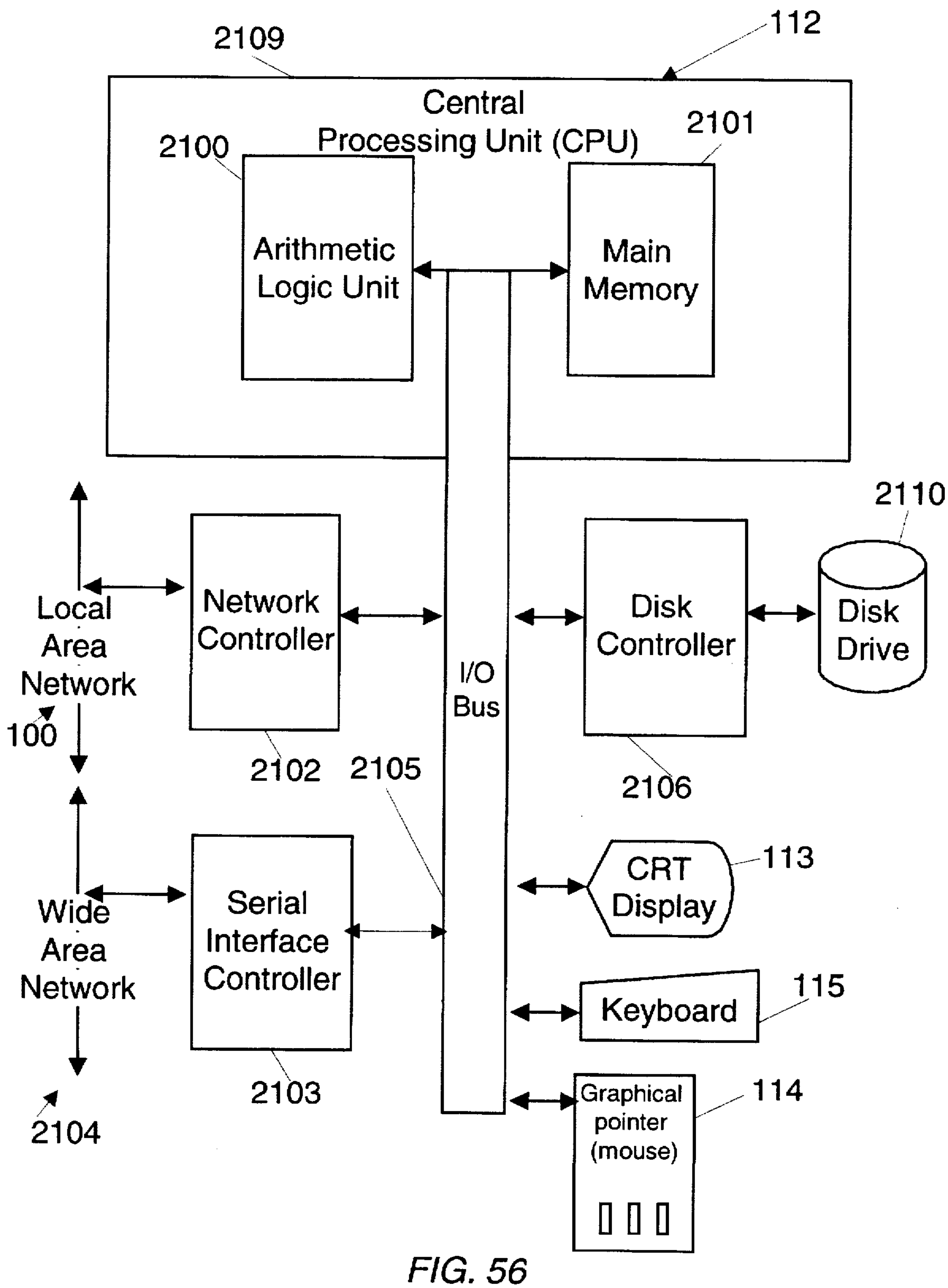
FIG. 56 shows the major components of a computer hardware configuration for a retriever, a schema editor, a graphical user interface component, and an API.

FIG. 56 shows the major components of a computer hardware configuration 112 providing the computational and communications environment for a retriever 130, schema editor 144, a graphical user interface component of legacy 133, and an API 143. This configuration consists of a central processing unit or CPU 2109 which includes an arithmetic logical unit 2100 which fetches and executes program instructions from main memory 2101. The programs are stored on one or more disk drives 2110, access to which is provided through a disk controller 2106. The user interacts with the system through the keyboard 115 and mouse or similar graphical pointer 114 with the graphical user interface displayed on the CRT display 113. The API 143 communicates with the knowledge base server 132 through a local area network 100, access to which is controlled by network controller 2102, or through a wide area network 2104, access to which is controlled by a serial interface controller 2103. An I/O bus 2105 mediates data transfers between the CPU 2109 and the peripheral data storage, interface and communication components.

The present invention may be advantageously used in a client/server architecture comprising a knowledge base client and a knowledge base server, as shown in FIG. 1. However, the invention is not necessarily limited to a client/server architecture. The invention may also be used in a distributed database system.

III. Object Oriented Database Structure

Figure 63:
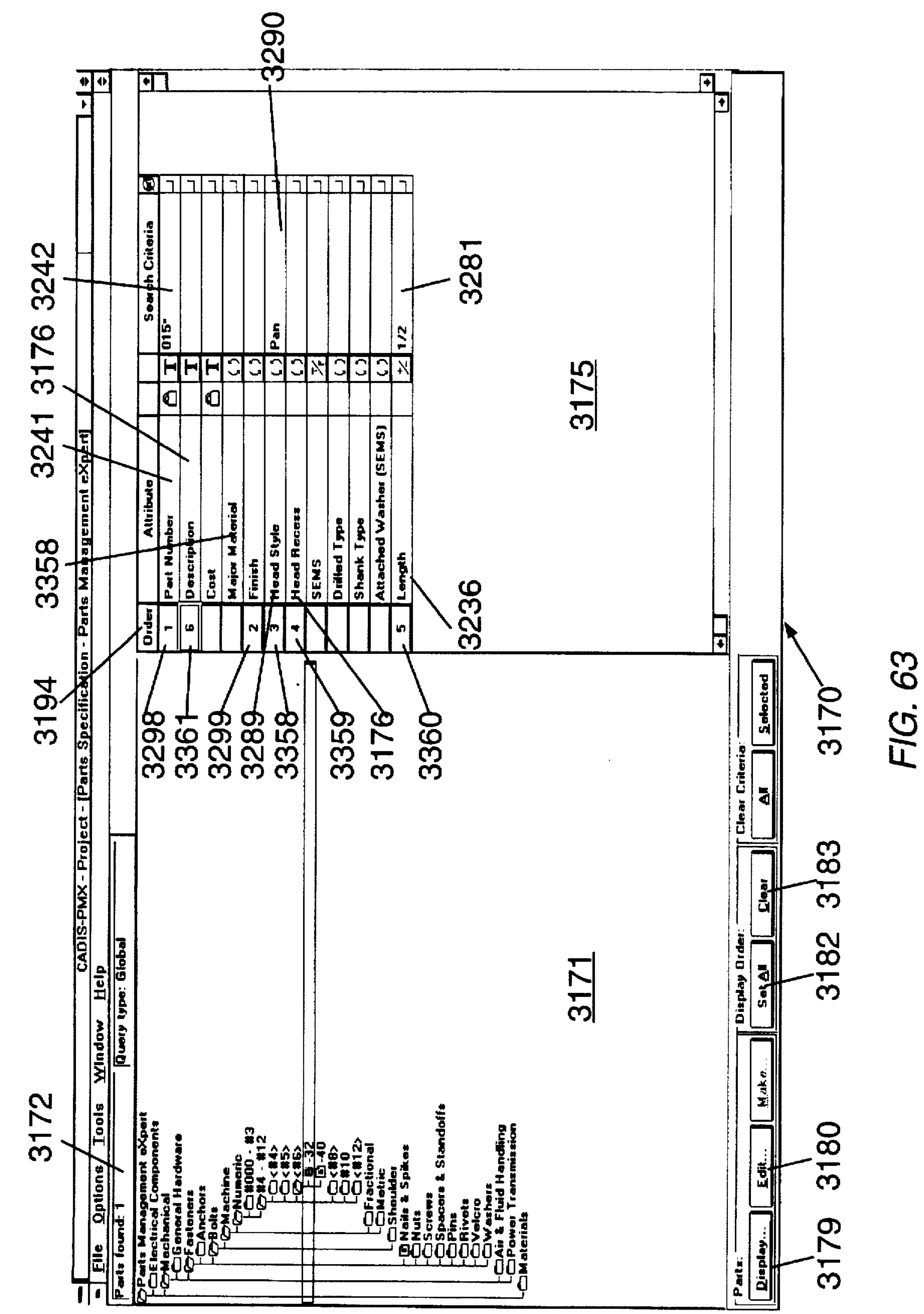
FIG. 63 depicts a display screen showing information displayed in the part specification window.
Figure 64:
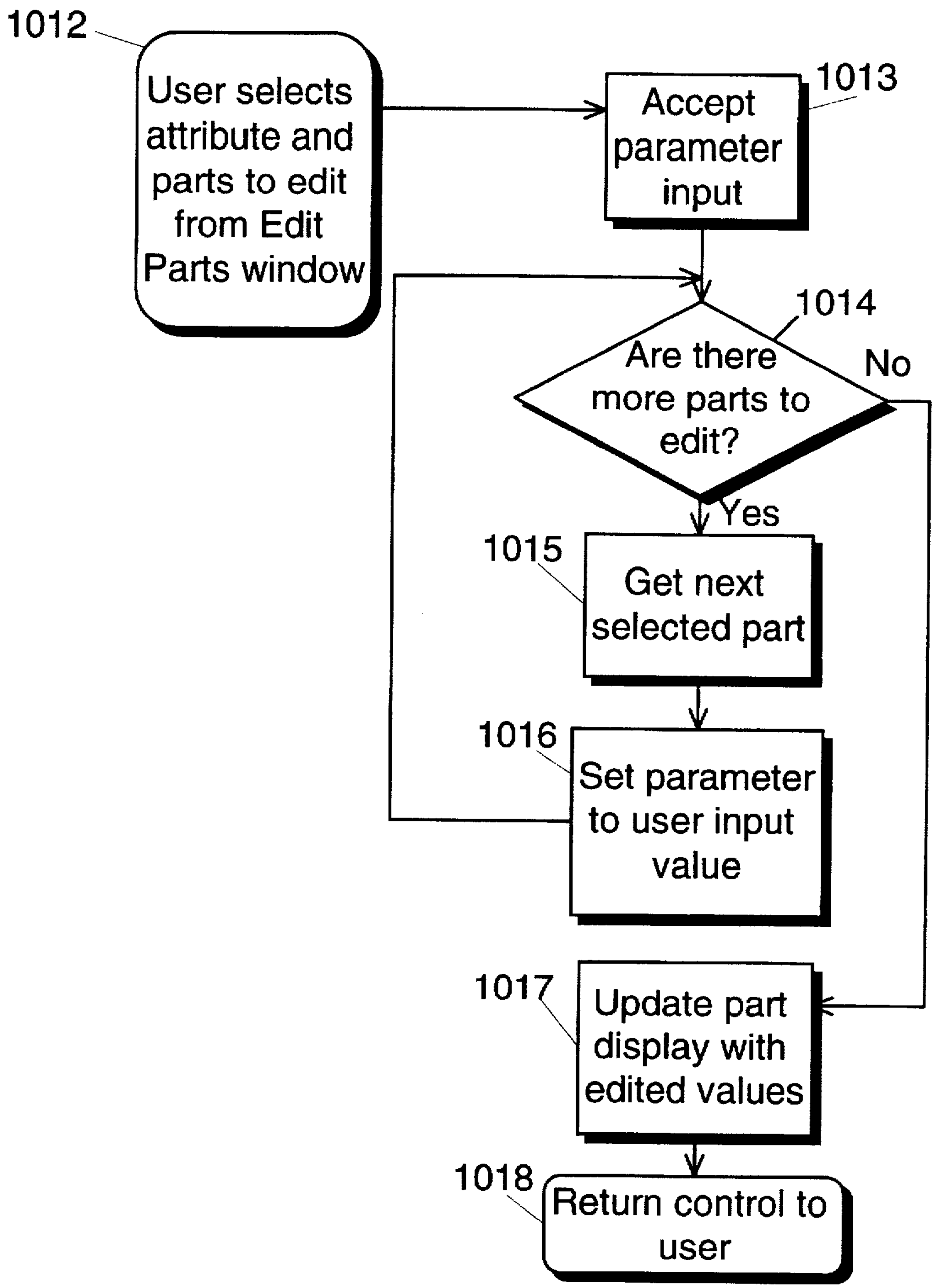
FIG. 64 is a flow chart depicting procedures followed when a user edits parts.
Figure 65:
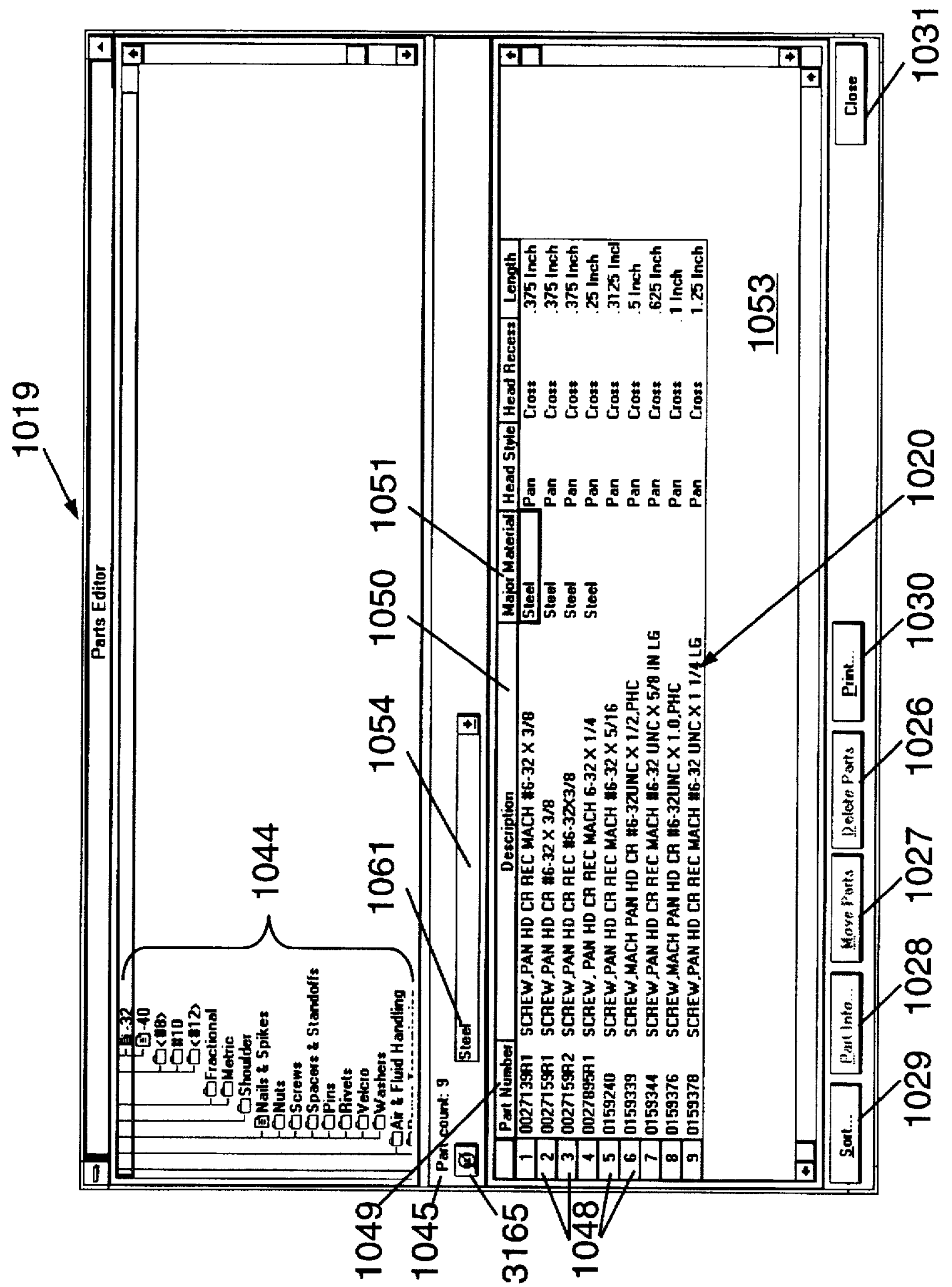
FIG. 65 depicts a display screen showing information displayed in the parts editor window.
Figure 66:
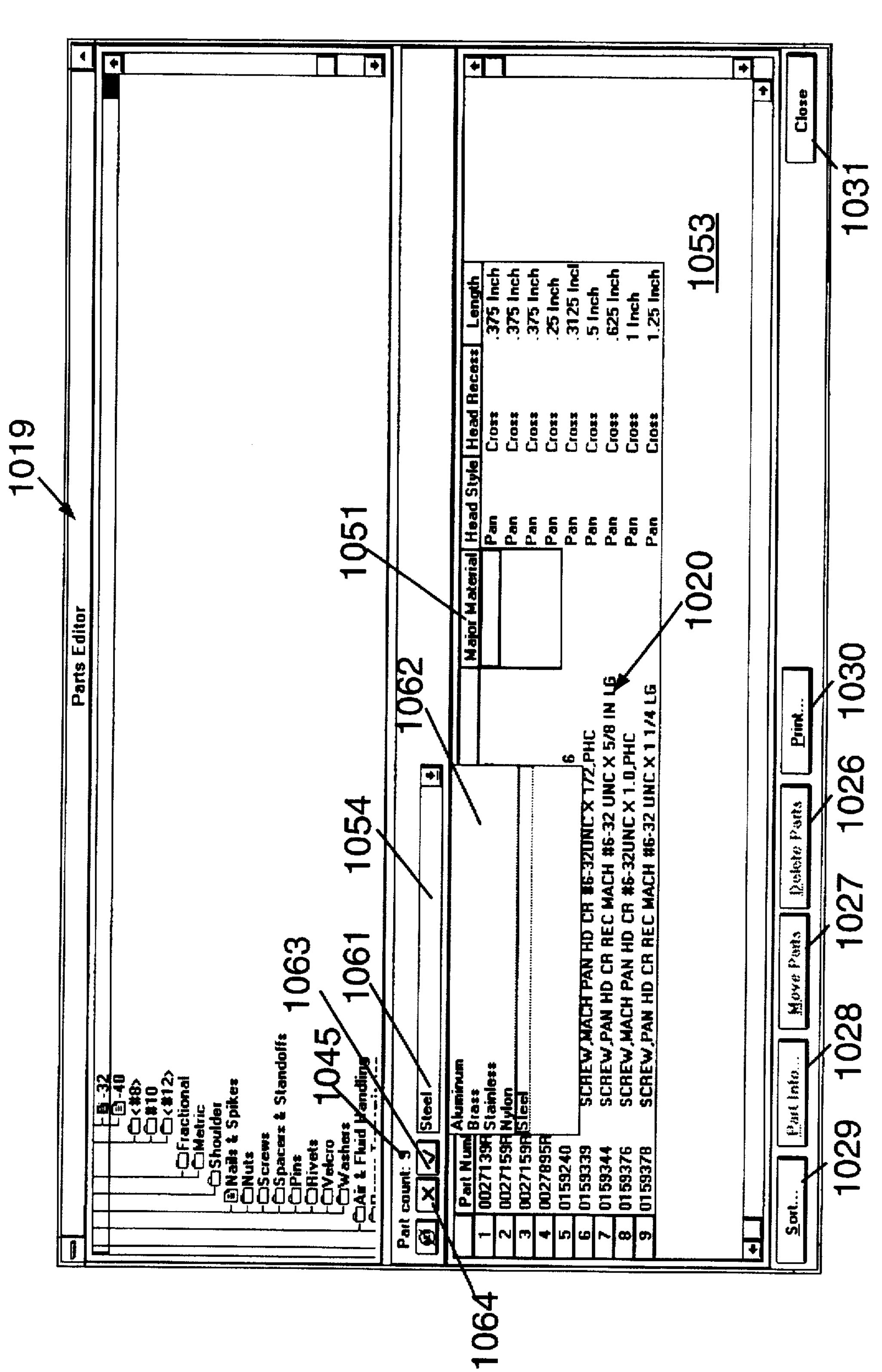
FIG. 66 depicts a display screen showing information displayed in the parts editor window.
Figure 67:
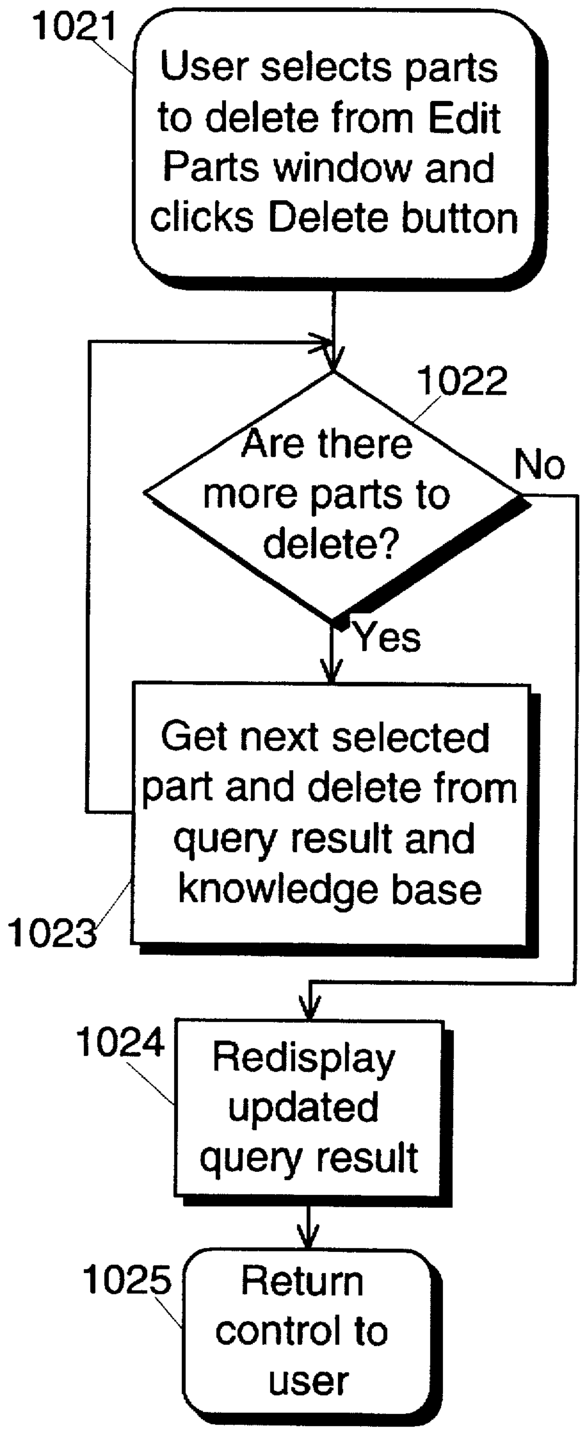
FIG. 67 is a flow chart depicting procedures followed when a user deletes parts.
Figure 68:
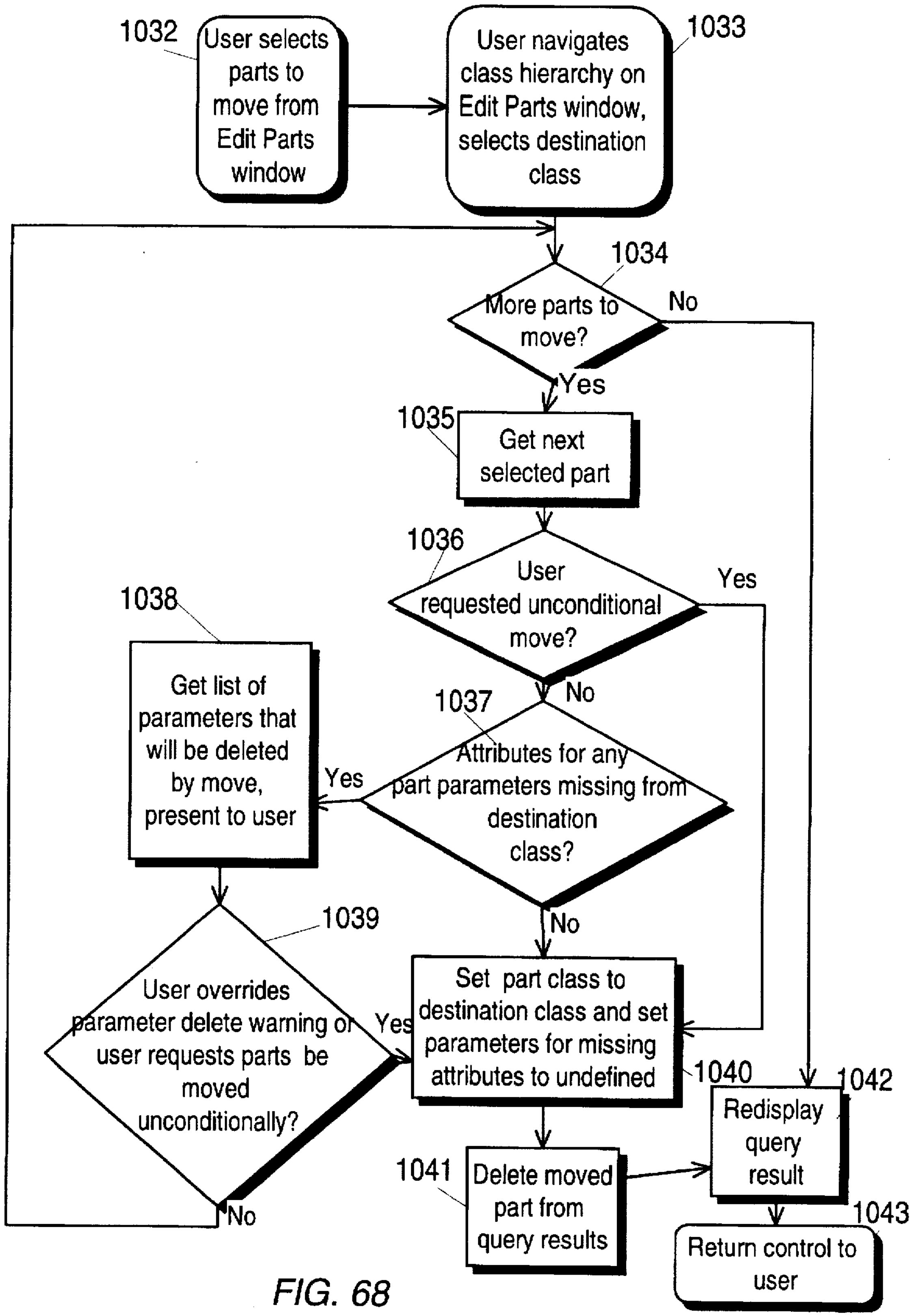
FIG. 68 is a flow chart depicting procedures followed when a user moves parts.
Figure 69:
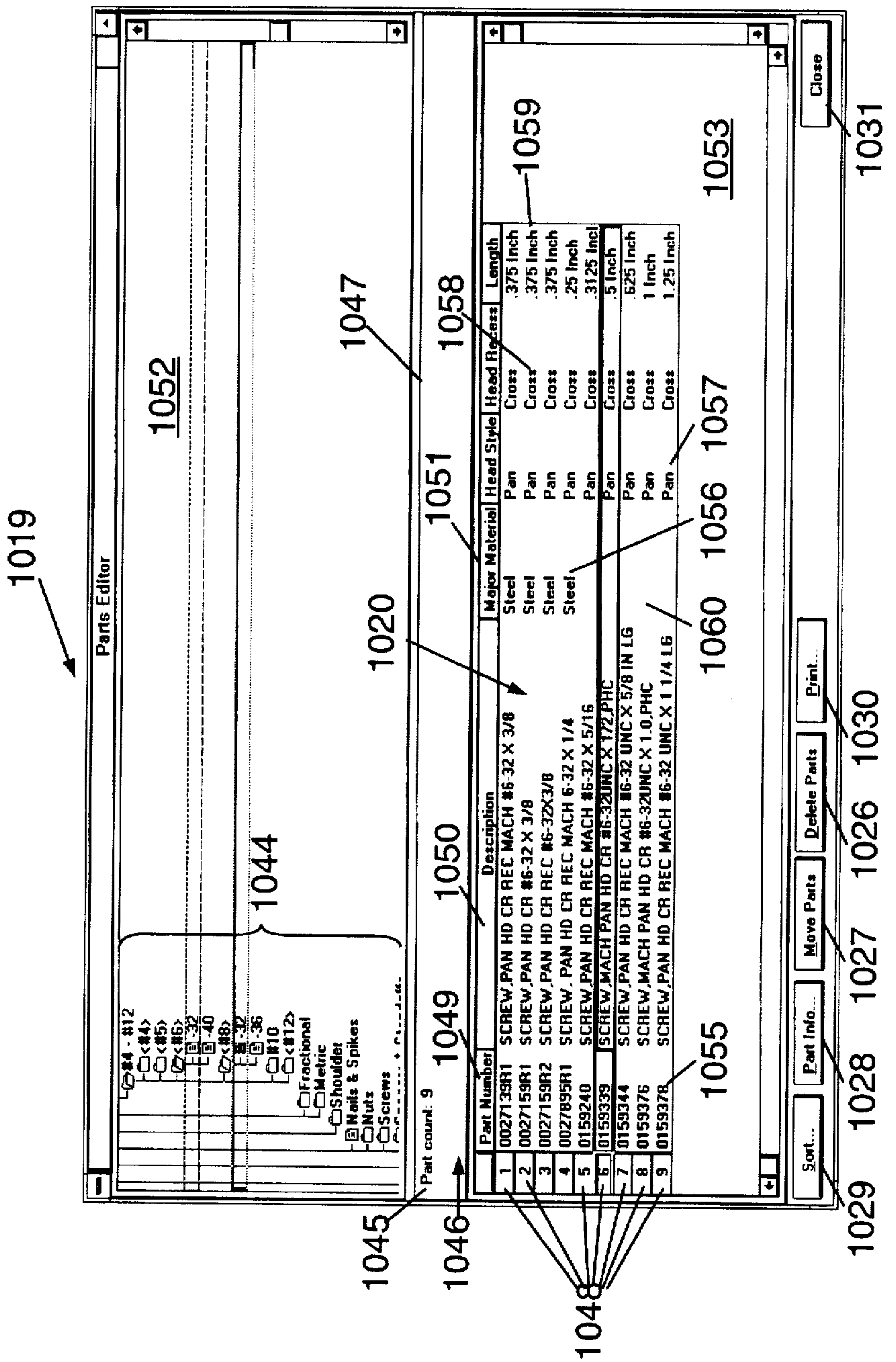
FIG. 69 depicts a display screen showing information displayed in the parts editor window.
Figure 70:
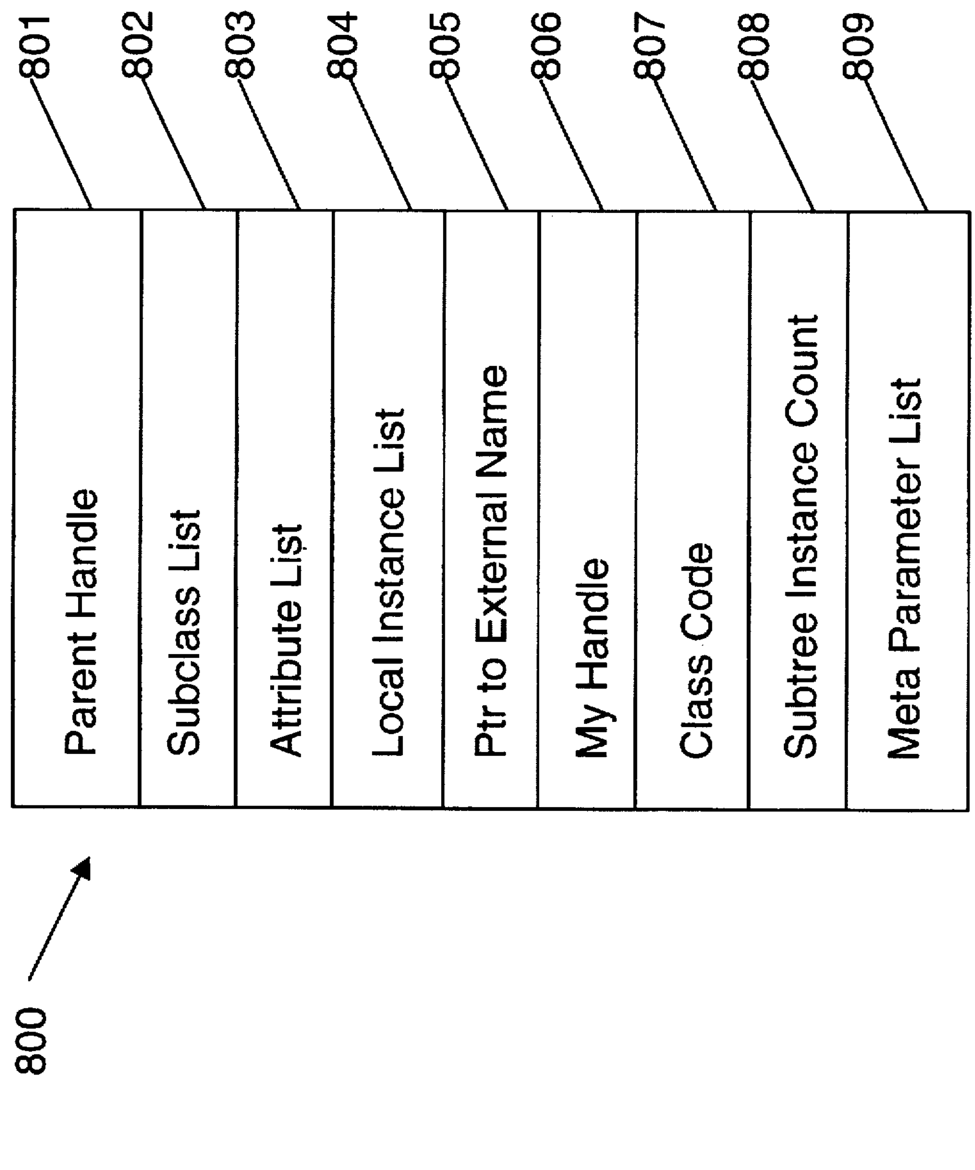
FIG. 70 shows the internal object representation for a class.
Figure 71:
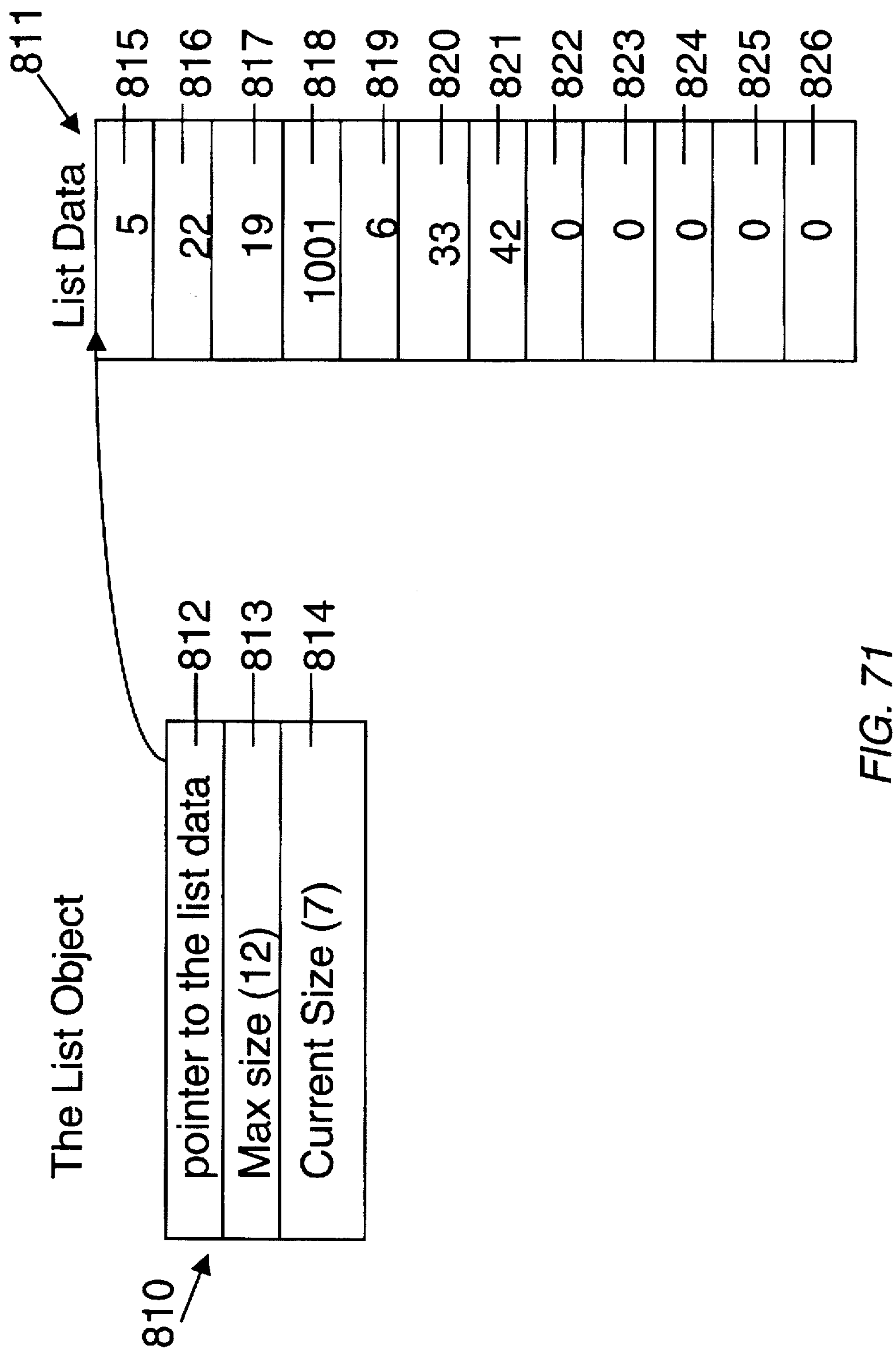
FIG. 71 depicts a generic list.
Figure 72:
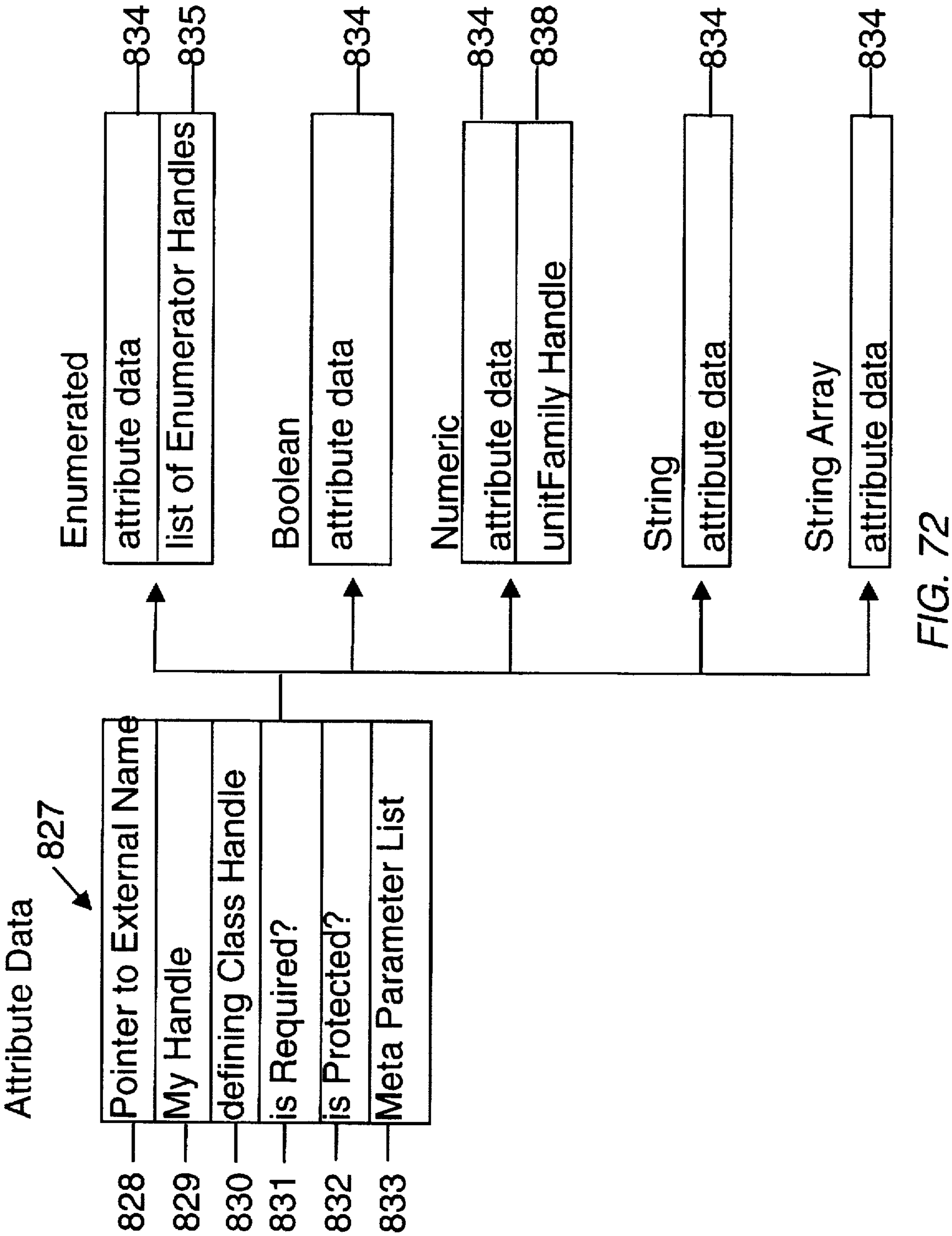
FIG. 72 illustrates the data structure for attribute data.
Figure 73:
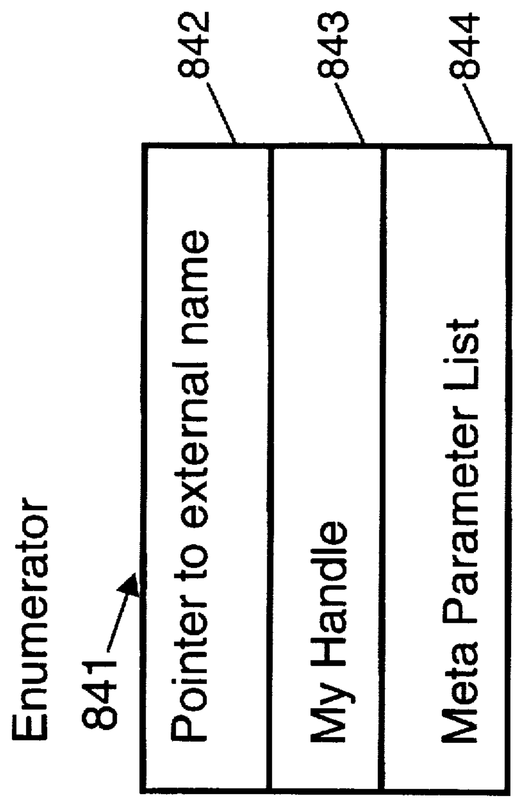
FIG. 73 illustrates the data structure for an enumerator object.
Figure 74:
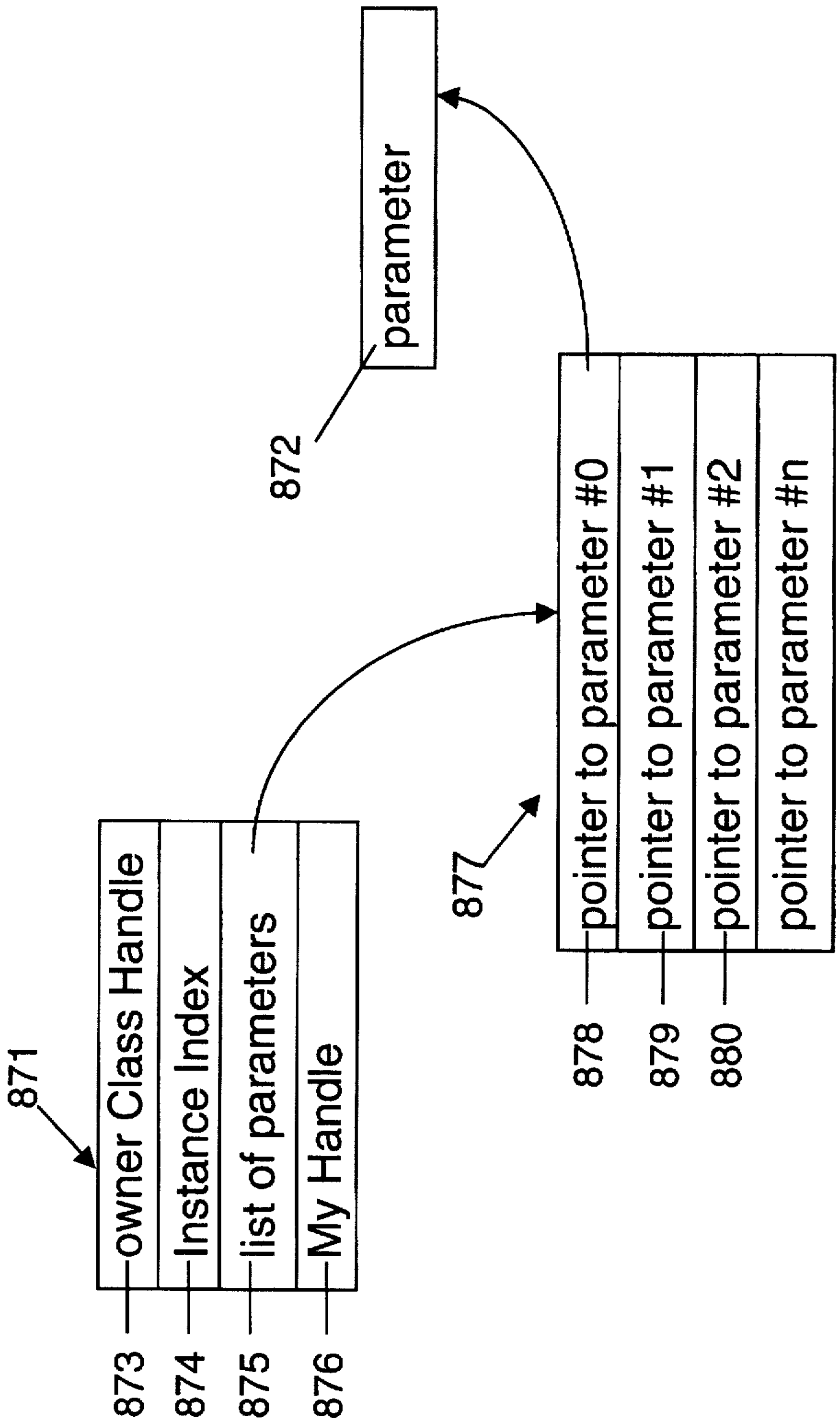
FIG. 74 depicts the data structure for an instance and associated parameters.
Figure 75:
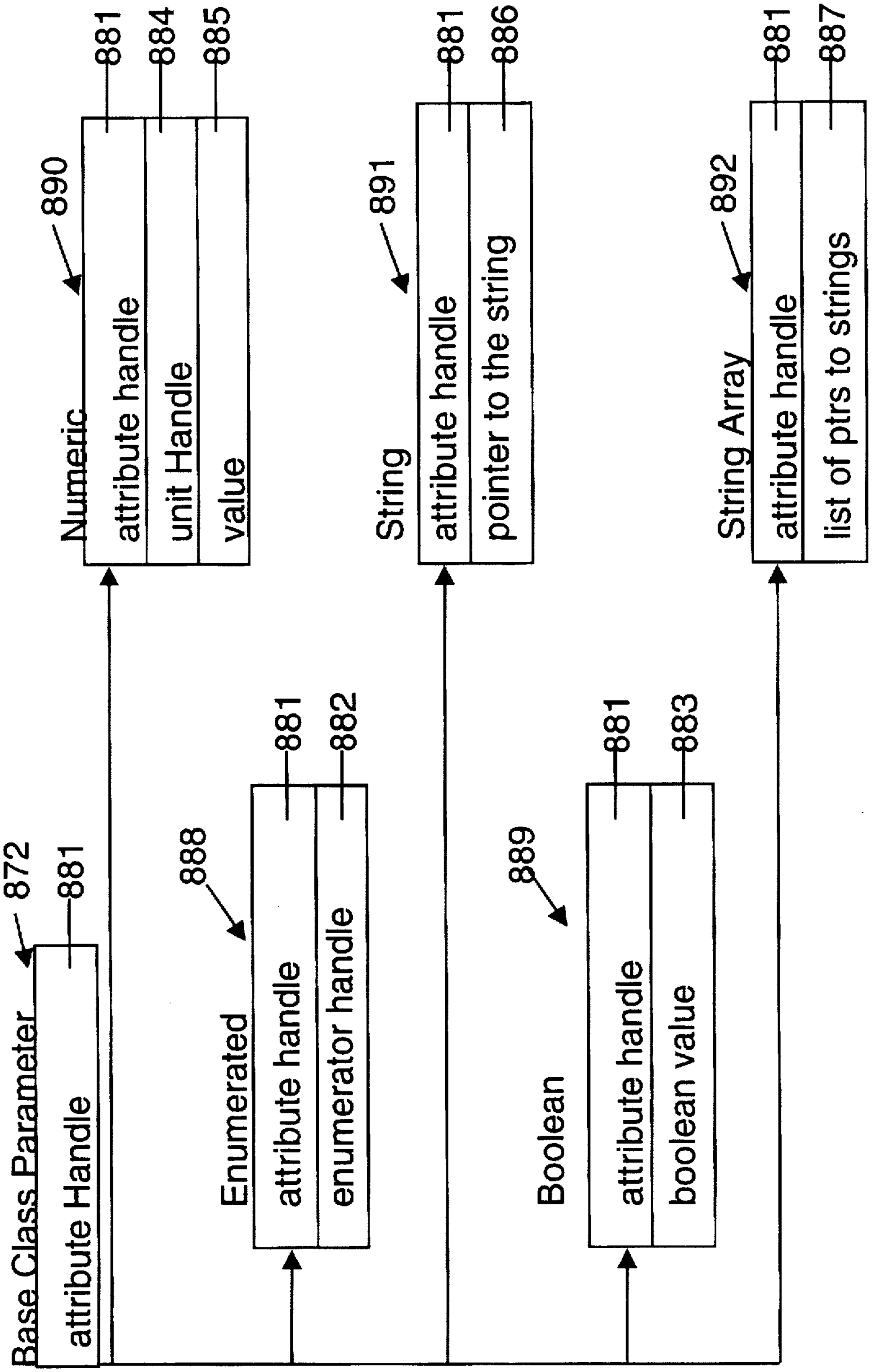
FIG. 75 depicts the data structure for a parameter.
Figure 76:
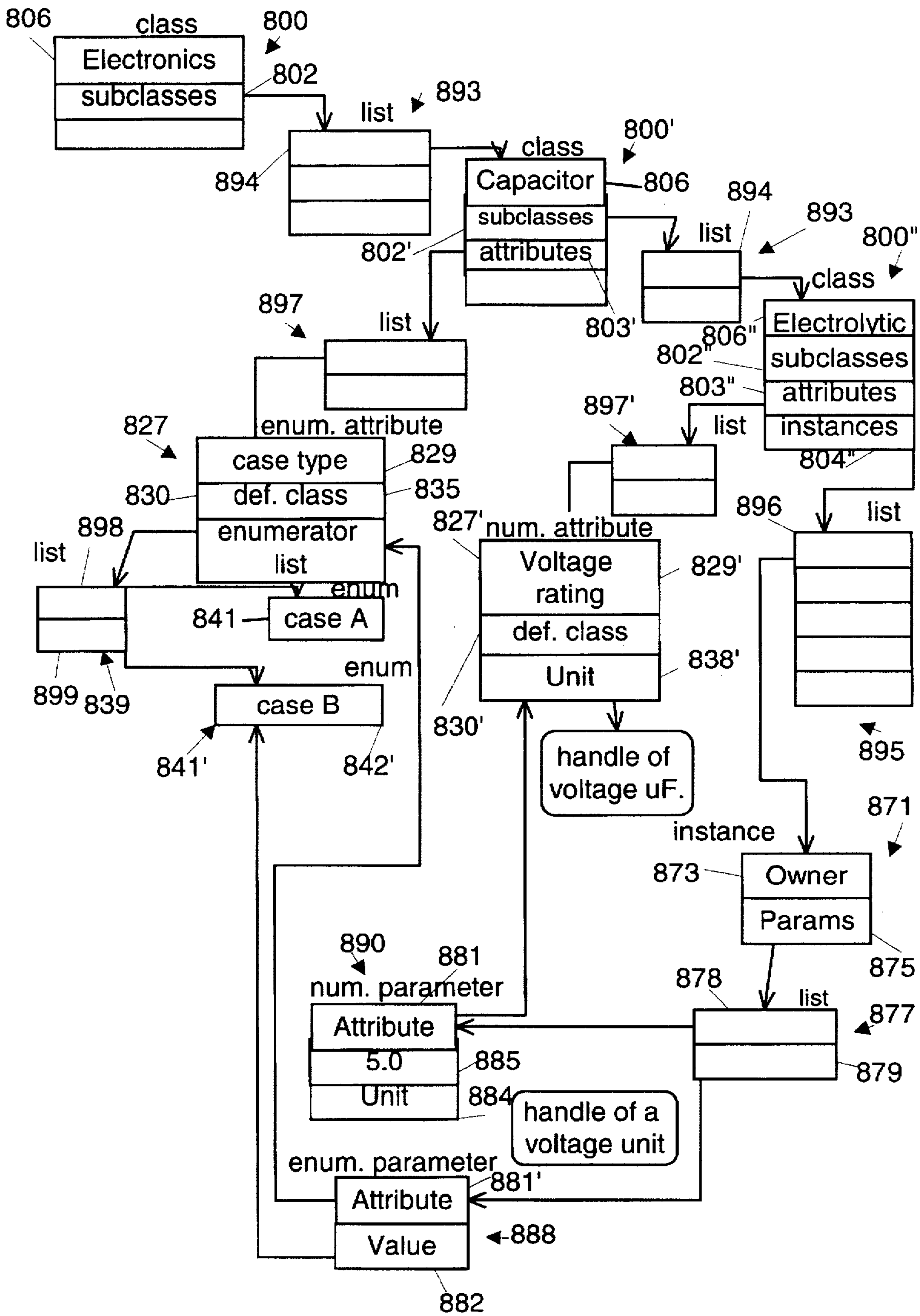
FIG. 76 is an example of a schema with instances.
Figure 77:
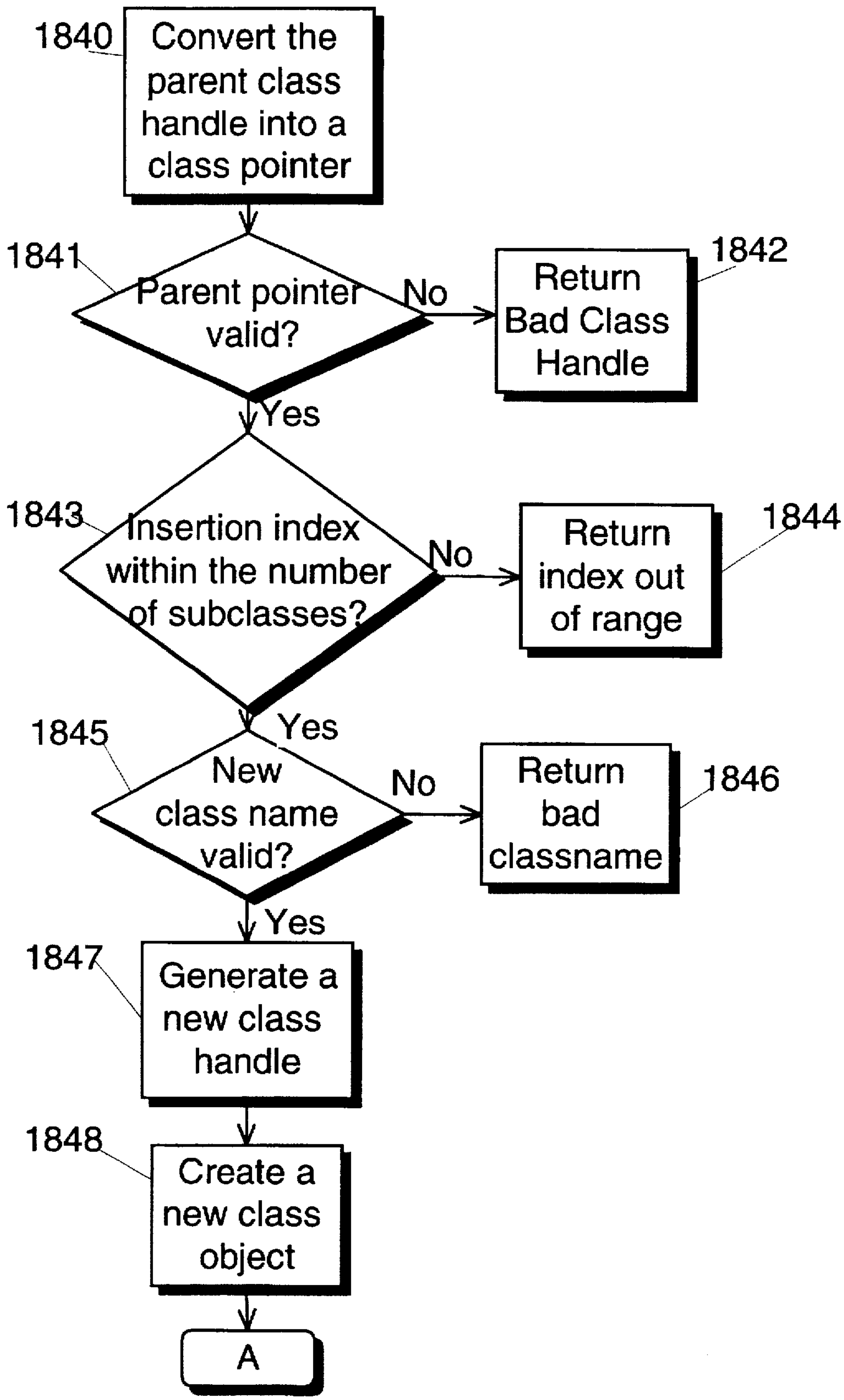
FIG. 77 is a flow chart depicting how to add a class to the schema.
Figure 78:
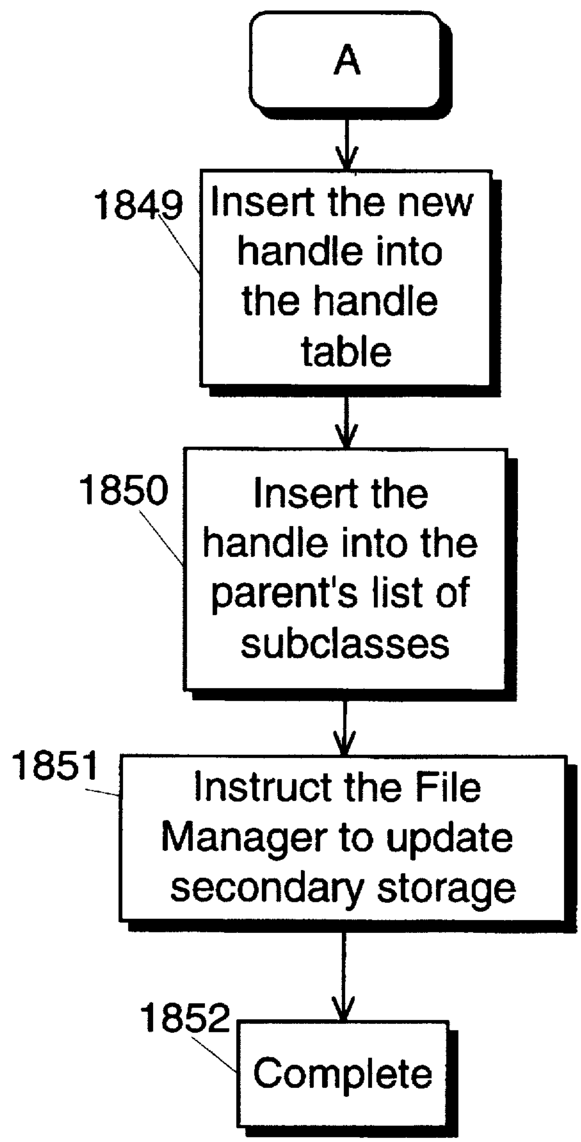
FIG. 78 is a continuation of the flow chart in FIG. 77.
Figure 79:
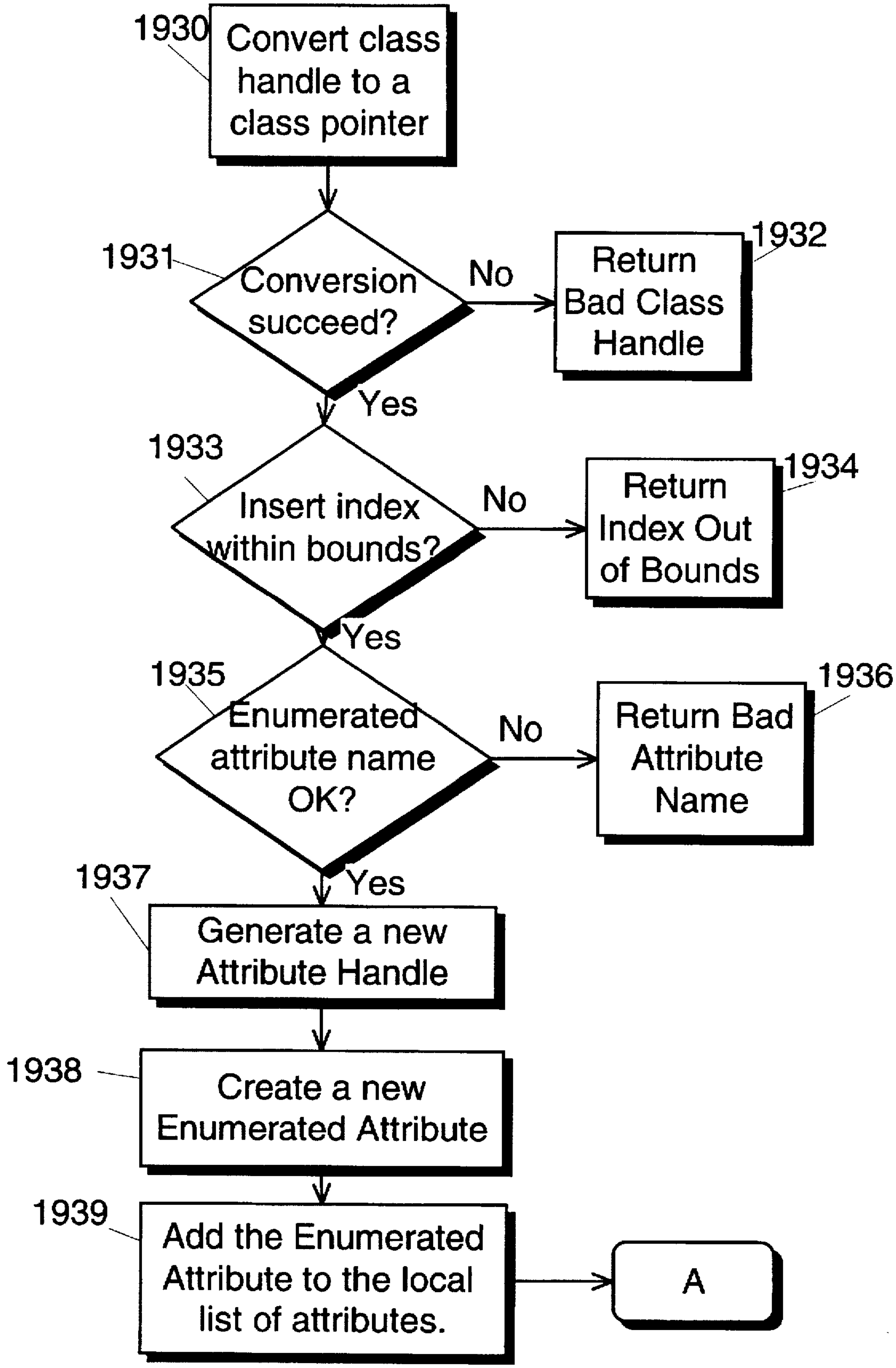
FIG. 79 is a flow chart depicting the addition of enumerated attributes.
Figure 80:
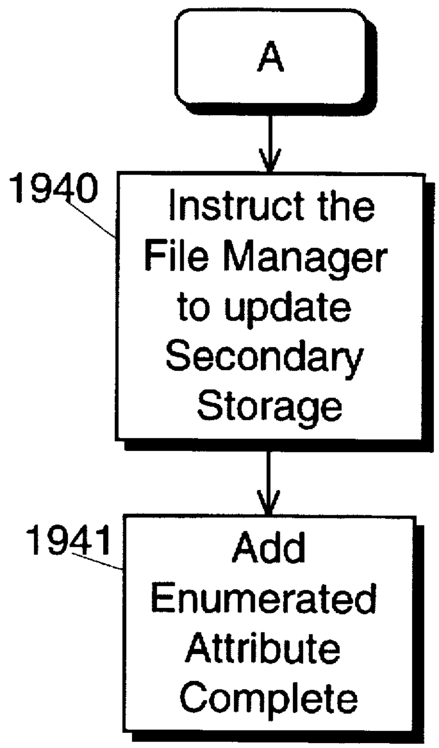
FIG. 80 is a continuation of the flow chart in FIG. 79.
Figure 89:
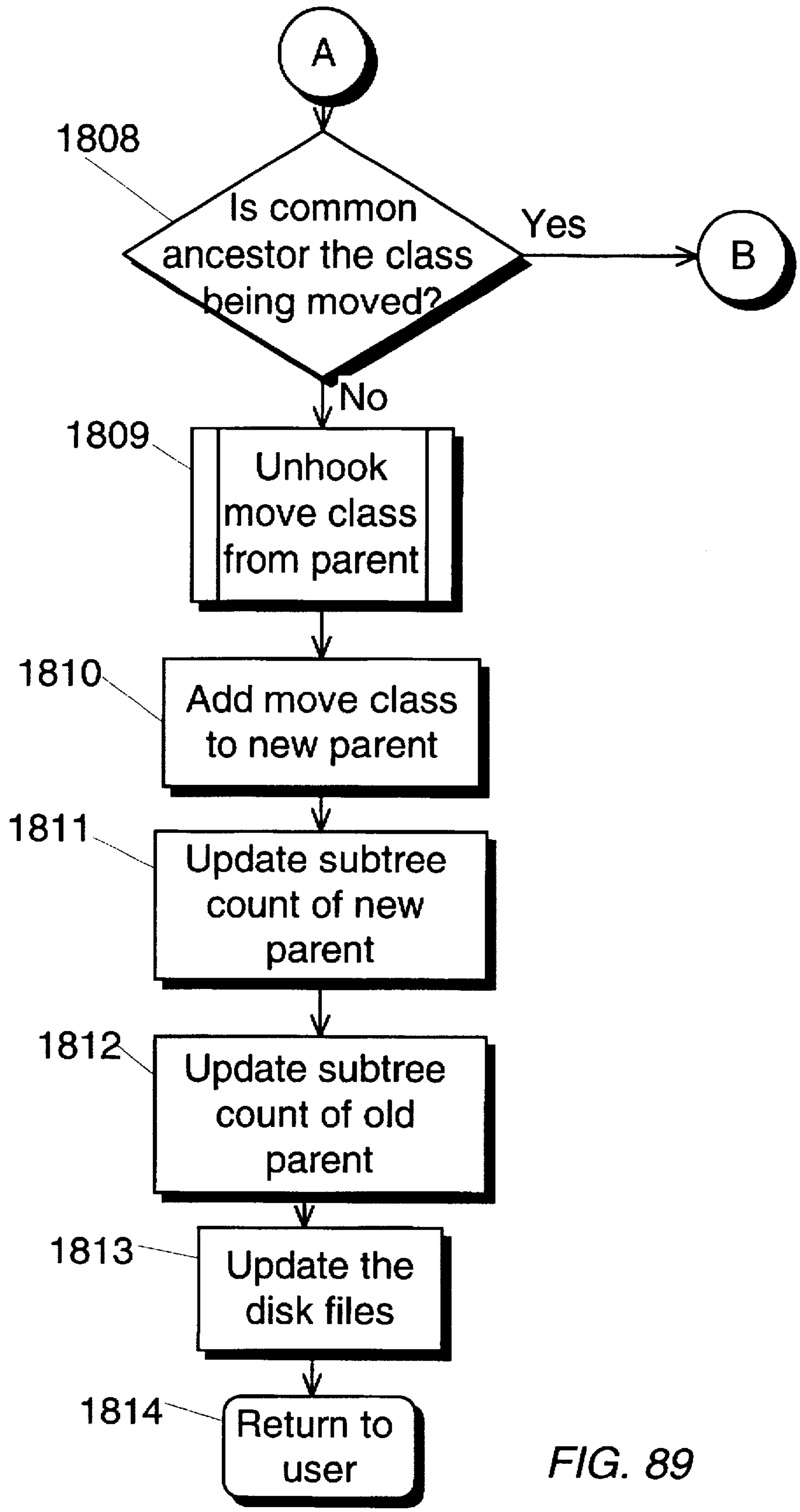
FIG. 89 is a continuation of the flow chart in FIG. 88.
Figure 90:
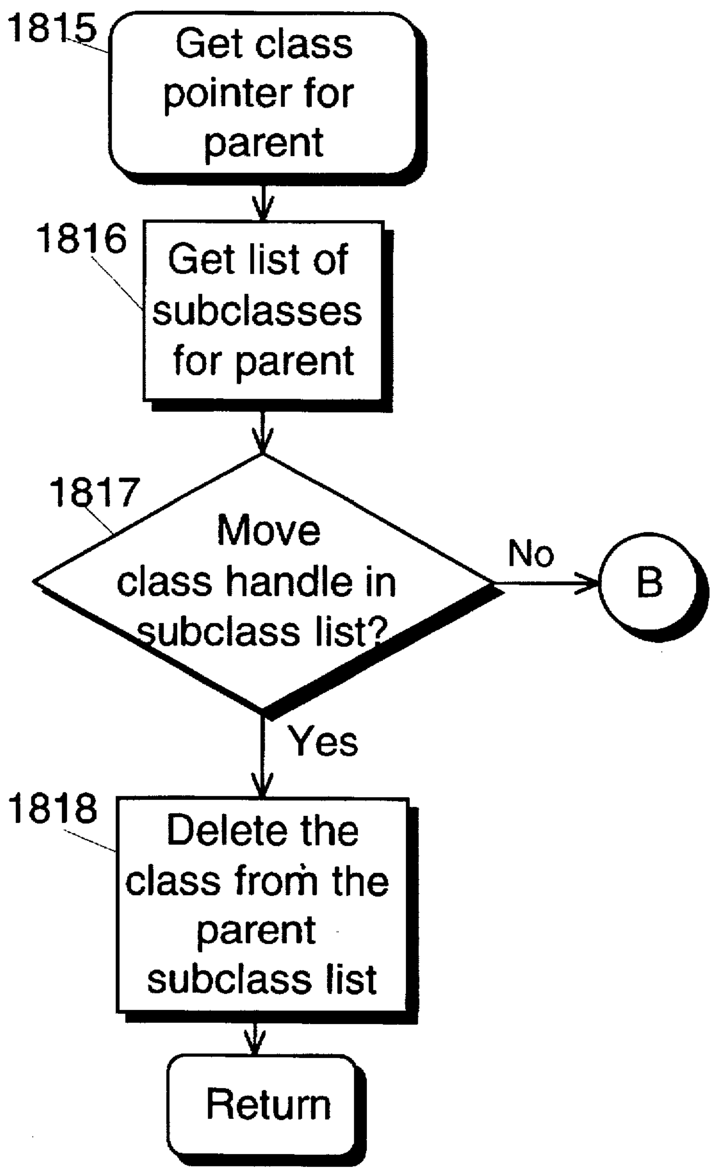
FIG. 90 is a flow chart depicting unhooking a moved class from the original parent.

FIG. 64 depicts a flow chart showing the procedure followed when a user edits parts. Referring, for example, to FIG. 63, a user who has access rights to edit parts may actuate the edit button 3180 and bring up the parts editor window 1019 shown in FIG. 89. The first step 1012 shown in FIG. 64 involves the user selection of attributes and parts to edit from the parts editor window 1019. A user may enter new or revised values 1061 for attributes 1101, and the system will accept parameter input in step 1013. If the attribute is an enumerated attribute 1101, a pull down list 1062 will be presented to the user with available choices, as shown in FIG. 90. In step 1014 of FIG. 64, a determination is made as to whether there are more parts to edit. If there are no more parts to edit, flow proceeds to step 1017. The system updates the part display 1020 and the parts editor window 1019 with edited values 1061. The system then proceeds to step 1018 and returns control to the user.

In step 1014, if more parts remain to be edited, flow proceeds to step 1015, and the system gets the next selected part. In step 1016, the system sets the next selected parts parameter to the user input value 1061. Control then loops back to step 1014.

Figure 91:
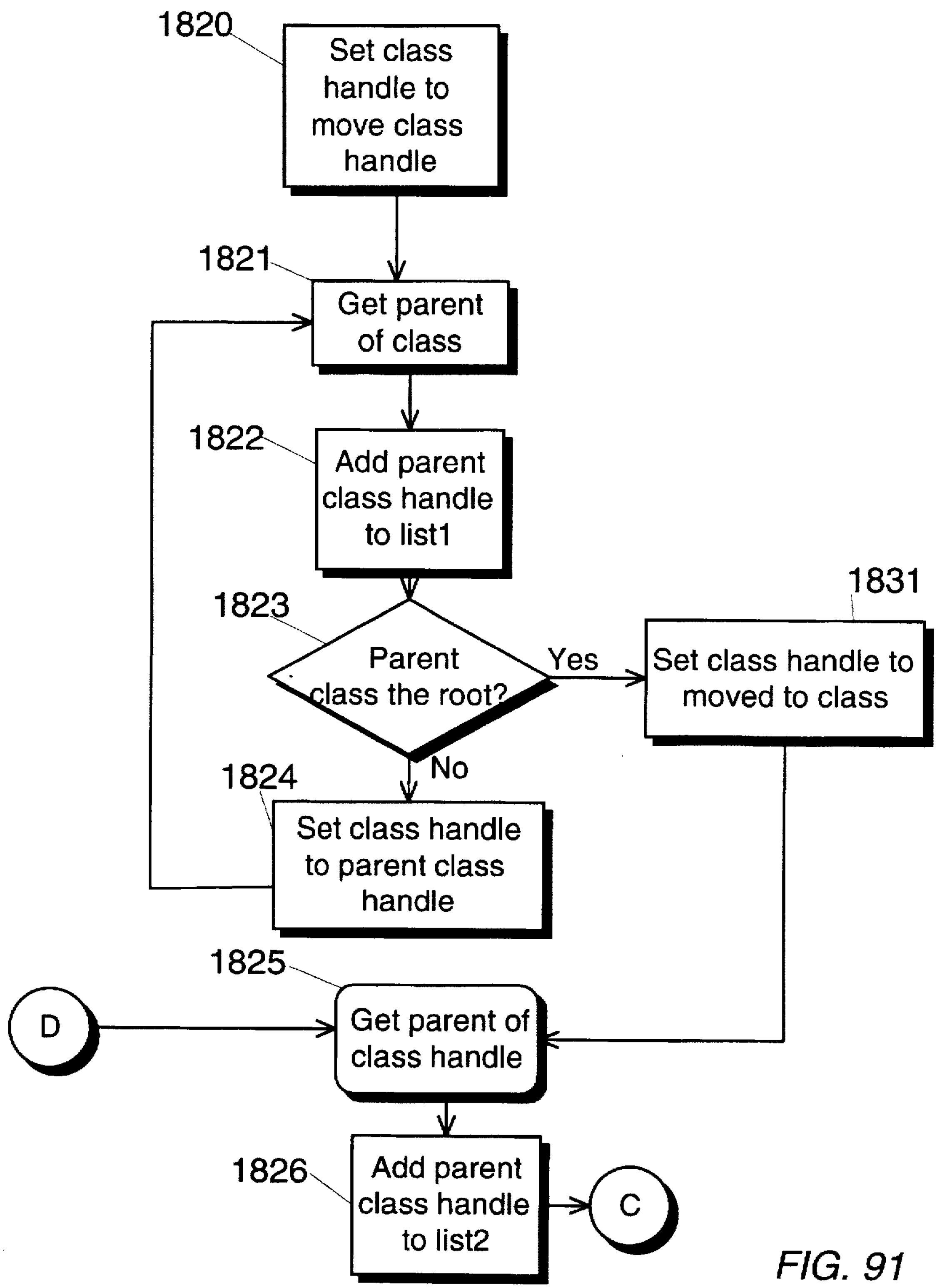
FIG. 91 is a flow chart describing the process for finding the common ancestor of the class to be moved.

FIG. 91 depicts a procedure for deleting parts. In step 1021, the user selects parts to delete from the edit parts window 1019. The user then clicks a delete parts command button 1026. In step 1022, a determination is made as to whether any more parts remain to be deleted. If the answer is yes, flow proceeds to step 1023 in which the system gets the next selected part and deletes it from the query result and the knowledge base. Flow then loops back to step 1022. When there are no more parts to delete, flow proceeds to step 1024, and the system redisplays the updated query result in the part editor window 1019. Flow then proceeds to step 1025, and control is returned to the user.

Figure 92:
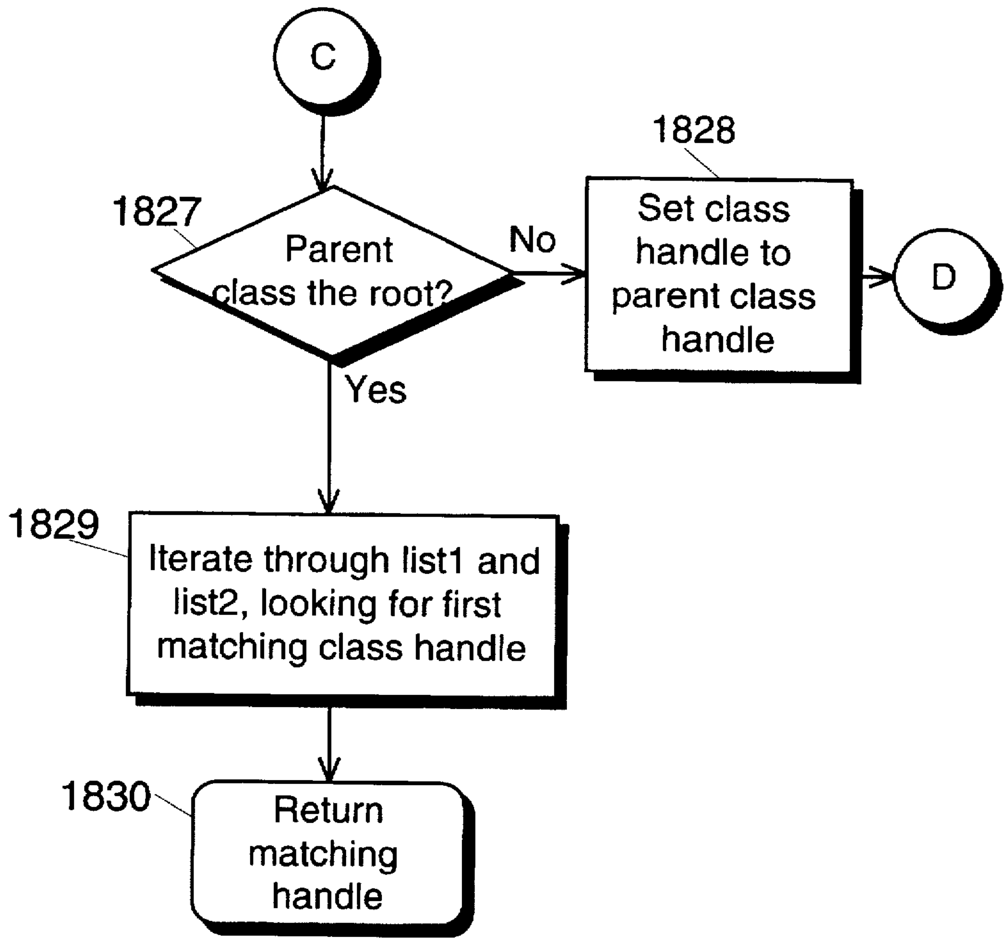
FIG. 92 is a continuation of the flow chart in FIG. 91.

FIG. 92 depicts a flow chart for a procedure for moving parts. The procedure may be initiated by the user selecting parts to move from the parts editor window 1019 as shown in step 1102. Alternatively, the user may initiate the procedure as in step 1103 by navigating the class hierarchy on the parts editor window 1019 and selecting a destination class. The user may actuate a move parts command button 1027, which is illustrated for example in FIG. 81.

Referring to FIG. 92, the procedure proceeds to step 1104 and a determination is made as to whether there are more parts to move. If there are no more parts to move, flow transfers to step 1042 and the system redisplays the query result in the parts editor window 1019. The flow then proceeds to step 1043, and control is returned to the user.

Returning to step 1104 in FIG. 92, if a determination is made that there are more parts to move, flow proceeds to step 1105 and the system gets the next selected part. In step 1106 a determination is made as to whether the user has requested an unconditional move. If the answer is yes, flow jumps to step 1040. The system then sets the part class to the destination class selected by the user. Any parameters or missing attributes are set to undefined. Flow proceeds to step 1041, and the system deletes the moved part from the query results. Flow proceeds to step 1042 where the system redisplays the query result in the parts editor window 1019.

In step 1106, if the user has not requested an unconditional move, flow proceeds to step 1107 where a determination is made as to whether attributes for any part parameters are missing from the destination class. If the answer is no, flow proceeds to step 1040 and continues as described above.

If a determination is made in step 1107 that there are attributes for part parameters which are missing from the destination class, flow transfers to step 1108. The system gets a list of parameters that will be deleted by the move and presents them to the user by displaying them on the display 116. Flow then proceeds to step 1109. If the user then overrides the warning that parameters will be deleted, or requests that the parts be moved unconditionally, flow transfers to step 1040 and proceeds as described above. If the user does not wish to override the parameter deletion warning or does not request that the parts be moved unconditionally, flow loops back to step 1104.

Figure 81:
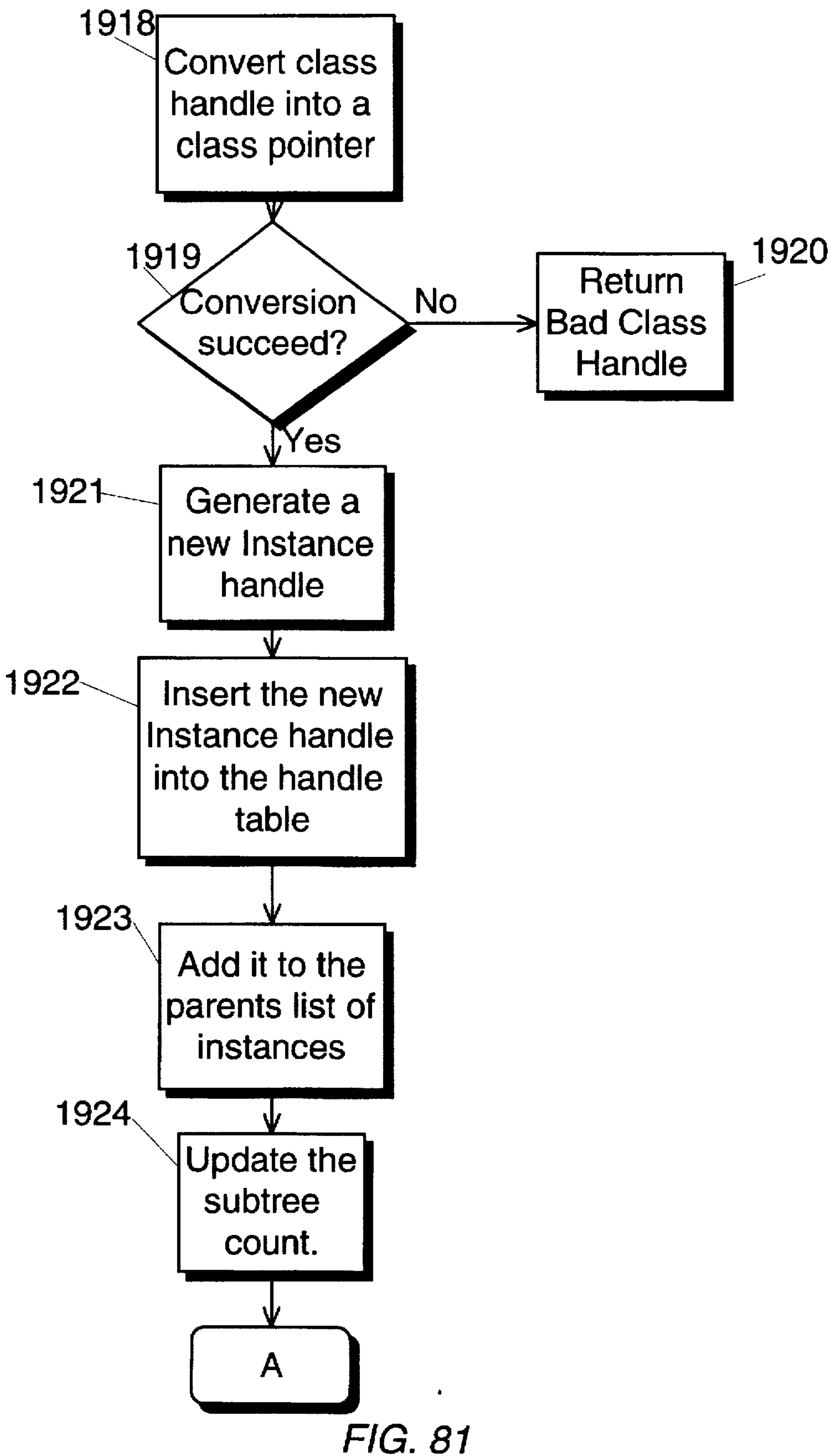
FIG. 81 is a flow chart depicting the addition of an instance.

The process of editing parts may be further understood in connection with a description of the parts editor window 1019 (shown in FIG. 81). Once the user has specified a part by selecting a class 3174 and subclasses 3196, 3197, 3198 and 3199, entered the attribute search criteria 3177, and set the display order 194, the user can edit the parts by choosing the edit command button 3180. Choosing this command 3180 causes the parts editor window 1019 to appear. The top area 1102 of the parts editor window 1019 contains the class tree 1044, showing highlighting the navigation path and class definition of the parts the user is editing. The bottom area 1103 of the window 1019 contains the parts 1020 the user has selected to edit. The parts appear in a table 1020 that is similar to tables that are used in spreadsheet applications. The part attributes 1049, 1100, 1101, etc., and attribute values 1105, 1106, 1107, etc., appear in the display order, from left to right, that the user previously established in the part specification window 3170. To use a value, the user clicks an enter box 1063. To cancel a new value, the user clicks a cancel box 1064.

The top area 1102 of the parts editor window 1019 contains the class definition 1044, which comprises the class tree showing the navigation path and class definition of the parts selected for editing. The window 1019 has a horizontal split bar 1047 that splits the window into two sections 1102 and 1103. The user can move the split bar 1047 up or down so the user can see more of one section 1102 or the other 1103. The parts editor window 1019 includes an area referred to as the editing area 1046. After selecting an attribute value 1101, a text box or list box 1104 appears in this editing area 1046 so the user can make changes (see FIG. 89). Each part appears as a row 1048 in the table 1020, and each row 1048 of the table 1020 is numbered. The user may use the row number to select a part that the user needs information on or that the user wants to move or delete. The attributes 1049, 1100, 1101, etc., are the column headings, and the attribute values are the rows.

After determining that the user is going to enter a new part in the knowledge base, the user must fully specify the part. In a preferred embodiment, a complete part specification is defined as selecting the class up to the leaf class 3201 and entering values for all the required attributes 3203. In a preferred embodiment, if the user does not select a leaf class 3201 or enter the required attributes 3203, the user cannot add the part. When making parts, a preferred procedure is for the user to enter as many attribute values 3203 as the user can in order to give the part as complete a specification as possible.

Some attributes are required before a part can be added. Before choosing the make command 3181, the user must enter an attribute value for each required attribute. In addition, a user cannot enter any attribute values for protected attributes. Protected attributes have a protected icon 3191 immediately to the left of the attribute icon. Once the user has selected the leaf class 3201 and entered all required attributes, the user can choose the make command button 3181. Choosing the make command 3181 causes the part to be added to the user's knowledge base and the parts found 3172 to be updated to show a part count of 1.

The knowledge base client 131 is a set of C++ libraries that provide knowledge base services to a client application 130, 133, and 144 through the API 143. The services may be either local or result in remote procedure calls to the knowledge base server 132. For client applications which run under Windows, the knowledge base client consists of one or more Windows Dynamic Link Libraries (DLL) which use the WinSock DLL to provide network access to the knowledge base server 132 and the registry server 141.

The knowledge base server 132 is a UNIX server process that manages knowledge base 110 access, retrieval and updates. A knowledge base server 132 may manage one or more knowledge bases 110 and 110.

The dynamic class manager 134 is a software subsystem in the knowledge base server 132 that manages schema and data. The dynamic class manager 134 provides the ability to store class, attribute, unit and instance information that can be modified dynamically. The dynamic class manager 134 consists of C++ libraries and classes and provides operations for "legacizing" and for accessing, creating, deleting, and modifying classes, attributes, instances, parameters, unit families, units and meta-attributes at run-time.

The capabilities of the dynamic class manager 134 are accessed by a user programmer through a set of functions provided by the API 143.

The dynamic class manager 134 knowledge base, hereafter sometimes referred to as "the knowledge base," is a collection of classes, attributes, units, instances with parameter values, and relationships among these objects. In the dynamic class manager 134, a class defines a separate type of object. Classes have defined attributes. The attributes have some type, and serve to define the characteristics of an object. A class can be derived from another class. In this case, the class inherits attributes from its ancestors. A knowledge base contains instances of classes. The attribute values defined by an instance are parameters.

Another way to describe the concept of classes, attributes, instances, and parameters is to use a dog as an example. The word "dog" is the analog of a class. Dog describes a group of similar things that have a set of characteristics, or attributes. The attributes of a dog are things like color, breed, and name. The class and attributes do not describe any particular dog, but provide the facility to describe one. An instance of a dog has parameters that give values to the attributes: for example, a dog whose color is beige, of the breed golden retriever, and whose name is Sandy.

Classes can have relationships. The class "dog" is part of the larger class, "mammal". The class "mammal" is less specific than "dog". It conveys less information about the object "dog", but everything about "mammal" also applies to "dog". "Dog" is clearly a subset of "mammal", and this relationship is a subclass. "Dog" is a subclass of the class "mammal". The subclass "dog" could be further subclassed into classes like big "dogs", little "dogs", etc. The concept subclass implies a parent relationship between the two classes. "Mammal" is a parent and "dog" is a subclass. The terminology "'dog' is derived from 'mammal'" is also used to describe the relationship.

The subclass "dog" inherits attributes from its parent class. The attribute color could be part of the "mammal" class, since all "mammals" have a color. The "dog" class inherits the attribute color from its parent.

The root class is special, it has no parent. It is the class from which all classes begin their derivation. In illustrations set forth herein, graphs have been drawn to illustrate a class hierarchy, and the root class is placed at the top of those drawings. Subclasses branch out from the root class into ever widening paths that make the graph look like an upside down tree. The entire group of classes is a tree, and the special class that has no parent, though it is at the top, is the root.

One of the available attribute types supported by the dynamic class manager 134 is a numeric type. Numeric attributes are used to describe measurable quantities in the real world. Such measurements do not consist of just a numeric value; they also have some associated units. The dynamic class manager 134, in conjunction with the units manager 138, maintains information about different types of units that can be used with numeric attributes. The dynamic class manager 134 (using the units manager 138) can also perform conversions among units where such conversion makes sense. The units that the system understands are grouped into various unit families. These unit families and the units they define, can be changed at run time. The dynamic class manager 134 also comprises a dynamic units manager 138.

The word "schema" refers to the layout of classes, attributes, units, and unit families. A knowledge base with no instances is a schema. This may be better understood in connection with the following more detailed description of the various objects managed by the dynamic class manager 134.

A class is the most fundamental object in the schema in accordance with the present invention. A class is a collection of related objects. In the present example, a class may have eight or nine components. A class is a schema object. As explained above, the schema is the collection of classes, attributes, units, and unit families and their relationships. Every class has exactly one parent from which it is derived, except for the root class 3173. The root class 3173 is the one class that has no parent. The root class 3173 has another special characteristic in that it can never be deleted. The consequence of a class being derived from its parent means that the class has all of the properties of its parent. These properties are referred to as attributes. Attributes are inherited from the parent class.

A class may have zero or more subclasses. A class is a parent of each of its subclasses. A subclass is a class that has a parent, so the root class 3173 is not a subclass. The subclasses of a parent class have some defined order. The order is persistent, meaning that the dynamic class manager 134 preserves the order even across closes and reopens of the knowledge base.

A class has a set of descendants that is comprised of all of its subclasses, all of the subclasses' subclasses, and so on. A class that has zero subclasses or an empty set of descendants is called a leaf class 3201. A subtree is the set composed of a class and all of its descendants. The subtree is said to be rooted at the class. A subclass also has a set of ancestors, which is the set composed of the parent, its parent's parent, and so on including the root class 3173. Classes that have the same parent are sometimes referred to as siblings.

Following a subclass to its parent is sometimes referred to as going up the tree. Moving from a parent to one of its subclasses is sometimes referred to as going down the tree. Therefore, the root class 3173 of the schema is the furthest up at the top of the tree, and the objects furthest down at the bottom of the tree are typically leaf classes 3201.

Figure 61:
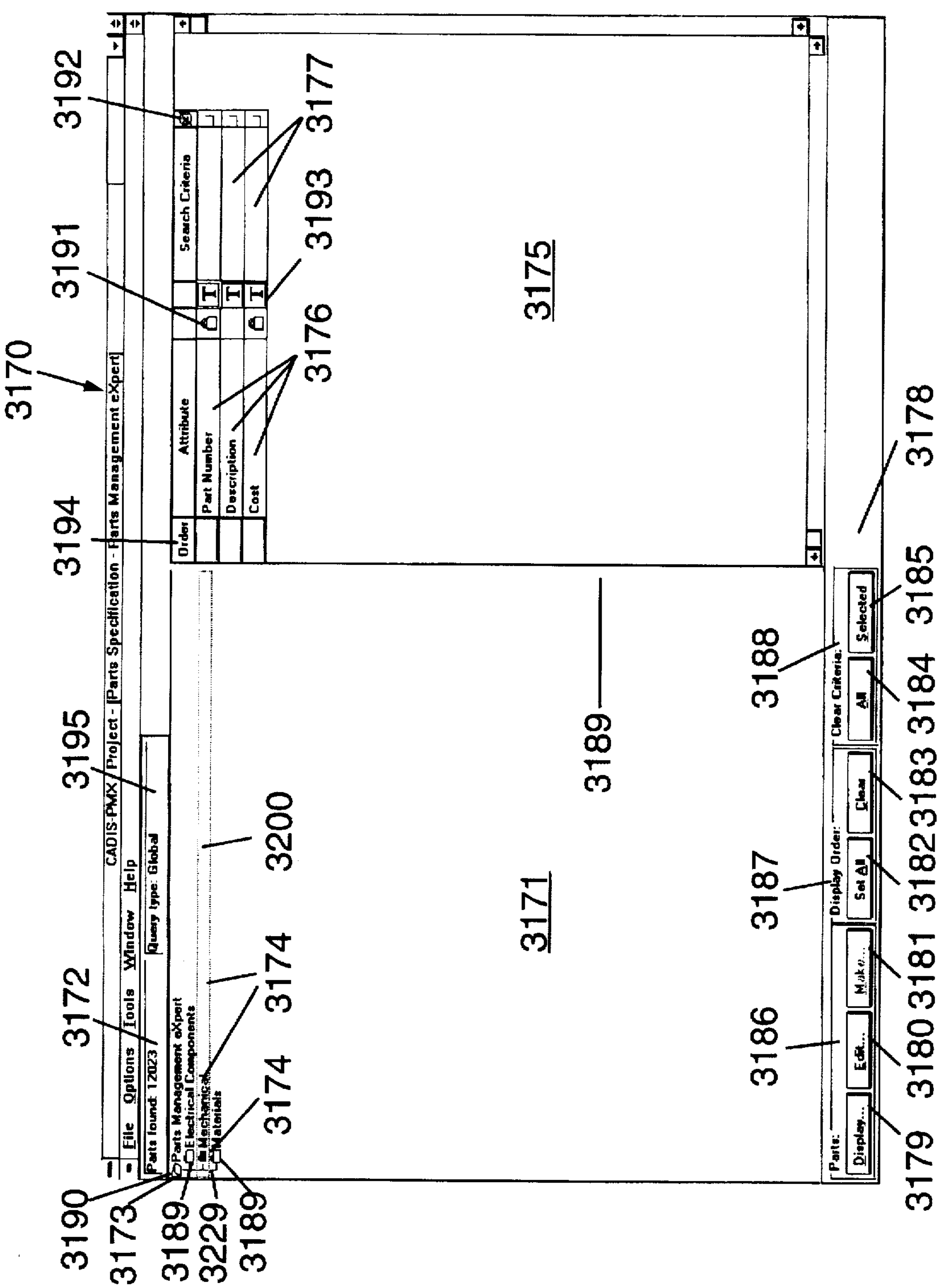
FIG. 61 depicts an initial display screen showing the part specification window.
Figure 62:
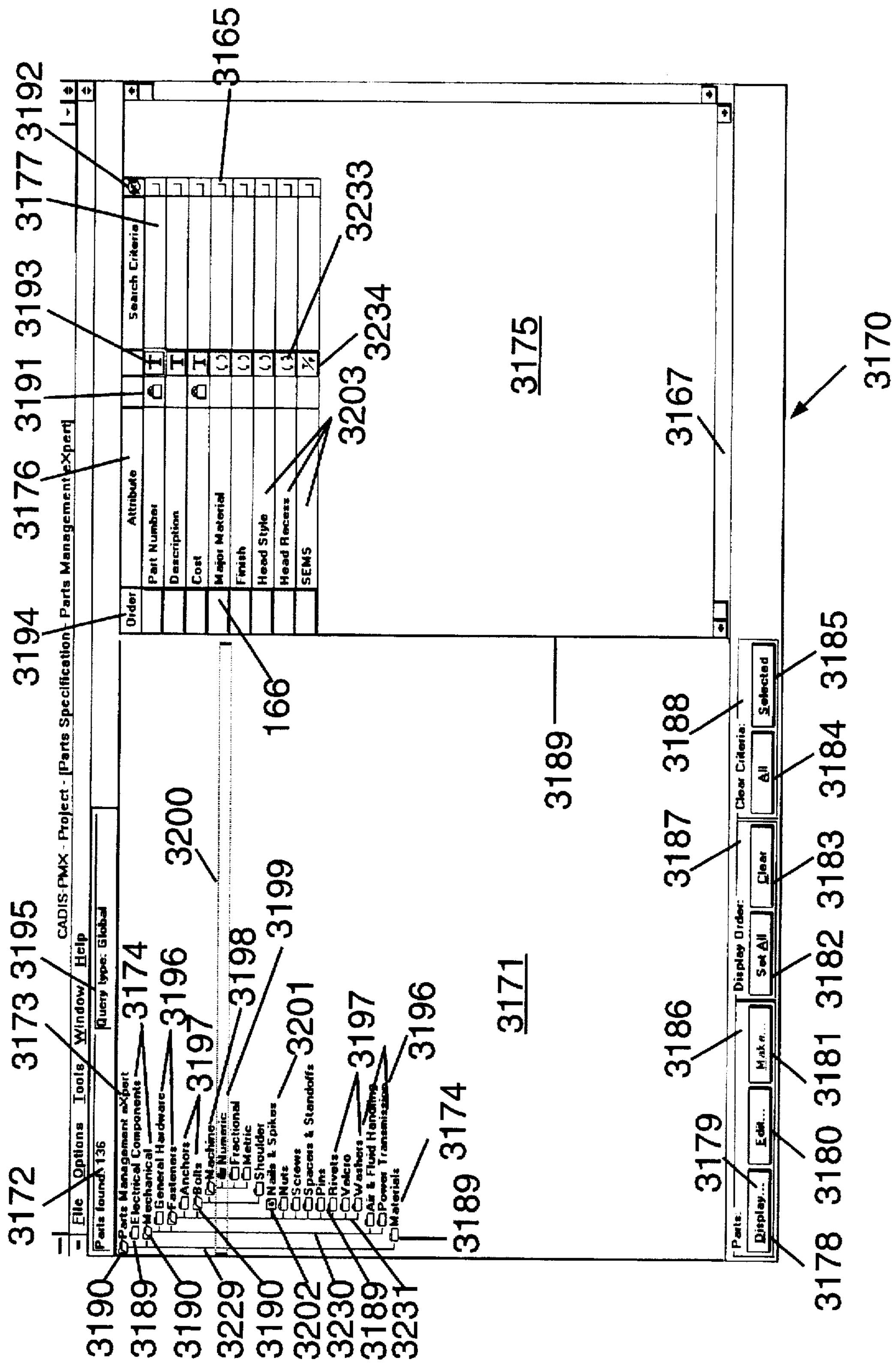
FIG. 62 depicts an example of the part specification window during a search.

A class has a name which is the text identifying a class, subclass, or leaf class, and is an ASCII character string. The present invention uses class handles for references to a class, which are further described in connection with the operation of the handle manager 3137. In the example shown in FIG. 61, there are three subclasses.

Figure 82:
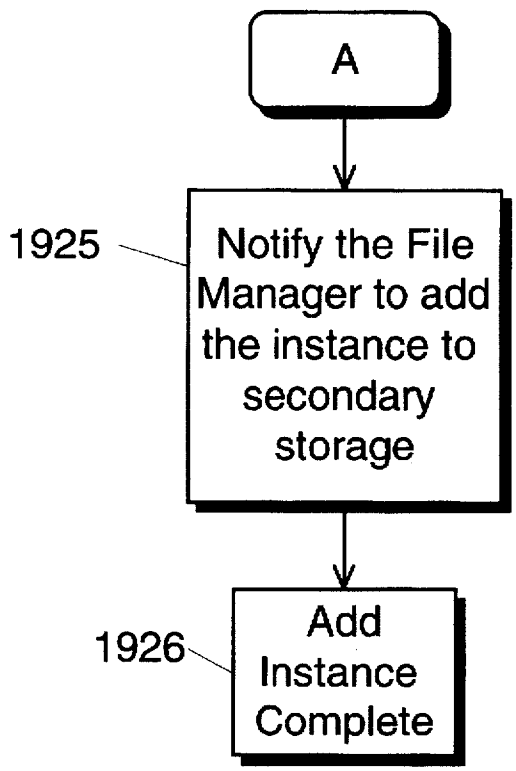
FIG. 82 is a continuation of the flow chart in FIG. 81.

FIG. 82 shows the internal object representation for a class 800. In the present schema, a class has a parent handle 801. Every class object 800 includes stored information representing the handle of its parent class, except in the special case of the root class 3173, which has no parent. A null is stored in this location in that case. A handle is a reference to an object. The parent handle information 801 is used by the handle manager 3137 to identify the stored class object which is the parent class for the class 800.

The class object 800 includes a subclass list 802. The subclass list 802 is an array of handles which may be used by the handle manager 3137 to identify those class objects which are subclasses of the class 800. In the internal representation provided in the present invention, lists can grow without bounds and are dynamic. The storage space available is not fixed.

This provides flexibility and power to the database structure, because the class object 800 may have an extremely large number of subclasses in a large database without substantial degradation in performance.

The class object 800 includes an attribute list 803. The attribute list 803 is a list of handles. The handle manager 3137 may use the information stored in the attribute list 110 to identify the attributes possessed by class object 800.

The class object 800 also includes a local instance list 804, which is a handle list. Field 805 shown in FIG. 82 is a pointer to storage location of the class name, i.e., the text identifying the class.

Field 806 is used to store the handle for the class 800. The field 807 stores an indication of the class code, i.e., whether it is primary, secondary, or a collection.

The class object 800 also includes a subtree instance count 808. The subtree instance count 808 is a numeric indication of the total number of items or instances present in all of the descendants of the class 800 i.e., the total number of instances in class 800, all of the class 800's subclasses, all of the subclasses' subclasses, and so on. Thus, when a user is navigating through the tree structure of a knowledge base, as a user selects and opens subclasses, the user can be immediately informed of the number of parts found at any location on the tree by retrieving the subtree instance count 808 for the current class and passing that information to the retriever 130. The subtree instance count 808 is kept up to date whenever the knowledge base is modified, so it is not necessary while a user is navigating through the tree structure of the database to perform a real time computation of parts found 3172.

Referring again to FIG. 82, the class object 800 also preferably includes a metaparameter list 809. The metaparameter list 809 is a string list, and may be used as a pointer to strings containing linking information, for example, the name of a file that contains a graphical display of the type of parts represented by the class 800, thesaurus information used for legacizing data, or other legacizing information.

Figure 83:
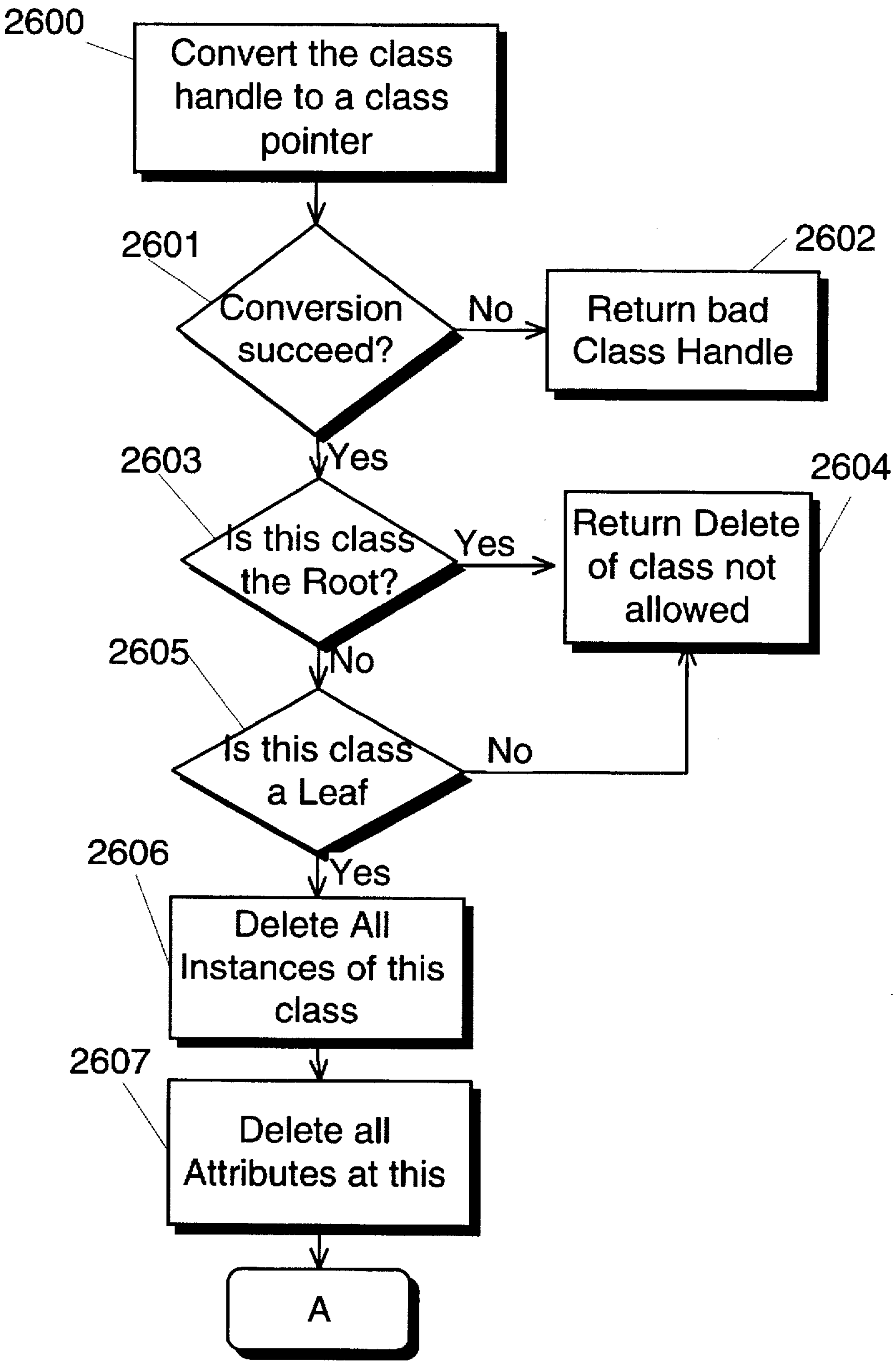
FIG. 83 is a flow chart depicting the deletion of a class.

FIG. 83 depicts an example of a generic list 810. The class manager 134 uses lists of handles, lists of floating point values, lists of pointers to character strings, etc. whenever a variable amount of data can be associated with an object. Examples of lists would be items 802, 803, 804 and 809. The list 810 depicts a list of simple integers.

A list object 810 includes a pointer 812 which points to the beginning 815 of the list data 811. A list object 810 also includes a field 813 indicating the currently allocated size for the list data 811. The list object 810 also includes a field 814 containing information indicating the amount of list data 811 currently in use.

The list data 811 contains the actual list of values. The first item 815 in the list in this example contains the value "5". Similarly, in this example list items 816, 817, 819, 820 and 821 contain additional values. List items 822, 823, 824, 825 and 826 in this example are not currently in use and are set to zero. In this illustrated example, the currently allocated size 813 of the list is twelve. The amount in use 814 of the list is seven, meaning that the first seven items in the list are valid.

Figure 84:
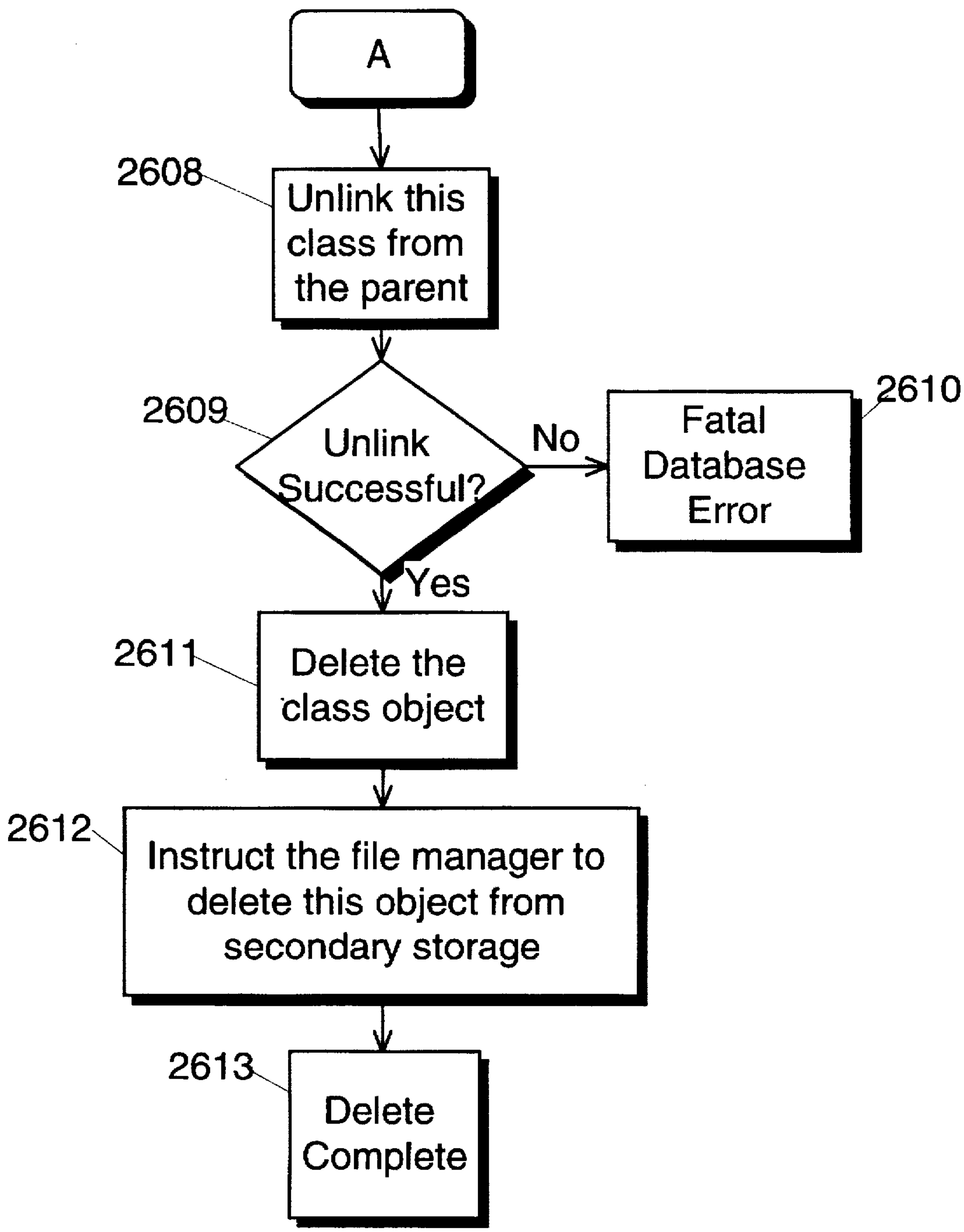
FIG. 84 is a continuation of the flow chart in FIG. 83.

FIG. 84 illustrates the data structure for attribute data 827. An attribute object 827 contains at least six fields in the illustrated embodiment. A first field 828 contains a pointer to an external name comprising an ASCII character string that is the name for the attribute. The attribute object 827 also contains a field 829 containing the handle for this attribute object 827. The attribute object 827 also contains a field 830 which contains the handle of the class that defines this attribute 827. The fourth field 831 is a Boolean indication of whether this attribute is a required attribute for the defining class. A fifth field 832 contains a Boolean field indicating whether this attribute is protected. This is indicated by the protected icon 3191. In the data structure of the attribute object 827 shown in FIG. 84, this information is stored in field 832. The attribute object 827 also contains a field 833 which is a metaparameter list.

Enumerated attributes include fields 828–833, indicated collectively as attribute data 834, plus a field 835 which is a list of enumerator handles.

In the case of a Boolean attribute, only fields 828–833 are used, which are again indicated collectively in FIG. 84 as attribute data 834.

Numeric attributes include fields 828–833, indicated collectively as attribute data 834, plus a field 838 which contains the handle of the unit family for this numeric attribute.

In the case of a string attribute, and in the case of a string array attribute, only the attribute data 834 comprising fields 828–833 is included.

One example of the use of these data structures by the dynamic class manager 134 is the procedure of a user selecting a class by clicking on the closed folder icon 3189 associated with the class. When a class is opened, the dynamic class manager 134 will check the class object 800 and retrieve the attribute list 803. The handles stored in the attribute list 803 will be passed to the handle manager 3137. The handle manager 3137 will return the virtual memory address for each attribute 827 of the class. The dynamic class manager 134 may then use the pointer 828 to the external name of an attribute object 827 to retrieve the character string text for the external name for the attribute. That ASCII text information can then be passed through the API 143 so that it may eventually be provided to the retriever 130 for display to a user on the display 116.

Figure 85:
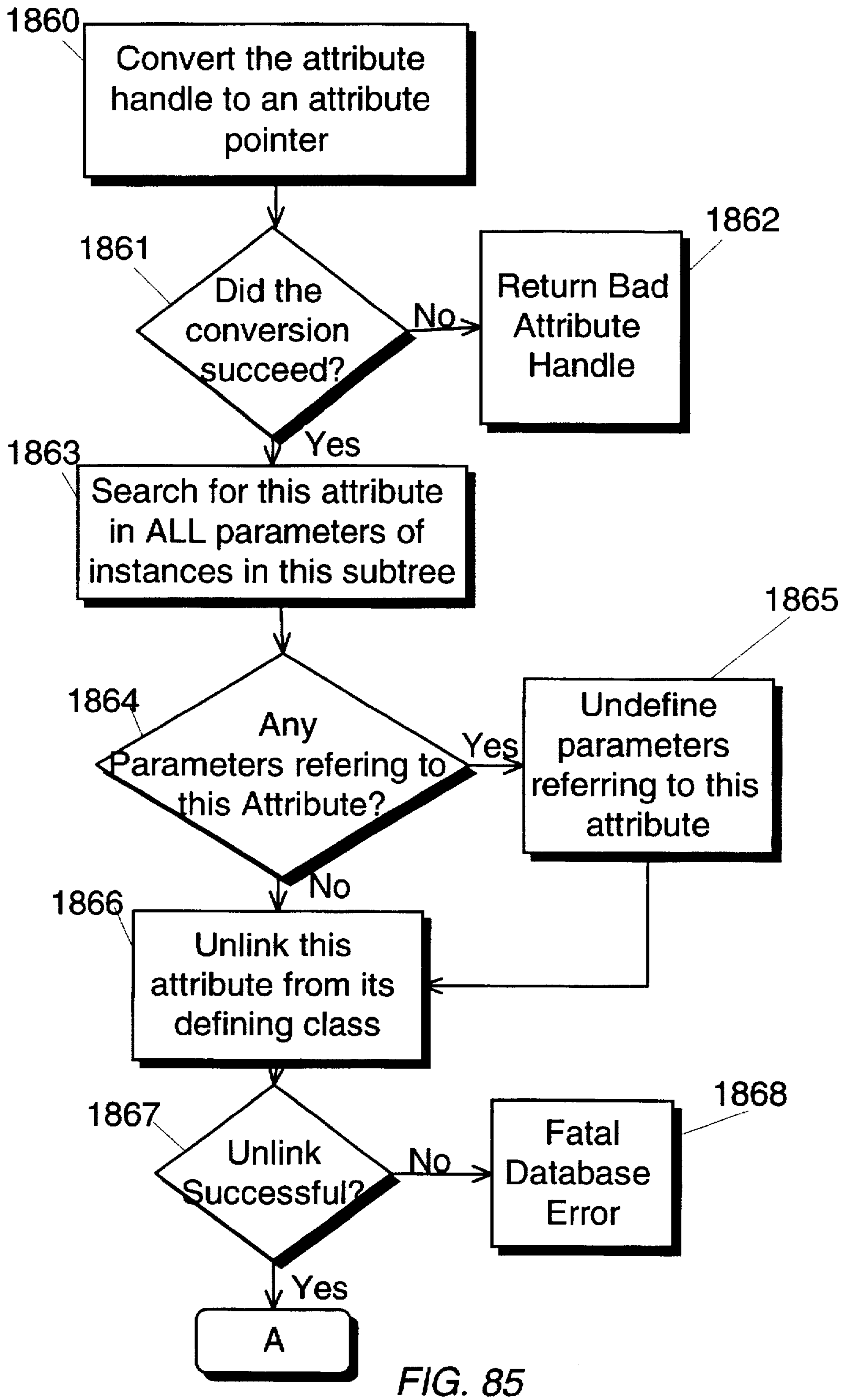
FIG. 85 is a flow chart depicting the deletion of an attribute.

FIG. 85 illustrates the data structure for an enumerator object 841. An enumerator object 841 may comprise three fields. A first field 842 contains a pointer to the external name for the enumerator object 841. A second field 843 contains the handle for the enumerator object 841. A third field 844 may contain a metaparameter list. Handles are used to link from other objects to the enumerator object 841. An advantage of this structure is the ability to easily modify a knowledge base if it becomes desirable to change the external name of an object. Such a change need only be performed once to the ASCII character string that is used to represent the external name. All other objects merely contain a handle which can be used by the handle manager 3137 to provide the dynamic class manager 134 with the actual external name.

Figure 86:
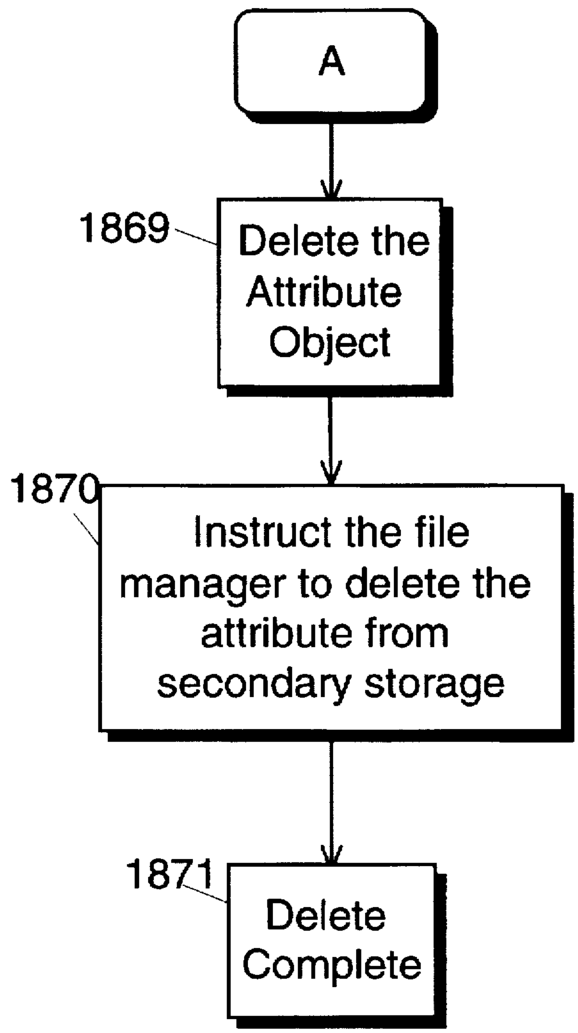
FIG. 86 is a continuation of the flow chart in FIG. 85.

FIG. 86 depicts the data structure for an instance 871 and associated parameters 872. An instance object 871 may contain four fields 873–876. The first field 873 is the handle for the owner class of this instance. The second field 874 may give the ordinal location of this instance's handle in the instance list 804 of its owning class. The third field 875 is a list of parameters, which points to the values contained in 877. The fourth field 876 is the handle for the instance object 871. The list of parameters 877 contains a plurality of pointers to parameters for the various attributes associated with this instance object 871. In the example illustrated in FIG. 86, the list 877 contains three entries 878, 879 and 880. Additional elements of the list 877 have been omitted for clarity. The pointer 878 in list 877 points to information concerning the associated parameter 872. The data structure for the parameter 872 is illustrated in more detail in FIG. 87.

Figure 87:
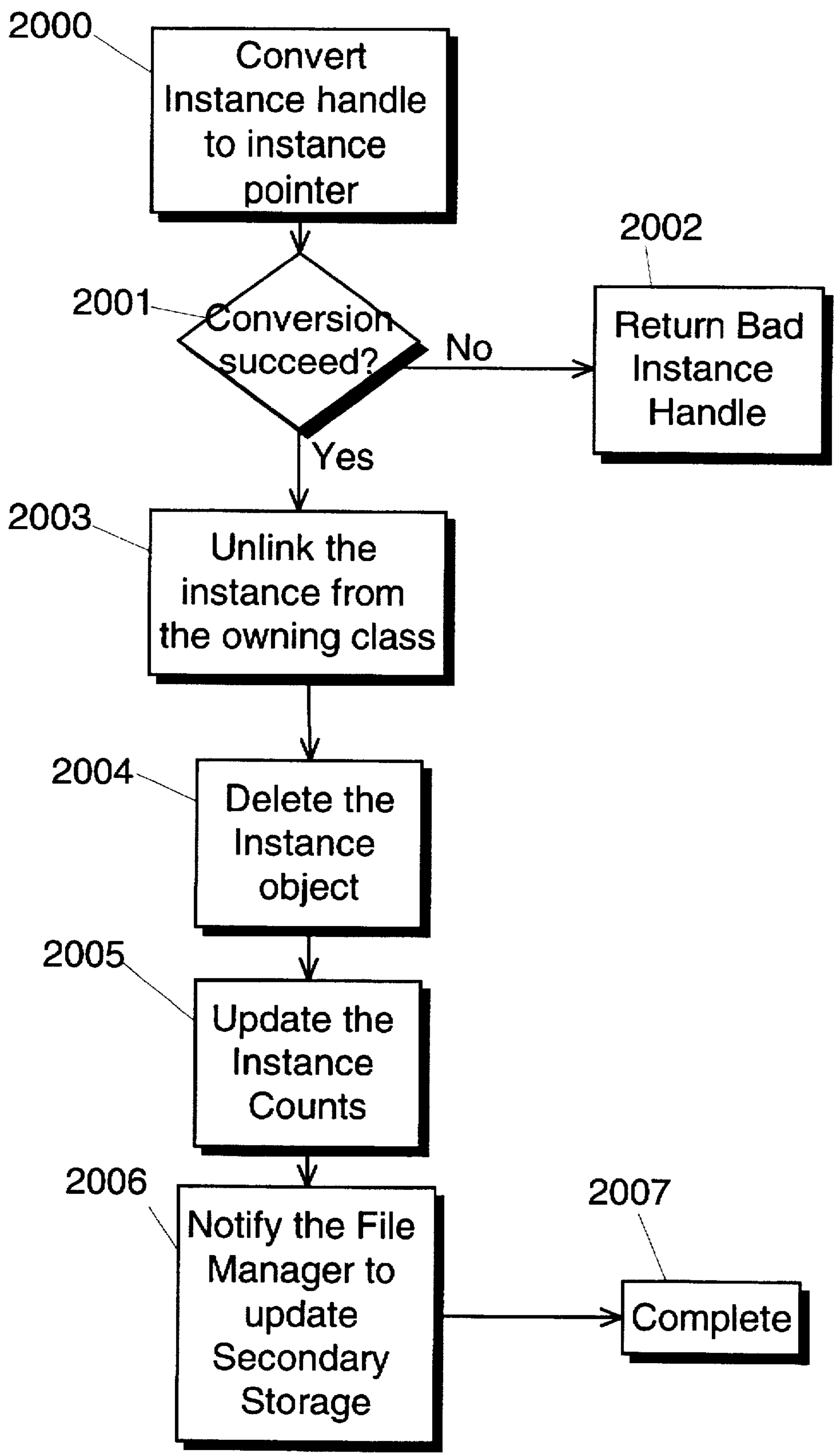
FIG. 87 is a flow chart depicting the deletion of an instance.

FIG. 87 shows the data structure for five different types of parameters: enumerated, Boolean, numeric, string and string array. Each of the parameter objects 872 has an attribute handle 881. An enumerated object 888 has an attribute handle 881 and an enumerator handle 882. A Boolean object 889 has an attribute handle 881 and a Boolean value 883. A numeric parameter object 890 has an attribute handle 881, a unit handle 884 and a value 885. For example, if the numeric parameter is 10 ohms, the unit handle 884 would be the handle for the ohms unit, and the value 885 would be 10. A string parameter 891 contains a field for the attribute handle 881 and a pointer 886 to an ASCII character string. A string array parameter 892 contains an attribute handle 881 and a field 887 that points to a list of pointers to string arrays.

Figure 88:
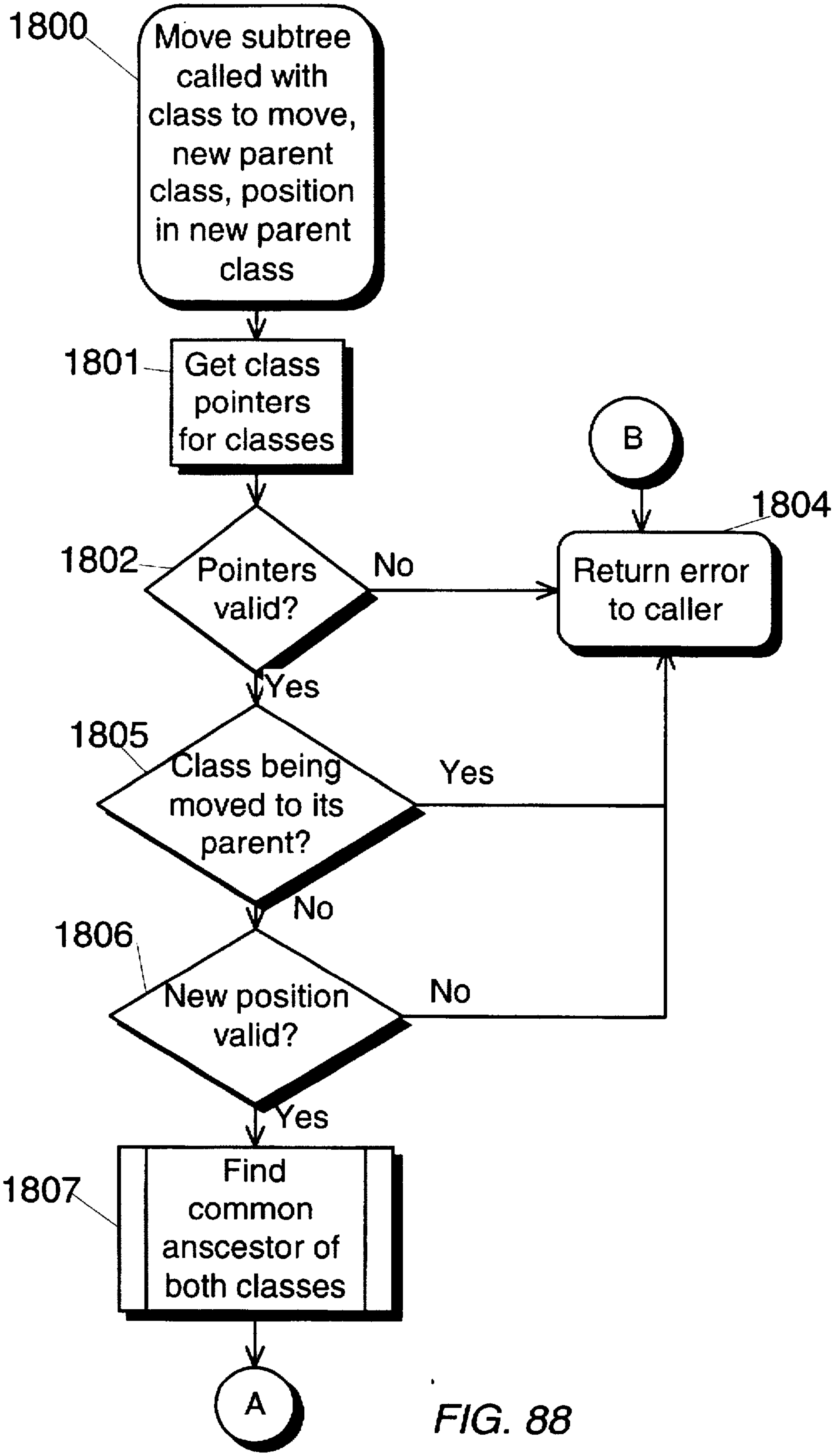
FIG. 88 is a flow chart depicting the steps involved in moving a subtree.

FIG. 88 is an example of a schema with instances. The example has a class named "electronics", which has a subclass 800' named "capacitors". The capacitors subclass 800' has an attribute 827 called "case type". There are two possible types of cases in this example, which are referred to as "case A" and "case B". The subclass capacitors 800' has a subclass 800' named "electrolytic". The electrolytic subclass 800' has an attribute 827' called "voltage rating", and one instance 871' is provided that has parameters 890 and 888 of 5 volts and a type B case, respectively. Most objects and lists are shown incomplete in order to simplify the illustration, it being understood that like reference numerals refer to the same objects described in connection with FIGS. 70–75.

In FIG. 88, the class object 800 has a name 806, which in this case is "electronics". The class object 800 has a field 802 which points to a list of subclasses 893. The list 893 has a first entry 894 which is the handle for the subclass 800'. In this case, the name 806' of the subclass 800' is capacitors. Of course, all references to schema objects actually use handles (not shown in FIG. 88) and actually go through the handle manager 3137 and handle table. This is not shown in FIG. 88 in order to simplify the diagram.

The subclass 800' capacitor has a field 802' which points to a list of subclasses 893'. The list 893' has an entry 894' which is the handle for subclass 800". The name 806" for subclass 800" is electrolytic. The subclass 800" has a null entry in the field 802" which would normally contain a pointer to a list of subclasses, if any. In this example, the subclass 800" does not have any subclasses.

Returning to the capacitors subclass 800', field 803 contains a pointer to a list of attributes 897. The list 897 contains the handle for the enumerated attribute 827 called "case type". Field 830 of the enumerated attribute object 827 contains the handle of the defining class 800' called capacitors. The enumerated attribute object 827 contains a pointer 835 which points to a list 839 of handles for enumerators. In this example, the list 839 contains a handle 898 for the enumerator 841. The enumerator 841 contains a pointer 842 to the external name for this enumerator, which may be an ASCII string for "case A". Similarly, item 899 in the list 839 points to enumerator 841' associated with case B.

Returning now to subclass 800" named electrolytic, the pointer 803" points to a list 897' of attributes, and one of the fields in the list 897' contains the handle for numeric attribute 827' which is "voltage rating". The numeric attribute 827' contains a field 830' which contains the handle of the defining class which in this example is the class 800" named electrolytic. The numeric attribute object 827' also contains a field 838' which contains the handle of the voltage unit family (not shown).

Returning to the electrolytic class 800", a field 804" contains a pointer to a list 895 of handles of instances. Item 896 in the list 895 contains the handle associated with instance 871. Instance 871 contains a field 873 which contains the handle of the owning class, which in this case is the electrolytic class 800". The instance data object 871 also contains a field 875 which points to a list of parameters 877. The list 877 contains a pointer 878 which points to the numeric parameter 890. The numeric parameter 890 contains a field 881 which contains the handle of the attribute 827' (voltage rating). The numeric parameter object 890 also contains a field 884 which has the handle of the units, which in this case is "volts". For simplicity, the unit object is not shown. The numeric parameter object 890 contains a field 885 which contains the value 5.0. In this instance, the electrolytic capacitor is rated at 5.0 volts.

The parameter list 877 contains a pointer 879 which points to the enumerated parameter 888. The enumerated parameter object 888 contains a field 881' which contains the handle of the attribute, which in this instance is case type. The enumerated parameter object 888 also contains a field 882 which is the handle for the enumerator 841'. In this example, the electrolytic capacitor rated at 5.0 volts has a type case B.

The data structure described herein has significant advantages. Referring to FIG. 88, it is easy to change a name or description in this data structure. Consider an example where the database may contain 1,000 instances of capacitors with a type B case. If the type B case is discontinued, or the name changed to "re-enforced", the only change that would need to be made would be to replace a single ASCII string representing the name for that case type. All 1,000 instances in the database simply contain a handle that the handle manager 3137 associates with that ASCII text string. No other changes need to be made in the database.

Another advantage of the data structure in accordance with the present invention is that if a primary value is undefined, nothing is stored. Thus there is no wasted space.

Another advantage of the database structure is that algorithms do not have to be changed based upon location in the tree structure. All algorithms work the same regardless of location in the tree structure. The only special case is the root class. For example, the algorithm for adding an instance to the database is the same no matter where in the tree structure you are located. This makes dynamic changes to the schema very easy. A class or an entire branch of the tree structure can be moved from one location to another simply by changing lists of handles. It is not necessary to run a convert program. Everything is self contained. A class object 800 contains the handle of its parent 801 and thus knows who it's parent is. The class object 800 also contains a pointer 802 to a list of its subclasses, so it knows who its children are.

In the present database structure, it is possible to delete instances quickly. An instance can be deleted by taking the last item in the list of instances 804 and moving it to the position of the instance being deleted. In other words, the handle of the last instance would be written over the handle of the instance being deleted, and the number of items in the list would be decremented by one. The instance index field 874 for an instance object 871 may be used to facilitate fast deletions.

In a preferred embodiment, the value of parameters are always stored in base units. The objects in fields described do not necessarily occupy a word of memory. In a preferred embodiment, all parameters of a particular type are stored contiguously. This improves the speed of searches. For example, the case type 841' described with reference to FIG. 88 would be stored contiguously with all the other parameters for case type. The numeric parameter of 5.0 volts would be stored in a different physical location in memory contiguous with other numeric volt parameters.

As described above, providing a class object structure 800 with a field 808 providing the subtree instance count for that class allows the system to virtually instantly display a parts count 3172 to provide the user instantaneous feedback during the tree traversal steps of the users search. The process of finding a part essentially amounts to discarding the thousands of parts that do not have the attributes desired and narrowing the search down to a small number that do.

This is accomplished by navigating to the correct class from the root of the classification hierarchy. During this phase, the parts found indication 3172 can be updated using the data structure field 808 indicating the subtree instance count. This provides significant response time advantages compared to actually counting the available instances at each step. The user has immediate feedback indicating the number of parts available in the selected tree. The combination of providing an object oriented hierarchical tree structure together with search criteria based upon any desired combination of attributes, while providing instantaneous feedback on the number of instances corresponding to the current search criteria and class provides significant advantages over data base management schemes that have been attempted in the past.

An important function of the dynamic class manager 134 is the ability to modify the database structure during operation. The database structure is known as the schema. The schema of the object oriented database is structured using classes. The classes contain attributes. The attributes may contain enumerators, and unit families. The ability to add, move and delete these items is important to the dynamic operation of the database.

To add a class to the schema, three items must be known: the class name, the parent of the new class, and the location within the list of subclasses to insert the new class. FIG. 89 illustrates this operation. The first step 1840 converts the handle of the parent class into an actual class pointer. The parent pointer must be immediately tested in step 1841 prior to its use. If the pointer proves to be invalid, then the operation terminates at step 1842. If the pointer is valid, the insertion index is tested in step 1843. If it proves to be invalid, the operation is terminated in step 1844. Finally, the name of the class must be tested in step 1845 to determine if it fits the guidelines of valid class names. If the class name fails, then the operation terminates in step 1846. When step 1845 accepts the class name, the new class can be created. A new handle is created in step 1847 first, and then the new class is created in internal memory in step 1848. The new handle is inserted into the table of class handles in step 1849 of FIG. 90, followed by the handle being added to the parents list of subclass handles in step 1850. The last operation is to cause the file manager 140 to add the new class to the indicated parent on the secondary storage device 110.

To add an attribute to a class, three items must be known: the class handle of the owning class, the location in which to insert the new attribute, and the name of the attribute. FIG. 91 illustrates the adding of attributes. The first step 1930 is to convert the class handle into a class pointer, followed by the testing of that class pointer in 1931 to determine if it is a valid class pointer. If not, the procedure terminates in 1932. If the class pointer is determined to be valid, then the insertion index is validated in 1933. If the index fails the validation test, then the procedure terminates in 1934. If the validation of the index succeeds, then the operation continues in 1935 where the name of the attribute is tested. If the attribute name fails, then the operation terminates in 1936. If the name of an enumerated attribute is accepted in 1935, then the attribute can be created. Step 1937 creates a new handle for the attribute. Then the new attribute is created in step 1938. The new attribute handle is then added to the list of attributes local to the owning class in 1939. The last step is 1940 of FIG. 92 to cause the file manager 140 to update secondary storage 110 with the new attribute. The operation is complete in step 1941.

The addition of an instance is shown in FIG. 81. Adding an instance requires a class handle. The class handle must be converted into a class pointer in 1918. The class pointer is tested in 1919 to determine if it is a valid class pointer. If it is not valid, then the procedure terminates in 1920. If the class pointer is determined to be valid, then the procedure continues in 1921 with the generation of a new instance handle and a new instance object. The handle for the new instance is inserted into the handle table in 1922. The instance is added to the parents list of instances in 1923. The subtree instance count is incremented to reflect the presence of the new instance in 1924. The instance has now been created in memory, and needs to be added to secondary storage 110, which is done in step 1925 of FIG. 82. The procedure is complete in step 1926.

The deletion of a class is shown in FIG. 83. To remove a class from the database structure, the current class handle must be identified. The class handle is first decoded into a class pointer in step 2600. The class pointer is then checked to determine if it is a valid class pointer in 2601. If the class pointer is invalid, the procedure is terminated in 2602. If the class pointer is valid, then it is checked to determine if it is the root class in 2603. If the class pointer represents the root class, then the procedure terminates in 2604, because the root class cannot be deleted. If the class pointer does not represent the root class, it is checked to determine if the class represents a leaf class in 2605. If the class pointer does not represent a leaf class, the procedure terminates in 2604. If the class pointer is found to point to a leaf class, then operation continues in 2906 where all of the instances of this class are deleted. The process of deleting instances is described below with reference to FIG. 87. In step 2607 all of the attributes which are local to the class being deleted are deleted. In FIG. 84 The class is then unlinked from its parent class in step 2608. The system checks to determine if the unlink was successful, and that the data structures which contain the class list are intact in 2609. If the unlink failed, then operation stops in 2610. If the unlink succeeded, then operation continues in 2611 where the class object is actually deleted. In step 2612, the file manager 140 is instructed to remove the class object from secondary storage 110, and the operation completes in step 2613.

The deletion of an attribute is shown in FIG. 85. To remove an attribute, the attribute handle must be decoded into an attribute pointer in step 1860. Step 1861 checks to see if the attribute pointer obtained from step 1860 is valid. If the attribute pointer is invalid, the procedure stops in 1862. If the attribute pointer is valid, the procedure continues in step 1863 by searching the entire subtree for all of the parameters in all of the subtree instances that are derived from this attribute. After searching, in step 1864 the system determines how many parameters were derived from this attribute. If there were parameters derived from this attribute, the operation proceeds to 1865, where the parameters are undefined. If there were no parameters derived from this attribute, then the procedure continues to step 1866. Likewise, after the parameters have been undefined in 1865, the operation continues to 1866. In step 1866, the attribute is unlinked from the defining class. In 1867 the procedure checks to determine if the unlink operation succeeded. If the unlink failed, then the procedure stops at 1868. If the unlink was successful, then the attribute object is deleted in 1869 in FIG. 86. The file manager 140 is then instructed to remove the attribute from secondary storage 110 in step 1870. The operation is complete in step 1871.

The deletion of an instance is shown in FIG. 87. An instance is deleted from the database by first converting the instance handle in step 2000 to an instance pointer. The instance pointer is checked to determine that it is indeed a valid instance pointer in 2001. If the instance pointer is invalid then the operation terminates in 2002. If the instance pointer is valid, then the instance is unlinked from its owning class in 2003. The instance object is itself deleted in 2004. The subtree instance counts is then decremented to indicate that one instance has been deleted from the subtree in 2005. The file manager 140 is then instructed to update the secondary storage 110 to reflect the deletion of the instance in 2006. The operation is complete in step 2007.

In FIG. 88, moving a subtree to a new position in the class hierarchy is described. In step 1800, the move subtree procedure is called with a class to move, the destination parent class, and the position among its sibling classes at the destination specified. In step 1801, the class pointers for the class to be moved and the destination parent class are obtained. If the test for all valid pointers in step 1802 fails, step 1804 returns an error, else test 1805 is made to prevent the class from being trivially moved to its own parent. Step 1806 insures that the position among the subclasses of the destination parent class is within a valid range, with an error returned by step 1804 upon error. In step 1807, the class hierarchy above both the class to be moved and the destination class is analyzed to identify the nearest common ancestor class.

In step 1808 of FIG. 89, the common ancestor is tested to see if it is identical to the class being moved. If it is, given that a test has already been performed to insure that the class is not being moved to its parent, then this is determined to be an attempt to move a class to a subclass of itself, and an error is returned. All other moves are legal, so the class is unhooked from its parent class in step 1809 and added to the list of subclasses for the destination class in step 1810. The destination class subtree instance count is incremented by the number of instances in the moved class in step 1811, and the subtree count of the original parent class of the moved class is decremented by the moved class instance count in step 1812. In step 1813 the permanent image of the knowledge base is updated through the file manager 140, with step 1814 returning successfully to the caller.

FIG. 90 describes unhooking the moved class from its original parent class. In step 1815 the class pointer for the parent is obtained and used in step 1816 to get a list of subclasses for the parent class. If the class handle of the class to be moved is not in the resulting subclass list as tested in step 1817, the knowledge base is internally inconsistent and an error is returned to the caller, else the class is deleted from the parent class subclass list in step 1818 before a successful return in step 1819.

FIG. 91 describes the process of finding the nearest common ancestor of the class to be moved and the destination class. In step 1820, a temporary class handle is set to the handle of the class to be moved. Step 1821 gets the parent of the temporary class, initiating a loop that creates a list of classes in order from the class to move to the root. Each class encountered is added to a list in step 1822, with iteration being terminated if step 1823 shows that the root has been encountered. If the test in step 1823 fails, the temporary class handle is set to the handle of its parent class in step 1824 and iteration continues.

A similar list is created for the destination class in steps 1831 through 1828, moving to FIG. 92. In step 1831, a temporary class handle is set to the handle of the destination class. Step 1832 gets the parent of the temporary class, initiating a loop that creates a list of classes in order from the class to move to the root. Each class encountered is added to a list in step 1826, with iteration being terminated if step 1827 shows that the root has been encountered. If the test in step 1827 fails, the temporary class handle is set to the handle of its parent class in step 1828 and iteration continues.

The final step 1829 iterates through the two resulting lists until a matching class handle is found. This is the handle of the nearest common ancestor, which is returned in step 1830.

IV. Comparing Instances By Their Attribute Values

Figure 59A:
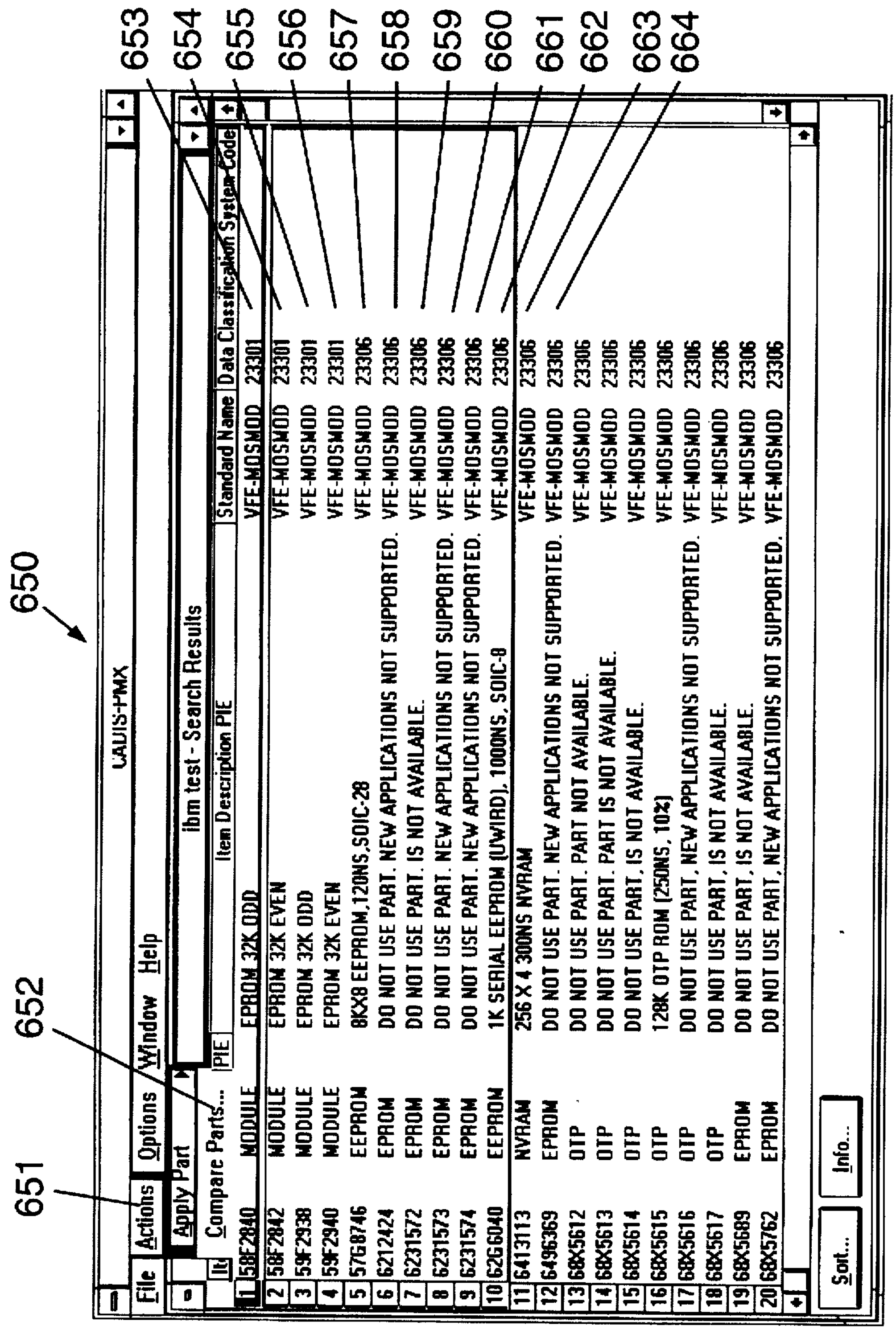
FIG. 59A shows an example of a display of a search results window.

A preferred method and apparatus for performing a search or query is described in more detail in application Ser. No. 08/339,481, filed Nov. 10, 1994. When the results of a search are obtained, the instances (in the illustrated example the instances are parts) may be displayed as shown in FIG. 59A. The parts may then be compared by their attribute values. The parts that the user wishes to compare are selected by clicking on them. When selected, the display of the selected part is shaded or highlighted, as shown in FIG. 59A by the shaded part displays indicated by reference numerals 653–662. The parts 663, 664, and subsequent parts are not highlighted because they have not been selected in the illustrated example.

After displaying the list of parts that match the search specification (see FIG. 59A), a user will often want to compare those parts in relation to their shared attribute values. This can be done by using the compare parts option 652 from the actions menu 651. This command 652 accesses the part attribute comparison dialog box 630 shown in FIG. 59B and FIG. 60, where a user can compare the attribute values among all selected parts 633, 634, 635, and 636. In a preferred embodiment, a user must select at least two parts in the search results window 650 before invoking the compare parts command 652. An example of comparing a selected part's attribute values to all other values is shown in the part attribute comparison dialog box 630 shown in FIG. 59B.

Figure 59B:
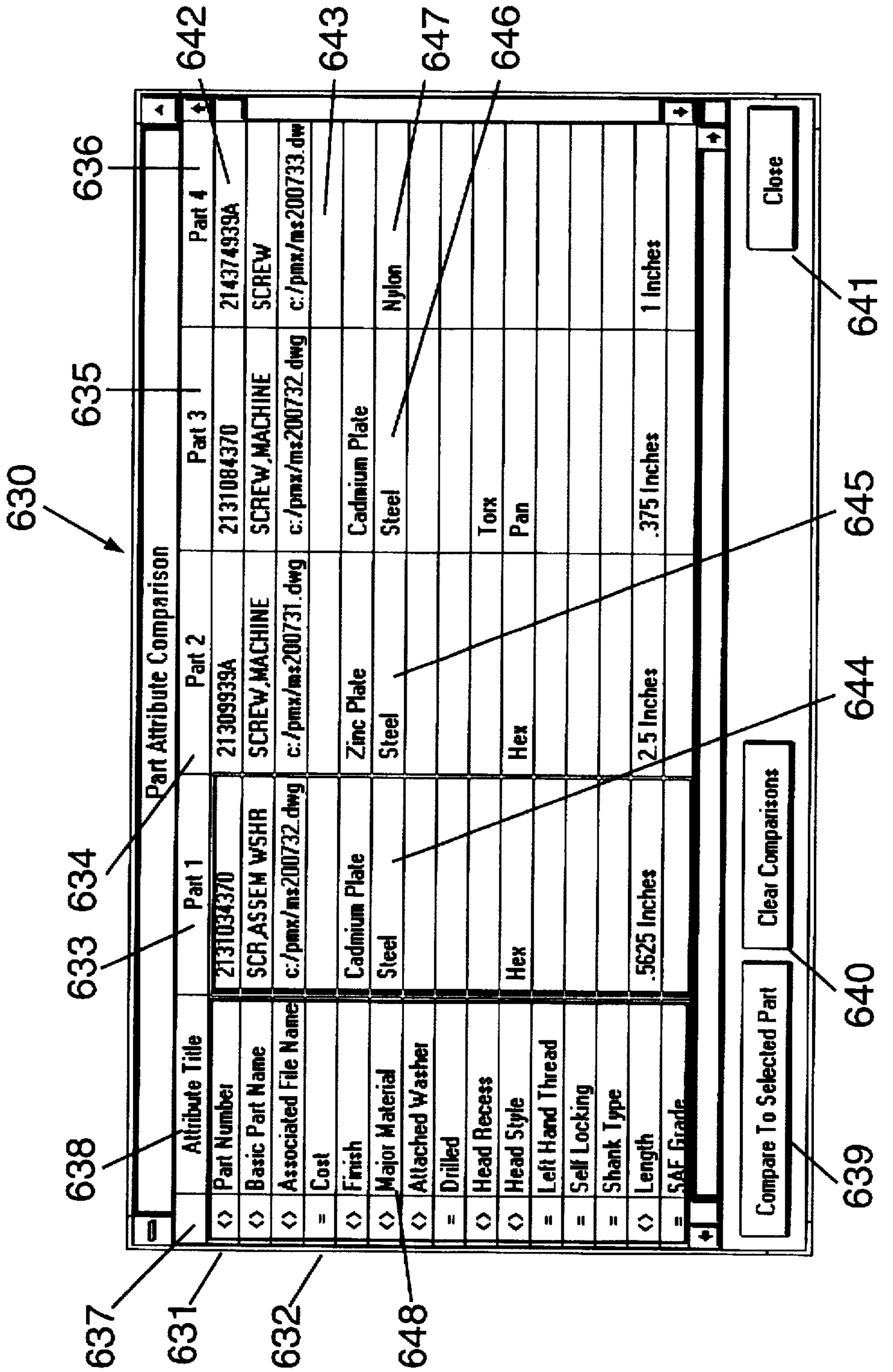
FIG. 59B shows an example of a display of a compare parts dialog box.

In a preferred embodiment, before the part attribute comparison dialog box 630 first appears on the user's display as shown in FIG. 59B, all attribute values for the selected parts are evaluated as to whether or not they have the same value. When the part attribute comparison dialog box 630 appears on the user's display screen, the results of this comparison are indicated in the first column 637 of the dialog box 630. In the illustrated example, an equal operator (=) 632 is displayed in the first column 637 where all of the attributes in that row 643 are equal for all of the parts 633, 634, 635, and 636 selected for the compare parts operation. A not equal (<>) operator 631 is displayed in the first column 637 where all of the attributes in that row 642 are not equal for all of the parts selected for the compare parts operation. The second column 638 of the dialog lists the attribute titles, and the remaining columns 633, 634, 635, and 636 are each allocated to a single part; that is, one for each part that the user previously selected from the search results window. Each part column 633, 634, 635, and 636 lists its attribute values in the same order as the other columns.

An example part attribute comparison dialog box 630 is shown in FIG. 59B. Table II describes the regions of the part attribute comparison dialog box 630:

TABLE II

| Region | Description |
|---|---|
| Initial Evaluation 637 | Displays either an equal operator (=) or a not equal (<>) operator, when the part attribute comparison dialog box 630 first appears. An equal operator 632 indicates that all the values for that specific attribute are the same for all the selected parts. A not equal operator 631 indicates that at least one value, for all the same attributes, for all the selected parts, is not the same. |

TABLE II-continued

| Region | Description |
|---|---|
| Attribute Title 638 | Displays the name of each attribute in a separate row. |
| Part 633, 634, 635 and 636 | Displays the values for each attribute for a particular part. Each attribute value is an element in a separate row for the column corresponding to that part. A part (column) number is at the top of the column corresponding to each part. |

Figure 60:
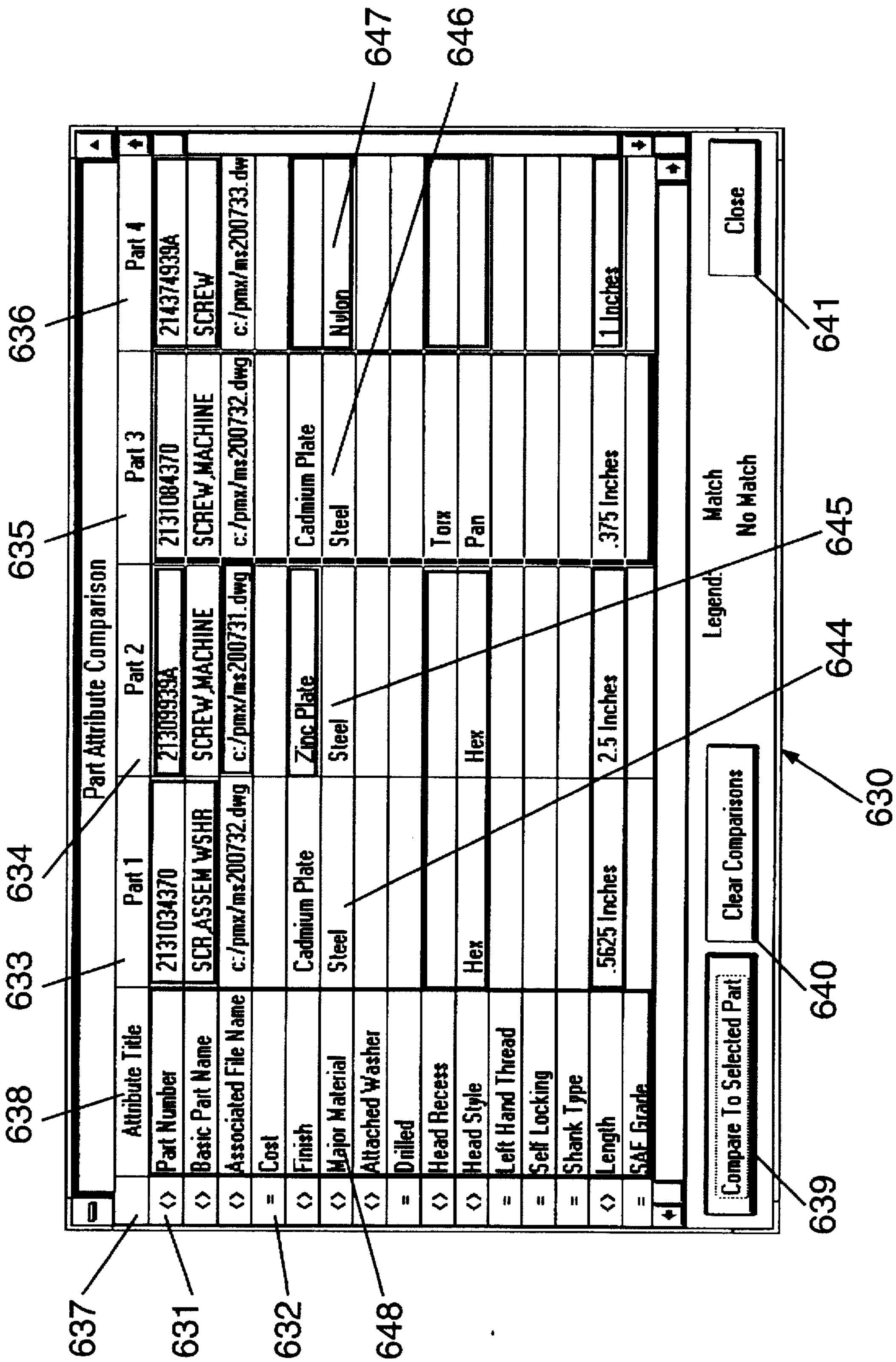
FIG. 60 shows an example of a display of a compare parts dialog box after a compare to selected part command has been invoked.

Referring to FIG. 59B and FIG. 60, certain command buttons 639, 640 and 641 are provided in the illustrated embodiment. A "compare to selected part" command button 639 causes the system to compares all the attribute values of the other parts 633, 634, and 636 shown in the dialog box 630 to those belonging to a single part 635 a user has selected (see FIG. 60). The user must select the part 635 by clicking on its column number 635 (labeled "part 3" in FIG. 60) before choosing this command 639. A "clear comparisons" command button 640 causes the system, once a comparison has been conducted using the "compare to selected part" command 639, clears the comparison results (at which point the display will return to a display similar to that shown in FIG. 59B). A "close" command button 641 will cause the system to close the part attribute comparison dialog box or window 630 and return to the display window that was active before the compare parts dialog box 630 was opened. Table III describes the command buttons 639, 640 and 641 in the part attribute comparison dialog box 630.

TABLE III

| Command | Description |
|---|---|
| Compare to Selected Part 649 | Compares all the attribute values shown in the dialog box to those belonging to a single part a user has selected. The user must select the part (that is, its column number) before choosing this command. |
| Clear Comparisons 640 | Once a comparison has been conducted using the Compare to Selected Part command, clears the comparison results. |
| Close 641 | Closes the dialog box. |

Referring to FIG. 60, when the compare to selected part command is issued, the attribute display changes to indicate the results of the comparison in a way that makes equal and unequal comparisons immediately apparent to a user in a very convenient manner. When all of the attribute values for the non-selected parts 633, 634, and 636 are compared to those for the baseline part 635, the cells 644 and 645 for attribute values that match are not shaded, and the cells 647 for attribute values that do not match are shaded. For example, the selected or baseline part 635 has a value for the attribute "major material" 648 indicating that the part is made of "steel" 646. The attribute value "steel" 646 for the selected part 635 is compared to the values of the other parts for the attribute "major material" 648. The first part 633 has a value of "steel" 644 for this attribute 648. Because it is the same value 644 as the attribute value 646 for the selected part 635, it is displayed unshaded, as shown in FIG. 60. Similarly, the second part 634 also has a value of "steel" 645 for this attribute 648. Because it is the same value 645 as the attribute value 646 for the selected part 635, it is also displayed unshaded, as shown in FIG. 60. The fourth part 636 has a value of "nylon" 647 for this attribute 648. Because it is not the same as or equal to the attribute value 646 for the selected part 635, it is displayed as a shaded cell 647, as shown in FIG. 60.

A procedure for comparing part attributes may include the following steps:

1. From the search results window, a user selects two or more parts that the user wants to compare.

2. From the actions menu, the user chooses compare parts. The part attribute comparison dialog box 630 appears, showing which attribute values for a single attribute are the same (=) 632, or if any attribute values for a single attribute are different (<>) 631, in the first column 637.

3. Referring to FIG. 60, to compare the attribute values for all parts 633, 634, and 636 displayed in the dialog box 630 with those for a baseline part 635, the user clicks the baseline part column number 635 and chooses the compare to selected part command button 639.

All the attribute values for the non-selected parts 633, 634, and 636 are compared to those for the baseline part 635. The cells 644 and 645 for attribute values that match are not shaded; the cells 647 for attribute values that do not match are shaded.

4. To clear the color comparisons, the user chooses the clear comparisons command button 640.

5. To compare the attribute values for all parts displayed in the dialog to those for a different part, repeat step 3.

Figure 57:
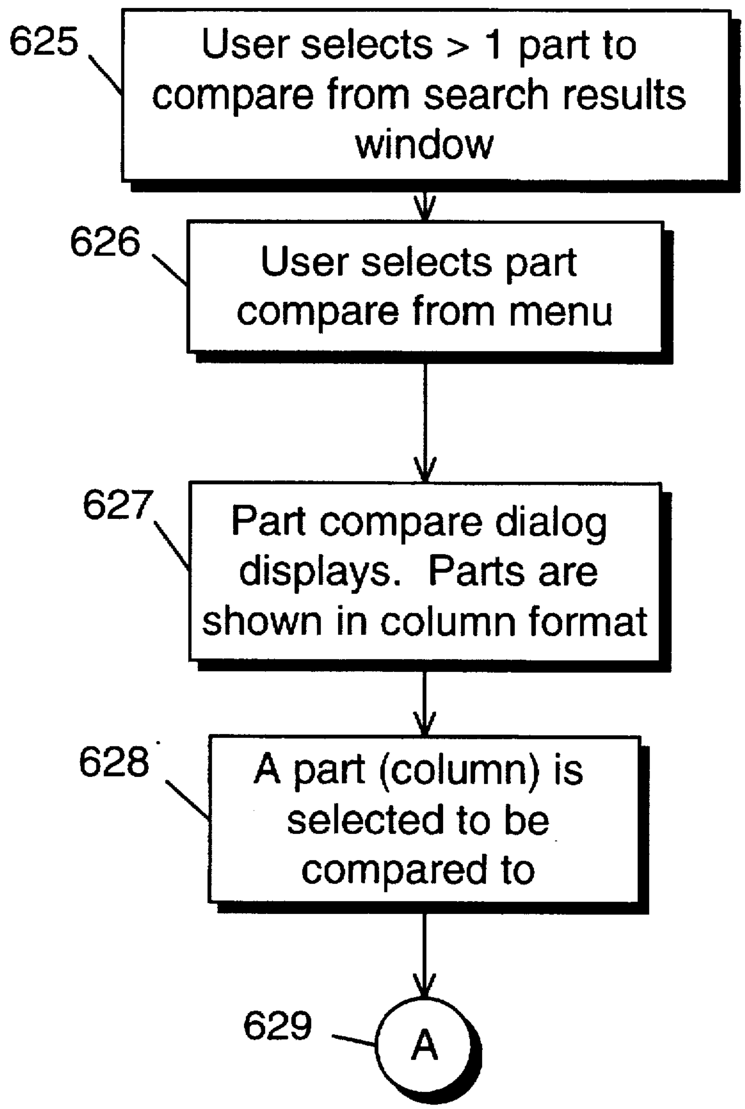
FIG. 57 and FIG. 58 depict flow charts for the process of comparing part attributes.
Figure 58:
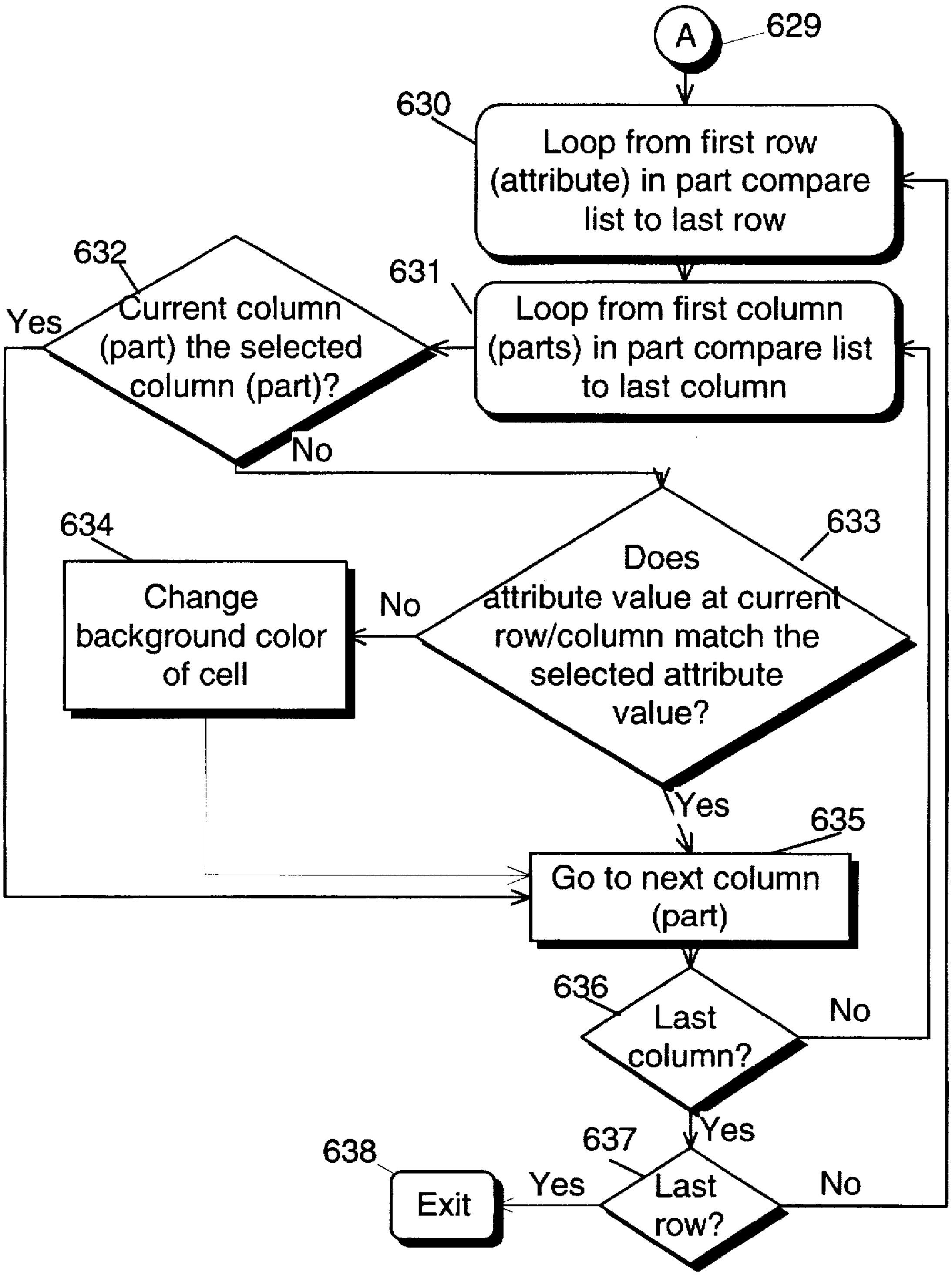

FIG. 57 and FIG. 58 depict flow charts for the process of comparing part attributes. In step 625, the user selects a number of parts greater than one for comparison. Of course, the user must select more than one part, because there would be nothing to compare with the baseline part if only one part was selected. In step 626, the user invokes a compare parts command 652 from an action menu 651.

In step 627, a window or dialog box is opened and the parts selected for comparison are displayed. In FIG. 59A, the part attributes are preferably displayed in rows. In a preferred embodiment, the part attributes are preferably displayed in columns as shown in FIG. 59B. The user then selects in step 628 a part 635 to compare. Point A identified with reference numeral 629 is a common point in the flow charts of FIGS. 57 and 58.

Step 630 is an entry point into an outer program loop, and step 631 is an entry point into an inner program loop. In step 632, the system checks to determine whether the current instance is the selected baseline instance 635. If it is, the method jumps to step 635 and goes to the next instance or column. If it is not, the method proceeds to step 633 where the method determines whether the corresponding attribute values are the same (or match) for the current instance and the selected instance 635. If the attribute values are equal, the display of that cell 644 of the attribute row 648 is unchanged, and the flow proceeds to step 635, where the procedure goes to the next instance. If the attribute values are not equal, the method goes to step 634, and the display of that cell 647 of the attribute row 648 is changed, for example to highlight it, or the background color is changed, or it is shaded. The flow then proceeds to step 635 and goes to the next instance, or column. In step 636, a check is made to determine whether this is the last instance for this attribute, i.e., whether it is the last column. If not, the process loops to step 631. If it is the last instance for this attribute, i.e., it is the last column, the procedure goes on to conduct a comparison of the next attribute, i.e., it goes to the next row. In step 637, the method checks to see if this is the last row. If not, the process loops back to step 630. If it is the last row, the comparison has been completed for all rows and columns, i.e., each attribute has been compared for every instance. The system then exits at step 638.

V. Summary

Using the present invention, in a preferred application involving the use of an object oriented database management system to manage parts information, multiple users may access the same knowledge base 123 concurrently for finding parts, editing parts, and editing the schema. The object oriented database management system manages concurrency by using "locks."

More than one schema editor or developer 144 can be active concurrently in the same knowledge base. When a user selects the class that he or she wants to edit, the schema editor 144 establishes a lock on that class. As long as the schema editor 144 has a lock on that class, that class and all of its subclasses are not accessible for editing in any other schema editor 144, and may not be available for viewing by the retriever 130. However, another schema editor 144 and/or retriever 130 may concurrently work on any other section of the knowledge base 123 that does not have a lock.

With schema developer/retriever concurrency, a user can edit his or her schema 123 at the same time that the rest of his or her company is using the object oriented database management system to retrieve parts information. Anyone attempting to find or edit parts in the area that is locked, preferably receives a message indicating that the class is locked. When this message appears, the first user can either go to a different area of the knowledge base 123 or wait until the second user's schema editor 144 releases the lock.

All of the editing functions require an application to become a lock holder and then request a form of write lock before the edit will succeed.

VI. Software Functions pmx_lockType

The enumeration, pmx_lockType, is used to specify the lock types that can be requested and released for classes in the knowledge base.

```
typdef enum {
    PMX_ERROR_LOCKTYPE        = 0,
    PMX_NO_LOCK               = 1,
    PMX_CLASS_S_LOCK          = 2,
    PMX_TREE_S_LOCK           = 3,
    PMX_TREE_U_LOCK           = 4,
    PMX_TREE_X_LOCK           = 5
} pmx_lockType;
```

pmx_lockMode

The enumeration, pmx_lockMode, is used to describe the lock state of a class in the knowledge base. Any given class is in some lock state which is defined by the locks present on the class, either explicitly on the class or by virtue of the class being in a subtree which is locked.

```
typedef enum {
    PMX_LOCKMODE_ERROR        = 0,
    PMX_LOCKMODE_NONE         = 1,
```

-continued

```
            PMX_LOCKMODE_SHARE          = 2,
            PMX_LOCKMODE_UPDATE         = 3,
            PMX_LOCKMODE_EXCLUSIVE      = 4,
          } pmx_lockMode                =5
pmd_lockDescriptor;
```

The pmx_lockDescriptor structure returned by the API function pmx_getLockDescriptor to return information about the locks held by the specified lock holder at the specified class. The specified class and lock holder are returned along with number of times each type of lock has been acquired.

```
typedef struct {
   pmx_classHandle        classHandle:
   pmx_lockHolderHandle   lockHolderHandle;
   long                   classShareLockCount;
   long                   treeShareLockCount;
   long                   treeUpdateLockCount;
   long                   treeExclusiveLockCount;
} pmx_lockDescriptor;
```

The following API functions are preferably provided for concurrency control:

pmx_startLockHolder
pmx_endLockHolder
pmx_requestLock
pmx_releaseLock
pmx_releaseAllLocks
pmx_releaseAllLocksOfType
pmx_freeLockDescriptor
pmx_getLockDescriptor
pmx_getLockMode
pmx_equalLockHolderHandles
pmx_isNullLockHolderHandle
pmx_getNullLockHolderHandle These functions are used to start and end being a lock holder, to request and release locks, and to retrieve information about the lock status of classes.

Lock holders, which are identified by lock holder handles, are started and ended with pmx_startLockHolder( ) and pmx_endLockHolder( ).

To request a lock, use pmx_requestLock. To release a lock or group of locks, use pmx_releaseLock( ), pmx_releaseAllLocks( ), or pmx_releaseAllLocksOfType( ).

To retrieve information about the locks that have been acquired on classes, use pmx_getLockMode( ) or pmx_getLockDescriptor( ).

A description of these functions follows:

1. pmx_endLockHolder

Purpose

Terminate a lock holder that has been started.

Syntax

```
cd_boolean
pmx_endLockholder (
   pmx_dbHandle           whichDB,
   pmx_lockHolderHandle   lockHolder );
```

Parameters

| | |
|---|---|
| whichDB | The handle of an open knowledge base. |
| lockHolder | The handle of a lock holder which has been started. |

Description

The lock holder is ended. Any locks that were requested with the lock holder handle are automatically released. The function will fail if the lock holder handle is invalid (i.e., it has never been started).

Return Value

Upon success, returns CD_TRUE.
Upon failure, returns CD_FALSE.

Errors

PMX_ERRORBADDBHANDLE
The knowledge base handle is invalid.

PMX_ERRORBADLOCKHOLDERHANDLE
The lock holder handle is invalid.

2. pmx_getLockDescriptor

Purpose

Get the description of the locks held at the given class.

Syntax

```
pmx_lockDescriptor CD_FAR *
pmx_getLockDescriptor(
   pmx_dbHandle           whichDB,
   pmx_lockHolderHandle   lockHolder,
   pmx_classHandle        thisClass );
```

Parameters

| | |
|---|---|
| whichDB | The handle of an open knowledge base. |

| | |
|---|---|
| lockHolder | The handle of a lock holder which has been started. |
| thisClass | The class of the class for which lock information is desired. |

Description

This function returns the count of the locks of each type which have been acquired for the given lock holder and class. Only the locks which have been requested for the given class are reported. A class may be influenced by a tree lock on an ancestor, but that condition is not reported.

The application should free the descriptor when it is finished with it. The application should also take care not to alter or destroy any of the data in the descriptor since the pmx_freeLockDescriptor( ) function expects it to be uncorrupted.

Return Value

Upon success, returns a pointer to the descriptor.

Upon failure, returns a NULL pointer.

Errors

PMX_ERRORBADCLASSHANDLE

The class handle is invalid.

PMX_ERRORBADDBHANDLE

The knowledge base handle is invalid.

PMX_ERRORBADLOCKHOLDERHANDLE

The lock holder handle is invalid.

3. pmx_getLockMode

Purpose

Return the lock mode of a given class.

Syntax

```
pmx_lockMode
pmx_getLockMode(
  pmx_dbHandle            whichDB,
  pmx_lockHolderHandle    lockHolder,
  pmx_classHandle         thisClass,
  cd_boolean              self );
```

Parameters

| | |
|---|---|
| whichDB | The handle of an open knowledge base. |
| lockHolder | The handle of a lock holder which has been started. |
| thisClass | The handle of the class for which the lock mode is desired. |
| self | Specifies whether the lock mode is desired with respect to the current application (self) or all other applications. |

Description

This function returns the lock mode of a given class. The lock mode is the effective lock on the class caused by locks at the class and at ancestors of the class. The application has the choice of asking for the mode based on locks it has acquired or based on locks held by other applications. When the self argument is CD_TRUE, then the lock mode result is based on the locks acquired by the current application and lock holder. Otherwise, when self is CD_FALSE, then lock mode result is based on all other applications and lock holders.

Return Value

Upon success, returns the lock mode.

Upon failure, returns PMX_LOCKMODE_ERROR.

Errors

PMX_ERRORBADBOOLEANVALUE

A boolean value is not CD_TRUE or CD_FALSE.

PMX_ERRORBADCLASSHANDLE

The class handle is invalid.

PMX_ERRORBADDBHANDLE

The knowledge base handle is invalid.

PMX_ERRORBADLOCKHOLDERHANDLE

The lock holder handle is invalid.

4. pmx_releaseAllLocks

Purpose

Releases all the locks that have been acquired for a class and for all of its descendants.

Syntax

```
cd_boolean
pmx_releaseAllLocks(
  pmx_dbHandle            whichDB,
  pmx_lockHolderHandle    lockHolder,
  pmx_classHandle         thisClass );
```

Parameters

| | |
|---|---|
| whichDB | The handle of an open knowledge base. |
| lockHolder | The handle of a lock holder which has been started. |
| thisClass | The handle of the class at the root of the subtree for which the locks are to be released. |

Description
This function releases all the locks of all types held on all classes in the subtree rooted by the given class. Only the locks for the given lock holder are released. An error does not occur if no locks have been acquired.
Return Value
Upon success, returns CD_TRUE.
Upon failure, returns CD_FALSE.
Errors
PMX_ERRORBADCLASSHANDLE
The class handle is invalid.
PMX_ERRORBADDBHANDLE
The knowledge base handle is invalid.
PMX_ERRORBADLOCKHOLDERHANDLE
The lock holder handle is invalid.

5. pmx_releaseAllLocksOfType
Purpose
Releases all the locks of a given type held on all classes in the subtree rooted by the given class.
Syntax

```
cd_boolean
pmx_releaseAllLocksOfType(
    pmx_dbHandle            whichDB,
    pmx_lockHolderHandle    lockHolder,
    pmx_classHandle         thisClass,
    pmx_lockType            lockType );
```

Parameters

| | |
|---|---|
| whichDB | The handle of an open knowledge base. |
| lockHolder | The handle of a lock holder which has been started. |
| thisClass | The handle of the class at the root of the subtree for which the locks are to be released. |
| lockType | The type of lock which is to be released. |

Description
This function releases all the locks of the specified type held on all classes in the subtree rooted by the given class. Only the locks for the given lock holder are released. An error does not occur if no locks have been acquired.
Return Value
Upon success, returns CD_TRUE.
Upon failure, returns CD_FALSE.
Errors
PMX_ERRORBADCLASSHANDLE
The class handle is invalid.
PMX_ERRORBADDBHANDLE
The knowledge base handle is invalid.
PMX_ERRORBADLOCKHOLDERHANDLE
The lock holder handle is invalid.
PMX_ERRORBADLOCKTYPE
The lock type is invalid.

6. pmx_releaseLock
Purpose
Releases the lock of the given type that has been acquired on the given class.
Syntax

```
cd_boolean
pmx_releaseLock(
    pmx_dbHandle            whichDB,
    pmx_lockHolderHandle    lockHolder,
    pmx_classhandle         thisClass,
    pmx_lockType            lockType );
```

Parameters

| | |
|---|---|
| whichDB | The handle of an open knowledge base. |
| lockHolder | The handle of a lock holder which has been started. |
| thisClass | The handle of the class for which the lock is to be released. |
| lockType | The type of lock which is to be released. |

Description
This function releases one lock of the given type for the given class and lock holder. An application can acquire multiple locks of the same type for a single class, so the lock must be released as many times as it is requested. Locks can be released en masse with pmx_releaseAllLocks.
The function fails if the lock described by the lock holder, class handle, and lock type has not been previously acquired.
Return Value
Upon success, returns CD_TRUE.
Upon failure, returns CD_FALSE.
Errors
PMX_ERRORBADCLASSHANDLE The class handle is invalid.
PMX_ERRORBADDBHANDLE
The knowledge base handle is invalid.
PMX_ERRORBADLOCKHOLDERHANDLE
The lock holder handle is invalid.
PMX_ERRORNOSUCHLOCK
Attempt to release a lock which is not present.

7. pmx_requestLock

Purpose
Request that a lock of the given type be acquired on the given class.

Syntax
```
cd_boolen
pmx_requestLock(
  pmx_dbHandle          whichDB,
  pmx_lockHolderHandle  lockHolder,
  pmx_classHandle       thisClass,
  pmx_lockType          lockType );
```
Parameters

| | |
|---|---|
| whichDB | The handle of an open knowledge base. |
| lockHolder | The handle of a lock holder which has been started. |
| thisClass | The handle of the class for which a lock is requested. |
| lockType | The type of lock which is requested. |

Description
This function requests a lock of the given type for the given class and lock holder. The lock is acquired if the request does not conflict with the locks held by other applications and lock holders.

Return Value
Upon success, returns CD_TRUE.
Upon failure, returns CD_FALSE.

Errors
PMX_ERRORBADCLASSHANDLE
The class handle is invalid.
PMX_ERRORBADDBHANDLE
The knowledge base handle is invalid.
PMX_ERRORBADLOCKHOLDERHANDLE
The lock holder handle is invalid.
PMX_ERRORBADLOCKTYPE
The lock type is invalid.
PMX_ERRORCANNOTGRANTLOCK
The requested lock cannot be granted.

8. pmx_startLockHolder

Purpose
Start being a new lock holder.

Syntax
```
pmx_lockHolderHandle
pmx_startLockHolder(
  pmx_dbHandle          whichDB );
```
Parameters

| | |
|---|---|
| whichDB | The handle of an open knowledge base. |

Description
This function creates a new lock holder, identified by a lock holder handle. The new lock holder may be used to request locks. Locks from one lock holder conflict with another lock holder, even for the same application.

Return Value
Upon success, returns a new lock holder handle.
Upon failure, returns pmx_NullLockHolder, a NULL lock holder handle.

Errors
PMX_ERRORBADDBHANDLE
The knowledge base handle is invalid.

9. pmx_freeLockDescriptor

Purpose
Free a pmx_lockDescriptor.

Syntax
```
cd_boolean
pmx_freeLockDescriptor(
  pmx_lockDescriptor * this Descriptor );
```
Parameters

| | |
|---|---|
| thisDescriptor | The lock descriptor to be freed. |

Description
This function frees the memory associated with a lock descriptor. No further reference to the descriptor may be made after calling this function.

Return Value
Upon success, returns CD_TRUE.
Upon failure, returns CD_FALSE.

Error

-continued

```
    PMX_ERRORNULLPOINTER
        A NULL pointer was passed in place of a required input argument.
10. pmx_equalLockHolderHandles
Purpose
    Compare two lock holder handles for equality.
Syntax
    cd_boolean
    pmx_equalLockHolderHandles(
      pmx_lockHolderHandle    handle1,
      pmx_lockHolderHandle    handle2 );
Return Value
    If the two handles are equal, returns CD_TRUE.
    If not equal, returns CD_FALSE.
11. pmx_getNullLockHolderHandle
Purpose
    Get a NULL lock holder handle.
Syntax
    pmx_lockHolderHandle
    pmx_getNullLockHolderHandle( );
Return Value
    Returns a NULL lock holder handle.
12. pmx_isNullLockHolderHandle
Purpose
    Check if a lock holder handle is the NULL handle.
Syntax
    cd_boolean
    pmx_isNullLockHolderHandle(
      pmx_lockHolderHandle    handle );
Return Value
    If the specified handle is the NULL handle, returns CD_TRUE.
    Upon failure, returns CD_FALSE.
```

Additional software listings for a preferred embodiment of the invention are included as Appendix A, Appendix B, Appendix C, Appendix D, Appendix E, and Appendix F, and all of them are incorporated herein by reference in their entirety.

TABLE I

| Lock Legend |
|---|
| TXL - Tree Exclusive Lock |
| TUL - Tree Update Lock |
| TSL - Tree Share Lock |
| CSL - Class Share Lock |

APPENDIX A

```
VERSION 2.00
Begin Form winTree
   BackColor      =  &H00C0C0C0&
   ClientHeight   =  8415
   ClientLeft     =  1275
   ClientTop      =  525
   ClientWidth    =  14460
   ClipControls   =  0   'False
   Height         =  9105
   Icon           =  WINTREE.FRX:0000
   Left           =  1215
   LinkMode       =  1  'Source
   LinkTopic      =  "Query"
   MDIChild       =  -1  'True
   ScaleHeight    =  8415
   ScaleWidth     =  14460
   Top            =  195
   Visible        =  0   'False
   Width          =  14580
   Begin VideoSoftElastic VSElastic6
      Align          =  5  'Fill Container
      AutoSizeChildren=  4  'Uneven Vertical
      BackColor      =  &H00C0C0C0&
      BevelInner     =  0  'None
      BevelOuter     =  0  'None
      BevelOuterWidth =  0
      BorderWidth    =  0
      ChildSpacing   =  0
      Height         =  8415
      Left           =  0
      TabIndex       =  4
      Top            =  0
      Width          =  14460
      Begin VideoSoftElastic VSElastic1
         AutoSizeChildren=  2  'Uneven Horizontal
         BackColor      =  &H00FFFFFF&
         BevelInner     =  0  'None
         BevelInnerWidth =  0
         BevelOuter     =  0  'None
         BevelOuterWidth =  0
         BorderWidth    =  0
         Height         =  7320
         Left           =  0
         Splitter       =  1  'Yes (with uneven spacing)
         TabIndex       =  23
         Top            =  405
         Width          =  14460
         Begin VideoSoftElastic VSElastic7
            AutoSizeChildren=  4  'Uneven Vertical
            BackColor      =  &H00FFFFFF&
            BevelInner     =  0  'None
            BevelOuter     =  0  'None
            BorderWidth    =  0
            Height         =  7320
            Left           =  7065
            Splitter       =  1  'Yes (with uneven spacing)
            TabIndex       =  25
            Top            =  0
            Width          =  7395
            Begin SpreadSheet Spread1
               AllowResize    =  -1  'True
               AutoCalc       =  0   'False
               AutoClipboard  =  0   'False
               CalcDependencies=  0   'False
               ColHeaderDisplay=  0  'Blank
               DAutoCellTypes =  0   'False
               DAutoFill      =  0   'False
               DAutoHeadings  =  0   'False
               DAutoSave      =  0   'False
               DAutoSizeCols  =  0  'Off
               Prop243        =  0   'False
               DisplayRowHeaders=  0   'False
               FontBold       =  -1  'True
               FontItalic     =  0   'False
               FontName       =  "MS Sans Serif"
               FontSize       =  8.25
               FontStrikethru =  0   'False
               FontUnderline  =  0   'False
               GridColor      =  &H00828282&
               Height         =  4215
               InterfaceDesigner=  WINTREE.FRX:0302
               Left           =  0
               MaxCols        =  6
               MaxRows        =  1
               Protect        =  0   'False
               SelectBlockOptions=  4
               TabIndex       =  26
               Top            =  0
               UnitType       =  2  'Twips
               UserResize     =  1
               Width          =  7395
            End
            Begin VideoSoftElastic ElasticExtAttributes
               AutoSizeChildren=  4  'Uneven Vertical
               BackColor      =  &H00C0C0C0&
               BevelInner     =  0  'None
               BevelOuter     =  0  'None
               BorderWidth    =  0
               ChildSpacing   =  0
               Height         =  3015
               Left           =  0
               TabIndex       =  27
               Top            =  4305
               Width          =  7395
               Begin SpreadSheet Spread2
                  AllowResize    =  -1  'True
                  AutoCalc       =  0   'False
                  AutoClipboard  =  0   'False
                  CalcDependencies=  0   'False
                  ColHeaderDisplay=  0  'Blank
                  DAutoCellTypes =  0   'False
                  DAutoFill      =  0   'False
                  DAutoHeadings  =  0   'False
                  DAutoSave      =  0   'False
                  DAutoSizeCols  =  0  'Off
                  Prop243        =  0   'False
                  DisplayColHeaders=  0   'False
                  DisplayRowHeaders=  0   'False
                  FontBold       =  -1  'True
                  FontItalic     =  0   'False
                  FontName       =  "MS Sans Serif"
                  FontSize       =  8.25
                  FontStrikethru =  0   'False
                  FontUnderline  =  0   'False
                  GridColor      =  &H00828282&
                  Height         =  2715
                  InterfaceDesigner=  WINTREE.FRX:11DE
                  Left           =  0
                  MaxCols        =  6
                  MaxRows        =  1
                  Protect        =  0   'False
                  SelectBlockOptions=  4
                  TabIndex       =  28
                  Top            =  300
                  UnitType       =  2  'Twips
                  UserResize     =  1
                  Width          =  7395
               End
               Begin VideoSoftElastic VSElastic9
                  AutoSizeChildren=  2  'Uneven Horizontal
                  BackColor      =  &H00C0C0C0&
                  BorderWidth    =  4
                  ChildSpacing   =  5
                  Height         =  435
                  Left           =  0
                  TabIndex       =  29
                  Top            =  2580
                  Visible        =  0   'False
                  Width          =  5780
                  Begin VideoSoftElastic lblExtFoundCount
                     BackColor      =  &H00C0C0C0&
                     BorderWidth    =  0
                     ChildSpacing   =  0
                     FontBold       =  0   'False
                     FontItalic     =  0   'False
                     FontName       =  "MS Sans Serif"
                     FontSize       =  8.25
                     FontStrikethru =  0   'False
```

```
            FontUnderline   =   0   'False
            Height          =   315
            Left            =   60
            TabIndex        =   30
            Top             =   60
            Width           =   4785
         End
         Begin CommandButton Command1
            Caption         =   "Update Join Count"
            Height          =   315
            Left            =   4920
            TabIndex        =   31
            Top             =   60
            Width           =   1800
         End
      End
      Begin VideoSoftElastic VSElastic8
         BackColor       =   &H00808080&
         BevelInner      =   0   'None
         BevelOuter      =   0   'None
         BorderWidth     =   0
         Caption         =   "Virtual Attributes"
         CaptionPos      =   4   'Center Center
         Height          =   300
         Left            =   0
         TabIndex        =   32
         Top             =   0
         Width           =   7395
      End
   End
End
Begin TList otlClassTree
   BackColor       =   &H00C0C0C0&
   DragHighlight   =   0   'False
   DragIcon        =   WINTREE.FRX:210D
   ForeColor       =   &H00000000&
   Height          =   7320
   InvStyle        =   2   'Text Inversion
   ItemImageDefHeight=   225
   ItemImageDefWidth=   225
   Left            =   0
   PathSeparator   =   "."
   PictureClosed   =   WINTREE.FRX:240F
   PictureLeaf     =   WINTREE.FRX:24F1
   PictureOpen     =   WINTREE.FRX:25D3
   PictureRoot     =   WINTREE.FRX:26B5
   SelBackColor    =   &H00800000&
   SelForeColor    =   &H00FFFFFF&
   ShiftStep       =   300
   TabIndex        =   24
   TabStopDistance =   0
   Top             =   0
   Width           =   6975
   WidthOfText     =   0
End
End
Begin VideoSoftElastic ButtonBar
   BackColor       =   &H00C0C0C0&
   BevelChildren   =   3   'No Graphical or Elastics
   BevelInner      =   0   'None
   BorderWidth     =   1
   Height          =   690
   Left            =   0
   TabIndex        =   9
   Top             =   7725
   Width           =   14460
   Begin PictureBox PartsButtonBox
      BackColor       =   &H00C0C0C0&
      Height          =   675
      Left            =   0
      ScaleHeight     =   645
      ScaleWidth      =   3825
      TabIndex        =   18
      Top             =   0
      Width           =   3855
      Begin VideoSoftElastic VSElastic3
         Align           =   1   'Align Top
         BackColor       =   &H00C0C0C0&
         BevelChildren   =   3   'No Graphical or Elastics
         BorderWidth     =   0
         Caption         =   "Parts"
         CaptionPos      =   3   'Center Top
         FontBold        =   0   'False
         FontItalic      =   0   'False
         FontName        =   "MS Sans Serif"
         FontSize        =   8.25
         FontStrikethru  =   0   'False
         FontUnderline   =   0   'False
         Height          =   195
         Left            =   0
         TabIndex        =   22
         Top             =   0
         Width           =   3825
      End
      Begin CommandButton btnMakePart
         Caption         =   "&Add"
         Enabled         =   0   'False
         Height          =   375
         Left            =   2520
         TabIndex        =   21
         Top             =   240
         Width           =   1215
      End
      Begin CommandButton btnDisplayParts
         Caption         =   "&Display"
         Height          =   375
         Left            =   60
         TabIndex        =   20
         Top             =   240
         Width           =   1215
      End
      Begin CommandButton btnEditParts
         Caption         =   "&Edit"
         Enabled         =   0   'False
         Height          =   375
         Left            =   1320
         TabIndex        =   19
         Top             =   240
         Width           =   1155
      End
   End
   Begin PictureBox DisplayOrderButtonBox
      BackColor       =   &H00C0C0C0&
      Height          =   675
      Left            =   3840
      ScaleHeight     =   645
      ScaleWidth      =   2385
      TabIndex        =   14
      Top             =   0
      Width           =   2415
      Begin CommandButton btnClearOrder
         Caption         =   "&Clear All"
         Height          =   375
         Left            =   1200
         TabIndex        =   17
         Top             =   240
         Width           =   1095
      End
      Begin CommandButton btnResetOrder
         Caption         =   "&Set All"
         Height          =   375
         Left            =   60
         TabIndex        =   16
         Top             =   240
         Width           =   1095
      End
      Begin VideoSoftElastic VSElastic4
         Align           =   1   'Align Top
         BackColor       =   &H00C0C0C0&
         BevelChildren   =   3   'No Graphical or Elastics
         BorderWidth     =   0
         Caption         =   "Display Order"
         CaptionPos      =   3   'Center Top
         FontBold        =   0   'False
         FontItalic      =   0   'False
         FontName        =   "MS Sans Serif"
         FontSize        =   8.25
         FontStrikethru  =   0   'False
```

```
            FontUnderline   =   0   'False
            Height          =   195
            Left            =   0
            TabIndex        =   15
            Top             =   0
            Width           =   2385
         End
      End
      Begin PictureBox SearchCriteriaButtonBox
         BackColor       =   &H00C0C0C0&
         Height          =   675
         Left            =   6240
         ScaleHeight     =   645
         ScaleWidth      =   2865
         TabIndex        =   10
         Top             =   0
         Width           =   2895
         Begin CommandButton btnClearSelected
            Caption         =   "Clear Se&lected"
            Height          =   375
            Left            =   1260
            TabIndex        =   13
            Top             =   240
            Width           =   1515
         End
         Begin CommandButton btnClearValues
            Caption         =   "Clear &All"
            Height          =   375
            Left            =   60
            TabIndex        =   12
            Top             =   240
            Width           =   1155
         End
         Begin VideoSoftElastic VSElastic5
            Align           =   1  'Align Top
            BackColor       =   &H00C0C0C0&
            BevelChildren   =   3  'No Graphical or Elastics
            BorderWidth     =   0
            Caption         =   "Search Criteria"
            CaptionPos      =   3  'Center Top
            FontBold        =   0  'False
            FontItalic      =   0  'False
            FontName        =   "MS Sans Serif"
            FontSize        =   8.25
            FontStrikethru  =   0  'False
            FontUnderline   =   0  'False
            Height          =   195
            Left            =   0
            TabIndex        =   11
            Top             =   0
            Width           =   2865
         End
      End
   End
   Begin VideoSoftElastic statusBar
      AutoSizeChildren=   1  'Even Horizontal
      BackColor       =   &H00C0C0C0&
      BorderWidth     =   5
      ChildSpacing    =   5
      Height          =   405
      Left            =   0
      TabIndex        =   5
      Top             =   0
      Width           =   14460
      Begin VideoSoftElastic VSElastic2
         AutoSizeChildren=   1  'Even Horizontal
         BackColor       =   &H00C0C0C0&
         BevelOuter      =   0  'None
         BorderWidth     =   0
         Height          =   255
         Left            =   75
         TabIndex        =   6
         Top             =   75
         Width           =   7125
         Begin Label lblFoundCount
            BackColor       =   &H00C0C0C0&
            BackStyle       =   0  'Transparent
            FontBold        =   0  'False
            FontItalic      =   0  'False
            FontName        =   "MS Sans Serif"
            FontSize        =   8.25
            FontStrikethru  =   0  'False
            FontUnderline   =   0  'False
            Height          =   255
            Left            =   0
            TabIndex        =   7
            Tag             =   "0"
            Top             =   0
            Width           =   7125
         End
      End
      Begin Label txtQueryType
         BackColor       =   &H00C0C0C0&
         BackStyle       =   0  'Transparent
         FontBold        =   0  'False
         FontItalic      =   0  'False
         FontName        =   "MS Sans Serif"
         FontSize        =   8.25
         FontStrikethru  =   0  'False
         FontUnderline   =   0  'False
         Height          =   255
         Left            =   7275
         TabIndex        =   8
         Top             =   75
         Width           =   7110
      End
   End
End
Begin CommandButton btnFindClass
   Caption         =   "FindClass"
   Height          =   255
   Left            =   6780
   TabIndex        =   1
   Top             =   0
   Visible         =   0  'False
   Width           =   1455
End
Begin CommandButton btnApply
   Caption         =   "Apply"
   Height          =   255
   Index           =   1
   Left            =   9600
   TabIndex        =   2
   Top             =   0
   Visible         =   0  'False
   Width           =   1395
End
Begin CommandButton btnApply
   Caption         =   "Apply"
   Height          =   255
   Index           =   0
   Left            =   8220
   TabIndex        =   3
   Top             =   0
   Visible         =   0  'False
   Width           =   1395
End
Begin Timer DragDropTimer
   Enabled         =   0  'False
   Interval        =   350
   Left            =   13620
   Top             =   900
End
Begin Label SetInstanceCountEvent
   Caption         =   "Set Instance Count Event"
   Height          =   255
   Left            =   50
   TabIndex        =   0
   Top             =   0
   Visible         =   0  'False
   Width           =   2295
End
Begin Menu mnuFile
   Caption         =   "&File"
   Begin Menu mnuOpen
      Caption         =   "&Open Knowledge Base..."
      Shortcut        =   ^O
   End
```

```
   Begin Menu mnuClose
      Caption         =   "&Close Knowledge Base..."
   End
   Begin Menu mnudash00
      Caption         =   "-"
   End
   Begin Menu mnuPrinterSetup
      Caption         =   "Printer &Setup..."
   End
   Begin Menu mnuPrint
      Caption         =   "&Print"
      Visible         =   0   'False
   End
   Begin Menu mnuFileDash2
      Caption         =   "-"
   End
   Begin Menu mnuExit
      Caption         =   "E&xit"
   End
End
Begin Menu mnuFind
   Caption         =   "F&ind"
   Begin Menu mnuFindClass
      Caption         =   "Find &Class..."
      Shortcut        =   ^F
   End
   Begin Menu mnuFindDash
      Caption         =   "-"
      Visible         =   0   'False
   End
   Begin Menu mnuSearchOtherDatabases
      Caption         =   "&Search Other Knowledge Bases..."
      Shortcut        =   ^S
      Visible         =   0   'False
   End
End
Begin Menu mnuOptions
   Caption         =   "&Options"
   Begin Menu mnuSplitH
      Caption         =   "Split &Horizontal"
   End
   Begin Menu mnuSplitV
      Caption         =   "Split &Vertical"
      Checked         =   -1  'True
   End
   Begin Menu mnudash001
      Caption         =   "-"
   End
   Begin Menu mnuAttributeDisplay
      Caption         =   "&Root Attribute Display..."
   End
   Begin Menu mnuVirtualAttributes
      Caption         =   "&Virtual Attributes"
   End
   Begin Menu Dash3
      Caption         =   "-"
   End
   Begin Menu mnuLocalQuery
      Caption         =   "&Local Query"
   End
   Begin Menu mnucpdash
      Caption         =   "-"
   End
   Begin Menu mnuSetStartingClass
      Caption         =   "&Set Starting Class..."
   End
   Begin Menu mnudash102
      Caption         =   "-"
   End
   Begin Menu mnuChangePassword
      Caption         =   "&Change Password..."
   End
End
Begin Menu mnuTools
   Caption         =   "&Tools"
   Begin Menu mnuSchemaEditor
      Caption         =   "&Schema Developer"
   End
   Begin Menu mnuUserActions
      Caption         =   "&User Actions..."
   End
End
Begin Menu mnuWindow
   Caption         =   "&Window"
   WindowList      =   -1  'True
   Begin Menu mnuCascade
      Caption         =   "&Cascade"
   End
   Begin Menu mnuTile
      Caption         =   "&Tile"
   End
   Begin Menu mnuArrangeIcons
      Caption         =   "&Arrange Icons"
   End
End
Begin Menu mnuHelp
   Caption         =   "&Help"
   Begin Menu mnuAbout
      Caption         =   "&About..."
   End
End
Begin Menu mnuPopAttribute
   Caption         =   "mnuPopAttribute"
   Visible         =   0   'False
   Begin Menu mnuSetOrder
      Caption         =   "Set Order"
   End
   Begin Menu mnudash0
      Caption         =   "-"
   End
   Begin Menu mnuPopSetCriteria
      Caption         =   "Set Criteria"
   End
   Begin Menu mnuClearCriteria
      Caption         =   "Clear Criteria"
   End
End
Begin Menu mnuPopAllAttributes
   Caption         =   "mnuPopAllAttributes"
   Visible         =   0   'False
   Begin Menu mnuClearAllCriteria
      Caption         =   "Clear All Criteria"
   End
   Begin Menu mnudash
      Caption         =   "-"
   End
   Begin Menu mnuPopSetAllOrder
      Caption         =   "Set All Order"
   End
   Begin Menu mnuClearAllOrder
      Caption         =   "Clear All Order"
   End
End
Begin Menu mnuPopFillAttributes
   Caption         =   "mnuPopFillAttributes"
   Visible         =   0   'False
   Begin Menu mnuDoNotFillRootAttributes
      Caption         =   "Do Not Set Root Attributes"
   End
   Begin Menu mnuFillRootAttributes
      Caption         =   "Set Root Attributes"
   End
End
End
'This program is the confidential and proprietary product of CADIS, Inc.
'Any unauthorized use, reproduction or transfer of this program is
'strictly prohibited.
'                    Copyright 1993 by CADIS, Inc.

Dim DatabaseHandle As Long
Dim MyKBSearchOrder() As Integer
Dim LockHolder As Long
Dim ActiveSpreadSheet As Control
Dim ExternalAttributes As Integer
Dim InCollapseEvent As Integer
Dim QPLoaded As Integer

Dim QueryResultHandle As Long
```

```
Dim ColRect As RECT
Dim OldListIndex As Integer
Dim QueryHandle As Long
Dim LocalX As Single
Dim LocalY As Single
Dim CLEAR_UNDEFINED As Integer
Dim NewRect As RECT
Dim PrevRect As RECT

Dim Attributes() As AttributeStructure
Dim oldAttributes() As AttributeStructure
Dim ExtAttributes() As AttributeStructure

Dim oldAttributeCount As Long
Dim AttributeCount As Long
Dim ExtAttributeCount As Long
Dim LocalQuery As Integer

'Column titles for search window
Const SEARCH_COL_ORDER = 1
Const SEARCH_COL_ATTRIBUTE = 2
Const SEARCH_COL_PROTECTED = 3
Const SEARCH_COL_BUTTON = 4
Const SEARCH_COL_CRITERIA = 5
Const SEARCH_COL_UNDEFINED = 6
Const SEARCH_COL_PRIMARYKEY = 7

Sub ActivateClass ()

CUR_SUB = "Sub ActivateClass"
On Error GoTo VB_ERR_ActivateClass

    Dim ListIndex As Integer
    Dim thisClassHandle As Long, oldClassHandle  As Long
    Dim oldQueryHandle As Long

    ListIndex = otlClassTree.ListIndex
    If ListIndex = -1 Then
    otlClassTree.ListIndex = 0
    End If

    If ListIndex = OldListIndex And Me.Visible = True Then
    Exit Sub
    End If

    oldClassHandle = otlClassTree.ItemLngValue(OldListIndex)
    thisClassHandle = otlClassTree.ItemLngValue(ListIndex)

    'check to see if this window conflicts with other windows in this lock holder spa
    ret% = pmx_checkSelfConflictLock(DatabaseHandle, LockHolder, thisClassHandle, PMX
    If ret% = CD_TRUE Then
    ret% = pmx_requestLock(DatabaseHandle, LockHolder, thisClassHandle, PMX_CLASS_S_L
    If ret% = CD_FALSE Then
        DragDropTimer.Enabled = False
        pmx_error
        If ListIndex > 0 Then
        otlClassTree.ListIndex = OldListIndex
        End If
        Exit Sub
    End If
    Else
    DragDropTimer.Enabled = False
    pmx_error
    If ListIndex > 0 Then
        otlClassTree.ListIndex = OldListIndex
    End If
    Exit Sub
    End If

    OldListIndex = ListIndex

    ret% = pmx_releaseLock(DatabaseHandle, LockHolder, oldClassHandle, PMX_CLASS_S_LC
    If ret% = CD_FALSE Then
    pmx_error
    End If

    Screen.MousePointer = 11

    oldAttributeCount = AttributeCount

    If AttributeCount > 0 Then
    'save old attributes
    ReDim oldAttributes(AttributeCount - 1)
    For x% = 0 To AttributeCount - 1
        oldAttributes(x%).AttributeHandle = Attributes(x%).AttributeHandle
        oldAttributes(x%).AttributeType = Attributes(x%).AttributeType
        oldAttributes(x%).AttributeTitle = Attributes(x%).AttributeTitle
        oldAttributes(x%).AttributeOrder = Attributes(x%).AttributeOrder
        oldAttributes(x%).UnitFamily = Attributes(x%).UnitFamily
        oldAttributes(x%).LocalAttribute = Attributes(x%).LocalAttribute
        oldAttributes(x%).Protected = Attributes(x%).Protected
        oldAttributes(x%).Required = Attributes(x%).Required
    Next x%
    End If

    'Fill in the attribute names for this class
    FillAttributes thisClassHandle

    'Initialize a new query handle
    oldQueryHandle = QueryHandle

    QueryHandle = pmx_createQuery(DatabaseHandle, thisClassHandle)
    If pmx_isNullQueryHandle(QueryHandle) = CD_TRUE Then
    DragDropTimer.Enabled = False
    pmx_error
    Exit Sub
    End If
    FormData(Me.Tag).QueryHandle = QueryHandle

    setQueryToNewClass oldQueryHandle, QueryHandle, oldClassHandle

    ret% = pmx_destroyQuery(DatabaseHandle, oldQueryHandle)
    If ret% = CD_FALSE Then
    DragDropTimer.Enabled = False
    pmx_error
    End If

    If Me.Visible = True Then
    'Do not allow any other events to happen during this search
    ret% = StartQueryProgress(True)
    Else
    SetInstanceCountEvent.Caption = True
    End If

VB_ERR_ActivateClass:
Screen.MousePointer = 0
If Err <> 0 Then
    ExitPmx DatabaseHandle
End If

End Sub

Function areExternalProjectorsSet () As Integer

    areExternalProjectorsSet = False

    For x1 = 0 To Spread2.MaxRows - 1
    If ExtAttributes(x1).AttributeOrder <> -1 Then
        areExternalProjectorsSet = True
        Exit For
    End If
    Next x1

End Function

Function areExternalSelectorsSet () As Integer

    areExternalSelectorsSet = False

    For x1 = 0 To Spread2.MaxRows - 1
    ret% = SpreadGetText(Spread2, SEARCH_COL_CRITERIA, x1 + 1, tmpstr$
    If ret% = True Then
        areExternalSelectorsSet = True
        Exit For
    End If
    ret% = SpreadGetText(Spread2, SEARCH_COL_UNDEFINED, x1 + 1, tmpstr$)
    If tmpstr$ = "1" Then
```

```
            areExternalSelectorsSet = True
            Exit For
        End If
        Next xl

    End Function

    Sub btnApply_Click (Index As Integer)

        Dim thisInstance As Long
        Dim thisClassHandle As Long
        Dim thisClassDescriptor As Long
        Dim ClassName As String
        Dim AttributeCount As Long, xl As Long

        thisClassHandle = pmx_getRoot(DatabaseHandle)
        AttributeCount = pmx_getAttributeCount(DatabaseHandle, thisClassHandle)

        If Index = 1 Then
        For xl = 0 To AttributeCount - 1
            If Attributes(xl).Hidden = True Then
            ret% = MsgBox("One or more root attributes are hidden.  Apply will display al
            If ret% = IDOK Then
                CLEAR_UNDEFINED = True
                ClearAllAttributeValues
                CLEAR_UNDEFINED = False

                Spread1.ReDraw = False
                For x& = 0 To AttributeCount - 1
                Attributes(x&).Hidden = False
                Spread1.Row = x& + 1
                Spread1.RowHidden = False
                Next x&
                Spread1.ReDraw = True
            Else
                Exit Sub
            End If
            End If
        Next xl
        End If

        thisInstance = FormData(Me.Tag).instanceHandle

        thisClassHandle = pmx_getOwnerOfInstance(DatabaseHandle, thisInstance)

        Spread1.ReDraw = False
        otlClassTree.Redraw = False
        OldListIndex = GoToClass(DatabaseHandle, otlClassTree, thisClassHandle, LockHolde
        otlClassTree.Redraw = True

        CLEAR_UNDEFINED = True
        ClearAllAttributeValues
        CLEAR_UNDEFINED = False

        FillAttributes thisClassHandle

        If Index = 1 Then
        FillAttributeValues DatabaseHandle, thisClassHandle, thisInstance, False, True
        Else
        FillAttributeValues DatabaseHandle, thisClassHandle, thisInstance, False, False
        End If

        SetInstanceCountEvent.Caption = True

        Spread1.ReDraw = True

    End Sub

    Sub btnApplyFillRootAttributes_Click ()
        For xl = 0 To AttributeCount - 1
        If Attributes(xl).Hidden = True Then
            ret% = MsgBox("One or more root attributes are hidden.  Apply will display al
            If ret% = IDOK Then
            CLEAR_UNDEFINED = True
            ClearAllAttributeValues
            CLEAR_UNDEFINED = False
            Spread1.ReDraw = False
            For x& = 0 To AttributeCount - 1
                Attributes(x&).Hidden = False
                Spread1.Row = x& + 1
                Spread1.RowHidden = False
            Next x&
            Spread1.ReDraw = True
            Exit For
            Else
            Exit Sub
            End If
        End If
        Next xl
    End Sub

    Sub btnClearOrder_Click ()

    CUR_SUB = "Sub btnClearOrder_Click"
    On Error GoTo VB_ERR_btnClearOrder_Click

        Spread1.Col = SEARCH_COL_ORDER

        For x% = 0 To UBound(Attributes
        Spread1.Row = x% + 1
        Spread1.TypeButtonText = ""
        Attributes(x%).AttributeOrder = -1
        Next x%

        If Spread2.Visible Then
        Spread2.Col = SEARCH_COL_ORDER
        For x% = 0 To UBound(ExtAttributes)
            Spread2.Row = x% + 1
            Spread2.TypeButtonText = ""
            ExtAttributes(x%).AttributeOrder = -1
        Next x%
        End If

    VB_ERR_btnClearOrder_Click:
    If Err <> 0 Then
        ExitPmx DatabaseHandle
    End If

    End Sub

    Sub btnClearSelected_Click ()

    CUR_SUB = "Sub btnClearSelected_Click"
    On Error GoTo VB_ERR_btnClearSelected_Click

        Dim Row As Long, Row2 As Long

        ActiveSpreadSheet.Redraw = False

        If ActiveSpreadSheet.SelBlockRow = -1 Then Exit Sub

        If ActiveSpreadSheet.SelBlockRow2 = -1 Then
        Row2 = ActiveSpreadSheet.SelBlockRow
        Else
        Row2 = ActiveSpreadSheet.SelBlockRow2
        End If

        CLEAR_UNDEFINED = True
        For x% = ActiveSpreadSheet.SelBlockRow To Row2
        Row = x%
        If Row > 0 Then
            If ActiveSpreadSheet Is Spread1 Then
            ret% = pmx_resetQuerySelector(DatabaseHandle, QueryHandle, Attributes(Row
            If ret% = CD_FALSE Then
                pmx_error
            End If
            End If
            ActiveSpreadSheet.Row = Row
            ActiveSpreadSheet.Col = SEARCH_COL_CRITERIA
            ActiveSpreadSheet.Action = SS_ACTION_CLEAR_TEXT
            ActiveSpreadSheet.Col = SEARCH_COL_UNDEFINED
            ActiveSpreadSheet.Text = 0
        End If
        Next x%
        CLEAR_UNDEFINED = False

        ActiveSpreadSheet.Action = SS_ACTION_DESELECT_BLOCK
```

```
    SetInstanceCountEvent.Caption = True

    ActiveSpreadSheet.Redraw = True

VB_ERR_btnClearSelected_Click:
If Err <> 0 Then
    ExitPmx DatabaseHandle
End If

End Sub

Sub btnClearValues_Click ()

CUR_SUB = "Sub btnClearValues_Click"
On Error GoTo VB_ERR_btnClearValues_Click

    CLEAR_UNDEFINED = True
    ClearAllAttributeValues
    CLEAR_UNDEFINED = False

VB_ERR_btnClearValues_Click:
If Err <> 0 Then
    ExitPmx DatabaseHandle
End If

End Sub

Sub btnDisplayParts_Click ()

CUR_SUB = "Sub btnDisplayParts_Click"
On Error GoTo VB_ERR_btnDisplayParts_Click

    Me.Enabled = False

    Dim thisLockHolder As Long

    If GetMaxIndex() = 0 Then
    Screen.MousePointer = 0
    MsgBox "Display order must be set before you can display parts.", 48
    GoTo VB_ERR_btnDisplayParts_Click
    End If

    thisLockHolder = pmx_startLockHolder(DatabaseHandle)
    If thisLockHolder = -1 Then
    pmx_error
    GoTo VB_ERR_btnDisplayParts_Click
    End If

    ret% = pmx_requestLock(DatabaseHandle, thisLockHolder, otlClassTree.ItemLngValue(
    If ret% = CD_FALSE Then
    pmx_error
    GoTo VB_ERR_btnDisplayParts_Click
    End If

    If SetGlobalSearchData() = True Then
    Dim newPartsWin As New dlgPartList
    Dim thisClassHandle As Long

    thisClassHandle = otlClassTree.ItemLngValue(otlClassTree.ListIndex)

    globalSlot = CreateSlot()

    CreateWindowStructure DatabaseHandle, thisClassHandle, thisLockHolder, FormData(M

    newPartsWin.Show
    End If

VB_ERR_btnDisplayParts_Click:
Me.Enabled = True
If Err <> 0 Then
    ExitPmx DatabaseHandle
End If

End Sub

Sub btnEditParts_Click ()

CUR_SUB = "Sub btnEditParts_Click"
On Error GoTo VB_ERR_btnEditParts_Click

    Me.Enabled = False

    If ExternalAttributes = CD_TRUE Then
    If areExternalSelectorsSet() = True Or areExternalProjectorsSet() = True Then
        MsgBox "Cannot edit parts with external attribute values set or order set.
        GoTo VB_ERR_btnEditParts_Click
    End If
    End If

    For x& = Forms.Count - 1 To 0 Step -1
    If TypeOf Forms(x&) Is winPartsEditor Then
        If FormData(Forms(x&).Tag).Deleted = False And FormData(Forms(x&).Tag).DBH
        MsgBox "Only one Part Editor Window can be open per Part Specification Wir
        GoTo VB_ERR_btnEditParts_Click
        End If
    End If
    Next x&

    For x& = Forms.Count - 1 To 0 Step -1
    If TypeOf Forms(x&) Is winSchemaEditor Then
        If FormData(Forms(x&).Tag).Deleted = False And FormData(Forms(x&).Tag).DBH
        MsgBox "A Part Editor Window can not be active when a Schema Developer Wir
        GoTo VB_ERR_btnEditParts_Click
        End If
    End If
    Next x&

    If GetMaxIndex() = 0 Then
    Screen.MousePointer = 0
    MsgBox "Display order must be set before you can edit parts.", 48
    GoTo VB_ERR_btnEditParts_Click
    End If

    If SetGlobalSearchData() = True Then
    Dim newEditWin As New winPartsEditor
    Dim thisClassHandle As Long

    ret% = pmx_requestLock(DatabaseHandle, LockHolder, otlClassTree.ItemLngValue(c
    If ret% = CD_FALSE Then
        Screen.MousePointer = 0
        pmx_error
        GoTo VB_ERR_btnEditParts_Click
    End If

    thisClassHandle = otlClassTree.ItemLngValue(otlClassTree.ListIndex)

    globalSlot = CreateSlot()

    CreateWindowStructure DatabaseHandle, thisClassHandle, LockHolder, FormData(Me

    newEditWin.Show
    End If

VB_ERR_btnEditParts_Click:
Me.Enabled = True
If Err <> 0 Then
    ExitPmx DatabaseHandle
End If

End Sub

Sub btnFindClass_Click ()

CUR_SUB = "Sub btnFindClass_Click"
On Error GoTo VB_ERR_btnFindClass_Click

    Screen.MousePointer = 11

    Dim thisClassHandle As Long
    Dim thisClassDescriptor As Long
    Dim ClassName As String

    thisClassHandle = FormData(Me.Tag).tmpClassHandle

    otlClassTree.Redraw = False
    tmpListIndex% = GoToClass(DatabaseHandle, otlClassTree, thisClassHandle, LockH
```

```
ctlClassTree.ListIndex = tmpListIndex%
OldListIndex = tmpListIndex%
ctlClassTree.Redraw = True

Screen.MousePointer = 0

VB_ERR_btnFindClass_Click:
If Err <> 0 Then
    ExitPmx DatabaseHandle
End If

End Sub

Sub btnMakePart_Click ()
    MakePart
End Sub

Sub btnResetOrder_Click ()

CUR_SUB = "Sub btnResetOrder_Click"
On Error GoTo VB_ERR_btnResetOrder_Click

    Dim Counter As Integer

    Counter = 1

    Spread1.Col = SEARCH_COL_ORDER
    For x% = 0 To AttributeCount - 1
    If Attributes(x%).Hidden = False Then
        Spread1.Row = x% + 1
        Attributes(x%).AttributeOrder = Counter
        Spread1.TypeButtonText = CStr(Counter)
        Counter = Counter + 1
    End If
    Next x%

    If Spread2.Visible Then
    Spread2.Col = SEARCH_COL_ORDER
    For x% = 0 To UBound(ExtAttributes)
        Spread2.Row = x% + 1
        ExtAttributes(x%).AttributeOrder = Counter
        Spread2.TypeButtonText = CStr(Counter)
        Counter = Counter + 1
    Next x%
    End If

VB_ERR_btnResetOrder_Click:
If Err <> 0 Then
    ExitPmx DatabaseHandle
End If

End Sub

Sub ChangeOrder (Row As Long, ctl As Control, theseAttributes()  As AttributeStructure

CUR_SUB = "Sub ChangeOrder"
On Error GoTo VB_ERR_ChangeOrder

    Dim NewValue As Integer
    Dim OldValue As Integer
    Dim maxIndex As Integer

    OldValue = theseAttributes(Row - 1).AttributeOrder

    maxIndex = GetMaxIndex()

    If OldValue > 0 Then 'Do not Display
    maxIndex = maxIndex - 1
    NewValue = -1
    Else
    maxIndex = maxIndex + 1
    NewValue = maxIndex
    End If

    theseAttributes(Row - 1).AttributeOrder = NewValue

    ctl.Col = SEARCH_COL_ORDER
    ctl.Row = Row
    ctl.TypeButtonText = ""

    If NewValue = -1 Then
    For x% = 0 To UBound(Attributes)
        If Attributes(x%).AttributeOrder > OldValue And Attributes(x%).AttributeOr
        Attributes(x%).AttributeOrder = Attributes(x%).AttributeOrder - 1
        Spread1.Row = x% + 1
        Spread1.TypeButtonText = CStr(Attributes(x%).AttributeOrder)
        End If
    Next x%
    If ExternalAttributes Then
        For x% = 0 To UBound(ExtAttributes)
        If ExtAttributes(x%).AttributeOrder > OldValue And ExtAttributes(x%).Attri
            ExtAttributes(x%).AttributeOrder = ExtAttributes(x%).AttributeOrder -
            Spread2.Row = x% + 1
            Spread2.TypeButtonText = CStr(ExtAttributes(x%).AttributeOrder)
        End If
        Next x%
    End If
    Else
    ctl.Row = Row
    ctl.TypeButtonText = CStr(NewValue)
    End If

VB_ERR_ChangeOrder:
If Err <> 0 Then
    ExitPmx DatabaseHandle
End If

End Sub

Sub ClearAllAttributeValues

CUR_SUB = "Sub ClearAllAttributeValues"
On Error GoTo VB_ERR_ClearAllAttributeValues

    Dim thisClassHandle  As Long
    Dim ListIndex As Long

    ListIndex = ctlClassTree.ListIndex
    If ListIndex < 0 Then ListIndex = 0

    thisClassHandle = ctlClassTree.ItemLngValue(ListIndex)

    'Initialize a new query handle
    ret% = pmx_destroyQuery(DatabaseHandle, QueryHandle)
    If ret% = CD_FALSE Then
    pmx_error
    End If

    QueryHandle = pmx_createQuery(DatabaseHandle, thisClassHandle)
    If pmx_isNullQueryHandle(QueryHandle) = CD_TRUE Then
    pmx_error
    Exit Sub
    End If
    FormData(Me.Tag).QueryHandle = QueryHandle

    Spread1.Row = -1
    Spread1.Col = SEARCH_COL_CRITERIA
    Spread1.Action = SS_ACTION_CLEAR_TEXT

    Spread1.Col = SEARCH_COL_UNDEFINED
    Spread1.Action = SS_ACTION_CLEAR_TEXT

    If Spread2.Visible Then
    Spread2.Row = -1
    Spread2.Col = SEARCH_COL_CRITERIA
    Spread2.Action = SS_ACTION_CLEAR_TEXT

    Spread2.Col = SEARCH_COL_UNDEFINED
    Spread2.Action = SS_ACTION_CLEAR_TEXT

    lblExtFoundCount.ForeColor = RED
    lblExtFoundCount = "Join Search Parts: ?"
    End If

    SetInstanceCountEvent.Caption = True

VB_ERR_ClearAllAttributeValues:
If Err <> 0 Then
```

```
        ExitPmx DatabaseHandle
    End If

    End Sub

    Sub closeAssociatedWindows ()
        'Close associated part edit and search result windows initialized from this retri
        y% = Forms.Count - 1
        For x% = y% To 1 Step -1
        If IsNumeric(CVar(Forms(x%).Tag)) Then
            If Forms(x%).Tag >= 100 Then
            curIndex = Forms(x%).Tag
            If FormData(curIndex).DBHandle = DatabaseHandle And FormData(curIndex).Owning
                Unload Forms(x%)
            End If
            End If
        End If
        Next x%
    End Sub

    Sub DragDropTimer_Timer ()

    CUR_SUB = "Sub DragDropTimer_Timer"
    On Error GoTo VB_ERR_DragDropTimer_Timer

        BeginDragMode Me.ActiveControl, GLOBAL_DRAG_MASK
        DragDropTimer.Enabled = False

    VB_ERR_DragDropTimer_Timer:
    If Err <> 0 Then
        ExitPmx DatabaseHandle
    End If

    End Sub

    Sub ElasticExtAttributes_ResizeChildren ()
        If Spread2.Height <= 244 Then
        Spread1.ScrollBars = 3
        Spread2.ScrollBars = 2
        Else
        Spread1.ScrollBars = 2
        Spread2.ScrollBars = 3
        End If
    End Sub

    Function ExternalJoin (JoinHandle As Long, SetSelectors As Integer, SetProjectors As

    CUR_SUB = "Sub ExternalJoin"
    On Error GoTo VB_ERR_ExternalJoin

        Dim x1 As Long, ExtJoinQueryCountDesc As Long, ProjectionList()  As Long
        Dim ProjectionCount As Long

        ExternalJoin = False

        JoinHandle = -1
        SetSelectors = False
        SetProjectors = False
        JoinCount = 0

        SetSelectors = areExternalSelectorsSet()
        SetProjectors = areExternalProjectorsSet()

        If SetSelectors = False And SetProjectors = False Then
        Exit Function
        End If

        PrimaryKey = getExtPrimaryKey(Attributes())
        If pmx_isNullAttributeHandle(PrimaryKey) = CD_TRUE Then
        MsgBox "A primary key attribute was not found.", 48
        Exit Function
        End If

        JoinCount = pmx_getQueryResultCount(DatabaseHandle, QueryResultHandle)

        If SetSelectors = False Then
        If JoinCount <= EXTJOINCOUNT Then
            JoinHandle = pmx_createExtJoin(DatabaseHandle, PrimaryKey, QueryResultHandle,
        Else
            JoinHandle = pmx_createExtJoin(DatabaseHandle, PrimaryKey, QueryResultHanc
        End If
        If JoinHandle = -1 Then
            pmx_error
            Exit Function
        End If
        ExternalJoin = True
        Exit Function
        Else
        JoinHandle = pmx_createExtJoin(DatabaseHandle, PrimaryKey, QueryResultHandle,
        If JoinHandle = -1 Then
            pmx_error
            Exit Function
        End If
        End If

        'set external selectors
        SetSelectors = False
        For x1 = 0 To Spread2.MaxRows - 1
        ret% = SpreadGetText(Spread2, SEARCH_COL_CRITERIA, x1 + 1, attributeValue)
        If ret% = True Then
            ret% = pmx_setExtStringSelector(DatabaseHandle, JoinHandle, ExtAttributes(
            If ret% = CD_FALSE Then
            pmx_error
            Else
            SetSelectors = True
            End If
        End If
        ret% = SpreadGetText(Spread2, SEARCH_COL_UNDEFINED, x1 + 1, tmpstr$)
        If tmpstr$ = "1" Then
            ret% = pmx_setExtSelectorUndefined(DatabaseHandle, JoinHandle, ExtAttribut
            If ret% = CD_FALSE Then
            pmx_error
            Else
            SetSelectors = True
            End If
        End If
        Next x1

        'create projection list
        ProjectionCount = 0
        ReDim ProjectionList(UBound(ExtAttributes))
        For x1 = 0 To UBound(ExtAttributes)
        If ExtAttributes(x1).AttributeOrder <> -1 Then
            ProjectionList(ProjectionCount) = ExtAttributes(x1).AttributeHandle
            ProjectionCount = ProjectionCount + 1
        End If
        Next x1&

        If ProjectionCount = 0 Then
        ExtJoinQueryCountDesc = pmx_joinQueryCount(DatabaseHandle, JoinHandle, 0&, 0&)
        ElseIf ProjectionCount > 0 Then
        ReDim Preserve ProjectionList(ProjectionCount - 1)
        ExtJoinQueryCountDesc = pmx_joinQueryCount(DatabaseHandle, JoinHandle, Project
        End If

        If ExtJoinQueryCountDesc = 0& Then
        pmx_error
        Exit Function
        End If

        JoinCount = pmx_getExtUniqueItemCount(ExtJoinQueryCountDesc)
        If JoinCount < 0 Then
        pmx_error
        End If

        ret% = pmx_freeExtJoinQueryCountDesc(ExtJoinQueryCountDesc)
        If ret% = CD_FALSE Then
        pmx_error
        End If

        ExternalJoin = True

    VB_ERR_ExternalJoin:
    If Err <> 0 Then
        ExitPmx DatabaseHandle
    End If

    End Function
```

```
'5 5 94 JDM BUGID 558 - Changed GetAttributeInfo to use attributeCount to determin if
Sub FillAttributes (thisClassHandle As Long)

CUR_SUB = "Sub FillAttributes"
On Error GoTo VB_ERR_FillAttributes

    Dim thisDescriptor As Long, x As Long

    If Spread1.ReDraw = False Then
    TurnRedrawBackOn% = False
    Else
    Spread1.ReDraw = False
    TurnRedrawBackOn% = True
    End If

    DragDropTimer.Enabled = False

    AttributeCount = GetAttributeInfo(DatabaseHandle, thisClassHandle, Attributes(),

    If Spread1.TopRow <> 0 Then
    Spread1.TopRow = 0
    End If

    'Delete leftovers from spread sheet
    If AttributeCount < Spread1.MaxRows Then
    Spread1.Row = AttributeCount + 1
    Spread1.Row2 = Spread1.MaxRows
    Spread1.BlockMode = True
    Spread1.Action = SS_ACTION_DELETE_ROW
    Spread1.BlockMode = False
    End If

    ' Now that leftovers have been deleted, we can set maxrows
    ' to reflect the current attribute count
    If AttributeCount <> Spread1.MaxRows Then
    Spread1.MaxRows = AttributeCount
    End If

    If AttributeCount = 0 Then
    btnEditParts.Enabled = False
    btnDisplayParts.Enabled = False
    btnResetOrder.Enabled = False
    btnClearOrder.Enabled = False
    btnClearSelected.Enabled = False
    btnClearValues.Enabled = False
    Spread1.ReDraw = True
    Spread1.Refresh
    Exit Sub
    Else
    btnResetOrder.Enabled = True
    btnClearOrder.Enabled = True
    btnClearSelected.Enabled = True
    btnClearValues.Enabled = True
    End If

    For x = 0& To AttributeCount - 1
    Spread1.Row = x + 1
    If Attributes(x).FreshMeat = True Then

        'place text in grid
        SpreadSetText Spread1, SEARCH_COL_ATTRIBUTE, x + 1&, Attributes(x).AttributeT
        SpreadSetText Spread1, SEARCH_COL_CRITERIA, x + 1&, ""

        Spread1.Col = SEARCH_COL_PROTECTED
        Spread1.TypeButtonPicture = LoadPicture()
        If Attributes(x).Protected = True Then
        Spread1.TypeButtonPicture = PMX.picProtected.Picture
        ElseIf Attributes(x).Required = True Then
        Spread1.TypeButtonPicture = PMX.picRequired.Picture
        End If

        Spread1.Col = SEARCH_COL_BUTTON
        'place picture in grid
        Select Case Attributes(x).AttributeType
        Case PMX_ATTRIBUTE_ENUMERATION
            Spread1.TypeButtonPicture = PMX.picEnum
        Case PMX_ATTRIBUTE_NUMERIC
            Spread1.TypeButtonPicture = PMX.picNum
        Case PMX_ATTRIBUTE_BOOLEAN
            Spread1.TypeButtonPicture = PMX.picBool
        Case PMX_ATTRIBUTE_STRING
            Spread1.TypeButtonPicture = PMX.picText
        Case PMX_ATTRIBUTE_STRINGARRAY
            Spread1.TypeButtonPicture = PMX.picEnumText
        Case Else
        End Select

        Spread1.Col = SEARCH_COL_UNDEFINED
        CLEAR_UNDEFINED = True
        Spread1.Text = ""
        CLEAR_UNDEFINED = False
    End If

    Spread1.Col = SEARCH_COL_ORDER
    If Attributes(x).AttributeOrder = -1 And Spread1.TypeButtonText <> "" Then
        Spread1.TypeButtonText = ""
    ElseIf Attributes(x).AttributeOrder <> -1 And Spread1.TypeButtonText <> CStr(A
        Spread1.TypeButtonText = CStr(Attributes(x).AttributeOrder
    End If

    thisDescriptor = pmx_getSingleMetaParameter(DatabaseHandle, Attributes(x).Attr
    If thisDescriptor > 0 Then
        HiddenAttribS = c2vbStr(pmx_getSingleStringElement(thisDescriptor, False)
        ret% = pmx_freeSingleStringDescriptor(thisDescriptor)
        If HiddenAttribS <> "" Then
        Spread1.RowHidden = True
        End If
    End If

    Next x

    If TurnRedrawBackOn% = True Then
    Spread1.ReDraw = True
    End If

VB_ERR_FillAttributes:
If Err <> 0 Then
    ExitPmx DatabaseHandle
End If

End Sub

Sub FillAttributeValues (thisDatabaseHandle As Long, thisClassHandle As Long, thi

CUR_SUB = "Sub FillAttributeValues"
On Error GoTo VB_ERR_FillAttributeValues

    Dim thisParameterDescriptor As Long, thisAttributeDescriptor As Long, theseAtt
    Dim thisAttributeType As Long, thisAttributeHandle As Long
    Dim thisConvertedValue As Long
    Dim x As Long, i As Long
    Dim Pic As Integer
    Dim attributeStr As String
    Dim tmpstr As String
    Dim tmpHandle As Long, thisAttributeCount As Long, rootAttributeCount As Long
    Dim handleMatch As Integer

    theseAttributeDescriptors = pmx_getAttributeDescriptorSet(thisDatabaseHandle,
    If theseAttributeDescriptors = 0 Then
    pmx_error
    Exit Sub
    End If

    thisAttributeCount = pmx_getAttributeCount(DatabaseHandle, thisClassHandle)
    If thisAttributeCount < 0 Then
    pmx_error
    Exit Sub
    ElseIf thisAttributeCount = 0 Then
    Exit Sub
    End If

    If SetRoot = True Then
    rootAttributeCount = 0
    Else
    rootAttributeCount = pmx_getAttributeCount(DatabaseHandle, pmx_getRoot(thisDa
    End If
```

```
For x = rootAttributeCount To thisAttributeCount - 1
attributeStr = ""

thisAttributeDescriptor = pmx_getADSIthDescriptor(theseAttributeDescriptors, x)
If thisAttributeDescriptor = 0& Then
    pmx_error
    Exit Sub
End If

thisAttributeHandle = pmx_getAttributeAttributeHandle(thisAttributeDescriptor)
If pmx_isNullAttributeHandle(thisAttributeHandle) = CD_TRUE Then
    pmx_error
    Exit Sub
End If

handleMatch = False
For i = rootAttributeCount To AttributeCount - 1
    If thisAttributeHandle = Attributes(i).AttributeHandle Then
    handleMatch = True
    Exit For
    End If
Next i

If handleMatch = True Then
    thisParameterDescriptor = pmx_getParameterDescriptor(thisDatabaseHandle, this
    If thisParameterDescriptor = 0 Then
    pmx_error
    Exit Sub
    End If

    'Determine if this attribute is set to undefined
    If (pmx_getParameterCode(thisParameterDescriptor)) <> PMX_PARAMETER_UNDEFINED
    Select Case Attributes(i).AttributeType
        Case PMX_ATTRIBUTE_ENUMERATION
        tmpHandle = pmx_getParameterEnumeratorHandle(thisParameterDescriptor)

        If pmx_isNullEnumeratorHandle(tmpHandle) = CD_FALSE Then
            ret% = pmx_setEnumeratedSelector(DatabaseHandle, QueryHandle, Attribu
            If ret% = CD_TRUE Then
            attributeStr = c2vbStr(pmx_getParameterEnumeratorName(thisParameterDe
            End If
        End If
        Case PMX_ATTRIBUTE_NUMERIC
        pmx_getParameterNumericForVB thisParameterDescriptor, retFloat!

        tmpHandle = pmx_getParameterUnitHandle(thisParameterDescriptor)
        If pmx_isNullUnitHandle(tmpHandle) = CD_FALSE Then
            ret% = pmx_setNumericSelector(DatabaseHandle, QueryHandle, Attributes
            If ret% = CD_TRUE Then
            'get the unit for this instance
            thisConvertedValue = pmx_convertBaseToNumericUnit(thisDatabaseHandle,
            unitStr$ = c2vbStr(pmx_getNumericConversionUnitName(thisConvertedValu

            ret% = pmx_freeNumericConvertedValue(thisConvertedValue)
            If ret% = CD_FALSE Then
                pmx_error
            End If

            attributeStr = CStr(retFloat!) + " " + unitStr$
            End If
        End If

        Case PMX_ATTRIBUTE_BOOLEAN
        tf% = pmx_getParameterBoolean(thisParameterDescriptor)

        ret% = pmx_setBooleanSelector(DatabaseHandle, QueryHandle, Attributes(i).
        If ret% = CD_TRUE Then
            If tf% = CD_TRUE Then
            attributeStr = "True"
            Else
            attributeStr = "False"
            End If
        End If
        Case PMX_ATTRIBUTE_STRING
        attributeStr = c2vbStr(pmx_getParameterString(thisParameterDescriptor), F
        ret% = pmx_setStringSelector(DatabaseHandle, QueryHandle, Attributes(i).A
        If ret% = CD_FALSE Then
            attributeStr = ""
            End If
            Case PMX_ATTRIBUTE_STRINGARRAY
        End Select

        End If

        SpreadSetText Spread1, SEARCH_COL_CRITERIA, x + 1, attributeStr

        ret% = pmx_freeParameterDescriptor(thisParameterDescriptor)
        If ret% = CD_FALSE Then
        pmx_error
        End If

    End If

    Next x

    ret% = pmx_freeAttributeDescriptorSet(theseAttributeDescriptors)
    If ret% = CD_FALSE Then
    pmx_error
    End If

VB_ERR_FillAttributeValues:
If Err <> 0 Then
    ExitPmx thisDatabaseHandle
    'Resume
End If

End Sub

Sub FillEXTAttributes ()

CUR_SUB = "Sub FillExtAttribute"
On Error GoTo VB_ERR_FillExtAttribute

    Dim thisDescriptor As Long, x As Long, thisClassHandle As Long, ExtAttributeC

    DisplayCount = 0
    thisClassHandle = pmx_getRoot(DatabaseHandle)
    ExtAttributeCount = GetExtAttributeInfo(DatabaseHandle, thisClassHandle, ExtAt
    If ExtAttributeCount < 1 Then
    ElasticExtAttributes.Visible = False
    mnuVirtualAttributes.Enabled = False
    ExternalAttributes = CD_FALSE
    Exit Sub
    End If

    Spread2.MaxRows = ExtAttributeCount

    For x = 0& To ExtAttributeCount - 1
    Select Case ExtAttributes(x).AttributeType
        Case PMX_EXTERNAL_STRING_ATTRIBUTE
        'place text in grid
        SpreadSetText Spread2, SEARCH_COL_ATTRIBUTE, DisplayCount + 1&, ExtAttrib
        SpreadSetText Spread2, SEARCH_COL_CRITERIA, DisplayCount + 1&, ""

        'place picture in grid
        Spread2.Row = DisplayCount + 1
        Spread2.Col = SEARCH_COL_BUTTON
        Spread2.TypeButtonPicture = PMX.picRelatedText

        DisplayCount = DisplayCount + 1
        Case Else
    End Select
    Next x

    If DisplayCount = 0 Then
    ExternalAttributes = CD_FALSE
    ElasticExtAttributes.Visible = False
    mnuVirtualAttributes.Enabled = False
    Exit Sub
    End If

VB_ERR_FillExtAttribute:
If Err <> 0 Then
    ExitPmx DatabaseHandle
End If

End Sub
```

```
Sub FillMakePartInfoAttributes ()

CUR_SUB = "Sub FillMakePartInfoAttributes"
On Error GoTo VB_ERR_FillMakePartInfoAttributes

    dlgMakePart.Spread1.MaxRows = 0
    Spread1.Col = SEARCH_COL_CRITERIA
    For x% = 0 To AttributeCount - 1
    Spread1.Row = x% + 1
    tmpstr$ = Spread1.Text
    If tmpstr$ <> "" Then
        y& = y& + 1
        dlgMakePart.Spread1.MaxRows = y&
        SpreadSetText dlgMakePart.Spread1, 2&, y&, tmpstr$
        tmpstr$ = Attributes(x%).AttributeTitle
        SpreadSetText dlgMakePart.Spread1, 1&, y&, tmpstr$
    End If
    Next x%

VB_ERR_FillMakePartInfoAttributes:
If Err <> 0 Then
    ExitPmx DatabaseHandle
End If

End Sub

Sub Form_Activate ()

CUR_SUB = "Sub Form_Activate"
On Error GoTo VB_ERR_Form_Activate

    Dim thisClassHandle As Long

    thisClassHandle = otlClassTree.ItemLngValue(otlClassTree.ListIndex)

    If LocalQuery = True Then
    txtQueryType.Caption = "Query type: Local"
    Else
    txtQueryType.Caption = "Query type: Global"
    End If

VB_ERR_Form_Activate:
If Err <> 0 Then
    ExitPmx DatabaseHandle
End If

End Sub

Sub Form_Load ()

CUR_SUB = "Sub Form_Load"
On Error GoTo VB_ERR_Form_Load

    Me.Enabled = False
    'Initialize stuff
    Me.Tag = globalSlot
    InEvent = False
    OldListIndex = 0
    oldAttributeCount = 0
    AttributeCount = 0
    CLEAR_UNDEFINED = False
    QPLoaded = False

    Erase Attributes
    Erase oldAttributes

    ReDim MyKBSearchOrder(0)
    MyKBSearchOrder(0) = -1
    ReDim Attributes(0)
    Dim thisClassHandle As Long, thisClassDescriptor As Long
    QueryInfo.GetInstanceHandles = CD_FALSE

    DatabaseHandle = FormData(Me.Tag).DBHandle
    thisClassHandle = FormData(CLng(Me.Tag)).ClassHandle
    LockHolder = pmx_startLockHolder(DatabaseHandle)
    If LockHolder = -1 Then
    pmx_error
    GoTo VB_ERR_Form_Load
    End If

    FormData(Me.Tag).LockHolder = LockHolder

    QueryHandle = pmx_createQuery(DatabaseHandle, thisClassHandle)
    FormData(Me.Tag).QueryHandle = QueryHandle
    LocalQuery = False

    Me.Top = 0
    Me.Left = 0
    Me.Width = PMX.ScaleWidth
    Me.Height = PMX.ScaleHeight - 600

    Spread1.Row = 0
    Spread1.Col = SEARCH_COL_ORDER
    Spread1.CellType = SS_CELL_TYPE_BUTTON
    Spread1.TypeButtonShadowSize = 1
    Spread1.TypeButtonPicture = PMX.picOrder.Picture

    Spread1.Row = 0
    Spread2.Row = 0
    Spread1.Col = SEARCH_COL_UNDEFINED
    Spread2.Col = SEARCH_COL_UNDEFINED
    Spread1.CellType = SS_CELL_TYPE_BUTTON
    Spread2.CellType = SS_CELL_TYPE_BUTTON
    Spread1.TypeButtonShadowSize = 1
    Spread2.TypeButtonShadowSize = 1
    Spread1.TypeButtonPicture = PMX.picNoDef.Picture

    'Set the search window title
    Me.Caption = FormData(Me.Tag).DBname + " - Parts Specification"

    If FormData(Me.Tag).editRights = CD_TRUE Then
    btnEditParts.Visible = True
    txtQueryType.Visible = True
    mnuLocalQuery.Visible = True
    Else
    btnEditParts.Visible = False
    txtQueryType.Visible = False
    mnuLocalQuery.Visible = False
    Spread1.Col = SEARCH_COL_UNDEFINED
    Spread1.ColHidden = True
    PartsButtonBox.Width = PartsButtonBox.Width - btnEditParts.Width
    btnMakePart.Left = btnEditParts.Left
    End If

    Spread1.Col = SEARCH_COL_PROTECTED
    If FormData(Me.Tag).makeRights = CD_TRUE Then
    btnMakePart.Visible = True
    Else
    Spread1.ColHidden = True
    btnMakePart.Visible = False
    PartsButtonBox.Width = PartsButtonBox.Width - btnMakePart.Width
    End If

    If FormData(Me.Tag).adminRights = CD_FALSE And FormData(Me.Tag).schemaRights
    mnuTools.Visible = False
    Else
    mnuTools.Visible = True
    If FormData(Me.Tag).adminRights = CD_TRUE Then
        mnuUserActions.Visible = True
    Else
        mnuUserActions.Visible = False
    End If

    If FormData(Me.Tag).schemaRights = CD_TRUE Then
        mnuSchemaEditor.Visible = True
    Else
        mnuSchemaEditor.Visible = False
    End If
    End If

    DisplayOrderButtonBox.Left = PartsButtonBox.Left + PartsButtonBox.Width + 60
    SearchCriteriaButtonBox.Left = DisplayOrderButtonBox.Left + DisplayOrderButto

    Spread1.Col = SEARCH_COL_ATTRIBUTE
    Spread1.Row = -1
    Spread1.BackColor = RGB(192, 192, 192)
```

```
    Spread1.Protect = True

    Spread1.Row = -1
    Spread1.Col = -1

    VSElastic1.Visible = True
    lblFoundCount.Visible = True

    'Make the search window look good
    VSElastic1.AutoSizeChildren = 1
    ret% = DoEvents()
    VSElastic1.AutoSizeChildren = 2

    ShowClassRoot DatabaseHandle, otlClassTree, thisClassHandle

    If FormData(Me.Tag).extDataAccess = CD_TRUE Then
    ExternalAttributes = CD_TRUE
    Spread2.Col = SEARCH_COL_ATTRIBUTE
    Spread2.Row = -1
    Spread2.BackColor = RGB(192, 192, 192)
    FillEXTAttributes
    ElasticExtAttributes.Visible = False
    Else
    ExternalAttributes = CD_FALSE
    ElasticExtAttributes.Visible = False
    mnuVirtualAttributes.Visible = False
    End If

    ExpandRoot% = True

    If FormData(Me.Tag).GoToClass >= 0 Then
    tmpIndex& = GoToClass(DatabaseHandle, otlClassTree, CLng(FormData(Me.Tag).GoToCla
    If tmpIndex& <> pmx_getRoot(DatabaseHandle) And tmpIndex& <> -1 Then
        ExpandRoot% = False
    End If
    End If

    If ExpandRoot% = True Then
    'Expand the root, do not change the following 3 lines or locks will not work corr
    otlClassTree.ListIndex = 0
    otlClassTree.Expand(0) = True
    otlClassTree.ListIndex = 0
    End If

    'Get lock for top class i.e. Index(0) because this is always showed open
    ret% = pmx_requestLock(DatabaseHandle, LockHolder, thisClassHandle, PMX_CLASS_S_L
    If ret% = CD_FALSE Then
    pmx_error
    GoTo VB_ERR_Form_Load
    End If

    Set ActiveSpreadSheet = Spread1

    SetRootLevelDisplayOrder

    Me.Show

    If RetWinSplit = SPLIT_DIR_HORZ Then
    mnuSplitV.Checked = False
    mnuSplitH.Checked = True

    VSElastic1.AutoSizeChildren = 3
    ret% = DoEvents()
    VSElastic1.AutoSizeChildren = 4
    otlClassTree.Height = VSElastic1.Height / 3
    Else
    mnuSplitH.Checked = False
    mnuSplitV.Checked = True
    ret% = DoEvents()
    otlClassTree.Width = VSElastic1.Width / 2.5
    End If

VB_ERR_Form_Load:

    Me.Enabled = True
    Screen.MousePointer = 0

If Err <> 0 Then
    ExitPmx DatabaseHandle
End If

End Sub

Sub Form_QueryUnload (Cancel As Integer, UnloadMode As Integer)

CUR_SUB = "Sub Form_QueryUnload"
On Error GoTo VB_ERR_Form_QueryUnload

    If isKnowledgebaseRunning(DatabaseHandle) = False Then Exit Sub

    If UnloadMode = 0 Then
    If checkCloseKB(DatabaseHandle, removeLocks%) = True Then 'Close the KB
        'close the external connection i.e. virtual attributes
        If FormData(Me.Tag).extDataAccess = CD_TRUE Then
        ret% = pmx_destroyExtPMXConnection(DatabaseHandle)
        If ret% = CD_FALSE Then
            pmx_error
        End If
        End If

        'close the knowledge base
        CloseDB DatabaseHandle
    Else
        If removeLocks% = True Then
        closeAssociatedWindows
        releaseClassShareLocks
        Else
        Cancel = True
        End If
    End If
    End If

VB_ERR_Form_QueryUnload:
If Err <> 0 Then
    ExitPmx DatabaseHandle
End If

End Sub

Sub Form_Unload (Cancel As Integer)

CUR_SUB = "Sub Form_Unload"
On Error GoTo VB_ERR_Form_Unload

    Erase Attributes
    Erase oldAttributes

    FormData(Me.Tag).Deleted = True

VB_ERR_Form_Unload:
If Err <> 0 Then
    ExitPmx DatabaseHandle
End If

End Sub

Function GetDBIndex (DatabaseName As String) As Integer

    Dim DatabaseHandle As Long, DBIndex As Long
    Dim CurrentlyOpen As Integer
    Dim Count As Long

    GetDBIndex = -1

    If DatabaseName = "" Then
    Exit Function
    End If

    Count = pmx_getUserDatabaseCount(PMX_USER_ID)
    If Count < 1 Then
    Exit Function
    End If

    For x& = 0& To Count - 1
    If pmx_getIthUserRights(PMX_USER_ID, x&, PMX_RETRIEVE) = CD_TRUE Then
        DBnames$ = c2vbStr(pmx_getIthUserDatabasename(PMX_USER_ID, x&), False)
        If DBnames$ = DatabaseName Then
```

```
        DBIndex = x&
        Exit For
        End If
    End If
    Next x&

    GetDBIndex = DBIndex

End Function

Function GetMaxIndex () As Integer

CUR_SUB = "Function GetMaxIndex"
On Error GoTo VB_ERR_GetMaxIndex

    Dim thismaxIndex As Integer
    thismaxIndex = 0
    For i% = 0 To UBound(Attributes)
    If Attributes(i%).AttributeOrder <> -1 Then
        thismaxIndex = thismaxIndex + 1
    End If
    Next i%

    If ExternalAttributes = CD_TRUE Then
    For i% = 0 To UBound(ExtAttributes)
        If ExtAttributes(i%).AttributeOrder <> -1 Then
        thismaxIndex = thismaxIndex + 1
        End If
    Next i%
    End If

    GetMaxIndex = thismaxIndex

VB_ERR_GetMaxIndex:
If Err <> 0 Then
    ExitPmx DatabaseHandle
End If

End Function

Function getOutlineRowFromPoint (x As Single, y As Single) As Integer

CUR_SUB = "Function getOutlineRowFromPoint"
On Error GoTo VB_ERR_getOutlineRowFromPoint

    ' Given a outline control and a coordinate position, this routine
    ' returns a Windows RECT structure containing the pixel
    ' coordinates of the row being pointed at.  The row number is
    ' returned, or -1, indicating that no row is being pointed at.

    Dim CurRow As Integer
    Dim totHeight As Integer
    Dim topLocation As Single
    Dim NewRect As RECT

    totHeight = 0

    ' Loop through each row, accumulating row height until we reach
    ' the row containing the point.

    For CurRow = 0 To otlClassTree.ListCount - 1

    topLocation = totHeight
    totHeight = totHeight + Me.TextHeight("B")

    If y < totHeight Then
        If TopIndex = 0 Then
        getOutlineRowFromPoint = CurRow + otlClassTree.TopIndex
        Else
        getOutlineRowFromPoint = CurRow + otlClassTree.TopIndex - 1
        End If
        NewRect.Top = topLocation   Screen.TwipsPerPixelY
        NewRect.Bottom = totHeight   Screen.TwipsPerPixelY
        NewRect.Left = 0
        NewRect.Right = otlClassTree.Width   Screen.TwipsPerPixelY
        Exit Function
    End If

    Next CurRow

    getOutlineRowFromPoint = -1          ' indicate failure

VB_ERR_getOutlineRowFromPoint:
If Err <> 0 Then
    ExitPmx DatabaseHandle
End If

End Function

Function getPathString (thisClassHandle As Long) As String

    Dim RootClass As Long, thisClassDescriptor As Long
    Dim classPath As String

    getPathString = ""

    RootClass = pmx_getRoot(DatabaseHandle)

    Do While thisClassHandle <> RootClass 'Loop until Root Class is reached

    thisClassDescriptor = pmx_getClassDescriptor(DatabaseHandle, thisClassHandle)
    If thisClassDescriptor = 0& Then
        pmx_error
        Exit Do
    End If

    classPath = "-" & c2vbStr(pmx_getClassName(thisClassDescriptor), False) & clas

    ret% = pmx_freeClassDescriptor(thisClassDescriptor)
    If ret% = CD_FALSE Then
        pmx_error
    End If

    thisClassHandle = pmx_getParentOfClass(DatabaseHandle, thisClassHandle)
    If pmx_isNullClassHandle(thisClassHandle) Then
        pmx_error
        Exit Do
    End If
    Loop

    getPathString = classPath

End Function

Function IsDBCurrentlyOpen (DatabaseName As String) As Long
    IsDBCurrentlyOpen = -1

    For x& = 100 To UBound(FormData)
    If FormData(x&).DBname = DatabaseName And FormData(x&).Deleted = False Then
        IsDBCurrentlyOpen = FormData(x&).DBHandle
        Exit Function
    End If
    Next x&

End Function

Sub lblFoundCount_Change ()

    If lblFoundCount.Caption = "" Then Exit Sub

    PartCount& = lblFoundCount.Tag

    If PartCount& = 0 Then
    btnMakePart.Enabled = True
    btnDisplayParts.Enabled = False
    btnEditParts.Enabled = False
    If AttributeCount = 0 Then
        btnMakePart.Enabled = False
    Else
        btnMakePart.Enabled = True
    End If
    lblFoundCount.ForeColor = RED
    Else
    btnDisplayParts.Enabled = True
    btnEditParts.Enabled = True
    btnMakePart.Enabled = False
    If PartCount& < 0 Then
        lblFoundCount.ForeColor = RED
```

```
        Else
            lblFoundCount.ForeColor = BLACK
        End If
        End If

    End Sub

    Sub MakePart ()

    CUR_SUB = "Sub MakePart"
    On Error GoTo VB_ERR_MakePart

        Dim badAttribute As Long
        Dim badAttributeDescriptor As Long
        Dim thisAttribute As Long
        Dim thisQueryResultHandle As Long
        Dim thisQueryDescriptor As Long
        Dim newInstanceHandle As Long

        If otlClassTree.ListIndex = -1 Then
        MsgBox "A leaf class needs to be selected to create this part", 64
        Exit Sub
        End If

        If otlClassTree.Image(otlClassTree.ListIndex) <> PMX.OUTLINE_PICTURE_LEAF Then
        MsgBox "A leaf class needs to be selected to create this part", 64
        Exit Sub
        End If

        thisQueryDescriptor = pmx_getQueryDescriptor(DatabaseHandle, QueryHandle)
        If thisQueryDescriptor = 0& Then
        pmx_error
        Exit Sub
        End If

        ret% = pmx_checkQuery(DatabaseHandle, thisQueryDescriptor, badAttribute)
        If ret% = CD_TRUE Then
        ShowMakePartInfo
        If CANCEL_PART_INFO = False Then
            ret% = pmx_requestLock(DatabaseHandle, LockHolder, otlClassTree.ItemLngValue(
            If ret% = CD_FALSE Then
            pmx_error

            ret% = pmx_freeQueryDescriptor(thisQueryDescriptor)
            If ret% = CD_FALSE Then
                pmx_error
            End If

            Exit Sub
            End If

            newInstanceHandle = pmx_addPartFromQuery(DatabaseHandle, thisQueryDescriptor)

            ret% = pmx_releaseLock(DatabaseHandle, LockHolder, otlClassTree.ItemLngValue(
            If ret% = CD_FALSE Then
            pmx_error
            End If

            If pmx_isNullInstanceHandle(newInstanceHandle) = CD_TRUE Then
            pmx_error
            Else
            MsgBox "The new part was successfully made", 64
            SetInstanceCountEvent.Caption = True
            End If
        End If
        Else

        If pmx_getErrorCode() = PMX_ERRORADDPARTPARAMPROTECTED Then
            For x% = 0 To AttributeCount - 1
            If Attributes(x%).AttributeHandle = badAttribute Then Exit For
            Next x%

            Spread1.Row = x% + 1
            Spread1.Col = SEARCH_COL_CRITERIA
            Spread1.Action = SS_ACTION_ACTIVE_CELL

            pmx_errorText$ = c2vbStr(pmx_getErrorText(pmx_getErrorCode()), False)
            Msg$ = pmx_errorText$' + Chr(9) + Chr(13) + "Clear all protected attributes?"
            MsgBox Msg$
            'Exit Sub
            'ret% = MsgBox(Msg$, 52, pmx_errormsg)
            'If ret% = IDYES Then
            '    Spread1.Col = SEARCH_COL_CRITERIA
            '    For x% = 0 To AttributeCount - 1
            '        If Attributes(x%).Protected = True Then
            '            ret% = pmx_resetQuerySelector(DatabaseHandle, QueryHandle, At
            '            If ret% = CD_FALSE Then
            '                pmx_error
            '            Else
            '                Spread1.Row = x% + 1
            '                Spread1.Action = SS_ACTION_CLEAR_TEXT
            '            End If
            '        End If
            '    Next x%
            '    QueryHandle = pmx_createQuery(DatabaseHandle, thisClassHandle)
            '    If pmx_isNullQueryHandle(QueryHandle) = CD_TRUE Then
            '        pmx_error
            '        Exit Sub
            '    End If
            '    FormData(Me.Tag).QueryHandle = QueryHandle

            '    SetInstanceCountEvent.Caption = True

            'End If
        Else
            For x% = 0 To AttributeCount - 1
            If Attributes(x%).AttributeHandle = badAttribute Then Exit For
            Next x%

            Spread1.Row = x% + 1
            Spread1.Col = SEARCH_COL_CRITERIA
            Spread1.Action = SS_ACTION_ACTIVE_CELL

            pmx_error
        End If

        Exit Sub
        End If

    VB_ERR_MakePart:
    If Err <> 0 Then
        ExitPmx DatabaseHandle
    End If
    Exit Sub

    badFile:
        MsgBox Error(Err) + Chr(9) + Chr(13) + thisApp
        Exit Sub

    End Sub

    Sub mnuAbout_Click ()

    CUR_SUB = "Sub mnuAbout_Click"
    On Error GoTo VB_ERR_mnuAbout_Click

        Screen.MousePointer = 11

        DlgAbout.Show 1

    VB_ERR_mnuAbout_Click:
    If Err <> 0 Then
        ExitPmx DatabaseHandle
    End If

    End Sub

    Sub mnuArrangeIcons_Click ()
        PMX.Arrange ARRANGE_ICONS
    End Sub

    Sub mnuAttributeDisplay_Click ()
        Dim thisClassHandle As Long
        Dim AttributeCount As Long, x1 As Long

        thisClassHandle = pmx_getRoot(DatabaseHandle)
        AttributeCount = pmx_getAttributeCount(DatabaseHandle, thisClassHandle)
        If AttributeCount < 1 Then
```

```
    MsgBox "There are no root attributes to set.", 64
    Exit Sub
    End If

    dlgHideAttributes.Spread1.MaxRows = AttributeCount

    For x1 = 0 To AttributeCount - 1
    SpreadSetText dlgHideAttributes.Spread1, 1, x1 + 1, Attributes(x1).AttributeTitle
    SpreadSetText dlgHideAttributes.Spread1, 2, x1 + 1, "1"
    If Attributes(x1).Hidden = True Then
        SpreadSetText dlgHideAttributes.Spread1, 2, x1 + 1, "0"
    End If
    Next x1

    dlgHideAttributes.Show 1

    If dlgHideAttributes.Tag = True Then
    Spread1.ReDraw = False
    For x1 = 0 To AttributeCount - 1
        Spread1.Row = x1 + 1
        ret% = SpreadGetText(dlgHideAttributes.Spread1, 2, x1 + 1, tmpstr$)
        If tmpstr$ <> "1" Then
        Spread1.Col = SEARCH_COL_ORDER
        If Spread1.TypeButtonText <> "" Then
            ChangeOrder x1 + 1, Spread1, Attributes()
        End If
        Attributes(x1).Hidden = True
        Else
        Attributes(x1).Hidden = False
        End If
        Spread1.Row = x1 + 1
        Spread1.RowHidden = Attributes(x1).Hidden
    Next x1
    Spread1.ReDraw = True
    End If

    Unload dlgHideAttributes
End Sub

Sub mnuCascade_Click ()

    PMX.Arrange CASCADE

End Sub

Sub mnuChangePassword_Click ()
    dlgChgPassword.Show 1
End Sub

Sub mnuClearAllCriteria_Click ()
    CLEAR_UNDEFINED = True
    ClearAllAttributeValues
    CLEAR_UNDEFINED = False
End Sub

Sub mnuClearAllOrder_Click ()

    Spread1.Col = SEARCH_COL_ORDER

    For x% = 0 To AttributeCount - 1
    Spread1.Row = x% + 1
    Spread1.TypeButtonText = ""
    Attributes(x%).AttributeOrder = -1
    Next x%

End Sub

Sub mnuClearCriteria_Click ()
CUR_SUB = "Sub mnuClearCriteria_Click"
On Error GoTo VB_ERR_mnuClearCriteria_Click

    Dim Row As Long, Row2 As Long

    Spread1.ReDraw = False

    If Spread1.SelBlockRow = -1 Then Exit Sub

    If Spread1.SelBlockRow2 = -1 Then
    Row2 = Spread1.SelBlockRow
    Else
    Row2 = Spread1.SelBlockRow2
    End If

    CLEAR_UNDEFINED = True
    For x% = Spread1.SelBlockRow To Row2
    Row = x%
    If Row > 0 Then
        ret% = pmx_resetQuerySelector(DatabaseHandle, QueryHandle, Attributes(Row
        If ret% = CD_FALSE Then
        pmx_error
        End If
        Spread1.Row = Row
        Spread1.Col = SEARCH_COL_CRITERIA
        Spread1.Action = SS_ACTION_CLEAR_TEXT
        Spread1.Col = SEARCH_COL_UNDEFINED
        Spread1.Text = 0
    End If
    Next x%
    CLEAR_UNDEFINED = False

    Spread1.Action = SS_ACTION_DESELECT_BLOCK

    SetInstanceCountEvent.Caption = True

    Spread1.ReDraw = False

VB_ERR_mnuClearCriteria_Click:
If Err <> 0 Then
    ExitPmx DatabaseHandle
End If

End Sub

Sub mnuClose_Click ()
    Dim Msg As String

    Msg = "Close knowledge base " + FormData(PMX.ActiveForm.Tag).DBname + "?"
    If MsgBox(Msg, 36, "CADIS-PMX") = IDYES Then
    FormData(Me.Tag).Deleted = True

    ret% = pmx_endLockHolder(DatabaseHandle, LockHolder)
    If ret% = CD_FALSE Then
        pmx_error
    End If

    If FormData(Me.Tag).extDataAccess = CD_TRUE Then
        ret% = pmx_destroyExtPMXConnection(DatabaseHandle)
        If ret% = CD_FALSE Then
        pmx_error
        End If
    End If

    CloseDB DatabaseHandle
    Unload Me
    End If
End Sub

Sub mnuDoNotFillRootAttributes_Click ()
    mnuDoNotFillRootAttributes.Checked = True
End Sub

Sub mnuExit_Click ()

CUR_SUB = "Sub mnuExit_Click"
On Error GoTo VB_ERR_mnuExit_Click

    Unload PMX

VB_ERR_mnuExit_Click:
If Err <> 0 Then
    ExitPmx DatabaseHandle
End If

End Sub

Sub mnuFillRootAttributes_Click ()
    Dim thisClassHandle As Long
    Dim AttributeCount As Long, x1 As Long
```

```
Dim HiddenAttributes As Integer

HiddenAttributes = False

thisClassHandle = pmx_getRoot(DatabaseHandle)
AttributeCount = pmx_getAttributeCount(DatabaseHandle, thisClassHandle)
For x1 = 0 To AttributeCount - 1
If Attributes(x1).Hidden = True Then
    HiddenAttributes = True
    Exit For
End If
Next x1

If HiddenAttributes = True Then
ret% = MsgBox("One or more root attributes are hidden.  Apply will display all ro
If ret% = IDOK Then
    Spread1.ReDraw = False
    For x& = 0 To AttributeCount - 1
    Attributes(x&).Hidden = False
    Spread1.Row = x& + 1
    Spread1.RowHidden = False
    Next x&
    Spread1.ReDraw = True
Else
    mnuFillRootAttributes.Checked = False
    mnuDoNotFillRootAttributes.Checked = False
    Exit Sub
End If
End If

CLEAR_UNDEFINED = True
ClearAllAttributeValues
CLEAR_UNDEFINED = False

mnuFillRootAttributes.Checked = True

End Sub

Sub mnuFindClass_Click ()

    dlgFindClass.Show 1

End Sub

Sub mnuLocalQuery_Click ()

CUR_SUB = "Sub mnuLocalQuery_Click"
On Error GoTo VB_ERR_mnuLocalQuery_Click

    mnuLocalQuery.Checked = Not mnuLocalQuery.Checked
    If mnuLocalQuery.Checked = True Then
    LocalQuery = True
    Else
    LocalQuery = False
    End If

    If otlClassTree.ListIndex < 0 Then
    otlClassTree.ListIndex = 0
    End If

    tmpQueryHandle! = pmx_createQuery(DatabaseHandle, thisClassHandle)

    If LocalQuery = True Then
    txtQueryType.Caption = "Query type: Local"
    PartsFound! = pmx_applyLocalQueryCount(DatabaseHandle, tmpQueryHandle!)
    Else
    txtQueryType.Caption = "Query type: Global"
    PartsFound! = pmx_applyQueryCount(DatabaseHandle, tmpQueryHandle!)
    End If

    ret% = pmx_destroyQuery(DatabaseHandle, tmpQueryHandle!)

    'Set parts found counter
    SetInstanceCountEvent.Caption = True

VB_ERR_mnuLocalQuery_Click:
If Err <> 0 Then
    ExitPmx DatabaseHandle
End If

End Sub

Sub mnuOpen_Click ()

CUR_SUB = "Sub mnuOpen_Click"
On Error GoTo VB_ERR_mnuOpen_Click

    OpenDB ""

VB_ERR_mnuOpen_Click:
If Err <> 0 Then
    ExitPmx DatabaseHandle
End If

End Sub

Sub mnuPopSetAllOrder_Click ()
    Spread1.Col = SEARCH_COL_ORDER
    For x% = 0 To AttributeCount - 1

    Spread1.Row = x% + 1
    Attributes(x%).AttributeOrder = x% + 1
    Spread1.TypeButtonText = CStr(x% + 1)

    Next x%
End Sub

Sub mnuPopSetCriteria_Click ()
    Spread1_ButtonClicked SEARCH_COL_BUTTON, CLng(Spread1.Row), False
End Sub

Sub mnuPrint_Click ()

CUR_SUB = "Sub mnuPrint_Click"
On Error GoTo VB_ERR_mnuPrint_Click

    Spread1.PrintAbortMsg = "  Printing...  "
    Spread1.PrintFooter = " cPage  p"
    Spread1.PrintJobName = "CADIS-PMX"
    Spread1.PrintUseDataMax = False
    Spread1.PrintShadows = False
    Spread1.PrintType = SS_PRINT_ALL
    Spread1.Action = SS_ACTION_PRINT

VB_ERR_mnuPrint_Click:
If Err <> 0 Then
    ExitPmx DatabaseHandle
End If

End Sub

Sub mnuPrinterSetup_Click ()

CUR_SUB = "Sub mnuPrinterSetup_Click"
On Error GoTo VB_ERR_mnuPrinterSetup_Click

    ShowPrinterSetup

VB_ERR_mnuPrinterSetup_Click:
If Err <> 0 Then
    ExitPmx DatabaseHandle
End If

End Sub

Sub mnuSchemaEditor_Click ()

    Dim thisClassHandle As Long

    closeMe% = False

    thisClassHandle = otlClassTree.ItemLngValue(otlClassTree.ListIndex)
    ret% = pmx_requestLock(DatabaseHandle, LockHolder, thisClassHandle, PMX_TREE_
    If ret% = CD_FALSE Then
    pmx_error
    Exit Sub
    End If
```

```
    For x& = Forms.Count - 1 To 0 Step -1
    If TypeOf Forms(x&) Is winSchemaEditor Then
        If FormData(Forms(x&).Tag).Deleted = False And FormData(Forms(x&).Tag).DBHand
        MsgBox "Only one Schema Developer Window can be open per Part Specification W
        GoTo mnuSchemaEditor_Click
        End If
    End If
    Next x&

    For x& = Forms.Count - 1 To 0 Step -1
    If TypeOf Forms(x&) Is winPartsEditor Then
        If FormData(Forms(x&).Tag).Deleted = False And FormData(Forms(x&).Tag).DBHand
        MsgBox "A Schema Developer Window can not be active when a Part Editor Window
        GoTo mnuSchemaEditor_Click
        End If
    End If
    Next x&

    If USER_LICENSE = CD_TRUE Then
    'attempt to get user license
    ret% = pmx_getUserLicense(SessionHandle, PMX_SCHEMADEVELOPERNAME)
    If ret% = CD_FALSE Then
        pmx_error
        GoTo mnuSchemaEditor_Click
    End If
    End If

    If otlClassTree.ListIndex = 0 Then
    ret% = MsgBox("The Parts Specification window will be closed to use the Schema De
    closeMe% = True
    ElseIf otlClassTree.Expand(otlClassTree.ListIndex) = True Then
    ret% = MsgBox("The class will be closed and it's parent will become the active cl
    Else
    ret% = MsgBox("The parent of the current class will become the active class in or
    End If

    If ret% = IDCANCEL Then
    GoTo mnuSchemaEditor_Click
    End If

    If otlClassTree.ListIndex > 0 And closeMe% = False Then
    curShift% = otlClassTree.Shift(otlClassTree.ListIndex)
    If otlClassTree.Expand(otlClassTree.ListIndex) = True Then
        otlClassTree.Expand(otlClassTree.ListIndex) = False
    End If
    For x& = otlClassTree.ListIndex To 0 Step -1
        If otlClassTree.Shift(x&) < curShift% Then
        If otlClassTree.Expand(x&) = True Then
            'this class already has one sharelock because it is open - no possible fa
            'setting the listindex will get the other sharelock
            otlClassTree.ListIndex = x&
            Exit For
        End If
        End If
    Next x&
    End If

    Screen.MousePointer = 11

    Dim newSchemaEditor As New winSchemaEditor

    globalSlot = CreateSlot()
    CreateWindowStructure FormData(Me.Tag).DBHandle, thisClassHandle, LockHolder, For
    newSchemaEditor.Show

    Screen.MousePointer = 0

    If closeMe% = True Then
    ret% = pmx_releaseAllLocksOfType(DatabaseHandle, LockHolder, thisClassHandle, PMX
    If ret% = CD_FALSE Then
        pmx_error
    End If

    Unload Me
    End If

    Exit Sub

mnuSchemaEditor_Click:
```

```
    Screen.MousePointer = 0
    ret% = pmx_releaseLock(DatabaseHandle, LockHolder, thisClassHandle, PMX_TREE_
    If ret% = CD_FALSE Then
    pmx_error
    End If

    Exit Sub

End Sub

Sub mnuSetOrder_Click
    SetDisplayOrder CLng(Spread1.Row)
End Sub

Sub mnuSetStartingClass_Click ()
    ret% = MsgBox("Set current class as the default starting class?", 36
    If ret% = IDYES Then
    myStartingClass$ = CStr(otlClassTree.ItemLngValue(otlClassTree.ListIndex))
    ret% = pmx_addDatabaseStartingClassPath(PMX_USER_NAME, FormData(Me.Tag).DBname
    If ret% = CD_FALSE Then
        pmx_error
    Else
    'Need to reset the user ID so the starting class can be seen by opening the db
        If pmx_FreeUser(PMX_USER_ID) = CD_FALSE Then
        pmx_error
        End If

        PMX_USER_ID = pmx_getUser(PMX_USER_NAME)

        If PMX_USER_ID = 0& Then
        pmx_error
        End If
    End If
    End If
End Sub

Sub mnuSplitH_Click ()

CUR_SUB = "Sub mnuSplitH_Click"
On Error GoTo VB_ERR_mnuSplitH_Click

    SPLIT_DIR = SPLIT_DIR_HORZ
    RetWinSplit = SPLIT_DIR

    mnuSplitV.Checked = False
    mnuSplitH.Checked = True

    VSElastic1.AutoSizeChildren = 3
    otlClassTree.Top = 0
    VSElastic7.Top = 200
    ret% = DoEvents()
    VSElastic1.AutoSizeChildren = 4

VB_ERR_mnuSplitH_Click:
If Err <> 0 Then
    ExitPmx DatabaseHandle
End If

End Sub

Sub mnuSplitV_Click ()

CUR_SUB = "Sub mnuSplitV_Click"
On Error GoTo VB_ERR_mnuSplitV_Click

    SPLIT_DIR = SPLIT_DIR_VERT
    RetWinSplit = SPLIT_DIR

    mnuSplitH.Checked = False
    mnuSplitV.Checked = True

    VSElastic1.AutoSizeChildren = 1
    otlClassTree.Left = 0
    VSElastic7.Left = 200
    ret% = DoEvents()
    VSElastic1.AutoSizeChildren = 2

VB_ERR_mnuSplitV_Click:
If Err <> 0 Then
```

```
        ExitPmx DatabaseHandle
    End If

    End Sub

Sub mnuTile_Click ()
        PMX.Arrange TILE_HORIZONTAL
    End Sub

Sub mnuUserActions_Click ()

CUR_SUB = "Sub mnuUserActions_Click"
On Error GoTo VB_ERR_mnuUserActions_Click

        Dim thisAction As String, IniFile As String, AppPath As String

        IniFile = "PMX.INI"

        AppPath = App.Path
        If Len(AppPath) > 3 Then
        AppPath = App.Path & "\" & IniFile
        Else
        AppPath = App.Path & IniFile
        End If

        If FileExists(AppPath) Then
        IniFile = AppPath
        Else
        If FileExists(GetWindowsDir() & IniFile) Then
            IniFile = GetWindowsDir() & IniFile
        Else
            IniFile = App.Path & IniFile
        End If
        End If

        thisAction = Space(255)
        ret% = GetPrivateProfileString("UserActions", "Title1", "", thisAction, 254, IniF
        thisAction = Space(255)
        ret% = ret% + GetPrivateProfileString("UserActions", "Application1", "", thisActi
        thisAction = Space(255)
        ret% = ret% + GetPrivateProfileString("UserActions", "Command1", "", thisAction,
        If ret% <> 0 Then
        ret% = MsgBox("The format of the User Actions file is from an earlier version of
        If ret% = IDCANCEL Then
            Exit Sub
        End If
        End If

        dlgUserActions.Show 1

VB_ERR_mnuUserActions_Click:
If Err <> 0 Then
    ExitPmx DatabaseHandle
End If

End Sub

Sub mnuVirtualAttributes_Click ()
    If mnuVirtualAttributes.Checked = True Then
    mnuVirtualAttributes.Checked = False
    ElasticExtAttributes.Visible = False
    Spread1.ScrollBars = 3
    For x1& = 0 To UBound(ExtAttributes)
        If ExtAttributes(x1&).AttributeOrder <> -1 Then
        ChangeOrder x1& + 1, Spread2, ExtAttributes()
        End If
    Next x1&
    ExternalAttributes = CD_FALSE
    Else
    mnuVirtualAttributes.Checked = True
    ElasticExtAttributes.Visible = True
    'Force a refresh
    VSElastic7.Height = ElasticExtAttributes.Top
    Spread1.ScrollBars = 2
    If Spread2.Height <= 244 Then
        ElasticExtAttributes.Height = VSElastic7.Height / 3
    End If
    ExternalAttributes = CD_TRUE
    End If
```

```
End Sub

'5/5/94 JDM BUGID 558 - Moved oldAttributeCount out of if statment, old way cause
Sub otlClassTree_Click ()

CUR_SUB = "Sub otlClassTree_Click"
On Error GoTo VB_ERR_otlClassTree_Click

    If InCollapseEvent = True Then
    Exit Sub
    Else
    ActivateClass
    End If

VB_ERR_otlClassTree_Click:
If Err <> 0 Then
    ExitPmx DatabaseHandle
End If

End Sub

Sub otlClassTree_Collapse (ListIndex As Integer)

    If InCollapseEvent = True Then Exit Sub

    InCollapseEvent = True
    Me.Enabled = False

    CUR_SUB = "Sub otlClassTree_Collapse"
    On Error GoTo VB_ERR_otlClassTree_Collapse

    Dim thisClassHandle As Long

    thisClassHandle = otlClassTree.ItemLngValue(ListIndex)

    ret% = pmx_releaseLock(DatabaseHandle, LockHolder, thisClassHandle, PMX_CLASS,
    If ret% = CD_FALSE Then
    pmx_error
    End If

    If otlClassTree.Image(ListIndex) = PMX.OUTLINE_PICTURE_OPEN Then
    otlClassTree.Image(ListIndex) = PMX.OUTLINE_PICTURE_CLOSED
    End If

    'Scan from current class down releasing locks on open classes including the c
    Dim curShift As Integer
    curShift = otlClassTree.Shift(ListIndex)
    For x& = ListIndex To otlClassTree.ListCount - 1
    If x& <> ListIndex Then
        If otlClassTree.Shift(x&) <> curShift Then
        Exit For
        ElseIf otlClassTree.Image(x&) = PMX.OUTLINE_PICTURE_OPEN Then
        thisClassHandle = otlClassTree.ItemLngValue(x&)
        ret% = pmx_releaseLock(DatabaseHandle, LockHolder, thisClassHandle, PMX_C
        If ret% = CD_FALSE Then
            pmx_error       'here
        End If
        End If
    End If
    Next x&

    Do While ListIndex + 1 < otlClassTree.ListCount
    If otlClassTree.Shift(ListIndex + 1) <= otlClassTree.Shift(ListIndex) Then
        Exit Do
    End If
    otlClassTree.RemoveItem ListIndex + 1
    Loop

VB_ERR_otlClassTree_Collapse:

    Me.Enabled = True
    InCollapseEvent = False
If Err <> 0 Then
    ExitPmx DatabaseHandle
End If

End Sub
```

```
Sub otlClassTree_DblClick ()

CUR_SUB = "Sub otlClassTree_DblClick"
On Error GoTo VB_ERR_otlClassTree_DblClick

    Dim ListIndex As Integer, Shift As Integer
    Dim thisClassHandle As Long

    ListIndex = otlClassTree.ListIndex

    If ListIndex = -1 Then Exit Sub

    Select Case otlClassTree.Image(ListIndex)
    Case PMX.OUTLINE_PICTURE_LEAF
    Case PMX.OUTLINE_PICTURE_CLOSED
        otlClassTree.Expand(ListIndex) = True
    Case Else
        otlClassTree.Expand(ListIndex) = False
    End Select

    OldListIndex = ListIndex

VB_ERR_otlClassTree_DblClick:

If Err <> 0 Then
    ExitPmx DatabaseHandle
End If

End Sub

Sub otlClassTree_DragOver (Source As Control, x As Single, y As Single, State As Inte

CUR_SUB = "Sub otlClassTree_DragOver"
On Error GoTo VB_ERR_otlClassTree_DragOver

    If Not DragValid(Source, MASK_CLASS) Or Not Source.Parent.hWnd = Me.hWnd Then
    Exit Sub
    End If

    Select Case State
    Case ENTER
        Source.DragIcon = PMX.SaveIcon.DragIcon
    Case LEAVE
        Source.DragIcon = PMX.NoDrag.DragIcon
    End Select

VB_ERR_otlClassTree_DragOver:
If Err <> 0 Then
    ExitPmx DatabaseHandle
End If

End Sub

Sub otlClassTree_Expand (ListIndex As Integer)

    Dim thisClassHandle As Long

    Screen.MousePointer = 11

    ListIndex = otlClassTree.ListIndex

    thisClassHandle = otlClassTree.ItemLngValue(ListIndex)

    ret% = pmx_checkSelfConflictLock(DatabaseHandle, LockHolder, thisClassHandle, PMX
    If ret% = CD_FALSE Then
    pmx_error
    Exit Sub
    End If

    ret% = pmx_requestLock(DatabaseHandle, LockHolder, thisClassHandle, PMX_CLASS_S_L
    If ret% = CD_FALSE Then
    pmx_error
    Exit Sub
    End If

    Select Case otlClassTree.Image(ListIndex)
    Case PMX.OUTLINE_PICTURE_CLOSED
        otlClassTree.Image(otlClassTree.ListIndex) = PMX.OUTLINE_PICTURE_OPEN
    Case PMX.OUTLINE_PICTURE_LEAF
        otlClassTree.Image(otlClassTree.ListIndex) = PMX.OUTLINE_PICTURE_LEAF
    End Select

    FillClassTree DatabaseHandle, otlClassTree, thisClassHandle, ListIndex, CInt(

    Screen.MousePointer = 0

End Sub

Sub otlClassTree_KeyPress (KeyAscii As Integer)

    If KeyAscii = 13 Then
    otlClassTree_DblClick
    End If

End Sub

Sub otlClassTree_KeyUp (KeyCode As Integer, Shift As Integer)
    'otlClassTree_Click
End Sub

Sub otlClassTree_MouseDown (Button As Integer, Shift As Integer, x As Single, y A

CUR_SUB = "Sub otlClassTree_MouseDown"
On Error GoTo VB_ERR_otlClassTree_MouseDown

    Dim thisLockHolder As Long
    Dim thisClassHandle As Long

    thisClassHandle = otlClassTree.ItemLngValue(otlClassTree.ListIndex)

    If otlClassTree.ListIndex <> OldListIndex Then
    Exit Sub
    End If

    ret% = pmx_checkSelfConflictLock(DatabaseHandle, LockHolder, thisClassHandle,
    If ret% = CD_FALSE Then
    Exit Sub
    End If

    If pmx_isNullClassHandle(thisClassHandle) = CD_TRUE Then
    pmx_error
    Exit Sub
    End If

    'Start timmer to see if user wants to drag/drop
    If Button = 1 Then
    PMX.SaveIcon.DragIcon = PMX.ClassDrag.DragIcon
    MakeClassDDStruct DatabaseHandle, thisLockHolder, thisClassHandle, CStr(otlCla
    DragDropTimer.Enabled = True
    End If

VB_ERR_otlClassTree_MouseDown:
If Err <> 0 Then
    ExitPmx DatabaseHandle
End If

End Sub

Sub otlClassTree_MouseMove (Button As Integer, Shift As Integer, x As Single, y A
    DragDropTimer.Enabled = False
End Sub

Sub otlClassTree_MouseUp (Button As Integer, Shift As Integer, x As Single, y As S

CUR_SUB = "Sub otlClassTree_MouseUp"
On Error GoTo VB_ERR_otlClassTree_MouseUp

    'Be sure the timer is disabled so that a click
    'does't initiate a drag.  If it's already disabled.
    'it doesn't matter
    DragDropTimer.Enabled = False

VB_ERR_otlClassTree_MouseUp:
If Err <> 0 Then
    ExitPmx DatabaseHandle
End If

End Sub
```

```
Sub releaseClassShareLocks ()

    Dim thisClassHandle As Long

    For x& = 0 To otlClassTree.ListCount - 1
    If otlClassTree.Expand(x&) = True Then
        thisClassHandle = otlClassTree.ItemLngValue(x&)
        ret% = pmx_releaseLock(DatabaseHandle, LockHolder, thisClassHandle, PMX_CLASS
        If ret% = CD_FALSE Then
        pmx_error
        End If
    End If
    Next x&

    thisClassHandle = otlClassTree.ItemLngValue(otlClassTree.ListIndex)
    ret% = pmx_releaseLock(DatabaseHandle, LockHolder, thisClassHandle, PMX_CLASS_S_L
    If ret% = CD_FALSE Then
    pmx_error
    End If

End Sub

Sub SetAttribute (Row As Long)

CUR_SUB = "Sub SetAttribute"
On Error GoTo VB_ERR_SetAttribute

    Dim thisUnitFamilyDescriptor As Long

    globalQueryHandle = QueryHandle
    globalAttributeHandle = Attributes(Row - 1).AttributeHandle

    ret% = SpreadGetText(Spread1, SEARCH_COL_ATTRIBUTE, Row, Title$)

    Select Case Attributes(Row - 1).AttributeType
    Case PMX_ATTRIBUTE_ENUMERATION
        dlgEnumAttribute.Caption = Title$
        dlgEnumAttribute.Show 1
        ret% = dlgEnumAttribute.Tag
        Unload dlgEnumAttribute
    Case PMX_ATTRIBUTE_NUMERIC
        If Attributes(Row - 1).EnumeratedNumeric = True Then
        globalEnumeratedUnitHandle = Attributes(Row - 1).EnumeratedUnitHandle
        dlgEnumNumericAttribute.Caption = Title$
        dlgEnumNumericAttribute.Show 1
        ret% = dlgEnumNumericAttribute.Tag
        Unload dlgEnumNumericAttribute
        Else
        dlgNumericAttribute.Caption = Title$
        dlgNumericAttribute.Show 1
        ret% = dlgNumericAttribute.Tag
        Unload dlgNumericAttribute
        End If
    Case PMX_ATTRIBUTE_BOOLEAN
        dlgBoolAttribute.Caption = Title$
        dlgBoolAttribute.Show 1
        ret% = dlgBoolAttribute.Tag
        Unload dlgBoolAttribute
    Case PMX_ATTRIBUTE_STRING
        dlgStringAttribute.Caption = Title$
        dlgStringAttribute.Show 1
        ret% = dlgStringAttribute.Tag
        Unload dlgStringAttribute
    Case PMX_ATTRIBUTE_STRINGARRAY
    End Select

    If ret% = True Then
    ret% = DoEvents()
    ret% = StartQueryProgress(True)
    End If

VB_ERR_SetAttribute:
If Err <> 0 Then
    ExitPmx DatabaseHandle
End If

End Sub

Sub SetDisplayOrder (Row As Long)

CUR_SUB = "Sub SetDisplayOrder"
On Error GoTo VB_ERR_SetDisplayOrder

    If Row = 0 Then
    Spread1.Col = SEARCH_COL_ORDER
    For x% = 0 To AttributeCount - 1
        Spread1.Row = x% + 1
        Attributes(x%).AttributeOrder = x% + 1
        Spread1.TypeButtonText = CStr(x% + 1)
    Next x%
    ElseIf Row > 0 Then
    ChangeOrder Row, Spread1, Attributes()
    End If

VB_ERR_SetDisplayOrder:
If Err <> 0 Then
    ExitPmx DatabaseHandle
End If

End Sub

Function SetExtGlobalSearchData ()

CUR_SUB = "Function SetExtGlobalSearchData"
On Error GoTo VB_ERR_SetExtGlobalSearchData

    SetExtGlobalSearchData = False

    ReDim globalExtAttributeInfo(UBound(ExtAttributes))

    For x% = 0 To UBound(ExtAttributes)
    globalExtAttributeInfo(x%).AttributeHandle = ExtAttributes(x%).AttributeHandle
    globalExtAttributeInfo(x%).AttributeType = ExtAttributes(x%).AttributeType
    globalExtAttributeInfo(x%).AttributeTitle = ExtAttributes(x%).AttributeTitle
    globalExtAttributeInfo(x%).AttributeOrder = ExtAttributes(x%).AttributeOrder
    globalExtAttributeInfo(x%).UnitFamily = ExtAttributes(x%).UnitFamily
    globalExtAttributeInfo(x%).EnumeratedNumeric = ExtAttributes(x%).EnumeratedNum
    globalExtAttributeInfo(x%).EnumeratedUnitHandle = ExtAttributes(x%).Enumeratec
    globalExtAttributeInfo(x%).LocalAttribute = ExtAttributes(x%).LocalAttribute
    globalExtAttributeInfo(x%).Protected = ExtAttributes(x%).Protected
    globalExtAttributeInfo(x%).Required = ExtAttributes(x%).Required
    globalExtAttributeInfo(x%).ReadOnly = ExtAttributes(x%).ReadOnly
    globalExtAttributeInfo(x%).FreshMeat = ExtAttributes(x%).FreshMeat
    globalExtAttributeInfo(x%).SortOrder = ExtAttributes(x%).SortOrder
    globalExtAttributeInfo(x%).Key = ExtAttributes(x%).Key
    Next x%

    If UBound(ExtAttributes) > 0 Then
    SetExtGlobalSearchData = True
    Else
    Erase globalExtAttributeInfo
    End If

VB_ERR_SetExtGlobalSearchData:
If Err <> 0 Then
    ExitPmx DatabaseHandle
End If

End Function

Function SetGlobalSearchData () As Integer

CUR_SUB = "Function SetGlobalSearchData"
On Error GoTo VB_ERR_SetGlobalSearchData

    Dim intAttributes As Long, x1 As Long

    intAttributes = 0

    SetGlobalSearchData = False

    Screen.MousePointer = 11

    QueryInfo.GetInstanceHandles = CD_TRUE

    ret% = StartQueryProgress(False)
```

```
If ret% = False Then
Screen.MousePointer = 
Exit Function
End If

'If LocalQuery = True Then
'    QueryResultHandle = pmx_applyLocalQuery(DatabaseHandle, QueryHandle)
'Else
'    QueryResultHandle = pmx_applyQuery(DatabaseHandle, QueryHandle)
'End If

If ExternalAttributes = CD_TRUE Then
Dim JoinHandle As Long, ExternalCount  As Long
Dim SetProjectors  As Integer

globalExternalJoinInfo.JoinHandle = -1
ret% = ExternalJoin(JoinHandle, globalExtSetSelectors, SetProjectors, globalExtUn
If ret% = True Then
    If globalExtSetSelectors = True Then
    Dim ProjectionList() As Long
    If globalExtUniqueCount < 0 Then
        Screen.MousePointer = 0
        Exit Function
    ElseIf globalExtSetSelectors = True Then
        Screen.MousePointer = 0
        If globalExtUniqueCount = 0 Then
        MsgBox "No parts where found matching the virtual attribute settings.", 4

        ret% = pmx_destroyExtJoin(DatabaseHandle, JoinHandle)
        If ret% = CD_FALSE Then
            pmx_error
        End If

        Exit Function
        Else
        If ExternalCount = 1 Then
            theWords$ = " part was "
        Else
            theWords$ = " parts where "
        End If
        ret% = MsgBox(CStr(globalExtUniqueCount) & theWords$ & "found matching th
        If ret% = IDCANCEL Then
            Exit Function
        End If
        End If
        Screen.MousePointer = 11
    End If
    End If

    ret% = SetExtGlobalSearchData()
    If ret% = True Then
    globalExternalJoinInfo.ChunkAllocated = False
    globalExternalJoinInfo.JoinHandle = JoinHandle
    globalExternalJoinInfo.JoinResult = -1
    End If
End If
Else
If pmx_getQueryResultCount(DatabaseHandle, QueryResultHandle) < 1 Then
    Screen.MousePointer = 0
    lblFoundCount.Tag = 0
    lblFoundCount.Caption = "Parts Found: 0"
    MsgBox "No parts found.", 48
    Exit Function
End If
End If

globalQueryResultHandle = QueryResultHandle

ReDim globalAttributeInfo(UBound(Attributes))

For x% = 0 To UBound(Attributes)
globalAttributeInfo(x%).AttributeHandle = Attributes(x%).AttributeHandle
globalAttributeInfo(x%).AttributeType = Attributes(x%).AttributeType
globalAttributeInfo(x%).AttributeTitle = Attributes(x%).AttributeTitle
globalAttributeInfo(x%).AttributeOrder = Attributes(x%).AttributeOrder
globalAttributeInfo(x%).UnitFamily = Attributes(x%).UnitFamily
globalAttributeInfo(x%).EnumeratedNumeric = Attributes(x%).EnumeratedNumeric
globalAttributeInfo(x%).EnumeratedUnitHandle = Attributes(x%).EnumeratedUnitHandl
globalAttributeInfo(x%).LocalAttribute = Attributes(x%).LocalAttribute
    globalAttributeInfo(x%).Protected = Attributes(x%).Protected
    globalAttributeInfo(x%).Required = Attributes(x%).Required
    globalAttributeInfo(x%).ReadOnly = Attributes(x%).ReadOnly
    globalAttributeInfo(x%).FreshMeat = Attributes(x%).FreshMeat
    globalAttributeInfo(x%).SortOrder = Attributes(x%).SortOrder
    globalAttributeInfo(x%).Key = Attributes(x%).Key
    globalAttributeInfo(x%).PrimaryKey = Attributes(x%).PrimaryKey
    Next x%

    SetGlobalSearchData = True

VB_ERR_SetGlobalSearchData:
If Err <> 0 Then
    ExitPmx DatabaseHandle
End If

End Function

Sub SetInstanceCountEvent_Change ()

    If SetInstanceCountEvent.Caption = True Then
    Screen.MousePointer = 11

    SetPartsFoundCounterFromQuery DatabaseHandle, Me, QueryHandle, LocalQuery

    Screen.MousePointer = 0

    SetInstanceCountEvent.Caption = False
    End If

End Sub

Sub setQueryToNewClass (oldQueryHandle As Long, newQueryHandle As Long, oldClassH

CUR_SUB = "Sub setQueryToNewClass"
On Error GoTo VB_ERR_setQueryToNewClass


    Dim x As Long, setEnumeratorCount As Long, EnumCount As Long, EnumHandle As L
    Dim x1 As Long
    Dim thisQueryDescriptor As Long, thisAttributeDescriptor As Long

    thisQueryDescriptor = pmx_getQueryDescriptor(DatabaseHandle, oldQueryHandle)
    If thisQueryDescriptor = 0& Then
    pmx_error
    End If

    theseAttributeDescriptors = pmx_getAttributeDescriptorSet(DatabaseHandle, thi
    If theseAttributeDescriptors = 0 Then
    pmx_error
    End If

    For Attrib% = 0 To AttributeCount - 1
    If Attrib% <= oldAttributeCount - 1 Then
        If oldAttributes(Attrib%).AttributeHandle = Attributes(Attrib%).AttributeH

        Select Case oldAttributes(Attrib%).AttributeType
            Case PMX_ATTRIBUTE_ENUMERATION

            thisAttributeDescriptor = pmx_getAttributeDescriptor(DatabaseHandle, (
            If thisAttributeDescriptor = 0& Then
                pmx_error
            End If

            'Get the enumerator count
            EnumCount = pmx_getAttributeEnumeratorCount(thisAttributeDescriptor)
            If EnumCount < 0 Then
                pmx_error
            End If

            querySelectorCount = pmx_getQuerySelectorCount(thisQueryDescriptor, ol
            If querySelectorCount > 0 Then
                selectorCount = 0
                For x1 = 0 To EnumCount - 1
                EnumHandle = pmx_getAttributeIthEnumHandle(thisAttributeDescripto
                If pmx_isNullEnumeratorHandle(EnumHandle) = CD_TRUE Then
                    pmx_error
                Else
                    ret% = pmx_isEnumeratedSelectorSet(thisQueryDescriptor, oldAtt
```

```
            If ret% = CD_TRUE Then
            ret% = pmx_setEnumeratedSelector(DatabaseHandle, newQueryHandle,
            If ret% = CD_FALSE Then
                pmx_error
            End If
            selectorCount = selectorCount + 1
            If selectorCount >= querySelectorCount Then
                Exit For
            End If
            End If
        End If
        Next x1
    End If

    ret% = pmx_freeAttributeDescriptor(thisAttributeDescriptor)
    If ret% = CD_FALSE Then
        pmx_error
    End If

    Case PMX_ATTRIBUTE_NUMERIC
    Dim lowValue As Single, highValue As Single
    Dim lowBounded As Integer, highBounded As Integer, fromEnumerated As Inte
    Dim lowIndex As Long, highIndex As Long, UnitHandle As Long

    querySelectorCount = pmx_getQuerySelectorCount(thisQueryDescriptor, oldAt
    If querySelectorCount > 0 Then
        For x1 = 0 To querySelectorCount - 1
        ret% = pmx_getIthNumericSelector(thisQueryDescriptor, oldAttributes(A
        If ret% = CD_TRUE Then
            If fromEnumerated = CD_TRUE Then
            ret% = pmx_setEnumUnitSelector(DatabaseHandle, newQueryHandle, At
            If ret% = CD_FALSE Then
                pmx_error
            End If
            Else
            ret% = pmx_setNumericSelector(DatabaseHandle, newQueryHandle, Att
            If ret% = CD_FALSE Then
                pmx_error
            End If
            End If
        End If
        Next x1
    End If
    Case PMX_ATTRIBUTE_BOOLEAN
    ret% = pmx_getBooleanTrueSelector(thisQueryDescriptor, oldAttributes(Attr
    If ret% = CD_TRUE Then
        ret% = pmx_setBooleanSelector(DatabaseHandle, newQueryHandle, Attribu
        If ret% = CD_FALSE Then
        pmx_error
        End If
    End If

    ret% = pmx_getBooleanFalseSelector(thisQueryDescriptor, oldAttributes(Att
    If ret% = CD_TRUE Then
        ret% = pmx_setBooleanSelector(DatabaseHandle, newQueryHandle, Attribu
        If ret% = CD_FALSE Then
        pmx_error
        End If
    End If
    Case PMX_ATTRIBUTE_STRING
    querySelectorCount = pmx_getQuerySelectorCount(thisQueryDescriptor, oldAt
    If querySelectorCount > 0 Then
        For x1 = 0 To querySelectorCount - 1
        tmpstr$ = c2vbStr(pmx_getIthStringSelector(thisQueryDescriptor, oldAt
        ret% = pmx_setStringSelector(DatabaseHandle, newQueryHandle, Attribut
        If ret% = CD_FALSE Then
            pmx_error
        End If
        Next x1
    End If

    Case PMX_ATTRIBUTE_STRINGARRAY
    'TODO
End Select

'Is this attribute set to undefined?
If pmx_getQueryUndefinedFlag(thisQueryDescriptor, oldAttributes(Attrib%).Attr
    ret% = pmx_setSelectorUndefined(DatabaseHandle, newQueryHandle, Attribute
    If ret% = CD_FALSE Then
            pmx_error
            End If
        End If
        Else
        Exit For
        End If

    Else
        Exit For
    End If
    Next Attrib%

    ret% = pmx_freeAttributeDescriptorSet(theseAttributeDescriptors)
    If ret% = CD_FALSE Then
    pmx_error
    End If

    ret% = pmx_freeQueryDescriptor(thisQueryDescriptor)
    If ret% = CD_FALSE Then
    pmx_error
    End If

VB_ERR_setQueryToNewClass:
If Err <> 0 Then
    ExitPmx DatabaseHandle
End If

End Sub

Sub SetRootLevelDisplayOrder ()
    Dim RootClass As Long

    RootClass = pmx_getRoot(DatabaseHandle)

    For x& = 0 To Spread1.MaxRows - 1
    If pmx_getDefiningClassOfAttribute(DatabaseHandle, Attributes(x&).AttributeHar
        ChangeOrder x& + 1, Spread1, Attributes()
    Else
        Exit For
    End If
    Next x&

End Sub

Sub ShowMakePartInfo ()

CUR_SUB = "Sub ShowmakePartInfo"
On Error GoTo VB_ERR_ShowmakePartInfo


    Dim thisClassHandle As Long

    thisClassHandle = otlClassTree.ItemLngValue(otlClassTree.ListIndex

    FillClassTreeUpToRoot DatabaseHandle, dlgMakePart.otlClassTree, thisClassHand
    FillMakePartInfoAttributes

    dlgMakePart.Show 1

VB_ERR_ShowmakePartInfo:
If Err <> 0 Then
    ExitPmx DatabaseHandle
End If

End Sub

Sub Spread1_ButtonClicked (Col As Long, Row As Long, ButtonDown As Integer)

CUR_SUB = "Sub Spread1_ButtonClicked"
On Error GoTo VB_ERR_Spread1_ButtonClicked

    If CLEAR_UNDEFINED = True Then Exit Sub

    If Row < 1 Then Exit Sub

    If Col = SEARCH_COL_UNDEFINED Then

    Screen.MousePointer = 11
```

```
    ret% = SpreadGetText(Spread1, Spread1.ActiveCol, Spread1.ActiveRow, tmpstr$)
    If CInt(tmpstr$) = 0 Then
        SetState% = CD_FALSE
    Else
        SetState% = CD_TRUE
    End If
    ret% = pmx_setSelectorUndefined(DatabaseHandle, QueryHandle, Attributes(Row - 1),
    If ret% = CD_FALSE Then
        pmx_error
    End If

    ret% = StartQueryProgress(True)
    Screen.MousePointer = 0

    ElseIf Col = SEARCH_COL_BUTTON Then

    Dim y As Single, x As Single

    GetCursorPos CursPos
    ret% = SpreadGetCellPos(Spread1, Col, Row, lpx&, lpy&, lpWidth&, lpHeight&)
    CursPos.y = (CursPos.y * Y_TWIPSPERPIXEL) - (LocalY - (lpy& + lpHeight&))
    CursPos.x = (CursPos.x * X_TWIPSPERPIXEL) - (LocalX - lpx&)

    Spread1.Col = SEARCH_COL_CRITERIA
    Spread1.Row = Row

    SetAttribute Row

    End If

VB_ERR_Spread1_ButtonClicked:
If Err <> 0 Then
    ExitPmx DatabaseHandle
End If

End Sub

Sub Spread1_Click (Col As Long, Row As Long)

CUR_SUB = "Sub Spread1_Click"
On Error GoTo VB_ERR_Spread1_Click

    If Row < 1 Then Exit Sub

    Select Case Col
    Case 0
        Spread1.Row = 1
        Spread1.Action = SS_ACTION_ACTIVE
    Case SEARCH_COL_ORDER
        ChangeOrder Row, Spread1, Attributes()
    Case SEARCH_COL_ATTRIBUTE
    Case SEARCH_COL_PROTECTED
    Case SEARCH_COL_BUTTON
    Case SEARCH_COL_CRITERIA
    End Select

VB_ERR_Spread1_Click:
If Err <> 0 Then
    ExitPmx DatabaseHandle
End If

End Sub

Sub Spread1_ColWidthChange (Col1 As Long, Col2 As Long)
    If Spread2.Visible Then Spread2.ColWidth(Col1) = Spread1.ColWidth(Col1)
End Sub

Sub Spread1_DblClick (Col As Long, Row As Long)

CUR_SUB = "Sub Spread1_DblClick"
On Error GoTo VB_ERR_Spread1_DblClick

    If Row < 1 Then Exit Sub

    Select Case Col
    Case 0
        Spread1.Row = 1
        Spread1.Action = SS_ACTION_ACTIVE
        Exit Sub
    Case SEARCH_COL_ORDER
    Case SEARCH_COL_ATTRIBUTE
    Case SEARCH_COL_PROTECTED
    Case SEARCH_COL_BUTTON
    Case SEARCH_COL_CRITERIA
        Dim y As Single, x As Single

        GetCursorPos CursPos
        Spread1.Col = SEARCH_COL_CRITERIA
        Spread1.Row = Row

        ret% = SpreadGetCellPos(Spread1, Col, Row, lpx&, lpy&, lpWidth&, lpHeight&
        CursPos.y = (CursPos.y * Y_TWIPSPERPIXEL) - (LocalY - (lpy& + lpHeight&))
        CursPos.x = (CursPos.x * X_TWIPSPERPIXEL) - (LocalX + lpx&)

        SetAttribute Row
    End Select

VB_ERR_Spread1_DblClick:
If Err <> 0 Then
    ExitPmx DatabaseHandle
End If

End Sub

Sub Spread1_DragDrop (Source As Control, x As Single, y As Single)

    If EndDragmode(MASK_INSTANCE, Source) Then

    Dim thisInstance As Long
    Dim thisClassHandle As Long
    Dim thisClassDescriptor As Long
    Dim ClassName As String

    thisClassDescriptor = pmx_getClassDescriptor(DatabaseHandle, thisClassHandle)
    If thisClassDescriptor = 0& Then
        MsgBox "A class does not exist for the dropped part, cannot complete drag,
        Exit Sub
    End If
    ret% = pmx_freeClassDescriptor(thisClassDescriptor)

    PopupMenu mnuPopFillAttributes
    If mnuFillRootAttributes.Checked = True Then
        mnuFillRootAttributes.Checked = False
        FillRootAttributes% = True
    ElseIf mnuDoNotFillRootAttributes.Checked = True Then
        mnuDoNotFillRootAttributes.Checked = False
        FillRootAttributes% = False
    Else
        Exit Sub
    End If

    thisInstance = globalDDInstanceStruct.instanceHandle

    thisClassHandle = pmx_getOwnerOfInstance(globalDDInstanceStruct.DatabaseHandle

    otlClassTree.Redraw = False
    OldListIndex = GoToClass(globalDDInstanceStruct.DatabaseHandle, otlClassTree,
    otlClassTree.Redraw = True

    CLEAR_UNDEFINED = True
    ClearAllAttributeValues
    CLEAR_UNDEFINED = False

    FillAttributes thisClassHandle

    FillAttributeValues globalDDInstanceStruct.DatabaseHandle, thisClassHandle, tl

    SetInstanceCountEvent.Caption = True

    End If

End Sub

Sub Spread1_DragOver (Source As Control, x As Single, y As Single, State As Intege
```

```
    If Not DragValid(Source, MASK_INSTANCE) Then
    Exit Sub
    End If

    Select Case State
    Case ENTER
        Source.DragIcon = PMX.SaveIcon.DragIcon
    Case LEAVE
        Source.DragIcon = PMX.NoDrag.DragIcon
    End Select

End Sub

Sub Spread1_GotFocus ()
    Set ActiveSpreadSheet = Spread1
End Sub

Sub Spread1_MouseDown (Button As Integer, Shift As Integer, x As Single, y As Single)

CUR_SUB = "Sub Spread1_MouseDown"
On Error GoTo VB_ERR_Spread1_MouseDown

    Dim Row As Long, Col As Long
    Dim tmpHandle As Long, thisClass As Long
    LocalX = x
    LocalY = y

    thisClass = otlClassTree.ItemLngValue(otlClassTree.ListIndex)
    SpreadGetCellFromScreenCoord Spread1, Col, Row, x, y

    If Col < 0 Then
    Exit Sub
    End If

    If Button = 1 And Shift = False And Row > 0 And Col = SEARCH_COL_CRITERIA Then
    GetCursorPos CursPos
    Spread1.SelectBlockOptions = SS_SELBLOCKOPT_BLOCKS

    ColRect.Top = 0
    ColRect.Bottom = 10000
    ColRect.Left = CursPos.x
    ColRect.Right = CursPos.x

    ClipCursor ColRect
    Else
    Spread1.SelectBlockOptions = 0
    End If

    If Button = 2 Then
Exit Sub
    Spread1.Row = Row
    Spread1.Col = Col

    If Row = 0 Then
        mnuSetOrder.Enabled = False
        PopupMenu mnuPopAllAttributes, 2
        mnuSetOrder.Enabled = True
    ElseIf Row > 0 Then
        Spread1.Action = SS_ACTION_ACTIVE_CELL
        PopupMenu mnuPopAttribute, 2
    End If
    End If

VB_ERR_Spread1_MouseDown:
If Err <> 0 Then
    ExitPmx DatabaseHandle
End If

End Sub

Sub Spread1_MouseUp (Button As Integer, Shift As Integer, x As Single, y As Single)

CUR_SUB = "Sub Spread1_MouseUp"
On Error GoTo VB_ERR_Spread1_MouseUp

    ClipCursor ByVal 0&

VB_ERR_Spread1_MouseUp:
If Err <> 0 Then
    ExitPmx DatabaseHandle
End If

End Sub

Sub Spread1_TopLeftChange (OldLeft As Long, OldTop As Long, NewLeft As Long, NewTo
    If NewLeft <> OldLeft Then
    Spread2.LeftCol = NewLeft
    End If
End Sub

Sub Spread2_ButtonClicked (Col As Long, Row As Long, ButtonDown As Integer)

CUR_SUB = "Sub Spread2_ButtonClicked"
On Error GoTo VB_ERR_Spread2_ButtonClicked

    Dim attributeValue As String

    If CLEAR_UNDEFINED = True Or Row < 1 Then
    Exit Sub
    End If

    If Col = SEARCH_COL_ORDER Then
    ChangeOrder Row, Spread2, ExtAttributes()
    ElseIf Col = SEARCH_COL_UNDEFINED Then

    ElseIf Col = SEARCH_COL_BUTTON Then

    Dim y As Single, x As Single

    GetCursorPos CursPos
    ret% = SpreadGetCellPos(Spread2, Col, Row, lpx&, lpy&, lpWidth&, lpHeight&)
    CursPos.y = (CursPos.y * Y_TWIPSPERPIXEL) - (LocalY - (lpy& + lpHeight&))
    CursPos.x = (CursPos.x * X_TWIPSPERPIXEL) - (LocalX - lpx&)

    Spread2.Col = SEARCH_COL_CRITERIA
    Spread2.Row = Row

    dlgExtStringAttribute.Text1 = Spread2.Text
    dlgExtStringAttribute.Show 1

    If dlgExtStringAttribute.Tag = True Then
        Spread2.Text = dlgExtStringAttribute.Text1
    End If

    Unload dlgExtStringAttribute
        }
    End If

VB_ERR_Spread2_ButtonClicked:
If Err <> 0 Then
    ExitPmx DatabaseHandle
End If

End Sub

Sub Spread2_Click (Col As Long, Row As Long)

    If Row < 1 Then Exit Sub

    Select Case Col
    Case 0
        Spread2.Row = 1
        Spread2.Action = SS_ACTION_ACTIVE
    Case SEARCH_COL_ORDER
        'ChangeOrder Row, Spread2, ExtAttributes()
    Case SEARCH_COL_ATTRIBUTE
    Case SEARCH_COL_PROTECTED
    Case SEARCH_COL_BUTTON
    Case SEARCH_COL_CRITERIA
    End Select

End Sub

Sub Spread2_GotFocus ()
    Set ActiveSpreadSheet = Spread2
End Sub

Sub Spread2_MouseDown (Button As Integer, Shift As Integer, x As Single, y As Sin
```

```
Dim Row As Long, Col As Long

LocalX = x
LocalY = y

SpreadGetCellFromScreenCoord Spread2, Col, Row, x, y

If Col < 1 Then
Exit Sub
End If

If Button = 1 And Shift = False And Row > 0 And Col = SEARCH_COL_CRITERIA Then
GetCursorPos CursPos
Spread2.SelectBlockOptions = SS_SELBLOCKOPT_BLOCKS

ColRect.Top = 0
ColRect.Bottom = 10000
ColRect.Left = CursPos.x
ColRect.Right = CursPos.x

ClipCursor ColRect
Else
Spread2.SelectBlockOptions = 0
End If

End Sub

Sub Spread2_MouseUp (Button As Integer, Shift As Integer, x As Single, y As Single)
    ClipCursor ByVal 0&
End Sub

Sub Spread2_TopLeftChange (OldLeft As Long, OldTop As Long, NewLeft As Long, NewTop A
    If NewLeft <> OldLeft Then
    Spread1.LeftCol = NewLeft
    End If
End Sub

Function StartQueryProgress (UpdateCount As Integer)

    Dim newQueryProgress As New QueryProgress

    QueryInfo.DBHandle = DatabaseHandle
    QueryInfo.QueryHandle = QueryHandle

    If mnuLocalQuery.Checked = True Then
    QueryInfo.LocalQuery = CD_FALSE
    Else
    QueryInfo.LocalQuery = CD_TRUE
    End If

    Load newQueryProgress

    QueryResultHandle = QueryInfo.QueryResultHandle

    If UpdateCount = True Then
    If newQueryProgress.Tag = True Then 'Cancel was selected
        StartQueryProgress = False
        lblFoundCount.Tag = newQueryProgress.lbInstancesFound.Caption
        lblFoundCount.Caption = "Query was Cancelled at " & newQueryProgress.lbInstan
        lblFoundCount.ForeColor = RED
    Else
        StartQueryProgress = True
        lblFoundCount.Tag = newQueryProgress.lbInstancesFound.Caption
        lblFoundCount.Caption = "Parts Found: " & newQueryProgress.lbInstancesFound.C
    End If
    Else
    If newQueryProgress.Tag = True Then 'Cancel was selected
        StartQueryProgress = False
    Else
        StartQueryProgress = True
    End If
    End If

    QueryInfo.GetInstanceHandles = CD_FALSE

    Unload newQueryProgress

    ret% = DoEvents()

End Function

VERSION 2.00
Begin Form winPartsEditor
   BackColor       =   &H00C0C0C0&
   Caption         =   "Parts Editor"
   ClientHeight    =   9015
   ClientLeft      =   1365
   ClientTop       =   1050
   ClientWidth     =   11610
   Height          =   9705
   Icon            =   PARTEDIT.FRX:0000
   Left            =   1005
   LinkTopic       =   "Form6"
   MDIChild        =   -1  'True
   ScaleHeight     =   9015
   ScaleWidth      =   11610
   Tag             =   "PARTLIST"
   Top             =   420
   Width           =   11730
   Begin CommandButton btnFindClass
      Caption         =   "FindClass"
      Height          =   255
      Left            =   0
      TabIndex        =   37
      Top             =   0
      Visible         =   0   'False
      Width           =   1455
   End
   Begin Timer DragDropTimer
      Enabled         =   0   'False
      Interval        =   300
      Left            =   9900
      Top             =   0
   End
   Begin VideoSoftElastic ButtonBar
      Align           =   2  'Align Bottom
      BackColor       =   &H00C0C0C0&
      BevelInner      =   0  'None
      Height          =   1155
      Left            =   0
      TabIndex        =   29
      Top             =   7860
      Width           =   11610
      Begin CommandButton btnDeleteParts
         Caption         =   "&Delete"
         Enabled         =   0   'False
         Height          =   375
         Left            =   4260
         TabIndex        =   27
         Top             =   240
         Width           =   1335
      End
      Begin CommandButton btnMoveParts
         Caption         =   "&Move"
         Enabled         =   0   'False
         Height          =   375
         Left            =   2700
         TabIndex        =   28
         Top             =   240
         Width           =   1335
      End
      Begin CommandButton btnPartInfo
         Caption         =   "&Info..."
         Enabled         =   0   'False
         Height          =   375
         Left            =   1380
         TabIndex        =   35
         Top             =   240
         Width           =   1215
      End
      Begin CommandButton btnSort
         Caption         =   "&Sort..."
         Height          =   375
         Left            =   120
         TabIndex        =   34
         Top             =   240
         Width           =   1215
```

```
            End
            Begin VideoSoftElastic statusBar
               Align            =  2  'Align Bottom
               AutoSizeChildren=  1  'Even Horizontal
               BackColor        =  &H00C0C0C0&
               Height           =  450
               Left             =  0
               TabIndex         =  30
               Top              =  705
               Width            =  11610
               Begin Label lblRowCount
                  BackColor        =  &H00C0C0C0&
                  BackStyle        =  0  'Transparent
                  Height           =  270
                  Left             =  90
                  TabIndex         =  32
                  Top              =  90
                  Width            =  11430
               End
               Begin Label lblStatus
                  BackStyle        =  0  'Transparent
                  Height           =  270
                  Left             =  5850
                  TabIndex         =  31
                  Top              =  90
                  Visible          =  0  'False
                  Width            =  5655
               End
            End
            Begin Label Label2
               Alignment        =  2  'Center
               BackStyle        =  0  'Transparent
               Caption          =  "Parts:"
               FontBold         =  0  'False
               FontItalic       =  0  'False
               FontName         =  "MS Sans Serif"
               FontSize         =  8.25
               FontStrikethru   =  0  'False
               FontUnderline    =  0  'False
               Height           =  195
               Index            =  2
               Left             =  120
               TabIndex         =  33
               Top              =  0
               Visible          =  0  'False
               Width            =  5355
            End
         End
         Begin CommandButton btnSetAttributeOK
            Caption          =  "SetAttributeOK"
            Height           =  315
            Left             =  -10000
            TabIndex         =  0
            Top              =  240
            Width            =  2055
         End
         Begin ListBox EnumeratedAttribute
            Height           =  1590
            Left             =  -10000
            TabIndex         =  2
            Top              =  1920
            Visible          =  0  'False
            Width            =  1875
         End
         Begin SpreadSheet EnumNumAttribute
            AllowResize      =  -1  'True
            AutoCalc         =  0  'False
            AutoClipboard    =  0  'False
            DAutoCellTypes   =  0  'False
            DAutoFill        =  0  'False
            DAutoHeadings    =  0  'False
            DAutoSave        =  0  'False
            DAutoSizeCols    =  0  'Off
            Prop243          =  0  'False
            DisplayColHeaders=  0  'False
            DisplayRowHeaders=  0  'False
            FontBold         =  -1  'True
            FontItalic       =  0  'False
            FontName         =  "MS Sans Serif"
            FontSize         =  8.25
            FontStrikethru   =  0  'False
            FontUnderline    =  0  'False
            Height           =  1572
            InterfaceDesigner=  PARTEDIT.FRX:0302
            Left             =  -10000
            MaxCols          =  0
            MaxRows          =  0
            TabIndex         =  22
            Top              =  3660
            UnitType         =  2  'Twips
            Visible          =  0  'False
            VisibleCols      =  4
            VisibleRows      =  12
            Width            =  4152
         End
         Begin TextBox StringArrayAttribute
            Height           =  1572
            Left             =  -10000
            MultiLine        =  -1  'True
            ScrollBars       =  3  'Both
            TabIndex         =  21
            Top              =  360
            Visible          =  0  'False
            Width            =  4152
         End
         Begin VideoSoftElastic ElasticSplitter
            AutoSizeChildren=  4  'Uneven Vertical
            BackColor        =  &H00FFFFFF&
            BorderWidth      =  0
            Height           =  6930
            Left             =  120
            Splitter         =  1  'Yes (with uneven spacing)
            TabIndex         =  3
            Top              =  720
            Width            =  11505
            Begin VideoSoftElastic VSElastic4
               AutoSizeChildren=  1  'Even Horizontal
               BackColor        =  &H00C0C0C0&
               BorderWidth      =  0
               Height           =  3420
               Left             =  0
               TabIndex         =  4
               Top              =  0
               Width            =  11505
               Begin TList otlClassTree
                  BackColor        =  &H00C0C0C0&
                  DragHighlight    =  0  'False
                  DragIcon         =  PARTEDIT.FRX:05A6
                  ForeColor        =  &H00000000&
                  Height           =  3420
                  InvStyle         =  2  'Text Invertion
                  ItemImageDefHeight=  225
                  ItemImageDefWidth=  225
                  Left             =  0
                  PictureClosed    =  PARTEDIT.FRX:08A8
                  PictureLeaf      =  PARTEDIT.FRX:098A
                  PictureOpen      =  PARTEDIT.FRX:0A6C
                  PictureRoot      =  PARTEDIT.FRX:0B4E
                  SelBackColor     =  &H00800000&
                  SelForeColor     =  &H00FFFFFF&
                  ShiftStep        =  300
                  TabIndex         =  36
                  TabStopDistance  =  0
                  Top              =  0
                  Width            =  11505
                  WidthOfText      =  0
               End
            End
            Begin VideoSoftElastic ElasticAttributeContainer
               AutoSizeChildren=  4  'Uneven Vertical
               BackColor        =  &H00C0C0C0&
               BorderWidth      =  0
               ChildSpacing     =  0
               Height           =  3420
               Left             =  0
               TabIndex         =  5
               Top              =  3510
               Width            =  11505
```

```
Begin VideoSoftElastic ElasticAttributes
   AutoSizeChildren=   1  'Even Horizontal
   BackColor      =   &H00C0C0C0&
   BorderWidth    =   0
   Height         =   2745
   Left           =   0
   TabIndex       =   7
   Top            =   675
   Width          =   11505
   Begin SpreadSheet lstParts1
      AllowResize     =   -1  'True
      AutoClipboard   =   0   'False
      CalcDependencies=   0   'False
      ColHeaderDisplay=   0  'Blank
      DAutoCellTypes  =   0   'False
      DAutoFill       =   0   'False
      DAutoHeadings   =   0   'False
      DAutoSave       =   0   'False
      DAutoSizeCols   =   0  'Off
      DragIcon        =   PAPTEDIT.FRX:0C30
      FontBold        =   -1  'True
      FontItalic      =   0   'False
      FontName        =   "MS Sans Serif"
      FontSize        =   8.25
      FontStrikethru  =   0   'False
      FontUnderline   =   0   'False
      Height          =   2745
      InterfaceDesigner=   PAPTEDIT.FRX:0F32
      Left            =   0
      MaxCols         =   0
      MaxRows         =   2
      TabIndex        =   24
      Top             =   0
      UnitType        =   2  'Twips
      VirtualMaxRows  =   2
      VirtualMode     =   -1  'True
      Width           =   11505
   End
End
Begin VideoSoftElastic ElasticEditBox
   BackColor      =   &H00C0C0C0&
   BevelInner     =   0  'None
   Height         =   675
   Left           =   0
   TabIndex       =   8
   Top            =   0
   Width          =   11505
   Begin OptionButton optTableCustom
      BackColor       =   &H00C0C0C0&
      Caption         =   "Custom"
      Height          =   240
      Index           =   1
      Left            =   4560
      TabIndex        =   25
      Top             =   60
      Visible         =   0   'False
      Width           =   1095
   End
   Begin OptionButton optTableCustom
      BackColor       =   &H00C0C0C0&
      Caption         =   "Table"
      Height          =   240
      Index           =   0
      Left            =   3600
      TabIndex        =   26
      Top             =   60
      Value           =   -1  'True
      Visible         =   0   'False
      Width           =   912
   End
   Begin PictureBox picEditButtons
      BackColor       =   &H00C0C0C0&
      BorderStyle     =   0  'None
      Height          =   375
      Left            =   60
      ScaleHeight     =   375
      ScaleWidth      =   1395
      TabIndex        =   10
      Top             =   240
      Visible         =   0   'False
      Width           =   1395
      Begin SSRibbon btnUndefined
         AutoSize        =   0  'None
         Height          =   360
         Left            =   120
         PictureUp       =   PAPTEDIT.FRX:11D6
         Top             =   0
         Width           =   360
      End
      Begin PictureBox Picture1
         BackColor       =   &H00C0C0C0&
         BorderStyle     =   0  'None
         Height          =   405
         Left            =   500
         ScaleHeight     =   405
         ScaleWidth      =   735
         TabIndex        =   13
         Top             =   0
         Width           =   735
         Begin SSCommand btnSetAttribute
            AutoSize        =   2  'Adjust Button Size To Picture
            Height          =   360
            Left            =   360
            Picture         =   PAPTEDIT.FRX:12F0
            TabIndex        =   11
            Top             =   0
            Width           =   360
         End
         Begin SSCommand btnCancelAttribute
            AutoSize        =   2  'Adjust Button Size To Picture
            Height          =   360
            Left            =   0
            Picture         =   PAPTEDIT.FRX:13EA
            TabIndex        =   12
            Top             =   0
            Width           =   360
         End
      End
   End
End
Begin PictureBox picEditBox
   BackColor      =   &H00C0C0C0&
   BorderStyle    =   0  'None
   Height         =   315
   Left           =   1500
   ScaleHeight    =   315
   ScaleWidth     =   4215
   TabIndex       =   15
   Tag            =   "picEditBox"
   Top            =   300
   Visible        =   0   'False
   Width          =   4215
   Begin SSCommand btnDDown
      Height          =   280
      Left            =   3840
      Picture         =   PAPTEDIT.FRX:14E4
      TabIndex        =   16
      Top             =   0
      Visible         =   0   'False
      Width           =   250
   End
   Begin PictureBox NumericAttribute
      BackColor       =   &H00C0C0C0&
      BorderStyle     =   0  'None
      Height          =   315
      Left            =   0
      ScaleHeight     =   315
      ScaleWidth      =   4155
      TabIndex        =   20
      Top             =   0
      Visible         =   0   'False
      Width           =   4155
      Begin ComboBox lstUnitsFrom
         BackColor       =   &H00C0C0C0&
         Height          =   300
         Left            =   2040
         Style           =   2  'Dropdown List
         TabIndex        =   23
         TabStop         =   0   'False
```

```
            Top             =   0
            Width           =   2055
         End
         Begin TextBox txtNumericValue
            BackColor       =   &H00FFFFFF&
            Height          =   300
            Left            =   0
            TabIndex        =   9
            Top             =   0
            Visible         =   0   'False
            Width           =   2055
         End
      End
      Begin PictureBox BooleanAttribute
         BackColor       =   &H00C0C0C0&
         BorderStyle     =   0  'None
         Height          =   288
         Left            =   0
         ScaleHeight     =   285
         ScaleWidth      =   4155
         TabIndex        =   17
         Top             =   0
         Visible         =   0   'False
         Width           =   4155
         Begin OptionButton optFalse
            BackColor       =   &H00C0C0C0&
            Caption         =   "False"
            Height          =   300
            Left            =   1080
            TabIndex        =   18
            Top             =   0
            Value           =   -1  'True
            Width           =   1155
         End
         Begin OptionButton optTrue
            BackColor       =   &H00C0C0C0&
            Caption         =   "True"
            Height          =   300
            Left            =   120
            TabIndex        =   19
            Top             =   0
            Width           =   855
         End
      End
      Begin TextBox Text1
         Height          =   288
         HideSelection   =   0   'False
         Left            =   0
         TabIndex        =   6
         Tag             =   "NO_EDIT"
         Top             =   0
         Visible         =   0   'False
         Width           =   4155
      End
      Begin Label lblAttributeText
         BorderStyle     =   1  'Fixed Single
         Height          =   288
         Left            =   -2400
         TabIndex        =   14
         Top             =   0
         Visible         =   0   'False
         Width           =   3912
      End
    End
  End
 End
End
Begin CommandButton btnSetAttributeCancel
   Cancel          =   -1  'True
   Caption         =   "SetAttributeCancel"
   Height          =   315
   Left            =   -10000
   TabIndex        =   1
   Top             =   0
   Width           =   2055
End
Begin Menu mnuFile
   Caption         =   "&File"
   Begin Menu mnuOpen
      Caption         =   "&Open Knowledge Base..."
      Shortcut        =   ^O
   End
   Begin Menu mnuCloseKB
      Caption         =   "&Close Knowledge Base..."
   End
   Begin Menu mnuDash1
      Caption         =   "-"
   End
   Begin Menu mnuPrint
      Caption         =   "&Print..."
   End
   Begin Menu mnuPrinterSetup
      Caption         =   "Printer &Setup..."
   End
   Begin Menu mnuFileDash1
      Caption         =   "-"
   End
   Begin Menu mnuExit
      Caption         =   "&Exit"
   End
End
Begin Menu mnuFind
   Caption         =   "F&ind"
   Begin Menu mnuFindClass
      Caption         =   "Find &Class..."
      Shortcut        =   ^F
   End
End
Begin Menu mnuOptions
   Caption         =   "&Options"
   Begin Menu mnuSplitH
      Caption         =   "Split &Horizontal"
      Checked         =   -1  'True
   End
   Begin Menu mnuSplitV
      Caption         =   "Split &Vertical"
   End
   Begin Menu mnuAttrDash
      Caption         =   "-"
   End
   Begin Menu mnuAttributeDisplay
      Caption         =   "&Attribute Display..."
   End
End
Begin Menu mnuParts
   Caption         =   "&Parts"
   Visible         =   0   'False
   Begin Menu mnuMoveParts
      Caption         =   "&Move..."
      Enabled         =   0   'False
      Shortcut        =   ^M
   End
   Begin Menu mnuDeleteParts
      Caption         =   "&Delete..."
      Enabled         =   0   'False
      Shortcut        =   ^D
   End
   Begin Menu mnuPartsDash0
      Caption         =   "-"
   End
   Begin Menu mnuPartInfo
      Caption         =   "&Information..."
      Enabled         =   0   'False
      Shortcut        =   ^I
   End
   Begin Menu mnuPartsDash1
      Caption         =   "-"
   End
   Begin Menu mnuSort
      Caption         =   "&Sort..."
      Shortcut        =   ^S
   End
End
Begin Menu mnuWindow
   Caption         =   "&Window"
   WindowList      =   -1  'True
   Begin Menu mnuCascade
      Caption         =   "&Cascade"
```

```
        End
        Begin Menu mnuTile
            Caption         =   "&Tile"
        End
        Begin Menu mnuArrangeIcons
            Caption         =   "&Arrange Icons"
        End
    End
    Begin Menu mnuHelp
        Caption         =   "&Help"
        Begin Menu mnuAbout
            Caption         =   "&About..."
        End
    End
End
'This program is the confidential and proprietary product of CADIS, Inc.
'Any unauthorized use, reproduction or transfer of this program is
'strictly prohibited.
'                   Copyright 1993 by CADIS, Inc.

Dim THECOL As Long

Dim DatabaseHandle As Long
Dim LockHolder As Long
Dim EditingClassHandle As Long

Dim CallingForm As Form
Dim Attributes() As AttributeStructure

Dim ColRect As RECT

Dim DISPLAY_MSG As Integer

Dim NewRect As RECT

Dim PARTS_EDITED As Integer
Dim SaveText As String

Dim EnumeratedNumeric As Integer

Dim ColNum As Integer
Dim EditColumn As Integer
Dim ArrayIndex As Integer

Dim QueryResultHandle As Long
Dim ResultCount As Long
Dim ClassHandle As Long
Dim UnitFamily As Long
Dim FullPath As String

Dim CursPosStart As POINTAPI
Dim CursPosEnd As POINTAPI

Dim SelectedAttributeType As Integer
Dim SelectedAttributeHandle As Long
Dim SelectedUnitHandle As Long

Dim SET_UNDEFINED As Integer

Dim PrintHeader As Integer
Dim AttributeHandles() As Long
Dim AttributeTypes() As Integer

Dim OldListIndex As Integer
Dim Printing As Integer

Sub BooleanAttribute_GotFocus ()
    btnUndefined.Value = False
End Sub

Sub btnCancelAttribute_Click ()

CUR_SUB = "Sub btnCancelAttribute_Click"
On Error GoTo VB_ERR_btnCancelAttribute_Click

    btnUndefined.Value = False

    Select Case SelectedAttributeType
        Case PMX_ATTRIBUTE_STRINGARRAY
            Text1.Text = SaveText
        Case Else
            lblAttributeText.Caption = SaveText
    End Select

    SetAttributeEditDisplay CLng(lstParts1.ActiveCol), CLng(lstParts1.ActiveRow)

    lstParts1.SetFocus

    btnSetAttribute.Visible = False
    btnCancelAttribute.Visible = False

VB_ERR_btnCancelAttribute_Click:
If Err <> 0 Then
    ExitPmx DatabaseHandle
End If

End Sub

Sub btnDDown_Click ()

CUR_SUB = "Sub btnDDown_Click"
On Error GoTo VB_ERR_btnDDown_Click

    btnUndefined.Value = False

    Select Case SelectedAttributeType
        Case PMX_ATTRIBUTE_ENUMERATION
            If EnumeratedAttribute.Visible = True Then
                EnumeratedAttribute.Visible = False
                btnSetAttribute.Visible = False
                btnCancelAttribute.Visible = False
                Exit Sub
            End If

            btnSetAttribute.Visible = True
            btnCancelAttribute.Visible = True

            EnumeratedAttribute.Order 0
            FillEnumeratedAttribute SelectedAttributeHandle
            EnumeratedAttribute.Visible = True

            SetInputControl EnumeratedAttribute
        Case PMX_ATTRIBUTE_NUMERIC

            Dim Count As Long, Index As Long
            Dim thisUnitFamilyDescriptor As Long

            thisAttributeDescriptor = pmx_getAttributeDescriptor(DatabaseHandle, S
            If thisAttributeDescriptor = 0& Then
                pmx_error
                Exit Sub
            End If

            UnitFamily = pmx_getAttributeUnitFamilyHandle(thisAttributeDescriptor
            If pmx_isNullUnitFamilyHandle(UnitFamily) = CD_TRUE Then
                pmx_error
                Exit Sub
            End If

            thisUnitFamilyDescriptor = pmx_getAvailableUnitsDescriptor(DatabaseHar
            If thisUnitFamilyDescriptor = 0& Then
                pmx_error
                Exit Sub
            End If

            Count = pmx_getUnitsEnumeratedCount(thisUnitFamilyDescriptor

            If Count > 0 Then
                If EnumNumAttribute.Visible = True Then
                    EnumNumAttribute.Visible = False
                    btnSetAttribute.Visible = False
                    btnCancelAttribute.Visible = False
                    Exit Sub
                End If

                btnSetAttribute.Visible = True
                btnCancelAttribute.Visible = True
```

```
                EnumeratedNumeric = True
                Index = pmx_getUnitsIthEnumeratedindex(thisUnitFamilyDescriptor, 0&)

                thisUnitHandle = pmx_getAvailableUnitsIthHandle(thisUnitFamilyDescrip
                If pmx_isNullUnitHandle(thisUnitHandle) = CD_TRUE Then
                    pmx_error
                    Exit Sub
                End If

                SelectedUnitHandle = thisUnitHandle
                EnumNumAttribute.ZOrder 0
                FillEnumeratedNumericAttribute SelectedUnitHandle
                EnumNumAttribute.Visible = True
                SetInputControl EnumNumAttribute
            Else
                EnumeratedNumeric = False
                SelectedUnitHandle = thisUnitHandle
            End If

            ret% = pmx_freeAttributeDescriptor(thisAttributeDescriptor)
            If ret% = CD_FALSE Then
                pmx_error
            End If

            ret% = pmx_freeAvailableUnitsDescriptor(thisUnitFamilyDescriptor)
            If ret% = CD_FALSE Then
                pmx_error
            End If

        Case PMX_ATTRIBUTE_BOOLEAN
        Case PMX_ATTRIBUTE_STRING
        Case PMX_ATTRIBUTE_STRINGARRAY
            If StringArrayAttribute.Visible = True Then
                StringArrayAttribute.Visible = False
                Exit Sub
            End If

            btnSetAttribute.Visible = False
            btnCancelAttribute.Visible = True

            StringArrayAttribute.Text = lstParts1.Text
            StringArrayAttribute.ZOrder 0
            StringArrayAttribute.Visible = Not (StringArrayAttribute.Visible)
            SetInputControl StringArrayAttribute
            If StringArrayAttribute.Visible Then StringArrayAttribute.SetFocus
    End Select

VB_ERR_btnDDown_Click:
If Err <> 0 Then
    ExitPmx DatabaseHandle
End If

End Sub

Sub btnDeleteParts_Click ()

CUR_SUB = "Sub btnDeleteParts_Click"
On Error GoTo VB_ERR_btnDeleteParts_Click

    Dim RowFrom As Long
    Dim RowTo As Long
    Dim RowsToDelete As Long
    Dim thisInstance As Long, thisLockClass As Long

    RowFrom = lstParts1.SelBlockRow
    RowTo = lstParts1.SelBlockRow2

    '-1 is the label
    If RowFrom = -1 Then
        RowFrom = 1
        RowTo = lstParts1.VirtualMaxRows
    ElseIf RowTo = -1 Then
        RowTo = RowFrom
    End If

    RowsToDelete = (RowTo - RowFrom) + 1

    If RowsToDelete = 1 Then
        thisInstance = pmx_getIthQueryInstance(DatabaseHandle, QueryResultHandle,
        thisLockClass = pmx_getOwnerOfInstance(DatabaseHandle, thisInstance)
        ret% = pmx_requestLock(DatabaseHandle, LockHolder, thisLockClass, PMX_TREI
        If ret% = CD_FALSE Then
            pmx_error
            Exit Sub
        End If
    Else
        thisLockClass = ClassHandle
        ret% = pmx_requestLock(DatabaseHandle, LockHolder, thisLockClass, PMX_TREI
        If ret% = CD_FALSE Then
            pmx_error
            Exit Sub
        End If
    End If

     lstParts1.ReDraw = False

    If RowsToDelete = 1 Then
        ret% = MsgBox("Delete the selected part?", 36, pmx_errormsg)
    Else
        ret% = MsgBox("Delete the " + CStr(RowsToDelete) + " selected parts?", 36,
    End If
    If ret% = IDNO Then
        GoTo VB_ERR_btnDeleteParts_Click
    End If

    Screen.MousePointer = 11
    DISPLAY_MSG = False
    DeleteInstances
    DISPLAY_MSG = True
    PARTS_EDITED = True
    ResultCount = pmx_getQueryResultCount(DatabaseHandle, QueryResultHandle)
    lblRowCount.Caption = "Part count: " + CStr(ResultCount)
    Screen.MousePointer = 0

VB_ERR_btnDeleteParts_Click:

    lstParts1.ReDraw = True

    ret% = pmx_releaseLock(DatabaseHandle, LockHolder, thisLockClass, PMX_TREE_X_I
    If ret% = CD_FALSE Then
        pmx_error
    End If

    If Err <> 0 Then
        ExitPmx DatabaseHandle
    End If

End Sub

Sub btnFindClass_Click ()

CUR_SUB = "Sub btnFindClass_Click"
On Error GoTo VB_ERR_btnFindClass_Click

    Screen.MousePointer = 11

    Dim thisClassHandle As Long
    Dim thisClassDescriptor As Long
    Dim ClassName As String

    thisClassHandle = FormData(Me.Tag).tmpClassHandle

    ctlClassTree.ReDraw = False
    ret% = GoToClass(DatabaseHandle, ctlClassTree, thisClassHandle, LockHolder, T
    ctlClassTree.ReDraw = True

    Screen.MousePointer = 0

VB_ERR_btnFindClass_Click:
If Err <> 0 Then
    ExitPmx DatabaseHandle
End If

End Sub

Sub btnMoveParts_Click ()
```

```
CUR_SUB = "Sub btnMoveParts_Click"
On Error GoTo VB_ERR_btnMoveParts_Click

    Dim RowFrom As Long
    Dim RowTo As Long
    Dim RowsToDelete As Long
    Dim thisInstance As Long, thisLockClass As Long, newClassHandle As Long

    RowFrom = lstParts1.SelBlockRow
    RowTo = lstParts1.SelBlockRow2

    '-1 is the label
    If RowFrom = -1 Then
        RowFrom = 1
        RowTo = lstParts1.VirtualMaxRows
    ElseIf RowTo = -1 Then
        RowTo = RowFrom
    End If

    RowsToDelete = RowTo - RowFrom
    RowsToDelete = RowsToDelete + 1

    If RowsToDelete = 1 Then
        thisInstance = pmx_getIthQueryInstance(DatabaseHandle, QueryResultHandle, Roy
        thisLockClass = pmx_getOwnerOfInstance(DatabaseHandle, thisInstance)
        ret% = pmx_requestLock(DatabaseHandle, LockHolder, thisLockClass, PMX_TREE_X_
        If ret% = CD_FALSE Then
            pmx_error
            Exit Sub
        End If
    Else
        thisLockClass = ClassHandle
        ret% = pmx_requestLock(DatabaseHandle, LockHolder, thisLockClass, PMX_TREE_X_
        If ret% = CD_FALSE Then
            pmx_error
            Exit Sub
        End If
    End If

    lstParts1.ReDraw = False

    newClassHandle = ctlClassTree.ItemLngValue(ctlClassTree.ListIndex)

    ret% = pmx_requestLock(DatabaseHandle, LockHolder, newClassHandle, PMX_TPEE_U_LOC
    If ret% = CD_FALSE Then
        pmx_error

        'remove first lock
        ret% = pmx_releaseLock(DatabaseHandle, LockHolder, thisLockClass, PMX_TREE_X_
        If ret% = CD_FALSE Then
            pmx_error
        End If
        Exit Sub
    End If

    If RowsToDelete = 1 Then
        ret% = MsgBox("Move the selected part?", 36, pmx_errormsg)
    Else
        ret% = MsgBox("Move the " + CStr(RowsToDelete) + " selected parts?", 36, pmx_
    End If
    If ret% = IDNO Then
        GoTo VB_ERR_btnMoveParts_Click
    End If

    Screen.MousePointer = 11
    DISPLAY_MSG = False
    MoveInstance newClassHandle
    DISPLAY_MSG = True
    PARTS_EDITED = True
    ResultCount = pmx_getQueryResultCount(DatabaseHandle, QueryResultHandle)
    lblRowCount.Caption = "Part count: " + CStr(ResultCount)
    Screen.MousePointer = 0

VB_ERR_btnMoveParts_Click:

    lstParts1.ReDraw = True

    ret% = pmx_releaseLock(DatabaseHandle, LockHolder, thisLockClass, PMX_TREE_X_LOCK
    If ret% = CD_FALSE Then
        pmx_error
    End If

    ret% = pmx_releaseLock(DatabaseHandle, LockHolder, newClassHandle, PMX_TREE_U_
    If ret% = CD_FALSE Then
        pmx_error
    End If

    If Err <> 0 Then
        ExitPmx DatabaseHandle
    End If

End Sub

Sub btnPartInfo_Click ()

CUR_SUB = "Sub btnPartInfo_Click"
On Error GoTo VB_ERR_btnPartInfo_Click

    Dim RowTo As Long, RowFrom As Long
    Dim thisInstance As Long, SelectedRows As Long

    RowFrom = lstParts1.SelBlockRow
    RowTo = lstParts1.SelBlockRow2

    SelectedRows = RowTo - RowFrom + 1

    '-1 is the label
    If RowFrom = -1 Then
        RowFrom = 1
        RowTo = lstParts1.VirtualMaxRows
    ElseIf RowTo = -1 Then
        RowTo = RowFrom
    End If

    counter& = 0

    For yl& = RowFrom To RowTo

        counter& = counter& + 1

        thisInstance = pmx_getIthQueryInstance(DatabaseHandle, QueryResultHandle,

        globalDatabaseHandle = DatabaseHandle
        globalQueryResultHandle = QueryResultHandle
        globalExtIndex = yl& - 1
        If (RowTo - RowFrom) = 0 Then
            ShowPartInfo DatabaseHandle, thisInstance, False, True, True, ""
        Else
            ShowPartInfo DatabaseHandle, thisInstance, True, True, True, CStr(cour
        End If

        ret% = DoEvents()
        If CANCEL_PART_INFO = True Then
            Exit For
        End If

    Next yl&

VB_ERR_btnPartInfo_Click:
If Err <> 0 Then
    ExitPmx DatabaseHandle
End If

End Sub

Sub btnSetAttribute_Click ()

CUR_SUB = "Sub btnSetAttribute_Click"
On Error GoTo VB_ERR_btnSetAttribute_Click

    If btnSetAttribute.Visible = False Then
        Exit Sub
    End If

    Screen.MousePointer = 11

    If btnUndefined.Value = True Then
```

```
        optTrue.Value = False
        optFalse.Value = False
    End If

    SaveAttribute
    lstParts1.Action = SS_ACTION_DESELECT_BLOCK
    Screen.MousePointer = 0
    lstParts1_Click CLng(lstParts1.ActiveCol), CLng(lstParts1.ActiveRow)

    btnUndefined.Value = False

VB_ERR_btnSetAttribute_Click:
If Err <> 0 Then
    ExitPmx DatabaseHandle
End If

End Sub

Sub btnSetAttributeCancel_Click ()

CUR_SUB = "Sub btnSetAttributeCancel_Click"
On Error GoTo VB_ERR_btnSetAttributeCancel_Click

    btnCancelAttribute_Click

VB_ERR_btnSetAttributeCancel_Click:
If Err <> 0 Then
    ExitPmx DatabaseHandle
End If

End Sub

Sub btnSetAttributeOK_Click ()

CUR_SUB = "Sub btnSetAttributeOK_Click"
On Error GoTo VB_ERR_btnSetAttributeOK_Click

    btnSetAttribute_Click

VB_ERR_btnSetAttributeOK_Click:
If Err <> 0 Then
    ExitPmx DatabaseHandle
End If

End Sub

Sub btnSort_Click ()

    lstParts1.ReDraw = False

    're-collate Key Order's for attributes that may not be displayed
    For x% = 0 To UBound(Attributes)
        If Attributes(x%).AttributeOrder = -1 And Attributes(x%).Key <> -1 Then
            OldValue = Attributes(x%).Key
            Attributes(x%).Key = -1
            For y% = 0 To UBound(Attributes)
                If Attributes(y%).Key > OldValue And Attributes(y%).Key <> -1 Then
                    Attributes(y%).Key = Attributes(y%).Key - 1
                End If
            Next y%
        End If
    Next x%

    AttrCount% = 0
    For x% = 0 To UBound(Attributes)
        If Attributes(x%).AttributeOrder <> -1 Then
            ReDim Preserve globalSortList(AttrCount%)
            globalSortList(AttrCount%).ActualOrder = AttrCount%
            globalSortList(AttrCount%).DisplayOrder = Attributes(x%).AttributeOrder
            globalSortList(AttrCount%).AttributeHandle = Attributes(x%).AttributeHand
            globalSortList(AttrCount%).AttributeTitle = Attributes(x%).AttributeTitle
            globalSortList(AttrCount%).Key = Attributes(x%).Key
            globalSortList(AttrCount%).SortOrder = Attributes(x%).SortOrder
            AttrCount% = AttrCount% + 1
        Else
            Attributes(x%).Key = -1
            Attributes(x%).SortOrder = -1
        End If
    Next x%

    globalQueryResultHandle = QueryResultHandle
    dlgSort.Show 1

    If dlgSort.Tag = True Then
        For x% = 0 To UBound(globalSortList)
            For y% = 0 To UBound(Attributes)
                If Attributes(y%).AttributeHandle = globalSortList(x%).AttributeH
                    Attributes(y%).Key = globalSortList(x%).Key
                    Attributes(y%).SortOrder = globalSortList(x%).SortOrder
                    Exit For
                End If
            Next y%
        Next x%

        SpreadGetBottomRightCell lstParts1, RCol&, BotRow&
        FillInPartsList CLng(lstParts1.VirtualCurTop), CLng(lstParts1.VirtualCurR
    End If

    Unload dlgSort

    lstParts1.ReDraw = True
    Erase globalSortList

End Sub

Sub btnUndefined_Click (Value As Integer)

    ret% = SpreadGetText(lstParts1, lstParts1.ActiveCol, lstParts1.ActiveRow, Sav
    Text1.Text = ""
    lblAttributeText.Caption = ""
    optTrue.Value = False
    optFalse.Value = False
    If Value = -1 Then
        btnSetAttribute.Visible = True
        btnCancelAttribute.Visible = True
    End If

End Sub

Sub DeleteInstances ()

CUR_SUB = "Sub DeleteInstances"
On Error GoTo VB_ERR_DeleteInstances

    Dim thisInstance As Long
    Dim deletedInstances As Long
    Dim instancesToDelete As Long, RowTo As Long, RowFrom As Long, DeleteCount As
    Dim MSG_ALREDY_DISPLAYED As Integer

    lstParts1.ReDraw = False

    RowFrom = lstParts1.SelBlockRow
    RowTo = lstParts1.SelBlockRow2

    '-1 is the label
    If RowFrom = -1 Then
        RowFrom = 1
        RowTo = lstParts1.VirtualMaxRows
    ElseIf RowTo = -1 Then
        RowTo = RowFrom
    End If

    DeleteCount = 0

    For yl& = RowFrom To RowTo

        If yl& Mod 10 = 0 Then
            lblRowCount.Caption = "Part count: " + CStr(ResultCount - DeleteCount
            lblRowCount.Refresh
        End If

        thisInstance = pmx_getIthQueryInstance(DatabaseHandle, QueryResultHandle,
        'Row to delete is always first row selected
        If pmx_isNullInstanceHandle(thisInstance) = CD_FALSE Or pmx_isNullClassHa
            ret% = pmx_deleteInstance(DatabaseHandle, thisInstance)
            If ret% = CD_FALSE Then
                pmx_error
            End If
```

```
        End If

        DeleteCount = DeleteCount + 1

    Next yl&

    ret% = pmx_removeQueryResultRange(DatabaseHandle, QueryResultHandle, RowFrom - 1,
    If ret% = CD_FALSE Then
        pmx_error
    Else
        FillInPartsList CInt(lstParts1.VirtualCurTop), CInt(lstParts1.VirtualCurRowCo
        lstParts1.Col = 1
        lstParts1.Row = RowFrom
        lstParts1.Action = SS_ACTION_ACTIVE_CELL
    End If

VB_ERR_DeleteInstances:

    lstParts1.ReDraw = True

    btnMoveParts.Enabled = False
    btnDeleteParts.Enabled = False
    btnPartInfo.Enabled = False

    If Err <> 0 Then
        ExitPmx DatabaseHandle
    End If

End Sub

Sub DragDropTimer_Timer ()

CUR_SUB = "Sub DragDropTimer_Timer"
On Error GoTo VB_ERR_DragDropTimer_Timer

    ClipCursor ByVal 0&
    BeginDragMode Me.ActiveControl, GLOBAL_DRAG_MASK
    DragDropTimer.Enabled = False

VB_ERR_DragDropTimer_Timer:
If Err <> 0 Then
    ExitPmx DatabaseHandle
End If

End Sub

Sub EnumeratedAttribute_Click ()

CUR_SUB = "Sub EnumeratedAttribute_Click"
On Error GoTo VB_ERR_EnumeratedAttribute_Click


    btnUndefined.Value = False

    btnSetAttribute.Visible = True

    lblAttributeText.Caption = EnumeratedAttribute.Text

    EnumeratedAttribute.Visible = False

    btnSetAttribute.SetFocus


VB_ERR_EnumeratedAttribute_Click:
If Err <> 0 Then
    ExitPmx DatabaseHandle
End If

End Sub

Sub EnumeratedAttribute_DblClick ()

CUR_SUB = "Sub EnumeratedAttribute_DblClick"
On Error GoTo VB_ERR_EnumeratedAttribute_DblClick

    EnumeratedAttribute.Visible = False
    btnSetAttribute_Click

VB_ERR_EnumeratedAttribute_DblClick:
If Err <> 0 Then
    ExitPmx DatabaseHandle
End If

End Sub

Sub EnumeratedAttribute_GotFocus ()
    btnUndefined.Value = False
End Sub

Sub EnumNumAttribute_Click (Col As Long, Row As Long)

CUR_SUB = "Sub EnumNumAttribute_Click"
On Error GoTo VB_ERR_EnumNumAttribute_Click

    btnUndefined.Value = False

    btnSetAttribute.Visible = True

    ret% = SpreadGetText(EnumNumAttribute, EnumNumAttribute.ActiveCol, EnumNumAtt

    lblAttributeText.Caption = tmpStr$

    EnumNumAttribute.Visible = False


VB_ERR_EnumNumAttribute_Click:
If Err <> 0 Then
    ExitPmx DatabaseHandle
End If

End Sub

Sub EnumNumAttribute_DblClick (Col As Long, Row As Long)

CUR_SUB = "Sub EnumNumAttribute_DblClick"
On Error GoTo VB_ERR_EnumNumAttribute_DblClick


    btnSetAttribute_Click
    EnumNumAttribute.Visible = False


VB_ERR_EnumNumAttribute_DblClick:
If Err <> 0 Then
    ExitPmx DatabaseHandle
End If

End Sub

Sub EnumNumAttribute_GotFocus ()
    btnUndefined.Value = False
End Sub

'5/3/94 JDH Set optTrue and optFalse to false
Sub FillBooleanAttribute ()

CUR_SUB = "Sub FillBooleanAttribute"
On Error GoTo VB_ERR_FillBooleanAttribute

    ret% = SpreadGetText(lstParts1, lstParts1.ActiveCol, lstParts1.ActiveRow, tmpS

    BooleanAttribute.ZOrder 0
    BooleanAttribute.Visible = True
    btnDDown.Visible = False

    optTrue.Value = False
    optFalse.Value = False

    If Left(tmpStr$, 1) = "T" Then
        optTrue.Value = True
    ElseIf Left(tmpStr$, 1) = "F" Then
        optFalse.Value = True
    End If

    btnSetAttribute.Visible = False
    btnCancelAttribute.Visible = False

VB_ERR_FillBooleanAttribute:
```

```
If Err <> 0 Then
    Resume
    ExitPmx DatabaseHandle
End If

End Sub

Sub FillEnumeratedAttribute (AttributeHandle As Long)

CUR_SUB = "Sub FillEnumeratedAttribute"
On Error GoTo VB_ERR_FillEnumeratedAttribute

    Dim Count As Long
    Dim Index As Long
    Dim thisAttributeDescriptor As Long
    Dim thisQueryDescriptor As Long

    thisAttributeDescriptor = pmx_getAttributeDescriptor(DatabaseHandle, AttributeHan
    If thisAttributeDescriptor = 0& Then
        pmx_error
        Exit Sub
    End If

    'Place all of the enumerators into the list
    Count = pmx_getAttributeEnumeratorCount(thisAttributeDescriptor)

    EnumeratedAttribute.Clear
    For Index = 0& To Count - 1
        EnumeratedAttribute.AddItem c2vbStr(pmx_getAttributeIthEnumName(thisAttribute
        EnumeratedAttribute.ItemData(Index) = pmx_getAttributeIthEnumHandle(thisAttri
    Next Index

    ret% = pmx_freeAttributeDescriptor(thisAttributeDescriptor)
    If ret% = CD_FALSE Then
        pmx_error
    End If

VB_ERR_FillEnumeratedAttribute:
If Err <> 0 Then
    ExitPmx DatabaseHandle
End If

End Sub

Sub FillEnumeratedNumericAttribute (EnumeratedUnitHandle As Long)

CUR_SUB = "Sub FillEnumeratedNumericAttribute"
On Error GoTo VB_ERR_FillEnumeratedNumericAttribute

    FillEnumeratedNumericTable DatabaseHandle, EnumeratedUnitHandle, EnumNumAttribute
    btnDDown.SetFocus

VB_ERR_FillEnumeratedNumericAttribute:
If Err <> 0 Then
    ExitPmx DatabaseHandle
End If

End Sub

Sub FillInColumnTitles ()

CUR_SUB = "Sub FillIncolumnTitles"
On Error GoTo VB_ERR_FillIncolumnTitles


    lstPartsl.MaxCols = UBound(Attributes) + 1

    Cols% = 0

    For x% = 0 To UBound(Attributes)
        'put in column headings
        If Attributes(x%).AttributeOrder > 0 Then
            Cols% = Cols% + 1
            SpreadSetText lstPartsl, Attributes(x%).AttributeOrder, 0, Attributes(x%)

            If Attributes(x%).ReadOnly = True Then
                lstPartsl.Col = Attributes(x%).AttributeOrder
                lstPartsl.Row = -1
                lstPartsl.ForeColor = RGB(255, 0, 0)
            Else
                lstPartsl.Col = Attributes(x%).AttributeOrder
                lstPartsl.Row = -1
                lstPartsl.ForeColor = RGB(0, 0, 0)
            End If
        End If
    Next x%

    lstPartsl.MaxCols = CLng(Cols%)

VB_ERR_FillIncolumnTitles:
If Err <> 0 Then
    ExitPmx DatabaseHandle
End If

End Sub

Sub FillInPartsList (Row As Long, RowsNeeded As Long)

CUR_SUB = "Sub FillInPartsList"
On Error GoTo VB_ERR_FillInPartsList

    Dim theseAttributeHandles() As Long
    Dim thisAttributeType As Long
    Dim thisParameterDescriptorSet As Long
    Dim thisParameterDescriptor As Long
    Dim thisConvertedValue As Long
    Dim thisInstance As Long
    Dim thisUnitHandle As Long
    Dim attributeStr As String
    Dim tmpStr As String
    Dim x1 As Long
    Dim y1 As Long
    Dim MSG_ALREDY_DISPLAYED As Integer

    ResultCount = pmx_getQueryResultCount(DatabaseHandle, QueryResultHandle)
    lstPartsl.VirtualMaxRows = ResultCount

    ReDim theseAttributeHandles(UBound(Attributes))
    For x% = 0 To UBound(Attributes)
      theseAttributeHandles(x%) = Attributes(x%).AttributeHandle
    Next x%

    '-1 is the label
    If Row < 1 Then
        Row = 1
    End If

    MSG_ALREDY_DISPLAYED = False
    For y1 = Row To Row + RowsNeeded - 1'rows

        If y1 > lstPartsl.VirtualMaxRows Then
            Exit For
        End If

        thisParameterDescriptorSet = pmx_getIthParameterDescriptorSet(DatabaseHanc
        If thisParameterDescriptorSet = 0 Then
            ButtonBar.Visible = False
            ElasticSplitter.Visible = False
            pmx_error
            Exit Sub
        End If

        For x1 = 0 To UBound(Attributes) 'columns

            tmpStr = ""

            If Attributes(x1).AttributeOrder > 0 Then

                thisAttributeType = Attributes(x1).AttributeType

                thisParameterDescriptor = pmx_getPDSIthDescriptor(thisParameterDe
                If thisParameterDescriptor = 0 Then
                    ButtonBar.Visible = False
                    ElasticSplitter.Visible = False
                    pmx_error
                    Exit Sub
                End If
```

```
'Is this attribute set to undefined
If (pmx_getParameterCode(thisParameterDescriptor)) <> PMX_PARAMETER_U
    Select Case thisAttributeType

        Case PMX_ATTRIBUTE_ENUMERATION

            tmpStr = c2vbStr(pmx_getParameterEnumeratorName(thisParam

        Case PMX_ATTRIBUTE_NUMERIC

            pmx_getParameterNumericForVB thisParameterDescriptor, ret
            tmpStr = CStr(retFloat!)

            thisUnitHandle = pmx_getParameterUnitHandle(thisParameter
            If pmx_isNullUnitHandle(thisUnitHandle) = CD_TRUE Then
                pmx_error
                ret% = pmx_freeParameterDescriptorSet(thisParameterDe
                Exit Sub
            End If

            thisConvertedValue = pmx_convertBaseToNumericUnit(Databas
            unitStr$ = c2vbStr(pmx_getNumericConversionUnitName(thisC

            ret% = pmx_freeNumericConvertedValue(thisConvertedValue)
            If ret% = CD_FALSE Then
                pmx_error
            End If

            tmpStr = tmpStr + " " + unitStr$

        Case PMX_ATTRIBUTE_BOOLEAN

            bool% = pmx_getParameterBoolean(thisParameterDescriptor)
            If bool% = CD_TRUE Then
                tmpStr = "True"
            Else
                tmpStr = "False"
            End If

        Case PMX_ATTRIBUTE_STRING

            lstParts1.Col = x1 + 1
            lstParts1.Row = y1

            tmpStr = c2vbStr(pmx_getParameterString(thisParameterDesc

        Case PMX_ATTRIBUTE_STRINGARRAY

            lstParts1.Col = x1 + 1
            lstParts1.Row = y1
            lstParts1.TypeEditLen = SPREAD_TEXT_WIDTH

            Elements& = pmx_getParameterStringArrayCount(thisParamete

            If Elements& > 0 Then
                tmpStringArray$ = c2vbStr(pmx_getParameterIthString(t

                For i& = 0 To Elements& - 1
                    tmpStr = tmpStr + c2vbStr(pmx_getParameterIthStri
                Next i&

                tmpStr = Left(tmpStr, Len(tmpStr) - 2)
            End If

    End Select

  End If

  SpreadSetText lstParts1, Attributes(x1).AttributeOrder, y1, tmpStr
End If

Next x1

ret% = pmx_freeParameterDescriptorSet(thisParameterDescriptorSet)
If ret% = CD_FALSE Then
    pmx_error
End If

    Next y1

VB_ERR_FillInPartsList:
If Err <> 0 Then
    ExitPmx DatabaseHandle
End If

End Sub

Sub FillNumericAttribute ()

CUR_SUB = "Sub FillNumericAttribute"
On Error GoTo VB_ERR_FillNumericAttribute

    Dim UnitHandle As Long, Index As Long
    Dim thisAttributeDescriptor As Long
    Dim thisUnitFamilyDescriptor As Long

    txtNumericValue.Text = ""

    thisAttributeDescriptor = pmx_getAttributeDescriptor(DatabaseHandle, Selected/
    If thisAttributeDescriptor = 0& Then
        pmx_error
        Exit Sub
    End If

    thisUnitFamily = pmx_getAttributeUnitFamilyHandle(thisAttributeDescriptor)
    If pmx_isNullUnitFamilyHandle(thisUnitFamily) = CD_TRUE Then
        pmx_error
        Exit Sub
    End If

    thisUnitFamilyDescriptor = pmx_getAvailableUnitsDescriptor(DatabaseHandle, th:
    If thisUnitFamilyDescriptor = 0& Then
        pmx_error
        Exit Sub
    End If

    ListCount& = pmx_getUnitsNumericCount(thisUnitFamilyDescriptor)

    lstUnitsFrom.Clear

    For x1 = 0& To ListCount& - 1
        Index = pmx_getUnitsIthNumericIndex(thisUnitFamilyDescriptor, x1)
        lstUnitsFrom.AddItem c2vbStr(pmx_getAvailableUnitsIthName(thisUnitFamilyDe

        lstUnitsFrom.ItemData(x1) = pmx_getAvailableUnitsIthHandle(thisUnitFamilyI
        If pmx_isNullUnitHandle(lstUnitsFrom.ItemData(x1)) = CD_TRUE Then
            pmx_error
            Exit Sub
        End If

    Next x1

    If x1 = 1 Then
        lstUnitsFrom.ListIndex = 0
    End If

    ret% = pmx_freeAvailableUnitsDescriptor(thisUnitFamilyDescriptor)
    If ret% = CD_FALSE Then
        pmx_error
    End If

    btnDDown.Visible = False

    NumericAttribute.Visible = True
    txtNumericValue.Visible = True
    picEditBox.Visible = True
    'txtNumericValue.SetFocus

VB_ERR_FillNumericAttribute:
If Err <> 0 Then
    ExitPmx DatabaseHandle
End If

End Sub

Sub Form_Load ()
```

```
CUR_SUB = "Sub Form_Load"
On Error GoTo VB_ERR_Form_Load

    Me.Tag = globalSlot

    Screen.MousePointer = 11

    Set CallingForm = PMX.ActiveForm

    DatabaseHandle = FormData(Me.Tag).DBHandle
    LockHolder = FormData(Me.Tag).LockHolder
    ClassHandle = FormData(Me.Tag).ClassHandle
    QueryResultHandle = globalQueryResultHandle

    Me.Left = 0
    Me.Top = 0
    Me.Width = PMX.ScaleWidth
    Me.Height = PMX.ScaleHeight - 600

    If FormData(Me.Tag).deleteRights = CD_TRUE Then
        btnDeleteParts.Visible = True
    Else
        btnDeleteParts.Visible = False
    End If

    Erase Attributes
    PrintHeader = True
    SaveText = ""
    EnumeratedNumeric = False
    EditColumn = 1
    FullPath = ""

    Dim thisClassDescriptor As Long, Count As Long, thisClassHandle As Long, theseCla
    Dim i As Long, rootClass As Long

    rootClass = pmx_getRoot(DatabaseHandle)

    thisClassDescriptor = pmx_getClassDescriptor(DatabaseHandle, rootClass)
    If thisClassDescriptor = 0& Then
        pmx_error
    End If

    Count = pmx_getClassSubclassCount(thisClassDescriptor)

    ret% = pmx_freeClassDescriptor(thisClassDescriptor)
    If ret% = CD_FALSE Then
        pmx_error
    End If

    theseClassDescriptors = pmx_getClassDescriptorSet(DatabaseHandle, rootClass)
    If theseClassDescriptors = 0 Then
        pmx_error
    End If

    ret% = pmx_freeClassDescriptorSet(theseClassDescriptors)
    If ret% = CD_FALSE Then
        pmx_error
    End If

    For x% = 0 To CallingForm.otlClassTree.ListCount - 1
        otlClassTree.AddItem CallingForm.otlClassTree.List(x%)
        otlClassTree.Image(x%) = CallingForm.otlClassTree.Image(x%)
        otlClassTree.ItemLngValue(x%) = CallingForm.otlClassTree.ItemLngValue(x%)
        For Shift% = 0 To CallingForm.otlClassTree.Shift(x%)
            otlClassTree.Shift(x%) = Shift%
        Next Shift%
    Next x%

    For x% = 0 To otlClassTree.ListCount - 1
        If CallingForm.otlClassTree.Expand(x%) = True Then
            otlClassTree.Expand(x%) = True
        End If
    Next x%

    otlClassTree.ListIndex = CallingForm.otlClassTree.ListIndex
    OldListIndex = otlClassTree.ListIndex
    otlClassTree.ItemForeColor(otlClassTree.ListIndex) = RED

    ResultCount = pmx_getQueryResultCount(DatabaseHandle, QueryResultHandle)

    lblRowCount.Caption = "Part count: " + CStr(ResultCount)

    ReDim Attributes(UBound(globalAttributeInfo))

    For x% = 0 To UBound(Attributes)
        Attributes(x%).AttributeHandle = globalAttributeInfo(x%).AttributeHandle
        Attributes(x%).AttributeType = globalAttributeInfo(x%).AttributeType
        Attributes(x%).AttributeTitle = globalAttributeInfo(x%).AttributeTitle
        Attributes(x%).AttributeOrder = globalAttributeInfo(x%).AttributeOrder
        Attributes(x%).UnitFamily = globalAttributeInfo(x%).UnitFamily
        Attributes(x%).EnumeratedNumeric = globalAttributeInfo(x%).EnumeratedNume
        Attributes(x%).EnumeratedUnitHandle = globalAttributeInfo(x%).EnumeratedU
        Attributes(x%).LocalAttribute = globalAttributeInfo(x%).LocalAttribute
        Attributes(x%).Protected = globalAttributeInfo(x%).Protected
        Attributes(x%).Required = globalAttributeInfo(x%).Required
        Attributes(x%).ReadOnly = globalAttributeInfo(x%).ReadOnly
        Attributes(x%).FreshMeat = globalAttributeInfo(x%).FreshMeat
        Attributes(x%).Key = -1
        Attributes(x%).SortOrder = -1
        Attributes(x%).AttributeSetting = globalAttributeInfo(x%).AttributeSettin
    Next x%

    Erase globalAttributeInfo

    lstParts1.MaxCols = UBound(Attributes) + 1
    lstParts1.VirtualMaxRows = ResultCount
    lstParts1.VirtualOverlap = 25
    lstParts1.VirtualMode = True

    If ResultCount > 32767 Then
        lstParts1.VScrollSpecial = True
    End If

    FillInColumnTitles

    Me.FontName = otlClassTree.FontName
    Me.FontSize = otlClassTree.FontSize

    EditColumn = 1

    lstParts1.Col = 1
    lstParts1.Row = 1
    lstParts1.Action = SS_ACTION_ACTIVE_CELL

    ElasticSplitter.Visible = True

    'Set the search window title
    Me.Caption = FormData(Me.Tag).DBname + " - Parts Editor"

    Me.Show

    If EditWinSplit = SPLIT_DIR_HORZ Then
        mnuSplitV.Checked = False
        mnuSplitH.Checked = True

        ElasticSplitter.AutoSizeChildren = 3
        ret% = DoEvents()
        ElasticSplitter.AutoSizeChildren = 4
    Else
        mnuSplitH.Checked = False
        mnuSplitV.Checked = True

        ElasticSplitter.AutoSizeChildren = 1
        ret% = DoEvents()
        ElasticSplitter.AutoSizeChildren = 2
    End If

    Screen.MousePointer = 0

VB_ERR_Form_Load:
If Err <> 0 Then
    ExitPmx DatabaseHandle
End If

End Sub

Sub Form_QueryUnload (Cancel As Integer, UnloadMode As Integer)
```

```
    If isKnowledgebaseRunning(DatabaseHandle) = False Then Exit Sub

    If UnloadMode = 0 Or UnloadMode = 1 Then

        Dim thisClassHandle As Long

        If pmx_destroyQueryResult(DatabaseHandle, QueryResultHandle) = CD_FALSE Then
            pmx_error
        End If

        'Release all locks
        thisClassHandle = otlClassTree.ItemLngValue(otlClassTree.ListIndex)
        ret% = pmx_releaseLock(DatabaseHandle, LockHolder, thisClassHandle, PMX_CLASS
        If ret% = CD_FALSE Then
            pmx_error
        End If

        If otlClassTree.ListCount > 1 Then
            For x& = 0 To otlClassTree.ListCount - 1
                If otlClassTree.Expand(x&) = True Then
                    thisClassHandle = otlClassTree.ItemLngValue(x&)
                    ret% = pmx_releaseLock(DatabaseHandle, LockHolder, thisClassHandl
                    If ret% = CD_FALSE Then
                        pmx_error
                    End If
                End If
            Next x&
        End If

        ret% = pmx_releaseLock(DatabaseHandle, LockHolder, ClassHandle, PMX_TREE_S_LO
        If ret% = CD_FALSE Then
            pmx_error
        End If
    End If
End Sub

Sub Form_Resize ()

CUR_SUB = "Sub Form_Resize"
On Error GoTo VB_ERR_Form_Resize

    If Me.WindowState = 1 Then Exit Sub'Don't do anything if minimizing

    ElasticSplitter.Left = 0
    ElasticSplitter.Width = Me.ScaleWidth
    ElasticSplitter.Top = 0
    tmpHeight% = Me.ScaleHeight - ButtonBar.Height
    If tmpHeight% > 0 Then
        ElasticSplitter.Height = tmpHeight%
    End If

    ElasticAttributes.Top = picEditBox.Height
VB_ERR_Form_Resize:
If Err <> 0 Then
    ExitPmx DatabaseHandle
End If

End Sub

Sub Form_Unload (Cancel As Integer)

CUR_SUB = "Sub Form_Unload"
On Error GoTo VB_ERR_Form_Unload

    Erase Attributes
    Erase AttributeHandles
    Erase AttributeTypes

    FormData(Me.Tag).Deleted = True

VB_ERR_Form_Unload:
If Err <> 0 Then
    ExitPmx DatabaseHandle
End If

End Sub

Function GetAttributeValue (thisInstance As Long, thisAttributeHandle As Long) As Var
```

```
CUR_SUB = "Function GetAttributeValue"
On Error GoTo VB_ERR_GetAttributeValue

    Dim thisAttributeDescriptor As Long
    Dim thisParameterDescriptor As Long
    Dim thisAttributeType As Long
    Dim x As Long
    Dim tmpHandle As Long

    thisAttributeDescriptor = pmx_getAttributeDescriptor(DatabaseHandle, thisAttr
    If thisAttributeDescriptor = 0& Then
        pmx_error
        Exit Function
    End If

    thisAttributeType = pmx_getAttributeType(thisAttributeDescriptor)

    'Determine if this attribute is set to undefined
    thisParameterDescriptor = pmx_getParameterDescriptor(DatabaseHandle, thisInst
    If thisParameterDescriptor = 0& Then
        pmx_error
        Exit Function
    End If

    If pmx_getParameterCode(thisParameterDescriptor) = PMX_PARAMETER_UNDEFINED The
        GetAttributeValue = Null
    Else
        Select Case thisAttributeType
            Case PMX_ATTRIBUTE_ENUMERATION
                tmpHandle = pmx_getParameterEnumeratorHandle(thisParameterDescript
                If pmx_isNullEnumeratorHandle(tmpHandle) = CD_TRUE Then
                    pmx_error
                    Exit Function
                End If

                GetAttributeValue = tmpHandle

            Case PMX_ATTRIBUTE_NUMERIC
                pmx_getParameterNumericForVB thisParameterDescriptor, retFloat!

                tmpHandle = pmx_getParameterUnitHandle(thisParameterDescriptor)
                If pmx_isNullUnitHandle(tmpHandle) = CD_TRUE Then
                    pmx_error
                    Exit Function
                End If

                GetAttributeValue = retFloat!
            Case PMX_ATTRIBUTE_BOOLEAN
                tf% = pmx_getParameterBoolean(thisParameterDescriptor)
                GetAttributeValue = tf%
            Case PMX_ATTRIBUTE_STRING
                tmpString$ = c2vbStr(pmx_getParameterString(thisParameterDescripto
                GetAttributeValue = tmpString$
            Case PMX_ATTRIBUTE_STRINGARRAY
                Elements! = pmx_getParameterStringArrayCount(thisParameterDescript
                For i& = 0 To Elements! - 1
                    tmpStr = tmpStr + "|" + c2vbStr(pmx_getParameterIthString(thi
                Next i&
        End Select
    End If

    ret% = pmx_freeParameterDescriptor(thisParameterDescriptor)
    If ret% = CD_FALSE Then
        pmx_error
    End If

    ret% = pmx_freeAttributeDescriptor(thisAttributeDescriptor)
    If ret% = CD_FALSE Then
        pmx_error
    End If


VB_ERR_GetAttributeValue:
If Err <> 0 Then
    ExitPmx DatabaseHandle
End If

End Function
```

```
Sub lblRowCount_Change ()

CUR_SUB = "Sub lblRowCount_Change"
On Error GoTo VB_ERR_lblRowCount_Change

    If ResultCount = 0 Then
        btnMoveParts.Enabled = False
        btnDeleteParts.Enabled = False
        picEditBox.Visible = False
        btnSort.Enabled = False
    End If

    If ResultCount = 1 Then
        btnSort.Enabled = False
    End If


VB_ERR_lblRowCount_Change:
If Err <> 0 Then
    ExitPmx DatabaseHandle
End If

End Sub

Sub lstParts1_BlockSelected (BlockCol As Long, BlockRow As Long, BlockCol2 As Long, B

CUR_SUB = "Sub lstParts1_BlockSelected"
On Error GoTo VB_ERR_lstParts1_BlockSelected

    ClipCursor ByVal 0&

    If BlockCol <> BlockCol2 Then
        If BlockCol <> 0 Then
            lstParts1.Action = SS_ACTION_DESELECT_BLOCK
            lstParts1.Col = lstParts1.ActiveCol'BlockCol2
            lstParts1.Col2 = lstParts1.ActiveCol'BlockCol2
            lstParts1.Row = BlockRow
            lstParts1.Row2 = BlockRow2
            lstParts1.BlockMode = True
            lstParts1.Action = SS_ACTION_SELECT_BLOCK
            lstParts1.BlockMode = False
        End If
    End If

    If BlockCol = 0 Then
        picEditBox.Visible = False
        picEditButtons.Visible = False
        btnMoveParts.Enabled = True
        btnDeleteParts.Enabled = True
        btnPartInfo.Enabled = True
    Else
        btnMoveParts.Enabled = False
        btnDeleteParts.Enabled = False
        btnPartInfo.Enabled = False
    End If

VB_ERR_lstParts1_BlockSelected:
If Err <> 0 Then
    ExitPmx DatabaseHandle
End If

End Sub

Sub lstParts1_Click (Col As Long, Row As Long)
        ClipCursor ByVal 0&

        TurnOffAttributeEditors

        If Row = 0 Then
            SetAttributeEditDisplay Row, Col
        ElseIf Row = -2 Then
            Row = lstParts1.MaxRows
        End If

        If Col > 0 Then
            SetAttributeEditDisplay Col, Row
        End If
```

```
End Sub

Sub lstParts1_DragOver (Source As Control, x As Single, y As Single, State As Inte

    If Not DragValid(Source, MASK_INSTANCE) Or Not Source.Parent.hWnd = Me.hWnd Th
        Exit Sub
    End If

    If Source.Parent.hWnd = Me.hWnd Then
        Select Case State
            Case ENTER
                Source.DragIcon = PMX.SaveIcon.DragIcon
            Case LEAVE
                Source.DragIcon = PMX.NoDrag.DragIcon
        End Select
    End If

End Sub

Sub lstParts1_KeyPress (KeyAscii As Integer)

CUR_SUB = "Sub lstParts1_KeyPress"
On Error GoTo VB_ERR_lstParts1_KeyPress
    btnUndefined.Value = False

    If SelectedAttributeType = PMX_ATTRIBUTE_STRING Then
        If KeyAscii > 31 And KeyAscii < 127 Then
            Text1.SelText = Chr(KeyAscii)
            btnSetAttribute.Visible = True
            btnCancelAttribute.Visible = True
        End If
        Text1.SetFocus
    End If

VB_ERR_lstParts1_KeyPress:
If Err <> 0 Then
    ExitPmx DatabaseHandle
End If

End Sub

Sub lstParts1_MouseDown (Button As Integer, Shift As Integer, x As Single, y As S
    Dim Row As Long, Col As Long
    SpreadGetCellFromScreenCoord lstParts1, Col, Row, x, y
    THECOL = Col
Exit Sub
CUR_SUB = "Sub lstParts1_MouseDown"
On Error GoTo VB_ERR_lstParts1_MouseDown

    Dim thisClass As Long, tmpHandle As Long

    SpreadGetCellFromScreenCoord lstParts1, Col, Row, x, y

    If Button = 1 And Col > 0 And Row > 0 Then

        GetCursorPos CursPos

        ColRect.Top = 0
        ColRect.Bottom = 10000
        ColRect.Left = CursPos.x
        ColRect.Right = CursPos.x

        ClipCursor ColRect
        Dim thisInstanceHandle As Long

    End If

VB_ERR_lstParts1_MouseDown:
If Err <> 0 Then
    ExitPmx DatabaseHandle
End If

End Sub

Sub lstParts1_MouseMove (Button As Integer, Shift As Integer, x As Single, y As S
     DragDropTimer.Enabled = False
    Dim Row As Long, Col As Long
    Dim thisClass As Long, tmpHandle As Long
```

```
SpreadGetCellFromScreenCoord lstPartsl, Col, Row, x, y

    If Button = 1 And Col >= 0 And Row > 0 Then
        GetCursorPos CursPos

        ColRect.Top = 0
        ColRect.Bottom = 10000
        ColRect.Left = CursPos.x
        ColRect.Right = CursPos.x

        ClipCursor ColRect
    ElseIf Button = 1 And Row = 0 Then
        ClipCursor ByVal 0&
    End If

End Sub

Sub lstPartsl_MouseUp (Button As Integer, Shift As Integer, x As Single, y As Single)

CUR_SUB = "Sub lstPartsl_MouseUp"
On Error GoTo VB_ERR_lstPartsl_MouseUp

    ClipCursor ByVal 0&
    DragDropTimer.Enabled = False

Exit Sub

    If Button = 1 Then
        SpreadGetCellFromScreenCoord lstPartsl, lpCol&, lpRow&, x, y
        If lpRow& = 0 Then
            SetAttributeEditDisplay lpCol&, lpRow&
        End If

        If lpRow& = -2 Then lpRow& = lstPartsl.MaxRows
        If lpCol& > 0 Then
            SetAttributeEditDisplay lpCol&, lpRow&
        End If
    End If

VB_ERR_lstPartsl_MouseUp:
If Err <> 0 Then
    ExitPmx DatabaseHandle
End If

End Sub

Sub lstPartsl_QueryData (Row As Long, RowsNeeded As Long, RowsLoaded As Long, Directi

CUR_SUB = "Sub lstPartsl_QueryData"
On Error GoTo VB_ERR_lstPartsl_QueryData

    If Row + RowsNeeded > lstPartsl.VirtualMaxRows Then
        RowsNeeded = lstPartsl.VirtualMaxRows - Row + 1
    End If

    Screen.MousePointer = 11

    CurCount& = lstPartsl.VirtualCurRowCount

    RowsLoaded = RowsNeeded

    FillInPartsList Row, RowsNeeded

    If CurCount& = 0 Then
        lstPartsl.Row = -2
        lstPartsl.ColWidth(0) = TextWidth(CStr(lstPartsl.VirtualMaxRows)) + 50
        For xl = 1 To lstPartsl.MaxCols
            lstPartsl.ColWidth(xl) = lstPartsl.MaxTextColWidth(xl) + 50
        Next xl
    End If

    VirtualListCount& = lstPartsl.VirtualCurRowCount

    If lstPartsl.VirtualCurTop < lstPartsl.VirtualOverlap Then
        ToCount = lstPartsl.VirtualCurTop + VirtualListCount& + lstPartsl.VirtualOver
    Else
        ToCount = lstPartsl.VirtualCurTop + VirtualListCount& - 1
    End If

    For x& = lstPartsl.VirtualCurTop To ToCount
        If x& > VirtualListCount& Then
            Exit For
        Else
            SpreadSetText lstPartsl, 0, x&, CStr(x&)
        End If
    Next x&

    Screen.MousePointer = 0

VB_ERR_lstPartsl_QueryData:
If Err <> 0 Then
    ExitPmx DatabaseHandle
End If

End Sub

Sub lstUnitsFrom_Click ()

CUR_SUB = "Sub lstUnitsFrom_Click"
On Error GoTo VB_ERR_lstUnitsFrom_Click

    btnUndefined.Value = False

    If txtNumericValue.Text <> "" Then
        btnSetAttribute.Visible = True
        btnCancelAttribute.Visible = True
    End If

VB_ERR_lstUnitsFrom_Click:
If Err <> 0 Then
    ExitPmx DatabaseHandle
End If

End Sub

Sub mnuAbout_Click ()

CUR_SUB = "Sub mnuAbout_Click"
On Error GoTo VB_ERR_mnuAbout_Click

    Screen.MousePointer = 11

    DlgAbout.Show 1

VB_ERR_mnuAbout_Click:
If Err <> 0 Then
    ExitPmx DatabaseHandle
End If

End Sub

Sub mnuArrangeIcons_Click ()
    PMX.Arrange ARRANGE_ICONS
End Sub

Sub mnuAttributeDisplay_Click ()

    lstPartsl.ReDraw = False

    globalClassHandle = ClassHandle

    ReDim globalAttributeInfo(UBound(Attributes))

    For x% = 0 To UBound(Attributes)
        globalAttributeInfo(x%).AttributeHandle = Attributes(x%).AttributeHandle
        globalAttributeInfo(x%).AttributeType = Attributes(x%).AttributeType
        globalAttributeInfo(x%).AttributeTitle = Attributes(x%).AttributeTitle
        globalAttributeInfo(x%).AttributeOrder = Attributes(x%).AttributeOrder
        globalAttributeInfo(x%).UnitFamily = Attributes(x%).UnitFamily
        globalAttributeInfo(x%).EnumeratedNumeric = Attributes(x%).EnumeratedNume
        globalAttributeInfo(x%).EnumeratedUnitHandle = Attributes(x%).EnumeratedU
        globalAttributeInfo(x%).LocalAttribute = Attributes(x%).LocalAttribute
        globalAttributeInfo(x%).Protected = Attributes(x%).Protected
        globalAttributeInfo(x%).Required = Attributes(x%).Required
        globalAttributeInfo(x%).ReadOnly = Attributes(x%).ReadOnly
        globalAttributeInfo(x%).FreshMeat = Attributes(x%).FreshMeat
        globalAttributeInfo(x%).SortOrder = Attributes(x%).SortOrder
        globalAttributeInfo(x%).Key = Attributes(x%).Key
```

```
    Next x%

    dlgAttrSetup.Show 1

    Screen.MousePointer = 11

    FillInAttributes% = CInt(dlgAttrSetup.Tag)

    If FillInAttributes% = True Then
        For x% = 0 To UBound(Attributes)
            Attributes(x%).AttributeOrder = globalAttributeInfo(x%).AttributeOrder
        Next x%

        FillInColumnTitles

        FillInPartsList CLng(lstParts1.VirtualCurTop), CLng(lstParts1.VirtualCurRowCo

        lstParts1.Row = -2
        For x1 = 1 To lstParts1.MaxCols
            lstParts1.ColWidth(x1) = lstParts1.MaxTextColWidth(x1) + 50
        Next x1

        PrintHeader = True

    End If

    Erase globalAttributeInfo

    Unload dlgAttrSetup

    Screen.MousePointer = 0

    lstParts1.ReDraw = True

End Sub

Sub mnuCascade_Click ()
    PMX.Arrange CASCADE
End Sub

Sub mnuCloseKB_Click ()
    Dim Msg As String

    Msg = "Close knowledge base " + FormData(PMX.ActiveForm.Tag).DBname + "?"
    If MsgBox(Msg, 36, "CADIS-PMX") = IDYES Then
        FormData(Me.Tag).Deleted = True

        If FormData(Me.Tag).extDataAccess = CD_TRUE Then
            ret% = pmx_destroyExtPMXConnection(DatabaseHandle)
            If ret% = CD_FALSE Then
                pmx_error
            End If
        End If

        CloseDB DatabaseHandle
        Unload Me
    End If
End Sub

Sub mnuDeleteParts_Click ()
    btnDeleteParts_Click
End Sub

Sub mnuExit_Click ()

CUR_SUB = "Sub mnuExit_Click"
On Error GoTo VB_ERR_mnuExit_Click


    Unload PMX


VB_ERR_mnuExit_Click:
If Err <> 0 Then
    ExitPmx DatabaseHandle
End If

End Sub

Sub mnuFindClass_Click ()
    dlgFindClass.Show 1
End Sub

Sub mnuMoveParts_Click ()
    btnMoveParts_Click
End Sub

Sub mnuOpen_Click ()

CUR_SUB = "Sub mnuOpen_Click"
On Error GoTo VB_ERR_mnuOpen_Click

    OpenDB ""

VB_ERR_mnuOpen_Click:
If Err <> 0 Then
    ExitPmx DatabaseHandle
End If

End Sub

Sub mnuPartInfo_Click ()
    btnPartInfo_Click
End Sub

Sub mnuPrint_Click ()

CUR_SUB = "Sub mnuPrint_Click"
On Error GoTo VB_ERR_mnuPrint_Click

    If Printing = True Then Exit Sub
    Printing = True

    MyIndex% = lstParts1.ActiveRow

    ReDim AttributeHandles(UBound(Attributes))
    ReDim AttributeTypes(UBound(Attributes))

    AttribCount% = 0
    For x& = 0 To UBound(Attributes)
        If Attributes(x&).AttributeOrder > 0 Then
            AttributeHandles(Attributes(x&).AttributeOrder - 1) = Attributes(x&).A
            AttributeTypes(Attributes(x&).AttributeOrder - 1) = Attributes(x&).At
            AttribCount% = AttribCount% + 1
        End If
    Next x&

    If AttribCount% = 0 Then
        GoTo VB_ERR_mnuPrint_Click
    End If

    ReDim Preserve AttributeHandles(AttribCount%)
    ReDim Preserve AttributeTypes(AttribCount%)

    If LastPrintTag <> Me.Tag Then
        PrintHeader = True
    End If

    ShowPrintDialog DatabaseHandle, QueryResultHandle, AttributeHandles(), Attrib

    lstParts1.Row = MyIndex%
    lstParts1.Action = SS_ACTION_ACTIVE_CELL

    lstParts1.ReDraw = True

    PrintHeader = False
    LastPrintTag = Me.Tag

VB_ERR_mnuPrint_Click:
    Printing = False
If Err <> 0 Then
    ExitPmx DatabaseHandle
End If

End Sub

Sub mnuPrinterSetup_Click ()
```

```
CUR_SUB = "Sub mnuPrinterSetup_Click"
On Error GoTo VB_ERR_mnuPrinterSetup_Click

    ShowPrinterSetup

VB_ERR_mnuPrinterSetup_Click:
If Err <> 0 Then
    ExitPmx DatabaseHandle
End If

End Sub

Sub mnuSort_Click ()
    btnSort_Click
End Sub

Sub mnuSplitH_Click ()

CUR_SUB = "Sub mnuSplitH_Click"
On Error GoTo VB_ERR_mnuSplitH_Click

    SPLIT_DIR = SPLIT_DIR_HORZ
    EditWinSplit = SPLIT_DIR

    mnuSplitV.Checked = False
    mnuSplitH.Checked = True

    ElasticSplitter.AutoSizeChildren = 3
    ret% = DoEvents()
    ElasticSplitter.AutoSizeChildren = 4

VB_ERR_mnuSplitH_Click:
If Err <> 0 Then
    ExitPmx DatabaseHandle
End If

End Sub

Sub mnuSplitV_Click ()

CUR_SUB = "Sub mnuSplitV_Click"
On Error GoTo VB_ERR_mnuSplitV_Click

    SPLIT_DIR = SPLIT_DIR_VERT
    EditWinSplit = SPLIT_DIR

    mnuSplitH.Checked = False
    mnuSplitV.Checked = True

    ElasticSplitter.AutoSizeChildren = 1
    ret% = DoEvents()
    ElasticSplitter.AutoSizeChildren = 2

VB_ERR_mnuSplitV_Click:
If Err <> 0 Then
    ExitPmx DatabaseHandle
End If

End Sub

Sub mnuTile_Click ()
    PMX.Arrange TILE_HORIZONTAL
End Sub

Sub MoveInstance (newClassHandle As Long)
'4/26/94 Optimized move to look for problem attributes if previous class handle equal
'and problemattributecount equals 0
'4/26/94 Changed logic of SKIP_MOVE_PART before MOVE_ALL_PARTS to make skipping part
'work properly

CUR_SUB = "Sub MoveInstance"
On Error GoTo VB_ERR_MoveInstance

    Dim thisInstance As Long
    Dim newInstanceHandle As Long
    Dim x As Long, y  As Long
    Dim problemAttributeCount As Integer
    Dim lastProblemAttributeCount As Integer
Dim thisAttributeHandle As Long
Dim RowTo As Long, RowFrom As Long
Dim DeleteCount As Long

Dim oldClassHandle As Long
Dim thisClassHandle As Long
Dim attributeCount As Long
Dim dlgNewAttributehandle() As Long
Dim oldAttributehandle() As Long
Dim movedInstances As Long
Dim instancesToMove As Long
Dim Value As Variant
Dim selectedMoveOption As Integer
Dim MSG_ALREDY_DISPLAYED As Integer

RowFrom = lstParts1.SelBlockRow
RowTo = lstParts1.SelBlockRow2

'-1 is the label
If RowFrom = -1 Then
    RowFrom = 1
    RowTo = lstParts1.VirtualMaxRows
ElseIf RowTo = -1 Then
    RowTo = RowFrom
End If

'verify the first part with a problem
selectedMoveOption = MOVE_PART

oldClassHandle = newClassHandle

attributeCount = pmx_getAttributeCount(DatabaseHandle, newClassHandle)

ReDim dlgNewAttributehandle(attributeCount)
lastProblemAttributeCount = 1 'set to trigger if statement

'Get all of the attributes from the new location and store them in an array
'for future comparisons to the old attributes
For x = 0 To attributeCount - 1
    dlgNewAttributehandle(x) = pmx_getIthAttribute(DatabaseHandle, newClassHa
    If pmx_isNullAttributeHandle(dlgNewAttributehandle(x)) = CD_TRUE Then
        pmx_error
        GoTo VB_ERR_MoveInstance
    End If
Next x

lstParts1.ReDraw = False

DeleteCount = 0
MSG_ALREDY_DISPLAYED = False
For y = RowFrom To RowTo

    problemAttributeCount = 0

    If y Mod 10 = 0 Then
        lblRowCount.Caption = "Part count: " + CStr(ResultCount - DeleteCount)
        lblRowCount.Refresh
    End If

    thisInstance = pmx_getIthQueryInstance(DatabaseHandle, QueryResultHandle

    'Row to delete is always first row selected
    thisClassHandle = pmx_getOwnerOfInstance(DatabaseHandle, thisInstance)
    If pmx_isNullInstanceHandle(thisInstance) = CD_FALSE Or pmx_isNullClassHa
        If thisClassHandle <> newClassHandle Then
            If selectedMoveOption = MOVE_ALL_PARTS Or (selectedMoveOption = M
                'Don't need to check
            Else
                'Get all of the attributes from the new location and store th
                'for future comaprisons to the new attributes
                attributeCount = pmx_getAttributeCount(DatabaseHandle, thisCl
                ReDim oldAttributehandle(attributeCount)

                For x = 0 To attributeCount - 1
                    oldAttributehandle(x) = pmx_getIthAttribute(DatabaseHandl
                    If pmx_isNullAttributeHandle(oldAttributehandle(x)) = CD_
                        pmx_error
                        GoTo VB_ERR_MoveInstance
                    End If
```

```
Next x

theseAttributeDescriptors = pmx_getAttributeDescriptorSet(Databas
If theseAttributeDescriptors = 0 Then
    pmx_error
    GoTo VB_ERR_MoveInstance
End If

'loop through looking for attribute handles that don't match
For Attrib% = 0 To UBound(oldAttributehandle) - 1

    If Attrib% <= UBound(dlgNewAttributehandle) - 1 Then

        If oldAttributehandle(Attrib%) <> dlgNewAttributehandle(A
            Value = GetAttributeValue(thisInstance, oldAttributeh

            If IsNull(Value) = False Then 'Null is Undefined
                'Put the title of the attribute in the dlgMoveIns
                thisAttributeDescriptor = pmx_getADSIthDescriptor
                If thisAttributeDescriptor = 0& Then
                    pmx_error
                    Exit For
                End If

                problemAttributeCount = problemAttributeCount + 1
                dlgMoveParts.Spread1.MaxRows = problemAttributeCo
                SpreadSetRowItemData dlgMoveParts.Spread1, proble
                SpreadSetText dlgMoveParts.Spread1, 1, problemAtt

            End If

        End If

    Else

        thisAttributeDescriptor = pmx_getADSIthDescriptor(theseAt
        If thisAttributeDescriptor = 0& Then
            pmx_error
            GoTo VB_ERR_MoveInstance
        End If

        problemAttributeCount = problemAttributeCount + 1
        dlgMoveParts.Spread1.MaxRows = problemAttributeCount
        SpreadSetRowItemData dlgMoveParts.Spread1, problemAttribu
        SpreadSetText dlgMoveParts.Spread1, 1, problemAttributeCo

    End If

Next Attrib%
lastProblemAttributeCount = problemAttributeCount

ret% = pmx_freeAttributeDescriptorSet(theseAttributeDescriptors)
    If ret% = CD_FALSE Then
    pmx_error
End If
End If

If problemAttributeCount > 0 Then
    If selectedMoveOption = MOVE_PART Or selectedMoveOption = SKIP_MO
        'Show the non-moveable attribute dialog
        Screen.MousePointer = 0
        globalInstanceHandle = thisInstance

        dlgMoveParts.Show 1
        Screen.MousePointer = 11
        ret% = DoEvents()
        selectedMoveOption = dlgMoveParts.Tag
        Unload dlgMoveParts

        Screen.MousePointer = 11

        If selectedMoveOption = CANCEL_MOVE_PARTS Then
            Exit For
        End If
    End If
End If

If selectedMoveOption = SKIP_MOVE_PART Then
    selectedMoveOption = MOVE_PART
                    RowFrom = RowFrom + 1
                    DeleteCount = DeleteCount - 1
                ElseIf selectedMoveOption = MOVE_PART Or selectedMoveOption = MOV]
                    ret% = pmx_moveInstance(DatabaseHandle, thisInstance, newClas
                    If ret% = CD_FALSE Then
                        pmx_error
                        DeleteCount = DeleteCount - 1
                        RowFrom = RowFrom + 1
                    Else
                        ret% = pmx_removeQueryResultRange(DatabaseHandle, QueryRe
                        If ret% = CD_FALSE Then
                            pmx_error
                            RowFrom = RowFrom + 1
                            DeleteCount = DeleteCount - 1
                        End If
                    End If
                End If
            Else 'Moving to the same class it came from
                ret% = pmx_removeQueryResultRange(DatabaseHandle, QueryResultHand
                If ret% = CD_FALSE Then
                    pmx_error
                    RowFrom = RowFrom + 1
                    DeleteCount = DeleteCount - 1
                End If
            End If
        End If

        DeleteCount = DeleteCount + 1

        oldClassHandle = thisClassHandle

    Next y

    FillInPartsList CInt(lstParts1.VirtualCurTop), CInt(lstParts1.VirtualCurRowCo
    lstParts1.Row = RowFrom
    lstParts1.Col = 1
    lstParts1.Action = SS_ACTION_ACTIVE_CELL

VB_ERR_MoveInstance:
    'DeleteInstances
    Erase dlgNewAttributehandle
    Erase oldAttributehandle

    btnMoveParts.Enabled = False
    btnDeleteParts.Enabled = False
    btnPartInfo.Enabled = False

    lstParts1.ReDraw = True

    If Err <> 0 Then
        ExitPmx DatabaseHandle
    End If

    Exit Sub

End Sub

Sub optFalse_Click ()

CUR_SUB = "Sub optFalse_Click"
On Error GoTo VB_ERR_optFalse_Click

    btnUndefined.Value = False

    If optFalse.Visible = False Then Exit Sub
    optTrue.Value = False
    btnSetAttribute.Visible = True
    btnCancelAttribute.Visible = True

VB_ERR_optFalse_Click:
If Err <> 0 Then
    ExitPmx DatabaseHandle
End If

End Sub

Sub optTableCustom_Click (Index As Integer)
```

```
    btnUndefined.Value = False
    EnumNumAttribute.Visible = False
    NumericAttribute.Visible = False
    btnSetAttribute.Visible = False
    btnCancelAttribute.Visible = False

    Select Case Index
        Case 0
            ShowLabelAttributeText
        Case 1
            FillNumericAttribute
            txtNumericValue.SetFocus
    End Select

End Sub

Sub optTableCustom_GotFocus (Index As Integer)
    btnUndefined.Value = False
End Sub

Sub optTrue_Click ()

CUR_SUB = "Sub optTrue_Click"
On Error GoTo VB_ERR_optTrue_Click

    btnUndefined.Value = False
    If optTrue.Value = False Then Exit Sub
    optFalse.Value = False
    btnSetAttribute.Visible = True
    btnCancelAttribute.Visible = True

VB_ERR_optTrue_Click:
If Err <> 0 Then
    ExitPmx DatabaseHandle
End If

End Sub

Sub otlClassTree_Click ()

CUR_SUB = "Sub otlClassTree_Click"
On Error GoTo VB_ERR_otlClassTree_Click

    If InEvent = True Then Exit Sub

    InEvent = True

    Dim ListIndex As Integer
    Dim thisClassHandle As Long, oldClassHandle  As Long
    Dim oldQueryHandle As Long

    ListIndex = otlClassTree.ListIndex
    If ListIndex = -1 Then
        otlClassTree.ListIndex = 0
    End If

    If ListIndex = OldListIndex And Me.Visible = True Then
        GoTo VB_ERR_otlClassTree_Click
    End If

    oldClassHandle = otlClassTree.ItemLngValue(OldListIndex)
    thisClassHandle = otlClassTree.ItemLngValue(ListIndex)

    ret% = pmx_checkSelfConflictLock(DatabaseHandle, LockHolder, thisClassHandle, PMX
    If ret% = CD_FALSE Then
        otlClassTree.ListIndex = OldListIndex
        pmx_error
        GoTo VB_ERR_otlClassTree_Click
    End If

    ret% = pmx_requestLock(DatabaseHandle, LockHolder, thisClassHandle, PMX_CLASS_S_L
    If ret% = CD_FALSE Then
        otlClassTree.ListIndex = OldListIndex
        pmx_error
        GoTo VB_ERR_otlClassTree_Click
    End If

    If Me.Visible = True Then
        ret% = pmx_releaseLock(DatabaseHandle, LockHolder, oldClassHandle, PMX_CLASS_
```

```
            If ret% = CD_FALSE Then
                pmx_error
            End If
        End If

        OldListIndex = ListIndex

VB_ERR_otlClassTree_Click:

    InEvent = False
If Err <> 0 Then
    ExitPmx DatabaseHandle
End If

End Sub

Sub otlClassTree_Collapse (ListIndex As Integer)

    Dim thisClassHandle As Long

    thisClassHandle = otlClassTree.ItemLngValue(ListIndex)

    ret% = pmx_releaseLock(DatabaseHandle, LockHolder, thisClassHandle, PMX_CLASS_
    If ret% = CD_FALSE Then
        pmx_error
    End If

    If otlClassTree.Image(ListIndex) = PMX.OUTLINE_PICTURE_OPEN Then
        otlClassTree.Image(ListIndex) = PMX.OUTLINE_PICTURE_CLOSED
    End If

    'Scan from cur class down releasing locks on open classes including the cur c
    Dim curShift As Integer
    curShift = otlClassTree.Shift(ListIndex)
    For x& = ListIndex To otlClassTree.ListCount - 1
        If x& <> ListIndex Then
            If otlClassTree.Shift(x&) <= curShift Then
                Exit For
            ElseIf otlClassTree.Image(x&) = PMX.OUTLINE_PICTURE_OPEN Then
                thisClassHandle = otlClassTree.ItemLngValue(x&)
                ret% = pmx_releaseLock(DatabaseHandle, LockHolder, thisClassHandl
                If ret% = CD_FALSE Then
                    pmx_error
                End If
            End If
        End If
    Next x&

    Do While ListIndex + 1 < otlClassTree.ListCount
        If otlClassTree.Shift(ListIndex + 1) <= otlClassTree.Shift(ListIndex) The
            Exit Do
        End If
        otlClassTree.RemoveItem ListIndex + 1
    Loop

End Sub

Sub otlClassTree_DblClick ()

CUR_SUB = "Sub otlClassTree_DblClick"
On Error GoTo VB_ERR_otlClassTree_DblClick

    Dim ListIndex As Integer, Shift As Integer
    Dim thisClassHandle As Long

    ListIndex = otlClassTree.ListIndex

    If ListIndex = -1 Then Exit Sub

    Select Case otlClassTree.Image(ListIndex)
        Case PMX.OUTLINE_PICTURE_LEAF
        Case PMX.OUTLINE_PICTURE_CLOSED
            otlClassTree.Expand(ListIndex) = True
        Case Else
            otlClassTree.Expand(ListIndex) = False
    End Select

VB_ERR_otlClassTree_DblClick:
```

```
If Err <> 0 Then
    Exit Pmx DatabaseHandle
End If

End Sub

Sub otlClassTree_DragOver (Source As Control, x As Single, y As Single, State As Inte

    If Not DragValid(Source, MASK_CLASS) Or Not Source.Parent.hWnd = Me.hWnd Then
        Exit Sub
    End If

    Select Case State
        Case ENTER
            Source.DragIcon = PMX.SaveIcon.DragIcon
        Case LEAVE
            Source.DragIcon = PMX.NoDrag.DragIcon
    End Select

End Sub

Sub otlClassTree_Expand (ListIndex As Integer)
    Dim thisClassHandle As Long

    Screen.MousePointer = 11

    thisClassHandle = otlClassTree.ItemLngValue(ListIndex)

    ret% = pmx_checkSelfConflictLock(DatabaseHandle, LockHolder, thisClassHandle, PMX
    If ret% = CD_FALSE Then
        pmx_error
        Exit Sub
    End If

    ret% = pmx_requestLock(DatabaseHandle, LockHolder, thisClassHandle, PMX_CLASS_S_L
    If ret% = CD_FALSE Then
        pmx_error
        Exit Sub
    End If

    If otlClassTree.HasSubItems(ListIndex) = False Then

        thisClassHandle = otlClassTree.ItemLngValue(ListIndex)

        FillClassTree DatabaseHandle, otlClassTree, thisClassHandle, ListIndex, CInt(

    End If

    otlClassTree.Image(otlClassTree.ListIndex) = PMX.OUTLINE_PICTURE_OPEN

    Dim curShift As Integer
    curShift = otlClassTree.Shift(ListIndex)
    For x& = ListIndex To otlClassTree.ListCount - 1
        If otlClassTree.Shift(x&) < otlClassTree.Shift(ListIndex) Then
            Exit For
        ElseIf otlClassTree.ItemLngValue(x&) = ClassHandle Then
            otlClassTree.ItemForeColor(x&) = RED
            Exit For
        End If
    Next x&

    Screen.MousePointer = 0

End Sub

Sub otlClassTree_MouseDown (Button As Integer, Shift As Integer, x As Single, y As Si

    'Start timmer to see if user wants to drag drop
    If Button = 1 Then
        'PMX.SaveIcon.DragIcon = PMX.ClassDrag.DragIcon
        'MakeClassDDStruct DatabaseHandle, CLng(otlClassTree.ItemLngValue(otlClassTre
        'DragDropTimer.Enabled = True
    End If

End Sub

Sub otlClassTree_MouseMove (Button As Integer, Shift As Integer, x As Single, y As Si
    DragDropTimer.Enabled = False
End Sub

Sub otlClassTree_MouseUp (Button As Integer, Shift As Integer, x As Single, y As S
    DragDropTimer.Enabled = False
End Sub

Sub SaveAttribute ()

CUR_SUB = "Sub SaveAttribute"
On Error GoTo VB_ERR_SaveAttribute

    Dim thisInstance As Long
    Dim RowTo As Long, RowFrom As Long
    Dim MSG_ALREDY_DISPLAYED As Integer
    Dim thisLockClass As Long

    lstParts1.ReDraw = False

    lstParts1.Col = EditColumn

    '-1 is the label
    RowFrom = lstParts1.SelBlockRow
    RowTo = lstParts1.SelBlockRow2

    If RowFrom = -1 Then
        RowFrom = 1
        RowTo = lstParts1.VirtualMaxRows
    ElseIf RowTo = -1 Then
        RowTo = RowFrom
    End If

    'Get Lock
    If RowTo - RowFrom = 0 Then  'only one part is selected, get a lock on owner c
        thisInstance = pmx_getIthQueryInstance(DatabaseHandle, QueryResultHandle,
        thisLockClass = pmx_getOwnerOfInstance(DatabaseHandle, thisInstance)
    Else 'more than one part is selected, get a lock class of query
        thisLockClass = ClassHandle
    End If

    ret% = pmx_requestLock(DatabaseHandle, LockHolder, thisLockClass, PMX_TREE_U_I
    If ret% = CD_FALSE Then
        pmx_error
        Exit Sub
    End If

    MSG_ALREDY_DISPLAYED = False
    For yl& = RowFrom To RowTo

        CurCount& = CurCount& + 1
        If CurCount& Mod 10 = 0 Then
            lblStatus.Caption = CStr(CurCount&)
            lblStatus.Refresh
        End If

        thisInstance = pmx_getIthQueryInstance(DatabaseHandle, QueryResultHandle,
        If pmx_isNullInstanceHandle(thisInstance) = CD_TRUE Or pmx_isNullClassHan
            If MSG_ALREDY_DISPLAYED = False Then
                MsgBox "One or more parts have been deleted by another user and w
                MSG_ALREDY_DISPLAYED = True
            End If

            ret% = pmx_removeQueryResultRange(DatabaseHandle, QueryResultHandle, ;
            If ret% = CD_FALSE Then
                pmx_error
            Else
                'need to keep yl& in sync with the query result list
                lstParts1.Row = yl&
                RowTo = RowTo - 1
                lstParts1.Action = SS_ACTION_DELETE_ROW
                lstParts1.VirtualMaxRows = lstParts1.VirtualMaxRows - 1
                ResultCount = ResultCount - 1
                If RowFrom <> RoTo Then
                    yl& = yl& - 1
                End If
            End If
        Else
            If btnUndefined.Value = True Then
                ret% = pmx_setParameterUndefined(DatabaseHandle, thisInstance, Se
                If ret% = CD_FALSE Then
                    pmx_error
```

```
        Else
            SpreadSetText lstPartsl, EditColumn, yl&, ""
            SpreadSetText lstPartsl, EditColumn, yl&, ""
        End If
    Else
        Select Case SelectedAttributeType
            Case PMX_ATTRIBUTE_ENUMERATION

                If EnumeratedAttribute.ListIndex < 0 Then
                    SetAttributeEditDisplay CLng(EditColumn), CLng(lstPartsl.
                    GoTo VB_ERR_SaveAttribute
                End If

                ret% = pmx_setEnumeratedParameter(DatabaseHandle, thisInstanc
                If ret% = CD_FALSE Then
                    pmx_error
                Else
                    tmpStr$ = EnumeratedAttribute.Text
                    SpreadSetText lstPartsl, EditColumn, yl&, tmpStr$
                End If

                EnumeratedAttribute.Visible = False

            Case PMX_ATTRIBUTE_NUMERIC

                If EnumeratedNumeric = True And optTableCustom(0).Value = Tru
                    Index% = Abs(((EnumNumAttribute.ActiveCol - 1) * EnumNumA
                    ret% = pmx_setEnumUnitParameter(DatabaseHandle, thisInsta
                    If ret% = CD_FALSE Then
                        pmx_error
                    End If

                    ret% = SpreadGetText(EnumNumAttribute, EnumNumAttribute.A
                    If ret% = CD_FALSE Then
                        pmx_error
                    Else
                        SpreadSetText lstPartsl, EditColumn, yl&, tmpStr$
                    End If

                    EnumNumAttribute.Visible = False

                Else

                    If lstUnitsFrom.ListIndex = -1 Then
                        MsgBox "A unit of measure needs to be selected.", 48
                        GoTo VB_ERR_SaveAttribute
                    End If

                    ret% = pmx_setNumericParameter(DatabaseHandle, thisInstan
                    If ret% = CD_FALSE Then
                        pmx_error
                    Else
                        SpreadSetText lstPartsl, EditColumn, yl&, txtNumericV
                    End If

                End If

            Case PMX_ATTRIBUTE_BOOLEAN

                If optTrue.Value = True Then
                    ret% = pmx_setBooleanParameter(DatabaseHandle, thisInstan
                    If ret% = CD_FALSE Then
                        pmx_error
                    Else
                        SpreadSetText lstPartsl, EditColumn, yl&, "True"
                    End If

                ElseIf optFalse.Value = True Then
                    ret% = pmx_setBooleanParameter(DatabaseHandle, thisInstan
                    If ret% = CD_FALSE Then
                        pmx_error
                    Else
                        SpreadSetText lstPartsl, EditColumn, yl&, "False"
                    End If

                End If

            Case PMX_ATTRIBUTE_STRING

                tmpStr$ = LTrim(RTrim(Text1.Text))

                ret% = pmx_setStringParameter(DatabaseHandle, thisInstanc
                If ret% = CD_FALSE Then
                    pmx_error
                Else
                    SpreadSetText lstPartsl, EditColumn, yl&, tmpStr$
                End If

            Case PMX_ATTRIBUTE_STRINGARRAY

                'TODO
        End Select

            End If
        End If

    Next yl&

    ret% = SpreadGetText(lstPartsl, EditColumn, RowFrom, SaveText)

    lblRowCount.Caption = "Part count: " + CStr(ResultCount)

    btnSetAttribute.Visible = False
    btnCancelAttribute.Visible = False

    TurnOffAttributeEditors
    SetAttributeEditDisplay CLng(EditColumn), RowFrom
    lstPartsl.SetFocus
    lstPartsl.ReDraw = True

    lblStatus.Caption = ""

VB_ERR_SaveAttribute:
    ret% = pmx_releaseLock(DatabaseHandle, LockHolder, thisLockClass, PMX_TREE_U_I
    If ret% = CD_FALSE Then
        pmx_error
    End If

    If Err <> 0 Then
        ExitPmx DatabaseHandle
    End If

End Sub

Sub SetAttributeEditDisplay (Col As Long, Row As Long)
CUR_SUB = "Sub SetAttributeEditDisplay"
On Error GoTo VB_ERR_SetAttributeEditDisplay


    Dim thisAttributeDescriptor As Long
    Dim thisUnitHandle As Long

    If Row = 0 And Col = 0 Then
        SetInstanceEditControls True
        Exit Sub
    ElseIf Row = 0 Then
        SetInstanceEditControls False
        Row = 1
    ElseIf Col = 0 Then
        SetInstanceEditControls True
        Exit Sub
    Else
        SetInstanceEditControls False
    End If

    EditColumn = Col

    For x% = 0 To UBound(Attributes)
        If Attributes(x%).AttributeOrder = Col Then
            ArrayIndex = x% + 1
            Exit For
        End If
    Next x%

    If Attributes(ArrayIndex - 1).ReadOnly = True Then
        TurnOffAttributeEditors
        picEditButtons.Visible = False
        btnDDown.Visible = False
```

```
    Exit Sub
End If

picEditButtons.Visible = True
btnUndefined.Visible = True

If lstPartsl.VirtualMaxRows = 0 Or Row <= 0 Or lstPartsl.ActiveCol <= 0 Then
    picEditBox.Visible = False
    picEditButtons.Visible = False
    Exit Sub
End If

ret% = SpreadGetText(lstPartsl, lstPartsl.ActiveCol, Row, SaveText)

btnSetAttribute.Visible = False
btnCancelAttribute.Visible = False
picEditButtons.Visible = True

SelectedAttributeHandle = Attributes(ArrayIndex - 1).AttributeHandle

SelectedAttributeType = Attributes(ArrayIndex - 1).AttributeType

TurnOffAttributeEditors

ret% = DoEvents()

Select Case SelectedAttributeType

    Case PMX_ATTRIBUTE_ENUMERATION

        btnSetAttributeOK.Default = True
        ShowLabelAttributeText

    Case PMX_ATTRIBUTE_NUMERIC

        btnSetAttributeOK.Default = True

        thisAttributeDescriptor = pmx_getAttributeDescriptor(DatabaseHandle, Sele
        If thisAttributeDescriptor = 0 Then
            pmx_error
            Exit Sub
        End If

        UnitFamily = pmx_getAttributeUnitFamilyHandle(thisAttributeDescriptor)
        If pmx_isNullUnitFamilyHandle(UnitFamily) = CD_TRUE Then
            pmx_error
            Exit Sub
        End If

        thisUnitFamilyDescriptor = pmx_getAvailableUnitsDescriptor(DatabaseHandle
        If thisUnitFamilyDescriptor = 0& Then
            pmx_error
            Exit Sub
        End If

        ListCount% = pmx_getUnitsEnumeratedCount(thisUnitFamilyDescriptor)

        ret% = pmx_freeAttributeDescriptor(thisAttributeDescriptor)
        If ret% = CD_FALSE Then
            pmx_error
        End If

        ret% = pmx_freeAvailableUnitsDescriptor(thisUnitFamilyDescriptor)
        If ret% = CD_FALSE Then
            pmx_error
        End If

        If ListCount% > 0 Then
            optTableCustom(0).Visible = True
            optTableCustom(0).Value = True
            optTableCustom(1).Visible = True
            ShowLabelAttributeText
        Else
            FillNumericAttribute
        End If

    Case PMX_ATTRIBUTE_BOOLEAN

        btnSetAttributeOK.Default = True

            FillBooleanAttribute

        Case PMX_ATTRIBUTE_STRING
            btnSetAttributeOK.Default = True
            btnDDown.Visible = False
            ret% = SpreadGetText(lstPartsl, lstPartsl.ActiveCol, Row, tmpStr$)
            Text1.Text = tmpStr$
            Text1.Visible = True
            Text1.ZOrder 0
            picEditBox.Visible = True
            Text1.SetFocus
        Case PMX_ATTRIBUTE_STRINGARRAY

            btnSetAttributeOK.Default = False
            ShowLabelAttributeText

    End Select

    picEditBox.Visible = True

VB_ERR_SetAttributeEditDisplay:
If Err <> 0 Then
    ExitPmx DatabaseHandle
End If

End Sub

Sub SetInputControl (ctl As Control)

CUR_SUB = "Sub SetInputControl"
On Error GoTo VB_ERR_SetInputControl

    Dim pt As POINTAPI, pt1 As POINTAPI

    ctl.Width = lblAttributeText.Width + btnDDown.Width
    ctl.Top = ElasticAttributeContainer.Top + ((btnDDown.Top + btnDDown.Height) *
    ctl.Left = ElasticAttributeContainer.Left + ElasticAttributes.Left + picEditBo

VB_ERR_SetInputControl:
If Err <> 0 Then
    ExitPmx DatabaseHandle
End If

End Sub

Sub SetInstanceEditControls (TurnOn As Integer)

    btnMoveParts.Enabled = TurnOn
    btnDeleteParts.Enabled = TurnOn
    btnPartInfo.Enabled = TurnOn

End Sub

Sub ShowLabelAttributeText ()

CUR_SUB = "Sub ShowLabelAttributeText"
On Error GoTo VB_ERR_ShowLabelAttributeText

    ret% = SpreadGetText(lstPartsl, lstPartsl.ActiveCol, lstPartsl.ActiveRow, tmp$

    Text1.Text = tmpStr$

    lblAttributeText.Caption = tmpStr$
    lblAttributeText.Top = Text1.Top
    lblAttributeText.Left = Text1.Left
    lblAttributeText.ZOrder 0
    lblAttributeText.Visible = True
    picEditBox.Visible = True
    btnDDown.Visible = True
    Text1.Visible = False

VB_ERR_ShowLabelAttributeText:
If Err <> 0 Then
    ExitPmx DatabaseHandle
End If

End Sub
```

```
Sub StringArrayAttribute_Change ()

CUR_SUB = "Sub StringArrayAttribute_Change"
On Error GoTo VB_ERR_StringArrayAttribute_Change

    btnSetAttribute.Visible = True

VB_ERR_StringArrayAttribute_Change:
If Err <> 0 Then
    ExitPmx DatabaseHandle
End If

End Sub

Sub StringArrayAttribute_GotFocus ()
    btnUndefined.Value = False
End Sub

Sub Text1_GotFocus ()
    btnUndefined.Value = False
End Sub

Sub Text1_KeyDown (KeyCode As Integer, Shift As Integer)

CUR_SUB = "Sub Text1_KeyDown"
On Error GoTo VB_ERR_Text1_KeyDown

    btnUndefined.Value = False

    If KeyCode = KEY_NEXT Or KeyCode = KEY_END Or KeyCode = KEY_HOME Or KeyCode = KEY
        Exit Sub
    Else
        btnSetAttribute.Visible = True
        btnCancelAttribute.Visible = True
    End If

VB_ERR_Text1_KeyDown:
If Err <> 0 Then
    ExitPmx DatabaseHandle
End If

End Sub

Sub TurnOffAttributeEditors ()

CUR_SUB = "Sub TurnOffAttributeEditors"
On Error GoTo VB_ERR_TurnOffAttributeEditors

    Text1.Visible = False
    EnumeratedAttribute.Visible = False
    StringArrayAttribute.Visible = False
    BooleanAttribute.Visible = False
    EnumNumAttribute.Visible = False
    NumericAttribute.Visible = False
    optTableCustom(0).Visible = False
    optTableCustom(1).Visible = False
    lblAttributeText.Visible = False
    EnumeratedNumeric = False

VB_ERR_TurnOffAttributeEditors:
If Err <> 0 Then
    ExitPmx DatabaseHandle
End If

End Sub

'4-30.94 CWB Dont call format for IsNumeric
Sub txtNumericValue_Change ()

CUR_SUB = "Sub txtNumericValue_Change"
On Error GoTo VB_ERR_txtNumericValue_Change

    btnUndefined.Value = False

    If txtNumericValue.Text = "" Then
        btnSetAttribute.Visible = False
        btnCancelAttribute.Visible = False
        Exit Sub
    End If

    If Left(txtNumericValue.Text, 1) = "." And Len(txtNumericValue.Text) = 1 Then
    If Left(txtNumericValue.Text, 1) = "-" And Len(txtNumericValue.Text) = 1 Then

    If Not IsNumeric(txtNumericValue.Text) Then
        MsgBox txtNumericValue.Text + " is an invalid numeric value", 48, pmx_err
        txtNumericValue.Text = Left(txtNumericValue.Text, Len(txtNumericValue.Text
        txtNumericValue.SelStart = Len(txtNumericValue.Text)
        txtNumericValue.SelLength = 0
        Exit Sub
    End If

    If lstUnitsFrom.ListIndex >= 0 And txtNumericValue <> "" Then
        btnSetAttribute.Visible = True
        btnCancelAttribute.Visible = True
    End If

VB_ERR_txtNumericValue_Change:
If Err <> 0 Then
    ExitPmx DatabaseHandle
End If

End Sub
```

APPENDIX B

```
/*---------------------------------------------------------------------------
    This program is the confidential and proprietary product of CADIS, Inc.
    Any unauthorized use, reproduction or transfer of this program
    is strictly prohibited.
                Copyright (C) 1994 by CADIS, Inc.

    File name---
      editOutline.c

    Purpose---
      Sets up and manages display of the Outline tree on the Edit
      dialog.

    File modification history---
      95-03-14  vwheel  Added class locking.
      94-04-14  ktraut  Use pmx_getClassDescriptorSet for efficiency.
      94-04-01  bterp   Merge Vic's last changes.

    Description---
-----------------------------------------------------------------------------*/

#include <stdio.h>
#include "UxLib.h"

#include "pmxapi.h"
#include "pmxexapi.h"
#include "memAlloc.h"
#include "outline.h"
#include "retrieve.h"
#include "editOutline.h"
#include "searchOutline.h"

extern Pixmap getPixFolder();
extern Pixmap getPixOpenFolder();
extern Pixmap getPixSheet();
extern swidget editDialog;

static Widget editOutline;
static Widget editScrlWndw;
static pmx_classHandle editClass;
static pmx_classHandle currentClass;
static t_cdRetrieverClass *currentNode;
static XtWorkProcId fillInOutlineID;

typedef struct
{
    Widget  outlineWidget;
    t_cdRetrieverClass *parentNode;
    t_cdRetrieverClass *subNode;
    t_cdRetrieverClass *leafNode;
} EditNode;

/*--------------------------------------------------------------------------
    editFetchNewOutlineClass tests the current selected class against
    the one being edited and returns TRUE if they differ.  The current
    class is also returned.
---------------------------------------------------------------------------*/
cd_boolean
editFetchNewOutlineClass( newClass )
    pmx_classHandle *newClass;
{
    *newClass = currentClass;
    return( pmx_equalClassHandles( editClass, currentClass ) == CD_FALSE );
}

/*--------------------------------------------------------------------------
    requestClassLock requests a class share lock for the specified class
    and reports the results.
---------------------------------------------------------------------------*/
static cd_boolean
requestClassLock( thisClass )
    pmx_classHandle thisClass;
{
    cd_boolean status;

#ifdef DEBUG
    {
        pmx_classDescriptor * thisDescr;

        thisDescr = pmx_getClassDescriptor( cd_fetchDBHandle(), thisClass );
        printf( "Requested class lock for %s\n", thisDescr->className );
        pmx_freeClassDescriptor( thisDescr );
    }
#endif

    status = pmx_requestLock( cd_fetchDBHandle(), cd_fetchLockHolder(),
        thisClass, PMX_CLASS_S_LOCK );
    if ( status == CD_FALSE )
        classLockFailed( editDialog, thisClass );
    return status;
}

/*--------------------------------------------------------------------------
    releaseClassLock releases a class share lock for the specified class
    and reports the results.
---------------------------------------------------------------------------*/
static void
releaseClassLock( thisClass )
    pmx_classHandle thisClass;
{
    cd_boolean status;
    pmx_classDescriptor * thisDescr;

#ifdef DEBUG
    {
        thisDescr = pmx_getClassDescriptor( cd_fetchDBHandle(), thisClass );
        printf( "Released class lock for %s\n", thisDescr->className );
        pmx_freeClassDescriptor( thisDescr );
    }
#endif
    status = pmx_releaseLock( cd_fetchDBHandle(), cd_fetchLockHolder(),
        thisClass, PMX_CLASS_S_LOCK );
    if ( status == CD_FALSE )
    {
        char sMsg[256];
        char sBuf[256];

        strcpy( sMsg, (void*)pmx_getErrorText( pmx_getErrorCode() ) );
        thisDescr = pmx_getClassDescriptor( cd_fetchDBHandle(), thisClass );
        sprintf( sBuf, "Class %s\n%s", thisDescr->className, sMsg );
        pmx_freeClassDescriptor( thisDescr );
        popup_pmxErrorDialog( editDialog, sBuf );
    }
}

/*--------------------------------------------------------------------------
    unlockClosedNodes recurses through a closed tree and unlocks any
    nodes that were previously open.
---------------------------------------------------------------------------*/
static void
unlockClosedNodes( root )
    t_cdRetrieverClass *root;
{
    t_cdRetrieverClass *node, *nodenext;

    for( node = root; node != NULL; node = nodenext )
    {
        nodenext = node->next;
        if ( node->nodeType == 1 && node->subclass != NULL )
        {
            releaseClassLock( *((pmx_classHandle*) &node->data) );
            unlockClosedNodes( node->subclass );
        }
    }
}

/*--------------------------------------------------------------------------
    gotoNode makes the specified node the current line in the class
    outline.
---------------------------------------------------------------------------*/
static void
gotoNode( classNode )
    t_cdRetrieverClass *classNode;
{
    Widget wNode;

    wNode = cdRetrieverSetCurrentLine( editOutline, classNode );
```

```
    XmScrollVisible( editScrlWndw, wNode, 0, 10 );
}

/*---------------------------------------------------------------------------
    makeEditSubTree builds the structure for the immediate subclasses of the
    current class for updating the outline tree.
---------------------------------------------------------------------------*/
static void
makeEditSubTree( current, currentClass, childNode, childClass )
    t_cdRetrieverClass *current;
    pmx_classHandle currentClass;
    t_cdRetrieverClass *childNode;
    pmx_classHandle childClass;
{
    long i;
    cd_boolean pmxStatus;
    t_cdRetrieverClass *node, *nextnode;
    pmx_classHandle thisClass;
    pmx_classDescriptor * subDescr;
    pmx_dbHandle thisDB;
    pmx_classDescriptorSet * thisDescrSet;

    node = NULL;
    thisDB = cd_fetchDBHandle();
    thisDescrSet = pmx_getClassDescriptorSet( thisDB, currentClass );
    PMX_ASSERT( thisDescrSet != NULL );

    for(i = 0; i < thisDescrSet->count; i++) {

        thisClass = thisDescrSet->descriptors[i]->classHandle;
        PMX_ASSERT( pmx_isNullClassHandle( thisClass ) == CD_FALSE );

        if ( pmx_equalClassHandles( childClass, thisClass) == CD_FALSE ) {
            nextnode = (t_cdRetrieverClass *)cd_memAlloc(
                                sizeof(t_cdRetrieverClass) );
        } else {
            nextnode = childNode;
        }
        if (i == 0) {
            current->subclass = nextnode;
        } else {
            node->next = nextnode;
        }
        node = nextnode;

        if ( pmx_equalClassHandles( childClass, thisClass) == CD_FALSE ) {
            subDescr = thisDescrSet->descriptors[i];;
            node->name = (char*)cd_memAlloc( strlen(subDescr->className) + 1 );
            strcpy( node->name, subDescr->className );
            node->data = (void*) *((long*)  &thisClass);
            node->next = NULL;
            node->subclass = NULL;
            if ( subDescr->subclassCount > 0 ) {
                node->nodeType = 0;
            } else {
                node->nodeType = 2;
            }
        }
    }
    pmxStatus = pmx_freeClassDescriptorSet( thisDescrSet );
    PMX_ASSERT( pmxStatus == CD_TRUE );
}

/*---------------------------------------------------------------------------
    makeEditTree builds the structure for the outline tree for the
    Edit Dialog.  It creates a structure for the current class and
    iterates back up through its parents building their other children
    as it goes.  Each parent node must be open so all of their children
    must be shown.
---------------------------------------------------------------------------*/
static void
makeEditTree( root, leaf, leafClass )
    t_cdRetrieverClass **root;
    t_cdRetrieverClass **leaf;
    pmx_classHandle leafClass;
{
    t_cdRetrieverClass *node, *nextnode;
    cd_boolean pmxStatus;
    pmx_dbHandle thisDB;
    pmx_classHandle rootClass, thisClass, childClass;
    pmx_classDescriptor * subDescr;
    pmx_classDescriptor * thisDescr;

    thisDB = cd_fetchDBHandle();
    thisDescr = pmx_getClassDescriptor( thisDB, leafClass );
    PMX_ASSERT( thisDescr != NULL );

    node = (t_cdRetrieverClass *)cd_memAlloc(sizeof(t_cdRetrieverClass));
    node->name = (char*)cd_memAlloc( strlen(thisDescr->className) + 1 );
    strcpy( node->name, thisDescr->className );
    node->nodeType = ( thisDescr->subclassCount > 0 ) ? 0 : 2 ;
    node->data = (void*) *((long*) &leafClass);
    node->next =NULL;
    node->subclass = NULL;
    *leaf = node;
    childClass = leafClass;
    rootClass = pmx_getRoot( thisDB );
    PMX_ASSERT( pmx_isNullClassHandle( rootClass ) == CD_FALSE );

    while ( pmx_equalClassHandles( childClass, rootClass) == CD_FALSE )
    {
        thisClass = pmx_getParentOfClass( thisDB, childClass );
        if ( pmx_isNullClassHandle( thisClass ) == CD_TRUE )
            break;
        nextnode = (t_cdRetrieverClass *)cd_memAlloc(
                                sizeof(t_cdRetrieverClass) );
        nextnode->subclass = node;
        node = nextnode;
        subDescr = pmx_getClassDescriptor( thisDB, thisClass );
        node->name = (char*)cd_memAlloc( strlen(subDescr->className) + 1 );
        strcpy( node->name, subDescr->className );
        node->data = (void*) *((long*)  &thisClass);
        node->nodeType = 1;
        node->next = NULL;

        makeEditSubTree( node, thisClass, node->subclass, childClass );

        childClass = thisClass;
        pmxStatus = pmx_freeClassDescriptor( subDescr );
        PMX_ASSERT( pmxStatus == CD_TRUE );
    }
    pmxStatus = pmx_freeClassDescriptor( thisDescr );
    PMX_ASSERT( pmxStatus == CD_TRUE );
    *root = node;
}

/*---------------------------------------------------------------------------
//  selectNewNode is called from an Outline callback when a new PMX
//  class is selected.  It updates the attributes display and resets
//  the current query.
---------------------------------------------------------------------------*
static cd_boolean
selectNewNode( w, attrParent, node )
    Widget w;
    swidget attrParent;
    t_cdRetrieverClass *node;
{
    cd_boolean status = CD_TRUE;
    pmx_classHandle thisClass;

    thisClass = *((pmx_classHandle*) &node->data);
    if ( pmx_equalClassHandles( currentClass, thisClass) == CD_FALSE )
    {
        status = requestClassLock( thisClass );
        if ( status == CD_FALSE )
        {
            if ( pmx_isNullClassHandle( currentClass ) == CD_FALSE )
                gotoNode( currentNode );
        }
        else
        {
            releaseClassLock( currentClass );
            currentClass =  thisClass;
            currentNode = node;
        }
    }
    editCheckRowButtons( );
    return status;
```

```
}

/*----------------------------------------------------------------------
    expandNode is called when a node on the outline tree is expanded.
    It checks to see if the outline needs to be updated with subclasses
    to the current class.
-----------------------------------------------------------------------*/
static void
expandNode( w, attrParent, node )
    Widget w;
    swidget attrParent;
    t_cdRetrieverClass *node;
{
    t_cdRetrieverClass *nextnode;
    t_cdRetrieverClass *subnode;
    pmx_classHandle thisClass;

    if ( selectNewNode( w, attrParent, node ) == CD_FALSE )
        return;
    thisClass = *((pmx_classHandle*) &node->data);

    if ( node->subclass == NULL )
    {
        cd_setBusyPointer( CD_TRUE );
        makeEditSubTree( node, thisClass, NULL, pmx_getNullClassHandle() );
        subnode = node->subclass;
        node->subclass = NULL;
        cdRetrieverListInsert( w, node, subnode, NULL );
        freeOutlineNodes( subnode );
        cd_setBusyPointer( CD_FALSE );
    }
#ifdef ORIGINAL
    if ( node->nodeType == OPENFOLDER )
        if ( requestClassLock( thisClass ) == CD_FALSE ) {
            cdChangeNodeType( editOutline, node, CLOSEDFOLDER );
        }
    else if ( node->nodeType == CLOSEDFOLDER )
    {
        releaseClassLock( thisClass );
        if ( node->subclass != NULL )
            unlockClosedNodes( node->subclass );
    }
#endif

    if ( node->nodeType == OPENFOLDER ) {
        if ( requestClassLock( thisClass ) == CD_FALSE ) {
            cdChangeNodeType( editOutline, node, CLOSEDFOLDER );
        }
    } else if ( node->nodeType == CLOSEDFOLDER )
    {
        releaseClassLock( thisClass );
        if ( node->subclass != NULL ) {
            extern myRetrieverListDelete();
            subnode = node->subclass;
            unlockClosedNodes( node->subclass );

            while ( subnode != NULL ) {
                nextnode = subnode->next;
                myRetrieverListDelete( w, subnode );
                    subnode = nextnode;
            }

            freeOutlineNodes( subnode );
        }
        node->subclass = NULL;
    }
}
/*----------------------------------------------------------------------
    closeEditOutline is called when the edit dialog is dismissed.  It stops
    any background outline fill in that is going on and releases the
    class locks requested by this outline.
-----------------------------------------------------------------------*/
void
closeEditOutline()
{
    if ( fillInOutlineID != NULL )
        XtRemoveWorkProc( fillInOutlineID );
    unlockClosedNodes( cdRetrieverRoot( editOutline ) );
    releaseClassLock( currentClass );
}

/*----------------------------------------------------------------------
    add_editOutline is a work proc that incrementally fills out the
    class tree for the edit dialog.  It expands the tree a level at a
    time to reduce the time it takes to bring up the dialog.
-----------------------------------------------------------------------*/
cd_boolean
add_editOutline( treeList )
    EditNode *treeList;
{
    long i, pos;
    Widget wLabel;
    t_cdRetrieverClass *node, *subnode, *leafnode, *parent;
    cd_boolean workStat = CD_TRUE;

    leafnode = NULL;
    for( pos = 0, node = treeList->subNode; node != NULL &&
        node->subclass == NULL; node = node->next, pos++ )
    {
        if ( node == treeList->leafNode )
        {
            leafnode = node;
            break;
        }
    }

    if ( node != NULL )
    {
        subnode = node->subclass;
        node->subclass = NULL;
    }
    else
        subnode = NULL;
    parent = cdRetrieverListInsert( treeList->outlineWidget,
        treeList->parentNode, treeList->subNode, leafnode, leafnode );

    if ( leafnode != NULL )
    {
        for( i = 0, node = parent; i < pos && node != NULL;
            i++, node = node->next );
        if ( node != NULL )
            currentNode = node;
    }

    freeOutlineNodes( treeList->subNode );
    if ( subnode != NULL)
    {
        for( i = 0, node = parent; i < pos && node != NULL;
            i++, node = node->next );
        if ( node != NULL )
        {
            treeList->parentNode = node;
            treeList->subNode = subnode;
            workStat = CD_FALSE;
        }
    }
    if ( workStat == CD_TRUE )
    {
        cdRetrieverGetCurrentLineLabel( editOutline, &wLabel );
        editSetScrolledPosition( wLabel );
        XtMapWidget( editOutline );
        cd_memFree( treeList );
    }

    return workStat;
}

/*----------------------------------------------------------------------
//  create_editOutline is called to create a new outline widget
//  for the Edit Dialog.  It traces back up the tree from the current
//  class and expands each level as it goes.
-----------------------------------------------------------------------*/
void
create_editOutline(Parent)
    swidget Parent;
{
    int n;
    Arg args[10];
```

```
    t_cdRetrieverClass *root, *node, *subnode, *parentnode;
    EditNode *editTree = NULL;
    pmx_classHandle thisClass;

    thisClass = cd_fetchClassHandle();

    if ( editOutline != NULL )
        XtDestroyWidget( editOutline );

    editClass = thisClass;
    currentClass = thisClass;
    requestClassLock( thisClass );

    makeEditTree(&root, &node, thisClass);

    if ( root->subclass != NULL )
    {
        editTree = (EditNode *)cd_memAlloc( sizeof( EditNode ) );
        editTree->subNode = root->subclass;
        root->subclass = NULL;
        editTree->leafNode = node;
    }

    n = 0;
    XtSetArg(args[n],CDNRetrieverShowIcons, 1); n++;
    XtSetArg(args[n],CDNOpenPixmap, getPixOpenFolder() ); n++;
    XtSetArg(args[n],CDNClosedPixmap, getPixFolder() ); n++;
    XtSetArg(args[n],CDNLeafPixmap, getPixSheet() ); n++;
    editOutline = cdCreateRetriever(UxGetWidget(Parent),
                            "editOutline", args, n);
    cdAddRetrieverCallback( editOutline, CDNSelectCallback,
                            selectNewNode, NULL );
    cdAddRetrieverCallback( editOutline, CDNExpandCallback,
                            expandNode, NULL );
    parentnode = cdRetrieverListInsert( editOutline, NULL, root, NULL );
    currentNode = parentnode;
    editScrlWndw = UxGetWidget( Parent );
    if ( editTree != NULL )
    {
        editTree->outlineWidget = editOutline;
        editTree->parentNode = parentnode;
        fillInOutlineID = XtAppAddWorkProc( UxAppContext, add_editOutline,
            (XtPointer)editTree );
        XtUnmapWidget( editOutline );
    }
    freeOutlineNodes( root );
}

/*---------------------------------------------------------------------
    findEditClass initializes the findClass routines and pops
    up the find class dialog.
---------------------------------------------------------------------*/
void
findEditClass( myParent )
    swidget myParent;
{
    pmx_dbHandle thisDB;
    thisDB = cd_fetchDBHandle();

    if ( pmx_isNullDBHandle( thisDB ) == CD_TRUE )
        return;
    setupFindClass( thisDB, currentNode, editOutline, editScrlWndw,
        selectNewNode, requestClassLock );
    popup_findClassDialog( myParent );
}

/*---------------------------------------------------------------------
      This program is the confidential and proprietary product of CADIS, Inc.
      Any unauthorized use, reproduction or transfer of this program
      is strictly prohibited.
                  Copyright (C) 1994 by CADIS, Inc.

    File name---
      findClass.c

    Purpose---
      Handles find class functions for the retriever, parts editor,
      and schema editor.

    File modification history---
//
//  Description---
//
---------------------------------------------------------------------*/

#include <stdio.h>
#include "UxLib.h"
#include "string.h"

#include "memAlloc.h"
#include "outline.h"
#include "retrieve.h"

extern swidget findClassDialog;

static Widget curOutline;
static Widget curWindow;
static pmx_dbHandle curDB;
static t_cdRetrieverClass *curNode;
static void (*selectNewNode)();
static cd_boolean (*requestClassLock)();

static t_cdRetrieverClass *orig_find_node;
static pmx_classHandle orig_find_class;
static t_cdRetrieverClass *beg_find_node;
static pmx_classHandle beg_find_class;

/*---------------------------------------------------------------------
/   setupFindClass initializes static values to enable us to use
/   common find class routines for the different windows.
---------------------------------------------------------------------*/
void
setupFindClass( thisDB, thisNode, thisOutline,
                thisWindow, selectNode, requestLock )
    pmx_dbHandle thisDB;
    t_cdRetrieverClass *thisNode;
    Widget thisOutline;
    Widget thisWindow;
    void (*selectNode)();
    cd_boolean (*requestLock)();
{
    curDB = thisDB;
    orig_find_node = thisNode;
    orig_find_class = *((pmx_classHandle*) &thisNode->data);
    curNode = thisNode;
    curOutline = thisOutline;
    curWindow = thisWindow;
    selectNewNode = selectNode;
    requestClassLock = requestLock;
}

/*---------------------------------------------------------------------
//  findClassNode recurses through the node descriptors looking for one
//  that matches our target class.  It returns a pointer to the found node
//  or NULL if not found.
---------------------------------------------------------------------*/
static t_cdRetrieverClass *
findClassNode( currentNode, classPtr )
    t_cdRetrieverClass *currentNode;
    ClassPath *classPtr;
{
    pmx_classHandle thisClass;
    t_cdRetrieverClass *node, *subnode, *nodenext;

    for( node = currentNode; node != NULL; node = nodenext )
    {
        thisClass = *((pmx_classHandle*) &node->data);
        if ( pmx_equalClassHandles( thisClass, classPtr->thisClass) == CD_TRUE )
        {
            if ( classPtr->childClass == NULL )
            {
                if ( node->nodeType == CLOSEDFOLDER &&
                    (*requestClassLock)( thisClass,
                        PMX_CLASS_S_LOCK ) == CD_FALSE )
                    return NULL;
                if ( node->subclass == NULL )
                {
                    makeSubTree( node, curDB, thisClass );
                    subnode = node->subclass;
```

```
                    node->subclass = NULL;
                    cdChangeNodeType( curOutline, node, 1 );
                    cdRetrieverListInsert( curOutline, node,
                        subnode, NULL, NULL );
                    freeOutlineNodes( subnode );
                }
                else if ( node->nodeType == CLOSEDFOLDER )
                    cdRetrieverExpandNode( curOutline, node );
                node = findClassNode( node->subclass, classPtr->childClass );
            }
            break;
        }
        nodenext = node->next;
    }
    return node;
}

/*--------------------------------------------------------------------
/  findClassPath searchs up through the class hierarchy looking for a
/  match of the given class.  It builds a linked list from the current
/  class down to the selected class.
---------------------------------------------------------------------*/
ClassPath *
findClassPath( thisDB, currentClass, targetClass )
    pmx_dbHandle thisDB;
    pmx_classHandle currentClass;
    pmx_classHandle targetClass;
{
    ClassPath *classPtr;
    ClassPath *childPtr;
    pmx_classHandle thisClass;

    classPtr = cd_memAlloc( sizeof(ClassPath) );
    classPtr->thisClass = targetClass;
    classPtr->childClass = NULL;
    thisClass = targetClass;

    while ( pmx_equalClassHandles( currentClass, thisClass ) == CD_FALSE )
    {
        thisClass = pmx_getParentOfClass( thisDB, thisClass );
        if ( pmx_isNullClassHandle( thisClass ) == CD_TRUE ) {
            cd_memFree(classPtr);
            classPtr = NULL;
            break;
        }

        childPtr = classPtr;
        classPtr = cd_memAlloc( sizeof(ClassPath) );
        classPtr->thisClass = thisClass;
        classPtr->childClass = childPtr;
    }
    return classPtr;
}

/*--------------------------------------------------------------------
/  releaseClassPath releases the blocks allocated by findClassPath
---------------------------------------------------------------------*/
void
releaseClassPath( classPtr )
    ClassPath *classPtr;
{
    ClassPath *childPtr;

    while( classPtr != NULL )
    {
        childPtr = classPtr->childClass;
        cd_memFree( classPtr );
        classPtr = childPtr;
    }
}

static void
gotoNode( classNode )
    t_cdRetrieverClass *classNode;
{
    Widget wNode;

    wNode = cdRetrieverSetCurrentLine( curOutline, classNode );
    XmScrollVisible( curWindow, wNode, 0, 10 );
}

/*--------------------------------------------------------------------
/  showClassOutline searches for the position of a given class in the
/  outline widget and makes it the current class.  It starts from the
/  orig Node and Class.
---------------------------------------------------------------------*/
static cd_boolean
showClassOutline( origNode, origClass, targetClass )
    t_cdRetrieverClass *origNode;
    pmx_classHandle origClass;
    pmx_classHandle targetClass;
{
    cd_boolean bRet = CD_FALSE;
    t_cdRetrieverClass *classNode;
    ClassPath *classPtr;

    classPtr = findClassPath( curDB, origClass, targetClass );
    if ( classPtr != NULL ) {
        classNode = findClassNode( origNode, classPtr );
        if ( classNode != NULL )
        {
            gotoNode( classNode );
            (*selectNewNode)( curOutline, NULL, classNode );
            curNode = classNode;
            bRet = CD_TRUE;
        }
        releaseClassPath( classPtr );
    }
    return bRet;
}

/*--------------------------------------------------------------------
/  gotoOrigClass returns the find class to the original class
/  from whence we started.
---------------------------------------------------------------------*/
void
gotoOrigClass( nCount, searchResult )
    long nCount;
    cd_handle searchResult;
{
    cd_boolean status;
    pmx_dbHandle thisDB;
    pmx_searchResultHandle thisSearchResult;

    thisDB = curDB;
    if ( pmx_isNullDBHandle( thisDB ) == CD_TRUE )
        return;
    if ( searchResult >= 0 && nCount > 0 )
    {
        thisSearchResult.searchResultHandle = searchResult;
        status = pmx_destroySearchResult( thisDB, thisSearchResult );
        PMX_ASSERT( status == CD_TRUE );
    }
    cd_setDialogBusy( findClassDialog, CD_TRUE );
    gotoNode( orig_find_node );
    (*selectNewNode)( curOutline, NULL, orig_find_node );
    curNode = orig_find_node;
    update_findClassDialog( 0, 0, -1 );
    cd_setDialogBusy( findClassDialog, CD_FALSE );
}

/*--------------------------------------------------------------------
/  findNextClass performs a class search using the text pattern given us
/  (if nPos == nCount) or goes to the next class matching the pattern.
---------------------------------------------------------------------*/
void
findNextClass( sText, nPos, nCount, searchResult )
    char *sText;
    long nPos;
    long nCount;
    cd_handle searchResult;
{
    cd_boolean status;
    pmx_dbHandle thisDB;
    pmx_classHandle thisClass;
    pmx_classHandle origClass;
```

```
    pmx_searchResultHandle thisSearchResult;

    thisDB = curDB;
    if ( pmx_isNullDBHandle( thisDB ) == CD_TRUE )
        return;
    if ( searchResult >= 0 )
        thisSearchResult.searchResultHandle = searchResult;
    if ( nPos == nCount && nCount == 0 )
    {
        beg_find_node = curNode;
        beg_find_class = *((pmx_classHandle*) &curNode->data);
    }
    origClass = beg_find_class;

    cd_setDialogBusy( findClassDialog, CD_TRUE );
    if ( nPos == nCount )
    {
        if ( searchResult >= 0 )
        {
            status = pmx_destroySearchResult( thisDB, thisSearchResult );
            PMX_ASSERT( status == CD_TRUE );
        }

        thisSearchResult = pmx_searchClassByPattern( thisDB,
            origClass, sText );
        if ( pmx_isNullSearchResultHandle( thisSearchResult )
                                    == CD_TRUE ) {
            popup_pmxErrorDialog( findClassDialog,
                pmx_getErrorText( pmx_getErrorCode() ) );
            nCount = 0;
        } else {

            nCount = pmx_getSearchResultCount( thisDB, thisSearchResult );
            if ( nCount == 0 )
            {
                status = pmx_destroySearchResult( thisDB, thisSearchResult );
                PMX_ASSERT( status == CD_TRUE );
                thisSearchResult = pmx_getNullSearchResultHandle();
                popup_infoDialog( findClassDialog, "Class not found" );
            }
        }

        nPos = 0;
    }

    if ( pmx_isNullSearchResultHandle( thisSearchResult ) == CD_FALSE )
    {
        thisClass = pmx_getIthSearchClass( thisDB, thisSearchResult, nPos );
        if (   (pmx_isNullClassHandle( thisClass ) == CD_FALSE )  &&

            (showClassOutline( beg_find_node, origClass, thisClass )
            == CD_TRUE )) {
            nPos++;
        } else {
#ifdef RIGHT
            if ( nPos < ( nCount -1 ) &&
                    popup_confDialog( findClassDialog, "Go to next class?",
                        "Find Class", "Yes", "No" ) == CD_TRUE )
            {
                findNextClass( sText, nPos + 1, nCount,
                    thisSearchResult.searchResultHandle );
            }
#endif
            nPos++;
        }
    }

    update_findClassDialog( nPos, nCount,
        thisSearchResult.searchResultHandle );
    cd_setDialogBusy( findClassDialog, CD_FALSE );
}

/*-------------------------------------------------------------------------
//  findPrevClass goes to the previous class in Find Class.
-------------------------------------------------------------------------*/
void
findPrevClass( nPos, nCount, searchResult )
    long nPos;
    long nCount;
    cd_handle searchResult;
{
    pmx_dbHandle thisDB;
    pmx_classHandle thisClass;
    pmx_searchResultHandle thisSearchResult;

    thisDB = curDB;
    if ( pmx_isNullDBHandle( thisDB ) == CD_TRUE )
        return;
    thisSearchResult.searchResultHandle = searchResult;
    if ( pmx_isNullSearchResultHandle ( thisSearchResult ) == CD_TRUE ) {
        return;
    }
#ifdef RIGHT
    if ( nPos > 1 )
    {
        cd_setDialogBusy( findClassDialog, CD_TRUE );
        thisClass = pmx_getIthSearchClass( thisDB, thisSearchResult, nPos-2 );
        if ( ( pmx_isNullClassHandle( thisClass ) == CD_FALSE ) &&
          ( showClassOutline( beg_find_node, beg_find_class, thisClass )
            == CD_TRUE ) ) {
            nPos--;
            update_findClassDialog( nPos, nCount,
                thisSearchResult.searchResultHandle );
        }
        cd_setDialogBusy( findClassDialog, CD_FALSE );
    }
#endif
    if ( nPos > 1 )
    {
        cd_setDialogBusy( findClassDialog, CD_TRUE );
        thisClass = pmx_getIthSearchClass( thisDB, thisSearchResult, nPos-2 );
        if ( pmx_isNullClassHandle( thisClass ) == CD_FALSE ) {
            showClassOutline( beg_find_node, beg_find_class, thisClass ) ;
        }

        nPos--;
        update_findClassDialog( nPos, nCount,
            thisSearchResult.searchResultHandle );
        cd_setDialogBusy( findClassDialog, CD_FALSE );
    }
}
/*-------------------------------------------------------------------------
//  cancelFindClass terminates a Find Class.
-------------------------------------------------------------------------*/
void
cancelFindClass( searchResult )
    cd_handle searchResult;
{
    cd_boolean status;
    pmx_dbHandle thisDB;
    pmx_searchResultHandle thisSearchResult;

    if ( searchResult >= 0 )
    {
        thisSearchResult.searchResultHandle = searchResult;
        thisDB = curDB;
        if ( pmx_isNullDBHandle( thisDB ) == CD_TRUE )
            return;

        status = pmx_destroySearchResult( thisDB, thisSearchResult );
        PMX_ASSERT( status == CD_TRUE );
    }
    cd_setFindClass( CD_TRUE );
}
/*-------------------------------------------------------------------------
//      This program is the confidential and proprietary product of CADIS, Inc.
//      Any unauthorized use, reproduction or transfer of this program
//      is strictly prohibited.
//                  Copyright (C) 1994 by CADIS, Inc.
//
//  File name---
//    openDataBase.c
//
//  Purpose---
//    Perform open sequences.
//
```

```
File modification history---
09-09-95 bterp  For fixed, make sure URET. For float, enforce RET.
06-03-95 bterp  Release all share locks before starting the schema editor
06-03-95 bterp  Release all share locks before starting the schema editor
03-12-95 vwheel Added lockHolder handling.  Removed exclusive
                locking on schema edit startup.
     02-23-95 bterp  Merged changes for keepalive.
     02-10-95 bterp  Did a strdup to preserve the database names.
     01-24-95 vwheel Changed pmx_open to use Read-Only flag.
     01-24-95 vwheel Changed handling of kb rights.
     01-24-95 vwheel Changed handling of pmx_getDBCopyright.
01-19-95 bterp  Add copyright popup to open.
11-01-94 bterp  Reset the screen to reactivate main window when
         closing the schema editor.
10-21-94 bterp  Save the rights information when opening the schema
                editor.
04-05-94 bterp  Close quiz before opening from menu.Bug 458.
         Also, use clearMain
         screen instead of resetMainScreen ( reset leaves behind
         query count and active buttons ).
03-30-94 bterp  Add routines for saving/fetching currentdatabase name
         Use database name for exit message to be consistent
         with MS-Windows.

Description---
  Is called from the File Open menu.
  Calls the API routines to fetch the valid database names.
----------------------------------------------------------------------*/

#include <stdio.h>

#include "memAlloc.h"
#include "handle.h"
#include "retrieve.h"
#include "pmxruapi.h"
#include "mnWndwShll.h"
#include "openDialog.h"

static cd_boolean joinServerStarted = CD_FALSE;
static cd_boolean canEditParts = CD_FALSE;
static cd_boolean canMakeParts = CD_FALSE;
static cd_boolean canDeleteParts = CD_FALSE;
static cd_boolean canEditSchema = CD_FALSE;
static cd_boolean canAdmin = CD_FALSE;
static cd_boolean canAccessExtData = CD_FALSE;
void cd_setNullHandles();
extern void setInitErrorTest( );

static pmx_classHandle vRootClass;
pmx_classHandle
cd_getVirtualRoot( thisDB )
    pmx_dbHandle thisDB;
{
    return vRootClass;
}
void
cd_setVirtualRoot( thisClass )
    pmx_classHandle thisClass;
{
    vRootClass = thisClass;
}
cd_boolean
cd_fetchJoinServerStarted()
{
    return ( joinServerStarted );
}
/*--------------------------------------------------------------------
   cd_fetchDBName returns the current DataBase name.
--------------------------------------------------------------------*/
static pmx_dbHandle currentDBHandle;
static char * currentDBName = NULL;

char *
cd_fetchDBName()
{
    return currentDBName;
}

static pmx_dbHandle currentSchemaDBHandle;
static char * currentSchemaDBName = NULL;

/*--------------------------------------------------------------------
// cd_fetchDBHandle returns the current DataBase handle. - no
// matter whether in the schema editor or not.
--------------------------------------------------------------------*/
pmx_dbHandle
cd_fetchDBHandle()
{
    return currentDBHandle;
}

/*--------------------------------------------------------------------
// cd_fetchSchemaDBHandle returns the current DataBase handle
// being used by the Schema Editor.
--------------------------------------------------------------------*/

pmx_dbHandle
cd_fetchSchemaDBHandle()
{
    return currentSchemaDBHandle;
}

/*--------------------------------------------------------------------
   cd_fetchStartingClassHandle returns the current starting class
--------------------------------------------------------------------*/
static pmx_classHandle currentStartingClassHandle;
pmx_classHandle
cd_fetchStartingClassHandle()
{
    return currentStartingClassHandle;
}

/*--------------------------------------------------------------------
// cd_closeSchemaDB closes the current schema database.
--------------------------------------------------------------------*/
void
cd_closeSchemaDB()
{
    cd_boolean bStat;

    if ( pmx_isNullDBHandle( currentSchemaDBHandle ) == CD_FALSE )
    {
        if ( canAccessExtData == CD_TRUE ) {
            pmx_destroyExtPMXConnection( currentSchemaDBHandle );
        }
        canAccessExtData = CD_FALSE;
        bStat = pmx_close( currentSchemaDBHandle );
        PMX_ASSERT( bStat == CD_TRUE );
        currentSchemaDBHandle = pmx_getNullDBHandle();
        if ( currentSchemaDBName != NULL ) {
            cd_memFree( currentSchemaDBName );
            currentSchemaDBName = NULL;
        }
        cd_setNullHandles();
        setSchemaEditFlag( 0 );
        clearMainScreen();
    }
}

/*--------------------------------------------------------------------
// cd_closeDataBase closes the current open knowledge base.
--------------------------------------------------------------------*/
void
cd_closeDataBase()
{
    cd_boolean bStat;

    if ( pmx_isNullDBHandle( currentSchemaDBHandle ) == CD_FALSE )
        cd_closeSchemaDB();
    else if ( pmx_isNullDBHandle( currentDBHandle ) == CD_FALSE )
    {
        if ( canAccessExtData == CD_TRUE ) {
            pmx_destroyExtPMXConnection( currentDBHandle );
        }
        canAccessExtData = CD_FALSE;
        bStat = pmx_close( currentDBHandle );
        PMX_ASSERT( bStat == CD_TRUE );
```

```
        currentDBHandle = pmx_getNullDBHandle();
        if ( currentDBName != NULL ) {
            cd_memFree( currentDBName );
            currentDBName = NULL;
        }
        cd_setNullHandles();
        clearMainScreen();
    }
}

/*-----------------------------------------------------------------------
// cd_pingDataBase pings the current open knowledge base to keep it active.
-----------------------------------------------------------------------*/
void
cd_pingDataBase()
{
    cd_boolean bStat;
    pmx_dbHandle thisDB;

    thisDB = currentSchemaDBHandle;
    if ( pmx_isNullDBHandle( thisDB ) == CD_TRUE )
        thisDB = currentDBHandle;
    if ( pmx_isNullDBHandle( thisDB ) == CD_FALSE )
    {
        bStat = pmx_markClientActive( thisDB );
        PMX_ASSERT( bStat == CD_TRUE );
    }
}

/*-----------------------------------------------------------------------
// cd_fetchSchemaDBName returns the current DataBase name
// being used by the Schema Editor.
-----------------------------------------------------------------------*/
char *
cd_fetchSchemaDBName()
{
    return currentSchemaDBName;
}

/*-----------------------------------------------------------------------
// cd_fetchClassHandle returns the current class handle.
-----------------------------------------------------------------------*/
static pmx_classHandle current_classHandle;

pmx_classHandle
cd_fetchClassHandle()
{
    return current_classHandle;
}

/*-----------------------------------------------------------------------
// cd_fetchLockHolder returns the current lock holder ID.
-----------------------------------------------------------------------*/
static pmx_lockHolderHandle current_lockHolder;

pmx_lockHolderHandle
cd_fetchLockHolder()
{
    return current_lockHolder;
}

/*-----------------------------------------------------------------------
// cd_setNullHandles initializes the DB, the dbname, and class handles.
-----------------------------------------------------------------------*/
void
cd_setNullHandles()
{
    currentDBHandle = pmx_getNullDBHandle();
    current_classHandle = pmx_getNullClassHandle();
    if ( currentDBName != NULL ) {
        /* free the memory */
        cd_memFree( currentDBName );
        currentDBName = NULL;
    }
    canDeleteParts = CD_FALSE;
    canEditParts = CD_FALSE;
    canMakeParts = CD_FALSE;
    canEditSchema = CD_FALSE;
    canAdmin = CD_FALSE;
}

/*-----------------------------------------------------------------------
// cd_storeDBName saves away the current dbname.
-----------------------------------------------------------------------*/
void
cd_storeDBName( dbName )
    char *dbName;
{
    if ( currentDBName != NULL ) {
        /* free the memory */
        cd_memFree( currentDBName );
    }
    currentDBName = cd_memAlloc( strlen( dbName) +1 );
    strcpy( currentDBName, dbName );
}

/*-----------------------------------------------------------------------
// cd_storeClassHandle saves away the current class handle.
-----------------------------------------------------------------------*/
void
cd_storeClassHandle( thisHandle )
    pmx_classHandle thisHandle;
{
    current_classHandle = thisHandle;
}

/*-----------------------------------------------------------------------
// cd_fetchRootName returns the name of the root class of the
// current open data base.
-----------------------------------------------------------------------*/
void
cd_fetchRootName( title )
    char *title;
{
    pmx_classHandle rootClass;
    pmx_classDescriptor *thisDescr;

    title[0] = 0;
    if ( pmx_isNullDBHandle( currentDBHandle ) == CD_FALSE )
    {
        rootClass = cd_getVirtualRoot( currentDBHandle );
        if ( pmx_isNullClassHandle( current_classHandle ) == CD_FALSE )
        {
            thisDescr = pmx_getClassDescriptor( currentDBHandle, rootClass );
            PMX_ASSERT( thisDescr != NULL );
            strcpy( title, thisDescr->className );
            pmx_freeClassDescriptor( thisDescr );
        }
    }
}

/*-----------------------------------------------------------------------
// getEditPartRight returns whether this user has rights to edit parts.
// getMakePartRight returns whether this user has rights to make new parts.
// getAdminright returns whether this user has administration rights.
-----------------------------------------------------------------------*/

cd_boolean
getEditPartRight()
{
    return canEditParts;
}

cd_boolean
getMakePartRight()
{
    return canMakeParts;
}

cd_boolean
getDeletePartRight()
{
    return canDeleteParts;
}

cd_boolean
getEditSchemaRight()
{
```

```
    return canEditSchema;
}

cd_boolean
getAdminRight()
{
    return canAdmin;
}
cd_boolean
getExtDataRight()
{
    return canAccessExtData;
}

/*------------------------------------------------------------------------
    getDBList retrieves the list of registered databases.  It allocates
    memory for the array to hold the names.  The calling routines must
    free the memory.
------------------------------------------------------------------------*/
static long
getDBList( dbList )
    char ***dbList;
{
    cd_boolean status;
    long i, canOpen;
    pmx_user *usr;

    canOpen = 0;
    usr = pmx_getUser( cd_getUserName() );
    if ( usr != NULL && usr->rightsCount > 0 )
    {
        *dbList = (char **)cd_memAlloc( usr->rightsCount * sizeof(char*) );
        for( i = 0; i < usr->rightsCount; i++ ) {
            if ( (i+1) == usr->rightsCount ) {

                if ( cd_strcmp( usr->rights[i].database,
                        "PMXREGISTRY" ) == 0 ) {
                    continue;
                }

            }
            if ( cd_isUserModel() == CD_TRUE ) {
                /* fixed user model licensing */
                if ( ( usr->rights[i].rightsBits
                    & PMX_MOTIF_RETRIEVER) == 0 ) {
                    continue;

                }
            } else {
                /* floating model licensing */
                if ( (usr->rights[i].rightsBits
                    & PMX_RETRIEVE ) == 0 ) {
                    continue;
                }

            }
            (*dbList)[canOpen++] = strdup(usr->rights[i].database);
        }
    }
    if ( usr != NULL )
    {
        status = pmx_freeUser( usr );
        PMX_ASSERT( status == CD_TRUE );
    }
    return canOpen;
}
/*------------------------------------------------------------------------
    openPmxDB attempts to open the named database and fetch its
    root class handle.  It returns the open status.
------------------------------------------------------------------------*/
static cd_boolean
openPmxDB( dbName, displayErrors )
    char* dbName;
    cd_boolean displayErrors;
{
    int i;
    char *msg;
    cd_boolean status;
    cd_boolean readOnly = CD_FALSE;
    pmx_user *usr;
    pmx_multiStringDescriptor  *thisDescriptor;

    currentDBHandle = pmx_open( cd_getSessionHandle(), dbName,
        CD_FALSE, CD_FALSE );
    status = ( pmx_isNullDBHandle( currentDBHandle ) == CD_FALSE );
    if ( status == CD_FALSE )
    {
        msg = (char*)pmx_getErrorText( pmx_getErrorCode() );
        fprintf( stderr, "Failed to open for write - %s\n", msg );
        currentDBHandle = pmx_open( cd_getSessionHandle(), dbName,
            CD_TRUE, CD_FALSE );
        status = ( pmx_isNullDBHandle( currentDBHandle ) == CD_FALSE );
        readOnly = CD_TRUE;
    }

    if ( status == CD_TRUE )
    {

        current_lockHolder = pmx_startLockHolder( currentDBHandle );
        if ( pmx_isNullLockHolderHandle( current_lockHolder ) == CD_TRUE )
        {
            status = CD_FALSE;
        }
        if ( status == CD_TRUE )
        {
            current_classHandle = pmx_getRoot( currentDBHandle );
            if ( pmx_isNullClassHandle( current_classHandle ) == CD_TRUE ) {
                status = CD_FALSE;
            }
            /* set it to the root or null initially */
            cd_setVirtualRoot( current_classHandle );

        }

        if ( status == CD_TRUE )
        {
            status = pmx_requestLock( currentDBHandle, current_lockHolder,
                current_classHandle, PMX_CLASS_S_LOCK );
            if ( status == CD_FALSE )
            {
                if ( displayErrors == CD_TRUE )  {
                    char msg[256];
                    sprintf( msg, "Knowledge base %s could not be opened.\n", dbNa
                    pmxWarning( msg );
                } else {
                    char msg[256];
                    sprintf( msg, "Knowledge base %s could not be opened.\n%s", db
                            pmx_getErrorText( pmx_getErrorCode() ) );
                    setInitErrorText( msg );
                }
                if ( canAccessExtData == CD_TRUE ) {
                    pmx_destroyExtPMXConnection( currentDBHandle );
                }
                canAccessExtData = CD_FALSE;
                status = pmx_close( currentDBHandle );
                PMX_ASSERT( status == CD_TRUE );
                cd_setNullHandles();
                return CD_FALSE;
            }

        }

        if ( status == CD_TRUE && readOnly == CD_FALSE )
        {
            usr = pmx_getUser( cd_getUserName() );
            PMX_ASSERT( usr != NULL );
            for( i = 0; i < usr->rightsCount; i++ )
            {
                if ( strcmp( dbName, usr->rights[i].database ) == 0 )
                {
                    canEditParts =
                        ( usr->rights[i].rightsBits & PMX_EDIT_PART ) != 0;
                    canMakeParts =
                        ( usr->rights[i].rightsBits & PMX_MAKE_PART ) != 0;
                    canEditSchema =
                        ( usr->rights[i].rightsBits & PMX_EDIT_SCHEMA ) != 0;
                    canAdmin =
                        ( usr->rights[i].rightsBits & PMX_ADMINISTER ) != 0;
                    canAccessExtData =
                        ( usr->rights[i].rightsBits & PMX_EXTERNAL_DATA_ACCESS ) !
```

```
            canDeleteParts =
                ( usr->rights[i].rightsBits & PMX_DELETE_PART ) != 0;

            if ( usr->rights[i].startingClassPath == NULL ) {
                currentStartingClassHandle =
                    cd_getVirtualRoot( currentDBHandle );
            } else {
                currentStartingClassHandle.classHandle =
                    atol( usr->rights[i].startingClassPath );
            }

            break;
        }
    }
    }

    cd_storeDBName( dbName );

    /* if external data rights, start the server */
    if ( getExtDataRight() == CD_TRUE ) {
        if ( joinServerStarted == CD_FALSE ) {
            if ( pmx_startExtJoinService ( cd_getSessionHandle() ) == CD_FALSE )
                pmxWarning( "Join service not started" );
            } else if ( pmx_openExtJoinServer ( cd_getSessionHandle() )  == CD_FA
                pmxWarning( "Join server not accessible" );
            } else {

                joinServerStarted = CD_TRUE;
            }
        }
        if ( joinServerStarted == CD_TRUE ) {
            if ( pmx_createExtPMXConnection ( currentDBHandle ) == CD_FALSE ) {
                pmxWarning( "Cannot create external connetion for this database"
            }
        }
    }

    /* get the copyright, if any */
    thisDescriptor = pmx_getDBCopyright(currentDBHandle);
    if (  thisDescriptor != NULL ) {
        long i;
        char *tstr;
        char mBuf[1024];

        mBuf[0] = '\0';
        for( i = 0; i < thisDescriptor->count; i++ ) {
            tstr = thisDescriptor->values[i];
            if ( tstr != NULL ) {
                if ( mBuf[0] != 0 )
                    strcat( mBuf, "\n" );
                strcat(mBuf, tstr );
            }
        }
        if ( mBuf[0] != 0 )
            popup_copyrightDialog( mainWindowShell, mBuf );

        status = pmx_freeMultiStringDescriptor(thisDescriptor);
        PMX_ASSERT( status == CD_TRUE );
    }
}

if ( status == CD_FALSE ) {
    if ( displayErrors == CD_TRUE ) {
        char msg[256];
        sprintf( msg, "Knowledge base %s::n", dbName );
        pmxWarning( msg );
    } else {
        char msg[256];
        sprintf( msg, "Knowledge base %s:\n%s", dbName,
                pmx_getErrorText( pmx_getErrorCode() ) );
        setInitErrorText( msg );
    }
}
return status;
}

*------------------------------------------------------------------------
  cd_openSingleDB checks for a single registered database and opens it.
------------------------------------------------------------------------*

long
cd_openSingleDB()
{
    long dbCount;
    char **dbList;

    if ( ( dbCount = getDBList( &dbList ) ) == 1 )
        if ( openPmxDB( dbList[0], CD_FALSE ) == CD_FALSE )
            dbCount = 0;
    cd_memFree( dbList );
    return dbCount;
}

/*-------------------------------------------------------------------------
//  cd_openDataBase is called from the File Open menu as a preface to
//  popping up the Open dialog.  It retrieves the list of registered
//  databases, formats it, and pops up the dialog.
-------------------------------------------------------------------------*
void
cd_openDataBase()
{
    char rootName[256];
    char msg[256];
    cd_boolean status;
    pmx_dbHandle thisDB;
    long dbCount;
    char **dbList;

    /* first do the close quiz here. */
    thisDB = cd_fetchDBHandle();

    if ( pmx_isNullDBHandle( thisDB ) == CD_FALSE )
    {
        cd_fetchRootName( rootName );
        sprintf( msg, "Close knowledge base %s?", cd_fetchDBName() );
        status = popup_confDialog( mainWindowShell,
            msg, "CADIS-PMX", "Yes", "No" );
        if ( status == CD_FALSE )
            return;

        if ( canAccessExtData == CD_TRUE ) {
            pmx_destroyExtPMXConnection( thisDB );
        }
        canAccessExtData = CD_FALSE;
        status = pmx_close( thisDB );
        PMX_ASSERT( status == CD_TRUE );
        /* reset the main screen */
        cd_setNullHandles();
        clearMainScreen(  );
    }

    dbCount = getDBList( &dbList );
    if ( dbCount < 1 )
    {
        popup_errorDialog( mainWindowShell,
        "No knowledge bases are available.\nPlease contact your system administrat
        "" );
    }
    else
        popup_openDialog( dbList, dbCount );

    cd_memFree( dbList );
}

/*-------------------------------------------------------------------------
//  cd_openThisDataBase is called from the Open Dialog OK callback.
//  It closes the current database, opens the new one, and causes the
//  search screen to be reset.
-------------------------------------------------------------------------*
void
cd_openThisDataBase( dbName )
    char *dbName;
{
    char rootName[256];
    char msg[256];
    cd_boolean status;
    pmx_dbHandle thisDB;

    thisDB = cd_fetchDBHandle( );
```

```
PMX_ASSERT( pmx_isNullDBHandle( thisDB ) == CD_TRUE );

if ( openPmxDB( dbName, CD_TRUE ) == CD_TRUE )
{
    cd_setBusyPointer( CD_TRUE );
    cd_fetchRootName( rootName );
    resetMainScreen( rootName );
    cd_setBusyPointer( CD_FALSE );
}
else
{
    cd_setNullHandles();
    clearMainScreen( );
}
}

/*--------------------------------------------------------------------
  getWriteLock tries to lock the current database for schema editing.
--------------------------------------------------------------------*/
cd_boolean
getWriteLock()
{
    char msg[256];
    cd_boolean status;
    cd_boolean bLockOK;
    pmx_dbHandle thisDB;
    pmx_classDescriptor *thisDescr;

    bLockOK = CD_FALSE;
    thisDB = cd_fetchDBHandle();

    if ( pmx_isNullDBHandle( thisDB ) == CD_FALSE )
    {
        /*
         * Tell the user we're going to close the open
         * knowledge base.
         */
        if ( cd_isUserModel() == CD_TRUE ) {
            /* attempt to get a user license */
            if ( pmx_getUserLicense( cd_getSessionHandle(), PMX_SCHEMADEVELOPERNAME
                pmxWarning( "" );
                return ( CD_FALSE );
            }
        }

        thisDescr = pmx_getClassDescriptor( currentDBHandle, cd_fetchClassHandle() );

        sprintf( msg,
        "Schema editing %s\ncloses the current knowledge base.\nProceed ?", thisDescr

        pmx_freeClassDescriptor( thisDescr );

        status = popup_confDialog( mainWindowShell, msg,
            "CADIS-PMX", NULL, NULL );
        if ( status == CD_FALSE )
            return CD_FALSE;

        /* Attempt to get the exclusive lock on virtual root */
        bLockOK = pmx_requestLock( thisDB, cd_fetchLockHolder(),
            cd_fetchClassHandle(), PMX_TREE_X_LOCK );
        if ( bLockOK == CD_FALSE )
        {
            pmxWarning( "Couldn't lock knowledge base." );
            currentSchemaDBHandle = pmx_getNullDBHandle();
            if ( currentSchemaDBName != NULL ) {
                cd_memFree( currentSchemaDBName );
                currentSchemaDBName = NULL;
            }
        } else {
            /* release all the share locks here */
            pmx_releaseAllLocksOfType(
                    thisDB,
                    cd_fetchLockHolder(),
                        pmx_getRoot( thisDB ),
                    PMX_TREE_S_LOCK);
            pmx_releaseAllLocksOfType(
                    thisDB,
                    cd_fetchLockHolder(),
                        pmx_getRoot( thisDB ),
                    PMX_CLASS_S_LOCK);
            /*
             * Reset the main screen
             */
            currentSchemaDBHandle = thisDB;
            currentSchemaDBName = currentDBName;
            currentDBName = NULL;
            /* bterp - don't call cd_nullhandles - it also
             * destroys the rights information needed later
             */
            cd_setVirtualRoot( cd_fetchClassHandle() );
            currentDBHandle = pmx_getNullDBHandle();
            current_classHandle = pmx_getNullClassHandle();
            clearMainScreen( );

        }
    }
    return bLockOK;
}

/*--------------------------------------------------------------------------
//    This program is the confidential and proprietary product of CADIS, Inc.
//    Any unauthorized use, reproduction or transfer of this program
//    is strictly prohibited.
//            Copyright (C) 1994 by CADIS, Inc.
//
//  File name---
//    schemaOutline.c
//
//  Purpose---
//    Sets up and manages display of the Outline tree on the Schema Edit
//    screen.
//
//  File modification history---
//  03-17-95 vwheel Added class locking.
//  01/24/95 vwheel Changed parameters in pmx_addLeafClass.
//  01/24/95 vwheel Changed pmx_getApplyQueryCount to
//                  pmx_applyQueryCount.
//  12/16/94 bterp  Fix reentrancy problems in delete class.
//  11/30/94 bterp  Fix problem in findParentNode - was not returning
//         parent properly from recursive descent.
//  10/25/94 - use getApplyQueryCount for performance
//
//  Description---
//
--------------------------------------------------------------------------*/

#include <stdio.h>
#include "UxLib.h"

#include "memAlloc.h"
#include "outline.h"
#include "retrieve.h"
#include "searchOutline.h"
#include "schemaEdit.h"
#include "schemaAttribute.h"

#define CONFMSG1 "Choose OK to delete this class, its subtree\nand all associated
#define CONFMSG2 "Choose OK to delete this class, its subtree\nand all associated

extern Pixmap getPixFolder();
extern Pixmap getPixOpenFolder();
extern Pixmap getPixSheet();
extern swidget schemaEditor;

static Widget schemaOutline;
static Widget scrOutline;

static void selectNewNode();
static void gotoNode();
cd_boolean requestParentLock();
void releaseParentLock();
static void classLockFailed();

/*** TEST ***/
```

```
extern int showDrag;

/*------------------------------------------------------------------------
/   countOpenNodes recurses through the outline tree and counts
    the number of lines that are open.  This is used to set the
    scrollbar increment.
------------------------------------------------------------------------*/
static long
countOpenNodes( root )
    t_cdRetrieverClass *root;
{
    t_cdRetrieverClass *node, *nodenext;
    long count = 0;

    for( node = root; node != NULL; node = nodenext )
    {
        nodenext = node->next;
        if ( node->nodeType == OPENFOLDER && node->subclass != NULL )
            count += countOpenNodes( node->subclass );
        count++;
    }
    return count;
}

/*------------------------------------------------------------------------
//  fetchSchemaClassNode returns the current schema class node.
------------------------------------------------------------------------*/
static pmx_classHandle current_classHandle;
static t_cdRetrieverClass *current_node;
t_cdRetrieverClass *
fetchSchemaClassNode()
{
    return current_node;
}

/*------------------------------------------------------------------------
//  storeSchemaClassNode saves away the current schema class node.
------------------------------------------------------------------------*/
void
storeSchemaClassNode( thisNode )
t_cdRetrieverClass *thisNode;
{
    current_node = thisNode;
}

/*------------------------------------------------------------------------
//  fetchSchemaClassHandle returns the current schema class handle.
------------------------------------------------------------------------*/
static pmx_classHandle current_classHandle;

pmx_classHandle
fetchSchemaClassHandle()
{
    return current_classHandle;
}

/*------------------------------------------------------------------------
//  storeSchemaClassHandle saves away the current schema class handle.
------------------------------------------------------------------------*/
void
storeSchemaClassHandle( thisHandle )
    pmx_classHandle thisHandle;
{
    current_classHandle = thisHandle;
}

/*------------------------------------------------------------------------
//  showSchemaClassName displays the current schema class name
//  in the edit box.
------------------------------------------------------------------------*/
void
showSchemaClassName()
{
    t_cdRetrieverClass *node;

    node = fetchSchemaClassNode();
    if ( node != NULL )
        setSchemaClassName( node->name );
}

/*------------------------------------------------------------------------
/   schemaSetClassName changes the name of the current class to the name
/   passed into us.
------------------------------------------------------------------------*/
void
schemaSetClassName( sName )
char *sName;
{
    int x;
    cd_boolean bStat;
    char *sPtr;
    t_cdRetrieverClass *node;
    pmx_classHandle thisClass;
    pmx_dbHandle thisDB;

    thisDB = cd_fetchSchemaDBHandle();
    if ( pmx_isNullDBHandle( thisDB ) == CD_TRUE )
        return;
    /*
     *  Fetch current outline tree node and its associated
     *  class handle.
     */
    node = fetchSchemaClassNode();
    if ( node == NULL )
        return;
    thisClass = *((pmx_classHandle*) &node->data);

    /*
     *  Attempt to get an exclusive lock on the parent of this class.
     */
    if ( requestParentLock( thisClass, PMX_TREE_X_LOCK ) == CD_FALSE )
        return;

    /*
     * Define a new name for this class.
     */
    bStat = pmx_setClassName( thisDB, thisClass, sName );
    if ( bStat == CD_FALSE ) {
        schemaWarning( "Couldn't change class name" );
        releaseParentLock( thisClass, PMX_TREE_X_LOCK );
        return;
    }

    /*
     *  Release the exclusive lock on the parent class.
     */
    releaseParentLock( thisClass, PMX_TREE_X_LOCK );

    /*
     * Save this name in our outline node.
     */
    if ( ( x = strlen( sName ) ) > strlen( node->name ) )
    {
        sPtr = (char *)cd_memAlloc( strlen( sName ) + 1 );
        cd_memFree( node->name );
        node->name = sPtr;
    }
    strcpy( node->name, sName );
    /*
     * Cause the outline widget to repaint.
     */
    UxUnmap( UxWidgetToSwidget(scrOutline) );
    setSchemaClassName( node->name );
    UxMap( UxWidgetToSwidget(scrOutline) );
}

/*------------------------------------------------------------------------
/   findParentNode iterates and recurses through a linked list of
/   nodes looking for the parent of the specified node.
------------------------------------------------------------------------*/
static t_cdRetrieverClass *
findParentNode( root, cnode )
    t_cdRetrieverClass *root;
    t_cdRetrieverClass *cnode;
{
    t_cdRetrieverClass *node, *pnode;

    for( node = root->subclass; node != NULL; node = node->next )
```

```
    {
        if ( node == cnode )
            return root;
        if ( node->subclass != NULL ) {
            if ( ( pnode = findParentNode( node, cnode ) ) != NULL ) {
                return pnode;
            }
        }
    }
    return NULL;
}

/*------------------------------------------------------------------
/   requestClassLock requests a class share lock for the specified class
/   and reports the results.
------------------------------------------------------------------*/
static cd_boolean
requestClassLock( thisClass, lockType )
    pmx_classHandle thisClass;
    pmx_lockType lockType;
{
    cd_boolean status;
#ifdef DEBUG
    {
        pmx_classDescriptor * thisDescr;

        thisDescr = pmx_getClassDescriptor( cd_fetchSchemaDBHandle(),
            thisClass );
        printf( "Requested class lock for %s\n", thisDescr->className );
        pmx_freeClassDescriptor( thisDescr );
    }
#endif
    status = pmx_requestLock( cd_fetchSchemaDBHandle(), cd_fetchLockHolder(),
        thisClass, lockType );
    if ( status == CD_FALSE )
        classLockFailed( schemaEditor, thisClass );
    return status;
}

/*------------------------------------------------------------------
/   releaseClassLock releases a class share lock for the specified class
/   and reports the results.
------------------------------------------------------------------*/
static void
releaseClassLock( thisClass, lockType )
    pmx_classHandle thisClass;
    pmx_lockType lockType;
{
    cd_boolean status;
    pmx_classDescriptor * thisDescr;

#ifdef DEBUG
    {
        thisDescr = pmx_getClassDescriptor( cd_fetchSchemaDBHandle(),
            thisClass );
        printf( "Released class lock for %s\n", thisDescr->className );
        pmx_freeClassDescriptor( thisDescr );
    }
#endif
    status = pmx_releaseLock( cd_fetchSchemaDBHandle(), cd_fetchLockHolder(),
        thisClass, lockType );
    if ( status == CD_FALSE )
    {
        char sMsg[256];
        char sBuf[256];

        strcpy( sMsg, (void*)pmx_getErrorText( pmx_getErrorCode() ) );
        thisDescr = pmx_getClassDescriptor( cd_fetchSchemaDBHandle(),
            thisClass );
        sprintf( sBuf, "Class %s\n%s", thisDescr->className, sMsg );
        pmx_freeClassDescriptor( thisDescr );
        popup_pmxErrorDialog( schemaEditor, sBuf );
    }
}

/*------------------------------------------------------------------
    classLockFailed composes a message for a class lock failure and
    pops up a dialog saying it.
------------------------------------------------------------------*/
static void
classLockFailed( sw, thisClass )
    swidget sw;
    pmx_classHandle thisClass;
{
    char sMsg[256];
    char sBuf[256];
    cd_boolean pmxStatus;
    pmx_classDescriptor * thisDescr;

    strcpy( sBuf, (void*)pmx_getErrorText( pmx_getErrorCode() ) );
    thisDescr = pmx_getClassDescriptor( cd_fetchSchemaDBHandle(), thisClass );
    PMX_ASSERT( thisDescr != NULL );
    sprintf( sMsg, "Class %s\n%s", thisDescr->className, sBuf );
    popup_warningDialog( sw, sMsg, "CADIS-PMX" );
    pmxStatus = pmx_freeClassDescriptor( thisDescr );
    PMX_ASSERT( pmxStatus == CD_TRUE );
}

/*------------------------------------------------------------------
/   unlockClosedNodes recurses through a closed tree and unlocks any
/   nodes that were previously open.
------------------------------------------------------------------*/
static void
unlockClosedNodes( root )
    t_cdRetrieverClass *root;
{
    t_cdRetrieverClass *node, *nodenext;

    for( node = root; node != NULL; node = nodenext )
    {
        nodenext = node->next;
        if ( node->nodeType == OPENFOLDER && node->subclass != NULL )
        {
            releaseClassLock( *((pmx_classHandle*) &node->data),
                PMX_CLASS_S_LOCK );
            unlockClosedNodes( node->subclass );
        }
    }
}

/*------------------------------------------------------------------
/   requestParentLock attempts to gain an exclusive lock on the
/   parent class of the requested class.
------------------------------------------------------------------*/
cd_boolean
requestParentLock( thisClass, lockType )
    pmx_classHandle thisClass;
    pmx_lockType lockType;
{
    cd_boolean status = CD_FALSE;
    pmx_classHandle parentClass;

    parentClass = pmx_getParentOfClass( cd_fetchSchemaDBHandle(),
        thisClass );
    if ( pmx_isNullClassHandle( parentClass ) == CD_FALSE ) {
        status = requestClassLock( parentClass, lockType );
    } else {
        /* special case ( as usual ) for the root */
        if ( pmx_equalClassHandles( thisClass,
            cd_getVirtualRoot( cd_fetchSchemaDBHandle() ) ) == CD_TRUE ) {
            status = requestClassLock( thisClass, lockType );
        }
    }

    return status;
}

/*------------------------------------------------------------------
/   releaseParentLock releases a lock on a parent class.
------------------------------------------------------------------*/
void
releaseParentLock( thisClass, lockType )
    pmx_classHandle thisClass;
    pmx_lockType lockType;
{
    pmx_classHandle parentClass;

    parentClass = pmx_getParentOfClass( cd_fetchSchemaDBHandle(),
```

```
        thisClass );
    if ( pmx_isNullClassHandle( parentClass ) == CD_FALSE ) {
        releaseClassLock( parentClass, lockType );
    } else {
        /* special case ( as usual ) for the root */
        if ( pmx_equalClassHandles( thisClass,
            cd_getVirtualRoot( cd_fetchSchemaDBHandle() ) ) == CD_TRUE ) {
            releaseClassLock( thisClass, lockType );
        }
    }
}

/*---------------------------------------------------------------------
 * schemaAddNewClass adds a new class node to the database and
 * puts a new node on the tree.
 *--------------------------------------------------------------------*/
void
schemaAddNewClass( sClassName )
char *sClassName;
{
    int min, max, numLines;
    cd_boolean needToMove;
    Widget scrlBar;
    t_cdRetrieverClass *node, *subnode, *leafnode;
    pmx_classHandle thisClass, newClass;
    pmx_dbHandle thisDB;
    pmx_classDescriptor * thisDescr;
    cd_boolean parentIsLocked = CD_FALSE;

    thisDB = cd_fetchSchemaDBHandle();
    if ( pmx_isNullDBHandle( thisDB ) == CD_TRUE )
        return;
    /*
     * Fetch current outline tree node and its associated
     * class handle.
     */
    node = fetchSchemaClassNode();
    if ( node == NULL )
        return;
    thisClass = *((pmx_classHandle*) &node->data);

    /*
     * Attempt to get an exclusive lock on the grandparent of this class.
     * If we are adding the first class.
     * This is so that the class will not change from a leaf to a
     * folder on someone's screen.
     */
    thisDescr = pmx_getClassDescriptor( thisDB, thisClass );
    if ( thisDescr->subclassCount == 0 ) {
        if ( requestParentLock( thisClass, PMX_TREE_X_LOCK )
            == CD_FALSE ) {
            pmx_freeClassDescriptor( thisClass );
            return;
        }
        parentIsLocked = CD_TRUE;
    }
    pmx_freeClassDescriptor( thisDescr );
    cd_setWindowBusy( schemaEditor, CD_TRUE );
    /*
     * Add a new leaf class to the database.
     */
    newClass = pmx_addLeafClass( thisDB, thisClass, sClassName, 0L );
    if ( pmx_isNullClassHandle( newClass ) == CD_TRUE )
    {
        schemaWarning( "Couldn't add new class." );
        if ( parentIsLocked == CD_TRUE ) {
            releaseParentLock( thisClass, PMX_TREE_X_LOCK );
        }
        cd_setWindowBusy( schemaEditor, CD_FALSE );
        return;
    }

    /*
     * If this node has not been expanded then make sure the tree under
     * it is defined.
     */
    if ( node->subclass == NULL )
    {
        makeSubTree( node, thisDB, thisClass );
        subnode = node->subclass;
        node->subclass = NULL;
        needToMove = CD_FALSE;
    }
    else
    {
        subnode = (t_cdRetrieverClass *)cd_memAlloc(
                    sizeof(t_cdRetrieverClass) );
        subnode->name = (char*)cd_memAlloc( strlen(sClassName) + 1 );
        strcpy( subnode->name, sClassName );
        subnode->data = (void*) *((long*) &newClass);
        subnode->next = NULL;
        subnode->subclass = NULL;
        subnode->nodeType = LEAFSHEET;
        needToMove = CD_TRUE;
    }
    /*
     * If the node we're adding to was a leaf node change
     * it to an open folder.
     */
    if ( node->nodeType != OPENFOLDER )
        cdChangeNodeType( schemaOutline, node, OPENFOLDER );
    /*
     * Add our new node, and possibly its siblings, to the outline
     * tree.
     */
    cdRetrieverListInsert( schemaOutline, node,
        subnode, NULL, NULL );
    freeOutlineNodes( subnode );
    /*
     * If we just added a leaf to a parent class that already had
     * other leaves open, we need to move it to the top of the
     * list, where pmx puts it.  The outline widget adds it to
     * the end of the list.
     */
    if ( needToMove == CD_TRUE )
    {
        for( leafnode = node->subclass; leafnode->next != NULL;
            leafnode = leafnode->next );
        cdRetrieverListMove( schemaOutline, leafnode, node->subclass );
    }

    /*
     * Release the exclusive lock on the parent class.
     */
    if ( parentIsLocked == CD_TRUE ) {
        releaseParentLock( thisClass, PMX_TREE_X_LOCK );
    }

    /*
     * Update the min and max values for the scrollbar.
     */
    XtVaGetValues( scrOutline, XmNverticalScrollBar, &scrlBar, NULL );
    XtVaGetValues( scrlBar,
        XmNminimum, &min,
        XmNmaximum, &max, NULL );
    numLines = countOpenNodes( cdRetrieverRoot( schemaOutline ) );
    XtVaSetValues( scrlBar, XmNincrement,
        ( ( max - min ) / numLines ), NULL );

    cd_setWindowBusy( schemaEditor, CD_FALSE );
}

/*---------------------------------------------------------------------
 * schemaDelClass deletes a class and its subtree from the database.
 *--------------------------------------------------------------------*/
void
schemaDelClass()
{
    int min, max, numLines;
    long resultCount;
    char msgBuf[256];
    cd_boolean pmxStatus;
    Widget scrlBar;
    t_cdRetrieverClass *pnode;
    t_cdRetrieverClass *node;
    pmx_classHandle thisClass, parentClass;
    pmx_classDescriptor * thisDescr;
    pmx_dbHandle thisDB;
```

```
pmx_queryHandle         thisQuery;
pmx_queryResultHandle   thisResult;
pmx_classHandle ancestorClass;

thisDB = cd_fetchSchemaDBHandle();
if ( pmx_isNullDBHandle( thisDB ) == CD_TRUE ) {
    return;
}
/*
 * Fetch current outline tree node and its associated
 * class handle.
 */
node = fetchSchemaClassNode();
if ( node == NULL ) {
    return;
}
pnode = findParentNode( cdRetrieverRoot( schemaOutline ), node );
thisClass = *((pmx_classHandle*) &node->data);

if ( pmx_equalClassHandles( thisClass, cd_getVirtualRoot( thisDB )) ) {
    popup_warningDialog(
        schemaEditor,
        "The root class of a knowledge base cannot be deleted.",
        "CADIS-PMX" );

    return;
}
if ( popup_confDialog( schemaEditor, CONFMSG1,
    "Delete Class", NULL, NULL ) == CD_FALSE ) {
    return;
}

/*
 * Attempt to get an exclusive lock on the grandparent of this class.
 * if we are deleting the last class.
 * This is so that the class will not change from a folder to a
 * leaf on someone's screen.
 */
parentClass = pmx_getParentOfClass( thisDB, thisClass );
ancestorClass = parentClass;
thisDescr = pmx_getClassDescriptor( thisDB, parentClass );
if ( thisDescr->subclassCount == 1 ) {
    ancestorClass = pmx_getParentOfClass( thisDB, parentClass );
}
if ( requestClassLock( ancestorClass, PMX_TREE_X_LOCK ) == CD_FALSE )
    return;
pmxStatus = pmx_freeClassDescriptor( thisDescr );
PMX_ASSERT( pmxStatus == CD_TRUE );

/*
 * Create a query handle to get the instances to warn the
 * user about potential instance loss.
 */
thisQuery = pmx_createQuery( thisDB, thisClass );
PMX_ASSERT( pmx_isNullQueryHandle( thisQuery ) == CD_FALSE );
resultCount = pmx_applyQueryCount( thisDB, thisQuery );
pmxStatus = pmx_destroyQuery( thisDB, thisQuery );
PMX_ASSERT( pmxStatus == CD_TRUE );
if ( resultCount > 0 )
{
    if ( getEditPartRight() == CD_TRUE )
    {
        sprintf( msgBuf, "%ld parts will be deleted.\n%s",
            resultCount, CONFMSG2 );
        if ( popup_confDialog( schemaEditor, msgBuf,
            "Delete Class", NULL, NULL ) == CD_FALSE ) {
            releaseClassLock( ancestorClass, PMX_TREE_X_LOCK );
            return;
        }
    }
    else
    {
        sprintf( msgBuf, "The selected class contains %ld parts,\nand cannot be r
        popup_infoDialog( schemaEditor, msgBuf );
        releaseClassLock( ancestorClass, PMX_TREE_X_LOCK );
        return;
    }
}
cd_setWindowBusy( schemaEditor, CD_TRUE );

/*
 * Delete the class and its subtree.
 */
pmxStatus = pmx_deleteSubtree( thisDB, thisClass );
if ( pmxStatus == CD_FALSE ) {
    schemaWarning( "Couldn't delete this class." );
    releaseClassLock( ancestorClass, PMX_TREE_X_LOCK );
    cd_setWindowBusy( schemaEditor, CD_FALSE );
    return;
} else {
    node = cdRetrieverListDelete( schemaOutline, node );
    storeSchemaClassHandle( pmx_getNullClassHandle() );
}

/*
 * See if the parent of this class has any subtrees now.
 * If not, change it to a leaf node on our outline tree.
 */
thisDescr = pmx_getClassDescriptor( thisDB, parentClass );
PMX_ASSERT( thisDescr != NULL );
if ( thisDescr->subclassCount == 0 )
    cdChangeNodeType( schemaOutline, pnode, LEAFSHEET );
pmxStatus = pmx_freeClassDescriptor( thisDescr );
PMX_ASSERT( pmxStatus == CD_TRUE );

/*
 * Select a new current class.
 */
node->nodeFlag = CD_FALSE;
selectNewNode( schemaOutline, NULL, node );

cd_setWindowBusy( schemaEditor, CD_FALSE );

/*
 * Release the exclusive lock on the parent class.
 */
releaseClassLock( ancestorClass, PMX_TREE_X_LOCK );

/*
 * Update the min and max values for the scrollbar.
 */
XtVaGetValues( scrOutline, XmNverticalScrollBar, &scrlBar, NULL );
XtVaGetValues( scrlBar,
    XmNminimum, &min,
    XmNmaximum, &max, NULL );
numLines = countOpenNodes( cdRetrieverRoot( schemaOutline ) );
XtVaSetValues( scrlBar, XmNincrement,
    ( ( max - min ) / numLines ), NULL );
}

struct update_params
{
    swidget aParent;
    pmx_classHandle pClass;
    pmx_classHandle tClass;
};

static cd_boolean
updateAttributes( updPtr )
    struct update_params *updPtr;
{
    update_schemaAttributes( updPtr->aParent,
        updPtr->pClass, updPtr->tClass, -1 );
    cd_memFree( updPtr );
    return CD_TRUE;
}

/*-----------------------------------------------------------------------
 * selectNewNode is called from an Outline callback when a new PMX
 * class is selected.  It updates the attributes display and resets
 * the current query.
 ----------------------------------------------------------------------*/
static void
selectNewNode( w, attrParent, node)
    Widget w;
    swidget attrParent;
```

```
    t_cdRetrieverClass *node;
{
    cd_boolean status;
    pmx_classHandle prevClass;
    pmx_classHandle thisClass;
    struct update_params *uPtr;

    thisClass = *((pmx_classHandle*) &node->data);
    prevClass = fetchSchemaClassHandle();
    /*
     * If this node is already current then don't do anything.
     * Otherwise save its node and classhandle, update the
     * class display and display a new set of attributes.
     */
    if ( pmx_equalClassHandles( prevClass, thisClass) == CD_FALSE )
    {
#ifdef HUH
        status = requestClassLock( thisClass, PMX_CLASS_S_LOCK );
        if ( status == CD_FALSE )
        {
            if ( pmx_isNullClassHandle( prevClass ) == CD_FALSE )
                gotoNode( fetchSchemaClassNode() );
            return;
        }
        if ( pmx_isNullClassHandle( prevClass ) == CD_FALSE )
            releaseClassLock( prevClass, PMX_CLASS_S_LOCK );
#endif
        storeSchemaClassHandle( thisClass );
        setSchemaClassName( node->name );
        storeSchemaClassNode( node );
        if ( node->nodeFlag )
        {
            uPtr = (struct update_params*)cd_memAlloc(
                sizeof( struct update_params ) );
            uPtr->aParent = attrParent;
            uPtr->pClass = prevClass;
            uPtr->tClass = thisClass;
            XtAppAddWorkProc( UxAppContext, updateAttributes, uPtr );
        }
        else
        {
            cd_setWindowBusy( schemaEditor, CD_TRUE );
            update_schemaAttributes( attrParent, prevClass, thisClass, -1 );
            cd_setWindowBusy( schemaEditor, CD_FALSE );
        }
    }
}

/*--------------------------------------------------------------------------
    expandNode is called when a node on the outline tree is expanded.
    It checks to see if the outline needs to be updated with subclasses
    to the current class.
--------------------------------------------------------------------------*/
static void
expandNode( w, attrParent, node)
  Widget w;
  swidget attrParent;
  t_cdRetrieverClass *node;
{
    int min, max, numLines;
    Widget scrlBar;
    t_cdRetrieverClass *subnode;
    t_cdRetrieverClass *nextnode;
    pmx_classHandle thisClass;

    /*
     * Make the node we're expanding the current node.
     */
    selectNewNode( w, attrParent, node );
    /*
     * If the node has not already been expanded
     * then fetch its immediate subclasses and insert
     * them into the outline tree.
     */
    thisClass = *((pmx_classHandle*) &node->data);
    if ( node->subclass == NULL )
    {
        cd_setWindowBusy( schemaEditor, CD_TRUE );
        makeSubTree( node, cd_fetchSchemaDBHandle(), thisClass );
        subnode = node->subclass;
        node->subclass = NULL;
        cdRetrieverListInsert( w, node, subnode, NULL, NULL );
        freeOutlineNodes( subnode );
        cd_setWindowBusy( schemaEditor, CD_FALSE );
    }

    if ( node->nodeType == OPENFOLDER ) {
#ifdef HUH
        requestClassLock( thisClass, PMX_CLASS_S_LOCK );
#endif
    } else if ( node->nodeType == CLOSEDFOLDER )
    {
#ifdef HUH
        releaseClassLock( thisClass, PMX_CLASS_S_LOCK );
#endif
        if ( node->subclass != NULL ) {
            extern myRetrieverListDelete();
            subnode = node->subclass;
#ifdef HUH
            unlockClosedNodes( node->subclass );
#endif

            while ( subnode != NULL ) {
               nextnode = subnode->next;
               myRetrieverListDelete( w, subnode );
                   subnode = nextnode;
            }

            freeOutlineNodes( subnode );
        }
        node->subclass = NULL;
    }

    /*
     * Update the scroll bar on this window to make a line
     * of the outline correspond to an increment on the scroll bar.
     */
    XtVaGetValues( scrOutline, XmNverticalScrollBar, &scrlBar, NULL );
    XtVaGetValues( scrlBar,
        XmNminimum, &min,
        XmNmaximum, &max, NULL );
    numLines = countOpenNodes( cdRetrieverRoot( schemaOutline ) );
    XtVaSetValues( scrlBar, XmNincrement,
        ( ( max - min ) / numLines ), NULL );
}

static void
gotoNode( classNode )
    t_cdRetrieverClass *classNode;
{
    Widget wNode;

    wNode = cdRetrieverSetCurrentLine( schemaOutline, classNode );
    XmScrollVisible( scrOutline, wNode, 0, 10 );
}

/*--------------------------------------------------------------------------
/   freeClosedNodes runs through the node tree that we deleted as
/   the first step in a move and and frees any subtrees that have
/   previously been closed.  We don't want to create these nodes
/   in the second half of the move.
--------------------------------------------------------------------------*/
static void
freeClosedNodes( node )
    t_cdRetrieverClass *node;
{
    t_cdRetrieverClass *snode;

    if ( node->nodeType == OPENFOLDER )
    {
        for( snode = node->subclass; snode != NULL; snode = snode->next )
            freeClosedNodes( snode );
    }
    else if ( node->subclass != NULL )
    {
        freeOutlineNodes( node->subclass );
        node->subclass = NULL;
    }
```

```
}

/*------------------------------------------------------------------------
 *  moveOutlineNode moves a node and its children to a new location
 *  on the outline.  It does this by deleting the subtree from the
 *  original location and inserting it at the new location.
 -----------------------------------------------------------------------*/
static void
moveOutlineNode( thisDB, currentClass, thisClass, node )
    pmx_dbHandle thisDB;
    pmx_classHandle currentClass;
    pmx_classHandle thisClass;
    t_cdRetrieverClass *node;
{
    int min, max, numLines;
    cd_boolean needToMove;
    cd_boolean pmxStatus;
    Widget scrlBar;
    Widget wNode;
    t_cdRetrieverClass *subnode;
    t_cdRetrieverClass *leafnode;
    t_cdRetrieverClass *snode;
    t_cdRetrieverClass *pnode;
    t_cdRetrieverClass *tmpnode;
    pmx_classHandle parentClass;
    pmx_classDescriptor * thisDescr;

    /*
     *  First remove the node from the outline tree.
     */
    cd_setBusyPointer( CD_TRUE );
    snode = fetchSchemaClassNode();
    pnode = findParentNode( cdRetrieverRoot( schemaOutline ), snode );
    ASSERT( pnode != NULL );
    cdRetrieverListDelete( schemaOutline, snode );

    /*
     *  Free any node paths that have been closed before
     *  the move.
     */
    freeClosedNodes( snode );

    /*
     *  See if the parent of this class has any subtrees now.
     *  If not, change it to a leaf node on our outline tree.
     */
    parentClass = *((pmx_classHandle*) &pnode->data);
    thisDescr = pmx_getClassDescriptor( thisDB, parentClass );
    PMX_ASSERT( thisDescr != NULL );
    if ( thisDescr->subclassCount == 0 )
        cdChangeNodeType( schemaOutline, pnode, 2 );
    pmxStatus = pmx_freeClassDescriptor( thisDescr );
    PMX_ASSERT( pmxStatus == CD_TRUE );

    /*
     *  If this node has not been expanded then make sure the tree under
     *  it is defined.
     */
    if ( node->subclass == NULL )
    {
        makeSubTree( node, thisDB, thisClass );
        tmpnode = node->subclass;
        snode->next = tmpnode->next;
        tmpnode->next = NULL;
        freeOutlineNodes( tmpnode );
        subnode = snode;
        node->subclass = NULL;
        needToMove = CD_FALSE;
    }
    else
    {
        subnode = snode;
        subnode->next = NULL;
        needToMove = CD_TRUE;
    }
    /*
     * If the node we're adding to was a leaf node change
     * it to an open folder.
     */
    if ( node->nodeType != OPENFOLDER )
    {
        if ( node->subclass == NULL )
        {
            requestClassLock( thisClass, PMX_CLASS_S_LOCK );
            cdChangeNodeType( schemaOutline, node, 1 );
        }
        else
            cdRetrieverExpandNode( schemaOutline, node );
    }
    /*
     *  Add our new node, and possibly its siblings, to the outline
     *  tree.
     */
    cdRetrieverListInsert( schemaOutline, node,
        subnode, NULL, NULL );
    /*
     * If we just added a leaf to a parent class that already had
     * other leaves open, we need to move it to the top of the
     * list, where pmx puts it.  The outline widget adds it to
     * the end of the list.
     */
    if ( needToMove == CD_TRUE )
    {
        for( leafnode = node->subclass; leafnode->next != NULL;
            leafnode = leafnode->next );
        cdRetrieverListMove( schemaOutline, leafnode, node->subclass );
    }

    /*
     *  Mark the moved node as being current.
     */
    storeSchemaClassHandle( pmx_getNullClassHandle() );
    node->subclass->nodeFlag = CD_FALSE;
    selectNewNode( schemaOutline, NULL, node->subclass );
    wNode = cdRetrieverSetCurrentLine( schemaOutline, node->subclass );

    freeOutlineNodes( subnode );
    /*
     *  Update the min and max values for the scrollbar.
     */
    XtVaGetValues( scrOutline, XmNverticalScrollBar, &scrlBar, NULL );
    XtVaGetValues( scrlBar,
        XmNminimum, &min,
        XmNmaximum, &max, NULL );
    numLines = countOpenNodes( cdRetrieverRoot( schemaOutline ) );
    XtVaSetValues( scrlBar, XmNincrement,
        ( ( max - min ) / numLines ), NULL );
    if ( wNode != NULL )
        XmScrollVisible( scrOutline, wNode, 0,
            ( ( max - min ) / numLines ) );

    cd_setBusyPointer( CD_FALSE );
}

/*------------------------------------------------------------------------
 *  checkAttributeDrop makes sure that the current class is the owner
 *  of the attribute being dragged.
 -----------------------------------------------------------------------*/
static cd_boolean
checkAttributeDrop( w, node )
    Widget w;
    t_cdRetrieverClass *node;
{
    pmx_dbHandle thisDB;
    pmx_classHandle thisClass, currentClass;
    pmx_attributeHandle thisAttribute;

    thisDB = cd_fetchSchemaDBHandle();
    currentClass = fetchSchemaClassHandle();
    thisAttribute = pmx_getIthAttribute( thisDB,
            currentClass, cd_fetchCurrentSchemaItem() );
    PMX_ASSERT( pmx_isNullAttributeHandle( thisAttribute ) == CD_FALSE );
    thisClass = pmx_getDefiningClassOfAttribute( thisDB, thisAttribute );
    if ( pmx_equalClassHandles( currentClass, thisClass ) == CD_TRUE )
        node->nodeFlag = CD_TRUE;
    return node->nodeFlag;
}
```

```
/*----------------------------------------------------------------------
    dragNode checks to see if the current node can be dropped on
    the node passed to us and returns a boolean as to the results.
------------------------------------------------------------------------*/
static void
dragNode( w, dragContext, node)
   Widget w;
   int dragContext;
   t_cdRetrieverClass *node;
{
    cd_boolean moveClass;
    pmx_dbHandle thisDB;
    pmx_classHandle thisClass, currentClass;
    pmx_classHandle dstParentClass, srcParentClass;

    /*
     * Save the type of drag-drop we're doing and assume its
     * going to fail.
     */
    moveClass = node->nodeFlag;
    node->nodeFlag = CD_FALSE;
    if ( node == current_node )
        return;

    /*
     * If the object being dragged is an attribute then check the
     * validity of it being dropped here.
     */
    if ( dragContext == _ATTRIBUTE )
    {
        checkAttributeDrop( w, node );
        return;
    }

#ifdef DEBUG
    if( showDrag )
        printf( "not current node\n" );
#endif
    thisDB = cd_fetchSchemaDBHandle();
    thisClass = *((pmx_classHandle*) &node->data);
    currentClass = fetchSchemaClassHandle();
    /*
     * If we're moving a class to a new parent then check to see
     * if this class qualifies.
     */
    if ( moveClass == CD_TRUE )
    {
        if ( pmx_checkMoveTree( thisDB, currentClass, thisClass ) == CD_TRUE )
            node->nodeFlag = CD_TRUE;
    }
    /*
     * Otherwise, if we're just rearranging make sure that our parent
     * is the same as the class being moved.
     */
    else
    {
        if ( pmx_equalClassHandles( pmx_getParentOfClass( thisDB, thisClass ),
                pmx_getParentOfClass( thisDB, currentClass ) ) == CD_TRUE )
        {
            node->nodeFlag = CD_TRUE;
#ifdef DEBUG
            if( showDrag )
                printf( "Its a sibling\n" );
#endif
        }
#ifdef DEBUG
        else if( showDrag )
            printf( "Its not a sibling - (%s) (%s)\n",
                current_node->name, node->name );
#endif
    }
}
/*----------------------------------------------------------------------
    dropNode moves the current selected node to the position currently
    occupied by the node  passed to the callback.
------------------------------------------------------------------------*/
typedef struct {
    Widget w;
    swidget attrParent;
    t_cdRetrieverClass *node;
} dnStruct;
static dnStruct dn;

static cd_boolean
dropNodeWorkProc( dnptr)
    dnStruct *dnptr;
{
    Widget w;
    Widget wNode;
    swidget attrParent;
    t_cdRetrieverClass *node;
    int iIndex;
    cd_boolean bStat;
    cd_boolean moveClass;
    pmx_dbHandle thisDB;
    pmx_classHandle rootClass;
    pmx_classHandle commonClass;
    pmx_classHandle thisClass, parentClass;
    pmx_classHandle currentClass, tmpClass;
    ClassPath *curClassPtr, *thisClassPtr;
    ClassPath *curPtr, *thisPtr;


    w = dnptr->w;
    attrParent = dnptr->attrParent;
    node = dnptr->node;
    /*
     * Save the type of drag-drop we're doing and assume its
     * going to fail.
     */
    moveClass = node->nodeFlag;
    node->nodeFlag = CD_FALSE;

    thisDB = cd_fetchSchemaDBHandle();
    thisClass = *((pmx_classHandle*) &node->data);
    currentClass = fetchSchemaClassHandle();

    if ( moveClass == CD_TRUE ) {

        rootClass = cd_getVirtualRoot( thisDB );
        if ( pmx_isNullClassHandle( rootClass ) == CD_TRUE )
            return CD_TRUE;
        /*
         *  Find the parent class of the to and from classes.
         */
        thisClassPtr = findClassPath( thisDB, rootClass, thisClass );
        ASSERT( thisClassPtr != NULL );
        curClassPtr = findClassPath( thisDB, rootClass, currentClass );
        ASSERT( curClassPtr != NULL );
        curPtr = curClassPtr;
        thisPtr = thisClassPtr;
        commonClass = pmx_getNullClassHandle();
        while( thisClassPtr != NULL && curClassPtr != NULL )
        {
            if ( pmx_equalClassHandles( thisClassPtr->thisClass,
                    curClassPtr->thisClass ) == CD_FALSE )
                break;
            commonClass = curClassPtr->thisClass;
            thisClassPtr = thisClassPtr->childClass;
            curClassPtr = curClassPtr->childClass;
        }
        releaseClassPath( curPtr );
        releaseClassPath( thisPtr );
        if ( pmx_isNullClassHandle( commonClass ) == CD_TRUE )
            return CD_TRUE;
#ifdef HUH
        /*
         *  Attempt to get an exclusive lock on this common class.
         */
        if ( requestClassLock( commonClass, PMX_TREE_X_LOCK ) == CD_FALSE ) {
            cd_setWindowBusy( schemaEditor, CD_FALSE );
            setSchemaEditorButtons(True);
            return CD_TRUE;
        }
#endif
        /*
```

```
        * If we're moving a class to a new parent then check to see
        * if this class qualifies.
        */
        if ( pmx_checkMoveTree( thisDB, currentClass, thisClass ) == CD_FALSE )
        {
            cd_setWindowBusy( schemaEditor, CD_FALSE );
            setSchemaEditorButtons(True);
#ifdef HUH
            releaseClassLock( commonClass, PMX_TREE_X_LOCK );
#endif
            return CD_TRUE;
        }
        /*
        * If so, then move the class in the knowledge base.  Squawk
        * if it fails.  If OK, then move it in the outline tree.
        */
        bStat = pmx_moveSubtree( thisDB, currentClass, thisClass, 0 );

        if ( bStat == CD_FALSE )
            schemaWarning( "Couldn't move class" );
        else
        {
            moveOutlineNode( thisDB, currentClass, thisClass, node );
            node->nodeFlag = CD_TRUE;
        }
#ifdef HUH
        releaseClassLock( commonClass, PMX_TREE_X_LOCK );
#endif

    } else {
        /*
        * If we're just rearranging make sure that our parent
        * is the same as the class being moved.
        */
        parentClass = pmx_getParentOfClass( thisDB, thisClass );
        if ( pmx_equalClassHandles( parentClass,
                pmx_getParentOfClass( thisDB, currentClass ) ) == CD_TRUE )
        {
#ifdef HUH
            /*
            *  Attempt to get an exclusive lock on this parent class.
            */
            if ( requestClassLock( parentClass, PMX_TREE_X_LOCK ) == CD_FALSE ) {
                cd_setWindowBusy( schemaEditor, CD_FALSE );
                setSchemaEditorButtons( True );
                return CD_TRUE;
            }
#endif
            /*
            * Find out where this class currently resides
            * in the subclass order.
            */
            for( iIndex = 0; ; iIndex++ )
            {
                tmpClass = pmx_getIthSubclass( thisDB, parentClass, iIndex );
                if ( pmx_isNullClassHandle( tmpClass ) == CD_TRUE )
                    return CD_TRUE;
                if ( pmx_equalClassHandles( thisClass, tmpClass )
                        == CD_TRUE )
                    break;
            }
            /*
            * Move the source class to this position.  If pmx OKs
            * the move then move it in the outline tree.
            */
            bStat = pmx_changeSubclassOrder( thisDB,
                parentClass, currentClass, iIndex );
            if ( bStat == CD_FALSE )
                schemaWarning( "Couldn't move class" );
            else
            {
                wNode = cdRetrieverListMove( schemaOutline,
                        current_node, node );
                node->nodeFlag = CD_TRUE;
                XmScrollVisible( scrOutline, wNode, 0, 10 );
            }
#ifdef HUH
            releaseClassLock( parentClass, PMX_TREE_X_LOCK );
#endif
        }
    }
    cd_setWindowBusy( schemaEditor, CD_FALSE );
    setSchemaEditorButtons( True );
    return CD_TRUE;
}
static void
dropNode( w, dropContext, node )
  Widget w;
  int dropContext;
  t_cdRetrieverClass *node;
{
    int iIndex;
    cd_boolean bStat;
    cd_boolean moveClass;
    pmx_dbHandle thisDB;
    pmx_classHandle thisClass, parentClass;
    pmx_classHandle currentClass, tmpClass;
    Widget wNode;

    /*
    * Save the type of drag-drop we're doing and assume its
    * going to fail.
    */
    if ( node == current_node )
        return;

    /*
    * If the object being dropped is an attribute then check the
    * validity of it being dropped here.
    */
    if ( dropContext == _ATTRIBUTE )
    {
        node->nodeFlag = CD_FALSE;
        if ( checkAttributeDrop( w, node ) == CD_TRUE )
        {
            thisClass = *((pmx_classHandle*) &node->data);
            if ( schemaMoveAttribute( thisClass ) == CD_FALSE )
                node->nodeFlag = CD_FALSE;
        }
        return;
    }
    setSchemaEditorButtons( False );
    cd_setWindowBusy( schemaEditor, CD_TRUE );
    dn.w = w;
    dn.attrParent = NULL;
    dn.node = node;
    /* XtAppAddWorkProc( UxAppContext, dropNodeWorkProc, (XtPointer)&dn ); */
    dropNodeWorkProc(&dn);
}

/*---------------------------------------------------------------------
    create_schemaOutline is called when the Schema Editor is first called.
    It builds the Outline Tree for the schema edit screen.
---------------------------------------------------------------------*/
static t_cdRetrieverClass *
create_schemaOutline(Parent)
    swidget Parent;
{
    int n;
    Arg args[10];
    cd_boolean status;
    t_cdRetrieverClass *Root, *root, *node;
    Pixmap folder, openfolder, sheet;
    pmx_classHandle rootClass;
    pmx_dbHandle thisDB;

    thisDB = cd_fetchSchemaDBHandle();
    if ( pmx_isNullDBHandle( thisDB ) == CD_TRUE )
        return NULL;
    rootClass = cd_getVirtualRoot( thisDB );
    if ( pmx_isNullClassHandle( rootClass ) == CD_TRUE )
        return NULL;

#ifdef HUH
    status = requestClassLock( rootClass, PMX_CLASS_S_LOCK );
    if ( status == CD_FALSE )
        return NULL;
    status = requestClassLock( rootClass, PMX_CLASS_S_LOCK );
```

```
    if ( status == CD_FALSE )
        return NULL;
#endif
    scrOutline = UxGetWidget( Parent );
    makeRootTree(&root, thisDB, rootClass);
    storeSchemaClassHandle( rootClass );
    node = root->subclass;
    root->subclass = NULL;

    folder = getPixFolder();
    openfolder = getPixOpenFolder();
    sheet = getPixSheet();

    n=0;
    XtSetArg(args[n],CDNRetrieverShowIcons, 1); n++;
    XtSetArg(args[n],CDNRetrieverData, root); n++;
    XtSetArg(args[n],CDNOpenPixmap, openfolder ); n++;
    XtSetArg(args[n],CDNClosedPixmap, folder ); n++;
    XtSetArg(args[n],CDNLeafPixmap, sheet ); n++;
    schemaOutline = cdCreateRetriever( scrOutline,
                        "schemaOutline", args, n);
    cdAddRetrieverCallback( schemaOutline, CDNSelectCallback,
                        selectNewNode, NULL );
    cdAddRetrieverCallback( schemaOutline, CDNExpandCallback,
                        expandNode, NULL );
    cdAddRetrieverCallback( schemaOutline, CDNDragCallback,
                        dragNode, NULL );
    cdAddRetrieverCallback( schemaOutline, CDNDropCallback,
                        dropNode, NULL );

    Root = cdRetrieverRoot( schemaOutline );
    cdRetrieverListInsert( schemaOutline, Root, node, NULL, NULL );

    root->subclass = node;
    freeOutlineNodes( root );
    return( cdRetrieverRoot( schemaOutline ) );
}

/*-----------------------------------------------------------------------
    update_schemaOutline is called when a new database is opened.
//  It removes the current Outline Tree and creates a new one.
-----------------------------------------------------------------------*/
void
update_schemaOutline(Parent)
    swidget Parent;
{
    t_cdRetrieverClass *root;

    if ( schemaOutline != NULL )
    {
        XtDestroyWidget( schemaOutline );
        schemaOutline = NULL;
    }

    root = create_schemaOutline( Parent );
    if ( root != NULL )
    {
        setSchemaClassName( root->name );
        storeSchemaClassNode( root );
    }
}
/*-----------------------------------------------------------------------
    findSchemaClass initializes the findClass routines and pops
    up the find class dialog.
-----------------------------------------------------------------------*/
void
findSchemaClass( myParent )
    swidget myParent;
{
    pmx_dbHandle thisDB;
    thisDB = cd_fetchSchemaDBHandle();

    if ( pmx_isNullDBHandle( thisDB ) == CD_TRUE )
        return;
    setupFindClass( thisDB, fetchSchemaClassNode(), schemaOutline, scrOutline,
        selectNewNode, requestClassLock );
    popup_findClassDialog( myParent );
}
/*-----------------------------------------------------------------------
//    This program is the confidential and proprietary product of CADIS, Inc.
//    Any unauthorized use, reproduction or transfer of this program
//    is strictly prohibited.
//              Copyright (C) 1994 by CADIS, Inc.
//
//  File name---
//    searchOutline.c
//
//  Purpose---
//    Sets up and manages display of the Outline tree on the Search
//    screen.
//
//  File modification history---
//  04-03-95    bterp   Added starting class.
//  03-15-95    vwheel  Added class locking.
//  01-26-95    vwheel  Add class find next / previous.
//  01-26-95    vwheel  Change displaySelectedCount to handle
//                      interruptable queries.
//  11-15-94    bterp   Fix problem with string select
//  03-04-03    bterp   Use ken's set descriptors.
//  03-30-94    bterp   Dim edit/display button if no parts found.
//                      Undim makepart when 0 parts found and no selectors.
//
//  Description---
//
-----------------------------------------------------------------------*/

#include <stdio.h>
#include "UxLib.h"
#include "string.h"

#include "memAlloc.h"
#include "outline.h"
#include "retrieve.h"

extern Pixmap getPixFolder();
extern Pixmap getPixOpenFolder();
extern Pixmap getPixSheet();

static Widget searchOutline;
static Widget scrOutline;
extern swidget mainWindowShell;
cd_boolean findStartingClass();
static void gotoNode();

static char *initErrorText = NULL;
void
setInitErrorText( text )
    char * text;
{
    if ( initErrorText != NULL ) {
        cd_memFree( initErrorText );
    }
    initErrorText = cd_memAlloc( strlen(text) + 1 );
    strcpy( initErrorText, text );
}
char *
getInitErrorText()
{
    return initErrorText;
}
/*-----------------------------------------------------------------------
//  displaySelectedCount applies the current query and updates the
//  displayed selection count.
-----------------------------------------------------------------------*/
void
displaySelectedCount( )
{
    long resultCount;
    cd_boolean wasCanceled;
    pmx_queryResultHandle thisResult;

    cd_setBusyPointer( CD_TRUE );
    wasCanceled = cd_doQuery( CD_FALSE, &thisResult );
    resultCount = cd_getResultCount();
    if ( wasCanceled == CD_TRUE )
    {
```

```
        cd_setNewPart( CD_FALSE );
        resultCount = -1;
    }
    else
        cd_setNewPart( resultCount == 0 );
    cd_setEditButton( resultCount != 0 );
    cd_setSearchButton( resultCount != 0 );
    setSelectedCount( resultCount );
    cd_setBusyPointer( CD_FALSE );
}

/*---------------------------------------------------------------------
    classLockFailed composes a message for a class lock failure and
    pops up a dialog saying it.
---------------------------------------------------------------------*/
void
classLockFailed( sw, thisClass )
    swidget sw;
    pmx_classHandle thisClass;
{
    char sMsg[256];
    char sBuf[256];
    cd_boolean pmxStatus;
    pmx_classDescriptor * thisDescr;

    strcpy( sBuf, (void*)pmx_getErrorText( pmx_getErrorCode() ) );
    thisDescr = pmx_getClassDescriptor( cd_fetchDBHandle(), thisClass );
    PMX_ASSERT( thisDescr != NULL );
    sprintf( sMsg, "Class %s\n%s", thisDescr->className, sBuf );
    popup_warningDialog( sw, sMsg, "CADIS-PMX" );
    pmxStatus = pmx_freeClassDescriptor( thisDescr );
    PMX_ASSERT( pmxStatus == CD_TRUE );
}

/*---------------------------------------------------------------------
    requestClassLock requests a class share lock for the specified class
    and reports the results.
---------------------------------------------------------------------*/
static cd_boolean
requestClassLock( thisClass )
    pmx_classHandle thisClass;
{
    cd_boolean status;
#ifdef DEBUG
    {
        pmx_classDescriptor * thisDescr;

        thisDescr = pmx_getClassDescriptor( cd_fetchDBHandle(), thisClass );
        printf( "Requested class lock for %s\n", thisDescr->className );
        pmx_freeClassDescriptor( thisDescr );
    }
#endif
    status = pmx_requestLock( cd_fetchDBHandle(), cd_fetchLockHolder(),
        thisClass, PMX_CLASS_S_LOCK );
    if ( status == CD_FALSE )
        classLockFailed( mainWindowShell, thisClass );
    return status;
}

/*---------------------------------------------------------------------
    releaseClassLock releases a class share lock for the specified class
    and reports the results.
---------------------------------------------------------------------*/
static void
releaseClassLock( thisClass )
    pmx_classHandle thisClass;
{
    cd_boolean status;
    pmx_classDescriptor * thisDescr;

#ifdef DEBUG
    {
        thisDescr = pmx_getClassDescriptor( cd_fetchDBHandle(), thisClass );
        printf( "Released class lock for %s\n", thisDescr->className );
        pmx_freeClassDescriptor( thisDescr );
    }
#endif
    status = pmx_releaseLock( cd_fetchDBHandle(), cd_fetchLockHolder(),
        thisClass, PMX_CLASS_S_LOCK );
    if ( status == CD_FALSE )
    {
        char sMsg[255];
        char sBuf[255];

        strcpy( sMsg, (void*)pmx_getErrorText( pmx_getErrorCode() ) );
        thisDescr = pmx_getClassDescriptor( cd_fetchDBHandle(), thisClass );
        sprintf( sBuf, "Class %s\n%s", thisDescr->className, sMsg );
        pmx_freeClassDescriptor( thisDescr );
        popup_pmxErrorDialog( mainWindowShell, sBuf );
    }
}

/*---------------------------------------------------------------------
/   lockClassPath iterates up a class tree attempting to lock each
/   class along the way. Only lock the path - not the class itself.
---------------------------------------------------------------------*/
cd_boolean
lockClassPath()
{
    pmx_dbHandle thisDB;
    pmx_classHandle rootClass, childClass;
    pmx_classHandle parentClass;

    thisDB = cd_fetchDBHandle();
    rootClass = cd_getVirtualRoot( thisDB );
    childClass = cd_fetchClassHandle();
    while ( pmx_equalClassHandles( childClass, rootClass) == CD_FALSE ) {
        parentClass = pmx_getParentOfClass( thisDB, childClass );
        if ( requestClassLock( parentClass ) == CD_FALSE ) {
            /* don't we need to unwind this if we fail? */
            return CD_FALSE;
        }
        childClass = parentClass;
    }
    return ( CD_TRUE );
}

/*---------------------------------------------------------------------
/   freeOutlineNodes iterates and recurses through a linked list of
/   nodes built to update an outline tree and frees all the allocated memory.
---------------------------------------------------------------------*/
void
freeOutlineNodes( root )
    t_cdRetrieverClass *root;
{
    t_cdRetrieverClass *node, *nodenext;

    for( node = root; node != NULL; node = nodenext )
    {
        nodenext = node->next;
        if ( node->subclass != NULL )
            freeOutlineNodes( node->subclass );
        if ( node->name != NULL )
            cd_memFree( node->name );
        cd_memFree( node );
    }
}

/*---------------------------------------------------------------------
/   makeRootTree builds the structure for the Root class and its immediate
/   subclasses for the outline tree.
---------------------------------------------------------------------*/
void
makeRootTree( root, thisDB, rootClass )
    t_cdRetrieverClass **root;
    pmx_dbHandle thisDB;
    pmx_classHandle rootClass;
{
    long i;
    long scCount;
    t_cdRetrieverClass *node, *nextnode;
    cd_boolean pmxStatus;
    pmx_classHandle thisClass;
    pmx_classDescriptor * subDescr;
    pmx_classDescriptor * thisDescr;
    pmx_classDescriptorSet *descSet;

    thisDescr = pmx_getClassDescriptor( thisDB, rootClass );
```

```
    PMX_ASSERT( thisDescr != NULL );

    node = (t_cdRetrieverClass *)cd_memAlloc( sizeof(t_cdRetrieverClass) );
    node->name = (char*)cd_memAlloc( strlen(thisDescr->className) + 1 );
    strcpy( node->name, thisDescr->className );
    node->data = (void*) *((long*) &rootClass);
    node->next =NULL;
    *root = node;

    descSet = pmx_getClassDescriptorSet( thisDB, rootClass );
    PMX_ASSERT( descSet != NULL );
    /* this is the subclasscount */
    scCount = descSet->count;
    if ( scCount == 0 ) {
        node->nodeType=LEAFSHEET;
    } else {
        node->nodeType=OPENFOLDER;
    }
    node->subclass = NULL;

    for(i = 0; i < scCount; i++)
    {
        thisClass = descSet->descriptors[i]->classHandle;

        PMX_ASSERT( pmx_isNullClassHandle( thisClass ) == CD_FALSE );
        nextnode = (t_cdRetrieverClass *)cd_memAlloc(
                    sizeof(t_cdRetrieverClass) );
        if (i == 0)
            (*root)->subclass = nextnode;
        else
            node->next = nextnode;
        node = nextnode;
        subDescr = descSet->descriptors[i];
        PMX_ASSERT( subDescr != NULL );
        node->name = (char*)cd_memAlloc( strlen(subDescr->className) + 1 );
        strcpy( node->name, subDescr->className );
        node->data = (void*) *((long*) &thisClass);
        if ( subDescr->subclassCount > 0 )
            node->nodeType=CLOSEDFOLDER;
        else
            node->nodeType = LEAFSHEET;
        node->next = NULL;
        node->subclass = NULL;
    }
    pmxStatus = pmx_freeClassDescriptorSet( descSet );
    PMX_ASSERT( pmxStatus == CD_TRUE );
    pmxStatus = pmx_freeClassDescriptor( thisDescr );
    PMX_ASSERT( pmxStatus == CD_TRUE );
}

/*---------------------------------------------------------------------
// makeSubTree builds the structure for the immediate subclasses of the
// current class for updating the outline tree.
---------------------------------------------------------------------*/
void
makeSubTree( root, thisDB, rootClass )
    t_cdRetrieverClass *root;
    pmx_dbHandle thisDB;
    pmx_classHandle rootClass;
{
    long i;
    t_cdRetrieverClass *node, *nextnode;
    cd_boolean pmxStatus;
    pmx_classHandle thisClass;
    pmx_classDescriptor * subDescr;
    pmx_classDescriptor * thisDescr;
    pmx_classDescriptorSet *descSet;
    long scCount;

    thisDescr = pmx_getClassDescriptor( thisDB, rootClass );
    PMX_ASSERT( thisDescr != NULL );

    descSet = pmx_getClassDescriptorSet( thisDB, rootClass );
    PMX_ASSERT( descSet != NULL );
    /* this is the subclasscount */
    scCount = descSet->count;

    node = NULL;

    for(i = 0; i < scCount; i++)
    {
        thisClass = descSet->descriptors[i]->classHandle;
        PMX_ASSERT( pmx_isNullClassHandle( thisClass ) == CD_FALSE );
        nextnode = (t_cdRetrieverClass *)cd_memAlloc(
                    sizeof(t_cdRetrieverClass) );
        if (i == 0)
            root->subclass = nextnode;
        else
            node->next = nextnode;
        node = nextnode;
        subDescr = descSet->descriptors[i];
        PMX_ASSERT( subDescr != NULL );
        node->name = (char*)cd_memAlloc( strlen(subDescr->className) + 1 );
        strcpy( node->name, subDescr->className );
        node->data = (void*) *((long*) &thisClass);
        node->next = NULL;
        node->subclass = NULL;
        if ( subDescr->subclassCount > 0 )
            node->nodeType = CLOSEDFOLDER;
        else
            node->nodeType = LEAFSHEET;
    }
    pmxStatus = pmx_freeClassDescriptorSet( descSet );
    PMX_ASSERT( pmxStatus == CD_TRUE );
    pmxStatus = pmx_freeClassDescriptor( thisDescr );
    PMX_ASSERT( pmxStatus == CD_TRUE );
}

/*---------------------------------------------------------------------
// fetchClassNode returns the current class node.
---------------------------------------------------------------------*/
static t_cdRetrieverClass *current_node;

static t_cdRetrieverClass *
fetchClassNode()
{
    return current_node;
}

/*---------------------------------------------------------------------
// storeClassNode saves away the current class node.
---------------------------------------------------------------------*/
static void
storeClassNode( thisNode )
t_cdRetrieverClass *thisNode;
{
    current_node = thisNode;
}

/*---------------------------------------------------------------------
/ countOpenNodes recurses through the outline tree and counts
/ the number of lines that are open. This is used to set the
/ scrollbar increment.
---------------------------------------------------------------------*/
static long
countOpenNodes( root )
    t_cdRetrieverClass *root;
{
    t_cdRetrieverClass *node, *nodenext;
    long count = 0;

    for( node = root; node != NULL; node = nodenext )
    {
        nodenext = node->next;
        if ( node->nodeType == OPENFOLDER && node->subclass != NULL )
            count += countOpenNodes( node->subclass );
        count++;
    }
    return count;
}

/*---------------------------------------------------------------------
/ unlockClosedNodes recurses through a closed tree and unlocks any
/ nodes that were previously open.
---------------------------------------------------------------------*/
static void
unlockClosedNodes( root )
    t_cdRetrieverClass *root;
```

```
{
    t_cdRetrieverClass *node, *nodenext;

    for( node = root; node != NULL; node = nodenext )
    {
        nodenext = node->next;
        if ( node->nodeType == OPENFOLDER && node->subclass != NULL )
        {
            releaseClassLock( *((pmx_classHandle*) &node->data) );
            unlockClosedNodes( node->subclass );
        }
    }
}

/*-----------------------------------------------------------------------
    selectNewNode is called from an Outline callback when a new PMX
    class is selected.  It updates the attributes display and resets
    the current query.
-----------------------------------------------------------------------*/
static cd_boolean
selectNewNode( w, attrParent, node)
    Widget w;
    swidget attrParent;
    t_cdRetrieverClass *node;
{
    cd_boolean status;
    long sameAttributes;
    pmx_classHandle prevClass;
    pmx_classHandle thisClass;

    thisClass = *((pmx_classHandle*) &node->data);
    prevClass = cd_fetchClassHandle();
    if ( pmx_equalClassHandles( prevClass, thisClass) == CD_FALSE )
    {
        status = requestClassLock( thisClass );
        if ( status == CD_FALSE )
        {
            if ( node->nodeType == OPENFOLDER ) {
                cdChangeNodeType( searchOutline, node, CLOSEDFOLDER );
            }
            if ( pmx_isNullClassHandle( prevClass ) == CD_FALSE )
                gotoNode( fetchClassNode() );
            return CD_FALSE;
        }
        releaseClassLock( prevClass );

        cd_setBusyPointer( CD_TRUE );
        cd_storeClassHandle( thisClass );
        storeClassNode( node );
        sameAttributes = update_searchAttributes( attrParent, prevClass );
        update_externAttributes();
        cd_updQuery( thisClass, sameAttributes );
        cd_setBusyPointer( CD_FALSE );
        displaySelectedCount();
    }
    return CD_TRUE;
}

/*-----------------------------------------------------------------------
    expandNode is called when a node on the outline tree is expanded.
    It checks to see if the outline needs to be updated with subclasses
    to the current class.
-----------------------------------------------------------------------*/
static void
expandNode( w, attrParent, node)
    Widget w;
    swidget attrParent;
    t_cdRetrieverClass *node;
{
    int min, max, numLines;
    Widget scrlBar;
    cd_boolean status;
    t_cdRetrieverClass *subnode;
    t_cdRetrieverClass *nextnode;
    pmx_classHandle thisClass;

    if ( selectNewNode( w, attrParent, node ) == CD_FALSE )
        return;
    thisClass = *((pmx_classHandle*) &node->data);
    if ( node->subclass == NULL )
    {
        cd_setBusyPointer( CD_TRUE );
        makeSubTree( node, cd_fetchDBHandle(), thisClass );
        subnode = node->subclass;
        node->subclass = NULL;
        cdRetrieverListInsert( w, node, subnode, NULL, NULL );
        freeOutlineNodes( subnode );
        cd_setBusyPointer( CD_FALSE );
    }
    if ( node->nodeType == OPENFOLDER ) {
        if ( requestClassLock( thisClass ) == CD_FALSE ) {
            cdChangeNodeType( searchOutline, node, CLOSEDFOLDER );
        }
    } else if ( node->nodeType == CLOSEDFOLDER )
    {
        releaseClassLock( thisClass );
        if ( node->subclass != NULL ) {
            extern myRetrieverListDelete();
            subnode = node->subclass;
            unlockClosedNodes( node->subclass );

            while ( subnode != NULL ) {
                nextnode = subnode->next;
                myRetrieverListDelete( w, subnode );
                    subnode = nextnode;
            }

            freeOutlineNodes( subnode );
        }
        node->subclass = NULL;
    }

    XtVaGetValues( scrOutline, XmNverticalScrollBar, &scrlBar, NULL );
    XtVaGetValues( scrlBar,
        XmNminimum, &min,
        XmNmaximum, &max, NULL );
    numLines = countOpenNodes( cdRetrieverRoot( searchOutline ) );
    XtVaSetValues( scrlBar, XmNincrement,
        ( ( max - min ) / numLines ), NULL );
}

/*-----------------------------------------------------------------------
/   create_searchOutline is called when the main shell is created to
/   build the Outline Tree for the search screen.  It also initializes
/   the Root query.
-----------------------------------------------------------------------*/
cd_boolean
create_searchOutline(Parent, attrParent)
    swidget Parent, attrParent;
{
    int n;
    Arg args[10];
    t_cdRetrieverClass *root;
    Pixmap folder, openfolder, sheet;
    cd_boolean status;
    pmx_dbHandle thisDB;
    pmx_classHandle thisClass;

    thisClass = cd_fetchClassHandle();
    thisDB = cd_fetchDBHandle();
    if ( pmx_isNullDBHandle( thisDB ) == CD_TRUE ||
            pmx_isNullClassHandle( thisClass ) == CD_TRUE ) {
        return CD_TRUE;
    }

    status = pmx_requestLock( cd_fetchDBHandle(), cd_fetchLockHolder(),
        thisClass, PMX_CLASS_S_LOCK );
    if ( status == CD_FALSE ) {
        char msg[256];
        pmx_classDescriptor * thisDescr;

        thisDescr = pmx_getClassDescriptor( cd_fetchDBHandle(), thisClass );

        sprintf( msg, "Class %s\n%s", thisDescr->className,
            pmx_getErrorText( pmx_getErrorCode() ) );
        setInitErrorText( msg );
        status = pmx_freeClassDescriptor( thisDescr );
        return CD_FALSE;
```

```
    }

    scrOutline = UxGetWidget( Parent );
    makeRootTree(&root, thisDB, thisClass);

    folder = getPixFolder();
    openfolder = getPixOpenFolder();
    sheet = getPixSheet();

    n=0;
    XtSetArg(args[n],CDNRetrieverShowIcons, 1); n++;
    XtSetArg(args[n],CDNRetrieverData, root); n++;
    XtSetArg(args[n],CDNOpenPixmap, openfolder ); n++;
    XtSetArg(args[n],CDNClosedPixmap, folder ); n++;
    XtSetArg(args[n],CDNLeafPixmap, sheet ); n++;
    searchOutline = cdCreateRetriever( scrOutline,
                        "searchOutline", args, n);
    cdAddRetrieverCallback( searchOutline, CDNSelectCallback,
                        selectNewNode, attrParent );
    cdAddRetrieverCallback( searchOutline, CDNExpandCallback,
                        expandNode, NULL );

    freeOutlineNodes( root );
    cd_initQuery();
    cd_newQuery( thisClass );
    storeClassNode( cdRetrieverRoot( searchOutline ) );
    displaySelectedCount( );

    /*
    status = pmx_releaseLock( thisDB, cd_fetchLockHolder(),
        thisClass, PMX_CLASS_S_LOCK );
    */
    return (findStartingClass());
}

/*---------------------------------------------------------------------
/   update_searchOutline is called when a new database is opened.
/   It removes the current Outline Tree and creates a new one.
---------------------------------------------------------------------*/
void
update_searchOutline(Parent, attrParent)
    swidget Parent, attrParent;
{
    if ( searchOutline != NULL )
    {
        XtDestroyWidget( searchOutline );
        searchOutline = NULL;
    }

    create_searchOutline( Parent, attrParent );
}

/*---------------------------------------------------------------------
/   findClassNode recurses through the node descriptors looking for one
/   that matches our target class.  It returns a pointer to the found node
/   or NULL if not found.
---------------------------------------------------------------------*/
static t_cdRetrieverClass *
findClassNode( currentNode, classPtr )
    t_cdRetrieverClass *currentNode;
    ClassPath *classPtr;
{
    pmx_classHandle thisClass;
    t_cdRetrieverClass *node, *subnode, *nodenext;

    for( node = currentNode; node != NULL; node = nodenext )
    {
        thisClass = *((pmx_classHandle*) &node->data);
        if ( pmx_equalClassHandles( thisClass, classPtr->thisClass) == CD_TRUE )
        {
            if ( classPtr->childClass != NULL )
            {
                if ( node->nodeType == CLOSEDFOLDER &&
                        requestClassLock( thisClass ) == CD_FALSE )
                    return NULL;
                if ( node->subclass == NULL )
                {
                    makeSubTree( node, cd_fetchDBHandle(), thisClass );
                    subnode = node->subclass;
                    node->subclass = NULL;
                    cdChangeNodeType( searchOutline, node, OPENFOLDER );
                    cdRetrieverListInsert( searchOutline, node,
                        subnode, NULL, NULL );
                    freeOutlineNodes( subnode );
                }
                else if ( node->nodeType == CLOSEDFOLDER )
                    cdRetrieverExpandNode( searchOutline, node );
                node = findClassNode( node->subclass, classPtr->childClass );
            }

            break;
        }

        nodenext = node->next;
    }
    return node;
}

static void
gotoNode( classNode )
    t_cdRetrieverClass *classNode;
{
    Widget wNode;

    wNode = cdRetrieverSetCurrentLine( searchOutline, classNode );
    XmScrollVisible( scrOutline, wNode, 0, 10 );
}

/*---------------------------------------------------------------------
/   showClassOutline searches for the position of a given class in the
/   outline widget and makes it the current class.  It starts from the
/   orig Node and Class.
---------------------------------------------------------------------*/
static cd_boolean
showClassOutline( origNode, origClass, targetClass )
    t_cdRetrieverClass *origNode;
    pmx_classHandle origClass;
    pmx_classHandle targetClass;
{
    cd_boolean bRet = CD_FALSE;
    t_cdRetrieverClass *classNode;
    ClassPath *classPtr;

    classPtr = findClassPath( cd_fetchDBHandle(), origClass, targetClass );
    ASSERT( classPtr != NULL );
    classNode = findClassNode( origNode, classPtr );
    if ( classNode != NULL )
    {
        gotoNode( classNode );
        selectNewNode( searchOutline, NULL, classNode );
        bRet = CD_TRUE;
    }
    releaseClassPath( classPtr );
    return bRet;
}

void
gotoClassLine( targetClass )
    pmx_classHandle targetClass;
{
    showClassOutline( fetchClassNode(), cd_fetchClassHandle(),
        targetClass );
}

/*---------------------------------------------------------------------
/   lockClassTree tries to acquire a Tree Lock for
/   the specified class.
---------------------------------------------------------------------*/
cd_boolean
lockClassTree( thisClass, lockType )
    pmx_classHandle thisClass;
    int lockType;
{
    cd_boolean status;
    pmx_dbHandle thisDB;
    pmx_lockType lType;

    thisDB = cd_fetchDBHandle();
```

```
    if ( pmx_isNullDBHandle( thisDB ) == CD_TRUE )
        return False;
    lType = ( lockType == 0 ) ? PMX_TREE_S_LOCK :
        ( ( lockType == 1 ) ? PMX_TREE_U_LOCK : PMX_TREE_X_LOCK );
    status = pmx_requestLock( thisDB, cd_fetchLockHolder(),
        thisClass, lType );
    if ( status == CD_FALSE )
        classLockFailed( mainWindowShell, thisClass );
    return status;
}

/*---------------------------------------------------------------------------
    lockCurrentClassTree tries to acquire a Tree Lock for
    the current class.
---------------------------------------------------------------------------*/
cd_boolean
lockCurrentClassTree( lockType )
    int lockType;
{
    pmx_classHandle thisClass;

    thisClass = cd_fetchClassHandle();
    if ( pmx_isNullClassHandle( thisClass ) == CD_TRUE )
        return False;
    return( lockClassTree( thisClass, lockType ) );
}

/*---------------------------------------------------------------------------
    unlockClassTree releases the tree lock for
    the specified class.
---------------------------------------------------------------------------*/
void
unlockClassTree( thisClass, lockType )
    pmx_classHandle thisClass;
    int lockType;
{
    cd_boolean status;
    pmx_dbHandle thisDB;
    pmx_lockType lType;

    thisDB = cd_fetchDBHandle();
    if ( pmx_isNullDBHandle( thisDB ) == CD_TRUE )
        return;
    lType = ( lockType == 0 ) ? PMX_TREE_S_LOCK :
        ( ( lockType == 1 ) ? PMX_TREE_U_LOCK : PMX_TREE_X_LOCK );
    status = pmx_releaseLock( thisDB, cd_fetchLockHolder(),
        thisClass, lType );
    if ( status == CD_FALSE )
        pmxWarning( "Error releasing tree lock" );
}

/*---------------------------------------------------------------------------
    unlockCurrentClassTree release the tree lock for
    the current class.
---------------------------------------------------------------------------*/
void
unlockCurrentClassTree( lockType )
    int lockType;
{
    pmx_classHandle thisClass;

    thisClass = cd_fetchClassHandle();
    if ( pmx_isNullClassHandle( thisClass ) == CD_FALSE )
        unlockClassTree( thisClass, lockType );
}

/*---------------------------------------------------------------------------
    findSearchClass initializes the findClass routines and pops
    up the find class dialog.
---------------------------------------------------------------------------*/
void
findSearchClass( myParent )
    swidget myParent;
{
    pmx_dbHandle thisDB;
    thisDB = cd_fetchDBHandle();

    if ( pmx_isNullDBHandle( thisDB ) == CD_TRUE )
        return;
    setupFindClass( thisDB, fetchClassNode(), searchOutline, scrOutline,
        selectNewNode, requestClassLock );
    popup_findClassDialog( myParent );
}

/*---------------------------------------------------------------------------
/   findStartingClass performs a class search using the text pattern given us
---------------------------------------------------------------------------*/
cd_boolean
findStartingClass(  )
{
    cd_boolean status;
    pmx_dbHandle thisDB;
    pmx_classHandle thisClass;
    pmx_classHandle origClass;
    t_cdRetrieverClass *o_find_node;
    pmx_classHandle o_find_class;

    extern pmx_classHandle cd_fetchStartingClassHandle();

    thisDB = cd_fetchDBHandle();

    if ( pmx_isNullDBHandle( thisDB ) == CD_TRUE )
        return CD_FALSE;
    o_find_class = cd_fetchClassHandle();
    o_find_node = fetchClassNode();

    origClass = cd_fetchStartingClassHandle();

    status = pmx_requestLock( cd_fetchDBHandle(), cd_fetchLockHolder(),
        origClass, PMX_CLASS_S_LOCK );
    if ( status == CD_FALSE ) {
        char msg[256];
        char *errorText;
        pmx_classDescriptor * thisDescr;
        errorText = pmx_getErrorText( pmx_getErrorCode() );
        thisDescr = pmx_getClassDescriptor( cd_fetchDBHandle(), origClass );

        sprintf( msg, "Starting class %s\n%s", thisDescr->className,
            errorText );
        setInitErrorText( msg );
        status = pmx_freeClassDescriptor( thisDescr );
        return CD_FALSE;
    }

    /* now open the tree to the found class */
    if ( pmx_equalClassHandles( origClass, o_find_class ) == CD_FALSE ) {
        if ( showClassOutline( o_find_node, o_find_class, origClass ) == CD_FALSE
            /* error */
        }

    }
    status = pmx_releaseLock( thisDB, cd_fetchLockHolder(),
        origClass, PMX_CLASS_S_LOCK );
    return CD_TRUE;
}
cd_boolean
cd_putStartingClass( thisClass )
    pmx_classHandle thisClass;
{
    char classBuf [100];
    pmx_dbHandle thisDB;
    cd_boolean status;

    thisDB = cd_fetchDBHandle();

    sprintf( classBuf, "%ld", thisClass.classHandle );

    status = pmx_addDatabaseStartingClassPath(
        cd_getUserName(),
        cd_fetchDBName(),
        classBuf );

    return ( status );
}
void
changeStartingClass()
{
```

```
pmx_classDescriptor * thisDescr;
pmx_classHandle selectedClass;
char msg[2048];
cd_boolean status;

selectedClass = cd_fetchClassHandle();

thisDescr = pmx_getClassDescriptor( cd_fetchDBHandle(), selectedClass );

sprintf( msg, "Make class %s the starting class?\n", thisDescr->className );

status = popup_confDialog( mainWindowShell,
        msg, "CADIS-PMX", "Yes", "No" );

if ( status == CD_TRUE ) {
    cd_putStartingClass( selectedClass );
}
status = pmx_freeClassDescriptor( thisDescr );

}
```

APPENDIX C

```
//---------------------------------------------------------------------------
//      This program is the confidential and proprietary product of CADIS, Inc.
//      Any unauthorized use, reproduction or transfer of this program
//      is strictly prohibited.
//                  Copyright (C) 1995 by CADIS, Inc.
//
//   File name---
//     lockmgr.hxx
//
//   Purpose---
//     Class declarations for the lock manager.
//
//   File modification history---
//     95-03-08  bheiny  Add lock holders.
//     95-02-22  bheiny  Revise warm start for locking.
//     95-02-10  bheiny  New code.
//
//   Description---
//     This file contains the class headers for the lock manager class,
//     cd_lockManager.
//---------------------------------------------------------------------------

#ifndef CD_LOCKMGR_HXX
#define CD_LOCKMGR_HXX

#include "config.h"

// System include files---


// Local include files---
#include "pmxtypes.h"
#include "pmxundoc.h"
#include "dcmenv.hxx"
#include "handlmgr.hxx"
#include "filemgr.hxx"
#include "pmxerrs.hxx"


// The current lock owner to which we refer in all the lock testing.
// We don't put this in the environment since it's a second argument
// that the connection manager didn't strip off.  But, let's strip
// it off in each API function and put both the user-id and lock holder
// into a static in the lock manager class.  I'll define a macro
// like in the environment to make referencing the lock owner simpler.
#define LOCKOWNER (cd_lockManager::lockOwner)

// The special lock holder == -1L means to ignore the lock holder
// for ownership tests.  This is required for the API edit function
// testing which does not distinguish among lock holders and for
// the releaseAllLocks that occurs when a connection is closed.
static pmx_lockHolderHandle ignoreLockHolder = ( -1L );

// The owner of a lock is the pair ( USERID, lockHolder )
struct cd_lockOwner {
    cd_serverKey          userID;
    pmx_lockHolderHandle lockHolder;

    int operator==( cd_lockOwner & rhs ) {
        return this->userID == rhs.userID &&
             ( this->lockHolder == rhs.lockHolder ||
               this->lockHolder == ignoreLockHolder ||
               rhs.lockHolder == ignoreLockHolder );
    }
    int operator!=( cd_lockOwner & rhs ) {
        return ! ( *this == rhs );
    }
};


class cd_lockManager {

  public:

    // The constructor.

    cd_lockManager();

    // The destructor.

    ~cd_lockManager();

    // API functions.

    cd_boolean requestLock(
            pmx_lockHolderHandle  lockHolder,
            pmx_classHandle       thisClass,
            pmx_lockType          lockType );

    cd_boolean checkSelfConflictLock(
            pmx_lockHolderHandle  lockHolder,
            pmx_classHandle       thisClass,
            pmx_lockType          lockType );

    cd_boolean releaseLock(
            pmx_lockHolderHandle  lockHolder,
            pmx_classHandle       thisClass,
            pmx_lockType          lockType );

    cd_boolean releaseAllLocks(
            pmx_lockHolderHandle  lockHolder,
            pmx_classHandle       thisClass );

    cd_boolean releaseAllLocksOfType(
            pmx_lockHolderHandle  lockHolder,
            pmx_classHandle       thisClass,
            pmx_lockType          lockType );

    pmx_lockDescriptor CD_FAR * getLockDescriptor(
            pmx_lockHolderHandle  lockHolder,
            pmx_classHandle       thisClass );

    static cd_boolean freeLockDescriptor(
            pmx_lockDescriptor CD_FAR * thisDescriptor );

    pmx_lockMode getLockMode(
            pmx_lockHolderHandle  lockHolder,
            pmx_classHandle       thisClass,
            cd_boolean            self );

    // Dumping functions.

    cd_boolean dumpLocks(
            pmx_classHandle thisClass ) const;

    // Dump all the locks for this class manager that are significant.
    cd_boolean dumpDBLocks() const;

    // Dump all the locks for this class manager whether or not
    // the class is locked.
    cd_boolean dumpAllDBLocks() const;

    // Public helpers.

    // These functions are used by the class manager editing functions
    // to validate the presence of proper locks before proceeding with
    // the knowledge base change.

    // Is the class under the influence of an exclusive (schema edit lock)?
    cd_boolean isXLocked(
        pmx_classHandle thisClass );

    // Is the parent of the class under the influence of an
    // exclusive (schema edit lock)?
    // NOTE: the parent of the root is defined to be the root
    // itself.  Thus, the callers of this function doesn't
    // have to worry about calling them it the root.
    //
    // The purpose for this convention is specifically for API calls
    // which require a lock on the parent.  Then, we don't have to
    // check for the special case.  For example, the call to change
    // a class name requires a TXL on the parent.  For the root, this
    // is a TXL on the parent of the root, which is the root itself.

    cd_boolean isParentXLocked(
        pmx_classHandle thisClass );

    // Is the class under the influence of an update (instance edit lock)?
```

```
    // Of course, this implies either an X or U lock.
    cd_boolean isULocked(
        pmx_classHandle thisClass );

    // For unit editing, an X lock on the root is required.  This
    // just makes the check look simpler.
    cd_boolean isUnitLocked() {
        return isXLocked( CLASSMGR->getRoot() );
    }

    // Two public functions so that the cd_classLock code can
    // navigate the schema and find other locks.

    // Find the class lock object for the given class.  If the class
    // handle isn't present, it is inserted in the correct place and
    // the pointer a new object is returned.
    cd_classLock CD_FAR * lookup(
        pmx_classHandle thisClass );

    // The list of class locks.
    const cd_classLockList CD_FAR & getClassLockList() const {
        return classLocks;
    }

    // This function is called when a data base is warm started.  We
    // prefill the lock table with all known class handles.  Later,
    // as classes are added and deleted, the lock table may grow and
    // shrink.  Classes are added by the lookup function when they
    // are first looked up.  The class manager deleteClass function
    // is reponsible for informing the lock manager of the deletion.
    // One argument is the class manager pointer.  This is needed
    // because the DCM environment has not yet been set up.
    cd_boolean warmStart(
        cd_classManager CD_FAR * theClassManager,
        cd_warmStartMode         warmStartMode );

    // This function is called when a class is deleted.  We remove
    // the class lock object from the table.  A fatal error is generated
    // upon a request to delete a class that is not present.
    cd_boolean deleteClass(
        pmx_classHandle thisClass );

    // This function is called when all the locks for a connection
    // are released.  This happens when a connection is closed.  Otherwise,
    // the user is expected to release locks by lock holder.
    cd_boolean releaseAllLocks(
            pmx_classHandle thisClass );

    // A global for the lock owner which everyone can reference.
    static cd_lockOwner lockOwner;

private:

    // The list of per class locks.  This list is kept ordered by
    // class handle for quick lookup.  We keep the classLock object
    // around, even when the class isn't locked, just to save the
    // cost of inserting and deleting from the list too frequently.

    cd_classLockList classLocks;

    // Some helpers.

    // Find the index for a class lock object in the classLocks
    // list.  The return is CD_TRUE or CD_FALSE depending on the
    // success of the look up.  The index is the location of the
    // lock object in the list.  If the return was CD_FALSE, then
    // the index is the point for insertion.
    cd_boolean findIt(
        pmx_classHandle thisClass,
        long CD_FAR &   index ) const;

    // Release all the locks in a subtree (this function is recursive).
    void releaseLocksInSubtree(
        pmx_classHandle thisClass );

    // Release all the locks of the given type in a subtree (this
    // function is recursive).
    void releaseLocksInSubtree(
        pmx_classHandle thisClass,
        pmx_lockType    lockType );
};

// The data structure which records a lock by a single client.
// The lock object is not very intelligent.  It is used for
// recording data, but doesn't really know how to behave.
// QUESTION:  Should this object be smarter?  Should it self-
//     destruct when the lock count goes to zero?

class cd_lock {

  public:

    // The constructor sets the owner and lock type.
    // The use count is set to one, unless the lock type
    // is PMX_NO_LOCK, in which case the use count is set
    // to zero.  Once set, the owner cannot be changed.
    // A lock can change types and use counts.
    cd_lock(
        cd_lockOwner theOwner,
        pmx_lockType theLockType );

    ~cd_lock();

    // Manipulate the share lock count.

    long getLockCount() const {
        return lockCount;
    }

    void incrementLockCount() {
        lockCount++;
    }

    void decrementLockCount() {
        lockCount--;
    }

    // Manipulate the lockType.

    pmx_lockType getLockType() const {
        return lockType;
    }

    void setLockType(
        pmx_lockType theLockType ) {
        lockType = theLockType;
    }

    // Get the owner of this lock.

    cd_lockOwner getOwner() const {
        return owner;
    }

    // Dumper.
    void dump() const;

  private:

    // The owner of the lock.
    cd_lockOwner owner;

    // The type of lock.
    pmx_lockType lockType;

    // The number of times this lock is applied.  The lock type
    // should be none when the count is zero.
    long lockCount;
};

// The data structure which records all the locks on a class.

class cd_classLock {

  public:

    // The constructor needs the class to which this lock applies.
    cd_classLock(
```

```
        pmx_classHandle thisClass );

    ~cd_classLock();

    // The primary function for determining lock conflicts during
    // lock granting.  Does the requested lock type conflict with
    // existing locks?
    cd_boolean checkLockConflict(
        pmx_lockType lockType );

    // And, a function for determining the lock conflicts with
    // tighter control on the checking.  A user is assumed to
    // self-conflict.
    cd_boolean checkLockSelfConflict(
        pmx_lockType lockType );

    // Functions for asking questions about the state of a class lock.
    // Some of these are really simple; the easy ones are inline'd.
    // The argument is always "does the current user have the given
    // lock, or does somebody else?"  With no argument, the call means
    // "is there any user with a lock?"  Two alternatives to this
    // implementation would be three separate functions for each
    // question: hasTXLockSelf, hasTXLockOther, hasTXLockAny, etc.
    // Another would be to have a three state argument.

// Do something about this.

    // Does the class have a TXL?
    cd_boolean hasTXLock(
        cd_boolean lockedBySelf ) const {
        if( xLock != NULL &&
            ( ( lockedBySelf == CD_TRUE && xLock->getOwner() == LOCKOWNER ) ||
              ( lockedBySelf == CD_FALSE && xLock->getOwner() != LOCKOWNER ) ) ) {
// Note: the last two lines are the same as:
//     lockedBySelf == (xLock->getOwner() == LOCKOWNER)
// We could make that enhancement if necessary.  This same test
// occurs in about three places.
            return CD_TRUE;
        } else {
            return CD_FALSE;
        }
    }

    // Does the class have an ancestor with a TXL?
    cd_boolean hasAncestorTXLock(
        cd_boolean lockedBySelf ) const;

    // Does the class have any descendant with a TXL?
    cd_boolean hasDescendantTXLock(
        cd_boolean lockedBySelf ) const;

    // The same three functions with no argument.

    cd_boolean hasTXLock() const {
        if( xLock != NULL ) {
            return CD_TRUE;
        } else {
            return CD_FALSE;
        }
    }

    cd_boolean hasAncestorTXLock() const;

    cd_boolean hasDescendantTXLock() const;

    // Does the class have a TXL or TUL?
    cd_boolean hasTXULock(
        cd_boolean lockedBySelf ) const {
        if( hasTXLock( lockedBySelf ) == CD_TRUE ) {
            return CD_TRUE;
        } else if( uLock != NULL &&
            ( ( lockedBySelf == CD_TRUE && uLock->getOwner() == LOCKOWNER ) ||
              ( lockedBySelf == CD_FALSE && uLock->getOwner() != LOCKOWNER ) ) ) {
            return CD_TRUE;
        } else {
            return CD_FALSE;
        }
    }

    // Does the class have an ancestor with a TXL or TUL?
    cd_boolean hasAncestorTXULock(
        cd_boolean lockedBySelf ) const;

    // Does the class have any descendant with a TXL or TUL?
    cd_boolean hasDescendantTXULock(
        cd_boolean lockedBySelf ) const;

    // The same three functions with no argument.

    cd_boolean hasTXULock() const {
        if( hasTXLock() || uLock != NULL ) {
            return CD_TRUE;
        } else {
            return CD_FALSE;
        }
    }

    cd_boolean hasAncestorTXULock() const;

    cd_boolean hasDescendantTXULock() const;

    // Does the class have any lock at all?
    cd_boolean hasAnyLock(
        cd_boolean lockedBySelf ) const;

    // Does the class have any tree lock?
    cd_boolean hasAnyTXUSLock(
        cd_boolean lockedBySelf ) const;

    // Does the class have an ancestor with any tree lock?
    cd_boolean hasAncestorAnyTXUSLock(
        cd_boolean lockedBySelf ) const;

    // Does the class have any descendant with any lock?
    cd_boolean hasDescendantAnyLock(
        cd_boolean lockedBySelf ) const;

    // The same four functions with no argument.

    cd_boolean hasAnyLock() const {
        if( hasTXULock() || shareLocks.count() != 0 ) {
            return CD_TRUE;
        } else {
            return CD_FALSE;
        }
    }

    cd_boolean hasAnyTXUSLock() const;

    cd_boolean hasAncestorAnyTXUSLock() const;

    cd_boolean hasDescendantAnyLock() const;

    // These functions are similar to the ones above, but are
    // specifically used for the getLockMode function.
    // Does the class have a class or tree share lock?
    cd_boolean hasShareLock(
        cd_boolean lockedBySelf ) const;

    // Is the class under the influence of a tree share lock?
    cd_boolean hasAncestorTSLock(
        cd_boolean lockedBySelf ) const;

    // Add a new lock of the given type to the class.  The owner of
    // the lock is gleaned from the environment and the lock holder
    // from an API function argument).  Marginal sanity checks are
    // made, because it shouldn't be called unless the lock addition
    // is proper.

    cd_boolean addLock(
        pmx_lockType lockType );

    // Delete a lock.  The return is CD_FALSE if the lock, which
    // is the combination of USERID and lockType isn't present.
    // Note: addLock and deleteLock aren't symmetrical.  The lock
    // manager code determines if it's OK to add a lock, then uses
    // addLock to do it.  Delete lock checks if it's OK to delete
    // the lock, then deletes it, and returns whether or not it was
```

```
    able to do the delete.  The reason for the asymmetry is
    that the lock manager can do the add only in the context
    of the other locks, but delete can be done in isolation.

  cd_boolean deleteLock(
      pmx_lockType lockType );

  // Service the releaseAllLocks function.
  cd_boolean deleteAllLocks();

  // Service the releaseAllLocksOfType function.
  cd_boolean deleteAllLocks(
      pmx_lockType lockType );

  // The class associated with this lock.  This is used by the
  // look up algorithm in the lock manager which scans the list
  // of class locks looking for one.

  pmx_classHandle getLockedClass() const {
      return lockedClass;
  }

  // Dumper.
  void dump(
      cd_boolean doAll ) const;

  // A function for filling in a lock descriptor.  Since everything
  // is private, the lock manager can't fill this in.
  void fillInLockDescriptor(
      pmx_lockDescriptor CD_FAR * des ) const;

private:

  // The class handle with which these locks are associated.

  pmx_classHandle lockedClass;

  // Any number of share locks can be in effect, so we have
  // a list of owners.  The lock types must always be share
  // class or share tree.

  cd_lockList shareLocks;

  // The update and exclusive locks.  These are NULL pointers
  // when neither lock is present.  Of course, if both are
  // present, both must have the same owner.

  cd_lock CD_FAR * xLock;
  cd_lock CD_FAR * uLock;

  // Manage the list of share locks.  The add function simply
  // uses the list insert and adds the new lock to the end of
  // the list.  The remove function, however, tries to improve
  // performance by using the "slip last element into the hole"
  // trick.  These functions cause a fatal error if a problem
  // is encountered.

  void addShareLock(     // Simple.
      cd_lock CD_FAR * thisLock ) {
      shareLocks.insert( thisLock );
  }

  void removeShareLock(
      long index );

  // Check all the descendants of the class for a TXL.
  // (this function is recursive)
  cd_boolean checkDescendantTXLocks(
      cd_boolean lockedBySelf ) const;

  // Check all the descendants of the class for a TUL or TXL.
  // (this function is recursive)
  cd_boolean checkDescendantTXULocks(
      cd_boolean lockedBySelf ) const;

  // Check all the descendants of the class for any lock.
  // (this function is recursive)
  cd_boolean checkDescendantAnyLocks(
      cd_boolean lockedBySelf ) const;

  // And, the same three functions for self-conflicting mode.
  cd_boolean checkDescendantTXLocks() const;
  cd_boolean checkDescendantTXULocks() const;
  cd_boolean checkDescendantAnyLocks() const;
};

#endif
```

APPENDIX D

```
//--------------------------------------------------------------------------
//      This program is the confidential and proprietary product of CADIS, Inc.
//      Any unauthorized use, reproduction or transfer of this program
//      is strictly prohibited.
//              Copyright (C) 1995 by CADIS, Inc.
//
//   File name---
//     lockmgr.cxx
//
//   Purpose---
//     Class definition for the lock manager.
//
//   File modification history---
//     95-06-27  ktraut  Remove previous change.
//     95-06-21  ktraut  Change log level of dumps.
//     95-06-08  ktraut  Cosmetic.
//     95-03-06  bheiny  Add lock holder concept.
//     95-02-22  bheiny  Revise warm start for locking.
//     95-02-10  bheiny  New code.
//
//   Description---
//     This file contains the implementation for the lock manager
//     class, cd_lockManager.
//
//--------------------------------------------------------------------------

#include "config.h"

// System include files---


// Local include files---
#include "lockmgr.hxx"
#include "transmgr.hxx"
#include "pmxutil.hxx"
#include "nhandle.h"
#include "error.hxx"


CD_DECLAREMODULE( lockmgr );


// The class static for a lock owner, which is an argument to all
// the API functions.  We compose a lockOwner out of the USERID
// from the environment and the lock holder argument.
cd_lockOwner cd_lockManager::lockOwner = { 0L, -1L };

// The constructor.

cd_lockManager::cd_lockManager()
{
    CD_ENTERFUNCTION( "cd_lockManager::cd_lockManager" );

    // The list of class locks is initialized to zero.

    CD_DEBUGRETVAL( this );
}

// The destructor.

cd_lockManager::~cd_lockManager()
{
    CD_ENTERFUNCTION( "cd_lockManager::~cd_lockManager" );
        CD_DEBUGARGUMENTS( this );

    // Delete all the class locks.
    for( long i = 0; i < classLocks.count(); i++ ) {
        delete classLocks[ i ];
    }
}

// The API functions.

cd_boolean
cd_lockManager::requestLock(
    pmx_lockHolderHandle  lockHolder,
    pmx_classHandle       thisClass,
    pmx_lockType          lockType )
{
    CD_ENTERFUNCTION( "cd_lockManager::requestLock" );
        CD_DEBUGARGUMENTS( this );
        CD_DEBUGARGUMENTS( lockHolder );
        CD_DEBUGARGUMENTS( thisClass );
        CD_DEBUGARGUMENTS( lockType );

    cd_boolean retval = CD_FALSE;

    // Turn the handle into a pointer.
    cd_class CD_FAR * classPtr =
        CLASSMGR->schemaHandleTable().getClassPointer( thisClass );

    // Did it succeed?  Report an error upon failure.
    if( classPtr == NULL ) {
        cd_errorModule::setCode( PMX_ERRORBADCLASSHANDLE );

    // Is the lock type a member of the enumeration?
    // Note that we check for the valid lockType here instead
    // of in checkLockConflict.  I prefer that the high level functions
    // are the ones that set error codes.
    } else if( lockType != PMX_CLASS_S_LOCK &&
               lockType != PMX_TREE_S_LOCK &&
               lockType != PMX_TREE_U_LOCK &&
               lockType != PMX_TREE_X_LOCK ) {
        cd_errorModule::setCode( PMX_ERRORBADLOCKTYPE );

    // Is the lock holder valid?
    } else if( TRANSMGR->checkLockHolder( lockHolder ) == CD_FALSE ) {
        cd_errorModule::setCode( PMX_ERRORBADLOCKHOLDERHANDLE );

    } else {

        // Start out with the class lock object for this class.
        cd_classLock CD_FAR * thisClassLock = lookup( thisClass );
        if( thisClassLock == NULL ) {
            cd_fatalError( "Failure to look up a lock" );
        }

        // Set up the lock owner for testing in lower code.
        lockOwner.userID = USERID;
        lockOwner.lockHolder = lockHolder;

        retval = thisClassLock->checkLockConflict( lockType );
        if( retval == CD_TRUE ) {
            thisClassLock->addLock( lockType );
        } else {
            cd_errorModule::setCode( PMX_ERRORCANNOTGRANTLOCK );
        }
    }

    CD_DEBUGRETVAL( retval );
    return retval;
}

cd_boolean
cd_lockManager::checkSelfConflictLock(
    pmx_lockHolderHandle  lockHolder,
    pmx_classHandle       thisClass,
    pmx_lockType          lockType )
{
    CD_ENTERFUNCTION( "cd_lockManager::checkSelfConflictLock" );
        CD_DEBUGARGUMENTS( this );
        CD_DEBUGARGUMENTS( lockHolder );
        CD_DEBUGARGUMENTS( thisClass );
        CD_DEBUGARGUMENTS( lockType );

    cd_boolean retval = CD_FALSE;

    // Turn the handle into a pointer.
    cd_class CD_FAR * classPtr =
        CLASSMGR->schemaHandleTable().getClassPointer( thisClass );

    // Did it succeed?  Report an error upon failure.
    if( classPtr == NULL ) {
        cd_errorModule::setCode( PMX_ERRORBADCLASSHANDLE );

    // Is the lock type a member of the enumeration?
    // Note that we check for the valid lockType here instead
```

```
    // of in checkLockConflict.  I prefer that the high level functions
    // are the ones that set error codes.
    } else if( lockType != PMX_CLASS_S_LOCK &&
               lockType != PMX_TREE_S_LOCK &&
               lockType != PMX_TREE_U_LOCK &&
               lockType != PMX_TREE_X_LOCK ) {
        cd_errorModule::setCode( PMX_ERRORBADLOCKTYPE );

    // Is the lock holder valid?
    } else if( TRANSMGR->checkLockHolder( lockHolder ) == CD_FALSE ) {
        cd_errorModule::setCode( PMX_ERRORBADLOCKHOLDERHANDLE );

    } else {

        // Start out with the class lock object for this class.
        cd_classLock CD_FAR * thisClassLock = lookup( thisClass );
        if( thisClassLock == NULL ) {
            cd_fatalError( "Failure to look up a lock" );
        }

        // Set up the lock owner for testing in lower code.
        lockOwner.userID = USERID;
        lockOwner.lockHolder = lockHolder;

        retval = thisClassLock->checkLockSelfConflict( lockType );
        // Note, this differs from request lock in that it doesn't
        // grant the lock, only reporting that the grant would
        // be successful.
        if( retval == CD_FALSE ) {
            cd_errorModule::setCode( PMX_ERRORCANNOTGRANTLOCK );
        }
    }

    CD_DEBUGRETVAL( retval );
    return retval;
}

cd_boolean
cd_lockManager::releaseLock(
    pmx_lockHolderHandle  lockHolder,
    pmx_classHandle       thisClass,
    pmx_lockType          lockType )
{
    CD_ENTERFUNCTION( "cd_lockManager::releaseLock" );
        CD_DEBUGARGUMENTS( this );
        CD_DEBUGARGUMENTS( lockHolder );
        CD_DEBUGARGUMENTS( thisClass );
        CD_DEBUGARGUMENTS( lockType );

    cd_boolean retval = CD_FALSE;

    // Turn the handle into a pointer.
    cd_class CD_FAR * classPtr =
        CLASSMGR->schemaHandleTable().getClassPointer( thisClass );

    // Did it succeed?  Report an error upon failure.
    if( classPtr == NULL ) {
        cd_errorModule::setCode( PMX_ERRORBADCLASSHANDLE );

    // Is the lock type a member of the enumeration?
    } else if( lockType != PMX_CLASS_S_LOCK &&
               lockType != PMX_TREE_S_LOCK &&
               lockType != PMX_TREE_U_LOCK &&
               lockType != PMX_TREE_X_LOCK ) {
        cd_errorModule::setCode( PMX_ERRORBADLOCKTYPE );

    // Is the lock holder valid?
    } else if( TRANSMGR->checkLockHolder( lockHolder ) == CD_FALSE ) {
        cd_errorModule::setCode( PMX_ERRORBADLOCKHOLDERHANDLE );

    } else {

        // First, find the lock.  This has the side effect of
        // adding the class to the list if it's not there, yet.
        cd_classLock CD_FAR * thisClassLock = lookup( thisClass );
        if( thisClassLock == NULL ) {
            cd_fatalError( "Failure to look up a lock" );
        }

        // Set up the lock owner for testing in lower code.
        lockOwner.userID = USERID;
        lockOwner.lockHolder = lockHolder;

        retval = thisClassLock->deleteLock( lockType );

        // If we didn't delete the lock, then gripe.
        if( retval == CD_FALSE ) {
            cd_errorModule::setCode( PMX_ERRORNOSUCHLOCK );
        }
    }

    CD_DEBUGRETVAL( retval );
    return retval;
}

cd_boolean
cd_lockManager::releaseAllLocks(
    pmx_lockHolderHandle  lockHolder,
    pmx_classHandle       thisClass )
{
    CD_ENTERFUNCTION( "cd_lockManager::releaseAllLocks" );
        CD_DEBUGARGUMENTS( this );
        CD_DEBUGARGUMENTS( lockHolder );
        CD_DEBUGARGUMENTS( thisClass );

    cd_boolean retval = CD_FALSE;

    // This function is a wee bit trickier than releaseLock.
    // We have to release all of the locks for the current
    // USER ID for the given class and we do that for all the
    // decendants of the given class, too.

    // Turn the handle into a pointer.
    cd_class CD_FAR * classPtr =
        CLASSMGR->schemaHandleTable().getClassPointer( thisClass );

    // Did it succeed?  Report an error upon failure.
    if( classPtr == NULL ) {
        cd_errorModule::setCode( PMX_ERRORBADCLASSHANDLE );

    // Is the lock holder valid?
    } else if( TRANSMGR->checkLockHolder( lockHolder ) == CD_FALSE ) {
        cd_errorModule::setCode( PMX_ERRORBADLOCKHOLDERHANDLE );

    } else {

        // Set up the lock owner for testing in lower code.
        lockOwner.userID = USERID;
        lockOwner.lockHolder = lockHolder;

        // We need to release all the locks owned by this user
        // in this subtree.  There are two approaches:
        //   1) do DFS of subtree and call removeAllLocks at each node.
        //   2) do walk through all class locks, if class is a descendant,
        //         then call removeAllLocks.
        // We use #2 when at the root and #1 elsewhere.  I have an
        // analysis of the problem in my notes.

        if( thisClass == CLASSMGR->getRoot() ) {
            // Examine every class (including the root).
            cd_classLockListIterator classLockList( classLocks );
            cd_classLock CD_FAR * thisClassLock = NULL;

            while( classLockList.next( thisClassLock ) ) {

                thisClassLock->deleteAllLocks();
            }

        } else {
            // Use our old friend, recursion.

            releaseLocksInSubtree( thisClass );
        }

        retval = CD_TRUE;
    }

    CD_DEBUGRETVAL( retval );
```

```
    return retval;
}

cd_boolean
cd_lockManager::releaseAllLocks(
    pmx_classHandle thisClass )
{
    CD_ENTERFUNCTION( "cd_lockManager::releaseAllLocks" );
        CD_DEBUGARGUMENTS( this );
        CD_DEBUGARGUMENTS( thisClass );

    cd_boolean retval = CD_FALSE;

    // This function is a wee bit trickier than releaseLock.
    // We have to release all of the locks for the current
    // USER ID for the given class and we do that for all the
    // decendants of the given class, too.

    // Turn the handle into a pointer.
    cd_class CD_FAR * classPtr =
        CLASSMGR->schemaHandleTable().getClassPointer( thisClass );

    // Did it succeed?  Report an error upon failure.
    if( classPtr == NULL ) {
        cd_errorModule::setCode( PMX_ERRORBADCLASSHANDLE );

    } else {

        // Set up the lock owner for testing in lower code.
        lockOwner.userID = USERID;
        // We want to release all the locks for all lock holders.
        lockOwner.lockHolder = ignoreLockHolder;

        // We need to release all the locks owned by this user
        // in this subtree.  There are two approaches:
        //   1) do DFS of subtree and call removeAllLocks at each node.
        //   2) do walk through all class locks, if class is a descendant,
        //        then call removeAllLocks.
        // We use #2 when at the root and #1 elsewhere.  I have an
        // analysis of the problem in my notes.

        if( thisClass == CLASSMGR->getRoot() ) {
            // Examine every class (including the root).
            cd_classLockListIterator classLockList( classLocks );
            cd_classLock CD_FAR * thisClassLock = NULL;

            while( classLockList.next( thisClassLock ) ) {

                thisClassLock->deleteAllLocks();
            }

        } else {
            // Use our old friend, recursion.

            releaseLocksInSubtree( thisClass );
        }

        retval = CD_TRUE;
    }

    CD_DEBUGRETVAL( retval );
    return retval;
}

cd_boolean
cd_lockManager::releaseAllLocksOfType(
    pmx_lockHolderHandle  lockHolder,
    pmx_classHandle       thisClass,
    pmx_lockType          lockType )
{
    CD_ENTERFUNCTION( "cd_lockManager::releaseAllLocksOfType" );
        CD_DEBUGARGUMENTS( this );
        CD_DEBUGARGUMENTS( lockHolder );
        CD_DEBUGARGUMENTS( thisClass );
        CD_DEBUGARGUMENTS( lockType );

    cd_boolean retval = CD_FALSE;

    // This function is very similar to releaseAllLocks.

    // Turn the handle into a pointer.
    cd_class CD_FAR * classPtr =
        CLASSMGR->schemaHandleTable().getClassPointer( thisClass );

    // Did it succeed?  Report an error upon failure.
    if( classPtr == NULL ) {
        cd_errorModule::setCode( PMX_ERRORBADCLASSHANDLE );

    // Is the lock type a member of the enumeration?
    } else if( lockType != PMX_CLASS_S_LOCK &&
               lockType != PMX_TREE_S_LOCK &&
               lockType != PMX_TREE_U_LOCK &&
               lockType != PMX_TREE_X_LOCK ) {
        cd_errorModule::setCode( PMX_ERRORBADLOCKTYPE );

    // Is the lock holder valid?
    } else if( TRANSMGR->checkLockHolder( lockHolder ) == CD_FALSE ) {
        cd_errorModule::setCode( PMX_ERRORBADLOCKHOLDERHANDLE );

    } else {

        // Set up the lock owner for testing in lower code.
        lockOwner.userID = USERID;
        lockOwner.lockHolder = lockHolder;

        if( thisClass == CLASSMGR->getRoot() ) {
            // Examine every class (including the root).
            cd_classLockListIterator classLockList( classLocks );
            cd_classLock CD_FAR * thisClassLock = NULL;

            while( classLockList.next( thisClassLock ) ) {
                // Ignore the return; it's OK if no lock of
                // that type exists.

                thisClassLock->deleteAllLocks( lockType );
            }

        } else {
            // Use our old friend, recursion.

            releaseLocksInSubtree( thisClass, lockType );
        }

        retval = CD_TRUE;
    }

    CD_DEBUGRETVAL( retval );
    return retval;
}

pmx_lockDescriptor CD_FAR *
cd_lockManager::getLockDescriptor(
    pmx_lockHolderHandle  lockHolder,
    pmx_classHandle       thisClass )
{
    CD_ENTERFUNCTION( "cd_lockManager::getLockDescriptor" );
        CD_DEBUGARGUMENTS( this );
        CD_DEBUGARGUMENTS( lockHolder );
        CD_DEBUGARGUMENTS( thisClass );

    pmx_lockDescriptor CD_FAR * des = NULL;

    // Turn the handle into a pointer.
    cd_class CD_FAR * classPtr =
        CLASSMGR->schemaHandleTable().getClassPointer( thisClass );

    // Did it succeed?  Report an error upon failure.
    if( classPtr == NULL ) {
        cd_errorModule::setCode( PMX_ERRORBADCLASSHANDLE );

    // Is the lock holder valid?
    } else if( TRANSMGR->checkLockHolder( lockHolder ) == CD_FALSE ) {
        cd_errorModule::setCode( PMX_ERRORBADLOCKHOLDERHANDLE );

    } else {

        // First, find the lock.  This has the side effect of
        // adding the class to the list if it's not there, yet.
```

```
        cd_classLock CD_FAR * thisClassLock = lookup( thisClass );
        if( thisClassLock == NULL ) {
            cd_fatalError( "Failure to look up a lock" );
        }

        // Allocate the descriptor and fill it in.
        des = new pmx_lockDescriptor;

        // Set up the lock owner for testing in lower code.
        lockOwner.userID = USERID;
        lockOwner.lockHolder = lockHolder;

        thisClassLock->fillInLockDescriptor( des );
        // We still need to fill in the lockHolder.
        des->lockHolderHandle = lockOwner.lockHolder;
    }

    CD_DEBUGRETVAL( des );
    return des;
}

cd_boolean
cd_lockManager::freeLockDescriptor(
    pmx_lockDescriptor CD_FAR * thisDescriptor )
{
    CD_ENTERFUNCTION( "cd_lockManager::freeLockDescriptor" );
        CD_DEBUGARGUMENTS( thisDescriptor );

    // Nothing to do but free the descriptor itself, since this
    // descriptor doesn't point at anything.
    delete thisDescriptor;

    cd_boolean retval = CD_FALSE;
    CD_DEBUGRETVAL( retval );
    return retval;
}

pmx_lockMode
cd_lockManager::getLockMode(
    pmx_lockHolderHandle  lockHolder,
    pmx_classHandle       thisClass,
    cd_boolean            self )
{
    CD_ENTERFUNCTION( "cd_lockManager::getLockMode" );
        CD_DEBUGARGUMENTS( this );
        CD_DEBUGARGUMENTS( thisClass );
        CD_DEBUGARGUMENTS( lockHolder );
        CD_DEBUGARGUMENTS( self );

    pmx_lockMode retval = PMX_LOCKMODE_ERROR;

    // Turn the handle into a pointer.
    cd_class CD_FAR * classPtr =
        CLASSMGR->schemaHandleTable().getClassPointer( thisClass );

    // Did it succeed? Report an error upon failure.
    if( classPtr == NULL ) {
        cd_errorModule::setCode( PMX_ERRORBADCLASSHANDLE );

    // Is the lock holder valid?
    } else if( TRANSMGR->checkLockHolder( lockHolder ) == CD_FALSE ) {
        cd_errorModule::setCode( PMX_ERRORBADLOCKHOLDERHANDLE );

    } else {

        // We return the "highest" lock state, where the states
        // are ordered share, update, exclusive. This probably
        // isn't the most efficient way to do this, but we have
        // handy tools. We check the ancestors three times, but
        // there isn't much cost for the checking (I hope).

        // First, find the lock. This has the side effect of
        // adding the class to the list if it's not there, yet.
        cd_classLock CD_FAR * thisClassLock = lookup( thisClass );
        if( thisClassLock == NULL ) {
            cd_fatalError( "Failure to look up a lock" );
        }

        retval = PMX_LOCKMODE_NONE;

        // Set up the lock owner for testing in lower code.
        lockOwner.userID = USERID;
        lockOwner.lockHolder = lockHolder;

        // Is this class under the influence of an exclusive lock?
        if( thisClassLock->hasTXLock( self ) ||
            thisClassLock->hasAncestorTXLock( self ) ) {

            retval = PMX_LOCKMODE_EXCLUSIVE;

        } else if( thisClassLock->hasTXULock( self ) ||
                   thisClassLock->hasAncestorTXULock( self ) ) {

            retval = PMX_LOCKMODE_UPDATE;

        // This is a little trickier. If the class has a
        // share class or tree lock, then the lock mode is
        // share. Otherwise, we look for an ancestor with
        // a share tree lock.
        } else if( thisClassLock->hasShareLock( self ) ||
                   thisClassLock->hasAncestorTSLock( self ) ) {

            retval = PMX_LOCKMODE_SHARE;
        }
    }

    CD_DEBUGRETVAL( retval );
    return retval;
}

// Dumping functions.

cd_boolean
cd_lockManager::dumpLocks(
    pmx_classHandle thisClass ) const
{
    // Look up by class handle in the lock table, then
    // call the private function to dump it.
    long index = -1L;
    cd_boolean foundIt = findIt( thisClass, index );
    if( foundIt == CD_TRUE ) {
        classLocks[ index ]->dump( CD_TRUE );
    } else {
        cd_debugPuts( "No lock entry for class " );
        cd_debugObject( thisClass );
        cd_debugPuts( "", CD_TRUE );
    }

    return CD_TRUE;
}

cd_boolean
cd_lockManager::dumpDBLocks() const
{
    cd_debugPuts( "----- Lock Manager -----", CD_TRUE );
    for( long i = 0; i < classLocks.count(); i++ ) {
        classLocks[ i ]->dump( CD_FALSE );
    }

    return CD_TRUE;
}

cd_boolean
cd_lockManager::dumpAllDBLocks() const
{
    cd_debugPuts( "----- Lock Manager -----", CD_TRUE );
    for( long i = 0; i < classLocks.count(); i++ ) {
        classLocks[ i ]->dump( CD_TRUE );
    }

    return CD_TRUE;
}


// Some helpers.

// Is the class under the influence of an exclusive (schema edit lock)?
cd_boolean
```

```
cd_lockManager::isXLocked(
    pmx_classHandle thisClass )
{
    CD_ENTERFUNCTION( "cd_lockManager::isXLocked" );
        CD_DEBUGARGUMENTS( this );
        CD_DEBUGARGUMENTS( thisClass );

    cd_boolean retval = CD_FALSE;

    // The class is X locked if the class itself is X locked or
    // an ancestor is X locked.
    cd_classLock CD_FAR * thisClassLock = lookup( thisClass );
    if( thisClassLock == NULL ) {
        cd_fatalError( "Failure to look up a lock" );
    }

    // Set up the lock owner for testing in lower code.
    lockOwner.userID = USERID;
    // We want to release all the locks for all lock holders.
    lockOwner.lockHolder = ignoreLockHolder;

    if( thisClassLock->hasTXLock( CD_TRUE ) ||
        thisClassLock->hasAncestorTXLock( CD_TRUE ) ) {
        retval = CD_TRUE;
    }

    CD_DEBUGRETVAL( retval );
    return retval;
}

// Is the parent of the given class under the influence of an
// exclusive (schema edit lock)?
cd_boolean
cd_lockManager::isParentXLocked(
    pmx_classHandle thisClass )
{
    CD_ENTERFUNCTION( "cd_lockManager::isParentXLocked" );
        CD_DEBUGARGUMENTS( this );
        CD_DEBUGARGUMENTS( thisClass );

    cd_boolean retval = CD_FALSE;

    // This is the same as the previous function, except we
    // start with the parent of the given class and make a
    // special case out of the root.

    // Turn the handle into a pointer.
    cd_class CD_FAR * classPtr =
        CLASSMGR->schemaHandleTable().getClassPointer( thisClass );

    // Did it succeed?  Report an error upon failure.
    if ( classPtr == NULL ) {
        cd_fatalError ( "NULL Class pointer encountered" );
    }

    // Set up the lock owner for testing in lower code.
    lockOwner.userID = USERID;
    // We want to release all the locks for all lock holders.
    lockOwner.lockHolder = ignoreLockHolder;

    // Special case of the root's ancestor is the root.  We either
    // look at the parent or at the root itself.
    if( thisClass != CLASSMGR->getRoot() ) {
        thisClass = classPtr->getParent();
    }

    retval = isXLocked( thisClass );

    CD_DEBUGRETVAL( retval );
    return retval;
}

// Is the class under the influence of an update (instance edit lock)?
// Of course, this implies either an X or U lock.
cd_boolean
cd_lockManager::isULocked(
    pmx_classHandle thisClass )
{
    CD_ENTERFUNCTION( "cd_lockManager::isULocked" );
        CD_DEBUGARGUMENTS( this );
        CD_DEBUGARGUMENTS( thisClass );

    cd_boolean retval = CD_FALSE;

    // The class is U locked if the class itself is X or U locked or
    // an ancestor is X or U locked.
    cd_classLock CD_FAR * thisClassLock = lookup( thisClass );
    if( thisClassLock == NULL ) {
        cd_fatalError( "Failure to look up a lock" );
    }

    // Set up the lock owner for testing in lower code.
    lockOwner.userID = USERID;
    // We want to release all the locks for all lock holders.
    lockOwner.lockHolder = ignoreLockHolder;

    if( thisClassLock->hasTXULock( CD_TRUE ) ||
        thisClassLock->hasAncestorTXULock( CD_TRUE ) ) {
        retval = CD_TRUE;
    }

    CD_DEBUGRETVAL( retval );
    return retval;
}

// This function is public because the class lock
// objects need to find other locks for conflict resolution.

cd_classLock CD_FAR *
cd_lockManager::lookup(
    pmx_classHandle thisClass )
{
    CD_ENTERFUNCTION( "cd_lockManager::lookup" );
        CD_DEBUGARGUMENTS( this );
        CD_DEBUGARGUMENTS( thisClass );

    cd_classLock CD_FAR * retval = NULL;

    // Do a find, then insert if not found.
    long index = -1L;
    cd_boolean foundIt = findIt( thisClass, index );

    if( foundIt == CD_TRUE ) {
        retval = classLocks[ index ];

    } else {

        // Make a new classLock object for insertion.
        cd_classLock CD_FAR * classLock = new cd_classLock( thisClass );
        classLocks.insert( classLock, index );
        retval = classLock;
    }

    CD_DEBUGRETVAL( retval );
    return retval;
}

cd_boolean
cd_lockManager::warmStart(
    cd_classManager CD_FAR * theClassManager,
    cd_warmStartMode          warmStartMode )
{
    CD_ENTERFUNCTION( "cd_lockManager::warmStart" );
        CD_DEBUGARGUMENTS( this );
        CD_DEBUGARGUMENTS( theClassManager );
        CD_DEBUGARGUMENTS( warmStartMode );

    cd_boolean retval = CD_TRUE;

    // Note that this function takes in the class manager pointer
    // because during warm start the environment has not yet been
    // set up.

    // If the warm start mode is root only, then we load only the
    // root into the lock table.  If the warm start mode was anything
    // else, then the entire schema has been loaded and we can load
    // the lock table with all the classes.
    if( warmStartMode == CD_WARMSTART_ROOT ) {
```

```
            // Make a new classLock object for insertion.
            cd_classLock CD_FAR * classLock = new cd_classLock(
                theClassManager->getRoot() );
            classLocks.insert( classLock );

        } else {

            // Read through the schema handle table.  For each class present,
            // insert a cd_classLock into the lock table.  The table will
            // be ordered by class handles when we're done.
            long count = theClassManager->schemaHandleTable().count();
            for( long i = 0; i < count; i++ ) {
                pmx_classHandle thisClass;
                thisClass.classHandle = i;
                // The following sets classPtr to something other than
                // NULL only when the handle refers to a class.
                cd_class CD_FAR * classPtr =
                    theClassManager->schemaHandleTable().getClassPointer(
                        thisClass );
                if( classPtr != NULL ) {
                    // Make a new classLock object for insertion.
                    cd_classLock CD_FAR * classLock = new cd_classLock( thisClass );
                    classLocks.insert( classLock );
                }
            }
        }

        CD_DEBUGRETVAL( retval );
        return retval;
}

cd_boolean
cd_lockManager::deleteClass(
    pmx_classHandle thisClass )
{
        CD_ENTERFUNCTION( "cd_lockManager::deleteClass" );
            CD_DEBUGARGUMENTS( this );
            CD_DEBUGARGUMENTS( thisClass );

        // No way it can fail.
        cd_boolean retval = CD_TRUE;

        // This function is called when the class is deleted in the
        // class manager.  We need to remove it from the class lock
        // list (if it is present).  Since the class lock may never
        // have been referenced (and, therefore, not in the list)
        // and since we need the index, we use findIt instead of lookup.

        // Do a find, then delete if found.
        long index = -1L;
        cd_boolean foundIt = findIt( thisClass, index );

        if( foundIt == CD_TRUE ) {

            // Just blow the lock away.  The only user who could
            // have any locks is the user who called this function.
            delete classLocks[ index ];

            // And, remove the lock from the list.
            classLocks.remove( index );

        }   // Otherwise, no big deal.

        CD_DEBUGRETVAL( retval );
        return retval;
}

cd_boolean
cd_lockManager::findIt(
    pmx_classHandle thisClass,
    long CD_FAR &   index ) const
{
        CD_ENTERFUNCTION( "cd_lockManager::findIt" );
            CD_DEBUGARGUMENTS( this );
            CD_DEBUGARGUMENTS( thisClass );
            CD_DEBUGARGUMENTS( index );

        cd_boolean retval = CD_FALSE;

        // If we need a hack for performance, we could use the list
        // base so the [] operator function isn't called.

        // Do a binary search, looking for the class handle.
        // We return the index in the list where the object belongs
        // if we don't find it.  The insertion point for an empty
        // list is at index 0.
        index = 0;
        long low = 0;
        long high = classLocks.count() - 1;
        while( high >= low ) {
            index = (high + low) / 2;
            // The list is ordered on the class handles.
            if( classLocks[ index ]->getLockedClass() == thisClass ) {
                retval = CD_TRUE;
                break;
            }
            // No > operator for handles is defined.
            if( classLocks[ index ]->getLockedClass().classHandle >
                    thisClass.classHandle ) {
                high = index - 1;
            } else {
                low = index + 1;
            }
        }
        // If we got out of the loop without finding the class handle, then
        // high == low - 1.  high is the index of the object which precedes,
        // and low is the index of the object which follows the class handle
        // that wasn't found.  The proper place for a new insertion is at the
        // index of the first handle greater than the one we're searching for,
        // so we set index to low.
        if( retval == CD_FALSE ) {
            index = low;
        }

        CD_DEBUGRETVAL( retval );
        return retval;
}

void
cd_lockManager::releaseLocksInSubtree(
    pmx_classHandle thisClass )
{
        CD_ENTERFUNCTION( "cd_lockManager::releaseLocksInSubtree" );
            CD_DEBUGARGUMENTS( this );
            CD_DEBUGARGUMENTS( thisClass );

        // First, find the lock.
        cd_classLock CD_FAR * thisClassLock = lookup( thisClass );
        if( thisClassLock == NULL ) {
            cd_fatalError( "Failure to look up a lock" );
        }

        // Release all the locks for the current class.
        thisClassLock->deleteAllLocks();

        // Then all the locks for the subclasses of the current class.
        cd_class CD_FAR * classPtr =
            CLASSMGR->schemaHandleTable().getClassPointer( thisClass );

        if ( classPtr == NULL ) {
            cd_fatalError ( "NULL Class pointer encountered" );
        }
        pmx_classHandleListIterator classes ( classPtr->getSubclasses() );
        pmx_classHandle thisSubclass;

        while( classes.next( thisSubclass ) ) {
            releaseLocksInSubtree( thisSubclass );
        }
}

void
cd_lockManager::releaseLocksInSubtree(
    pmx_classHandle thisClass,
    pmx_lockType    lockType )
{
        CD_ENTERFUNCTION( "cd_lockManager::releaseLocksInSubtree(lockType)" );
            CD_DEBUGARGUMENTS( this );
            CD_DEBUGARGUMENTS( thisClass );
```

```
        CD_DEBUGARGUMENTS( lockType );

    // First, find the lock.
    cd_classLock CD_FAR * thisClassLock = lookup( thisClass );
    if( thisClassLock == NULL ) {
        cd_fatalError( "Failure to look up a lock" );
    }

    // Release the locks for the current class.
    thisClassLock->deleteAllLocks( lockType );

    // Then all the locks for the subclasses of the current class.
    cd_class CD_FAR * classPtr =
        CLASSMGR->schemaHandleTable().getClassPointer( thisClass );

    if ( classPtr == NULL ) {
        cd_fatalError ( "NULL class pointer encountered" );
    }
    pmx_classHandleListIterator classes ( classPtr->getSubclasses() );
    pmx_classHandle thisSubclass;

    while( classes.next( thisSubclass ) ) {
        releaseLocksInSubtree( thisSubclass, lockType );
    }
}

// The functions for per class lock objects.

cd_classLock::cd_classLock(
    pmx_classHandle thisClass ) :
        lockedClass( thisClass ),
        xLock( NULL ),
        uLock( NULL )
{
    CD_ENTERFUNCTION( "cd_classLock::cd_classLock" );
        CD_DEBUGARGUMENTS( thisClass );

    CD_DEBUGRETVAL( this );
}

cd_classLock::~cd_classLock()
{
    CD_ENTERFUNCTION( "cd_classLock::~cd_classLock" );
        CD_DEBUGARGUMENTS( this );

    // Delete all the share locks.
    for( long i = 0; i < shareLocks.count(); i++ ) {
        delete shareLocks[ i ];
    }

    // And the update or exclusive lock.
    if( xLock != NULL ) {
        delete xLock;
    }
    if( uLock != NULL ) {
        delete uLock;
    }
}

// Check for lock conflicts during lock grant.
cd_boolean
cd_classLock::checkLockConflict(
    pmx_lockType lockType )
{
    CD_ENTERFUNCTION( "cd_classLock::checkLockConflict" );
        CD_DEBUGARGUMENTS( this );
        CD_DEBUGARGUMENTS( lockType );

    cd_boolean retval = CD_FALSE;

    switch( lockType ) {

    case PMX_CLASS_S_LOCK:
        // The algorithm for testing Class S Lock interference:
        // 1) Test the class for a TXL.
        // 2) If none, test all ancestors for a TXL.
        // 3) If none, grant the lock request.
        if( hasTXLock( CD_FALSE ) == CD_FALSE ) {
            if( hasAncestorTXLock( CD_FALSE ) == CD_FALSE ) {
                retval = CD_TRUE;
            }
        }
        break;

    case PMX_TREE_S_LOCK:
        // The algorithm for testing Tree S Lock interference:
        // Note: steps 1 and 2 are the same as for test CSL.
        // 1) Test the class for a TXL.
        // 2) If none, test all ancestors for a TXL.
        // 3) If none, test all descendants for TXL.
        // 4) If none, grant the lock request.
        if( hasTXLock( CD_FALSE ) == CD_FALSE ) {
            if( hasAncestorTXLock( CD_FALSE ) == CD_FALSE ) {
                if( hasDescendantTXLock( CD_FALSE ) == CD_FALSE ) {
                    retval = CD_TRUE;
                }
            }
        }
        break;

    case PMX_TREE_U_LOCK:
        // The algorithm for testing Tree U Lock interference:
        // 1) Test the class for a TXL or TUL.
        // 2) If none, test all ancestors for a TXL or TUL.
        // 3) If none, test all descendants for a TXL or TUL.
        // 4) If none, grant the lock request.
        if( hasTXULock( CD_FALSE ) == CD_FALSE ) {
            if( hasAncestorTXULock( CD_FALSE ) == CD_FALSE ){
                if( hasDescendantTXULock( CD_FALSE ) == CD_FALSE ) {
                    retval = CD_TRUE;
                }
            }
        }
        break;

    case PMX_TREE_X_LOCK:
        // The algorithm for testing Tree X Lock interference:
        // 1) Test the class for "any" lock.
        // 2) If none, test all ancestors for any tree lock.
        // 3) If none, test all descendants for any lock.
        // 4) If none, grant the lock request.
        if( hasAnyLock( CD_FALSE ) == CD_FALSE ) {
            if( hasAncestorAnyTXUSLock( CD_FALSE ) == CD_FALSE ){
                if( hasDescendantAnyLock( CD_FALSE ) == CD_FALSE ) {
                    retval = CD_TRUE;
                }
            }
        }
        break;

    default:
        cd_fatalError( "bad lockType in checkConflict" );
        break;
    }

    CD_DEBUGRETVAL( retval );
    return retval;
}

// This function lets the user treat the lock request as if it is a
// request from another user.  Thus, a share lock can be acquired
// only when there are no blocking exclusive lock.  An update lock
// can be acquired only when there are no blocking exclusive or
// update locks.  And, an exclusive lock can be acquired only when
// there are no blocking locks of any type.  This function has the
// same framework as the checkLockConflict function, but we don't
// ignore the user's own locks this time.  And, we don't actually
// grant the lock.  We just check to see if there is a conflict.
cd_boolean
cd_classLock::checkLockSelfConflict(
    pmx_lockType lockType )
{
    CD_ENTERFUNCTION( "cd_classLock::checkLockSelfConflict" );
        CD_DEBUGARGUMENTS( this );
        CD_DEBUGARGUMENTS( lockType );

    cd_boolean retval = CD_FALSE;
```

```
    switch( lockType ) {

    case PMX_CLASS_S_LOCK:
        // The algorithm for testing Class S Lock interference:
        //  1) Test the class for a TXL.
        //  2) If none, test all ancestors for a TXL.
        //  3) If none, grant the lock request.
        if( hasTXLock() == CD_FALSE ) {
            if( hasAncestorTXLock() == CD_FALSE ) {
                retval = CD_TRUE;
            }
        }
        break;

    case PMX_TREE_S_LOCK:
        // The algorithm for testing Tree S Lock interference:
        //  Note: steps 1 and 2 are the same as for test CSL.
        //  1) Test the class for a TXL.
        //  2) If none, test all ancestors for a TXL.
        //  3) If none, test all descendants for TXL.
        //  4) If none, grant the lock request.
        if( hasTXLock() == CD_FALSE ) {
            if( hasAncestorTXLock() == CD_FALSE ) {
                if( hasDescendantTXLock() == CD_FALSE ) {
                    retval = CD_TRUE;
                }
            }
        }
        break;

    case PMX_TREE_U_LOCK:
        // The algorithm for testing Tree U Lock interference:
        //  1) Test the class for a TXL or TUL.
        //  2) If none, test all ancestors for a TXL or TUL.
        //  3) If none, test all descendants for a TXL or TUL.
        //  4) If none, grant the lock request.
        if( hasTXULock() == CD_FALSE ) {
            if( hasAncestorTXULock() == CD_FALSE ){
                if( hasDescendantTXULock() == CD_FALSE ) {
                    retval = CD_TRUE;
                }
            }
        }
        break;

    case PMX_TREE_X_LOCK:
        // The algorithm for testing Tree X Lock interference:
        //  1) Test the class for "any" lock.
        //  2) If none, test all ancestors for any tree lock.
        //  3) If none, test all descendants for any lock.
        //  4) If none, grant the lock request.
        if( hasAnyLock() == CD_FALSE ) {
            if( hasAncestorAnyTXUSLock() == CD_FALSE ){
                if( hasDescendantAnyLock() == CD_FALSE ) {
                    retval = CD_TRUE;
                }
            }
        }
        break;

    default:
        cd_fatalError( "bad lockType in checkSelfConflict" );
        break;
    }

    CD_DEBUGRETVAL( retval );
    return retval;
}

// Does the class have an ancestor with a TXL?
cd_boolean
cd_classLock::hasAncestorTXLock(
    cd_boolean lockedBySelf ) const
{
    CD_ENTERFUNCTION( "cd_classLock::hasAncestorTXLock(lockedBySelf)" );
        CD_DEBUGARGUMENTS( this );
        CD_DEBUGARGUMENTS( lockedBySelf );

    cd_boolean retval = CD_FALSE;

    // Look up the tree until either (1) the root or (2) a
    // TXL is found.
    pmx_classHandle thisClass = lockedClass;
    while( thisClass != CLASSMGR->getRoot() && retval == CD_FALSE ) {

        // Turn the handle into a pointer.
        cd_class CD_FAR * classPtr =
            CLASSMGR->schemaHandleTable().getClassPointer( thisClass );

        // Did it succeed?  Report an error upon failure.
        if ( classPtr == NULL ) {
            cd_fatalError ( "NULL Class pointer encountered" );
        }

        // Get the parent.
        thisClass = classPtr->getParent();

        // Look up the classLock.
        cd_classLock CD_FAR * thisClassLock = LOCKMGR->lookup( thisClass );
        if( thisClassLock == NULL ) {
            cd_fatalError( "Failure to look up a lock" );
        }

        retval = thisClassLock->hasTXLock( lockedBySelf );
    }

    CD_DEBUGRETVAL( retval );
    return retval;
}

// Does the class have any descendant with a TXL?
cd_boolean
cd_classLock::hasDescendantTXLock(
    cd_boolean lockedBySelf ) const
{
    CD_ENTERFUNCTION( "cd_classLock::hasDescendantTXLock(lockedBySelf)" );
        CD_DEBUGARGUMENTS( this );
        CD_DEBUGARGUMENTS( lockedBySelf );

    cd_boolean retval = CD_FALSE;

    // We use the two algorithms as explained in the releaseAllLocks
    // function.

    if( lockedClass == CLASSMGR->getRoot() ) {
        // Examine every class (including the root).
        cd_classLockListIterator classLockList( LOCKMGR->getClassLockList() );
        cd_classLock CD_FAR * thisClassLock = NULL;

        // We stop when a TXL is found or the list runs out.
        while( retval == CD_FALSE && classLockList.next( thisClassLock ) ) {
            retval = thisClassLock->hasTXLock( lockedBySelf );
        }

    } else {

        retval = checkDescendantTXLocks( lockedBySelf );
    }

    CD_DEBUGRETVAL( retval );
    return retval;
}

// Does the class have an ancestor with a TXL?  Self-conflicting mode.
cd_boolean
cd_classLock::hasAncestorTXLock() const
{
    CD_ENTERFUNCTION( "cd_classLock::hasAncestorTXLock" );
        CD_DEBUGARGUMENTS( this );

    cd_boolean retval = CD_FALSE;

    // Look up the tree until either (1) the root or (2) a
    // TXL is found.
    pmx_classHandle thisClass = lockedClass;
    while( thisClass != CLASSMGR->getRoot() && retval == CD_FALSE ) {

        // Turn the handle into a pointer.
```

```
        cd_class CD_FAR * classPtr =
            CLASSMGR->schemaHandleTable().getClassPointer( thisClass );

        // Did it succeed?  Report an error upon failure.
        if ( classPtr == NULL ) {
            cd_fatalError ( "NULL Class pointer encountered" );
        }

        // Get the parent.
        thisClass = classPtr->getParent();

        // Look up the classLock.
        cd_classLock CD_FAR * thisClassLock = LOCKMGR->lookup( thisClass );
        if( thisClassLock == NULL ) {
            cd_fatalError( "Failure to look up a lock" );
        }

        retval = thisClassLock->hasTXLock();
    }

    CD_DEBUGRETVAL( retval );
    return retval;
}

// Does the class have any descendant with a TXL?  Self-conflicting mode.
cd_boolean
cd_classLock::hasDescendantTXLock() const
{
    CD_ENTERFUNCTION( "cd_classLock::hasDescendantTXLock" );
        CD_DEBUGARGUMENTS( this );

    cd_boolean retval = CD_FALSE;

    // We use the two algorithms as explained in the releaseAllLocks
    // function.

    if( lockedClass == CLASSMGR->getRoot() ) {
        // Examine every class (including the root).
        cd_classLockListIterator classLockList( LOCKMGR->getClassLockList() );
        cd_classLock CD_FAR * thisClassLock = NULL;

        // We stop when a TXL is found or the list runs out.
        while( retval == CD_FALSE && classLockList.next( thisClassLock ) ) {
            retval = thisClassLock->hasTXLock();
        }

    } else {

        retval = checkDescendantTXLocks();
    }

    CD_DEBUGRETVAL( retval );
    return retval;
}

// Does the class have an ancestor with a write lock?
cd_boolean
cd_classLock::hasAncestorTXULock(
    cd_boolean lockedBySelf ) const
{
    CD_ENTERFUNCTION( "cd_classLock::hasAncestorTXULock(lockedBySelf)" );
        CD_DEBUGARGUMENTS( this );
        CD_DEBUGARGUMENTS( lockedBySelf );

    cd_boolean retval = CD_FALSE;

    // Look up the tree until either (1) the root or (2) a
    // TXL is found.
    pmx_classHandle thisClass = lockedClass;
    while( thisClass != CLASSMGR->getRoot() && retval == CD_FALSE ) {

        // Turn the handle into a pointer.
        cd_class CD_FAR * classPtr =
            CLASSMGR->schemaHandleTable().getClassPointer( thisClass );

        // Did it succeed?  Report an error upon failure.
        if ( classPtr == NULL ) {
            cd_fatalError ( "NULL Class pointer encountered" );
        }

        // Get the parent.
        thisClass = classPtr->getParent();

        // Look up the classLock.
        cd_classLock CD_FAR * thisClassLock = LOCKMGR->lookup( thisClass );
        if( thisClassLock == NULL ) {
            cd_fatalError( "Failure to look up a lock" );
        }

        retval = thisClassLock->hasTXULock( lockedBySelf );
    }

    CD_DEBUGRETVAL( retval );
    return retval;
}

// Does the class have any descendant with a write lock?
cd_boolean
cd_classLock::hasDescendantTXULock(
    cd_boolean lockedBySelf ) const
{
    CD_ENTERFUNCTION( "cd_classLock::hasDescendantTXULock(lockedBySelf)" );
        CD_DEBUGARGUMENTS( this );
        CD_DEBUGARGUMENTS( lockedBySelf );

    cd_boolean retval = CD_FALSE;

    // We use the two algorithms as explained in the releaseAllLocks
    // function.

    if( lockedClass == CLASSMGR->getRoot() ) {
        // Examine every class (including the root).
        cd_classLockListIterator classLockList( LOCKMGR->getClassLockList() );
        cd_classLock CD_FAR * thisClassLock = NULL;

        // We stop when a TXL or TUL is found or the list runs out.
        while( retval == CD_FALSE && classLockList.next( thisClassLock ) ) {
            retval = thisClassLock->hasTXULock( lockedBySelf );
        }

    } else {

        retval = checkDescendantTXULocks( lockedBySelf );
    }

    CD_DEBUGRETVAL( retval );
    return retval;
}

// Does the class have an ancestor with a write lock?  Self-conflicting mode.
cd_boolean
cd_classLock::hasAncestorTXULock() const
{
    CD_ENTERFUNCTION( "cd_classLock::hasAncestorTXULock" );
        CD_DEBUGARGUMENTS( this );

    cd_boolean retval = CD_FALSE;

    // Look up the tree until either (1) the root or (2) a
    // TXL is found.
    pmx_classHandle thisClass = lockedClass;
    while( thisClass != CLASSMGR->getRoot() && retval == CD_FALSE ) {

        // Turn the handle into a pointer.
        cd_class CD_FAR * classPtr =
            CLASSMGR->schemaHandleTable().getClassPointer( thisClass );

        // Did it succeed?  Report an error upon failure.
        if ( classPtr == NULL ) {
            cd_fatalError ( "NULL Class pointer encountered" );
        }

        // Get the parent.
        thisClass = classPtr->getParent();

        // Look up the classLock.
        cd_classLock CD_FAR * thisClassLock = LOCKMGR->lookup( thisClass );
        if( thisClassLock == NULL ) {
```

```
            cd_fatalError( "Failure to look up a lock" );
        }

        retval = thisClassLock->hasTXULock();
    }

    CD_DEBUGRETVAL( retval );
    return retval;
}

// Does the class have any descendant with a write lock?  Self-conflicting mode.
cd_boolean
cd_classLock::hasDescendantTXULock() const
{
    CD_ENTERFUNCTION( "cd_classLock::hasDescendantTXULock" );
        CD_DEBUGARGUMENTS( this );

    cd_boolean retval = CD_FALSE;

    // We use the two algorithms as explained in the releaseAllLocks
    // function.

    if( lockedClass == CLASSMGR->getRoot() ) {
        // Examine every class (including the root).
        cd_classLockListIterator classLockList( LOCKMGR->getClassLockList() );
        cd_classLock CD_FAR * thisClassLock = NULL;

        // We stop when a TXL or TUL is found or the list runs out.
        while( retval == CD_FALSE && classLockList.next( thisClassLock ) ) {
            retval = thisClassLock->hasTXULock();
        }

    } else {

        retval = checkDescendantTXULocks();
    }

    CD_DEBUGRETVAL( retval );
    return retval;
}

// Does the class have any lock?
cd_boolean
cd_classLock::hasAnyLock(
    cd_boolean lockedBySelf ) const
{
    CD_ENTERFUNCTION( "cd_classLock::hasAnyLock(lockedBySelf:" );
        CD_DEBUGARGUMENTS( this );
        CD_DEBUGARGUMENTS( lockedBySelf );

    cd_boolean retval = CD_FALSE;

    // We do the quick check for a TXL or TUL.
    retval = hasTXULock( lockedBySelf );

    // Otherwise, we have to look through the list of share lockers.
    // Note that I could eliminate this if test and use the first
    // clause of the relational expression in the while statement for
    // the same effect, but that might be too obscure.
    if( retval == CD_FALSE ) {

        cd_lockListIterator lockList( shareLocks );
        cd_lock CD_FAR * thisLock = NULL;

        // We quit as soon as we have an answer.
        while( retval == CD_FALSE && lockList.next( thisLock ) ) {
            if( ( lockedBySelf == CD_TRUE &&
                  thisLock->getOwner() == LOCKOWNER ) ||
                ( lockedBySelf == CD_FALSE &&
                  thisLock->getOwner() != LOCKOWNER ) ) {
                retval = CD_TRUE;
            }
        }
    }

    CD_DEBUGRETVAL( retval );
    return retval;
}

// Does the class have any tree lock?
cd_boolean
cd_classLock::hasAnyTXUSLock(
    cd_boolean lockedBySelf ) const
{
    CD_ENTERFUNCTION( "cd_classLock::hasAnyTXUSLock(lockedBySelf)" );
        CD_DEBUGARGUMENTS( this );
        CD_DEBUGARGUMENTS( lockedBySelf );

    cd_boolean retval = CD_FALSE;

    // We do the quick check for a TXL or TUL.
    retval = hasTXULock( lockedBySelf );

    // Otherwise, we have to look through the list of share lockers.
    // Note that I could eliminate this if test and use the first
    // clause of the relational expression in the while statement for
    // the same effect, but that might be too obscure.
    if( retval == CD_FALSE ) {

        cd_lockListIterator lockList( shareLocks );
        cd_lock CD_FAR * thisLock = NULL;

        // We quit as soon as we have an answer.
        while( retval == CD_FALSE && lockList.next( thisLock ) ) {
            if( ( lockedBySelf == CD_TRUE &&
                  thisLock->getOwner() == LOCKOWNER ) ||
                ( lockedBySelf == CD_FALSE &&
                  thisLock->getOwner() != LOCKOWNER ) ) {
                if( thisLock->getLockType() == PMX_TREE_S_LOCK ) {
                    retval = CD_TRUE;
                }
            }
        }
    }

    CD_DEBUGRETVAL( retval );
    return retval;
}

// Does the class have an ancestor with any tree lock?
cd_boolean
cd_classLock::hasAncestorAnyTXUSLock(
    cd_boolean lockedBySelf ) const
{
    CD_ENTERFUNCTION( "cd_classLock::hasAncestorAnyTXUSLock(lockedBySelf)" );
        CD_DEBUGARGUMENTS( this );
        CD_DEBUGARGUMENTS( lockedBySelf );

    cd_boolean retval = CD_FALSE;

    // Look up the tree until either (1) the root or (2) some
    // lock is found.
    pmx_classHandle thisClass = lockedClass;
    while( thisClass != CLASSMGR->getRoot() && retval == CD_FALSE ) {

        // Turn the handle into a pointer.
        cd_class CD_FAR * classPtr =
            CLASSMGR->schemaHandleTable().getClassPointer( thisClass );

        // Did it succeed?  Report an error upon failure.
        if ( classPtr == NULL ) {
            cd_fatalError ( "NULL Class pointer encountered" );
        }

        // Get the parent.
        thisClass = classPtr->getParent();

        // Look up the classLock.
        cd_classLock CD_FAR * thisClassLock = LOCKMGR->lookup( thisClass );
        if( thisClassLock == NULL ) {
            cd_fatalError( "Failure to look up a lock" );
        }

        retval = thisClassLock->hasAnyTXUSLock( lockedBySelf );
    }

    CD_DEBUGRETVAL( retval );
    return retval;
```

```
}

// Does the class have any descendant with any lock?
cd_boolean
cd_classLock::hasDescendantAnyLock(
    cd_boolean lockedBySelf ) const
{
    CD_ENTERFUNCTION( "cd_classLock::hasDescendantAnyLock(lockedBySelf)" );
        CD_DEBUGARGUMENTS( this );
        CD_DEBUGARGUMENTS( lockedBySelf );

    cd_boolean retval = CD_FALSE;

    // We use the two algorithms as explained in the releaseAllLocks
    // function.

    if( lockedClass == CLASSMGR->getRoot() ) {
        // Examine every class (including the root).
        cd_classLockListIterator classLockList( LOCKMGR->getClassLockList() );
        cd_classLock CD_FAR * thisClassLock = NULL;

        // We stop when a lock is found or the list runs out.
        while( retval == CD_FALSE && classLockList.next( thisClassLock ) ) {
            retval = thisClassLock->hasAnyLock( lockedBySelf );
        }

    } else {

        retval = checkDescendantAnyLocks( lockedBySelf );
    }

    CD_DEBUGRETVAL( retval );
    return retval;
}

// Does the class have any lock?  Self-conflicting mode.
cd_boolean
cd_classLock::hasAnyTXUSLock() const
{
    CD_ENTERFUNCTION( "cd_classLock::hasAnyTXUSLock" );
        CD_DEBUGARGUMENTS( this );

    cd_boolean retval = CD_FALSE;

    // We do the quick check for a TXL or TUL.
    retval = hasTXULock();

    // Otherwise, we have to look through the list of share lockers.
    // Note that I could eliminate this if test and use the first
    // clause of the relational expression in the while statement for
    // the same effect, but that might be too obscure.
    if( retval == CD_FALSE ) {

        cd_lockListIterator lockList( shareLocks );
        cd_lock CD_FAR * thisLock = NULL;

        // We quit as soon as we have an answer.
        while( retval == CD_FALSE && lockList.next( thisLock ) ) {
            if( thisLock->getLockType() == PMX_TREE_S_LOCK ) {
                retval = CD_TRUE;
            }
        }
    }

    CD_DEBUGRETVAL( retval );
    return retval;
}

// Does the class have an ancestor with any lock?  Self-conflicting mode.
cd_boolean
cd_classLock::hasAncestorAnyTXUSLock() const
{
    CD_ENTERFUNCTION( "cd_classLock::hasAncestorAnyTXUSLock" );
        CD_DEBUGARGUMENTS( this );

    cd_boolean retval = CD_FALSE;

    // Look up the tree until either (1) the root or (2) some
    // lock is found.
    pmx_classHandle thisClass = lockedClass;
    while( thisClass != CLASSMGR->getRoot() && retval == CD_FALSE ) {

        // Turn the handle into a pointer.
        cd_class CD_FAR * classPtr =
            CLASSMGR->schemaHandleTable().getClassPointer( thisClass );

        // Did it succeed?  Report an error upon failure.
        if ( classPtr == NULL ) {
            cd_fatalError ( "NULL class pointer encountered" );
        }

        // Get the parent.
        thisClass = classPtr->getParent();

        // Look up the classLock.
        cd_classLock CD_FAR * thisClassLock = LOCKMGR->lookup( thisClass );
        if( thisClassLock == NULL ) {
            cd_fatalError( "Failure to look up a lock" );
        }

        retval = thisClassLock->hasAnyTXUSLock();
    }

    CD_DEBUGRETVAL( retval );
    return retval;
}

// Does the class have any descendant with any lock?  Self-conflicting mode.
cd_boolean
cd_classLock::hasDescendantAnyLock() const
{
    CD_ENTERFUNCTION( "cd_classLock::hasDescendantAnyLock" );
        CD_DEBUGARGUMENTS( this );

    cd_boolean retval = CD_FALSE;

    // We use the two algorithms as explained in the releaseAllLocks
    // function.

    if( lockedClass == CLASSMGR->getRoot() ) {
        // Examine every class (including the root).
        cd_classLockListIterator classLockList( LOCKMGR->getClassLockList() );
        cd_classLock CD_FAR * thisClassLock = NULL;

        // We stop when a lock is found or the list runs out.
        while( retval == CD_FALSE && classLockList.next( thisClassLock ) ) {
            retval = thisClassLock->hasAnyLock();
        }

    } else {

        retval = checkDescendantAnyLocks();
    }

    CD_DEBUGRETVAL( retval );
    return retval;
}

// Does the class have a class or tree share lock?
cd_boolean
cd_classLock::hasShareLock(
    cd_boolean lockedBySelf ) const
{
    CD_ENTERFUNCTION( "cd_classLock::hasShareLock" );
        CD_DEBUGARGUMENTS( this );
        CD_DEBUGARGUMENTS( lockedBySelf );

    cd_boolean retval = CD_FALSE;

    // We have to look through the list of share lockers.
    // See the note in hasAnyLock.

    cd_lockListIterator lockList( shareLocks );
    cd_lock CD_FAR * thisLock = NULL;

    // We quit as soon as we have an answer.
    while( retval == CD_FALSE && lockList.next( thisLock ) ) {
        if( ( thisLock->getLockType() == PMX_CLASS_S_LOCK ||
```

```
            thisLock->getLockType() == PMX_TREE_S_LOCK )
            &&
            ( ( lockedBySelf == CD_TRUE &&
                thisLock->getOwner() == LOCKOWNER ) ||
              ( lockedBySelf == CD_FALSE &&
                thisLock->getOwner() != LOCKOWNER ) )
            ) {
            retval = CD_TRUE;
        }
    }

    CD_DEBUGRETVAL( retval );
    return retval;
}

// Is the class under the influence of a tree share lock?
cd_boolean
cd_classLock::hasAncestorTSLock(
    cd_boolean lockedBySelf ) const
{
    CD_ENTERFUNCTION( "cd_classLock::hasAncestorTSLock" );
        CD_DEBUGARGUMENTS( this );
        CD_DEBUGARGUMENTS( lockedBySelf );

    cd_boolean retval = CD_FALSE;

    // Look up the tree until either (1) the root or (2) a tree share
    // lock is found.
    pmx_classHandle thisClass = lockedClass;
    while( thisClass != CLASSMGR->getRoot() && retval == CD_FALSE ) {

        // Turn the handle into a pointer.
        cd_class CD_FAR * classPtr =
            CLASSMGR->schemaHandleTable().getClassPointer( thisClass );

        // Did it succeed?  Report an error upon failure.
        if ( classPtr == NULL ) {
            cd_fatalError ( "NULL Class pointer encountered" );
        }

        // Get the parent.
        thisClass = classPtr->getParent();

        // Look up the classLock.
        cd_classLock CD_FAR * thisClassLock = LOCKMGR->lookup( thisClass );
        if( thisClassLock == NULL ) {
            cd_fatalError( "Failure to look up a lock" );
        }

        cd_lockListIterator lockList( thisClassLock->shareLocks );
        cd_lock CD_FAR * thisLock = NULL;

        // We quit as soon as we have an answer.
        while( retval == CD_FALSE && lockList.next( thisLock ) ) {
            if( ( thisLock->getLockType() == PMX_TREE_S_LOCK )
                &&
                ( ( lockedBySelf == CD_TRUE &&
                    thisLock->getOwner() == LOCKOWNER ) ||
                  ( lockedBySelf == CD_FALSE &&
                    thisLock->getOwner() != LOCKOWNER ) )
                ) {
                retval = CD_TRUE;
            }
        }
    }

    CD_DEBUGRETVAL( retval );
    return retval;
}

cd_boolean
cd_classLock::addLock(
pmx_lockType lockType )
{
CD_ENTERFUNCTION( "cd_classLock::addLock" );
    CD_DEBUGARGUMENTS( this );
    CD_DEBUGARGUMENTS( lockType );

    // No real need for return value.  This function blows up if
    // some problem is found.  The caller should behave.
    cd_boolean retval = CD_TRUE;

    // Switch on the lock type and either insert into the share
    // lock list or add a new uLock or xLock.
    switch( lockType ) {

    case PMX_CLASS_S_LOCK:
    case PMX_TREE_S_LOCK:
      {

        // Look up the lock in the share lock list.
        // If the lock is found in the list, then we bump the
        // count.  Otherwise, we have to add a new lock to the list.

        cd_lockListIterator lockList( shareLocks );
        cd_lock CD_FAR * thisLock = NULL;

        cd_boolean foundIt = CD_FALSE;
        while( lockList.next( thisLock ) ) {
            if( thisLock->getLockType() == lockType &&
                    thisLock->getOwner() == LOCKOWNER ) {
                // Found the lock, so increment the use count.
                foundIt = CD_TRUE;
                thisLock->incrementLockCount();
                break;
            }
        }

        // If the lock wasn't found, then we have to add a new one.
        if( foundIt == CD_FALSE ) {
            thisLock = new cd_lock( LOCKOWNER, lockType );
            addShareLock( thisLock );
        }
      }
      break;

    case PMX_TREE_U_LOCK:
      {
        // If a lock already exists, increment the use count,
        // otherwise create a new one.
        if( uLock != NULL ) {
            uLock->incrementLockCount();
        } else {
            uLock = new cd_lock( LOCKOWNER, lockType );
        }
      }
      break;

    case PMX_TREE_X_LOCK:
      {
        // If a lock already exists, increment the use count,
        // otherwise create a new one.
        if( xLock != NULL ) {
            xLock->incrementLockCount();
        } else {
            xLock = new cd_lock( LOCKOWNER, lockType );
        }
      }
      break;

    default:
        cd_fatalError( "addLock of bad lockType" );
        break;
    }

    CD_DEBUGRETVAL( retval );
    return retval;
}

// Delete one lock of the specified type.
cd_boolean
cd_classLock::deleteLock(
    pmx_lockType lockType )
{
    CD_ENTERFUNCTION( "cd_classLock::deleteLock" );
        CD_DEBUGARGUMENTS( this );
        CD_DEBUGARGUMENTS( lockType );
```

```
// The return value is CD_FALSE if the lock isn't found.
cd_boolean retval = CD_FALSE;

// Switch on the lock type so we know whether to look in the
// lock list, xLock, or uLock.
switch( lockType ) {

case PMX_CLASS_S_LOCK:
case PMX_TREE_S_LOCK:
    {
    // Look through the list of share locks looking for a match.
    cd_lockListIterator lockList( shareLocks );
    cd_lock CD_FAR * thisLock = NULL;

    while( lockList.next( thisLock ) ) {
        if( thisLock->getLockType() == lockType &&
            thisLock->getOwner() == LOCKOWNER ) {

            // Drop the use count and clobber the lock object
            // altogether if the use count is zero.
            // Gripe if the use count is already less than zero.
            if( thisLock->getLockCount() <= 0 ) {
                cd_fatalError( "Invalid lock count in release" );
            }

            thisLock->decrementLockCount();
            if( thisLock->getLockCount() == 0 ) {
                removeShareLock( lockList.getIndex() );
                delete thisLock;
            }
            retval = CD_TRUE;
            break;
        }
    }
    }
    break;

case PMX_TREE_U_LOCK:
    {
    if( uLock != NULL &&
        uLock->getLockType() == lockType &&
        uLock->getOwner() == LOCKOWNER ) {

        // Drop the use count and clobber the lock object
        // altogether if the use count is zero.
        // Gripe if the use count is already less than zero.
        if( uLock->getLockCount() <= 0 ) {
            cd_fatalError( "Invalid ulock count in release" );
        }

        uLock->decrementLockCount();
        if( uLock->getLockCount() == 0 ) {
            delete uLock;
            uLock = NULL;
        }
        retval = CD_TRUE;
    }
    }
    break;

case PMX_TREE_X_LOCK:
    {
    if( xLock != NULL &&
        xLock->getLockType() == lockType &&
        xLock->getOwner() == LOCKOWNER ) {

        // Drop the use count and clobber the lock object
        // altogether if the use count is zero.
        // Gripe if the use count is already less than zero.
        if( xLock->getLockCount() <= 0 ) {
            cd_fatalError( "Invalid xlock count in release" );
        }

        xLock->decrementLockCount();
        if( xLock->getLockCount() == 0 ) {
            delete xLock;
            xLock = NULL;
        }
        retval = CD_TRUE;
        }
    }
    break;

default:
    cd_fatalError( "deleteLock of bad lockType" );
    break;
}

CD_DEBUGRETVAL( retval );
return retval;
}

// Delete all the locks of all types.
cd_boolean
cd_classLock::deleteAllLocks()
{
    CD_ENTERFUNCTION( "cd_classLock::deleteAllLocks" );
        CD_DEBUGARGUMENTS( this );

    // No real need for return value.  This function blows up if
    // some problem is found.  The caller should behave.
    cd_boolean retval = CD_TRUE;

    // Is the uLock owned by this user?
    if( uLock != NULL && uLock->getOwner() == LOCKOWNER ) {
        // Simple, just delete the lock object.
        delete uLock;
        uLock = NULL;
    }

    // Is the xLock owned by this user?
    if( xLock != NULL && xLock->getOwner() == LOCKOWNER ) {
        // Simple, just delete the lock object.
        delete xLock;
        xLock = NULL;
    }

    // Look through the list of share locks looking for a match
    // on the user.  We look until no more locks are found.  If
    // performance is a problem we could take advantage of what
    // we know the removeShareLock function does by starting the
    // subsequent search where the previous one left off.

    cd_boolean oneFound = CD_TRUE;
    while( oneFound == CD_TRUE ) {
        oneFound = CD_FALSE;

        cd_lockListIterator lockList( shareLocks );
        cd_lock CD_FAR * thisLock = NULL;
        while( lockList.next( thisLock ) ) {

            if( thisLock->getOwner() == LOCKOWNER ) {

                // Gripe if the use count is already less than zero.
                if( thisLock->getLockCount() <= 0 ) {
                    cd_fatalError( "Invalid lock count in deleteAllLocks" );
                }

                // Clobber the lock without regard to the use count.
                removeShareLock( lockList.getIndex() );
                delete thisLock;

                // There might be more locks (of the other share type),
                // so we traverse the list until no lock is found.
                oneFound = CD_TRUE;
                break;
            }
        }
    }

    CD_DEBUGRETVAL( retval );
    return retval;
}

// Delete all the locks of the specified type.
cd_boolean
cd_classLock::deleteAllLocks(
    pmx_lockType lockType )
```

```
{
    CD_ENTERFUNCTION( "cd_classLock::deleteAllLocks(lockType)" );
        CD_DEBUGARGUMENTS( this );
        CD_DEBUGARGUMENTS( lockType );

    // No real need for return value.  This function blows up if
    // some problem is found.  The caller should behave.
    cd_boolean retval = CD_TRUE;

    // Switch on the lock type so we know whether to look in the
    // lock list, xLock, or uLock.
    switch( lockType ) {

    case PMX_CLASS_S_LOCK:
    case PMX_TREE_S_LOCK:
      {
        // See the comments in the other deleteAllLocks function.
        cd_boolean oneFound = CD_TRUE;
        while( oneFound == CD_TRUE ) {
            oneFound = CD_FALSE;

            cd_lockListIterator lockList( shareLocks );
            cd_lock CD_FAR * thisLock = NULL;
            while( lockList.next( thisLock ) ) {

                if( thisLock->getOwner() == LOCKOWNER ) {

                    // Gripe if the use count is already less than zero.
                    if( thisLock->getLockCount() <= 0 ) {
                        cd_fatalError( "Invalid lock count in deleteAllLocks" );
                    }

                    // Clobber the lock without regard to the use count.
                    removeShareLock( lockList.getIndex() );
                    delete thisLock;

                    oneFound = CD_TRUE;
                    break;
                }
            }
        }
      }
      break;

    case PMX_TREE_U_LOCK:
      {
        if( uLock != NULL &&
            uLock->getLockType() == lockType &&
            uLock->getOwner() == LOCKOWNER ) {

            // Just delete the lock object.
            delete uLock;
            uLock = NULL;
        }
      }
      break;

    case PMX_TREE_X_LOCK:
      {
        if( xLock != NULL &&
            xLock->getLockType() == lockType &&
            xLock->getOwner() == LOCKOWNER ) {

            // Just delete the lock object.
            delete xLock;
            xLock = NULL;
        }
      }
      break;

    default:
        cd_fatalError( "deleteLock of bad lockType" );
        break;
    }

    CD_DEBUGRETVAL( retval );
    return retval;
}

void
cd_classLock::dump(
    cd_boolean doAll ) const
{
    // If doAll isn't CD_TRUE, we don't dump non-locks.
    if( doAll == CD_FALSE &&
        uLock == NULL && xLock == NULL && shareLocks.count() == 0 )
        return;
    }

    cd_debugPuts( "Locks for Class " );
    cd_debugObject( lockedClass );
    // Let's attempt to show the class name, too.
    cd_debugPuts( " " );
    cd_class CD_FAR * classPtr =
        CLASSMGR->schemaHandleTable().getClassPointer( lockedClass );
    if( classPtr != NULL ) {
        cd_debugPuts( classPtr->getClassName() );
    } else {
        cd_debugPuts( "INVALID CLASS POINTER" );
    }
    cd_debugPuts( "", CD_TRUE );

    // Show the state of the exclusive lock.
    if( xLock == NULL ) {
        cd_debugPuts( "  No exclusive lock", CD_TRUE );
    } else {
        cd_debugPuts( "  Exclusive lock", CD_TRUE );
        xLock->dump();
    }
    // Show the state of the update lock.
    if( uLock == NULL ) {
        cd_debugPuts( "  No update lock", CD_TRUE );
    } else {
        cd_debugPuts( "  Update lock", CD_TRUE );
        uLock->dump();
    }
    // Then, the share locks.
    cd_debugPuts( "  Share Locks  count - " );
    cd_debugObject( shareLocks.count() );
    cd_debugPuts( "", CD_TRUE );
    for( long i = 0; i < shareLocks.count(); i++ ) {
        shareLocks[ i ]->dump();
    }
}

void
cd_classLock::fillInLockDescriptor(
    pmx_lockDescriptor CD_FAR * des ) const
{
    CD_ENTERFUNCTION( "cd_classLock::fillInLockDescriptor" );
        CD_DEBUGARGUMENTS( this );
        CD_DEBUGARGUMENTS( des );

    des->classHandle = lockedClass;
    // Fill in the lock counts for which we are the owner.
    des->treeExclusiveLockCount = 0L;
    if( xLock != NULL && xLock->getOwner() == LOCKOWNER ) {
        des->treeExclusiveLockCount = xLock->getLockCount();
    }
    des->treeUpdateLockCount = 0L;
    if( uLock != NULL && uLock->getOwner() == LOCKOWNER ) {
        des->treeUpdateLockCount = uLock->getLockCount();
    }

    // Look through the share locks, too.
    cd_lockListIterator lockList( shareLocks );
    cd_lock CD_FAR * thisLock = NULL;

    // We could quit when the list runs out or when we've seen both
    // the Tree and Class Share Locks for this user.
    des->classShareLockCount = 0L;
    des->treeShareLockCount = 0L;
    while( ( des->classShareLockCount == 0 || des->treeShareLockCount == 0 )
            && lockList.next( thisLock ) ) {
        if( thisLock->getOwner() == LOCKOWNER ) {
            if( thisLock->getLockType() == PMX_CLASS_S_LOCK ) {
                des->classShareLockCount = thisLock->getLockCount();
            }
```

```
            if( thisLock->getLockType() == PMX_TREE_S_LOCK ) {
                des->treeShareLockCount = thisLock->getLockCount();
            }
        }
    }
}

    Private functions.

void
cd_classLock::removeShareLock(
    long index )
{
    CD_ENTERFUNCTION( "cd_classLock::removeShareLock" );
        CD_DEBUGARGUMENTS( this );
        CD_DEBUGARGUMENTS( index );

    // Use the same trick for removal that we use to improve performance
    // for unordered instance lists.  Take the last element in the
    // list and copy it in the index which is being removed.  Then,
    // remove the last element.

    // If this is the last one in the list, then no trickery is needed.
    long lastIndex = shareLocks.count() - 1;
    if( index != lastIndex ) {
        // Replace the lock at index with the last lock.
        cd_lock CD_FAR * lastLock = shareLocks[ lastIndex ];
        shareLocks.replace( lastLock, index );
    }

    // Remove the last element in the list.
    shareLocks.remove( lastIndex );
}

// Check for any descendant with a TXL.
cd_boolean
cd_classLock::checkDescendantTXLocks(
    cd_boolean lockedBySelf ) const
{
    CD_ENTERFUNCTION( "cd_classLock::checkDescendantTXLocks(lockedBySelf)" );
        CD_DEBUGARGUMENTS( this );
        CD_DEBUGARGUMENTS( lockedBySelf );

    cd_boolean retval = CD_FALSE;

    // Check all the locks for the subclasses of the current class.
    cd_class CD_FAR * classPtr =
        CLASSMGR->schemaHandleTable().getClassPointer( lockedClass );

    if ( classPtr == NULL ) {
        cd_fatalError ( "NULL Class pointer encountered" );
    }
    pmx_classHandleListIterator classes ( classPtr->getSubclasses() );
    pmx_classHandle thisSubclass;

    // We quit as soon as we find a lock.
    while( retval == CD_FALSE && classes.next( thisSubclass ) ) {
        cd_classLock CD_FAR * thisClassLock = LOCKMGR->lookup( thisSubclass );
        if( thisClassLock == NULL ) {
            cd_fatalError( "Failure to look up a lock" );
        }

        if( thisClassLock->hasTXLock( lockedBySelf ) ) {
            retval = CD_TRUE;
        } else {
            retval = thisClassLock->checkDescendantTXLocks( lockedBySelf );
        }
    }

    CD_DEBUGRETVAL( retval );
    return retval;
}

// Check for any descendant with a TXL or TUL.
cd_boolean
cd_classLock::checkDescendantTXULocks(
    cd_boolean lockedBySelf ) const
{
    CD_ENTERFUNCTION( "cd_classLock::checkDescendantTXULocks(lockedBySelf)" );
        CD_DEBUGARGUMENTS( this );
        CD_DEBUGARGUMENTS( lockedBySelf );

    cd_boolean retval = CD_FALSE;

    // Check all the locks for the subclasses of the current class.
    cd_class CD_FAR * classPtr =
        CLASSMGR->schemaHandleTable().getClassPointer( lockedClass );

    if ( classPtr == NULL ) {
        cd_fatalError ( "NULL Class pointer encountered" );
    }
    pmx_classHandleListIterator classes ( classPtr->getSubclasses() );
    pmx_classHandle thisSubclass;

    // We quit as soon as we find a lock.
    while( retval == CD_FALSE && classes.next( thisSubclass ) ) {
        cd_classLock CD_FAR * thisClassLock = LOCKMGR->lookup( thisSubclass );
        if( thisClassLock == NULL ) {
            cd_fatalError( "Failure to look up a lock" );
        }

        if( thisClassLock->hasTXULock( lockedBySelf ) ) {
            retval = CD_TRUE;
        } else {
            retval = thisClassLock->checkDescendantTXULocks( lockedBySelf );
        }
    }

    CD_DEBUGRETVAL( retval );
    return retval;
}

// Check for any descendant with any lock.
cd_boolean
cd_classLock::checkDescendantAnyLocks(
    cd_boolean lockedBySelf ) const
{
    CD_ENTERFUNCTION( "cd_classLock::checkDescendantAnyLocks(lockedBySelf)" );
        CD_DEBUGARGUMENTS( this );
        CD_DEBUGARGUMENTS( lockedBySelf );

    cd_boolean retval = CD_FALSE;

    // Check all the locks for the subclasses of the current class.
    cd_class CD_FAR * classPtr =
        CLASSMGR->schemaHandleTable().getClassPointer( lockedClass );

    if ( classPtr == NULL ) {
        cd_fatalError ( "NULL Class pointer encountered" );
    }
    pmx_classHandleListIterator classes ( classPtr->getSubclasses() );
    pmx_classHandle thisSubclass;

    // We quit as soon as we find a lock.
    while( retval == CD_FALSE && classes.next( thisSubclass ) ) {
        cd_classLock CD_FAR * thisClassLock = LOCKMGR->lookup( thisSubclass );
        if( thisClassLock == NULL ) {
            cd_fatalError( "Failure to look up a lock" );
        }

        if( thisClassLock->hasAnyLock( lockedBySelf ) ) {
            retval = CD_TRUE;
        } else {
            retval = thisClassLock->checkDescendantAnyLocks( lockedBySelf );
        }
    }

    CD_DEBUGRETVAL( retval );
    return retval;
}

// Check for any descendant with a TXL.  Self-conflicting mode.
cd_boolean
cd_classLock::checkDescendantTXLocks() const
{
    CD_ENTERFUNCTION( "cd_classLock::checkDescendantTXLocks" );
        CD_DEBUGARGUMENTS( this );
```

```
    cd_boolean retval = CD_FALSE;

    // Check all the locks for the subclasses of the current class.
    cd_class CD_FAR * classPtr =
        CLASSMGR->schemaHandleTable().getClassPointer( lockedClass );

    if ( classPtr == NULL ) {
        cd_fatalError ( "NULL Class pointer encountered" );
    }
    pmx_classHandleListIterator classes ( classPtr->getSubclasses() );
    pmx_classHandle thisSubclass;

    // We quit as soon as we find a lock.
    while( retval == CD_FALSE && classes.next( thisSubclass ) ) {
        cd_classLock CD_FAR * thisClassLock = LOCKMGR->lookup( thisSubclass );
        if( thisClassLock == NULL ) {
            cd_fatalError( "Failure to look up a lock" );
        }

        if( thisClassLock->hasTXLock() ) {
            retval = CD_TRUE;
        } else {
            retval = thisClassLock->checkDescendantTXLocks();
        }
    }

    CD_DEBUGRETVAL( retval );
    return retval;
}

// Check for any descendant with a TXL or TUL.  Self-conflicting mode.
cd_boolean
cd_classLock::checkDescendantTXULocks() const
{
    CD_ENTERFUNCTION( "cd_classLock::checkDescendantTXULocks" );
        CD_DEBUGARGUMENTS( this );

    cd_boolean retval = CD_FALSE;

    // Check all the locks for the subclasses of the current class.
    cd_class CD_FAR * classPtr =
        CLASSMGR->schemaHandleTable().getClassPointer( lockedClass );

    if ( classPtr == NULL ) {
        cd_fatalError ( "NULL Class pointer encountered" );
    }
    pmx_classHandleListIterator classes ( classPtr->getSubclasses() );
    pmx_classHandle thisSubclass;

    // We quit as soon as we find a lock.
    while( retval == CD_FALSE && classes.next( thisSubclass ) ) {
        cd_classLock CD_FAR * thisClassLock = LOCKMGR->lookup( thisSubclass );
        if( thisClassLock == NULL ) {
            cd_fatalError( "Failure to look up a lock" );
        }

        if( thisClassLock->hasTXULock() ) {
            retval = CD_TRUE;
        } else {
            retval = thisClassLock->checkDescendantTXULocks();
        }
    }

    CD_DEBUGRETVAL( retval );
    return retval;
}

// Check for any descendant with any lock.  Self-conflicting mode.
cd_boolean
cd_classLock::checkDescendantAnyLocks() const
{
    CD_ENTERFUNCTION( "cd_classLock::checkDescendantAnyLocks" );
        CD_DEBUGARGUMENTS( this );

    cd_boolean retval = CD_FALSE;

    // Check all the locks for the subclasses of the current class.
    cd_class CD_FAR * classPtr =
        CLASSMGR->schemaHandleTable().getClassPointer( lockedClass );

    if ( classPtr == NULL ) {
        cd_fatalError ( "NULL Class pointer encountered" );
    }
    pmx_classHandleListIterator classes ( classPtr->getSubclasses() );
    pmx_classHandle thisSubclass;

    // We quit as soon as we find a lock.
    while( retval == CD_FALSE && classes.next( thisSubclass ) ) {
        cd_classLock CD_FAR * thisClassLock = LOCKMGR->lookup( thisSubclass );
        if( thisClassLock == NULL ) {
            cd_fatalError( "Failure to look up a lock" );
        }

        if( thisClassLock->hasAnyLock() ) {
            retval = CD_TRUE;
        } else {
            retval = thisClassLock->checkDescendantAnyLocks();
        }
    }

    CD_DEBUGRETVAL( retval );
    return retval;
}

// The functions for per class per owner lock objects.

cd_lock::cd_lock(
    cd_lockOwner theOwner,
    pmx_lockType theLockType ) :
        owner( theOwner ),
        lockType( theLockType ),
        lockCount( 1L )
{
    CD_ENTERFUNCTION( "cd_lock::cd_lock" );
        CD_DEBUGARGUMENTS( theOwner.userID );
        CD_DEBUGARGUMENTS( theOwner.lockHolder );
        CD_DEBUGARGUMENTS( theLockType );

    CD_DEBUGRETVAL( this );
}

cd_lock::~cd_lock()
{
    CD_ENTERFUNCTION( "cd_lock::~cd_lock" );
        CD_DEBUGARGUMENTS( this );
}

void
cd_lock::dump() const
{
    cd_debugPuts( "    userID      - " );
    cd_debugObject ( owner.userID );
    cd_debugPuts( "", CD_TRUE );
    cd_debugPuts( "    lockHolder  - " );
    cd_debugObject ( owner.lockHolder );
    cd_debugPuts( "", CD_TRUE );
    cd_debugPuts( "      lockType  - " );
    cd_debugObject( lockType );
    cd_debugPuts( "", CD_TRUE );
    cd_debugPuts( "      lockCount - " );
    cd_debugObject ( lockCount );
    cd_debugPuts( "", CD_TRUE );
}
```

APPENDIX E

```
VERSION 2.00
Begin Form dlgPartComparison
   Caption         =   "Part Attribute Comparison"
   ClientHeight    =   5370
   ClientLeft      =   1155
   ClientTop       =   2910
   ClientWidth     =   10800
   Height          =   5775
   Left            =   1095
   LinkTopic       =   "Form1"
   MinButton       =   0   'False
   ScaleHeight     =   5370
   ScaleWidth      =   10800
   Top             =   2565
   Width           =   10920
   Begin VideoSoftElastic VSElastic2
      Align           =   5  'Fill Container
      AutoSizeChildren=   4  'Uneven Vertical
      BackColor       =   &H00C0C0C0&
      BorderWidth     =   0
      ChildSpacing    =   0
      Height          =   5370
      Left            =   0
      TabIndex        =   0
      Top             =   0
      Width           =   10800
      Begin VideoSoftElastic VSElastic1
         AutoSizeChildren=   1  'Even Horizontal
         BackColor       =   &H00C0C0C0&
         BorderWidth     =   0
         Height          =   4770
         Left            =   0
         TabIndex        =   1
         Top             =   0
         Width           =   10800
         Begin SpreadSheet Spread1
            AllowResize     =   -1  'True
            CalcDependencies=   0   'False
            ColHeaderDisplay=   1  'DisplayNumbers
            DAutoCellTypes  =   0   'False
            DAutoFill       =   0   'False
            DAutoHeadings   =   0   'False
            DAutoSave       =   0   'False
            DAutoSizeCols   =   0  'Off
            DragIcon        =   DLGPARTC.FRX:0000
            FontBold        =   -1  'True
            FontItalic      =   0   'False
            FontName        =   "MS Sans Serif"
            FontSize        =   8.25
            FontStrikethru  =   0   'False
            FontUnderline   =   0   'False
            GridColor       =   &H007F7F7F&
            Height          =   4770
            InterfaceDesigner=   DLGPARTC.FRX:0302
            Left            =   0
            MaxCols         =   3
            MaxRows         =   1
            NoBeep          =   -1  'True
            OperationMode   =   1  'ReadOnly
            Protect         =   0   'False
            RestrictCols    =   -1  'True
            RowHeaderDisplay=   0  'Blank
            SelectBlockOptions=   0
            StartingColNumber=   0
            TabIndex        =   2
            Top             =   0
            UnitType        =   2  'Twips
            UserResize      =   1
            VirtualMaxRows  =   1
            Width           =   10800
         End
      End
      Begin VideoSoftElastic VSElastic3
         BackColor       =   &H00C0C0C0&
         BevelChildren   =   3  'No Graphical or Elastics
         BevelInner      =   0  'None
         BevelInnerWidth =   0
         BevelOuter      =   0  'None
         BevelOuterWidth =   0
         BorderWidth     =   0
         Height          =   600
         Left            =   0
         TabIndex        =   3
         Top             =   4770
         Width           =   10800
         Begin PictureBox Legend
            BackColor       =   &H00C0C0C0&
            BorderStyle     =   0  'None
            Height          =   495
            Left            =   5760
            ScaleHeight     =   495
            ScaleWidth      =   2475
            TabIndex        =   8
            Top             =   60
            Visible         =   0   'False
            Width           =   2475
            Begin Label Label2
               BackStyle       =   0  'Transparent
               Caption         =   "Legend:"
               Height          =   195
               Left            =   120
               TabIndex        =   11
               Top             =   0
               Width           =   975
            End
            Begin Label Label1
               Alignment       =   2  'Center
               BackColor       =   &H00FFFF00&
               Caption         =   "No Match"
               Height          =   195
               Index           =   1
               Left            =   960
               TabIndex        =   10
               Top             =   240
               Width           =   1275
            End
            Begin Label Label1
               Alignment       =   2  'Center
               Caption         =   "Match"
               Height          =   195
               Index           =   0
               Left            =   960
               TabIndex        =   9
               Top             =   0
               Width           =   1275
            End
         End
         Begin CommandButton Command3
            Caption         =   "Clear Comparisons"
            Height          =   375
            Left            =   2940
            TabIndex        =   7
            Top             =   120
            Width           =   2055
         End
         Begin VideoSoftElastic VSElastic4
            Align           =   4  'Align Right
            BackColor       =   &H00C0C0C0&
            BevelChildren   =   3  'No Graphical or Elastics
            BevelInner      =   0  'None
            BevelOuter      =   0  'None
            Height          =   600
            Left            =   9345
            TabIndex        =   5
            Top             =   0
            Width           =   1455
            Begin CommandButton Command2
               Caption         =   "Close"
               Height          =   375
               Left            =   0
               TabIndex        =   6
               Top             =   120
               Width           =   1395
            End
         End
         Begin CommandButton Command1
            Caption         =   "Compare To Selected Part"
            Height          =   375
```

```
                Left            =   120
                TabIndex        =   4
                Top             =   120
                Width           =   2715
            End
        End
    End
End
Dim DatabaseHandle As Long
Dim CallingForm As Form
Dim QueryResultHandle As Long
Dim ClassHandle As Long
Dim Attributes() As AttributeStructure
Dim ColRect As RECT

Sub Command1_Click ()

    Dim baseCol As Long
    Dim baseAttribStr As String, curAttribStr As String

    If Spread1.ActiveCol < 2 Then
        Exit Sub
    End If

    Spread1.ReDraw = False

    baseCol = Spread1.ActiveCol

    For y& = 1 To Spread1.MaxRows
        Spread1.Col = baseCol
        Spread1.Row = y&
        baseAttribStr = Spread1.Text
        For x& = 2 To Spread1.MaxCols
            Spread1.Col = x&
            If x& = baseCol Then
                Spread1.ForeColor = BLACK
                Spread1.BackColor = WHITE
            Else
                curAttribStr = Spread1.Text
                If curAttribStr = baseAttribStr Then
                    Spread1.BackColor = WHITE
                Else
                    Spread1.BackColor = CYAN
                End If
            End If
        Next x&
    Next y&

    Legend.Visible = True

    Spread1.ReDraw = True

End Sub

Sub Command2_Click ()
    Unload Me
End Sub

Sub Command3_Click ()
    Spread1.ReDraw = False
    For y& = 1 To Spread1.MaxRows
        Spread1.Row = y&
        For x& = 2 To Spread1.MaxCols
            Spread1.Col = x&
            Spread1.ForeColor = BLACK
            Spread1.BackColor = WHITE
        Next x&
    Next y&

    Legend.Visible = False
    Spread1.ReDraw = True
End Sub

Sub CompareCols ()

    Spread1.Col = 0
    For y& = 1 To Spread1.MaxRows
        Spread1.Row = y&
        ret% = SpreadGetText(Spread1, 2, y&, baseStr$)
        SpreadSetText Spread1, 0, y&, "="
        For x& = 3 To Spread1.MaxCols
            ret% = SpreadGetText(Spread1, x&, y&, tmpStr$)
            If tmpStr$ <> baseStr$ Then
                SpreadSetText Spread1, 0, y&, "<>"
                Exit For
            End If
        Next x&
    Next y&

End Sub

Sub FillInAttributeTitles ()

CUR_SUB = "Sub FillIncolumnTitles"
On Error GoTo VB_ERR_FillIncolumnTitles
    Dim x1 As Long, Counter As Long

    Spread1.MaxCols = 1
    Spread1.MaxRows = UBound(Attributes) + 1

    Counter = 0

    For x1 = 0 To UBound(Attributes)

        If Attributes(x1).AttributeOrder <> -1 Then
            Counter = Counter + 1
            'put in column headings
            SpreadSetText Spread1, 1, Counter, Attributes(x1).AttributeTitle
        End If

    Next x1

    Spread1.MaxRows = Counter

VB_ERR_FillIncolumnTitles:
If Err <> 0 Then
    ExitPmx DatabaseHandle
End If

End Sub

Sub FillInstanceInfo (thisInstance As Long, Col As Long)

CUR_SUB = "Sub FillInstanceInfo"
On Error GoTo VB_ERR_FillInstanceInfo

    Dim x1  As Long, Counter As Long
    Dim attributeStr As String
    Dim thisConvertedValue As Long

    Counter = 0

    Spread1.MaxCols = Col + 1

    For x1 = 0& To UBound(Attributes)

        If Attributes(x1).AttributeOrder <> -1 Then

            Counter = Counter + 1

            attributeStr = ""

            thisParameterDescriptor = pmx_getParameterDescriptor(DatabaseHandle, t
            If thisParameterDescriptor = 0& Then
                pmx_error
                Exit Sub
            End If

            'Determine if this attribute is set to undefined
            If pmx_getParameterCode(thisParameterDescriptor) = PMX_PARAMETER_UNDEI
                attributeStr = ""
            Else
                Select Case Attributes(x1).AttributeType

                    Case PMX_ATTRIBUTE_ENUMERATION

                        tmpHandle = pmx_getParameterEnumeratorHandle(thisParamete
                        If pmx_isNullEnumeratorHandle(tmpHandle) = CD_TRUE Then
```

```
            pmx_error
            Exit Sub
        End If

        attributeStr = c2vbStr(pmx_getParameterEnumeratorName(thisPar

      Case PMX_ATTRIBUTE_NUMERIC

        pmx_getParameterNumericForVB thisParameterDescriptor, retFloa
        tmpHandle = pmx_getParameterUnitHandle(thisParameterDescripto
        If pmx_isNullUnitHandle(tmpHandle) = CD_TRUE Then
            pmx_error
            Exit Sub
        End If

        'get the unit for this instance
        thisConvertedValue = pmx_convertBaseToNumericUnit(DatabaseHan
        unitStr$ = c2vbStr(pmx_getNumericConversionUnitName(thisConve

        ret% = pmx_freeNumericConvertedValue(thisConvertedValue)
        If ret% = CD_FALSE Then
            pmx_error
        End If

        attributeStr = CStr(retFloat!) + " " + unitStr$

      Case PMX_ATTRIBUTE_BOOLEAN

        tf% = pmx_getParameterBoolean(thisParameterDescriptor)

        If tf% = CD_TRUE Then
            attributeStr = "True"
        Else
            attributeStr = "False"
        End If

      Case PMX_ATTRIBUTE_STRING

        attributeStr = c2vbStr(pmx_getParameterString(thisParameterDe

      Case PMX_ATTRIBUTE_STRINGARRAY

    End Select

  End If

  If attributeStr <> "" Then
      SpreadSetText Spread1, Col + 1, Counter, "  " & attributeStr
  End If

  ret% = pmx_freeParameterDescriptor(thisParameterDescriptor)
  If ret% = CD_FALSE Then
      pmx_error
  End If

 End If

Next x1

VB_ERR_FillInstanceInfo:
If Err <> 0 Then
    ExitPmx DatabaseHandle
End If

End Sub

Sub Form_Load ()

    Set CallingForm = PMX.ActiveForm
    DatabaseHandle = FormData(CallingForm.Tag).DBHandle
    QueryResultHandle = globalQueryResultHandle
    ClassHandle = globalClassHandle

    Dim SelCount As Long, x1 As Long
    Dim CurCount As Long
    Dim thisInstance As Long

    Me.Width = Screen.Width * .95

    Me.Height = Screen.Height * .65

    CenterMe Me

    SelCount = CallingForm.lstParts1.SelModeSelCount
    CurCount = 0

    ReDim Attributes(UBound(globalAttributeInfo))

    For x% = 0 To UBound(Attributes)
        Attributes(x%).AttributeHandle = globalAttributeInfo(x%).AttributeHandle
        Attributes(x%).AttributeType = globalAttributeInfo(x%).AttributeType
        Attributes(x%).AttributeTitle = globalAttributeInfo(x%).AttributeTitle
        Attributes(x%).AttributeOrder = globalAttributeInfo(x%).AttributeOrder
        Attributes(x%).UnitFamily = globalAttributeInfo(x%).UnitFamily
        Attributes(x%).EnumeratedNumeric = globalAttributeInfo(x%).EnumeratedNume
        Attributes(x%).EnumeratedUnitHandle = globalAttributeInfo(x%).EnumeratedU
        Attributes(x%).LocalAttribute = globalAttributeInfo(x%).LocalAttribute
        Attributes(x%).Protected = globalAttributeInfo(x%).Protected
        Attributes(x%).Required = globalAttributeInfo(x%).Required
        Attributes(x%).ReadOnly = globalAttributeInfo(x%).ReadOnly
        Attributes(x%).FreshMeat = globalAttributeInfo(x%).FreshMeat
        Attributes(x%).Key = -1
        Attributes(x%).SortOrder = -1
        Attributes(x%).AttributeSetting = globalAttributeInfo(x%).AttributeSettin
    Next x%

    Erase globalAttributeInfo

    FillInAttributeTitles

    For x1 = 1 To CallingForm.lstParts1.VirtualMaxRows
        CallingForm.lstParts1.Row = x1
        If CallingForm.lstParts1.SelModeSelected = True Then
            CurCount = CurCount + 1
            thisInstance = pmx_getIthQueryInstance(DatabaseHandle, QueryResultHan
            FillInstanceInfo thisInstance, CurCount
            SpreadSetText Spread1, CurCount + 1, 0, "Part " & CStr(x1)
            If CurCount = SelCount Then
                Exit For
            End If
        End If
    Next x1

    Spread1.Row = -2
    For x1 = 1 To Spread1.MaxCols
        Spread1.ColWidth(x1) = Spread1.MaxTextColWidth(x1) + 50
    Next x1

    CompareCols

    SetSelection 2, 0

    Spread1.ReDraw = True
    Me.Refresh

    Screen.MousePointer = 0

End Sub

Sub Form_Unload (Cancel As Integer)
    Erase Attributes
End Sub

Sub SetSelection (Col As Long, Row As Long)
    Spread1.ReDraw = False
    LeftCol& = Spread1.LeftCol
    If Row < 1 Then
        Spread1.Row = 1
        Spread1.Row2 = 1
        Spread1.Col = 1
        Spread1.Col2 = 1
        Spread1.Action = SS_ACTION_SELECT_BLOCK
    End If
    If Col < 2 Then
        Spread1.Row = 1
        Spread1.Row2 = 1
        Spread1.Col = 1
        Spread1.Col2 = 1
```

```
            Spread1.Action = SS_ACTION_SELECT_BLOCK
        Else
            Spread1.Row = 1
            Spread1.Row2 = Spread1.MaxRows
            Spread1.Col = Col
            Spread1.Col2 = Col
            Spread1.Action = SS_ACTION_SELECT_BLOCK
            Spread1.Row = 0
            Spread1.Action = SS_ACTION_ACTIVE_CELL
        End If
        Spread1.LeftCol = LeftCol&
        Spread1.ReDraw = True
    End Sub

    Sub Spread1_Click (Col As Long, Row As Long)
        SetSelection Col, Row
    End Sub

    Sub Spread1_DblClick (Col As Long, Row As Long)
        SetSelection Col, Row
        Command1.Value = True
    End Sub

    Sub Spread1_LeaveCell (Col As Long, Row As Long, NewCol As Long, NewRow As Long, Canc
        SetSelection Col, Row
    End Sub

    Sub Spread1_MouseDown (Button As Integer, Shift As Integer, x As Single, y As Single)

        Exit Sub
        GetCursorPos CursPos
        ColRect.Top = CursPos.y
        ColRect.Bottom = CursPos.y
        ColRect.Left = CursPos.x
        ColRect.Right = CursPos.x

        ClipCursor ColRect
    End Sub

    Sub Spread1_MouseUp (Button As Integer, Shift As Integer, x As Single, y As Single)
        ClipCursor ByVal 0&
    End Sub
```

APPENDIX F

```
/*******************************************************************
        compareDialog.c

        Associated Header file: compareDialog.h
*******************************************************************/

#include <stdio.h>
#include "UxLib.h"
#include "UxPushB.h"
#include "UxSep.h"
#include "UxForm.h"
#include "UxDialSh.h"

/*******************************************************************
        Includes, Defines, and Global variables from the Declarations Editor:
*******************************************************************/

#include <Xm/MwmUtil.h>
#include "scale.h"

/*******************************************************************
        The following header file defines the context structure.
*******************************************************************/

#define CONTEXT_MACRO_ACCESS 1
#include "compareDialog.h"
#undef CONTEXT_MACRO_ACCESS

/*******************************************************************
Auxiliary code from the Declarations Editor:
*******************************************************************/

popup_compareDialog( MyParent, rowArray, numRows, rowNums, numCols )
    swidget MyParent;
    char ***rowArray;
    int numRows;
    long *rowNums;
    int numCols;
{
    static Boolean isUp = False;
    extern void create_compareTable();
    extern void update_compareTable();

    if ( isUp == False )
    {
        create_compareDialog( MyParent );
        create_compareTable( compareForm, compareSep );
        isUp = True;
    }
    update_compareTable( rowArray, numRows, rowNums, numCols );
    UxPopupInterface( compareDialog, no_grab );
}

/*******************************************************************
        The following are callback functions.
*******************************************************************/

static  void    activateCB_btnClose( UxWidget, UxClientData, UxCallbackArg )
    Widget      UxWidget;
    XtPointer   UxClientData, UxCallbackArg;

{
    _UxCcompareDialog       *UxSaveCtx, *UxContext;
    swidget                 UxThisWidget;

    UxThisWidget = UxWidgetToSwidget( UxWidget );

    UxSaveCtx = UxCompareDialogContext;
    UxCompareDialogContext = UxContext =
            (_UxCcompareDialog *) UxGetContext( UxThisWidget );
    {
        UxPopdownInterface( compareDialog );
    }
    UxCompareDialogContext = UxSaveCtx;
}

static  void    activateCB_btnCompare( UxWidget, UxClientData, UxCallbackArg )
    Widget      UxWidget;
    XtPointer   UxClientData, UxCallbackArg;

{
    _UxCcompareDialog       *UxSaveCtx, *UxContext;
    swidget                 UxThisWidget;

    UxThisWidget = UxWidgetToSwidget( UxWidget );

    UxSaveCtx = UxCompareDialogContext;
    UxCompareDialogContext = UxContext =
            (_UxCcompareDialog *) UxGetContext( UxThisWidget );
    {
        void compare_compareTable();

        compare_compareTable();
    }
    UxCompareDialogContext = UxSaveCtx;
}

static  void    activateCB_btnClear( UxWidget, UxClientData, UxCallbackArg )
    Widget      UxWidget;
    XtPointer   UxClientData, UxCallbackArg;

{
    _UxCcompareDialog       *UxSaveCtx, *UxContext;
    swidget                 UxThisWidget;

    UxThisWidget = UxWidgetToSwidget( UxWidget );

    UxSaveCtx = UxCompareDialogContext;
    UxCompareDialogContext = UxContext =
            (_UxCcompareDialog *) UxGetContext( UxThisWidget );
    {
        void clear_compareTable();

        clear_compareTable();
    }
    UxCompareDialogContext = UxSaveCtx;
}

/*******************************************************************
        The 'build_' function creates all the swidgets and X widgets,
        and sets their properties to the values specified in the
        Property Editor.
*******************************************************************/

static swidget  _Uxbuild_compareDialog()
{
    /* Create the swidgets */

    /* Creation of compareDialog */
    compareDialog = UxCreateDialogShell( "compareDialog", UxParent );
    UxPutContext( compareDialog, UxCompareDialogContext );

    UxPutDeleteResponse( compareDialog, "unmap" );
    UxPutMinHeight( compareDialog, SCALED_Y(300) );
    UxPutMinWidth( compareDialog, SCALED_X(500) );
    UxPutMwmDecorations( compareDialog, MWM_DECOR_TITLE | MWM_DECOR_RESIZEH | MWM_
    UxCreateWidget( compareDialog );


    /* Creation of compareForm */
    compareForm = UxCreateForm( "compareForm", compareDialog );
    UxPutWidth( compareForm, SCALED_X(600) );
    UxPutHeight( compareForm, SCALED_Y(400) );
    UxPutResizePolicy( compareForm, "resize_none" );
    UxPutUnitType( compareForm, "pixels" );
    UxPutDialogStyle( compareForm, "dialog_primary_application_modal" );
    UxPutAutoUnmanage( compareForm, "false" );
    UxPutDialogTitle( compareForm, "Parts Compare" );
    UxCreateWidget( compareForm );


    /* Creation of compareSep */
    compareSep = UxCreateSeparator( "compareSep", compareForm );
    UxPutHeight( compareSep, 4 );
```

```
    UxPutBottomAttachment( compareSep, "attach_form" );
    UxPutBottomOffset( compareSep, SCALED_Y(50) );
    UxPutRightAttachment( compareSep, "attach_form" );
    UxPutTopAttachment( compareSep, "attach_none" );
    UxPutLeftAttachment( compareSep, "attach_form" );
    UxCreateWidget( compareSep );


    /* Creation of btnClose */
    btnClose = UxCreatePushButton( "btnClose", compareForm );
    UxPutWidth( btnClose, SCALED_X(90) );
    UxPutHeight( btnClose, SCALED_Y(30) );
    UxPutLabelString( btnClose, "Close" );
    UxPutBottomAttachment( btnClose, "attach_form" );
    UxPutBottomOffset( btnClose, SCALED_Y(10) );
    UxPutLeftAttachment( btnClose, "attach_none" );
    UxPutTopAttachment( btnClose, "attach_none" );
    UxPutRightAttachment( btnClose, "attach_position" );
    UxPutRightPosition( btnClose, 80 );
    UxCreateWidget( btnClose );

    UxAddCallback( btnClose, XmNactivateCallback,
        (XtCallbackProc) activateCB_btnClose,
        (XtPointer) UxCompareDialogContext );


    /* Creation of btnCompare */
    btnCompare = UxCreatePushButton( "btnCompare", compareForm );
    UxPutWidth( btnCompare, SCALED_X(90) );
    UxPutHeight( btnCompare, SCALED_Y(30) );
    UxPutLabelString( btnCompare, "Compare" );
    UxPutBottomAttachment( btnCompare, "attach_form" );
    UxPutBottomOffset( btnCompare, SCALED_Y(10) );
    UxPutLeftAttachment( btnCompare, "attach_position" );
    UxPutLeftPosition( btnCompare, 20 );
    UxPutTopAttachment( btnCompare, "attach_none" );
    UxCreateWidget( btnCompare );

    UxAddCallback( btnCompare, XmNactivateCallback,
        (XtCallbackProc) activateCB_btnCompare,
        (XtPointer) UxCompareDialogContext );


    /* Creation of btnClear */
    btnClear = UxCreatePushButton( "btnClear", compareForm );
    UxPutWidth( btnClear, SCALED_X(90) );
    UxPutHeight( btnClear, SCALED_Y(30) );
    UxPutLabelString( btnClear, "Clear" );
    UxPutBottomAttachment( btnClear, "attach_form" );
    UxPutBottomOffset( btnClear, SCALED_Y(10) );
    UxPutLeftAttachment( btnClear, "attach_position" );
    UxPutLeftOffset( btnClear, SCALED_X(-45) );
    UxPutLeftPosition( btnClear, 50 );
    UxPutTopAttachment( btnClear, "attach_none" );
    UxCreateWidget( btnClear );

    UxAddCallback( btnClear, XmNactivateCallback,
        (XtCallbackProc) activateCB_btnClear,
        (XtPointer) UxCompareDialogContext );

    UxAddCallback( compareDialog, XmNdestroyCallback,
        (XtCallbackProc) UxDestroyContextCB,
        (XtPointer) UxCompareDialogContext);


    /* UxRealizeInterface creates the X windows for the widgets above. */

    UxRealizeInterface( compareDialog );

    return ( compareDialog );
}

/*************************************************************************
    The following is the 'Interface function' which is the
    external entry point for creating this interface.
    This function should be called from your application or from
    a callback function.
*************************************************************************/

swidget create_compareDialog( _UxUxParent )
    swidget _UxUxParent;
{
    swidget                 rtrn;
    _UxCcompareDialog       *UxContext;

    UxCompareDialogContext = UxContext =
        (_UxCcompareDialog *) UxNewContext( sizeof(_UxCcompareDialog), False );

    UxParent = _UxUxParent;

    rtrn = _Uxbuild_compareDialog();

    return(rtrn);
}

/*************************************************************************
    END OF FILE
*************************************************************************/


/*************************************************************************
    compareDialog.h
    This header file is included by compareDialog.c

*************************************************************************/

#ifndef _COMPAREDIALOG_INCLUDED
#define _COMPAREDIALOG_INCLUDED


#include <stdio.h>
#include "UxLib.h"
#include "UxPushB.h"
#include "UxSep.h"
#include "UxForm.h"
#include "UxDialSh.h"

/*************************************************************************
    The definition of the context structure:
    If you create multiple copies of your interface, the context
    structure ensures that your callbacks use the variables for the
    correct copy.

    For each swidget in the interface, each argument to the Interface
    function, and each variable in the Interface Specific section of the
    Declarations Editor, there is an entry in the context structure.
    and a #define.  The #define makes the variable name refer to the
    corresponding entry in the context structure.
*************************************************************************/

typedef struct
{
    swidget UxcompareDialog;
    swidget UxcompareForm;
    swidget UxcompareSep;
    swidget UxbtnClose;
    swidget UxbtnCompare;
    swidget UxbtnClear;
    swidget UxUxParent;
} _UxCcompareDialog;

#ifdef CONTEXT_MACRO_ACCESS
static _UxCcompareDialog        *UxCompareDialogContext;
#define compareDialog           UxCompareDialogContext->UxcompareDialog
#define compareForm             UxCompareDialogContext->UxcompareForm
#define compareSep              UxCompareDialogContext->UxcompareSep
#define btnClose                UxCompareDialogContext->UxbtnClose
#define btnCompare              UxCompareDialogContext->UxbtnCompare
#define btnClear                UxCompareDialogContext->UxbtnClear
#define UxParent                UxCompareDialogContext->UxUxParent

#endif /* CONTEXT_MACRO_ACCESS */

/*************************************************************************
    Declarations of global functions.
*************************************************************************/
```

```
swidget create_compareDialog();
#endif /* _COMPAREDIALOG_INCLUDED */
```

```
/*------------------------------------------------------------------------
//     This program is the confidential and proprietary product of CADIS, Inc.
//     Any unauthorized use, reproduction or transfer of this program
//     is strictly prohibited.
//                    Copyright (C) 1994 by CADIS, Inc.
//
//  File name---
//    compareTable.c
//
//  Purpose---
//    Retrieves the results of a search query and builds the table
//    for the results dialog.
//
//  File modfication history---
//
//  Description---
//
-------------------------------------------------------------------------*/

#include <stdio.h>
#include "UxLib.h"
#include "scale.h"

#include "memAlloc.h"
#include "retrieve.h"
#include "Matrix.h"

void clear_compareTable();

typedef struct
{
    String  equalColor;
    String  unequalColor;
} CompareColors;

static Widget compareTable;
static CompareColors compareColors;
static Pixel equalColor;
static Pixel unequalColor;

static XtResource compareResources[] =
{
    {
        "equalColor",
        "EqualColor",
        XmRString,
        sizeof(String),
        XtOffsetOf( CompareColors, equalColor ),
        XmRImmediate,
        (XtPointer) "Green"
    },
    {
        "unequalColor",
        "UnequalColor",
        XmRString,
        sizeof(String),
        XtOffsetOf( CompareColors, unequalColor ),
        XmRImmediate,
        (XtPointer) "Red"
    },
};

/*------------------------------------------------------------------------
/  getColor returns the Pixel value for a given color.
-------------------------------------------------------------------------*/
static Pixel
getColor( w, sColor )
Widget w;
char *sColor;
{
    XrmValue from, to;

    from.size = strlen( sColor ) + 1;
    if ( from.size < sizeof(String) )
        from.size = sizeof(String);
    from.addr = sColor;
    to.addr = NULL;
    XtConvert( w, XmRString, &from, XmRPixel, &to );
    if ( to.addr != NULL )
        return( (Pixel) *((Pixel*)to.addr ));
    else
        return( (XtArgVal) NULL );
}

/*------------------------------------------------------------------------
/  colorLoad is called at startup time to load Part Comparison definitions
/  from the user's application resources.
-------------------------------------------------------------------------*/
void
colorLoad( topLevel )
    Widget topLevel;
{
    XtVaGetApplicationResources( topLevel, &compareColors,
            compareResources, XtNumber(compareResources), NULL );
    equalColor = getColor( topLevel, compareColors.equalColor );
    unequalColor = getColor( topLevel, compareColors.unequalColor );
}

/*------------------------------------------------------------------------
/  This callback is called whenever a new cell on the table is entered.
/  It ensures that no cell can be edited.
-------------------------------------------------------------------------*/
static void
compareEnterCell( UxWidget, UxClientData, Cell )
    Widget      UxWidget;
    XtPointer   UxClientData;
    XbaeMatrixEnterCellCallbackStruct *Cell;

{
    Cell->doit = False;
}

static int currentColumn;

/*------------------------------------------------------------------------
/  This callback is called when a row or column button is pressed.
/  We only allow selecting a column.
-------------------------------------------------------------------------*/
static void
compareSelectColumn( UxWidget, UxClientData, Cell )
    Widget      UxWidget;
    XtPointer   UxClientData;
    XbaeMatrixRowColumnClickCallbackStruct *Cell;
{
    if ( Cell->reason == XbaeColumnClickReason &&
            Cell->row_column > 0 )
    {
        clear_compareTable();
        XbaeMatrixDeselectAll( UxWidget );
        XbaeMatrixSelectColumn( UxWidget, Cell->row_column );
        currentColumn = Cell->row_column - 1;
    }
}

/*------------------------------------------------------------------------
//  create_compareTable creates the Table widget and assigns all of
//  its attributes.  It is filled in later.
-------------------------------------------------------------------------*/
Widget
create_compareTable( MyParent, adjacentWidget )
    swidget MyParent, adjacentWidget;
{
    int         i;
    short       colWidth[2];
    Widget      rtrn;

    colWidth[0] = 10;
    rtrn = XtVaCreateManagedWidget("",
            xbaeMatrixWidgetClass,
            UxGetWidget(MyParent),
            XmNresizePolicy, XmRESIZE_ANY,
            XmNx, SCALED_X( 0) ,
            XmNy, SCALED_Y( 0) ,
            XmNwidth, SCALED_X( 600) ,
            XmNheight, SCALED_Y( 400) ,
            XmNrows, 1,
            XmNcolumns, 1,
            XmNcolumnWidths, colWidth,
```

```
            XmNspace, 1,
            XmNcellHighlightThickness, 1,
            XmNcellShadowThickness, 1,
            XmNcolors, NULL,
            XmNbottomAttachment, XmATTACH_WIDGET,
            XmNbottomWidget, UxGetWidget(adjacentWidget),
            XmNleftAttachment, XmATTACH_FORM,
            XmNrightAttachment, XmATTACH_FORM,
            XmNtopAttachment, XmATTACH_FORM,
            XmNtraversalOn, 0,
            NULL );

    XtAddCallback( rtrn, XmNenterCellCallback,
        (XtCallbackProc) compareEnterCell,
        (XtPointer) NULL );
    XtAddCallback( rtrn, XmNrowColumnClickCallback,
        (XtCallbackProc) compareSelectColumn,
        (XtPointer) NULL );

    compareTable = rtrn;
    return rtrn;
}

/*---------------------------------------------------------------------------
 /  compareRow looks at the strings in a row and sees if they are all
 /  the same.
----------------------------------------------------------------------------*/
static cd_boolean
compareRow( rowPtr, numItems )
    char **rowPtr;
    int numItems;
{
    int i;
    char *sFirst, *sNext;
    cd_boolean isSame = CD_TRUE;

    /*
     * Skip over the first column.  It contains the
     * attribute name.
     */
    if ( ( sFirst = rowPtr[1] ) == NULL )
        sFirst = "";
    /*
     * See if the rest of the columns match the first one.
     */
    for( i = 2; i < numItems; i++ )
    {
        if ( ( sNext = rowPtr[i] ) == NULL )
            sNext = "";
        /*
         * Stop if we find a non-match.
         */
        if ( strcmp( sFirst, sNext ) != 0 )
        {
            isSame = CD_FALSE;
            break;
        }
    }
    return isSame;
}

/*---------------------------------------------------------------------------
 /  update_resultsTable is an overly long routine that fills in a
 /  results table with the results of a query.  It populates the table
    previously created by building a row array of column arrays of
    string pointers.  Along the way it adjusts the column widths for
    proper display of the attribute values.
    If no items are available or if the order list is empty we put
    up an error dialog and return a bad status.
----------------------------------------------------------------------------*/
void
update_compareTable( rowArray, numRows, selRows, numCols )
    char ***rowArray;
    int numRows;
    long *selRows;
    int numCols;
{
    int i, j, n;
    char sBuf[24];
    char **colLabels;
    char **rowLabels;
    char **rowPtr;
    short *colWidths;
    unsigned char *colAlign;

    colLabels = (char **)cd_memAlloc( (numCols + 1) * sizeof(char*) );
    colWidths = (short *)cd_memAlloc( (numCols + 1) * sizeof(short) );
    for( j = 0; j < numCols + 1; colWidths[j++] = 5 );
    colAlign  = (unsigned char *)cd_memAlloc( (numCols + 1) );
    rowLabels = (char **)cd_memAlloc( numRows * sizeof(char*) );

    for( i = 0; i < numRows; i++ )
    {
        rowPtr = rowArray[i];
        if ( compareRow( rowPtr, numCols ) == CD_TRUE )
            rowLabels[i] = "=";
        else
            rowLabels[i] = "<>";
        for( j = 0; j < numCols; j++ )
        {
            if ( rowPtr[j] != NULL &&
                    ( n = strlen( rowPtr[j] ) ) > colWidths[j] )
                colWidths[j] = n;
        }
    }
    colLabels[0] = "Attribute";
    colAlign[0] = XmALIGNMENT_CENTER;
    for( j = 1; j < numCols; j++ )
    {
        colAlign[j] = XmALIGNMENT_CENTER;
        sprintf( sBuf, "%d", selRows[j-1] );
        colLabels[j] = (char*)cd_memAlloc( strlen(sBuf) + 1 );
        strcpy( colLabels[j], sBuf );
    }

    XtVaSetValues( compareTable,
        XmNcolors, NULL,
        XmNcolumns, (numCols > 0 ? numCols : 1),
        XmNcolumnLabels, colLabels,
        XmNcolumnLabelAlignments, colAlign,
        XmNcolumnWidths, colWidths,
        XmNcells, rowArray,
        XmNfixedColumns, 1,
        XmNrows, numRows,
        XmNrowLabels, rowLabels,
        XmNrowLabelAlignment, XmALIGNMENT_CENTER,
        XmNrowLabelWidth, 3,
        NULL );

    XbaeMatrixDeselectAll( compareTable );
    XbaeMatrixSelectColumn( compareTable, 1 );
    currentColumn = 0;

    for(i = 1; i < numCols; i++)
        cd_memFree( colLabels[i] );
    cd_memFree( colLabels );
    cd_memFree( colWidths );
    cd_memFree( colAlign );
    cd_memFree( rowLabels );
    return;
}

/*---------------------------------------------------------------------------
 /  compareAttr compares the strings in a row against the selected
 /  column and builds a color string.
----------------------------------------------------------------------------*/
static void
compareAttr( rowPtr, colNbr, numItems, colorPtr )
    char **rowPtr;
    int colNbr;
    int numItems;
    Pixel *colorPtr;
{
    int i;
    char *sSel, *sCur;
    Pixel dflt;

    dflt = BlackPixel( UxDisplay, UxScreen );
```

```
    colorPtr[0] = dflt;
    /*
     * Fetch the selected column string.
     */
    if ( ( sSel = rowPtr[colNbr] ) == NULL )
        sSel = "";
    /*
     * See if the rest of the columns match the selected one.
     */
    for( i = 1; i < numItems; i++ )
    {
        if ( i == colNbr )
        {
            colorPtr[i] = dflt;
            continue;
        }

        if ( ( sCur = rowPtr[i] ) == NULL )
            sCur = "";
        /*
         * Set the color of the cell according to
         * equal or unequal.
         */
        if ( strcmp( sSel, sCur ) == 0 )
            colorPtr[i] = equalColor;
        else
            colorPtr[i] = unequalColor;
    }
}

/*-----------------------------------------------------------------------
/   compare_compareTable compares the string in each column of the table
/   against the string in the selected column and sets its color
/   according to equal or unequal.
-----------------------------------------------------------------------*/
void
compare_compareTable()
{
    int i;
    int numCols, numRows;
    char ***rowArray;
    Pixel *cp;
    Pixel **colorArray;

    XtVaGetValues( compareTable,
        XmNcolumns, &numCols,
        XmNcells, &rowArray,
        XmNrows, &numRows,
        NULL );

    colorArray = (Pixel**)cd_memAlloc( numRows * sizeof(Pixel*) );
    for( i = 0; i < numRows; i++ )
    {
        cp = (Pixel*)cd_memAlloc( numCols * sizeof(Pixel) );
        memset( cp, 0, numCols * sizeof(Pixel) );
        compareAttr( rowArray[i], currentColumn + 1,
            numCols, cp );
        colorArray[i] = cp;
    }

    XtVaSetValues( compareTable,
        XmNcolors, colorArray,
        NULL );

    for( i = 0; i < numRows; i++ )
        cd_memFree( colorArray[i] );
    cd_memFree( colorArray );
}

/*-----------------------------------------------------------------------
/   clear_compareTable resets the colors in the table back to the default.
-----------------------------------------------------------------------*/
void
clear_compareTable()
{
    Pixel **colorArray;

    XtVaGetValues( compareTable,
        XmNcolors, &colorArray,
        NULL );

    if ( colorArray != NULL )
        XtVaSetValues( compareTable,
            XmNcolors, NULL,
            NULL );
}
```

What is claimed is:

1. A network having a client/server architecture comprising:

a plurality of client applications;

a knowledge base server, the knowledge base server including a dynamic class manager, a connection manager, a query manager, a handle manager, a units manager, a database manager, and a file manager;

an object oriented hierarchical schema representing classes of instances as objects arranged in a hierarchy, said schema being fully connected with each class object including information as to any class object that is a parent in the hierarchy, and class objects that are descendants in the hierarchy, said class objects being managed by said dynamic class manager;

a concurrency control system for controlling access by said plurality of client applications by providing class share locks and not using instance locks, the concurrency control system including an object oriented lock manager, and a lock holder table, the lock manager being operative to control concurrent access by said client applications by granting class share locks for navigation of the schema, the lock manager being operative to control concurrent access by said client applications by granting tree exclusive locks for certain editing functions, and the lock manager being operative to control concurrent access by said client applications by granting tree update locks for certain limited functions as to which more concurrency may be provided as compared to functions as to which a tree exclusive lock is required; and, the object oriented lock manager obtaining from the dynamic class manager information concerning the relationship between classes in determining whether locks requested by said client applications may be granted.

2. An object oriented database management system in a client/server architecture having a knowledge base client and a knowledge base server, the knowledge base server including a dynamic class manager, a connection manager, a query manager, a handle manager, a units manager, a database manager, and a file manager, comprising:

an object oriented hierarchical database structure including classes, where each class is represented by a class object data structure which includes hierarchical location identifying information for said class, said class object data structures being managed by said dynamic class manager;

an object oriented lock manager for controlling access by a plurality of client applications, said object oriented lock manager providing concurrency control using class share locks, tree update locks, and tree exclusive locks, and not using instance locks; and, a lock holder table, the lock holder table being used by the lock manager to control concurrent access by said client applications by granting appropriate locks to a client application when the requested lock does not conflict with an existing lock in the lock holder table.

* * * * *